US012771431B2

(12) United States Patent
Murakami

(10) Patent No.: US 12,771,431 B2
(45) Date of Patent: Oct. 20, 2026

(54) COMMUNICATION DEVICE AND COMMUNICATION METHOD

(71) Applicant: Panasonic Intellectual Property Corporation of America, Torrance, CA (US)

(72) Inventor: Yutaka Murakami, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 295 days.

(21) Appl. No.: 18/696,284

(22) PCT Filed: Jul. 15, 2022

(86) PCT No.: PCT/JP2022/027838
§ 371 (c)(1),
(2) Date: Mar. 27, 2024

(87) PCT Pub. No.: WO2023/053671
PCT Pub. Date: Apr. 6, 2023

(65) Prior Publication Data

US 2025/0317185 A1 Oct. 9, 2025

(30) Foreign Application Priority Data

Sep. 30, 2021 (JP) ................................ 2021-161741

(51) Int. Cl.
*H04W 76/40* (2018.01)
*H04B 7/06* (2006.01)
(Continued)

(52) U.S. Cl.
CPC ......... *H04B 7/06952* (2023.05); *H04L 5/023* (2013.01); *H04W 74/0808* (2013.01); *H04W 76/40* (2018.02)

(58) Field of Classification Search
CPC ............... H04B 7/06952; H04L 5/023; H04W 74/0808; H04W 76/40; H04W 16/14; H04W 16/28
See application file for complete search history.

(56) References Cited

U.S. PATENT DOCUMENTS

| | | | |
|---|---|---|---|
| 10,368,301 | B2 | 7/2019 | Chendamarai Kannan et al. |
| 2010/0128712 | A1 | 5/2010 | Cordeiro |

(Continued)

FOREIGN PATENT DOCUMENTS

| | | | |
|---|---|---|---|
| JP | 2012529849 | A | 11/2012 |
| JP | 2018518855 | A | 7/2018 |

OTHER PUBLICATIONS

Supplementary Partial European Search Report, dated Nov. 22, 2024, for European Patent Application No. 22875549.2. (13 pages).

(Continued)

*Primary Examiner* — Chuong A Ngo
(74) *Attorney, Agent, or Firm* — Seed Intellectual Property Law Group LLP

(57) ABSTRACT

This communication device includes a control circuit that forms a plurality of beams, and a communication circuit that transmits each of a plurality of broadcast frames in association with the respective beams. The communication circuit
(Continued)

transmits the plurality of broadcast frames on the basis of a result of Listen Before Talk (LBT) carried out in the direction of the respective beams.

13 Claims, 157 Drawing Sheets

(51) Int. Cl.
*H04L 5/02* (2006.01)
*H04W 74/0808* (2024.01)

(56) References Cited

U.S. PATENT DOCUMENTS

| | | | | |
|---|---|---|---|---|
| 2010/0322130 | A1 | 12/2010 | Gong et al. | |
| 2016/0323755 | A1 | 11/2016 | Cordeiro et al. | |
| 2018/0279134 | A1* | 9/2018 | Malik | H04L 5/0048 |
| 2019/0261296 | A1* | 8/2019 | Li | H04B 7/0617 |
| 2020/0022185 | A1* | 1/2020 | Luo | H04B 7/088 |
| 2021/0120583 | A1 | 4/2021 | Wang et al. | |

OTHER PUBLICATIONS

3GPP TS 23.501 V16.1.0; "3rd Generation Partnership Project; Technical Specification Group Services and System Aspects; System Architecture for the 5g System; Stage 2 (Release 16);" Jun. 2019; 367 pages.

3GPP TS 38.211 V15.6.0, "3rd Generation Partnership Project; Technical Specification Group Radio Access Network; NR; Physical channels and modulation (Release 15)," Jun. 2019, 97 pages.

3GPP TS 38.300 V15.6.0, "3rd Generation Partnership Project; Technical Specification Group Radio Access Network; NR; NR and NG-RAN Overall Description; Stage 2 (Release 15)," Jun. 2019, 99 pages.

International Search Report dated Sep. 6, 2022, for the corresponding International Patent Application No. PCT/JP2022/027838, 4 pages. (With English Translation).

International Telecommunication Union, "IMT Vision—Framework and overall objectives of the future development of IMT for 2020 and beyond," Recommendation ITU-R M.2083-0, Sep. 2015, 21 pages.

* cited by examiner

FIG. 87
001
RADIO COMMUNI-CATION DEVICE
051
RADIO COMMUNI-CATION DEVICE

COMMUNICATION DEVICE AND COMMUNICATION METHOD

TECHNICAL FIELD

The present disclosure relates to a communication apparatus and a communication method.

BACKGROUND ART

An exemplary system using a frequency equal to or higher than 52.6 GHz is a communication system using a 60 GHz band.

A scheme disclosed in Patent Literature 1 is one of a communication method for extending a communication distance. FIG. 87 illustrates an exemplary communication state of radio communication devices disclosed in Patent Literature 1.

For example, radio communication device 001 transmits a sector sweep signal. After that, radio communication device 051 transmits a sector sweep signal. Then, radio communication device 051 transmits a signal including feedback information on the sector sweep to radio communication device 001.

Following this procedure, radio communication device 001 determines a method of "transmit beamforming and/or receive beamforming", and radio communication device 051 also determines a method of "transmit beamforming and/or receive beamforming". This extends the communication distance between radio communication device 001 and radio communication device 051.

CITATION LIST

Patent Literature

PTL 1

Japanese Unexamined Patent Application Publication (Translation of PCT Application) No. 2018-518855

SUMMARY OF INVENTION

In some cases, radio systems using different radio communication schemes, such as 5th Generation (5G)(cellular system) and Institute of Electrical and Electronics Engineers (IEEE) 802.11ad/ay, share "a licensed band and/or an unlicensed band", for example. Although the communication distance can be extended by beamforming according to PTL 1, challenges remain in developing a mechanism that allows this communication system and "apparatuses using other radio communication standards" to coexist.

Challenges also remain in developing a mechanism for broadcasting data to as many apparatuses as possible while in the situation where this communication system and "apparatuses using other radio communication standards" coexist.

One non-limiting and exemplary embodiment of the present disclosure facilitates providing a technique for broadcasting data to as many apparatuses as possible in a situation where an apparatus using a different radio communication standard coexists.

A communication apparatus according to an embodiment of the present disclosure includes: control circuitry, which, in operation, forms a plurality of beams; and communication circuitry, which, in operation, associates a plurality of broadcast frames with the plurality of beams respectively and transmits the plurality of broadcast frames, wherein, the communication circuitry transmits the plurality of broadcast frames based on a result of listen before talk (LBT) in a direction of each of the plurality of beams.

A communication apparatus according to an embodiment of the present disclosure includes: control circuitry, which, in operation, includes broadcast data in each of a plurality of reference signals for sector sweeping; and communication circuitry, which, in operation, transmits the plurality of reference signals.

A communication method according to an embodiment of the present disclosure includes: forming a plurality of beams; associating a plurality of broadcast frames with the plurality of beams respectively and transmitting the plurality of broadcast frames; and transmitting the plurality of broadcast frames based on a result of LBT in a direction of each of the plurality of beams.

A communication method according to an embodiment of the present disclosure includes: including broadcast data in each of a plurality of reference signals for sector sweeping; and transmitting the plurality of reference signals.

It should be noted that general or specific embodiments may be implemented as a system, an apparatus, a method, an integrated circuit, a computer program, a storage medium, or any selective combination thereof.

According to an exemplary embodiment of the present disclosure, it is possible to broadcast data to as many apparatuses as possible in a situation where an apparatus using a different radio communication standard coexists.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

FIG. 69A illustrates an exemplary frequency band used by gNB to transmit a modulation signal;

FIG. 69B illustrates an exemplary frequency band used by gNB to transmit a modulation signal;

FIG. 69C illustrates an exemplary frequency band used by gNB to transmit a modulation signal;

FIG. 69D illustrates an exemplary frequency band used by gNB to transmit a modulation signal.

FIG. 70A illustrates an exemplary frequency band used by gNB to transmit a modulation signal.

FIG. 70B illustrates an exemplary frequency band used by gNB to transmit a modulation signal;

FIG. 70C illustrates an exemplary frequency band used by gNB to transmit a modulation signal;

FIG. 70D illustrates an exemplary frequency band used by gNB to transmit a modulation signal;

FIG. 71A illustrates an exemplary frequency band used by gNB to transmit a modulation signal;

FIG. 71B illustrates an exemplary frequency band used by gNB to transmit a modulation signal;

FIG. 71C illustrates an exemplary frequency band used by gNB to transmit a modulation signal;

FIG. 71D illustrates an exemplary frequency band used by gNB to transmit a modulation signal;

Figure 72A:
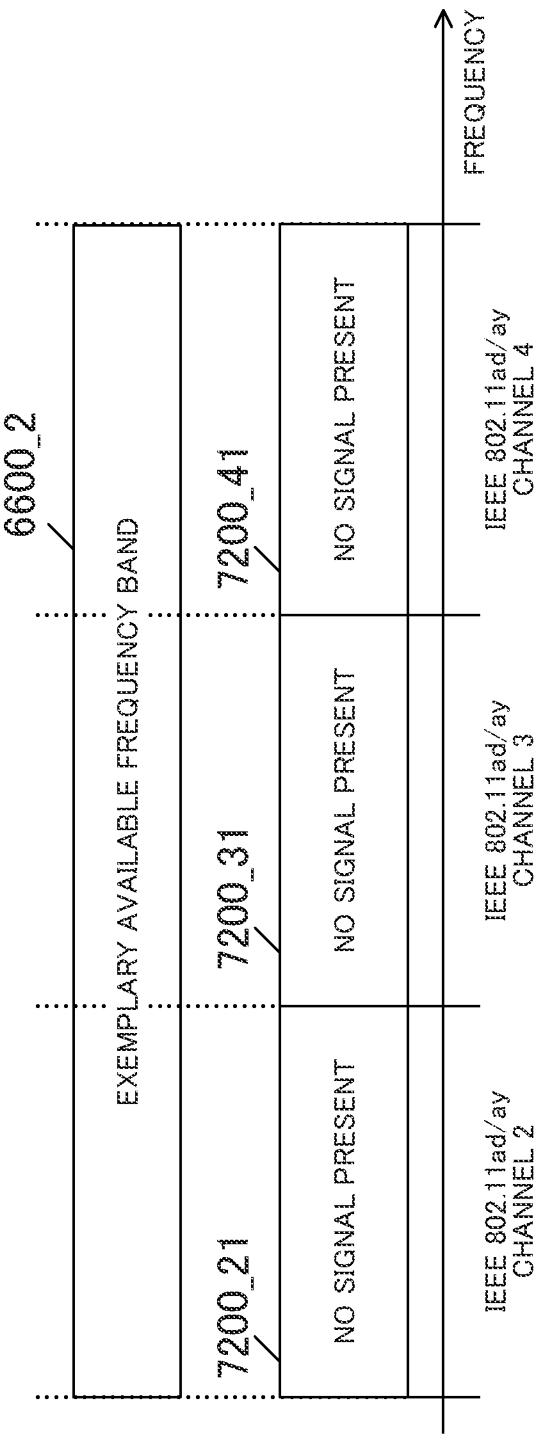
Figure 72B:
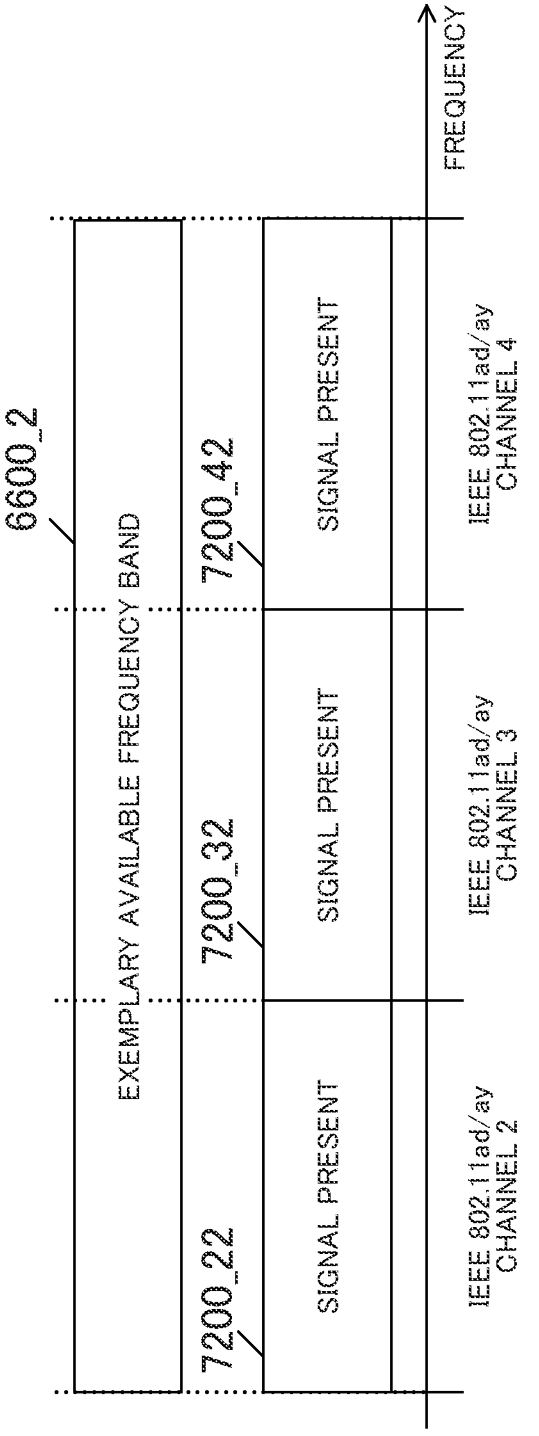
Figure 72C:
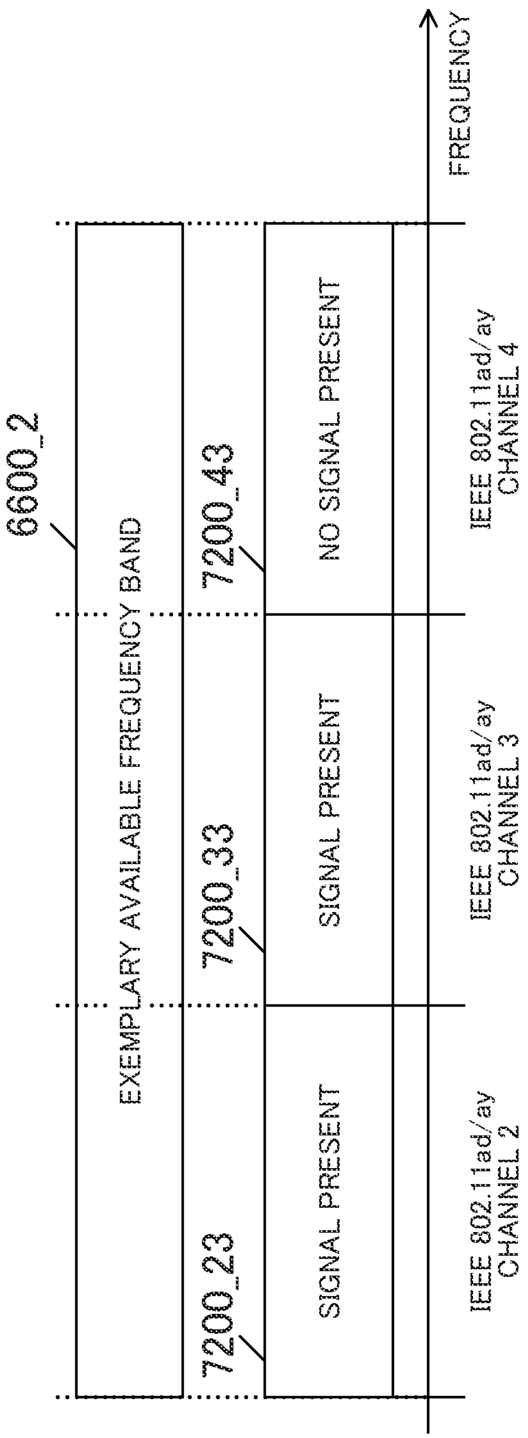
Figure 72D:
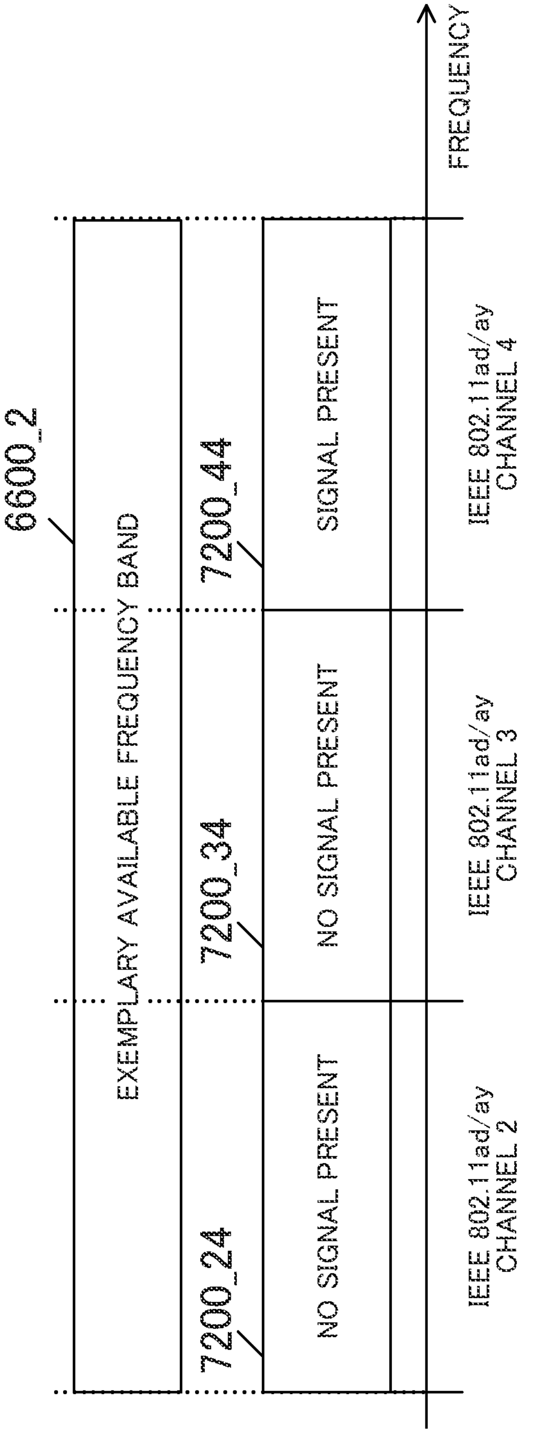
Figure 73A:
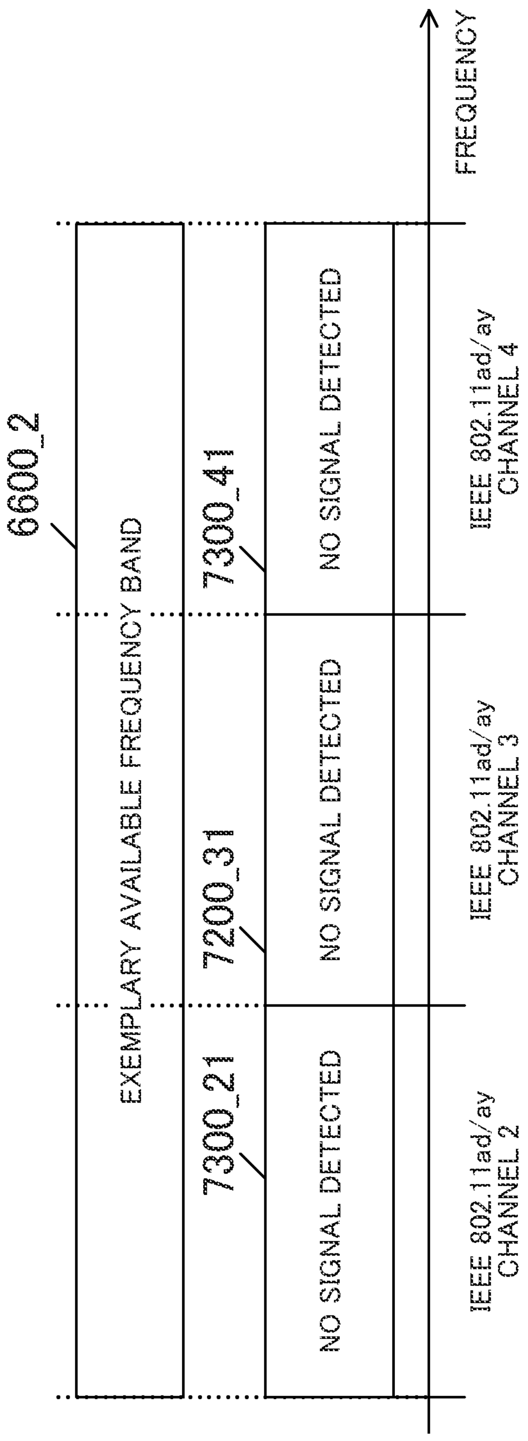
Figure 73B:
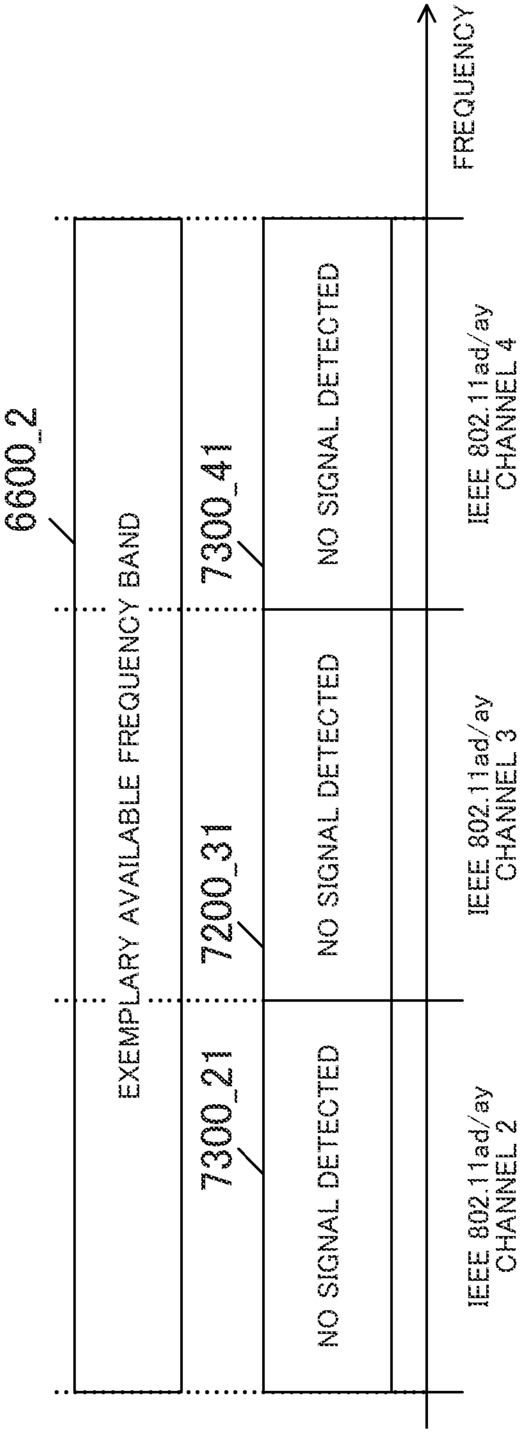
Figure 73C:
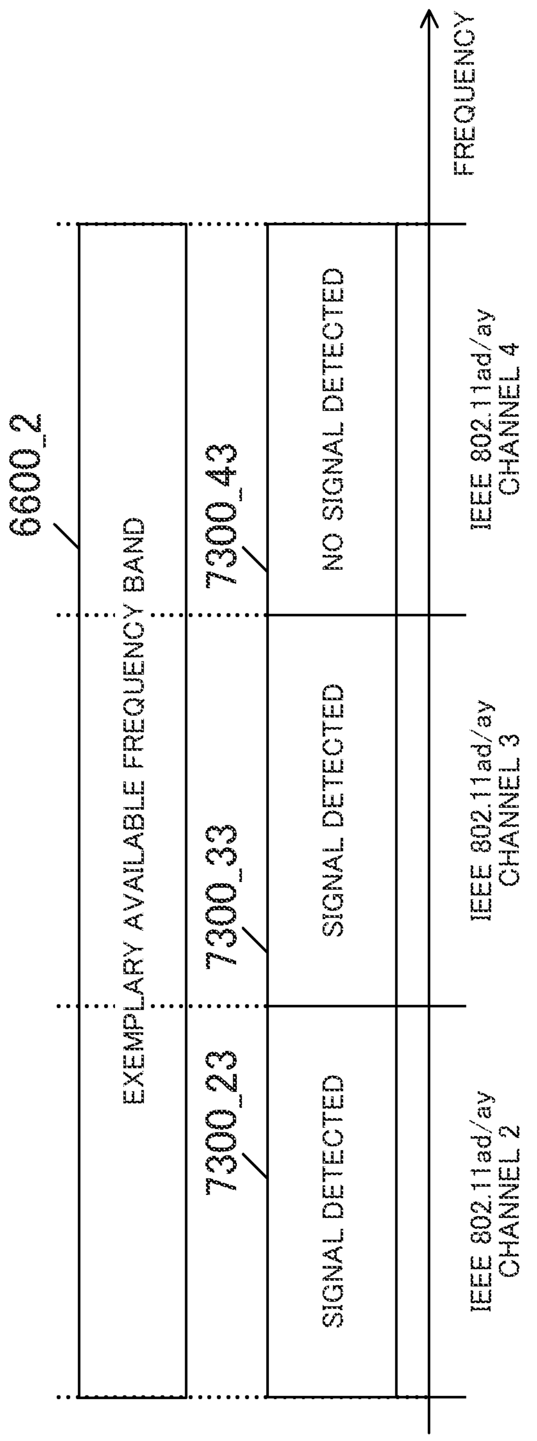
Figure 73D:
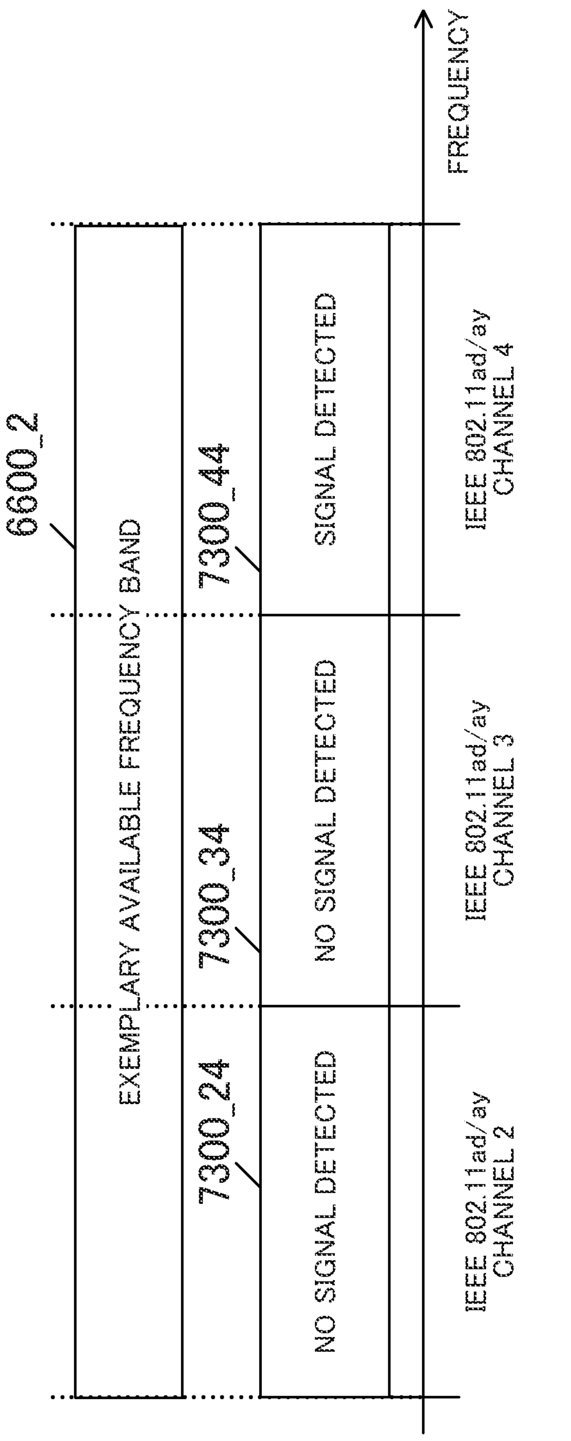
Figure 74A:
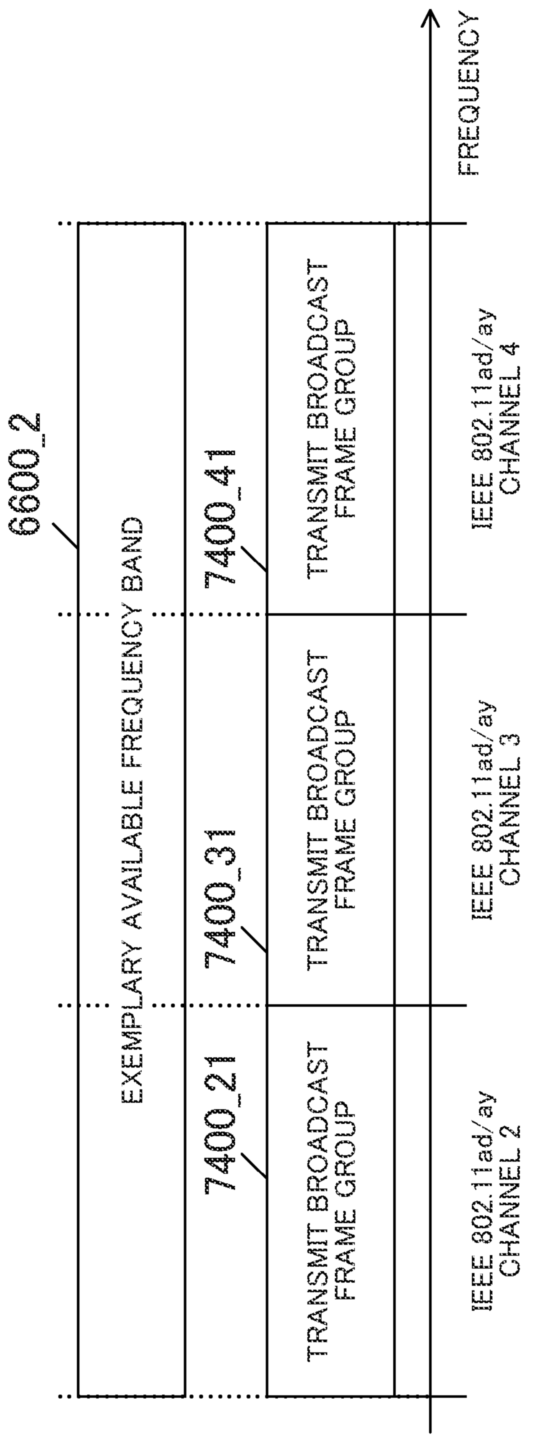
Figure 74B:
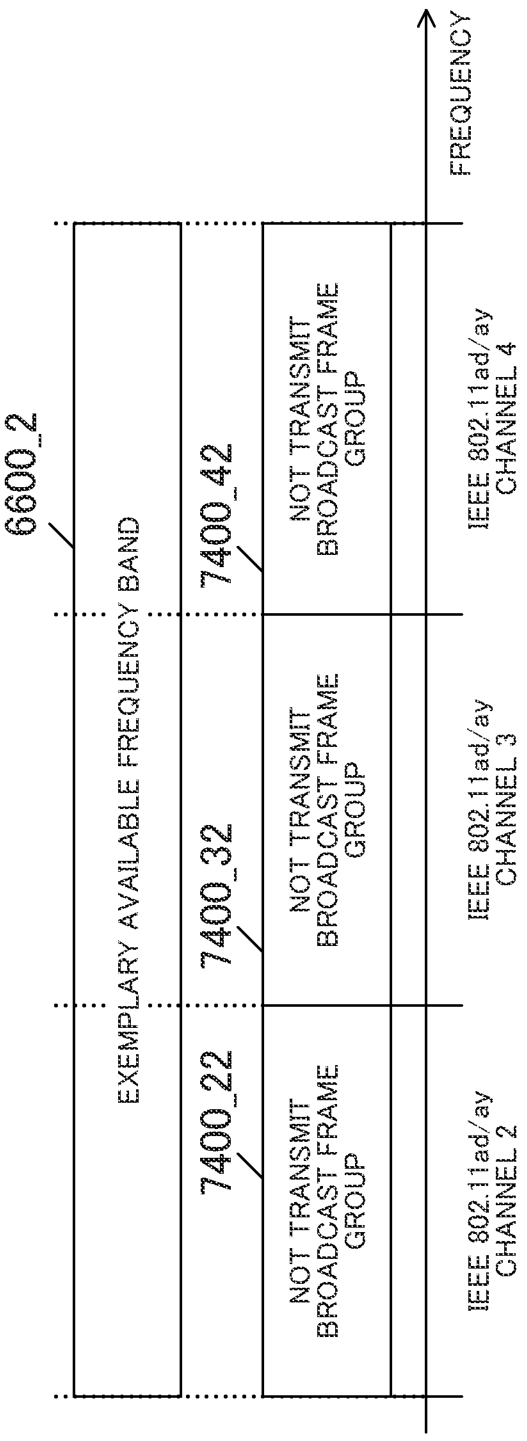
Figure 74C:
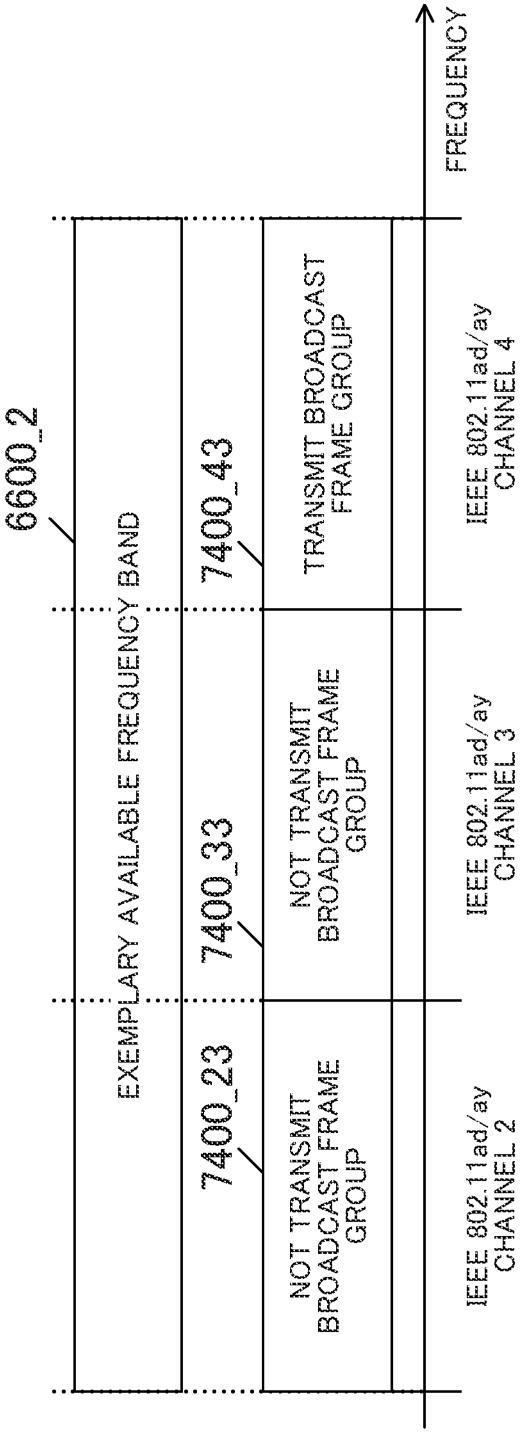
Figure 74D:
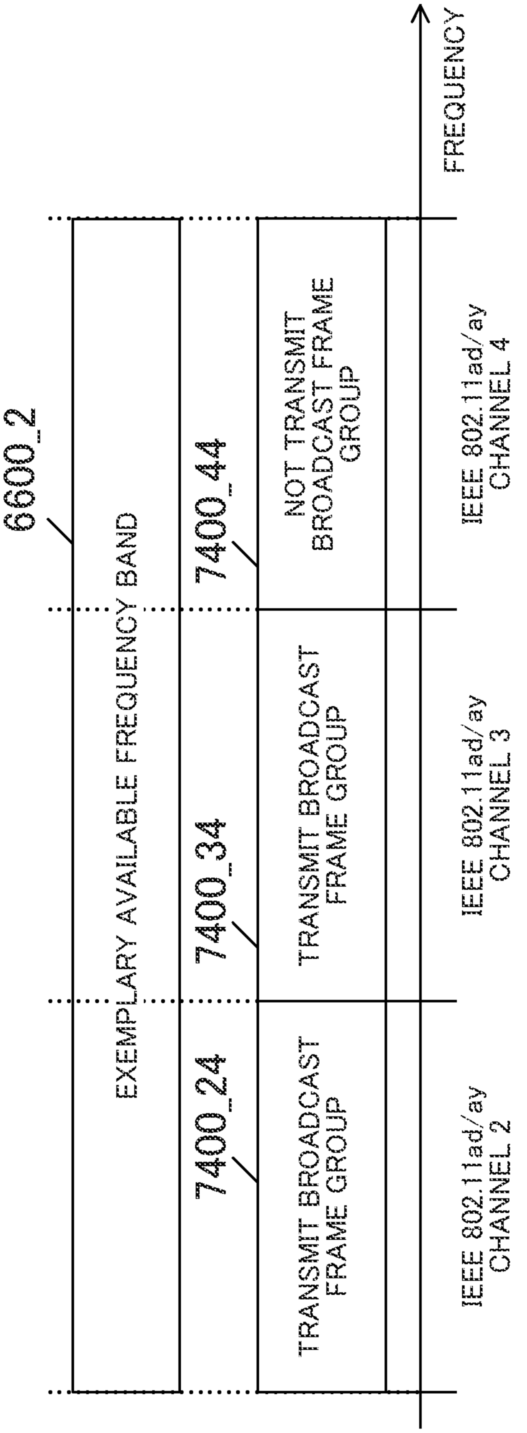
Figure 75:
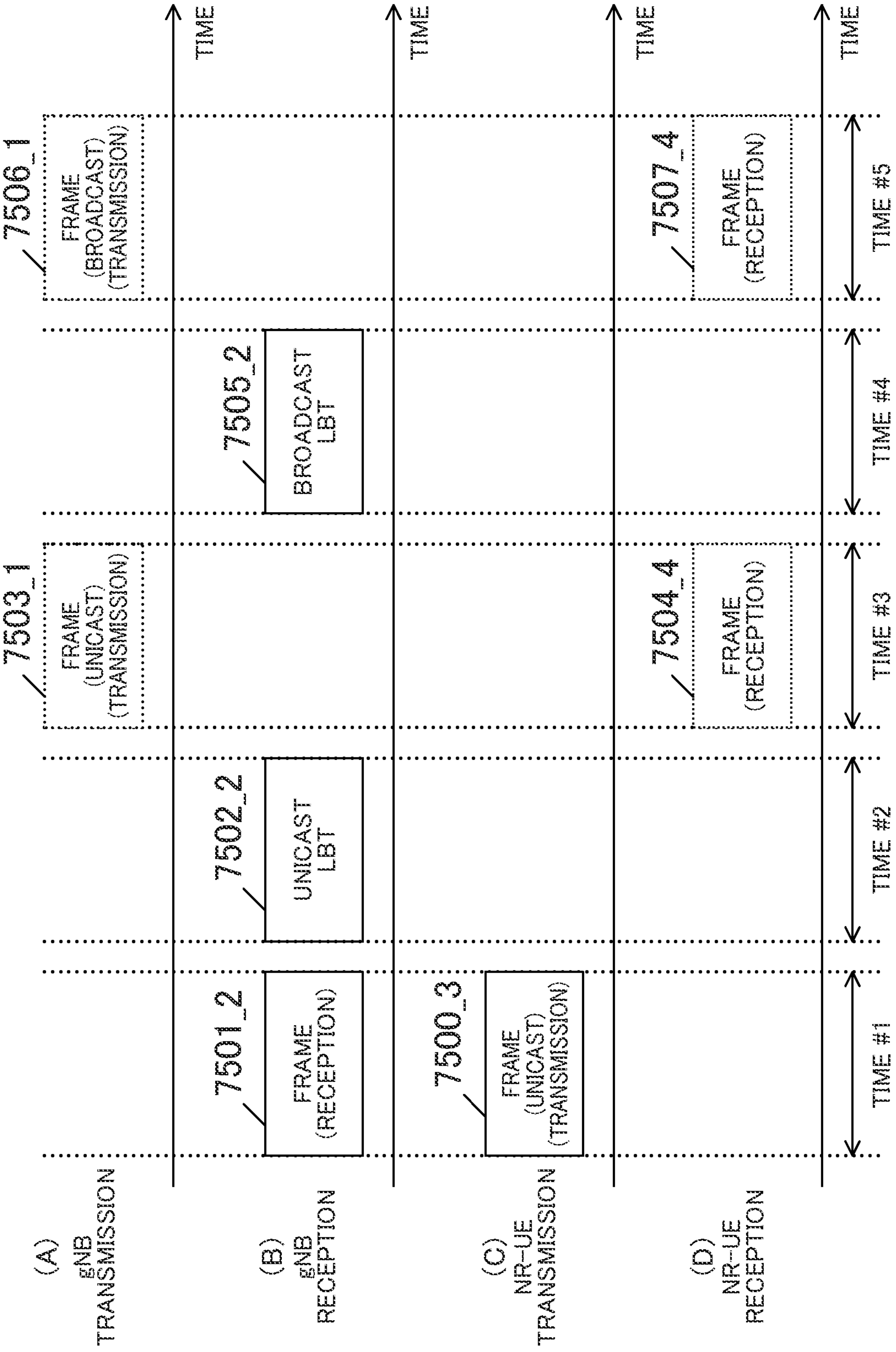
Figure 76:
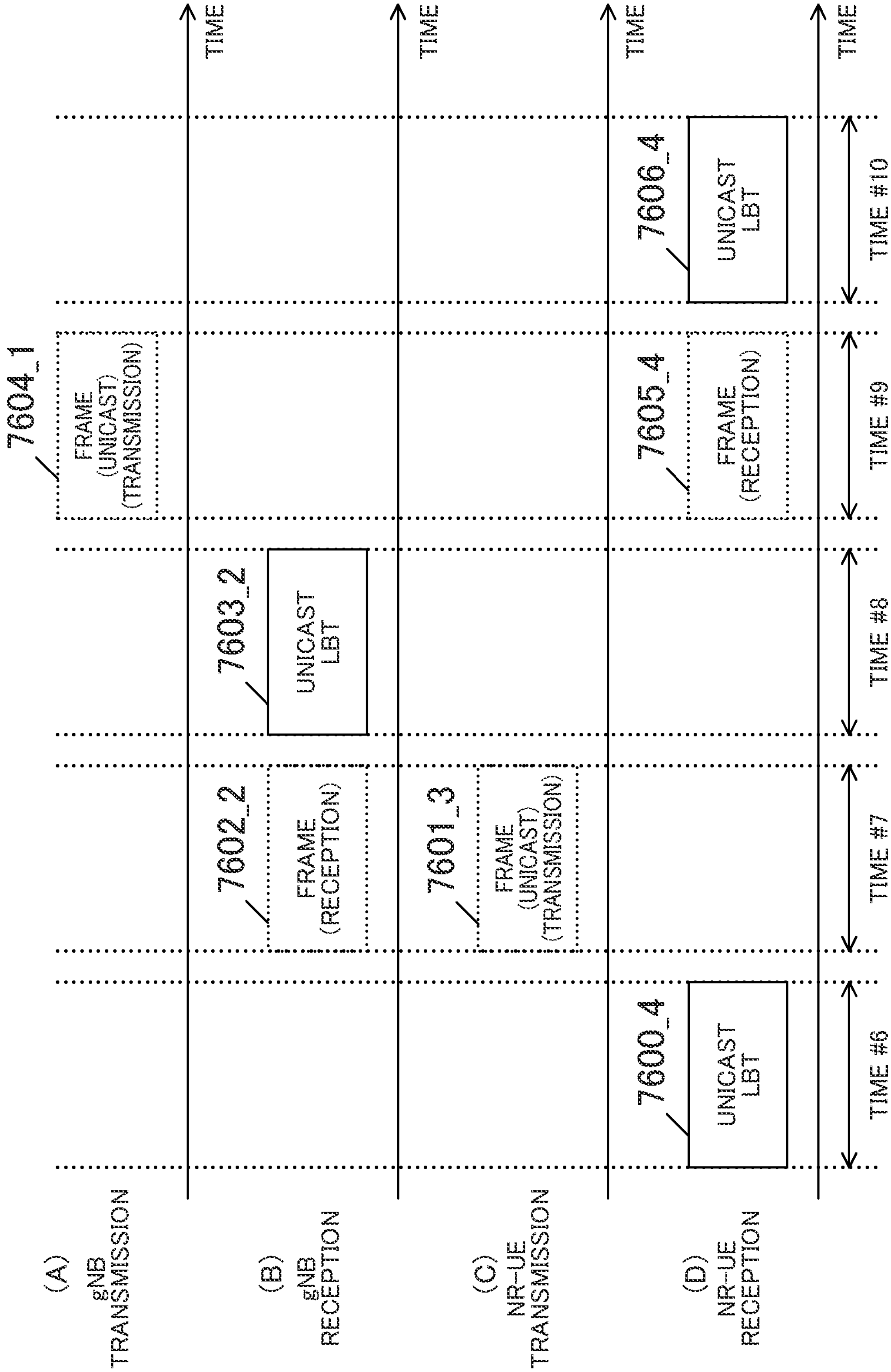
Figure 77:
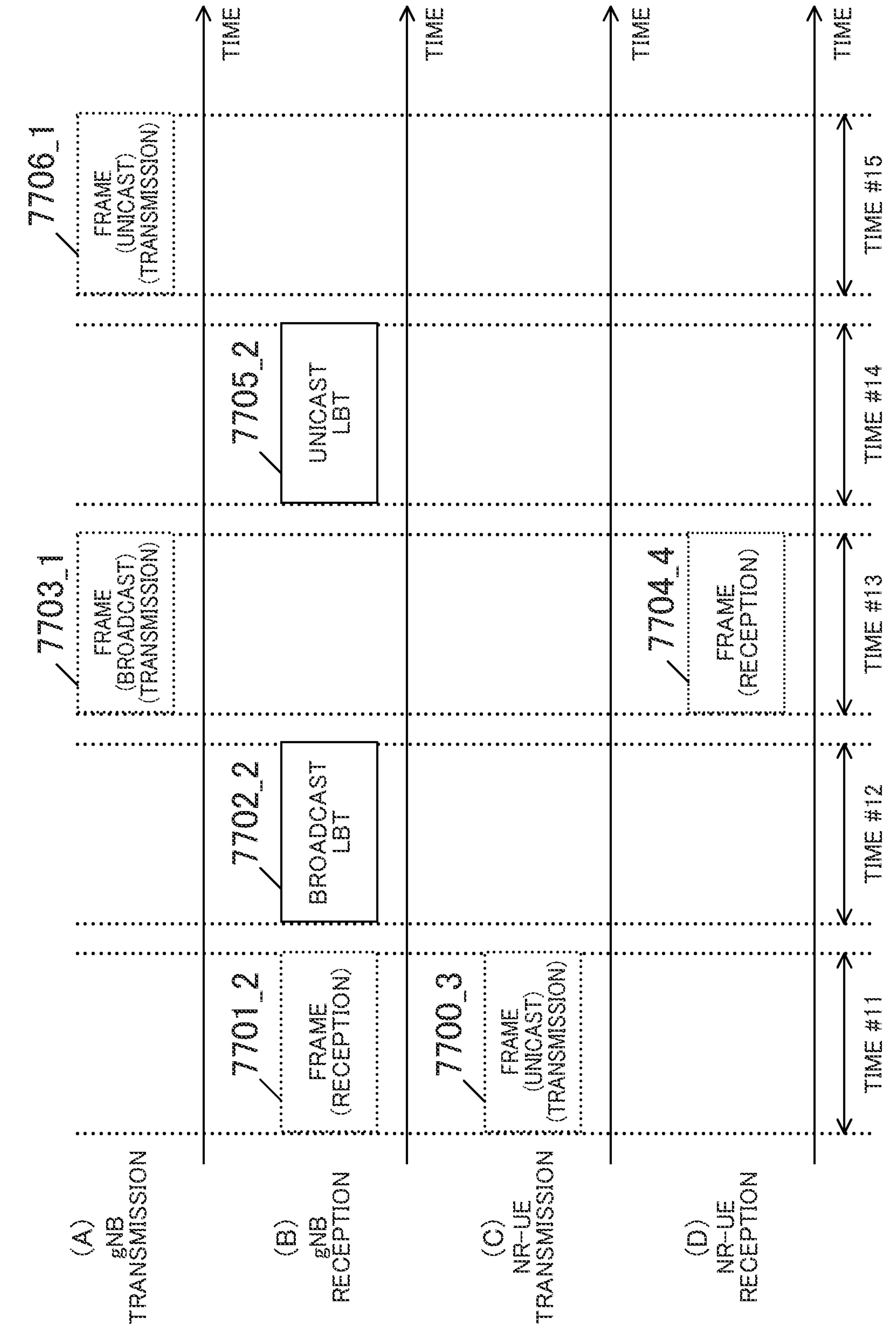
Figure 78A:
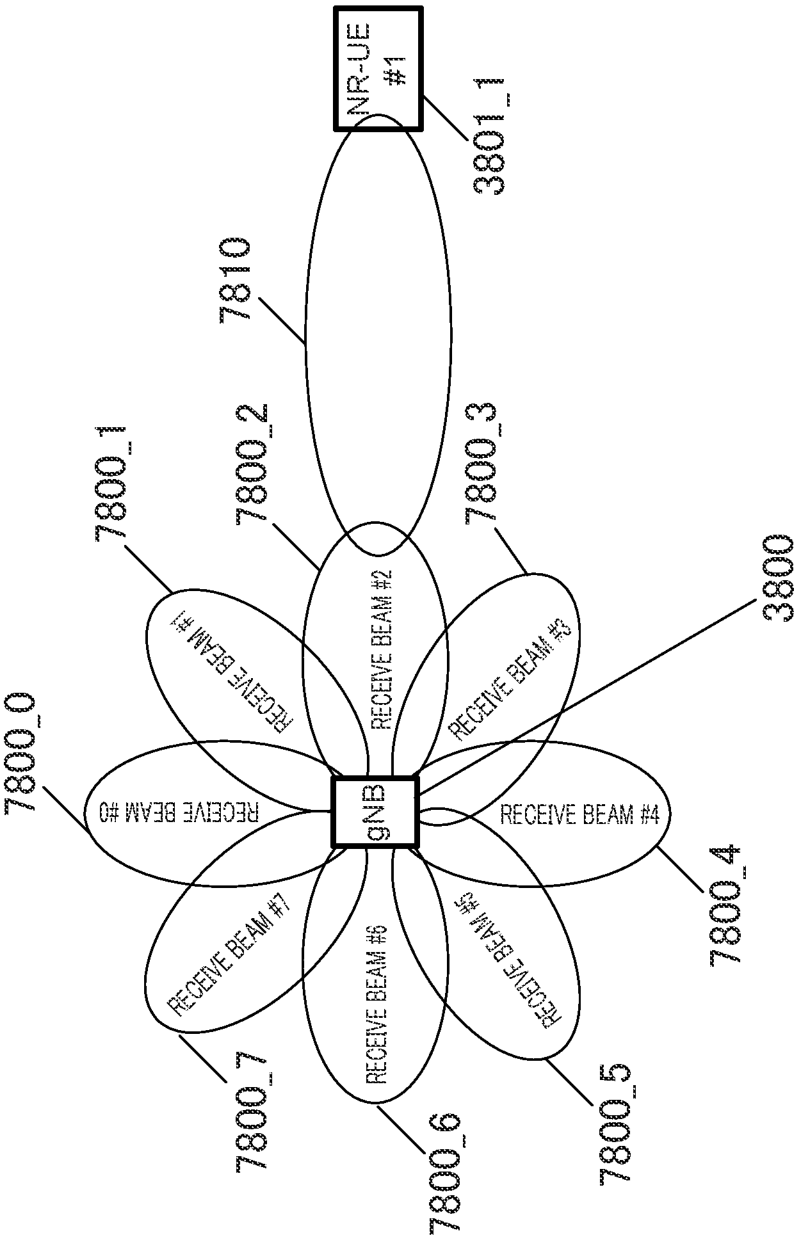
Figure 78B:
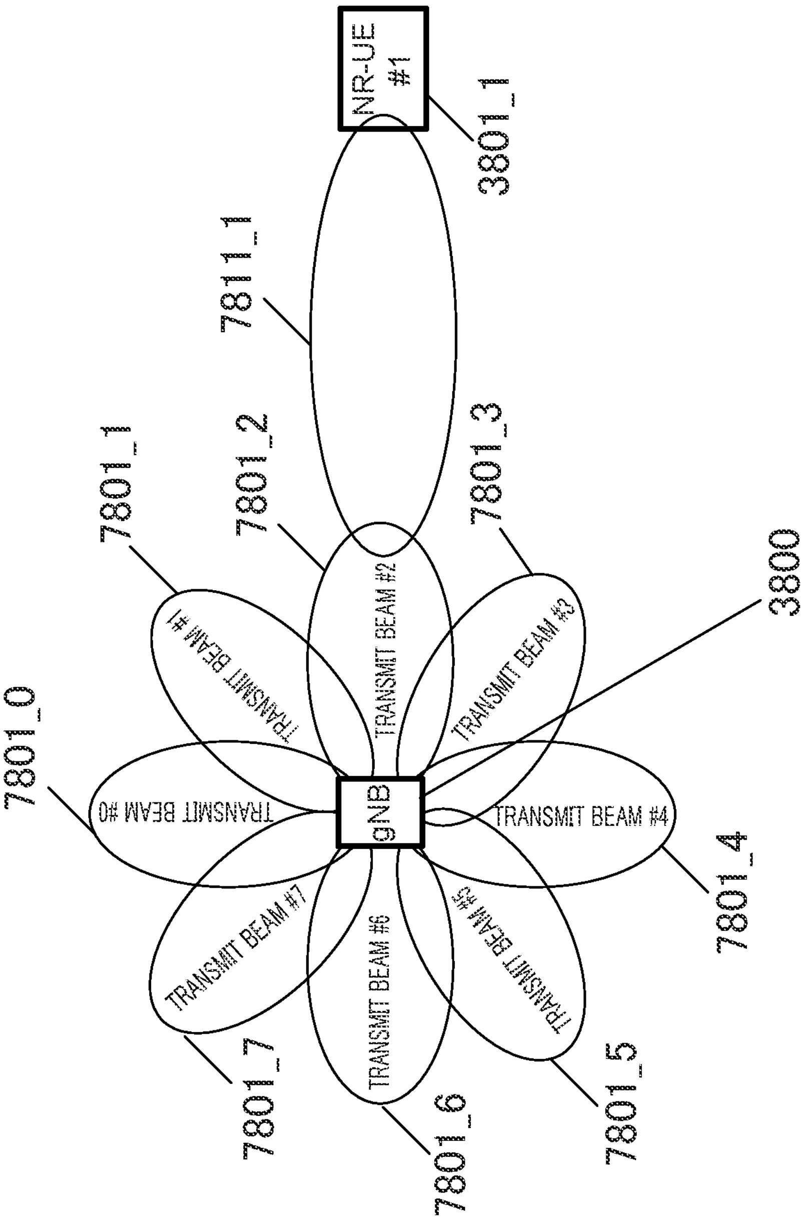
Figure 78C:
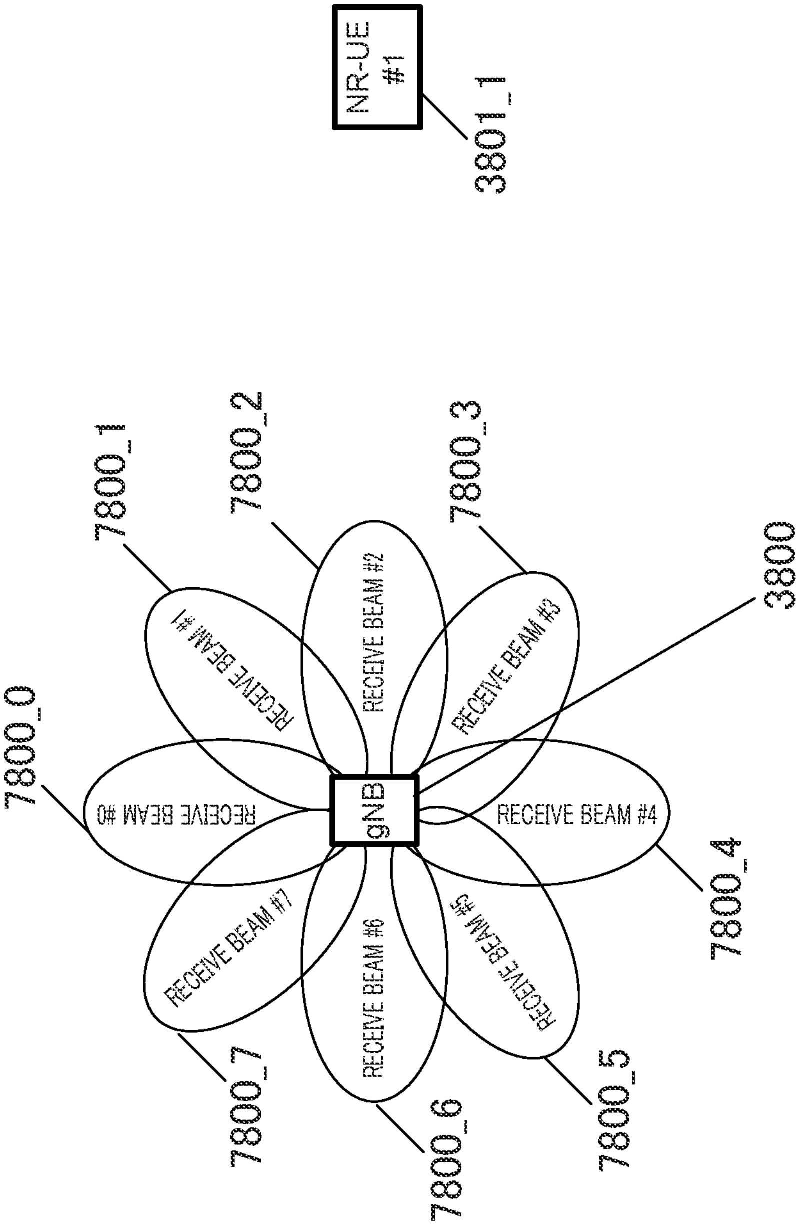
Figure 78D:
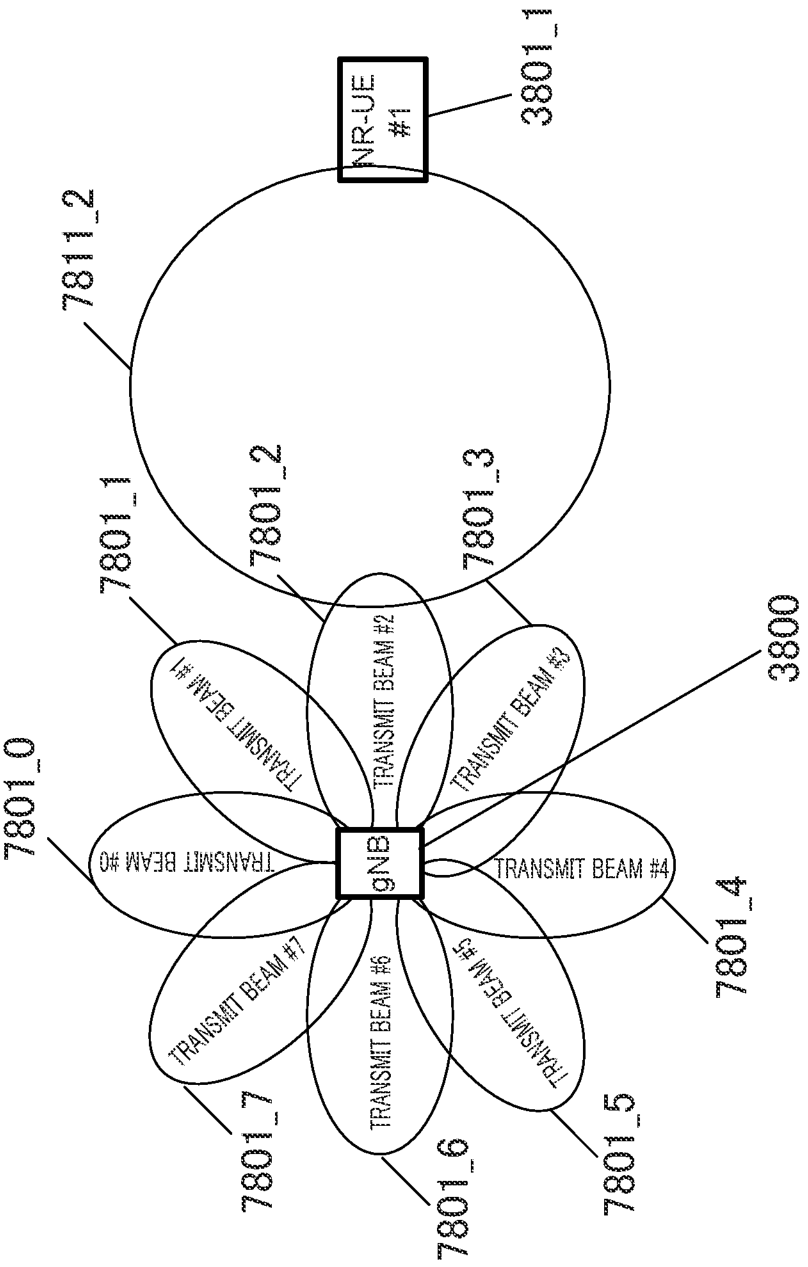
Figure 78E:
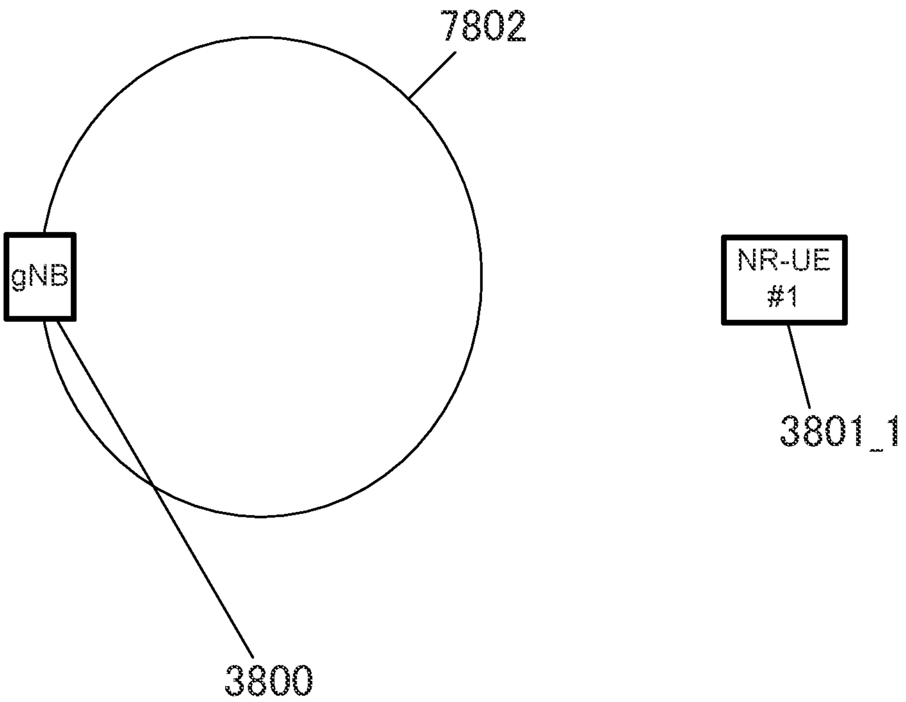
Figure 79A:
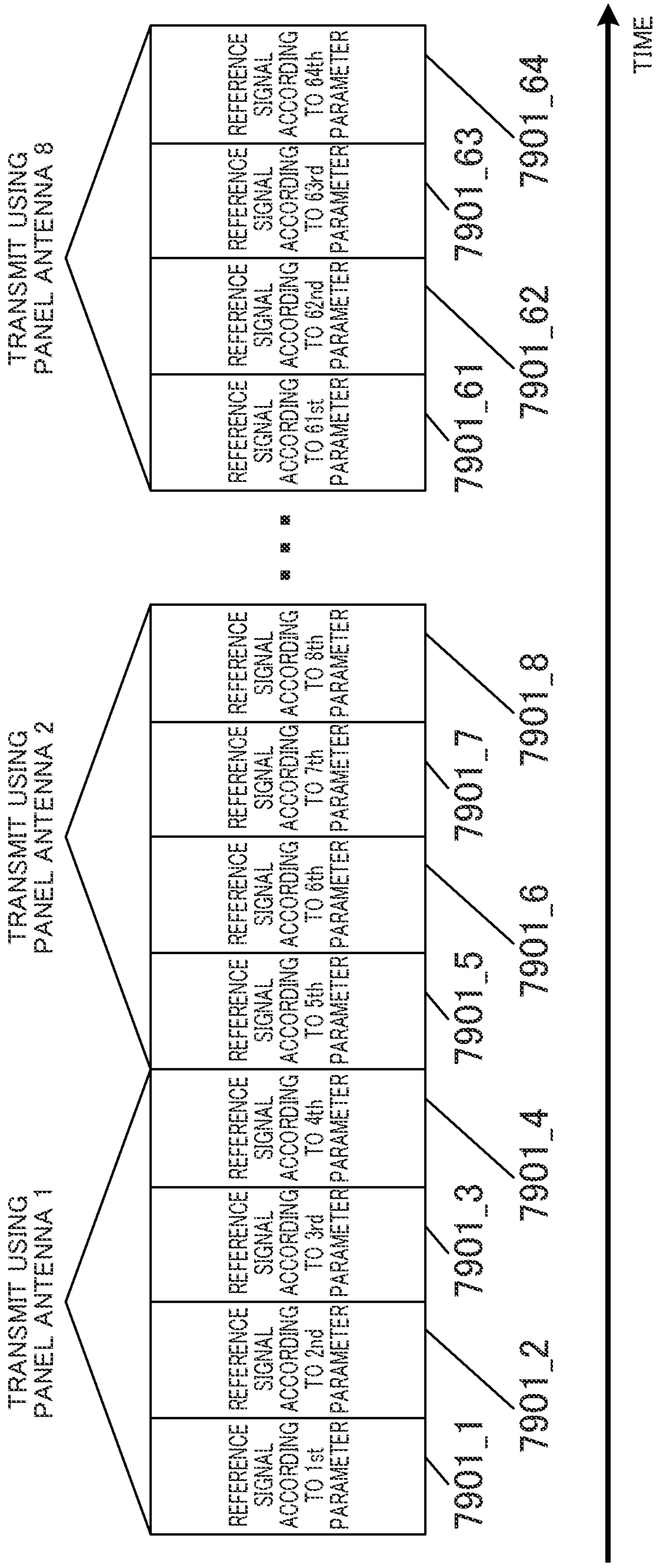
Figure 79B:
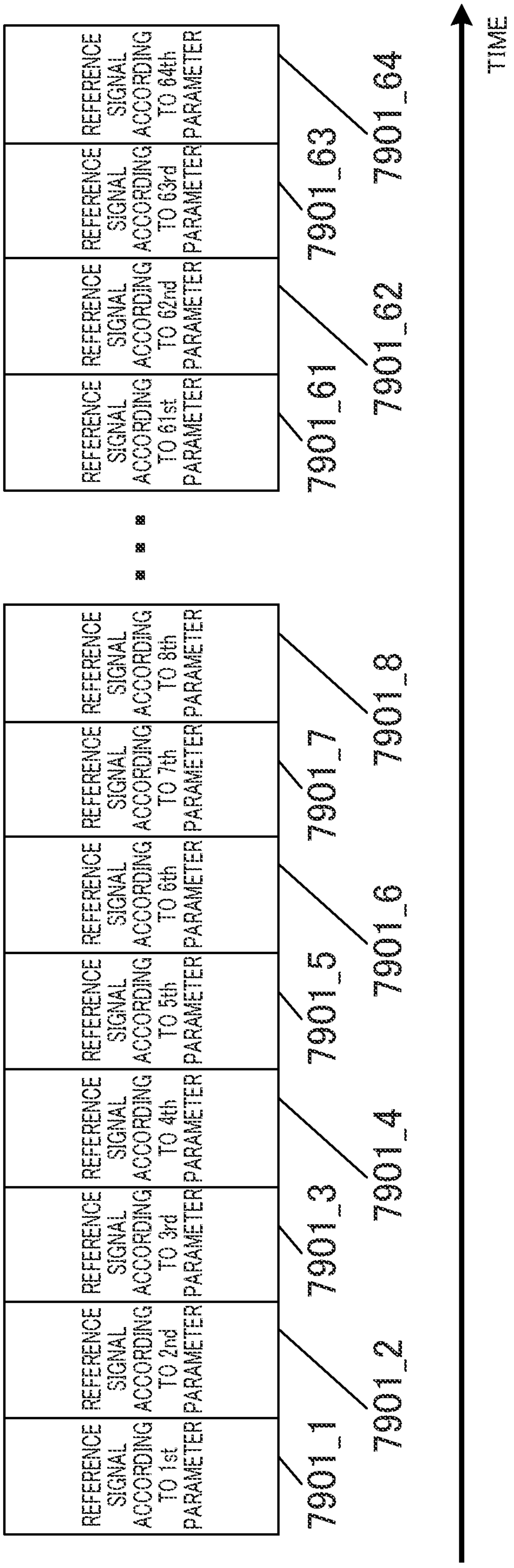
Figure 80:
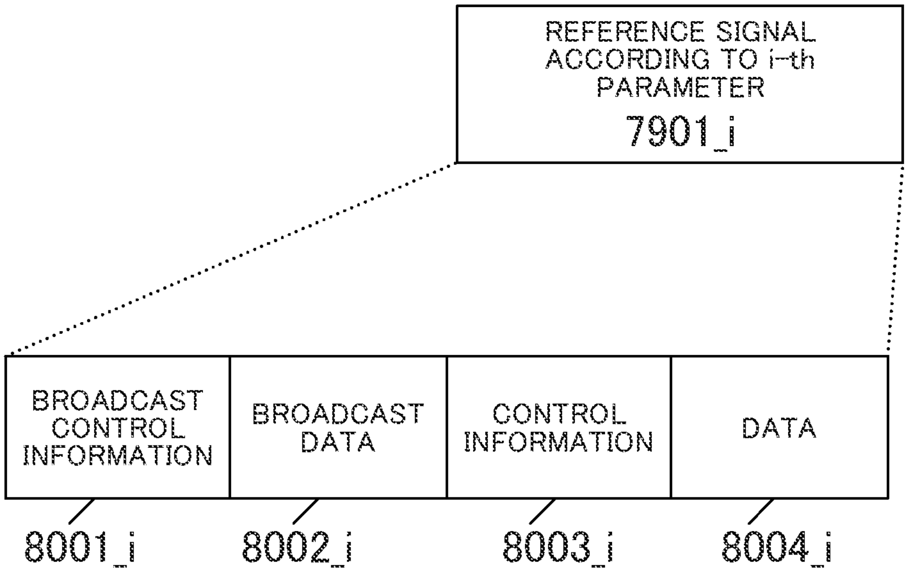
Figure 81A:
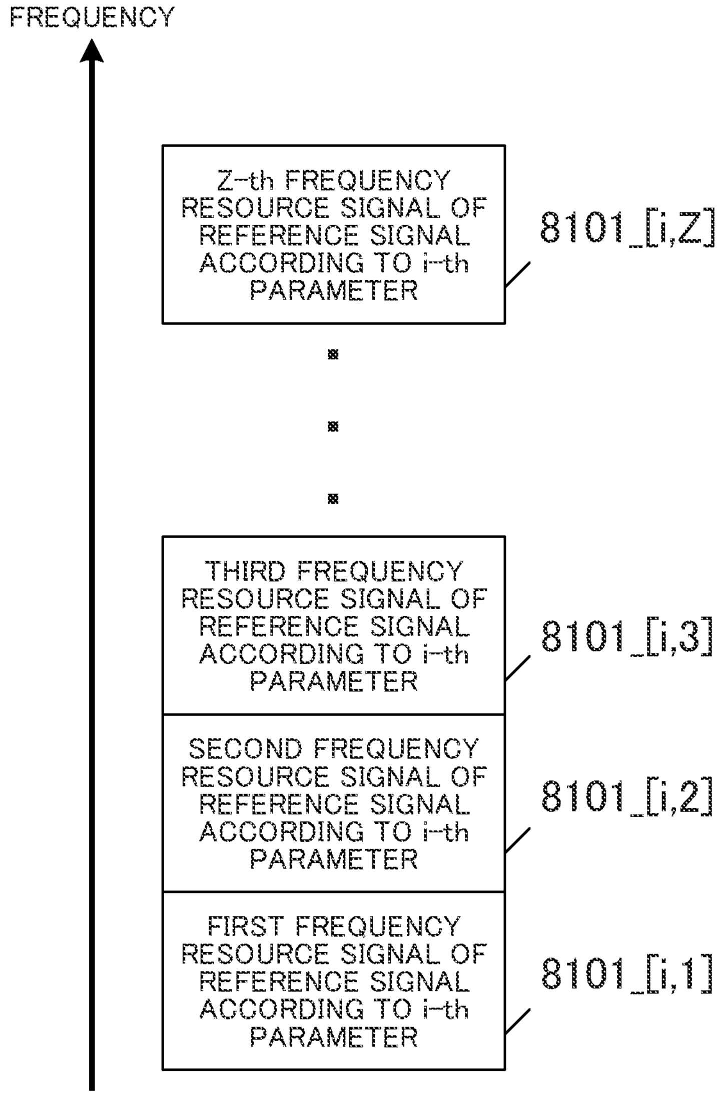
Figure 81B:
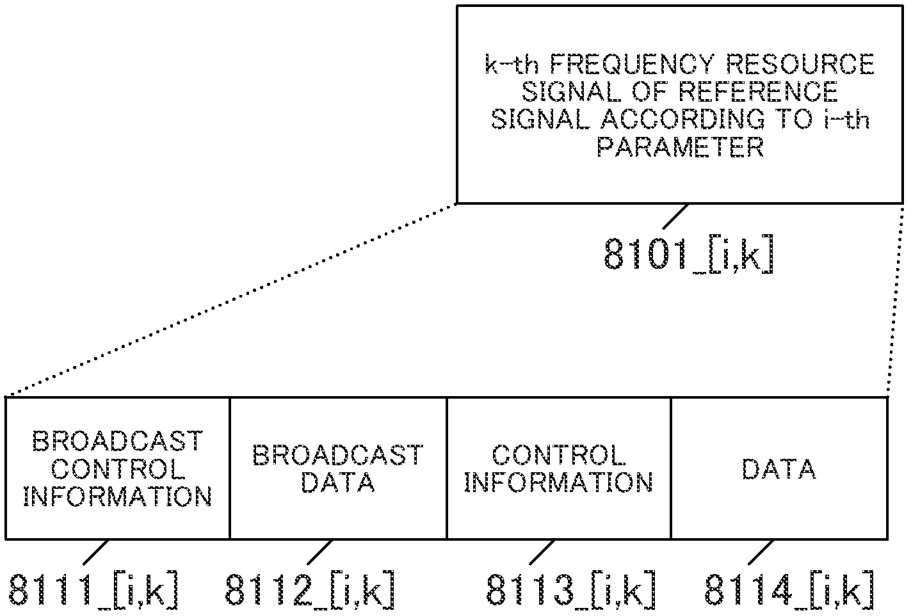
Figure 82A:
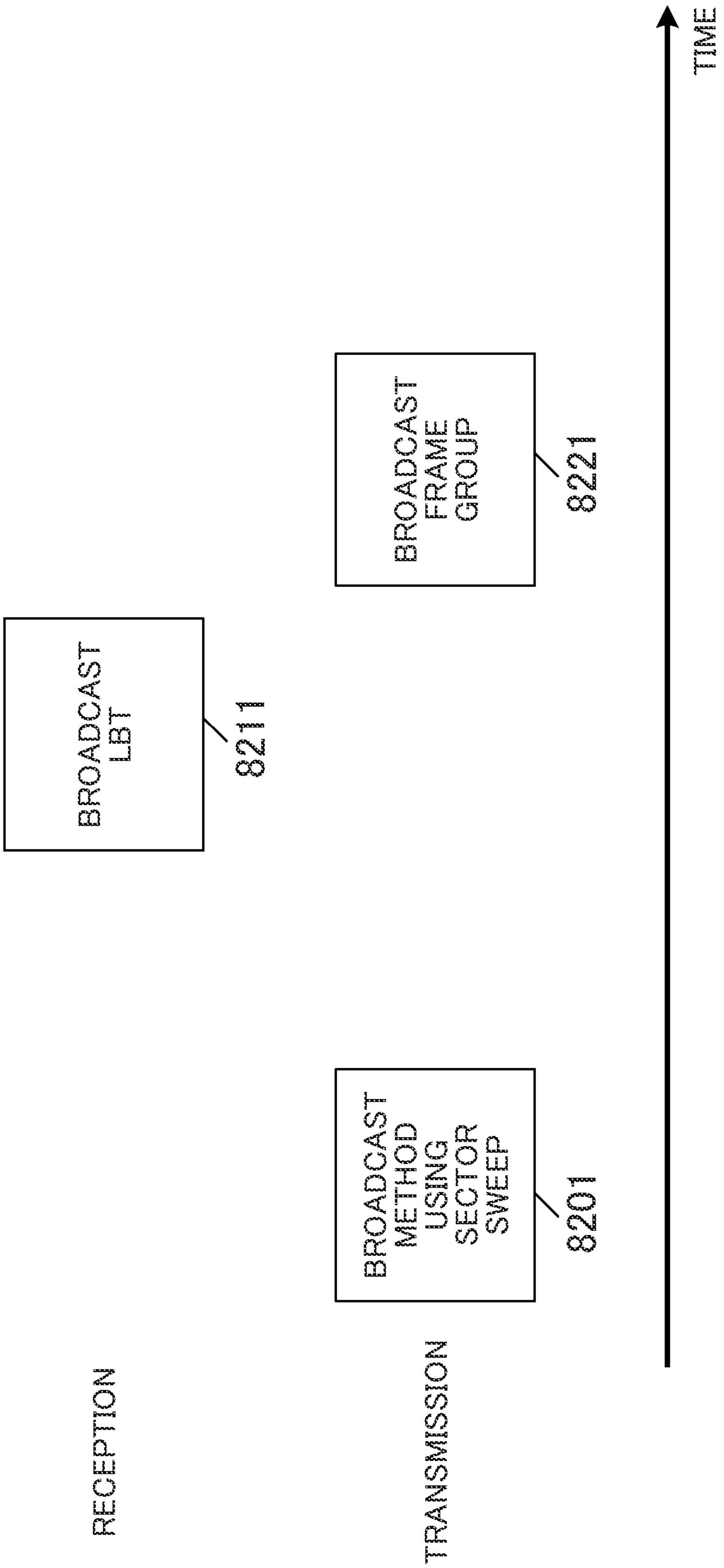
Figure 82B:
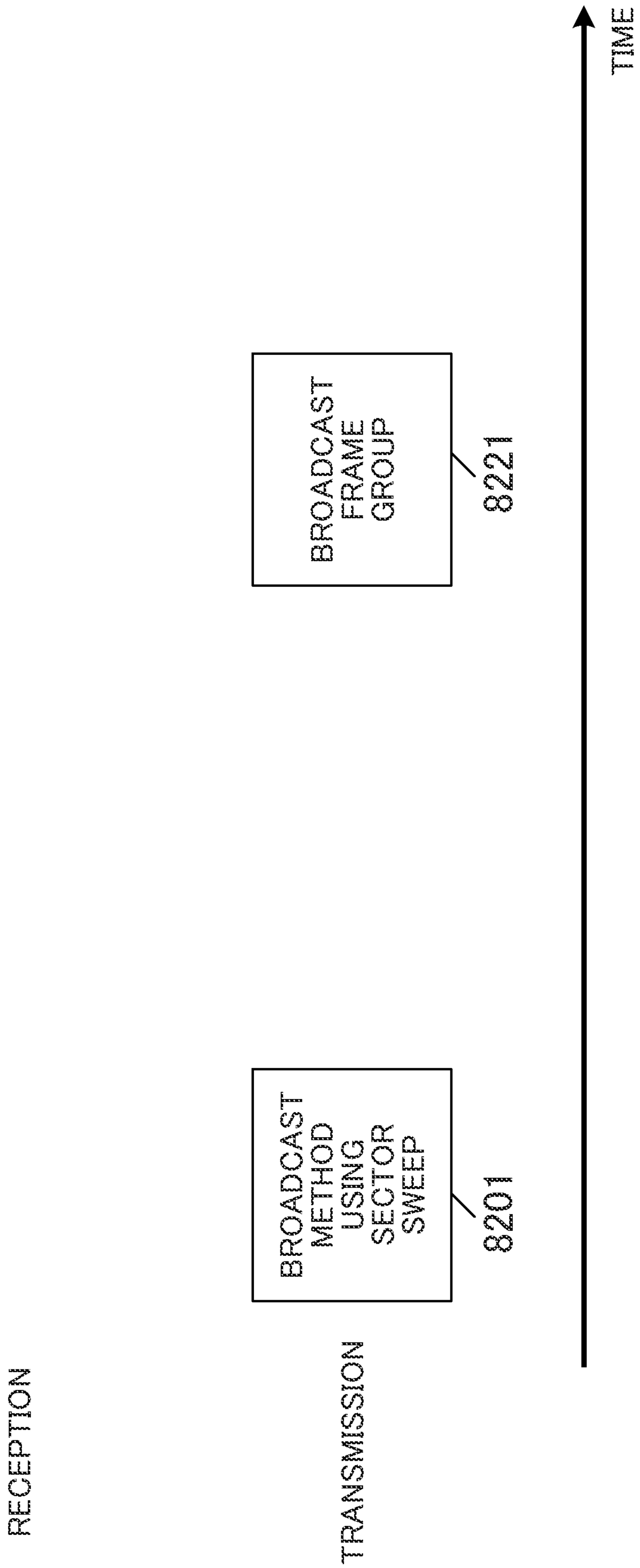
Figure 82C:
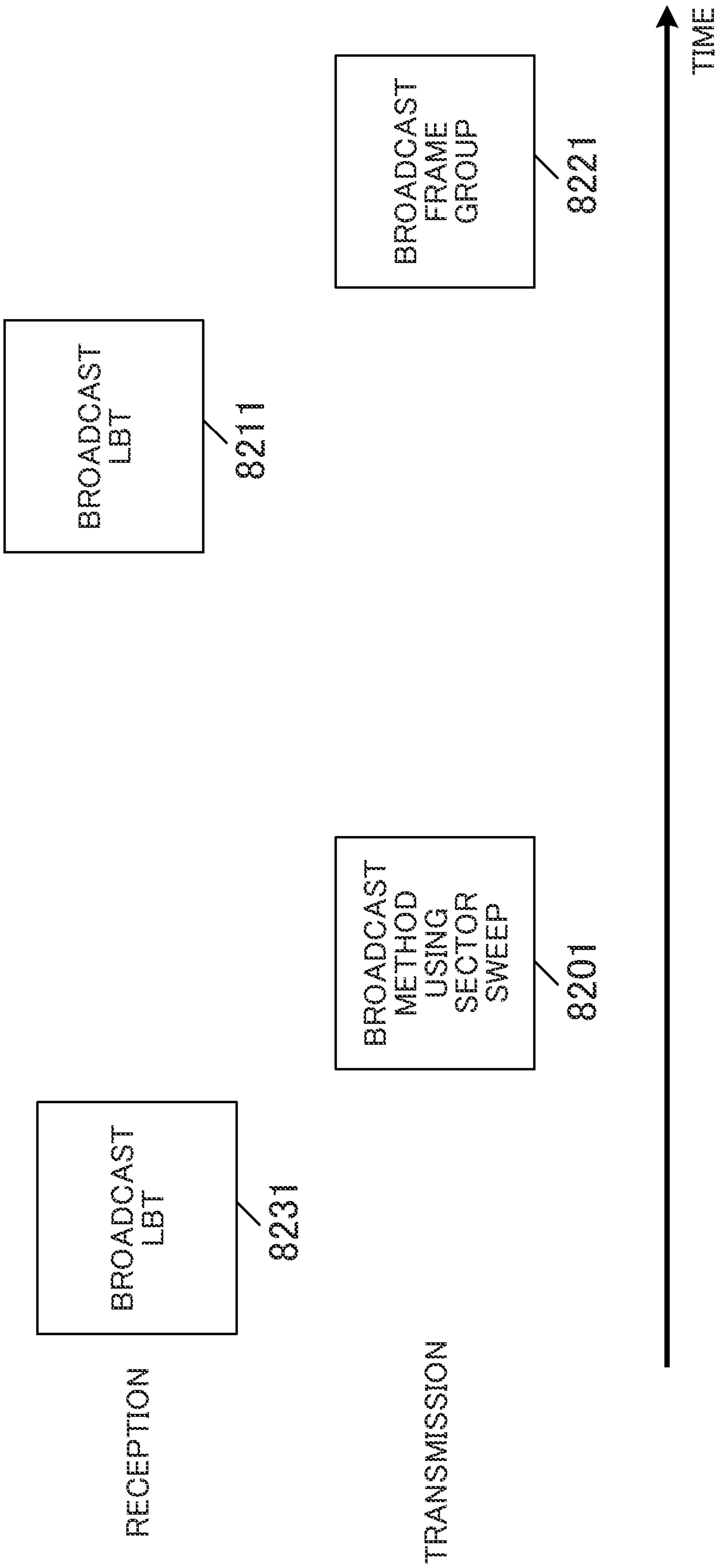
Figure 83A:
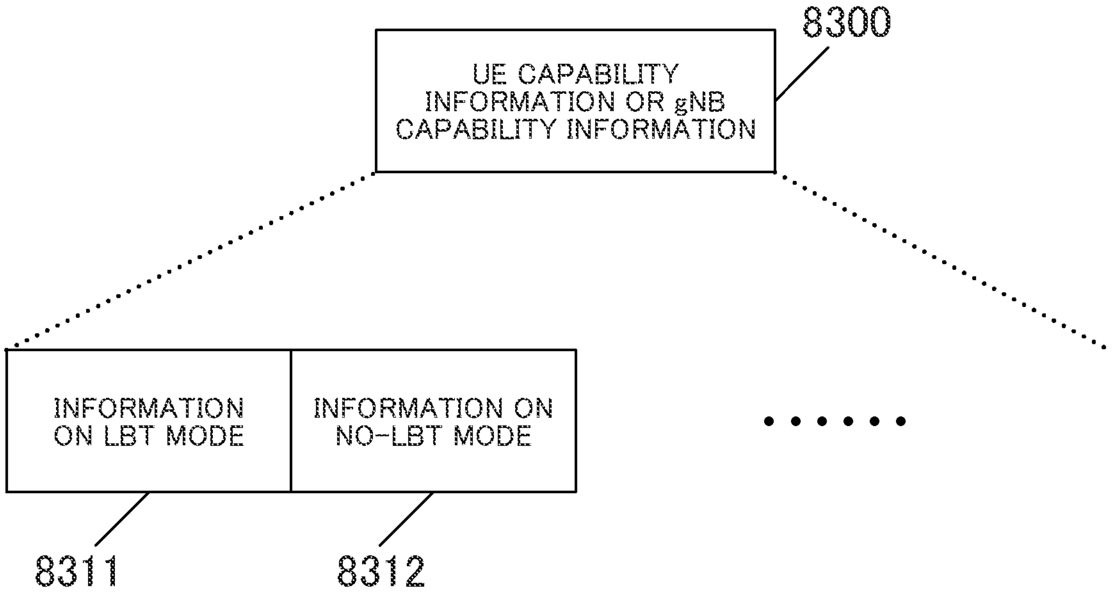
Figure 83B:
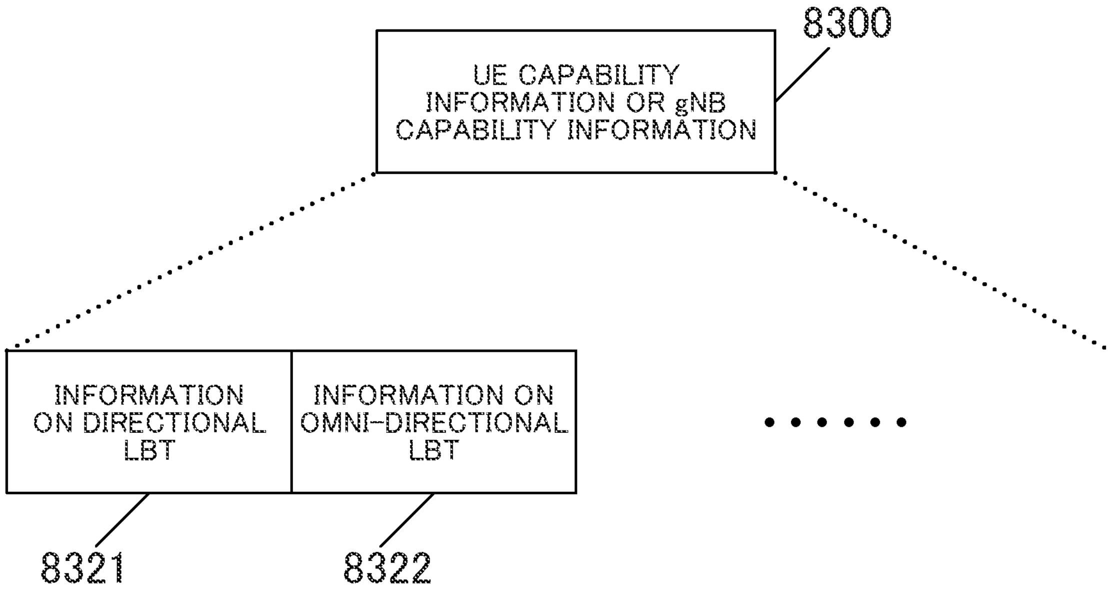
Figure 83C:
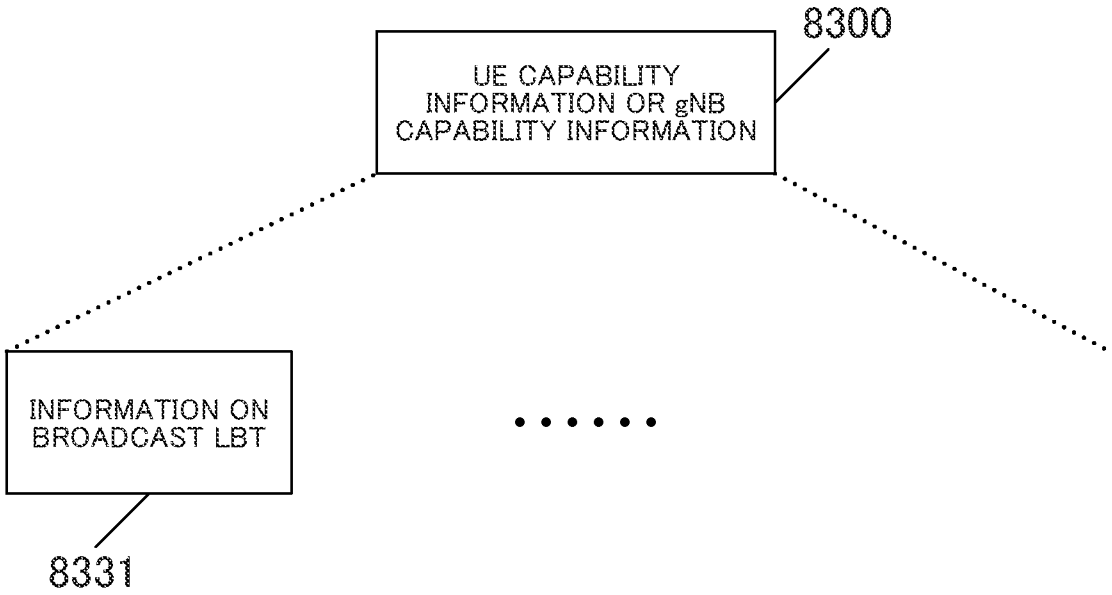
Figure 84:
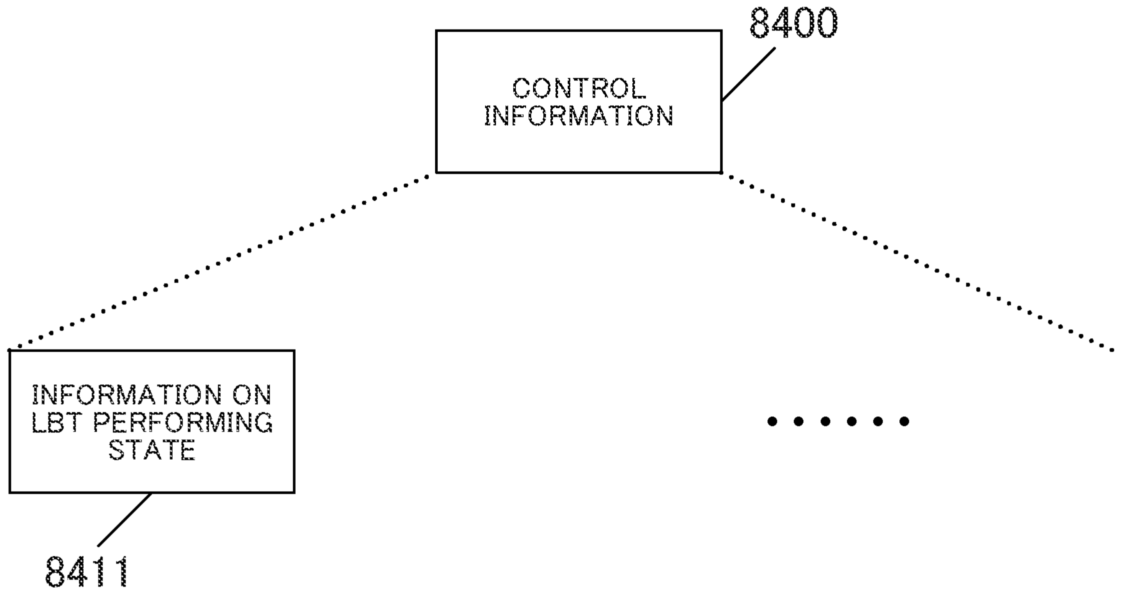
Figure 85A:
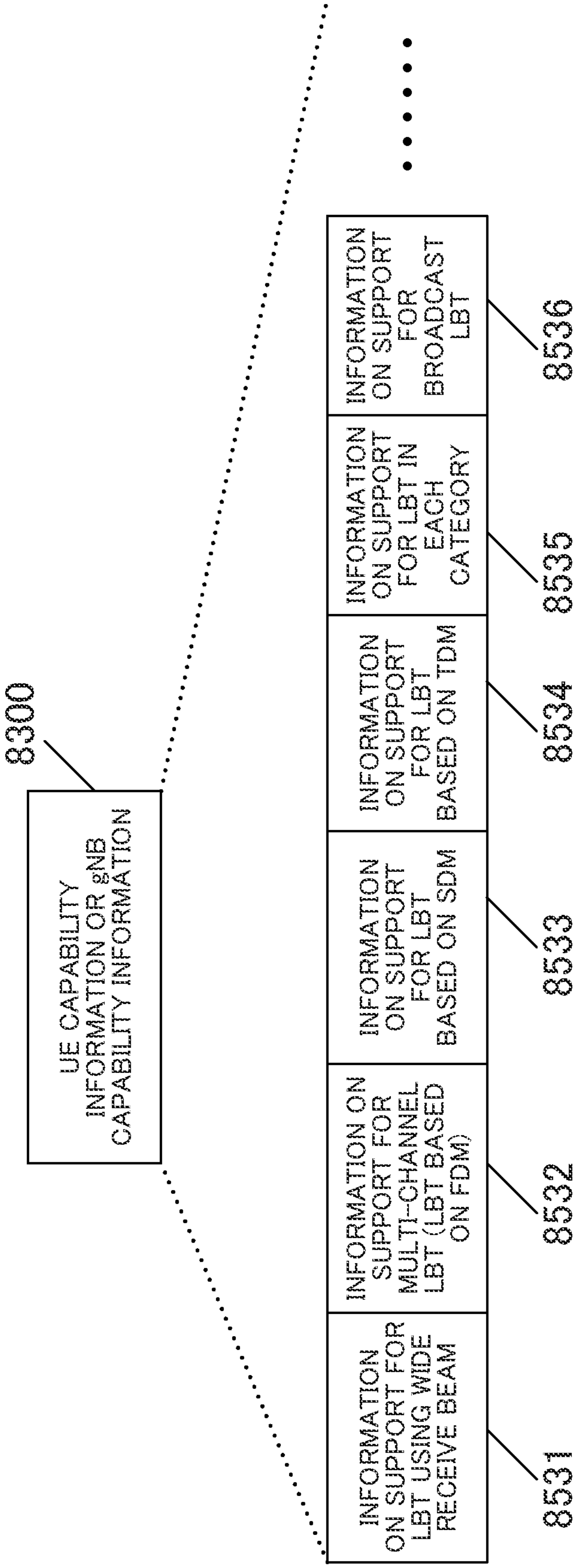
Figure 85B:
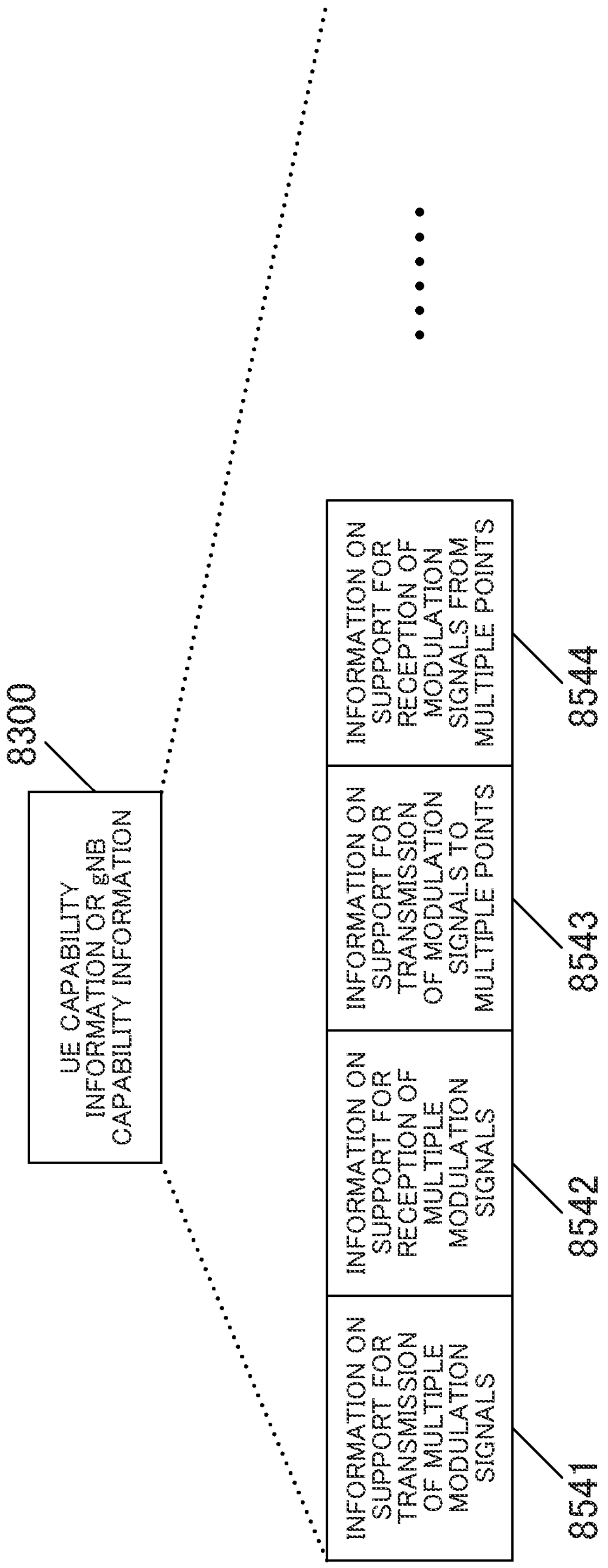
Figure 86:
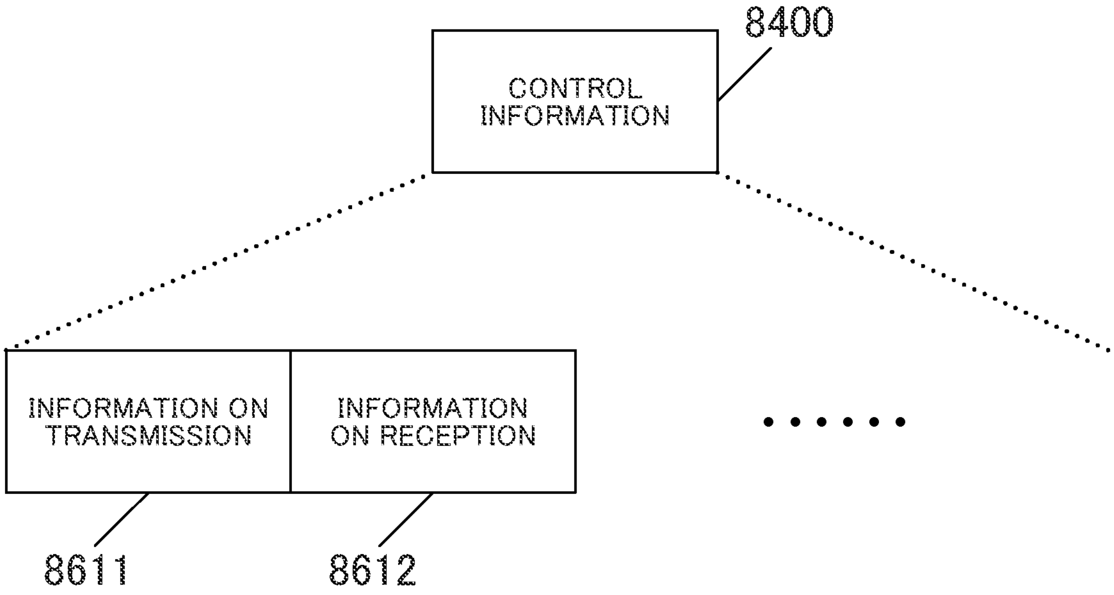
Figure 87:

FIG. 72A illustrates an exemplary frequency band used by gNB to transmit a modulation signal;

FIG. 72B illustrates an exemplary frequency band used by gNB to transmit a modulation signal;

FIG. 72C illustrates an exemplary frequency band used by gNB to transmit a modulation signal;

FIG. 72D illustrates an exemplary frequency band used by gNB to transmit a modulation signal;

FIG. 73A illustrates an exemplary frequency band used by gNB to transmit a modulation signal;

FIG. 73B illustrates an exemplary frequency band used by gNB to transmit a modulation signal;

FIG. 73C illustrates an exemplary frequency band used by gNB to transmit a modulation signal;

FIG. 73D illustrates an exemplary frequency band used by gNB to transmit a modulation signal;

FIG. 74A illustrates an exemplary frequency band used by gNB to transmit a modulation signal;

FIG. 74B illustrates an exemplary frequency band used by gNB to transmit a modulation signal;

FIG. 74C illustrates an exemplary frequency band used by gNB to transmit a modulation signal;

FIG. 74D illustrates an exemplary frequency band used by gNB to transmit a modulation signal;

FIG. 75 illustrates an exemplary transmission state of gNB;

FIG. 76 illustrates an exemplary transmission state of gNB;

FIG. 77 illustrates an exemplary transmission state of gNB;

FIG. 78A illustrates an exemplary state of communication by unicast between gNB and NR-UE;

FIG. 78B illustrates an exemplary state of communication by unicast between gNB and NR-UE;

FIG. 78C illustrates an exemplary state of communication by unicast between gNB and NR-UE;

FIG. 78D illustrates an exemplary state of communication by unicast between gNB and NR-UE;

FIG. 78E illustrates an exemplary state of communication by unicast between gNB and NR-UE;

FIG. 79A illustrates an exemplary transmission method for sector-sweep reference signals transmitted by gNB in the time axis;

FIG. 79B illustrates an exemplary transmission method for the sector-sweep reference signals transmitted by gNB on the time axis;

FIG. 80 illustrates an exemplary configuration of the reference signal;

FIG. 81A illustrates an exemplary configuration of the reference signal on the frequency axis;

FIG. 81B illustrates an exemplary configuration of the k-th frequency resource signal of the reference signal;

FIG. 82A illustrates an exemplary transmission and reception state of gNB;

FIG. 82B illustrates an exemplary transmission and reception state of gNB;

FIG. 82C illustrates an exemplary transmission and reception state of gNB;

FIG. 83A illustrates an exemplary configuration of terminal capability information or gNB capability information;

FIG. 83B illustrates an exemplary configuration of the terminal capability information or gNB capability information;

FIG. 83C illustrates an exemplary configuration of the terminal capability information or gNB capability information;

FIG. 84 illustrates an exemplary configuration of control information included in a modulation signal transmitted by gNB;

FIG. 85A illustrates an exemplary configuration of the terminal capability information or gNB capability information;

FIG. 85B illustrates an exemplary configuration of the terminal capability information or gNB capability information;

FIG. 86 illustrates an exemplary configuration of the control information included in a modulation signal transmitted by gNB; and FIG. 87 illustrates an exemplary communication state of radio communication devices according to a conventional technique.

DESCRIPTION OF EMBODIMENTS

Hereinafter, embodiments of the present disclosure will be described in detail with reference to the accompanying drawings.

First, communication methods using sector sweep will be described in Embodiments 1 to 4, and then broadcast communication schemes taking into account utilization of communication using sector sweep will be described.

Embodiment 1

In Embodiment 1, a description will be given of a communication system, a communication apparatus, and a communication method using sector sweep.

Figure 1A:
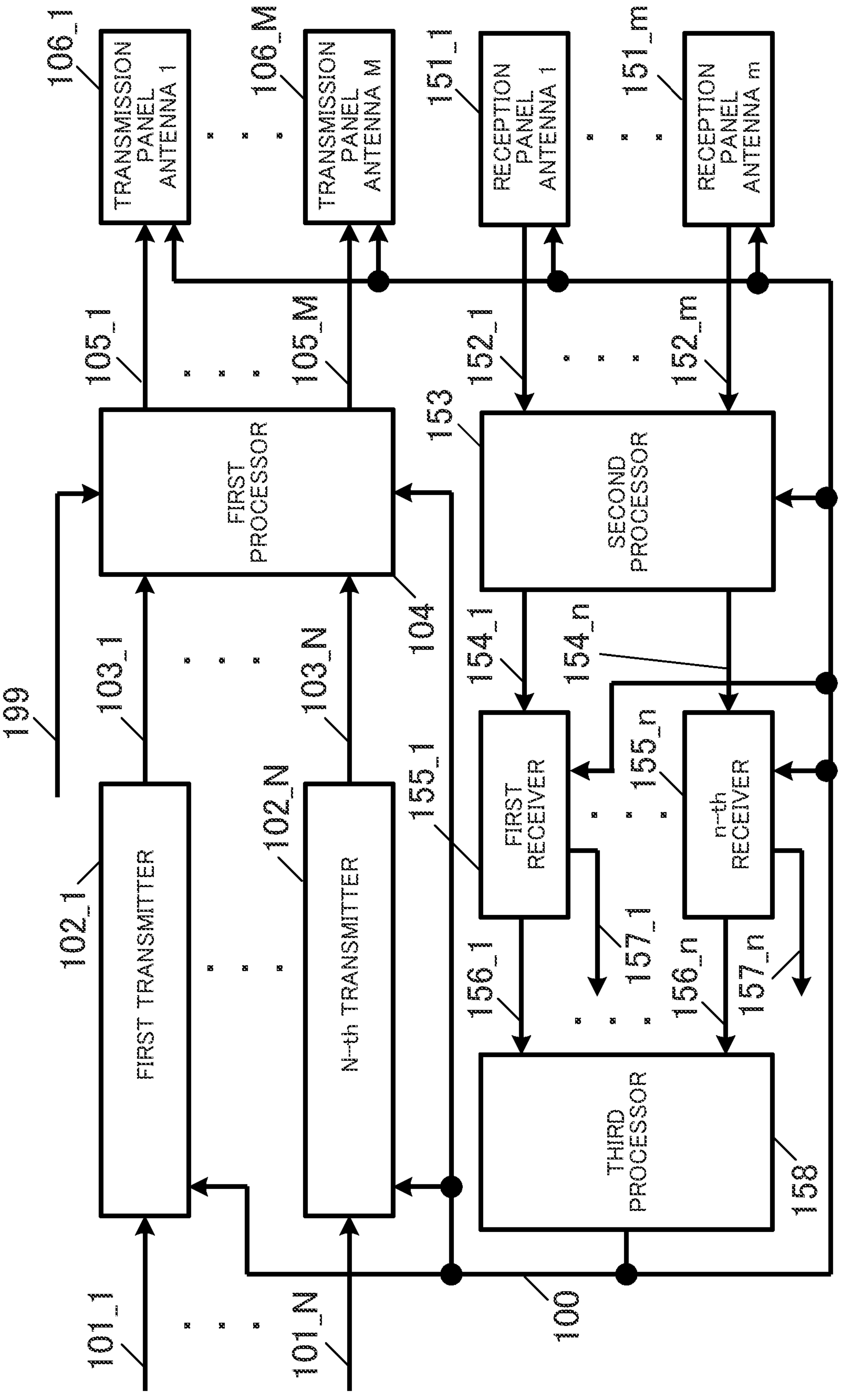
FIG. 1A illustrates an exemplary configuration of a communication apparatus in Embodiment 1.

FIG. 1A illustrates an exemplary configuration of a communication apparatus, such as a base station, an access point, a terminal, and a repeater in Embodiment 1.

The communication apparatus in FIG. 1A includes N transmitters, which are "first transmitter 102_1 to N-th transmitter102_N". Note that N is an integer equal to or greater than 1 or an integer equal to or greater than 2.

The communication apparatus in FIG. 1A also includes M transmission panel antennas, which are "transmission panel antenna 1 labeled 106_1 to transmission panel antenna M labeled 106_M", for transmission. Note that M is an integer equal to or greater than 1 or an integer equal to or greater than 2.

The communication apparatus in FIG. 1A includes n receivers, which are "first receiver 155_1 to n-th receiver 155_*n*". Note that n is an integer equal to or greater than 1 or an integer equal to or greater than 2.

The communication apparatus in FIG. 1A includes m reception panel antennas, which are "reception panel antenna 1 labeled 151_1 to reception panel antenna m labeled 151_*m*", for reception. Note that m is an integer equal to or greater than 1 or an integer equal to or greater than 2.

The i-th transmitter 102_*i* takes control signal 100 and i-th data 101_*i* as input, performs processing such as error correction coding and mapping based on a modulation scheme, and outputs i-th modulation signal 103_*i*. Note that i is an integer from 1 to N (both inclusive).

Note that i-th data 101_*i* may be configured to include data of one or more users. In this case, an error correction code, a modulation scheme, and a transmission method may be configured for each user First processor 104 takes i-th modulation signal 103_*i* (i is an integer from 1 to N (both inclusive)), control signal 100, and reference signal 199 as input and outputs j-th transmission signal 105_*j* (j is an integer from 1 to M (both inclusive)) based on frame configuration information included in control signal 100. Note that some of i-th modulation signals 103_*i* may include no signal, and some of j-th transmission signals 105_*j* may include no signal.

Then, j-th transmission signal 105_*j* is outputted as a radio wave from transmission panel antenna j labeled 106_*j*. Note that transmission panel antenna j labeled 106_*j* may perform beamforming and change the transmission directivity taking control signal 100 as input. In addition, transmission panel antenna j labeled **106_*j* may be switched by control signal 100** in transmitting a modulation signal to a communication counterpart. This will be described later.

Reception panel antenna i labeled **151_*i* receives i-th received signal 152_*i*. Note that reception panel antenna i labeled 151_*i* may perform beamforming and change the reception directivity taking control signal 100** as input. This will be described later.

Second processor 153 performs processing such as frequency conversion taking i-th received signal **152_*i* and control signal 100 as input, and outputs j-th signal-processing-subjected signal (i.e., j-th signal that has been subjected to signal processing) 154_*j*. Note that some of i-th received signals 152_*i* may include no signal, and some of j-th signal-processing-subjected signals 154_*j*** may include no signal.

Then, j-th receiver **155_*j* takes j-th signal-processing-subjected signal 154_*j* and control signal 100 as input, performs processing such as demodulation and error correction decoding on j-th signal-processing-subjected signal 154_*j* based on control signal 100, and outputs j-th control data 156_*j* and j-th data 157_*j***.

Note that j-th control data **156_*j* may be configured to include control data of one or more users, and j-th data 157_*j*** may be configured to include data of one or more users.

Third processor 158 takes j-th control data **156_*j* as input, generates control signal 100 based on information obtained from the communication counterpart, and outputs generated control signal 100**.

Incidentally, first processor 104 of the communication apparatus in FIG. 1A may perform processing for transmit beamforming (transmission directivity control), for example, precoding processing. Meanwhile, second processor 153 may perform processing for reception directivity control. As another example, first processor 104 may perform processing of outputting first modulation signal 103_1 as first transmission signal 105_1, second modulation signal 103_2 as second transmission signal 105_2, and third modulation signal 103_3 as third transmission signal 105_3, for example. Alternatively, first processor 104 may perform processing of outputting second modulation signal 103_2 as first transmission signal 105_1. In addition, second processor 153 may perform processing of outputting first received signal 152_1 as first signal-processing-subjected signal 154_1, second received signal 152_2 as second signal-processing-subjected signal 154_2, and third received signal 152_3 as third signal-processing-subjected signal 154_3. Alternatively, the second processor 153 may perform processing of outputting first received signal 152_1 as second signal-processing-subjected signal 154_2.

The configuration in FIG. 1A may include a processor not illustrated in FIG. 1A. For example, an interleaver for sorting symbols and/or data, a padder for padding, and the like may be included in the communication apparatus. Moreover, the communication apparatus in FIG. 1A (also in FIG. 1B and FIG. 1C) may perform transmission and/or reception corresponding to multiple input multiple output (MIMO) transmission for transmitting a plurality of modulation signals (a plurality of streams), using a plurality of antennas. Further, the communication apparatus in FIG. 1A (also in FIG. 1B and FIG. 1C) may perform transmission corresponding to multi-user MIMO transmission for transmitting, using a first frequency (band), modulation signals to a plurality of terminals in a first time period at least.

Figure 1B:
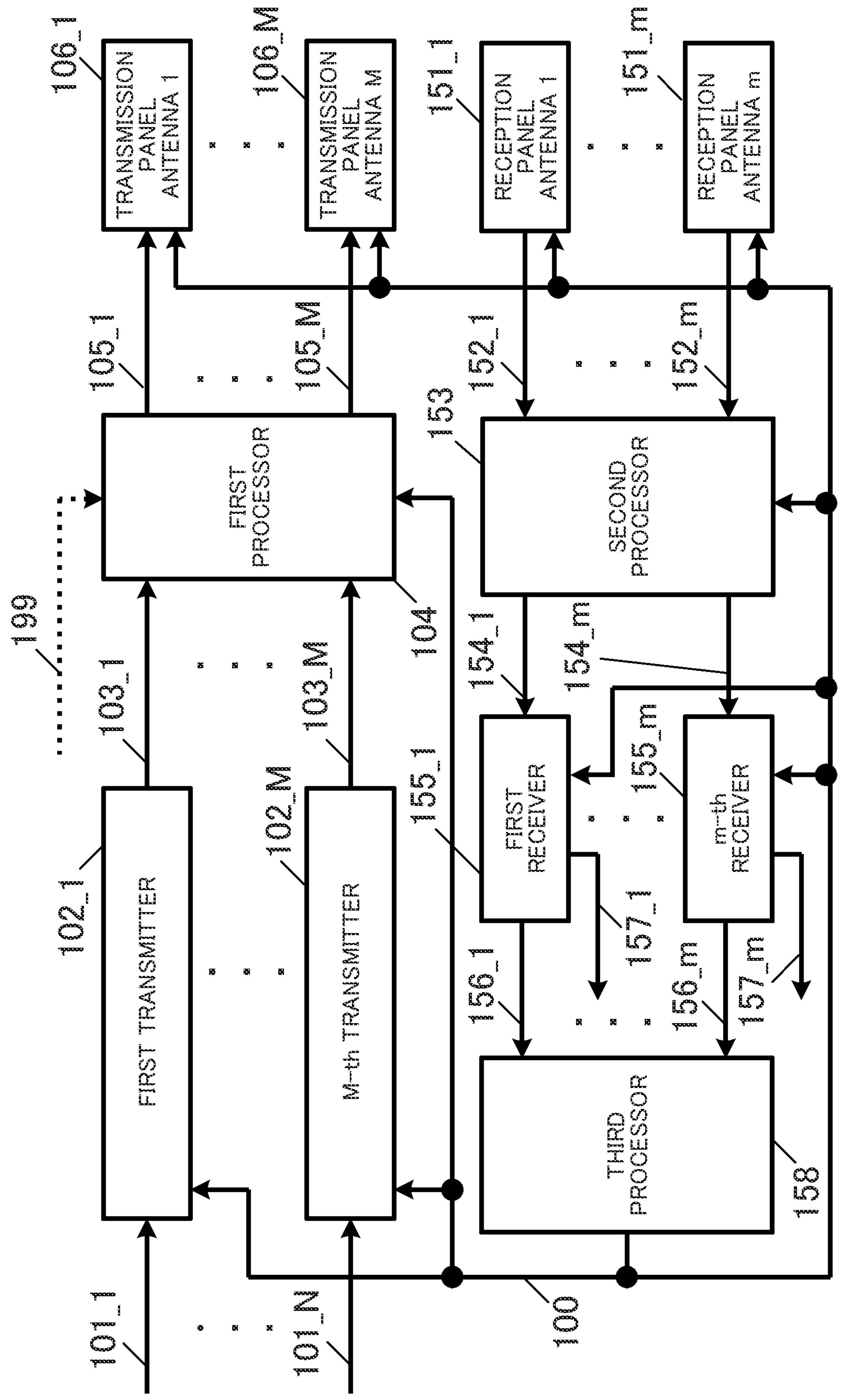
FIG. 1B illustrates an exemplary configuration of the communication apparatus different from the configuration in FIG. 1A in Embodiment 1.

FIG. 1B illustrates an exemplary configuration of the communication apparatus in Embodiment 1, such as a base station, an access point, a terminal, a repeater, etc., different from the configuration in FIG. 1A. In FIG. 1B, the components that operate in the same manner as in FIG. 1A are denoted by the same reference signs, and detailed descriptions thereof will be omitted.

The configuration in FIG. 1B is characterized in that the number of transmitters and the number of transmission panel antennas are the same. In this case, first processor 104 may perform processing for transmit beamforming (transmission directivity control), for example, precoding processing. First processor 104 may output y-th modulation signal **103_*y* as x-th transmission signal 105_*x***. Note that x is an integer from 1 to M (both inclusive), and y is an integer from 1 to M (both inclusive).

In addition, the number of receivers and the number of reception panel antennas are the same. In this case, second processor 153 may perform processing for the reception directivity control. Second processor 153 may output y-th received signal **152_*y* as x-th signal-processing-subjected signal 154_*x***. Note that x is an integer from 1 to m (both inclusive), and y is an integer from 1 to m (both inclusive).

Figure 1C:
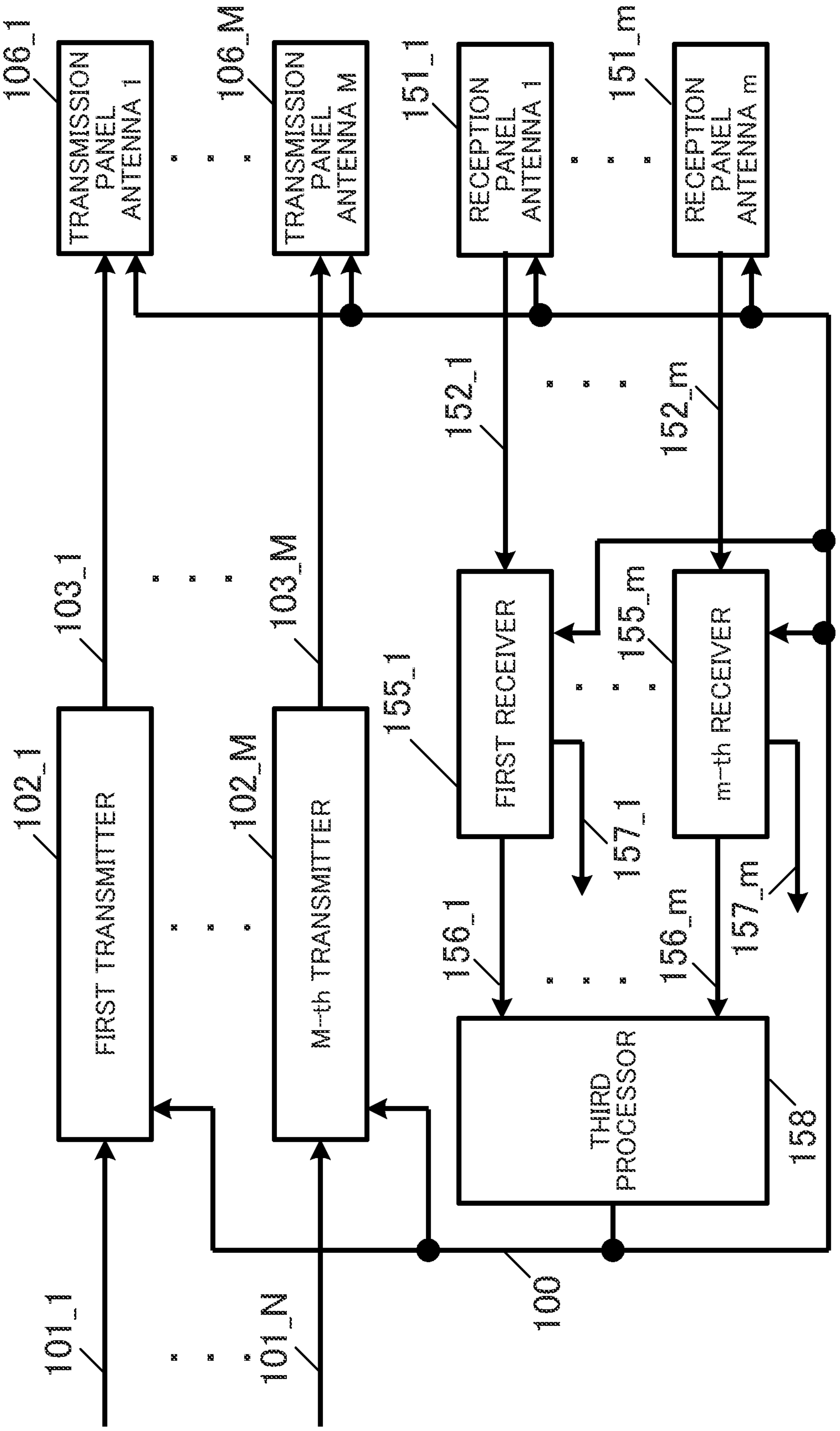
FIG. 1C illustrates an exemplary configuration of the communication apparatus different from the configurations in FIGS. 1A and 1B in Embodiment 1.

FIG. 1C illustrates an exemplary configuration of the communication apparatus in Embodiment 1, such as a base station, an access point, a terminal, a repeater, etc., different from the configurations in FIGS. 1A and 1B. In FIG. 1C, the components that operate in the same manner as in FIG. 1A are denoted by the same reference signs, and detailed descriptions thereof will be omitted.

The configuration in FIG. 1C is characterized in that the number of transmitters and the number of transmission panel antennas are the same and the first processor is not present. In addition, the number of receivers and the number of reception panel antennas are the same and the second processor is not present.

Note that FIGS. 1A, 1B, and 1C illustrate exemplary configurations of the communication apparatus, such as a base station, an access point, a terminal, a repeater, etc., and the configuration of the communication apparatus is not limited to these examples.

Figure 2:
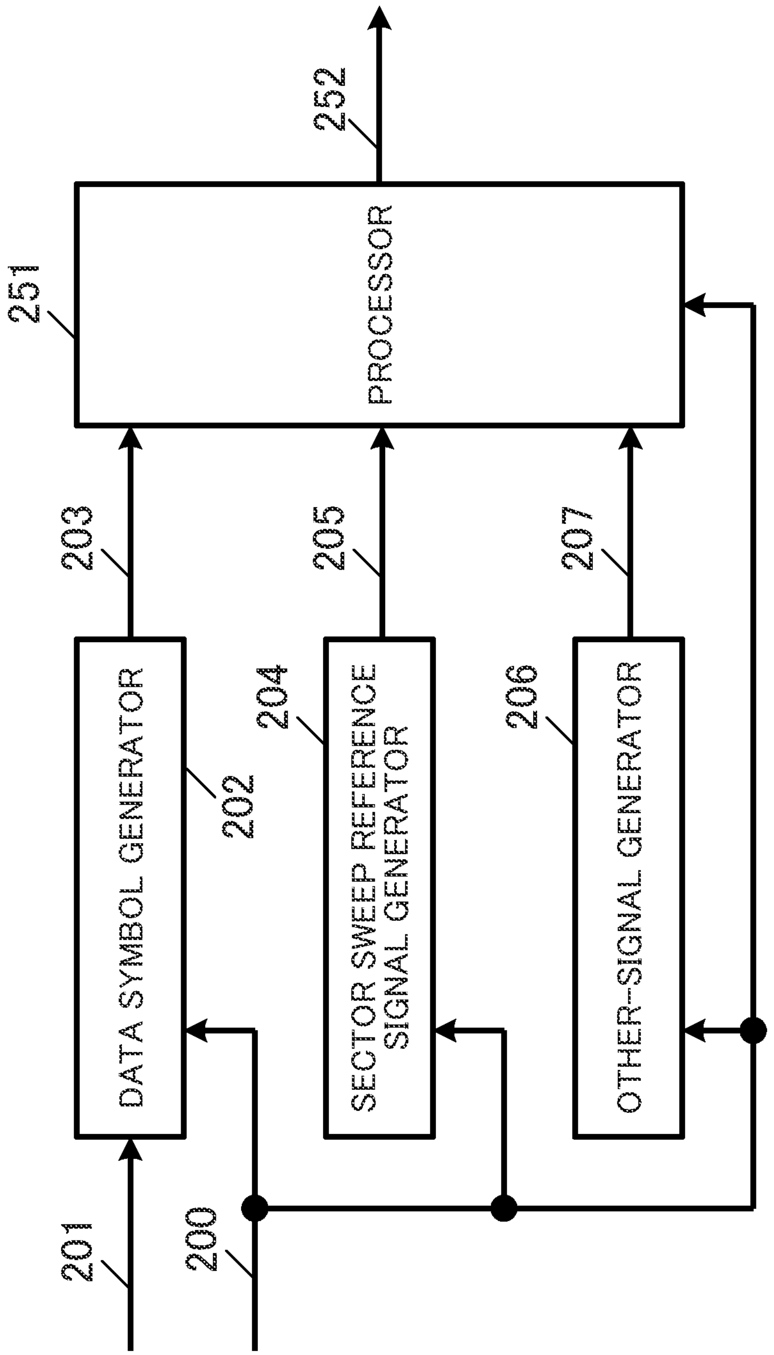
FIG. 2 illustrates an exemplary configuration of an i-th transmitter.

FIG. 2 illustrates an exemplary configuration of i-th transmitter **102_*i***. Note that i is "an integer from 1 to N (both inclusive)" or "an integer from 1 to M (both inclusive)".

Data symbol generator 202 takes data 201 and control signal 200 as input, performs error correction coding, mapping, signal processing for transmission, etc. on the basis of information on an error correction coding method, information on a modulation scheme, information on a transmission method, information on a frame configuration method, etc. included in control signal 200, and outputs data symbol modulation signal 203. Note that data 201 corresponds to i-th data **101_*i*, and control signal 200 corresponds to control signal 100. Thus, data 201** may include data of one or more users.

Sector sweep reference signal (i.e., reference signal for sector sweep) generator 204 takes control signal 200 as input, generates sector sweep reference signal 205 based on the frame configuration information included in control signal 200, and outputs the generated signal. Note that specific configuration methods and transmission methods for sector sweep reference signal 205 will be described later in detail.

Other-signal generator 206 takes control signal 200 as input, generates other signals 207 based on the control signal, and outputs the generated signals.

Processor 251 takes data symbol modulation signal 203, sector sweep reference signal 205, other signals 207, and control signal 200 as input, generates frame configuration-based modulation signal (i.e., modulation signal in accordance with frame configuration) 252 based on the frame configuration information included in control signal 200, and outputs the generated signal. Note that frame configuration-based modulation signal 252 corresponds to i-th modulation signal 103_*i*, and specific examples of the frame configuration will be described later in detail.

Figure 3:
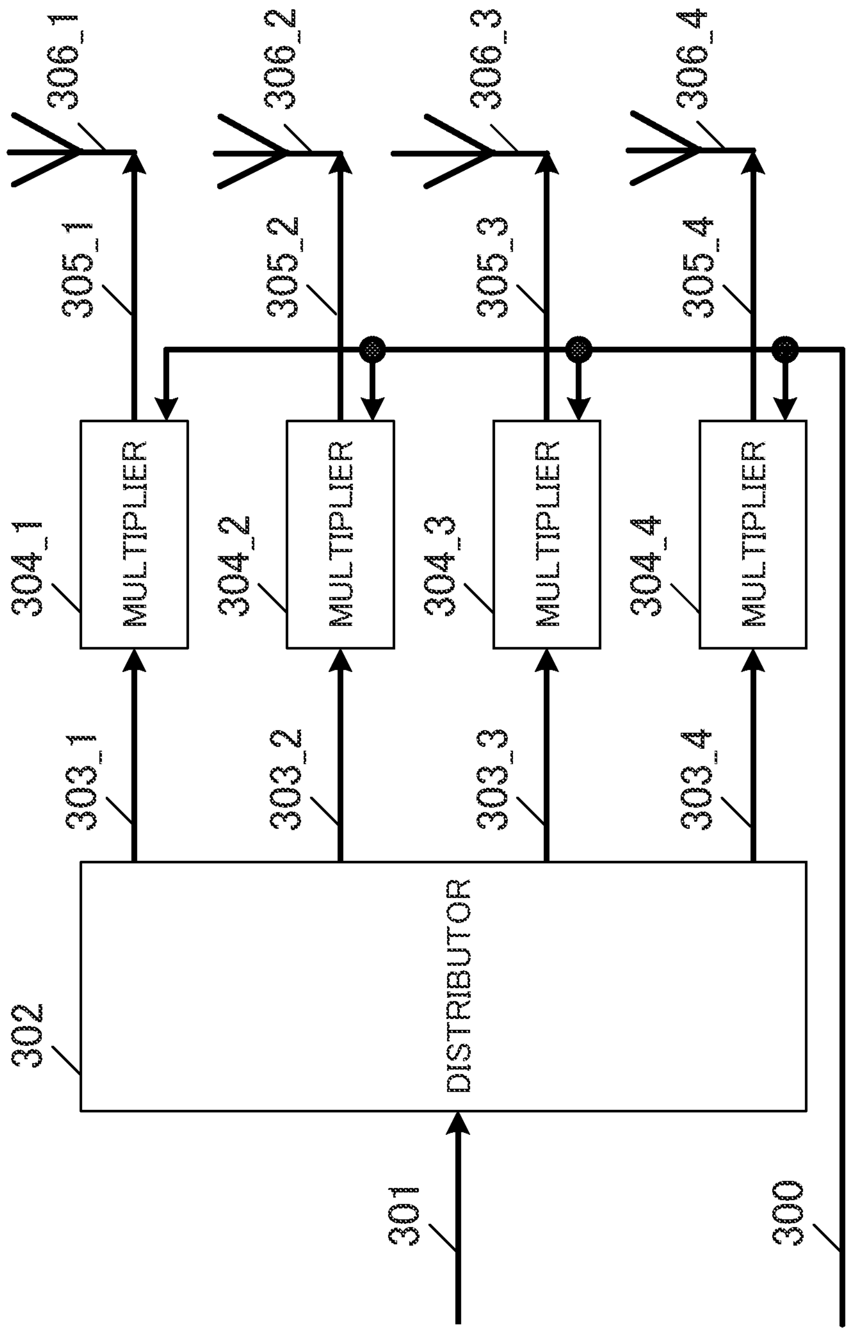
FIG. 3 illustrates an exemplary configuration of transmission panel antenna i in FIGS. 1A, 1B, and 1C.

FIG. 3 illustrates an exemplary configuration of transmission panel antenna i labeled 106_*i* in FIGS. 1A, 1B, and 1C. Note that i is "an integer from 1 to M (both inclusive)". Distributor 302 takes transmission signal 301 as input, performs distribution, and outputs first transmission signal 303_1, second transmission signal 303_2, third transmission signal 303_3, and fourth transmission signal 303_4. Note that transmission signal 301 corresponds to "i-th transmission signal 105_*i* in FIGS. 1A and 1B" or "i-th modulation signal 103_*i* in FIG. 1C".

Multiplier 304_1 takes first transmission signal 303_1 and control signal 300 as input, multiplies first transmission signal 303_1 by a multiplication coefficient based on control signal 300, generates and outputs coefficient-multiplication-subjected first transmission signal (i.e., first transmission signal that has been subjected to the coefficient multiplication) 305_1. Then, coefficient-multiplication-subjected first transmission signal 305_1 is outputted from antenna 306_1 as a radio wave. Note that control signal 300 corresponds to control signal 100.

A specific description follows. First transmission signal 303_1 is represented by tx1(t). Note that t represents time. When the multiplication coefficient is w1, coefficient-multiplication-subjected first transmission signal 305_1 can be expressed as tx1(t)×w1. Note that tx1(t) can be represented by a complex number, and thus, it may be a real number. Likewise, w1 can be represented by a complex number, and thus, it may be a real number.

Multiplier 304_2 takes second transmission signal 303_2 and control signal 300 as input, multiplies second transmission signal 3032 by a multiplication coefficient based on control signal 300, generates and outputs coefficient-multiplication-subjected second transmission signal 305_2. Then, coefficient-multiplication-subjected second transmission signal 305_2 is outputted from antenna 306_2 as a radio wave.

A specific description follows. Second transmission signal 3032 is represented by tx2(t). Note that t represents time. When the multiplication coefficient is w2, coefficient-multiplication-subjected second transmission signal 305_2 can be expressed as tx2(t)×w2. Note that tx2(t) can be represented by a complex number, and thus, it may be a real number. Likewise, w2 can be represented by a complex number, and thus, it may be a real number.

Multiplier 304_3 takes third transmission signal 303_3 and control signal 300 as input, multiplies third transmission signal 303_3 by a multiplication coefficient based on control signal 300, generates and outputs coefficient-multiplication-subjected third transmission signal 305_3. Then, coefficient-multiplication-subjected third transmission signal 305_3 is outputted from antenna 306_3 as a radio wave.

A specific description follows. Third transmission signal 303_3 is represented by tx3(t). Note that t represents time. When the multiplication coefficient is w3, coefficient-multiplication-subjected third transmission signal 305_3 can be expressed as tx3(t)×w3. Note that tx3(t) can be represented by a complex number, and thus, it may be a real number. Likewise, w3 can be represented by a complex number, and thus, it may be a real number.

Multiplier 304_4 takes fourth transmission signal 303_4 and control signal 300 as input, multiplies fourth transmission signal 3034 by a multiplication coefficient based on control signal 300, generates and outputs coefficient-multiplication-subjected fourth transmission signal 305_4. Then, coefficient-multiplication-subjected fourth transmission signal 3054 is outputted from antenna 306_4 as a radio wave.

A specific description follows. Fourth transmission signal 3034 is represented by tx4(t). Note that t represents time. When the multiplication coefficient is w4, coefficient-multiplication-subjected fourth transmission signal 305_4 can be expressed as tx4(t)×w4. Note that tx4(t) can be represented by a complex number, and thus, it may be a real number. Likewise, w4 can be represented by a complex number, and thus, it may be a real number.

Note that "an absolute value of w1, an absolute value of w2, an absolute value of w3, and an absolute value of w4 may be equal to each other". This corresponds to a case where a phase change has been performed. It is needless to say that the absolute value of w1, the absolute value of w2, the absolute value of w3, and the absolute value of w4 need not be equal to each other.

The respective values of w1, w2, w3, and w4 may be switched for each frame, each slot, each mini-slot, each multiple-symbols, or each symbol. The switch timings of the respective values of w1, w2, w3, and w4 are not limited to the above examples.

Further, FIG. 3 illustrates an example of the transmission panel antenna composed of four antennas (and four multipliers), but the number of antennas is not limited to four and the transmission panel antenna only needs to be composed of two or more antennas.

Note that transmission panel antenna i labeled 106_*i* in FIGS. 1A, 1B, and 1C may perform directivity control by changing the characteristics of the antenna itself, and in this case, transmission panel antenna i labeled 106_*i* may be composed of one or more antennas.

Figure 4:
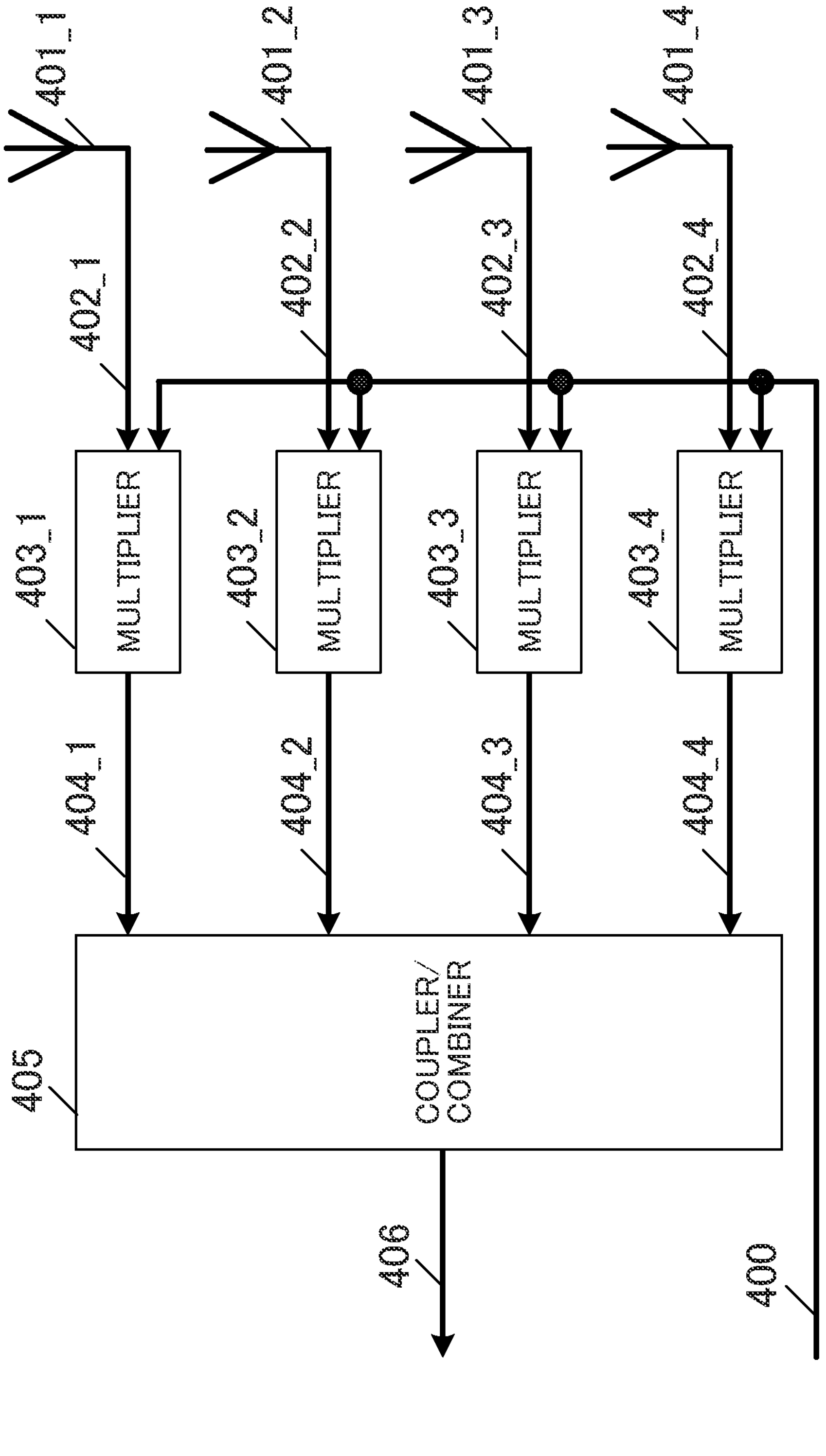
FIG. 4 illustrates an exemplary configuration of reception panel antenna i in FIGS. 1A, 1B, and 1C.

FIG. 4 illustrates an exemplary configuration of reception panel antenna i labeled 151_*i* in FIGS. 1A, 1B, and 1C. Note that i is "an integer from 1 to m (both inclusive)".

Multiplier 403_1 takes first received signal 402_1 received at antenna 401_1 and control signal 400 as input, multiplies first received signal 402_1 by a multiplication coefficient based on control signal 400, and outputs coefficient-multiplication-subjected first received signal 404_1.

A specific description follows. First received signal 402_1 is represented by rx1(t). Note that t represents time. When the multiplication coefficient is d1, coefficient-multiplication-subjected first received signal 4041 can be expressed as rx1(t)×d1. Note that rx1(t) can be represented by a complex number, and thus, it may be a real number. Likewise, d1 can be represented by a complex number, and thus, it may be a real number.

Multiplier 403_2 takes second received signal 4022 received at antenna 401_2 and control signal 400 as input, multiplies second received signal 402_2 by a multiplication coefficient based on control signal 400, and outputs coefficient-multiplication-subjected second received signal 4042.

A specific description follows. Second received signal 4022 is represented by rx2(t). Note that t represents time. When the multiplication coefficient is d2, coefficient-multiplication-subjected second received signal 404_2 can be expressed as rx2(t)×d2. Note that rx2(t) can be represented by a complex number, and thus, it may be a real number. Likewise, d2 can be represented by a complex number, and thus, it may be a real number.

Multiplier 403_3 takes third received signal 402_3 received at antenna 401_3 and control signal 400 as input, multiplies third received signal 402_3 by a multiplication coefficient based on control signal 400, and outputs coefficient-multiplication-subjected third received signal 404_3.

A specific description follows. Third received signal 402_3 is represented by rx3(t). Note that t represents time. When the multiplication coefficient is d3, coefficient-multiplication-subjected third received signal 404_3 can be expressed as rx3(t)×d3. Note that rx3(t) can be represented by a complex number, and thus, it may be a real number. Likewise, d3 can be represented by a complex number, and thus, it may be a real number.

Multiplier 403_4 takes fourth received signal 4024 received at antenna 401_4 and control signal 400 as input, multiplies fourth received signal 402_4 by a multiplication coefficient based on control signal 400, and outputs coefficient-multiplication-subjected fourth received signal 404_4.

A specific description follows. Fourth received signal 4024 is represented by rx4(t). Note that t represents time. When the multiplication coefficient is d4, coefficient-multiplication-subjected fourth received signal 404_4 can be expressed as rx4(t)×d4. Note that rx4(t) can be represented by a complex number, and thus, it may be a real number. Likewise, d4 can be represented by a complex number, and thus, it may be a real number.

Coupler/combiner 405 takes coefficient-multiplication-subjected first received signal 404_1, coefficient-multiplication-subjected second received signal 404_2, coefficient-multiplication-subjected third received signal 404_3, and coefficient-multiplication-subjected fourth received signal 4044 as input, combines coefficient-multiplication-subjected first received signal 404_1, coefficient-multiplication-subjected second received signal 404_2, coefficient-multiplication-subjected third received signal 404_3, and coefficient-multiplication-subjected fourth received signal 404_4, and outputs modulation signal 406. Note that modulation signal 406 is expressed as rx1(t)×d1+rx2(t)×d2+rx3(t)×d3+rx4(t)×d4.

Note that control signal 400 corresponds to control signal 100, and modulation signal 406 corresponds to i-th received signal 152_*i*.

In addition, "an absolute value of d1, an absolute value of d2, an absolute value of d3, and an absolute value of d4 may be equal to each other". This corresponds to a case where a phase change has been performed. It is needless to say that the absolute value of d1, the absolute value of d2, the absolute value of d3, and the absolute value of d4 need not be equal to each other.

The respective values of d1, d2, d3, and d4 may be switched for each frame, each slot, each mini-slot, each multiple-symbols, or each symbol. The switch timings of the respective values of d1, d2, d3, and d4 are not limited to the above examples.

Further, FIG. 4 illustrates an example of the reception panel antenna composed of four antennas (and four multipliers), but the number of antennas is not limited to four and the reception panel antenna only needs to be composed of two or more antennas.

Note that reception panel antenna i labeled 151_*i* in FIGS. 1A, 1B, and 1C may perform directivity control by changing the characteristics of the antenna itself, and in this case, reception panel antenna i labeled 151_*i* may be composed of one or more antennas.

In the present embodiment, in a case where the communication apparatus in FIGS. 1A, 1B, and 1C is a base station or g Node B (gNB), for example, it supports multi-carrier transmission such as orthogonal frequency division multiplexing (OFDM). The base station or gNB in FIGS. 1A, 1B, and 1C may also support orthogonal frequency division multiple access (OFDMA).

Figure 5:
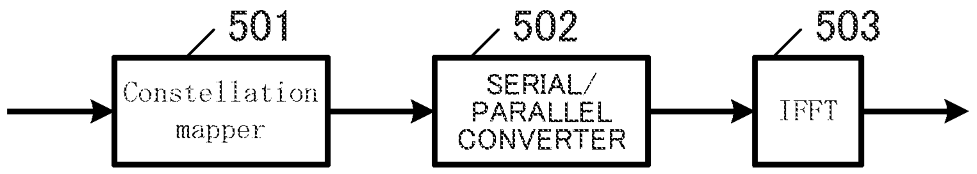
FIG. 5 illustrates an exemplary configuration of a transmission apparatus in a case of using an OFDM scheme.

FIG. 5 illustrates an exemplary configuration of a transmission apparatus in a case of using an OFDM scheme. As illustrated in FIG. 5, the transmission apparatus is composed of, for example, constellation mapper 501, serial/parallel converter 502, and inverse fast Fourier transform (IFFT) 503.

Constellation mapper 501, for example, takes data as input, performs mapping based on the configured modulation scheme, and outputs the modulation signal.

Serial/parallel converter 502 converts serial signals into parallel signals. Note that serial/parallel converter 502 need not be present when parallel signals are already obtained.

IFFT 503 performs IFFT processing on an input signal, and outputs the modulation signal based on the OFDM scheme. Note that IFFT 503 may be an inverse Fourier transformer performing inverse Fourier transform.

The transmission apparatus in a case of using the OFDM scheme may include another processor (e.g., error correction coder, interleaver, etc.), and the configuration is not limited to that in FIG. 5.

In the present embodiment, in a case where the communication apparatus in FIGS. 1A, 1B, and 1C is a base station or gNB, for example, it may support multi-carrier reception such as in the OFDM scheme or may support single-carrier reception such as in a single-carrier scheme based on discrete Fourier transform (DFT), for example. The following description is about an exemplary configuration of a reception part in a single-carrier scheme.

Figure 6:
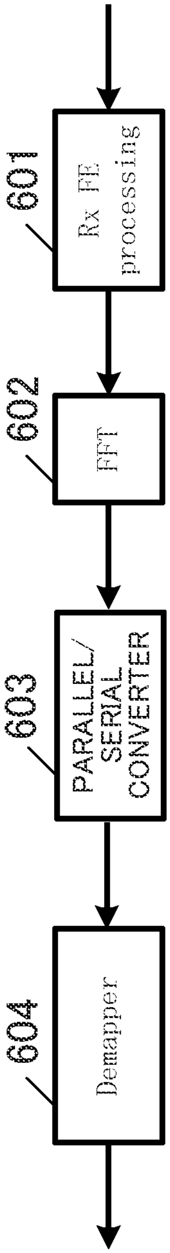
FIG. 6 illustrates an exemplary configuration of a reception apparatus in a case of using an OFDM scheme.

FIG. 6 illustrates an exemplary configuration of a reception apparatus in a case of using the OFDM scheme. As illustrated in FIG. 6, the reception apparatus in a case of using the OFDM scheme is composed of receiver (Rx) front end (FE) processing 601, fast Fourier transform 602, parallel/serial converter 603, and demapper 604.

Rx FE processing 601 performs processing of a reception front end.

FFT 602 performs FFT processing on the input signal.

Parallel/serial converter 603 converts parallel signals into serial signals. Note that parallel/serial converter 603 need not be present when serial signals are already obtained.

Demapper 604 performs demodulation processing based on the transmission method and modulation scheme.

Note that the reception apparatus may include another processor (e.g., de-interleaver, decoder for error correction coding, etc.), and the configuration is not limited to that in FIG. 6.

Figure 7:
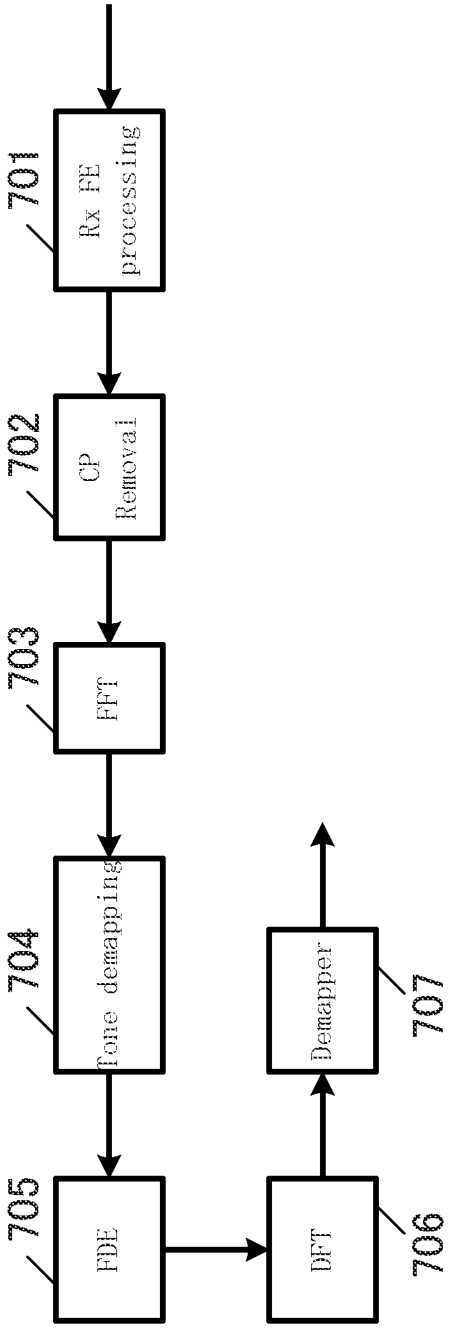
FIG. 7 illustrates an exemplary configuration of the reception apparatus in a case of using a single-carrier scheme based on DFT.

FIG. 7 illustrates an exemplary configuration of the reception apparatus in a case of using a single-carrier scheme based on DFT. As illustrated in FIG. 7, the reception apparatus is composed of receiver (Rx) FE processing 701, CP removal 702, fast Fourier transform 703, tone demapping 704, frequency domain equalization (FDE) 705, DFT 706, and demapper 707. Note that the reception apparatus may include a processor other than the above.

Figure 8:
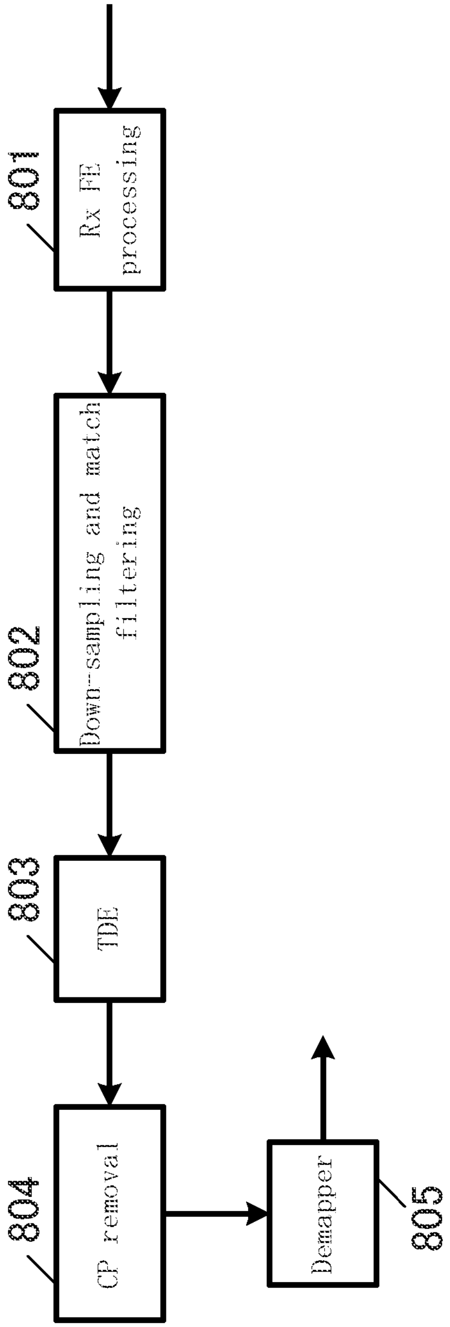
FIG. 8 illustrates an exemplary configuration of the reception apparatus in a case of using a single-carrier scheme based on time domain.

FIG. 8 illustrates an exemplary configuration of the reception apparatus in a case of using a single-carrier scheme based on time domain. As illustrated in FIG. 8, the reception apparatus is composed of receiver (Rx) FE processing 801, down-sampling and match filtering 802, time domain equalization (TDE) 803, CP removal 804, and demapper 805. Note that the reception apparatus may include a processor other than the above.

Although exemplary reception methods in single-carrier schemes and exemplary configurations of the reception apparatus have been described above, the reception method in a single-carrier scheme and the reception apparatus are not limited to these. For example, examples of the single-carrier scheme include "discrete Fourier transform (DFT)-spread orthogonal frequency division multiplexing (OFDM)" (DFT-S OFDM), "trajectory constrained DFT-spread OFDM", "constrained DFT-spread OFDM" (constrained DFT-S OFDM), "OFDM based single carrier (SC)", "single carrier (SC)-frequency division multiple access (FDMA)", "guard interval DFT-spread OFDM", a time-domain implementation single carrier scheme (e.g., single carrier (SC)-QAM), and the like.

Figure 9:
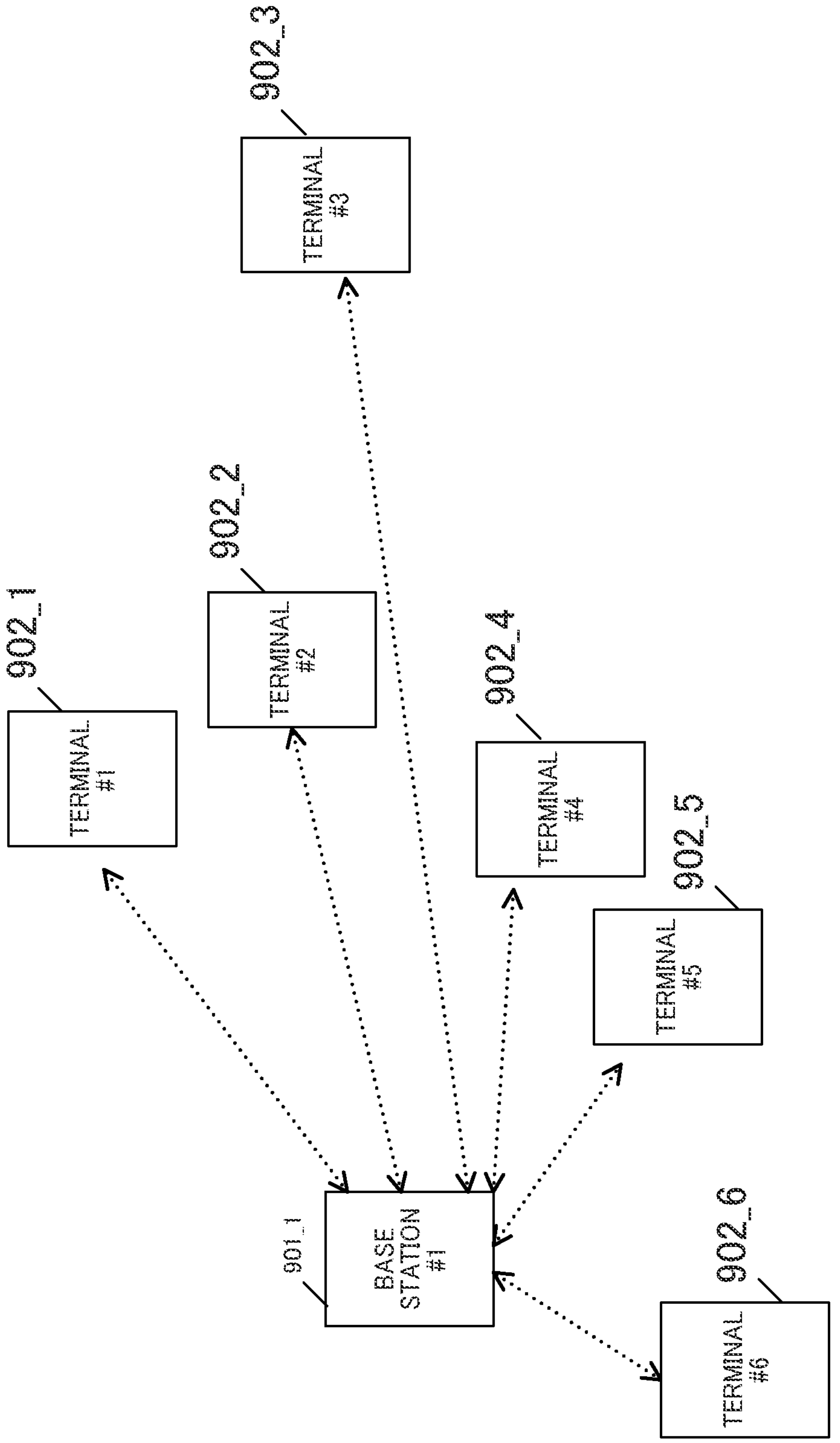
FIG. 9 illustrates an exemplary communication state in Embodiment 1.

FIG. 9 illustrates an exemplary communication state in Embodiment 1. As illustrated in FIG. 9, a case to be discussed is where base station #1 labeled 901_1 communicates with terminal #1 labeled 902_1, terminal #2 labeled 902_2, terminal #3 labeled 902_3, terminal #4 labeled 902_4, terminal #5 labeled 902_5, and terminal #6 labeled 902_6. A relationship between a base station and terminals, however, is not limited to this example, and the base station may communicate with one or more terminals, for example.

Note that the following description is about an exemplary case where the base station transmits modulation signals to the terminals using the OFDMA scheme.

Figure 10:
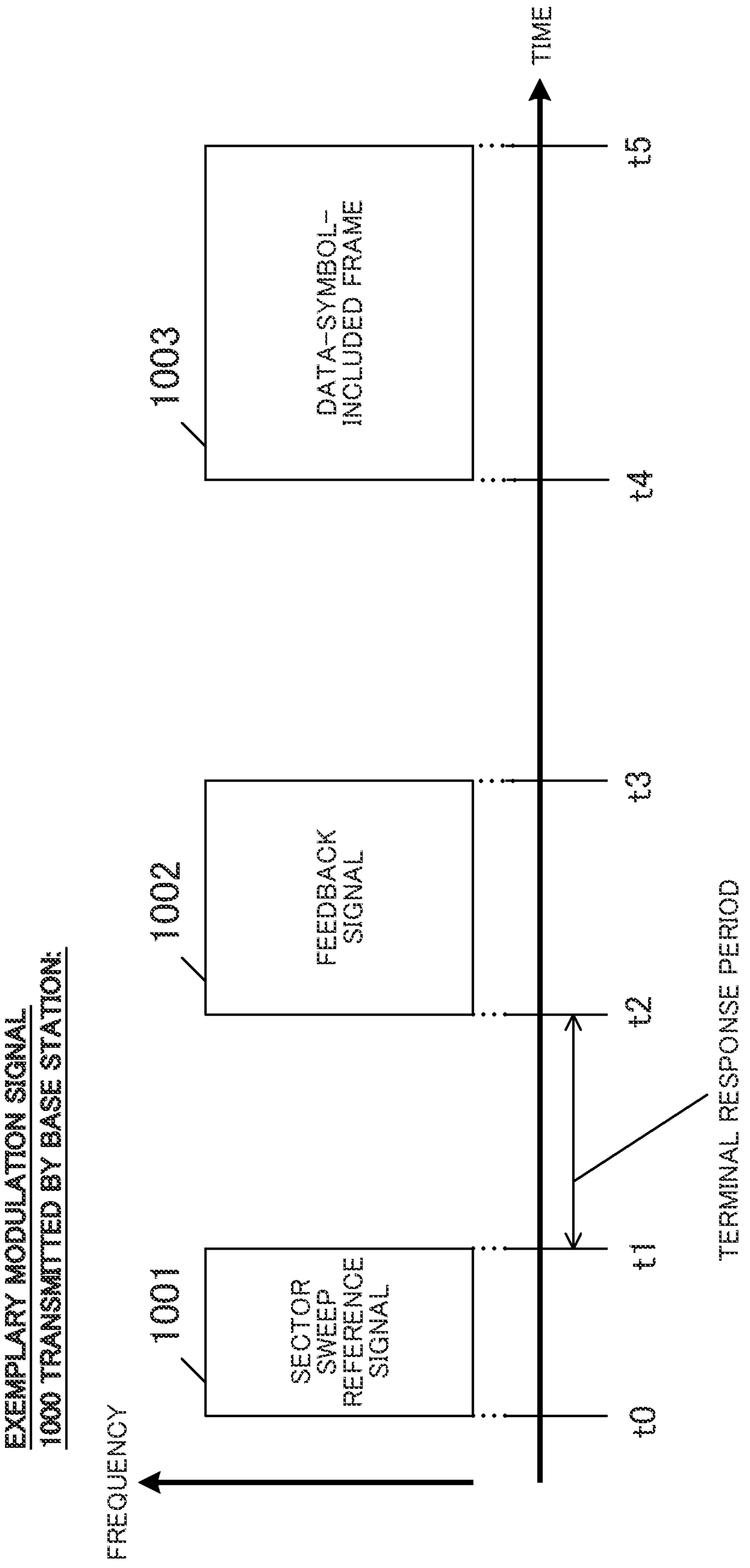
FIG. 10 illustrates an exemplary modulation signal transmitted by base station #1 in FIG. 9.

FIG. 10 illustrates an example of modulation signal 1000 transmitted by base station #1 labeled 901_1 in FIG. 9. In FIG. 10, the horizontal axis represents time and the vertical axis represents frequency. In the time period from time t0 to t1, sector sweep (sector-sweep level) reference signal 1001 is present. Note that sector sweep reference signal 1001 will be described later.

The time period from time t1 to t2 is a terminal response period. Note that the terminal response will be described later.

In the time period from time t2 to t3, feedback signal 1002 is present. Note that feedback signal 1002 will be described later.

In the time period from time t4 to t5, data-symbol-included frame 1003 is present. Note that data-symbol-included frame 1003 will be described later The reference signal for sector sweep is referred to as sector sweep reference signal 1001 in FIG. 10, but the name is not limited thereto and may be a reference signal, a reference symbol, a training signal, a training symbol, or the like. The signal denoted by reference sign 1002 is referred to as feedback signal 1002, but the name is not limited thereto and may be a feedback symbol, a terminal-addressed signal, a terminal-addressed symbol, a control signal, a control symbol, or the like. In addition, the frame including a data symbol is referred to as data-symbol-included frame 1003, but the name is not limited thereto and may be a slot/mini-slot/unit-included frame, or the like.

Figure 11:
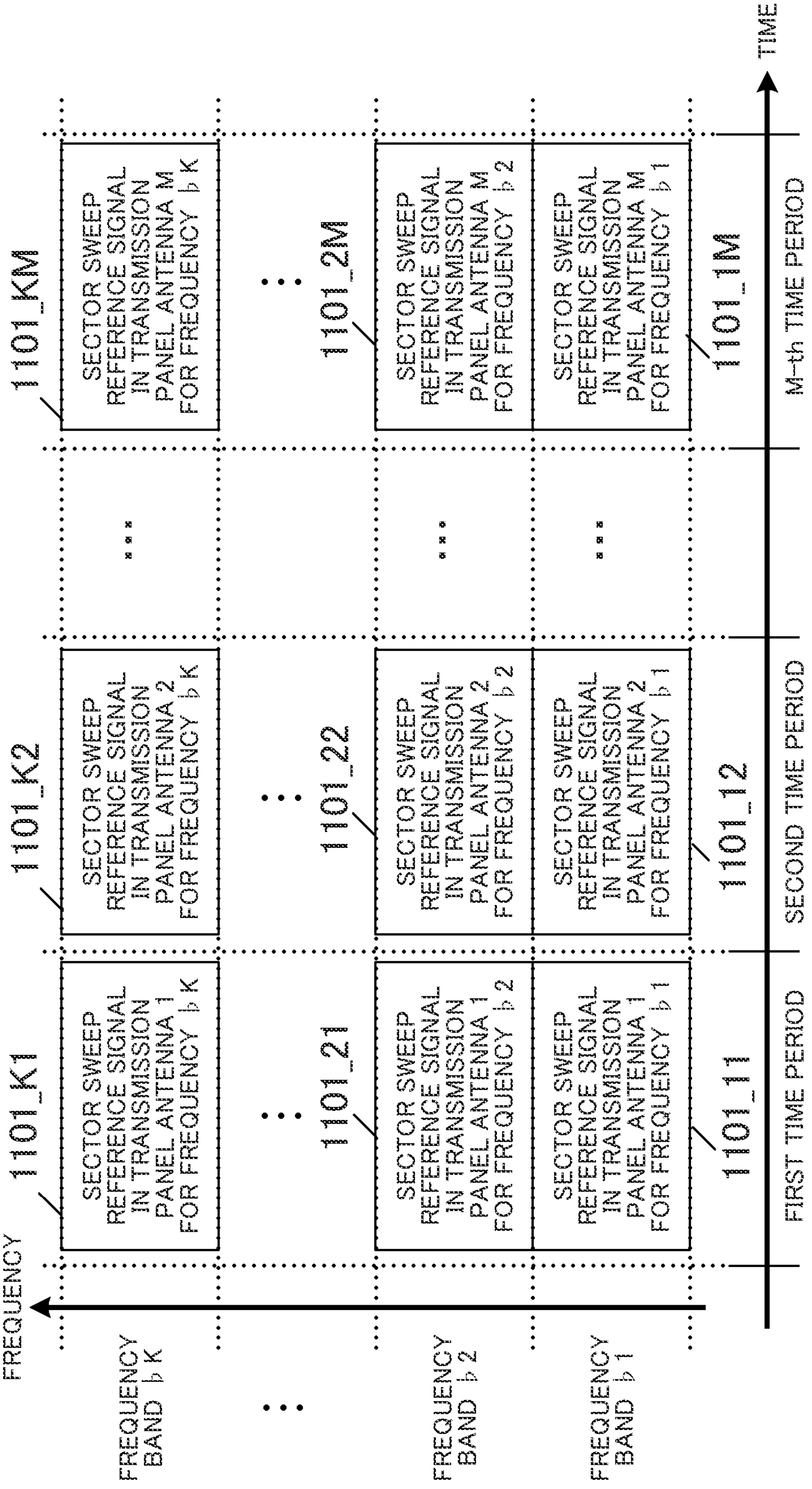
FIG. 11 illustrates exemplary sector sweep reference signals in FIG. 10 transmitted by base station #1 in FIG. 9 with the configuration in FIG. 1A, 1B, or 1C.

FIG. 11 illustrates examples of sector sweep reference signal 1001 in FIG. 10 transmitted by base station #1 labeled 901_1 in FIG. 9 with the configuration in FIG. 1A, 1B, or 1C, for example. Note that the horizontal axis represents time and the vertical axis represents frequency in FIG. 11. In the example of FIG. 11, the frequency is divided into frequency band ♭1, frequency band ♭2, . . . , frequency band ♭K as illustrated in FIG. 11 for base station #1 labeled 901_1 to transmit modulation signals based on OFDMA. Note that K is an integer equal to or greater than 1 or an integer equal to or greater than 2. Note that, in a case of using OFDM(A), for example, a single frequency band includes one or more (sub)carriers or includes two or more (sub)carriers. This may apply to the other drawings and embodiments.

In frequency band ♭1, for example, sector sweep reference signal 1101_11 in transmission panel antenna 1 for frequency ♭1 is present in the first time period, sector sweep reference signal 1101_12 in transmission panel antenna 2 for frequency ♭1 is present in the second time period, . . . , sector sweep reference signal 1101_1M in transmission panel antenna M for frequency ♭1 is present in the M-th time period.

That is, in frequency band ♭i, sector sweep reference signal 1101_*i* i in transmission panel antenna 1 for frequency ♭i is present in the first time period, sector sweep reference signal 1101_*i*2 in transmission panel antenna 2 for frequency ♭i is present in the second time period, . . . , sector sweep reference signal 1101_*i*M in transmission panel antenna M for frequency ♭i is present in the M-th time period. Note that i is an integer from 1 to K (both inclusive).

Note that sector sweep reference signal 1101_*ij* in transmission panel antenna j for frequency ♭i is transmitted from transmission panel antenna j labeled 106_*j* of base station #1 labeled 901_1 with the configuration in FIG. 1A, 1B, or 1C. In this case, j is an integer from 1 to M (both inclusive).

One feature is that "sector sweep reference signals are transmitted from the same transmission panel antenna in the i-th time period regardless of the frequency band in FIG. 1I". At this time, the same beamforming parameter is used in a first period of time regardless of the frequency band. Note that the beamforming will be described later.

Figure 12:
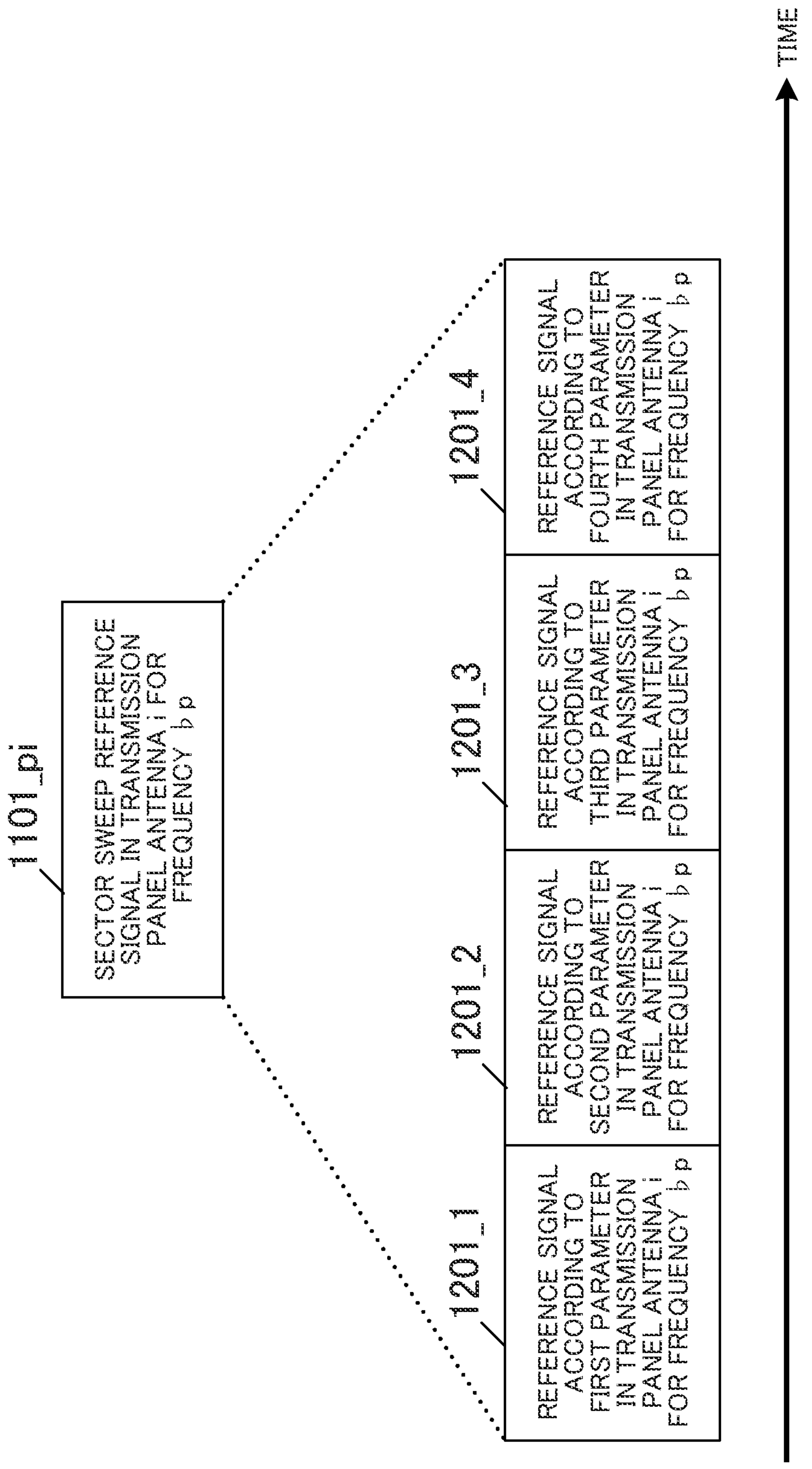
FIG. 12 illustrates an exemplary configuration of a "sector sweep reference signal in transmission panel antenna i for frequency ♭p" in FIG. 11.

FIG. 12 illustrates an exemplary configuration of "sector sweep reference signal 1101_*pi* in transmission panel antenna i for frequency ♭p" in FIG. 11. Note that the horizontal axis represents time in FIG. 12. Note that p is an integer from 1 to K (both inclusive) and i is an integer from 1 to M (both inclusive).

For example, base station #1 labeled 901_1 with the configuration in FIG. 1A, 1B, or 1C includes the configuration in FIG. 3 as transmission panel antenna i labeled 106_*i*.

A description will be given of "reference signal 1201_1 according to first parameter in transmission panel antenna i for frequency ♭p".

When base station #1 labeled 901_1 transmits "reference signal 1201_1 according to first parameter in transmission panel antenna i for frequency ♭p" illustrated in FIG. 12, base station #1 labeled 901_1 sets the multiplication coefficient in multiplier 304_1 in transmission panel antenna i labeled 106_*i* as w1(i, 1). When first transmission signal 303_1 of "reference signal 1201_1 according to first parameter in transmission panel antenna i for frequency ♭p" is tx1ref1(t), multiplier 304_1 obtains tx1ref1(t)×w1(i, 1). Then, base station #1 labeled 901_1 transmits tx1ref1(t)×w1(i, 1) from antenna 306_1 in FIG. 3. Note that t represents time.

When base station #1 labeled 901_1 transmits "reference signal 1201_1 according to first parameter in transmission panel antenna i for frequency ♭p" illustrated in FIG. 12, base station #1 labeled 901_1 sets the multiplication coefficient in multiplier 304_2 in transmission panel antenna i labeled 106_*i* as w2(i, 1). When second transmission signal 303_2 of "reference signal 1201_1 according to first parameter in transmission panel antenna i for frequency ♭p" is tx2ref1(t), multiplier 304_2 obtains tx2ref1(t)×w2(i, 1). Then, base station #1 labeled 901_1 transmits tx2ref1(t)×w2(i, 1) from antenna 306_2 in FIG. 3.

When base station #1 labeled 901_1 transmits "reference signal 1201_1 according to first parameter in transmission panel antenna i for frequency ♭p" illustrated in FIG. 12, base station #1 labeled 901_1 sets the multiplication coefficient in multiplier 304_3 in transmission panel antenna i labeled

106_*i* as w3(i, 1). When third transmission signal 303_3 of "reference signal 1201_1 according to first parameter in transmission panel antenna i for frequency ♭p" is tx3ref1(t), multiplier 304_3 obtains tx3ref1(t)×w3(i, 1). Then, base station #1 labeled 901_1 transmits tx3ref1(t)×w3(i, 1) from antenna 306_3 in FIG. 3.

When base station #1 labeled 901_1 transmits "reference signal 1201_1 according to first parameter in transmission panel antenna i for frequency ♭p" illustrated in FIG. 12, base station #1 labeled 901_1 sets the multiplication coefficient in multiplier 304_4 in transmission panel antenna i labeled 106_*i* as w4(i, 1). When fourth transmission signal 303_4 of "reference signal 1201_1 according to first parameter in transmission panel antenna i for frequency ♭p" is tx4ref1(t), multiplier 304_4 obtains tx4ref1(t)×w4(i, 1). Then, base station #1 labeled 901_1 transmits tx4ref1(t)×w4(i, 1) from antenna 306_4 in FIG. 3.

A description will be given of "reference signal 1201_*j* according to j-th parameter in transmission panel antenna i for frequency ♭p".

When base station #1 labeled 901_1 transmits "reference signal 1201_*j* according to j-th parameter in transmission panel antenna i for frequency ♭p" illustrated in FIG. 12, base station #1 labeled 901_1 sets the multiplication coefficient in multiplier 3041 in transmission panel antenna i labeled 106_*i* as w1(i, j). When first transmission signal 303_1 of "reference signal 1201_*j* according to j-th parameter in transmission panel antenna i for frequency ♭p" is tx1refj(t), multiplier 304_1 obtains tx1refj(t)×w1(i, j). Then, base station #1 labeled 901_1 transmits tx1refj(t)×w1(i, j) from antenna 306_1 in FIG. 3. Note that t represents time.

When base station #1 labeled 901_1 transmits "reference signal 1201_*j* according to j-th parameter in transmission panel antenna i for frequency ♭p" illustrated in FIG. 12, base station #1 labeled 901_1 sets the multiplication coefficient in multiplier 304_2 in transmission panel antenna i labeled 106_*i* as w2(i, j). When second transmission signal 303_2 of "reference signal 1201_*j* according to j-th parameter in transmission panel antenna i for frequency ♭p" is tx2refj(t), multiplier 304_2 obtains tx2refj(t)×w2(i, j). Then, base station #1 labeled 901_1 transmits tx2refj(t)×w2(i, j) from antenna 306_2 in FIG. 3.

When base station #1 labeled 901_1 transmits "reference signal 1201_*j* according to j-th parameter in transmission panel antenna i for frequency ♭p" illustrated in FIG. 12, base station #1 labeled 901_1 sets the multiplication coefficient in multiplier 304_3 in transmission panel antenna i labeled 106_*i* as w3(i, j). When third transmission signal 303_3 of "reference signal 1201_*j* according to j-th parameter in transmission panel antenna i for frequency ♭p" is tx3refj(t), multiplier 304_3 obtains tx3refj(t)×w3(i, j). Then, base station #1 labeled 901_1 transmits tx3refj(t)×w3(i, j) from antenna 306_3 in FIG. 3.

When base station #1 labeled 901_1 transmits "reference signal 1201_*j* according to j-th parameter in transmission panel antenna i for frequency ♭p" illustrated in FIG. 12, base station #1 labeled 901_1 sets the multiplication coefficient in multiplier 304_4 in transmission panel antenna i labeled 106_*i* as w4(i, j). When fourth transmission signal 303_4 of "reference signal 1201_*j* according to j-th parameter in transmission panel antenna i for frequency ♭p" is tx4refj(t), multiplier 304_4 obtains tx4refj(t)×w4(i, j). Then, base station #1 labeled 901_1 transmits tx4refj(t)×w4(i, j) from antenna 306_4 in FIG. 3.

Note that j is an integer from 1 to 4 (both inclusive) in the case of FIG. 12. The number Z of parameter changes is four in FIG. 12, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 11 and 12, when base station #1 labeled 901_1 transmits "sector sweep reference signal 1101_*i* in transmission panel antenna i for frequency ♭p", "reference signal 1201_*j* according to j-th parameter in transmission panel antenna i for frequency ♭p" includes, for example, the following information:

- Identification number (ID) of the transmission panel antenna, which corresponds to i here, for example;
- Identification number (ID) of the parameter used for beamforming (directivity control), which corresponds to j here, for example; and
- The number of time divisions in which sector sweep reference signals can be transmitted when the terminals transmit the sector sweep reference signals, which will be described later.

Note that "reference signal 1201_*j* according to j-th parameter in transmission panel antenna i for frequency ♭p" may include other information. Examples of the information will be described in the other embodiments, for example, in Embodiment 6 or later.

The following information may also be included in "reference signal 1201_*j* according to j-th parameter in transmission panel antenna i for frequency ♭p";

- Information on the frequency band and/or frequency ♭*p* (information of the number of frequency divisions may also be included), which will be described later.

Transmission of the "identification number (ID) of the transmission panel antenna for frequency ♭p" and the "identification number (ID) of the parameter used for beamforming (directivity control)" by base station #1 labeled 901_1 allows the terminals to recognize the "identification number (ID) of the transmission panel antenna" and the "identification number (ID) of the parameter used for beamforming (directivity control)" that have allowed successful reception; accordingly, base station #1 labeled 901_1 and the terminals can perform appropriate control. This produces the effect of enhancing data reception quality.

Note that "the number of time divisions in which sector sweep reference signals can be transmitted when the terminals transmit the sector sweep reference signals" may be changeable according to the frame and/or time, for example. This produces the effect of enhancing data transmission efficiency of a communication system.

Further, transmission of the "information on the frequency band and/or frequency ♭p" by base station #1 labeled 901_1 allows the terminals to obtain the information and transmit "information relative to a frequency that the terminals desire the base station to use for transmission". This allows the base station to perform appropriate control and produces the effect of enhancing data reception quality.

Next, a description will be given of an operation in the time period from time t1 to t2 in FIG. 10, which is the terminal response period. Note that, in Embodiment 1, the description is based on a case where the terminals use OFDM and frequency (bands) used by the base station and frequency (bands) used by the terminals partially overlap each other.

Figure 13:
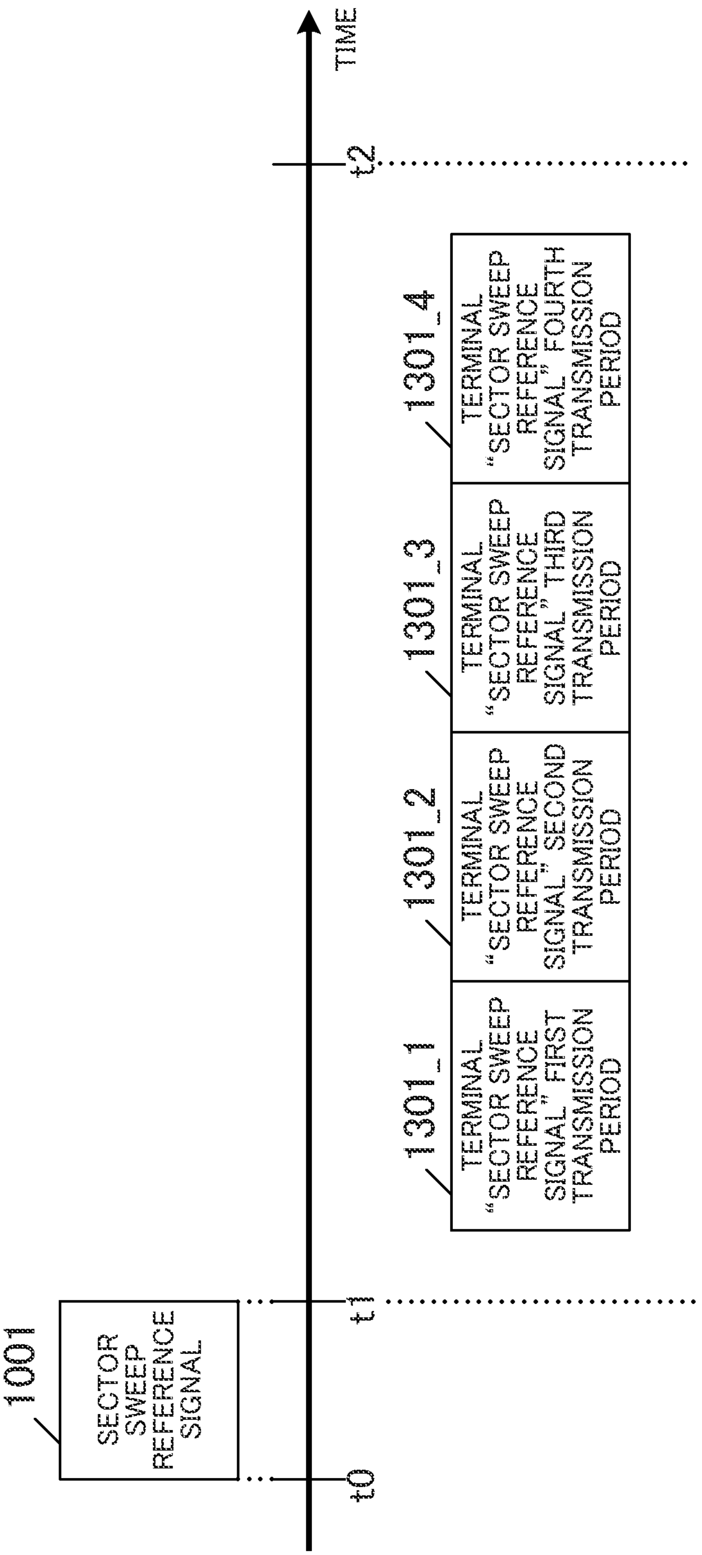
FIG. 13 illustrates an exemplary operation in the time period from time t1 to t2, which is a terminal response period.

FIG. 13 illustrates an exemplary operation in the time period from time t1 to t2, which is the terminal response period. Note that the horizontal axis represents time in FIG. 13. Terminals such as terminal #1 labeled 902_1, terminal #2 labeled 902_2, terminal #3 labeled 902_3, terminal #4 labeled 902_4, terminal #5 labeled 902_5, and terminal #6 labeled 902_6 in FIG. 9 transmit sector sweep reference signals in the time period from time t1 to t2, which is the terminal response period.

As illustrated in FIGS. 10 and 13, for example, base station #1 labeled 901_1 transmits sector sweep reference signals in the time period from time t0 to t1. After that, the terminal response period, which is the time period from time t1 to t2, includes terminal "sector sweep reference signal" first transmission period (i.e., first transmission period for terminals to transmit sector sweep reference signals) 1301_1, terminal "sector sweep reference signal" second transmission period 1301_2, terminal "sector sweep reference signal" third transmission period 1301_3, and terminal "sector sweep reference signal" fourth transmission period 1301_4, as illustrated in FIG. 13.

Thus, in the case of FIG. 13, "the number of time divisions in which sector sweep reference signals can be transmitted when the terminals transmit the sector sweep reference signals" is set to four by base station #1 labeled 901_1.

Figure 14:
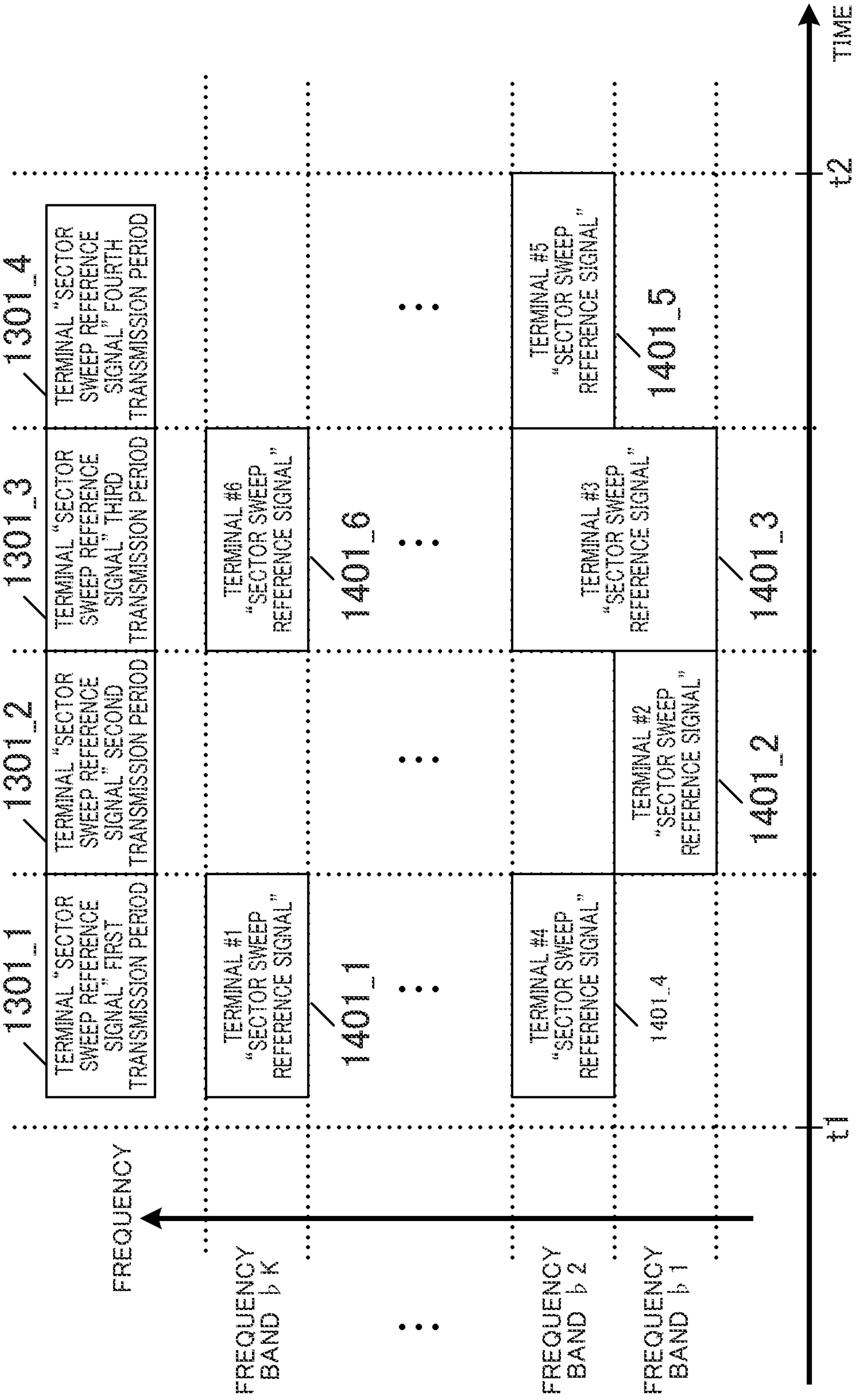
FIG. 14 illustrates exemplary occupation by terminals in terminal "sector sweep reference signal" transmission periods illustrated in FIG. 13.

FIG. 14 illustrates exemplary occupation by the terminals in terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4 illustrated in FIG. 13. Note that the horizontal axis represents time and the vertical axis represents frequency in FIG. 14.

Terminal #1 labeled 902_1 in FIG. 9 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency ♭p" included in sector sweep reference signal 1001 may be used for this estimation.

Terminal #1 labeled 902_1 estimates, for example, "transmission panel antenna a1 and parameter b1" as the "transmission panel antenna and parameter" with high reception quality. Terminal #1 labeled 902_1 also estimates frequency band ♭K as the "frequency domain" with high reception quality.

In addition, while estimating the "transmission panel antenna and parameter" with high reception quality, terminal #1 labeled 902_1 simultaneously obtains information of "the number of time divisions in which sector sweep reference signals can be transmitted when the terminals transmit the sector sweep reference signals". In the case of FIG. 14, terminal #1 labeled 902_1 obtains information indicating that "the number of time divisions in which sector sweep reference signals can be transmitted when the terminals transmit the sector sweep reference signals" is four.

In this case, terminal #1 labeled 902_1 obtains, for example, any one of the values "0", "1", "2", and "3" using a random number. For example, terminal #1 labeled 902_1 obtains "0" using a random number. In this case, since "0"+1=1, terminal #1 labeled 902_1 transmits terminal #1 "sector sweep reference signal" 1401_1 using "terminal "sector sweep reference signal" first (="0"+1) transmission period 1301_1" in FIG. 14. Here, the transmission period for the sector sweep reference signal is configured using a random number, but the transmission period for the sector sweep reference signal may be configured using, instead of a random number, a random number of an integer or a natural number, an irregular integer or natural number, a regular integer or natural number, an integer or a natural number held uniquely by the terminal, for example. Hence, the configuration of the transmission period for the sector sweep reference signal is not limited to the above example, and the transmission period for the sector sweep reference signal is configured for each terminal, for example. This is also applicable to the following similar descriptions.

Note that terminal #1 "sector sweep reference signal" 1401_1 includes information of the "transmission panel antenna and parameter" with high reception quality obtained by terminal #1 labeled 902_1, that is, information of "transmission panel antenna a1 and parameter b1". Terminal #1 "sector sweep reference signal" 1401_1 may also include information of the "frequency domain", for example, information of "frequency band ♭K". This will be described later.

Likewise, terminal #2 labeled 902_2 in FIG. 9 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency ♭p" included in sector sweep reference signal 1001 may be used for this estimation.

Terminal #2 labeled 902_2 estimates, for example, "transmission panel antenna a2 and parameter b2" as the "transmission panel antenna and parameter" with high reception quality. Terminal #2 labeled 902_2 also estimates frequency band ♭1 as the "frequency domain" with high reception quality.

In addition, while estimating the "transmission panel antenna and parameter" with high reception quality, terminal #2 labeled 902_2 simultaneously obtains information of "the number of time divisions in which sector sweep reference signals can be transmitted when the terminals transmit the sector sweep reference signals". In the case of FIG. 14, terminal #2 labeled 902_2 obtains information indicating that "the number of time divisions in which sector sweep reference signals can be transmitted when the terminals transmit the sector sweep reference signals" is four.

In this case, terminal #2 labeled 902_2 obtains, for example, any one of the values "0", "1", "2", and "3" using a random number. For example, terminal #2 labeled 902_2 obtains "1" using a random number. In this case, since "1"+1=2, terminal #2 labeled 902_2 transmits terminal #2 "sector sweep reference signal" 1401_2 using "terminal "sector sweep reference signal" second (="1"+1) transmission period 1301_2" in FIG. 14.

Note that terminal #2 "sector sweep reference signal 1401_2" includes information of the "transmission panel antenna and parameter" with high reception quality obtained by terminal #2 labeled 902_2, that is, information of "transmission panel antenna a2 and parameter b2". Terminal #2 "sector sweep reference signal" 1401_2 may also include information of the "frequency domain", for example, information of "frequency band ♭1". This will be described later.

Thus, terminal #i labeled 902_*i* receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. Note that i is an integer equal to or greater than 1, for example. In addition, the "information on the frequency band and/or frequency ♭p" included in sector sweep reference signal 1001 may be used for this estimation.

Terminal #i labeled 902_*i* estimates, for example, "transmission panel antenna ai and parameter b1" as the "transmission panel antenna and parameter" with high reception quality. Terminal #i labeled 902_*i* also estimates frequency band ♭zi as the "frequency domain" with high reception quality.

In addition, while estimating the "transmission panel antenna and parameter" with high reception quality, terminal #i labeled 902_*i* simultaneously obtains information of "the number of time divisions in which sector sweep reference signals can be transmitted when the terminals transmit the sector sweep reference signals". In the case of FIG. 14, terminal #i labeled 902_*i* obtains information indicating that "the number of time divisions in which sector sweep reference signals can be transmitted when the terminals transmit the sector sweep reference signals" is four.

In this case, terminal #i labeled 902_*i* obtains, for example, any one of the values "0", "1", "2", and "3" using a random number. For example, terminal #i labeled 902_*i* obtains "yi" using a random number. Note that yi is any one of the values "0", "1", "2", and "3". In this case, terminal #i labeled 902_*i* transmits terminal #i "sector sweep reference signal" 1401_*i* using terminal "sector sweep reference signal" ("yi"+1)-th transmission period 1301_("yi"+1) in FIG. 14.

Note that terminal #i "sector sweep reference signal" 1401_*i* includes information of the "transmission panel antenna and parameter" with high reception quality obtained by terminal #i labeled 902_*i*, that is, information of "transmission panel antenna ai and parameter b1". Terminal #i "sector sweep reference signal" 1401_*i* may also include information of the "frequency domain", for example, information of "frequency band ♭p". This will be described later.

Note that terminal #i "sector sweep reference signal" 1401_*i* may be assigned to a plurality of frequency bands as illustrated in FIG. 14. For example, terminal #3 "sector sweep reference signal" 1401_3 is assigned to frequency band ♭1 and frequency band ♭2. As another example, terminal #i "sector sweep reference signal" 1401_*i* may be assigned to frequency bands discretely. For example, terminal #i "sector sweep reference signal" 1401_*i* may be assigned to frequency band ♭1 and frequency band ♭K. (As a result, terminal #i "sector sweep reference signal" 1401_*i* is assigned to one or more frequency bands.)

In the manner described above, a collision of the sector sweep reference signals transmitted by the respective terminals can be reduced. This produces the effect that the base station can receive more sector sweep reference signals and can communicate with more terminals.

A description will be given of a configuration of terminal #i "sector sweep reference signal" 1401_*i* transmitted by terminal #i labeled 902_*i* described with reference to FIG. 14. To simplify the description, terminal #i labeled 902_*i* has the configuration in FIG. 1A, 1B, or 1C, and terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

Figure 15A:
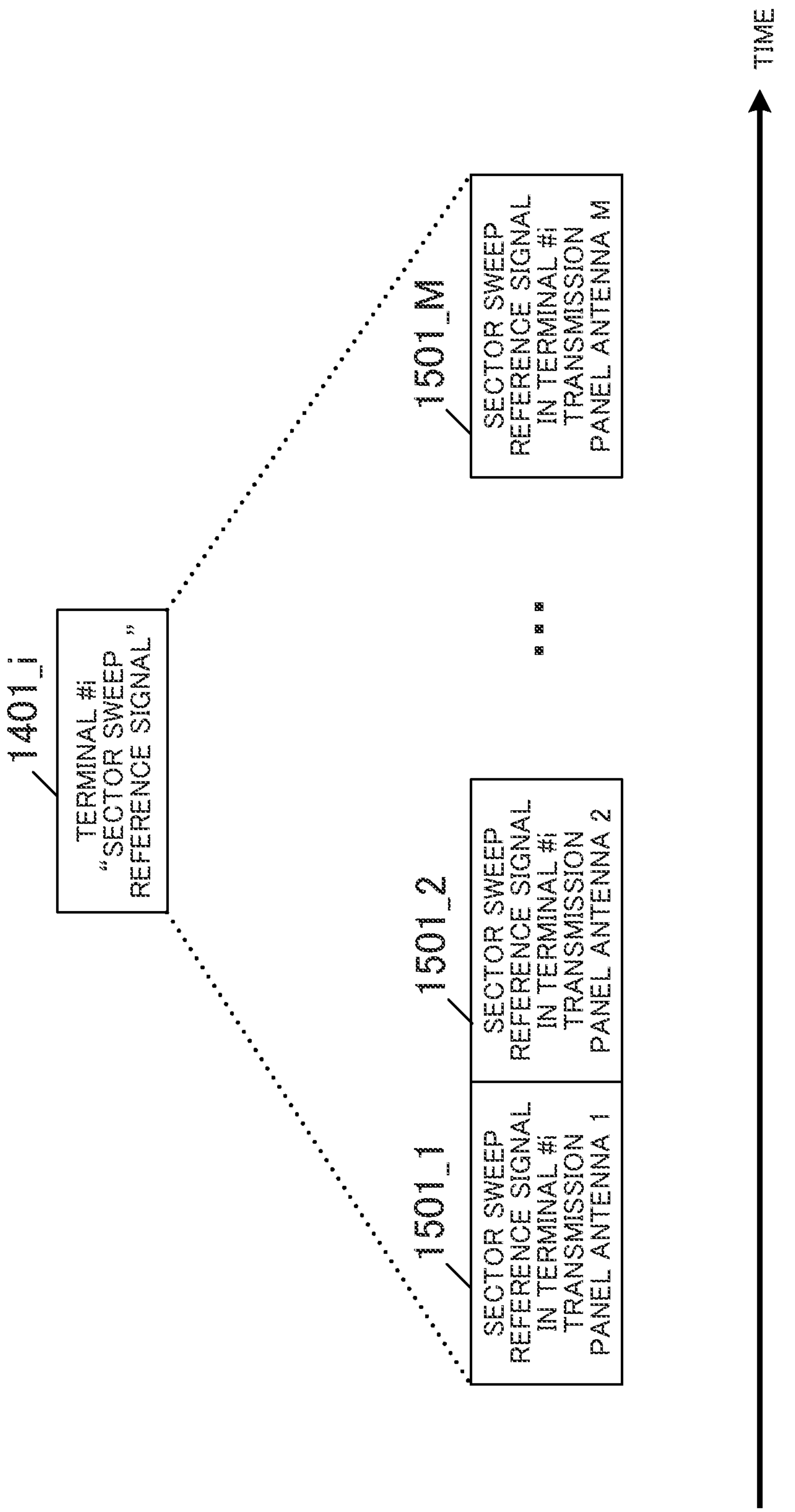
FIG. 15A illustrates an exemplary configuration of a terminal #i "sector sweep reference signal"

Terminal #i labeled 902_*i* transmits terminal #i "sector sweep reference signal" 1401_*i* as illustrated in FIG. 14. FIG. 15A illustrates an exemplary configuration of terminal #i "sector sweep reference signal" 1401_*i*. Note that the horizontal axis represents time in FIG. 15A.

As illustrated in FIG. 15A, terminal #i "sector sweep reference signal" 1401_*i* of terminal #i labeled 902_*i* is composed of "sector sweep reference signal 1501_1 in terminal #i transmission panel antenna 1, sector sweep reference signal 1501_2 in terminal #i transmission panel antenna 2, . . . , sector sweep reference signal 1501_M in terminal #i transmission panel antenna M".

For example, terminal #i labeled 902_*i* with the configuration in FIG. 1A, 1B, or 1C transmits "sector sweep reference signal 1501_1 in terminal #i transmission panel antenna 1" using transmission panel antenna 1 labeled 106_1.

That is, terminal #i labeled 902_*i* with the configuration in FIG. 1A, 1B, or 1C transmits "sector sweep reference signal 1501_*k* in terminal #i transmission panel antenna k" using transmission panel antenna k labeled 106_*k*. Note that k is an integer from 1 to M (both inclusive).

Note that the number of transmission panel antennas included in terminal #i labeled 902_*i* is M in FIG. 15A, but the number of transmission panel antennas is not limited to this and may be N, where N is an integer equal to or greater than 1.

Figure 15B:
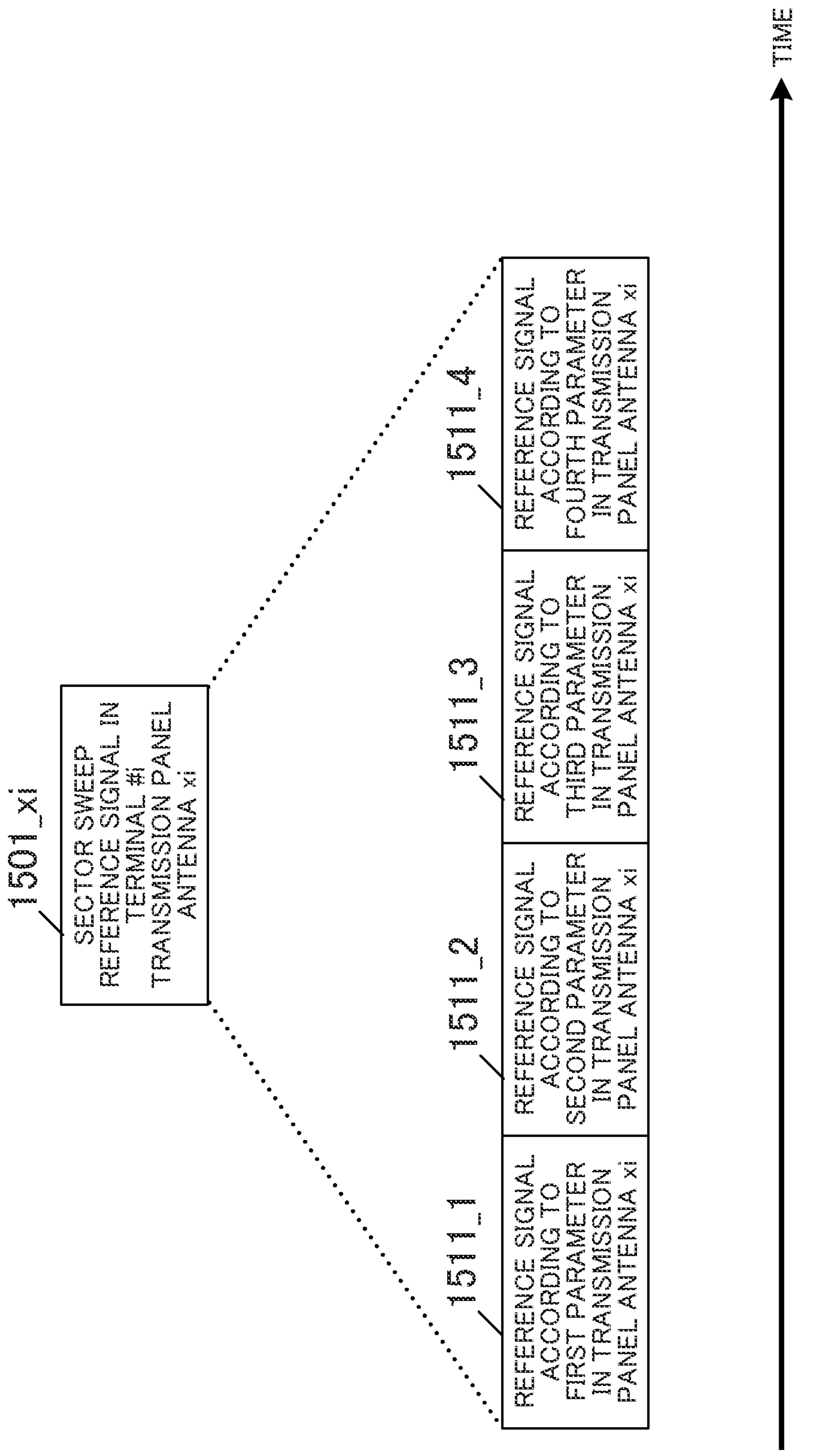
FIG. 15B illustrates an exemplary configuration of a "sector sweep reference signal in terminal #i transmission panel antenna xi" in FIG. 15A.

FIG. 15B illustrates an exemplary configuration of "sector sweep reference signal 1501_*xi* in terminal #i transmission panel antenna xi" in FIG. 15A. Note that the horizontal axis represents time in FIG. 15.

As illustrated in FIG. 15B, "sector sweep reference signal 1501_*xi* in terminal #i transmission panel antenna xi" is composed of, for example, "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi".

For example, terminal #i labeled 902_*i* with the configuration in FIG. 1A, 1B, or 1C includes the configuration in FIG. 3 as transmission panel antenna xi labeled 106_*xi*.

A description will be given of "reference signal 1511_1 according to first parameter in transmission panel antenna xi".

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, 1). When first transmission signal 303_1 of "reference signal 1511_1 according to first parameter in transmission panel antenna xi" is tx1ref1(t), multiplier 304_1 obtains tx1ref1(t)×w1(xi, 1). Then, terminal #i labeled 902_*i* transmits tx1ref1(t)×w1(xi, 1) from antenna 306_1 in FIG. 3. Note that t represents time.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, 1). When second transmission signal 303_2 of "reference signal 1511_1 according to first parameter in transmission panel antenna xi" is tx2ref1(t), multiplier 304_2 obtains tx2ref1(t)×w2(xi, 1). Then, terminal #i labeled 902_*i* transmits tx2ref1(t)×w2(xi, 1) from antenna 306_2 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, 1). When third transmission signal 303_3 of "reference signal 1511_1 according to first parameter in transmission panel antenna xi" is tx3ref1(t), multiplier 304_3 obtains tx3ref1(t)×w3(xi, 1). Then, terminal #i labeled 902_*i* transmits tx3ref1(t)×w3(xi, 1) from antenna 306_3 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, 1). When fourth transmission signal 303_4 of "reference signal 1511_1 according to first parameter in transmission panel antenna xi" is tx4ref1(t), multiplier 304_4 obtains tx4ref1(t)×w4(xi, 1). Then, terminal #i labeled 902_*i* transmits tx4ref1(t)×w4(xi, 1) from antenna 306_4 in FIG. 3.

A description will be given of "reference signal 1511_*j* according to j-th parameter in transmission panel antenna xi".

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, j). When first transmission signal 303_1 of "reference signal 151_*j* according to j-th parameter in transmission panel antenna xi" is tx1refj(t), multiplier 304_1 obtains tx1refj(t)×w1(xi, j). Then, terminal #i labeled 902_*i* transmits tx1refj(t)×w1(xi, j) from antenna 306_1 in FIG. 3. Note that t represents time.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, j). When second transmission signal 303_2 of "reference signal 1511_*j* according to j-th parameter in transmission panel antenna xi" is tx2refj(t), multiplier 304_2 obtains tx2refj(t)×w2(xi, j). Then, terminal #i labeled 902_*i* transmits tx2refj(t)×w2(xi, j) from antenna 306_2 in FIG. 3.

When terminal #i labeled 902_*i* transmits "reference signal 1511_*j* according to j-th parameter in transmission panel antenna xi" illustrated in FIG. 15B, terminal #i labeled 902_1 sets the multiplication coefficient in multiplier 304_3 in transmission panel antenna xi labeled 106_*xi* as w3(xi, j). When third transmission signal 303_3 of "reference signal 1511_*j* according to j-th parameter in transmission panel antenna xi" is tx3refj(t), multiplier 304_3 obtains tx3refj(t)×w3(xi, j). Then, terminal #i labeled 902_*i* transmits tx3refj(t)×w3(xi, j) from antenna 306_3 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, j). When fourth transmission signal 303_4 of "reference signal 1511_*j* according to j-th parameter in transmission panel antenna xi" is tx4refj(t), multiplier 304_4 obtains tx4refj(t)×w4(xi, j). Then, terminal #i labeled 902_*i* transmits tx4refj(t)×w4(xi, j) from antenna 306_4 in FIG. 3.

Note that j is an integer from 1 to 4 (both inclusive) in the case of FIG. 15B. The number Z of parameter changes is four in FIG. 15B, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 14, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

Information of the "transmission panel antenna and parameter" of base station #1 labeled 901_1 with high reception quality, as described above.

Thus, terminal #i labeled 902_*i* transmits the "information of the "transmission panel antenna and parameter" of base station #1 labeled 901_1 with high reception quality" in "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A.

Note that "reference signal 1511_*j* according to j-th parameter in transmission panel antenna xi" may include other information.

In addition, terminal #i labeled 902_*i* transmits the "information of the "transmission panel antenna and parameter" of base station #1 labeled 901_1 with high reception quality" in "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi" in FIG. 15B in "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A".

In this case, base station #1 labeled 901_1 is more likely to receive, even with an omnidirectional antenna for example, any of "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A" transmitted by terminal #i labeled 902_1. This is because terminal #i labeled 902_*i* performs transmit beamforming (directivity control). This produces the effect that base station #1 labeled 901_1 is more likely to receive the "information of the "transmission panel antenna and parameter" of base station #1 labeled 901_1 with high reception quality" transmitted by terminal #i labeled 902_*i*. Accordingly, base station #1 labeled 901_1 can transmit a modulation signal to terminal #i labeled 902_*i* based on the "information of the "transmission panel antenna and parameter" of base station #1 labeled 901_1 with high reception quality", and terminal #i labeled 902_*i* can receive the modulation signal with high reception quality.

In a case where a plurality of terminals transmit the sector sweep reference signals as in FIG. 14, base station #1 labeled 901_1 can obtain the "information of the "transmission panel antenna and parameter" of base station #1 labeled 901_1 with high reception quality" from the plurality of terminals. This produces the effect that base station #1 labeled 901_1 can transmit modulation signals to the plurality of terminals based on the "information of the "transmission panel antenna and parameter" of base station #1 labeled 901_1 with high reception quality" from the plurality of terminals, and that the plurality of terminals can receive the modulation signals with high reception quality.

As illustrated in FIGS. 14, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information.

Identification number (ID) of the transmission panel antenna, which corresponds to xi here, for example; and Identification number (ID) of the parameter used for beamforming (directivity control), which corresponds to j here, for example.

Transmission of the "identification number (ID) of the transmission panel antenna" and the "identification number (ID) of the parameter used for beamforming (directivity control)" by terminal #i labeled 902_*i* allows base station #1 labeled 901_1 to recognize the "identification number (ID) of the transmission panel antenna" and the "identification number (ID) of the parameter used for beamforming (directivity control)" that have allowed successful reception; accordingly, terminal #i labeled 902_*i* and base station #1 labeled 901_1 can perform appropriate control. This produces the effect of enhancing data reception quality.

Note that "reference signal 1511_*j* according to j-th parameter in transmission panel antenna xi" may include other information. Examples of the information will be described in the other embodiments, for example, in Embodiment 6 or later.

Further, as illustrated in FIGS. 14, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

"Information on the frequency band and/or frequency ♭p" that has been used for transmission by terminal #i labeled 902_*i* or that terminal #i labeled 902_*i* desires base station #1 labeled 901_1 to use.

Transmission of the "information on the frequency band and/or frequency ♭p" by terminal #i labeled 902_*i* allows base station #1 labeled 901_1 to recognize the "information on the frequency band and/or frequency ♭p"; accordingly, terminal #i labeled 902_*i* and base station #1 labeled 901_1 can perform appropriate control. This produces the effect of enhancing data reception quality.

In a case where base station #1 labeled 901_1 and terminal #i labeled 902_*i* perform communication using the same frequency band, however, they can recognize the "information on the frequency band and/or frequency ♭p" by detecting modulation signals transmitted from each other without the transmission of the "information on the frequency band and/or frequency ♭p".

Figure 16A:
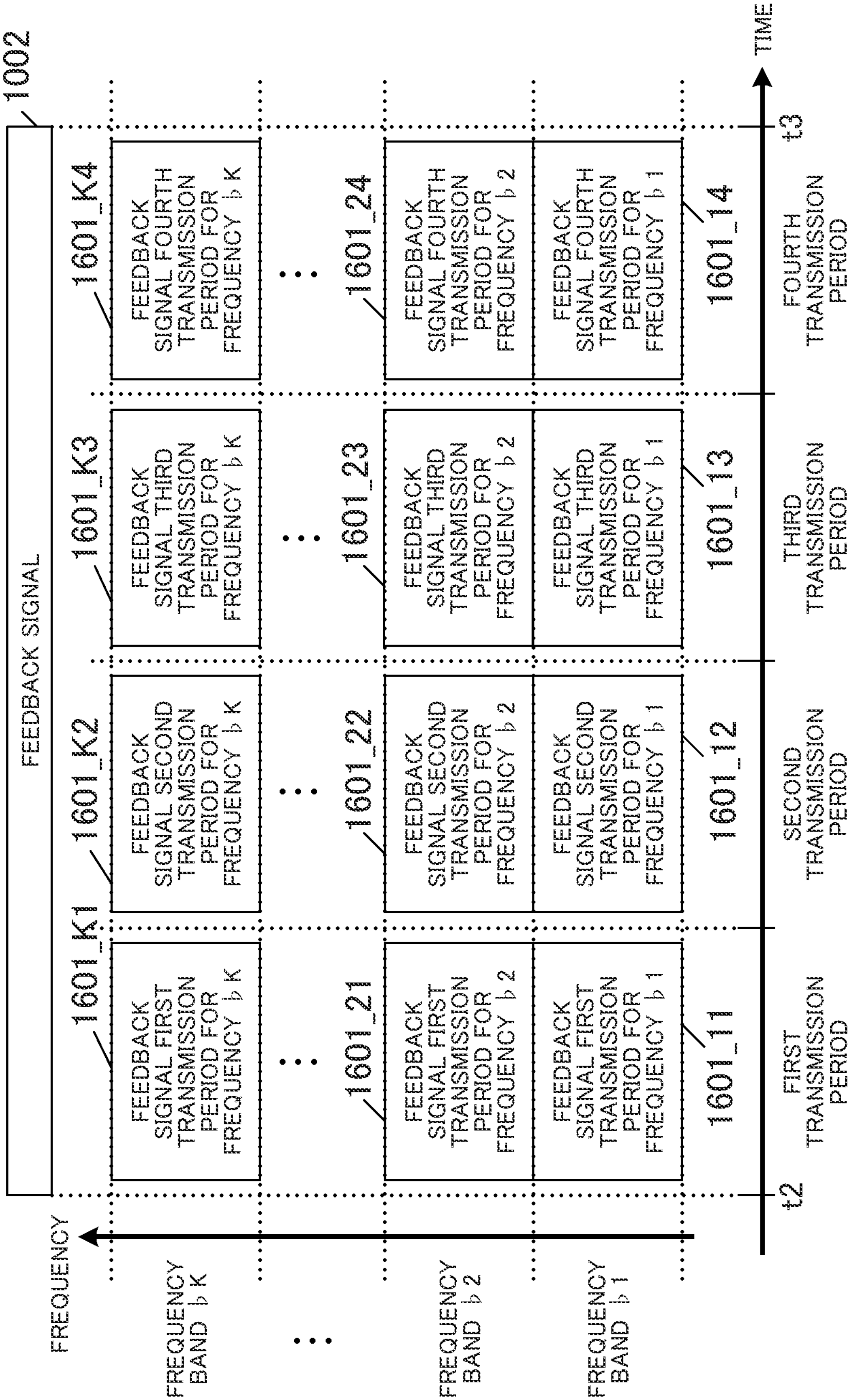
FIG. 16A illustrates an exemplary configuration of a feedback signal that is present in the time period from t2 to t3 in FIG. 10 and transmitted by base station #1.

FIG. 16A illustrates an exemplary configuration of feedback signal 1002 that is present in the time period from t2 to t3 in FIG. 10 and transmitted by base station #1 labeled 901_1. Note that the horizontal axis represents time and the vertical axis represents frequency in FIG. 16A. In this example, since "the number of time divisions in which sector sweep reference signals can be transmitted when the terminals transmit the sector sweep reference signals" is four, there are a first transmission period, a second transmission period, a third transmission period, and a fourth transmission period for feedback signal 1002 as illustrated in FIG. 16A. Note that, in a case where "the number of time divisions in which sector sweep reference signals can be transmitted when the terminals transmit the sector sweep reference signals" is Ω, for example, 1 transmission periods may be configured to be present for feedback signal 1002, where Ω is an integer equal to or greater than 1 or an integer equal to or greater than 2.

In addition, there are frequency band ♭1, frequency band ♭2, . . . , frequency band ♭K for feedback signal 1002 in FIG. 16A.

Thus, the first transmission period includes feedback signal first transmission period 1601_11 for frequency ♭1, feedback signal first transmission period 1601_21 for frequency ♭2, . . . , feedback signal first transmission period 1601_K1 for frequency ♭K. Likewise, the second transmission period includes feedback signal second transmission period 1601_12 for frequency ♭1, feedback signal second transmission period 1601_22 for frequency ♭2, . . . , feedback signal second transmission period 1601_K2 for frequency ♭K. The third transmission period includes feedback signal third transmission period 1601_13 for frequency ♭1, feedback signal third transmission period 1601_23 for frequency ♭2, . . . , feedback signal third transmission period 1601_K3 for frequency ♭K. The fourth transmission period includes feedback signal fourth transmission period 1601_14 for frequency ♭1, feedback signal fourth transmission period 1601_24 for frequency ♭2, . . . , feedback signal fourth transmission period 1601_K4 for frequency ♭K.

One feature is that "feedback signals are transmitted from the same transmission panel antenna in the i-th time period regardless of the frequency band in FIG. 16A".

Figure 16B:
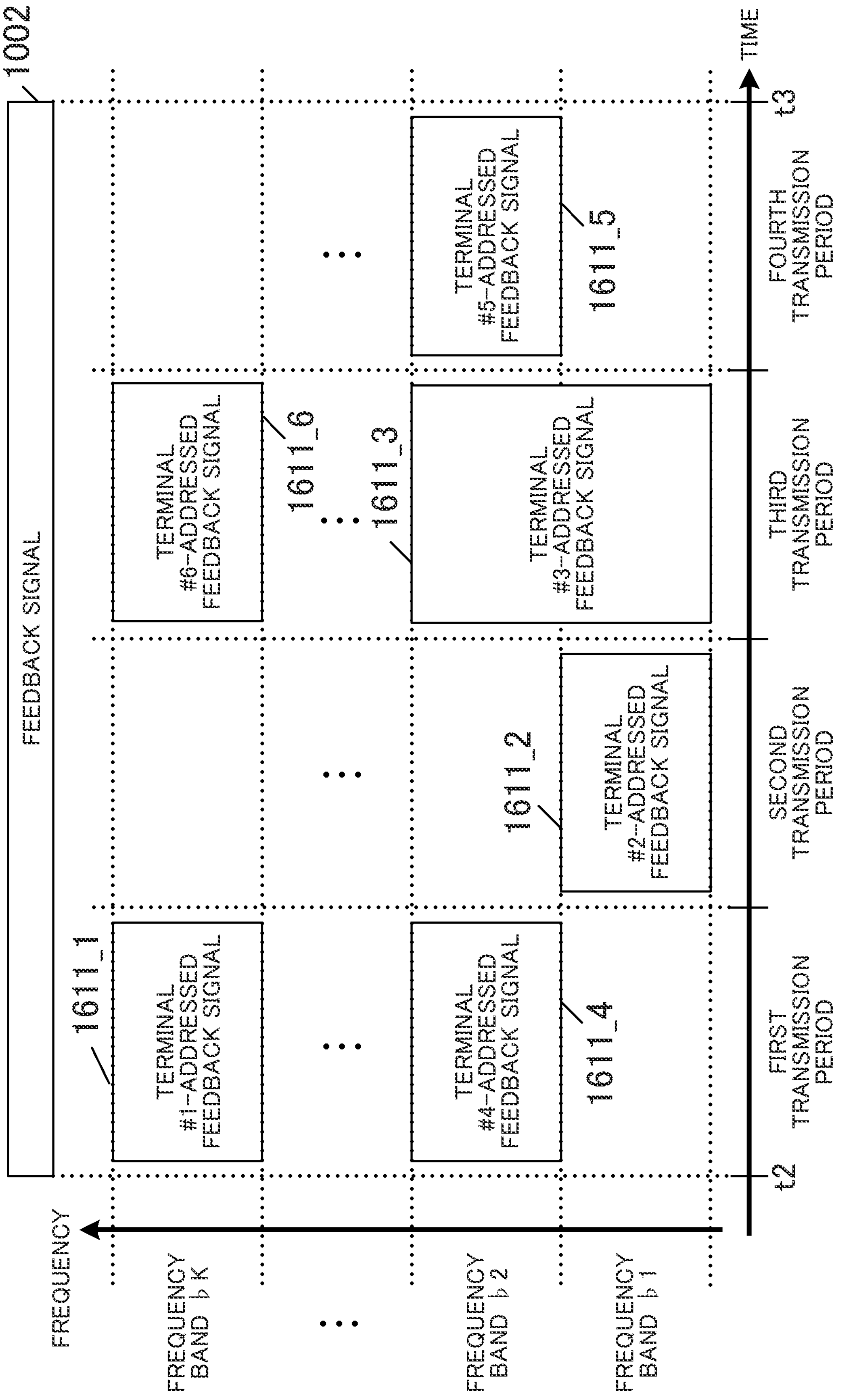
FIG. 16B illustrates exemplary specific feedback signal assignment for the feedback signal illustrated in FIG. 16A.

FIG. 16B illustrates exemplary specific feedback signal assignment for feedback signal 1002 illustrated in FIG. 16A.

As in FIG. 14, for example, terminal #1 labeled 902_1 transmits terminal #1 "sector sweep reference signal" 1401_1, terminal #2 labeled 902_2 transmits terminal #2 "sector sweep reference signal" 1401_2, terminal #3 labeled 902_3 transmits terminal #3 "sector sweep reference signal" 1401_3, terminal #4 labeled 902_4 transmits terminal #4 "sector sweep reference signal" 1401_4, terminal #5 labeled 902_5 transmits terminal #5 "sector sweep reference signal" 1401_5, and terminal #6 labeled 902_6 transmits terminal #6 "sector sweep reference signal" 1401_6.

Since terminal #1 "sector sweep reference signal" 1401_1 is present in frequency band ♭K as in FIG. 14, terminal #1-addressed feedback signal (i.e., feedback signal addressed to terminal #1) 1611_1 is present in frequency band ♭K in FIG. 16B.

Since terminal #2 "sector sweep reference signal" 1401_2 is present in frequency band ♭1 as in FIG. 14, terminal #2-addressed feedback signal 1611_2 is present in frequency band ♭1 in FIG. 16B.

Since terminal #3 "sector sweep reference signal" 1401_3 is present in frequency bands ♭1 and ♭2 as in FIG. 14, terminal #3-addressed feedback signal 1611_3 is present in frequency bands ♭1 and ♭2 in FIG. 16B.

Since terminal #4 "sector sweep reference signal" 1401_4 is present in frequency band ♭2 as in FIG. 14, terminal #4-addressed feedback signal 1611_4 is present in frequency band ♭2 in FIG. 16B.

Since terminal #5 "sector sweep reference signal" 1401_5 is present in frequency band ♭2 as in FIG. 14, terminal #5-addressed feedback signal 1611_5 is present in frequency band ♭2 in FIG. 16B.

Since terminal #6 "sector sweep reference signal" 1401_6 is present in frequency band ♭K as in FIG. 14, terminal #6-addressed feedback signal 1611_6 is present in frequency band ♭K in FIG. 16B.

In this manner, obtaining terminal #i-addressed feedback signal 1611_*i* allows terminal #i labeled 902_*i* to know that communication with base station #1 labeled 901_1 is available and to know the frequency band to be used. Note that FIG. 16B is merely an example. In a case where there is no terminal #1-addressed feedback signal 1611_1 as feedback signal 1002, for example, terminal #1 labeled 902_1 recognizes that the communication with base station #1 labeled 901_1 has not been established.

At this time, terminal #i-addressed feedback signal 1611_*i* includes, for example, information indicating that communication with terminal #i labeled 902_*i* is available (or indicating that data-symbol-included frame 1003 in FIG. 10 includes a symbol addressed to terminal #i labeled 902_*i*).

Further, base station #1 labeled 901_1 selects a frequency (band) and a transmission panel antenna and sets a parameter of beamforming based on the "frequency (band) information" and information of the "transmission panel antenna and parameter" of base station #1 labeled 901_1 with high reception quality" transmitted by terminal #i labeled 902_*i*, and base station #1 labeled 901_1 then transmits terminal #i-addressed feedback signal 1611_*i*.

Figure 17A:
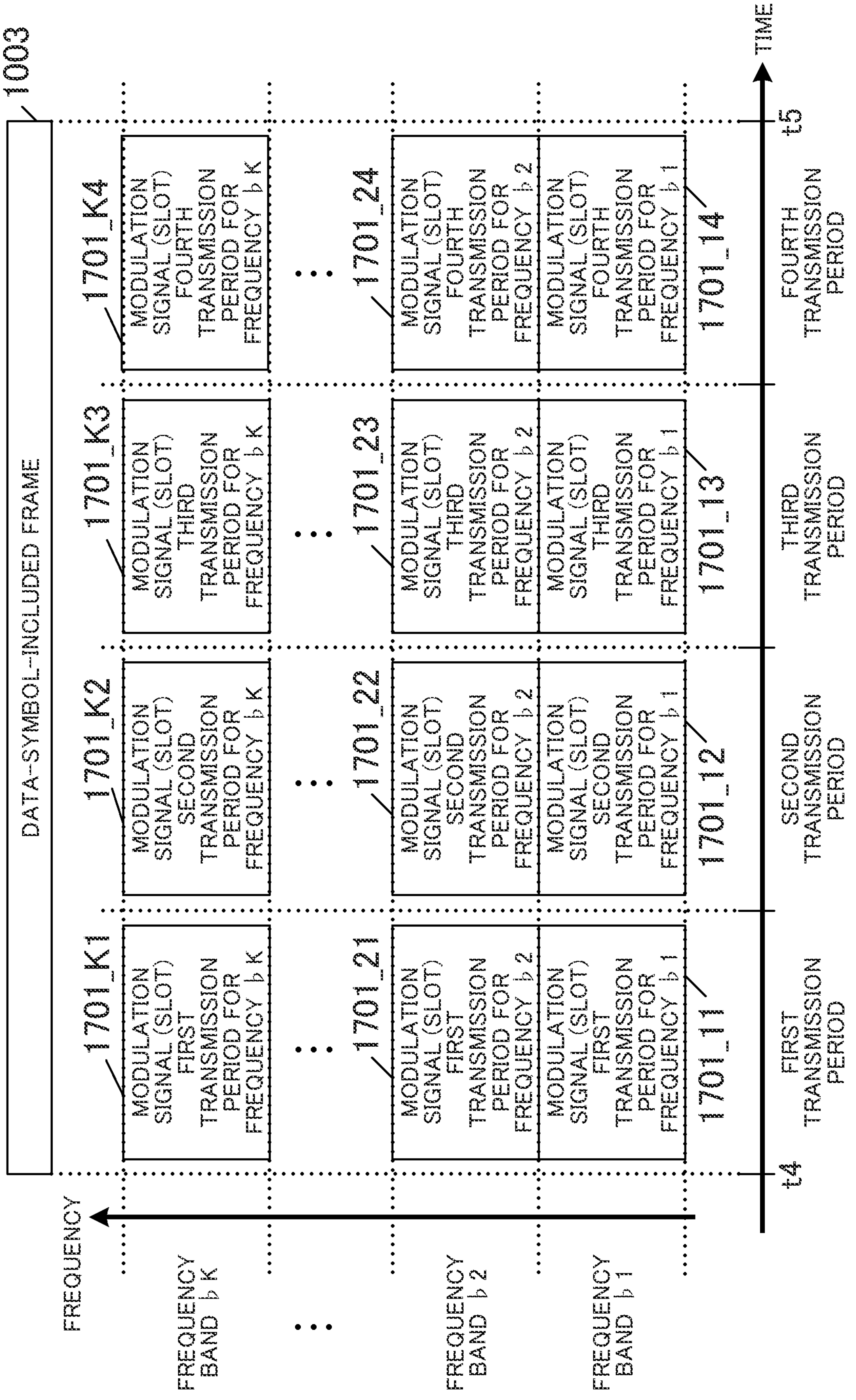
FIG. 17A illustrates an exemplary configuration of a data-symbol-included frame that is present in the time period from t4 to t5 in FIG. 10 and transmitted by base station #1.

FIG. 17A illustrates an exemplary configuration of data-symbol-included frame 1003 that is present in the time period from t4 to t5 in FIG. 10 and transmitted by base station #1 labeled 901_1. Note that the horizontal axis represents time and the vertical axis represents frequency in FIG. 17A. In this example, since "the number of time divisions in which sector sweep reference signals can be transmitted when the terminals transmit the sector sweep reference signals" is four, there are a first transmission period, a second transmission period, a third transmission period, and a fourth transmission period for data-symbol-included frame 1003 as illustrated in FIG. 17A. Note that, in a case where "the number of time divisions in which sector sweep reference signals can be transmitted when the terminals transmit the sector sweep reference signals" is Ω for example, Ω transmission periods may be configured to be present for data-symbol-included frame 1003, where 1 is an integer equal to or greater than 1 or an integer equal to or greater than 2.

In addition, there are frequency band ♭1, frequency band ♭2, . . . , frequency band ♭K for data-symbol-included frame 1003 in FIG. 17A.

Thus, the first transmission period includes modulation signal (slot) first transmission period 1701_11 for frequency ♭1, modulation signal (slot) first transmission period 1701_21 for frequency ♭2, . . . , modulation signal (slot) first transmission period 1701_K1 for frequency ♭K. Likewise, the second transmission period includes modulation signal (slot) second transmission period 1701_12 for frequency ♭1, modulation signal (slot) second transmission period 1701_22 for frequency ♭2, . . . , modulation signal (slot) second transmission period 1701_K2 for frequency ♭K. The third transmission period includes modulation signal (slot) third transmission period 1701_13 for frequency ♭1, modulation signal (slot) third transmission period 1701_23 for frequency ♭2, . . . , modulation signal (slot) third transmission period 1701_K3 for frequency ♭K. The fourth transmission period includes modulation signal (slot) fourth transmission period 1701_14 for frequency ♭1, modulation signal (slot) fourth transmission period 1701_24 for frequency ♭2, . . . , modulation signal (slot) fourth transmission period 1701_K4 for frequency ♭K.

Figure 17B:
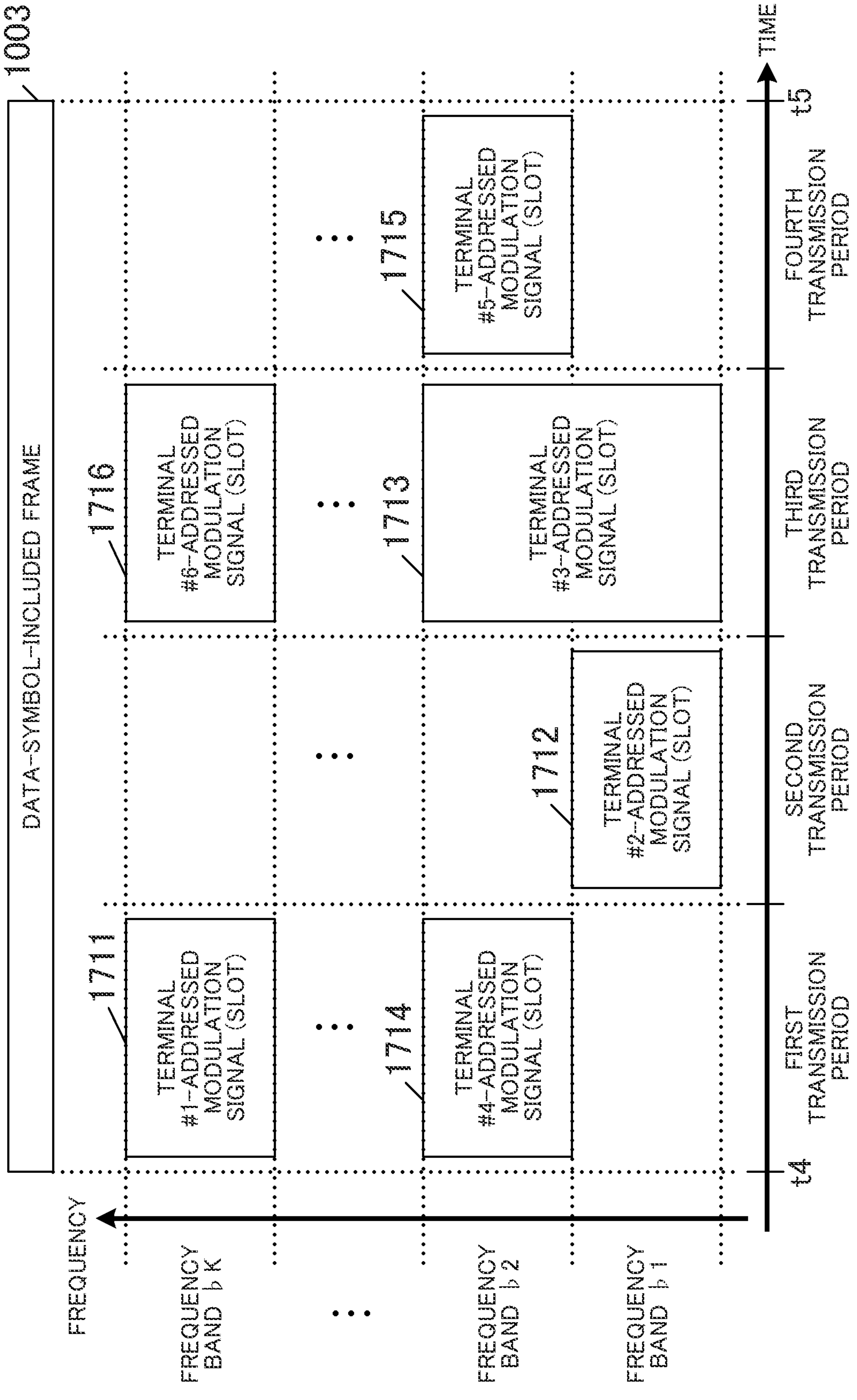
FIG. 17B illustrates exemplary specific modulation signal (slot) assignment for the data-symbol-included frame illustrated in FIG. 17A.

FIG. 17B illustrates exemplary specific modulation signal (slot) assignment for data-symbol-included frame 1003 illustrated in FIG. 17A.

As in FIG. 14, for example, terminal #1 labeled 902_1 transmits terminal #1 "sector sweep reference signal" 1401_1, terminal #2 labeled 902_2 transmits terminal #2 "sector sweep reference signal" 1401_2, terminal #3 labeled 902_3 transmits terminal #3 "sector sweep reference signal" 1401_3, terminal #4 labeled 902_4 transmits terminal #4 "sector sweep reference signal" 1401_4, terminal #5 labeled 902_5 transmits terminal #5 "sector sweep reference signal" 1401_5, and terminal #6 labeled 902_6 transmits terminal #6 "sector sweep reference signal" 1401_6.

Since terminal #1 "sector sweep reference signal" 1401_1 is present in frequency band ♭K as in FIG. 14, terminal #1-addressed modulation signal (slot) (i.e., modulation signal (slot) addressed to terminal #1) 1711 is present in frequency band ♭K in FIG. 17B.

Since terminal #2 "sector sweep reference signal" 1401_2 is present in frequency band ♭1 as in FIG. 14, terminal #2-addressed modulation signal (slot) 1712 is present in frequency band ♭1 in FIG. 17B.

Since terminal #3 "sector sweep reference signal" 1401_3 is present in frequency bands ♭1 and ♭2 as in FIG. 14, terminal #3-addressed modulation signal (slot) 1713 is present in frequency bands ♭1 and ♭2 in FIG. 17B.

Since terminal #4 "sector sweep reference signal" 1401_4 is present in frequency band ♭2 as in FIG. 14, terminal #4-addressed modulation signal (slot) 1714 is present in frequency band ♭2 in FIG. 17B.

Since terminal #5 "sector sweep reference signal" 1401_5 is present in frequency band ♭2 as in FIG. 14, terminal #5-addressed modulation signal (slot) 1715 is present in frequency band ♭2 in FIG. 17B.

Since terminal #6 "sector sweep reference signal" 14016 is present in frequency band ♭K as in FIG. 14, terminal #6-addressed modulation signal (slot) 1716 is present in frequency band ♭K in FIG. 17B.

At this time, terminal #i-addressed modulation signal (slot) 171_*i* includes, for example, a data symbol (data and/or information) addressed to terminal #i labeled 902_*i*.

In this manner, terminal #i-addressed modulation signal (slot) 171_*i* allows terminal #i labeled 902_*i* to know that communication with base station #1 labeled 901_1 is available and to know the frequency band to be used. Note that FIG. 17B is merely an example. In a case where there is no terminal #1-addressed modulation signal (slot) 1711 as data-symbol-included frame 1003, for example, terminal #1 labeled 902_1 recognizes that the communication with base station #1 labeled 901_1 has not been established.

Further, base station #1 labeled 901_1 selects a frequency (band) and a transmission panel antenna and sets a parameter of beamforming based on the "frequency (band) information" and information of the "transmission panel antenna and parameter" of base station #1 labeled 9011 with high reception quality" transmitted by terminal #i labeled 902_*i*, and base station #1 labeled 901_1 then transmits terminal #i-addressed modulation signal (slot) 171*i*.

Note that, in FIGS. 16A and 16B, base station #1 labeled 901_1 may estimate the "frequency (band)" and the "transmission panel antenna and parameter" of terminal #i labeled 902_1 with high reception quality in receiving "terminal #i "sector sweep reference signal" 1401_*i* transmitted by terminal #i labeled 902_*i*", and the estimated information may be included in terminal #i-addressed feedback signal 1611_*i*.

Terminal #i labeled 902_*i* selects a frequency (band) and a transmission panel antenna and determines a beamforming method based on the information of "frequency (band)" and "transmission panel antenna and parameter" of terminal #i labeled 902_*i* with high reception quality obtained from base station #1 labeled 901_1, and terminal #i labeled 902_*i* then transmits a symbol, a frame, and/or a modulation signal to base station #1 labeled 901_1. This produces the effect of enhancing data reception quality in base station #1 labeled 901_1.

Incidentally, in the time period from t3 to t4 in FIG. 10, terminal #i labeled 902_*i* may transmit, to base station #1 labeled 901_1, a modulation signal including information indicating successful reception of a signal from base station #1 labeled 901_1, such as acknowledgement (ACK).

Note that, terminal #i-addressed modulation signal (slot) 171_*i* in FIG. 17B may include, in addition to the data symbol, a "reference signal such as a demodulation reference signal (DMRS), phase tracking reference signal (PTRS), or sounding reference signal (SRS)", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of the modulation and coding scheme (MCS), and the like.

Figure 18:
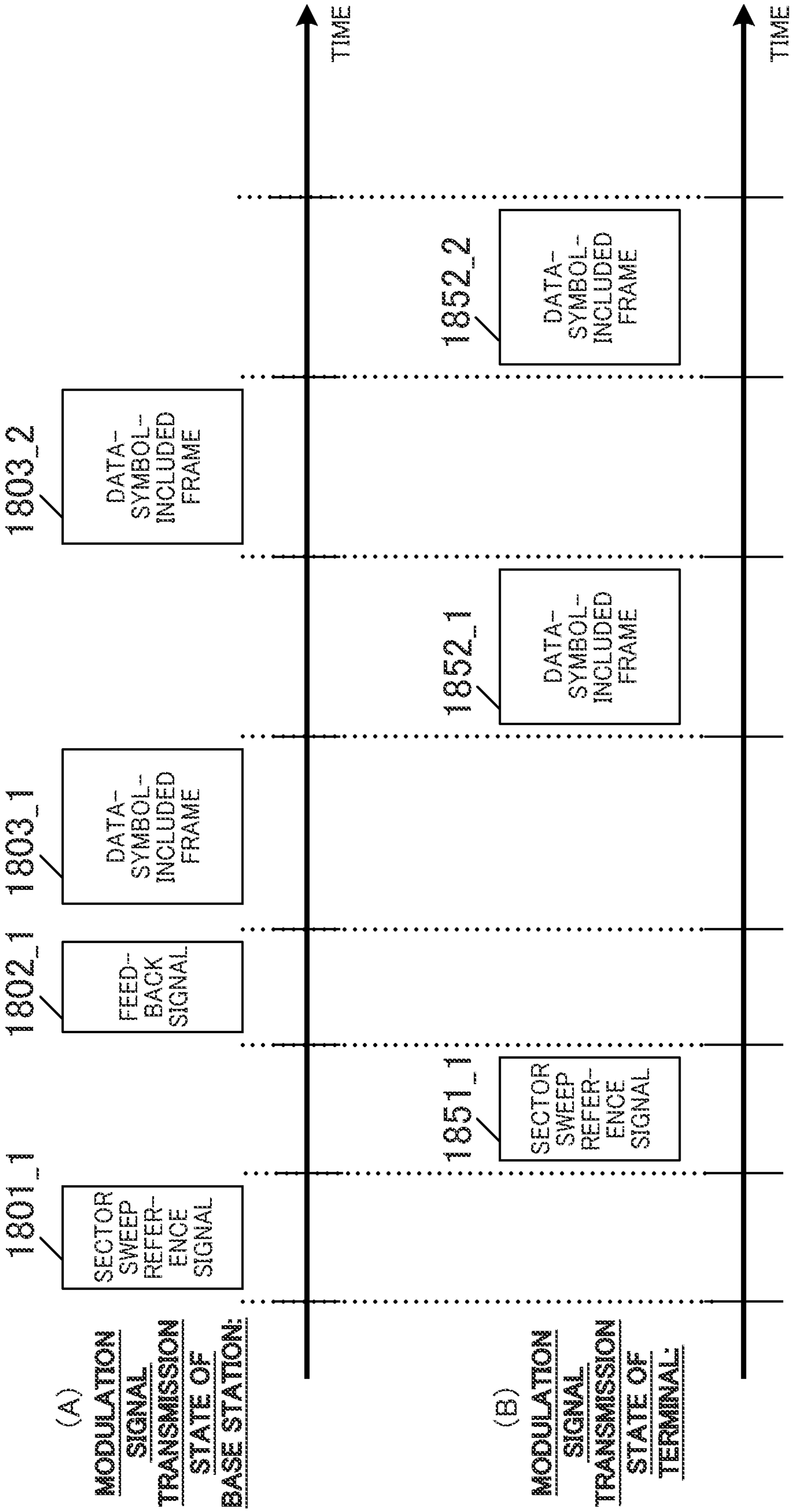
FIG. 18 illustrates an exemplary state where base station #1 and "terminal #1 to terminal #6" communicate with each other.

FIG. 18 illustrates an exemplary state where base station #1 labeled 901_1 and "terminal #1 labeled 902_1, terminal #2 labeled 902_2, terminal #3 labeled 902_3, terminal #4 labeled 902_4, terminal #5 labeled 902_5, and terminal #6 labeled 902_6" communicate with each other as illustrated in FIG. 9. (A) of FIG. 18 illustrates an exemplary modulation signal transmission state of base station #1 labeled 901_1, and (B) of FIG. 18 illustrates an exemplary modulation signal transmission state of "terminal #1 labeled 902_1, terminal #2 labeled 902_2, terminal #3 labeled 902_3, terminal #4 labeled 902_4, terminal #5 labeled 902_5, and terminal #6 labeled 902_6". Note that the horizontal axes represent time in (A) and (B) of FIG. 18.

First, base station #1 labeled 901_1 transmits sector sweep reference signal 1801_1. Note that this has already been described with reference to FIG. 10, and the description thereof will be thus omitted.

Then, a terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_1. Note that this has already been described with reference to, for example. FIGS. 13, 14, 15A, 15B, etc., and the description thereof will be thus omitted.

Base station #1 labeled 901_1 transmits feedback signal 1802_1. Note that this has already been described with reference to FIGS. 16A and 16B, and the description thereof will be thus omitted.

After that, base station #1 labeled 901_1 transmits "data-symbol-included frame 1803_1". Note that this has already been described with reference to FIGS. 17A and 17B, and the description thereof will be thus omitted. (Hence, "data-symbol-included frame 1803_1" is considered to be a frame for downlink, for example).

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_1". Note that a configuration of the frame will be described later with reference to FIGS. 20A to 20F. (Hence, "data-symbol-included frame 1852_1" is considered to be a frame for uplink, for example).

Next, base station #1 labeled 901_1 transmits "data-symbol-included frame 1803_2". Note that a configuration method of "data-symbol-included frame 1803_2" is as described with reference to FIGS. 17A and 17B.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_2". Note that a configuration of the frame will be described later with reference to FIGS. 20A to 20F.

Figure 19:
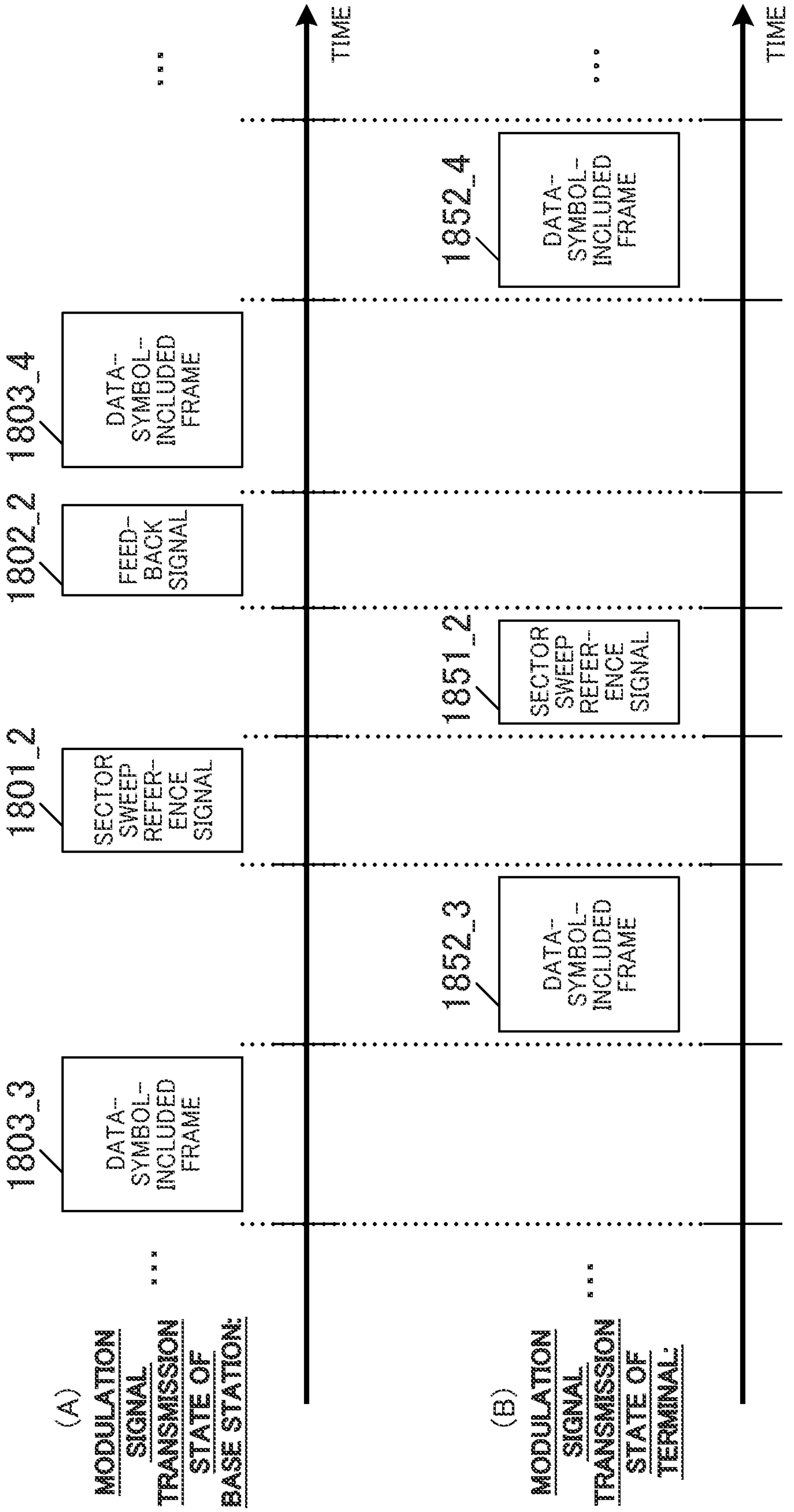
FIG. 19 illustrates an exemplary modulation signal transmission state of base station #1 and an exemplary modulation signal transmission state of a terminal such as "terminal #1 to terminal #6" after the state in FIG. 18.

FIG. 19 illustrates an exemplary modulation signal transmission state of base station #1 labeled 901_1 and an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" after the state in FIG. 18.

(A) of FIG. 19 illustrates an exemplary modulation signal transmission state of base station #1 labeled 901_1, and it is a temporal continuation from the modulation signal transmission state of base station #1 labeled 901_1 in (A) of FIG. 18.

(B) of FIG. 19 illustrates an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6", and it is a temporal continuation from the modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" in (B) of FIG. 18.

Note that the horizontal axes represent time in (A) and (B) of FIG. 19.

After the states in (A) and (B) of FIG. 18, base station #1 labeled 901_1 transmits "data-symbol-included frame 1803_3". Note that a configuration method of "data-symbol-included frame 1803_3" is as described with reference to FIGS. 17A and 17B.

The terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_3". Note that a configuration of the frame will be described later with reference to FIGS. 20A to 20F.

Next, base station #1 labeled 901_1 transmits sector sweep reference signal 1801_2. Note that this has already been described with reference to FIG. 10, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_2. Note that this has already been described with reference to, for example. FIGS. 13, 14, 15A, 15B, etc., and the description thereof will be thus omitted.

Base station #1 labeled 901_1 transmits feedback signal 1802_2. Note that this has already been described with reference to FIGS. 16A and 16B, and the description thereof will be thus omitted.

After that, base station #1 labeled 901_1 transmits "data-symbol-included frame 1803_4". Note that this has already been described with reference to FIGS. 17A and 17B, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_4". Note that a configuration of the frame will be described later with reference to FIGS. 20A to 20F.

As described above, base station #1 labeled 901_1 and the terminal transmit the sector sweep reference signals before the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"", and again transmit the sector sweep reference signals after the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"" Base station #1 labeled 901_1 and the terminal then each configure a frequency (band), select a transmission panel antenna to be used, and configure transmit beamforming. This produces the effect that the base station and/or the terminal achieve high data reception quality.

Next, a description will be given of an exemplary configuration of "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" with reference to FIGS. 20A to 20F. Note that i is an integer equal to or greater than 1, for example, and the horizontal axis represents time in FIGS. 20A to 20F.

As illustrated in FIGS. 20A, 20B, 20C, 20D, 20E, and 20F, "data-symbol-included frame 1852_*i*" is composed of a first transmission period, a second transmission period, a third transmission period, and a fourth transmission period. In addition, there are frequency band ♭1, frequency band ♭2, . . . , frequency band ♭K for "data-symbol-included frame 1852_*i*".

Figure 20A:
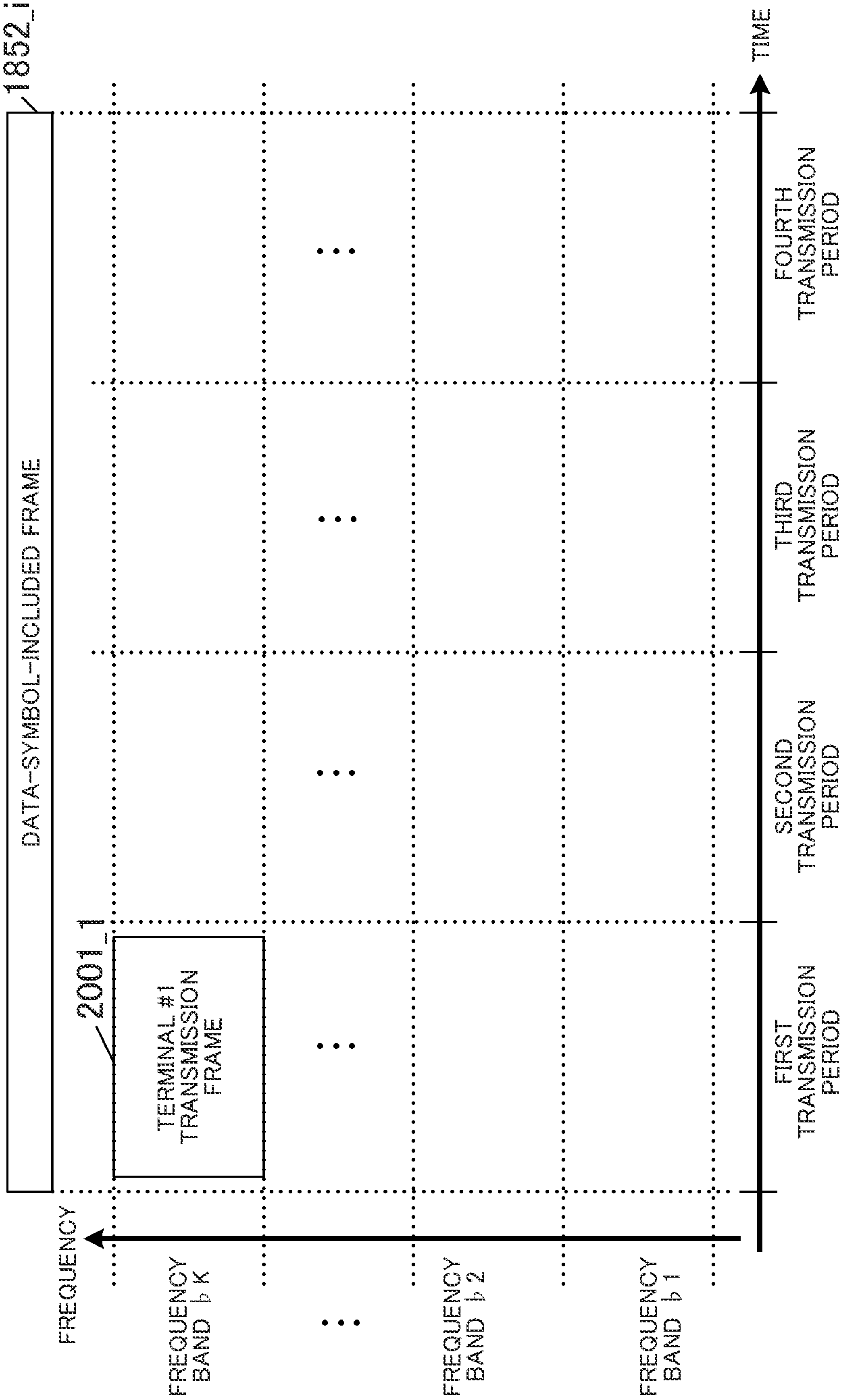
FIG. 20A illustrates an exemplary configuration of a "data-symbol-included frame" transmitted by terminal #1.

As illustrated in FIG. 20A, terminal #1 labeled 902_1 transmits terminal #1 transmission frame (including a data symbol) 2001_1 using frequency band ♭K and the first transmission period, for example.

"Terminal #1 labeled 902_1 transmits terminal #1 transmission frame (including a data symbol) 2001_1 using frequency band ♭K" because "base station #1 labeled 901_1 transmits a modulation signal (slot) addressed to terminal #1 labeled 9021 using frequency band ♭K" as illustrated in FIG. 17B.

Figure 20B:
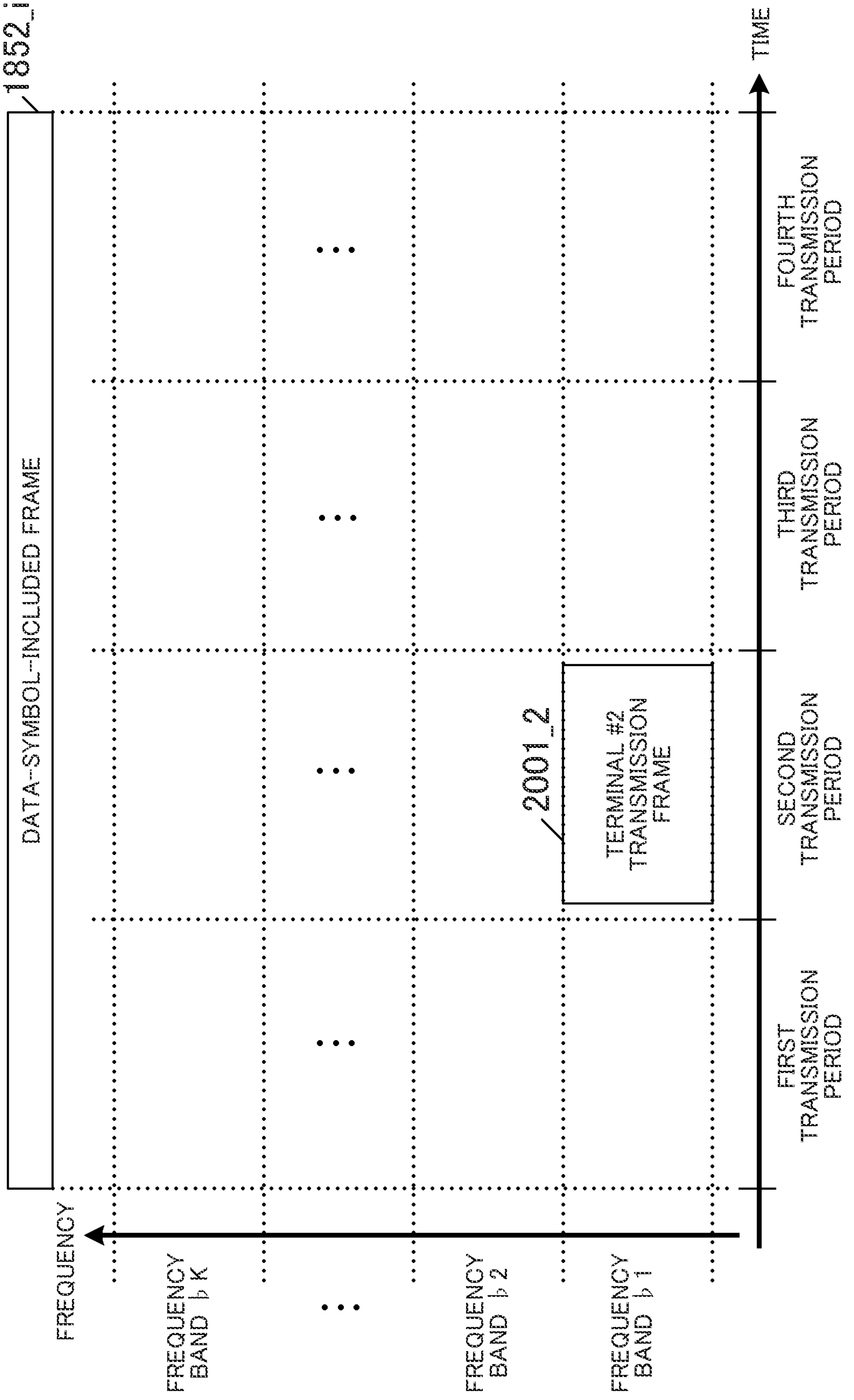
FIG. 20B illustrates an exemplary configuration of a "data-symbol-included frame" transmitted by terminal #2.

As illustrated in FIG. 20B, terminal #2 labeled 902_2 transmits terminal #2 transmission frame (including a data symbol) 2001_2 using frequency band ♭1 and the second transmission period, for example.

"Terminal #2 labeled 902_2 transmits terminal #2 transmission frame (including a data symbol) 2001_2 using frequency band ♭1" because "base station #1 labeled 901_1 transmits a modulation signal (slot) addressed to terminal #2 labeled 902_2 using frequency band ♭1" as illustrated in FIG. 17B.

Figure 20C:
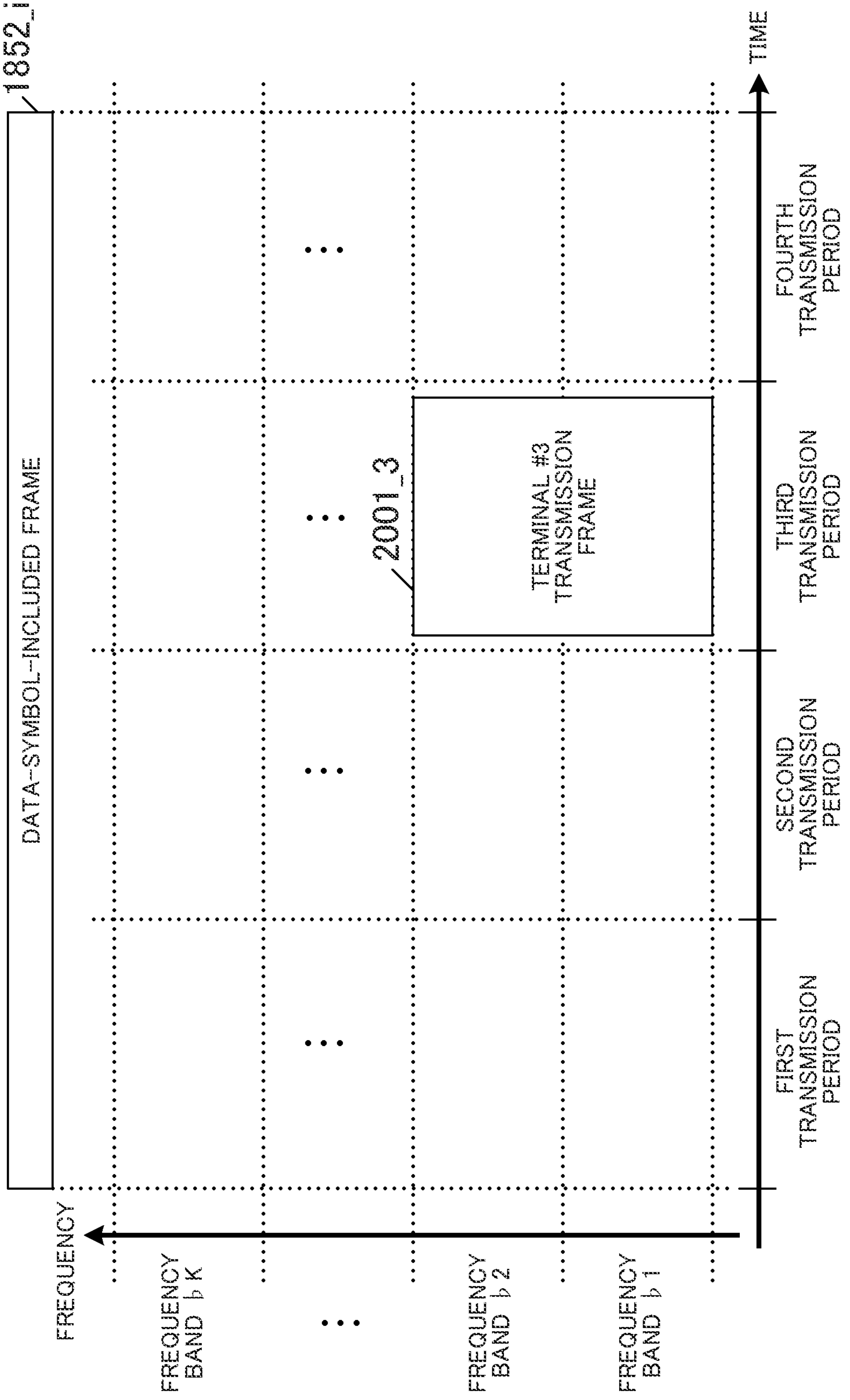
FIG. 20C illustrates an exemplary configuration of a "data-symbol-included frame" transmitted by terminal #3.

As illustrated in FIG. 20C, terminal #3 labeled 902_3 transmits terminal #3 transmission frame (including a data symbol) 2001_3 using frequency bands ♭1 and ♭2 and the third transmission period, for example.

"Terminal #3 labeled 902_3 transmits terminal #3 transmission frame (including a data symbol) 2001_3 using frequency bands ♭1 and ♭2" because "base station #1 labeled 901_1 transmits a modulation signal (slot) addressed to terminal #3 labeled 902_3 using frequency bands ♭1 and ♭2" as illustrated in FIG. 17B.

Figure 20D:
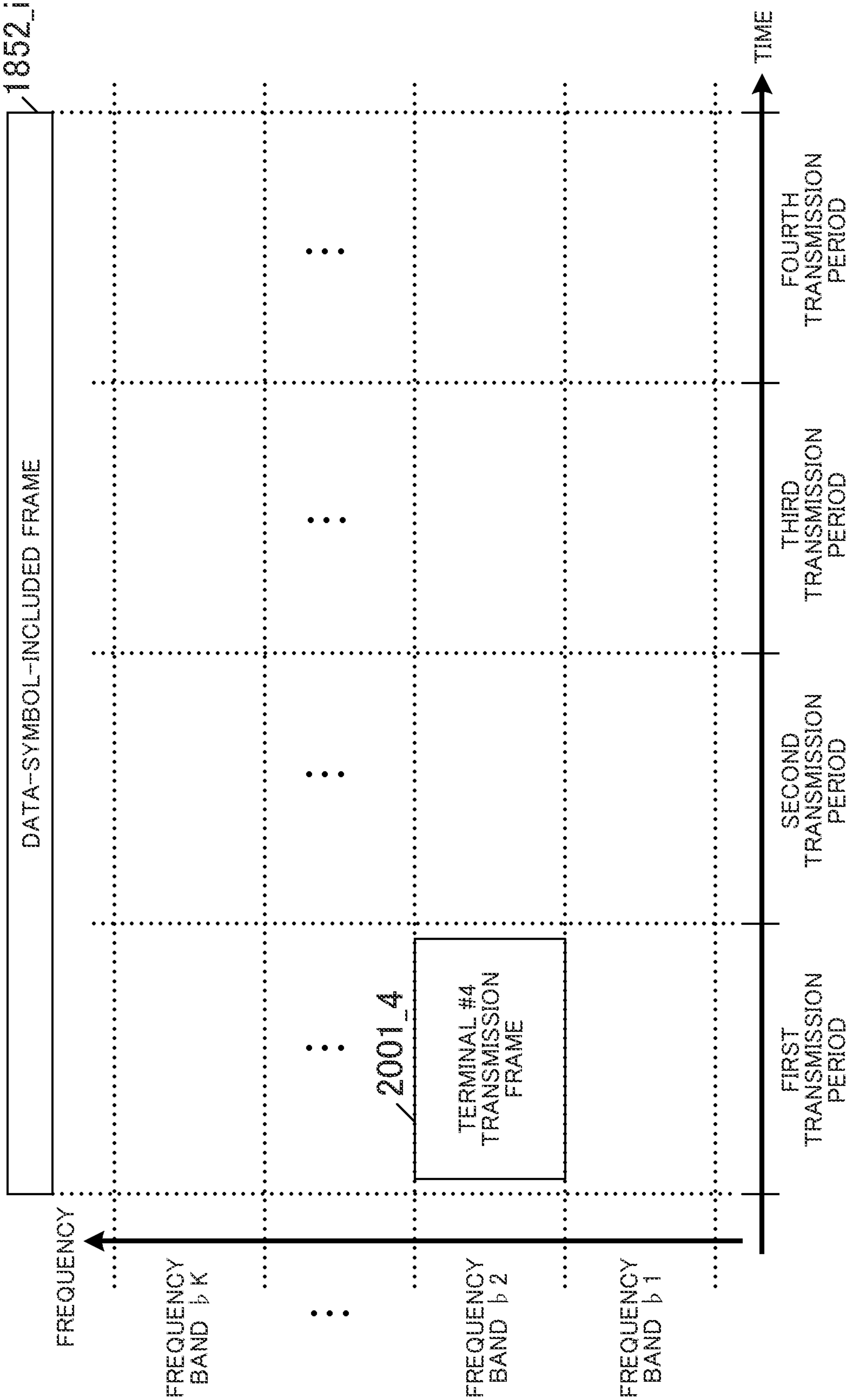
FIG. 20D illustrates an exemplary configuration of a "data-symbol-included frame" transmitted by terminal #4.

As illustrated in FIG. 20D, terminal #4 labeled 902_4 transmits terminal #4 transmission frame (including a data symbol) 2001_4 using frequency band ♭2 and the first transmission period, for example.

"Terminal #4 labeled 902_4 transmits terminal #4 transmission frame (including a data symbol) 2001_4 using frequency band ♭2" because "base station #1 labeled 901_1 transmits a modulation signal (slot) addressed to terminal #4 labeled 9024 using frequency band ♭2" as illustrated in FIG. 17B.

Figure 20E:
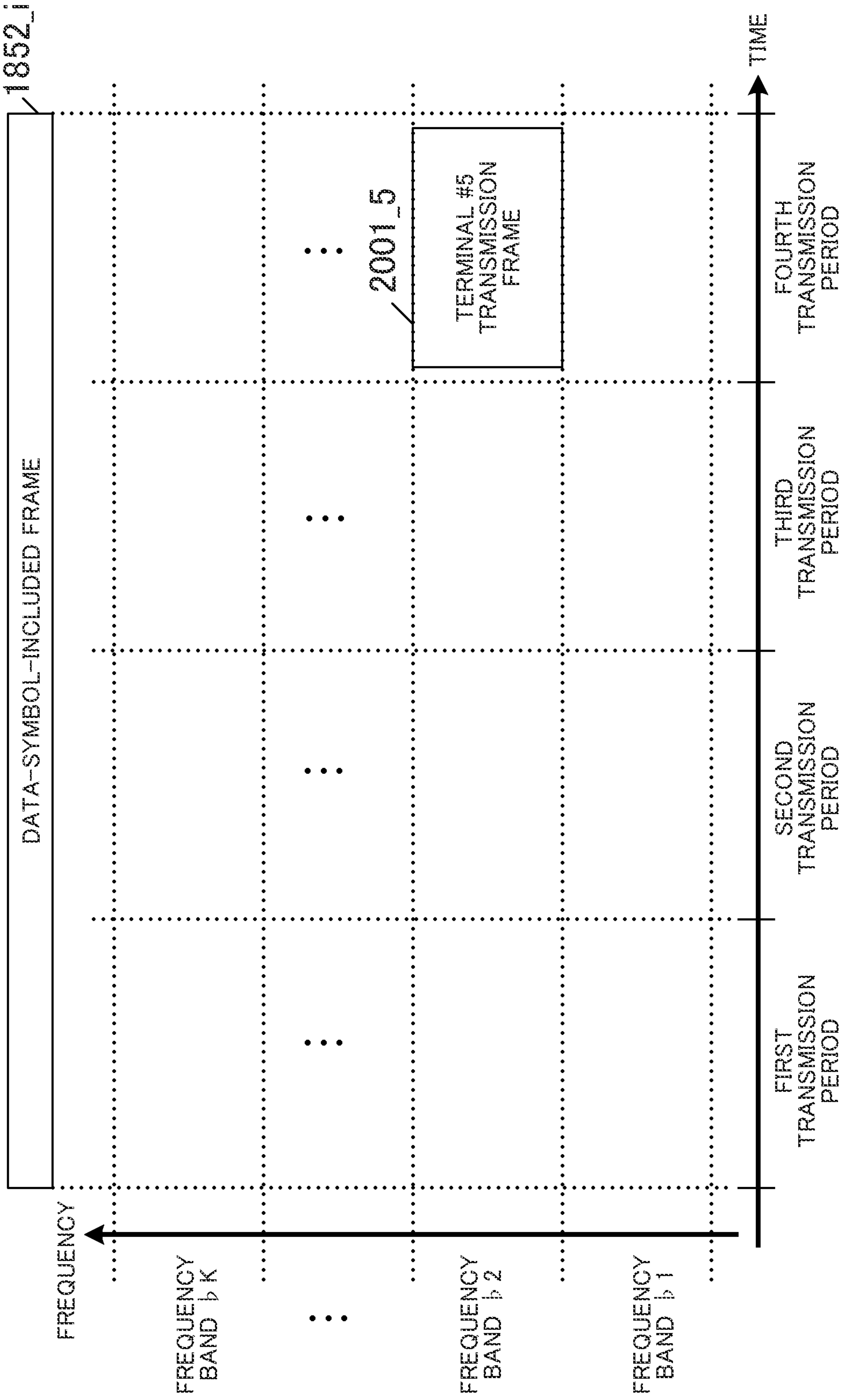
FIG. 20E illustrates an exemplary configuration of a "data-symbol-included frame" transmitted by terminal #5.

As illustrated in FIG. 20E, terminal #5 labeled 902_5 transmits terminal #5 transmission frame (including a data symbol) 2001_5 using frequency band ♭2 and the fourth transmission period, for example.

"Terminal #5 labeled 902_5 transmits terminal #5 transmission frame (including a data symbol) 2001_5 using frequency band ♭2" because "base station #1 labeled 901_1 transmits a modulation signal (slot) addressed to terminal #5 labeled 902_5 using frequency band ♭2" as illustrated in FIG. 17B.

Figure 20F:
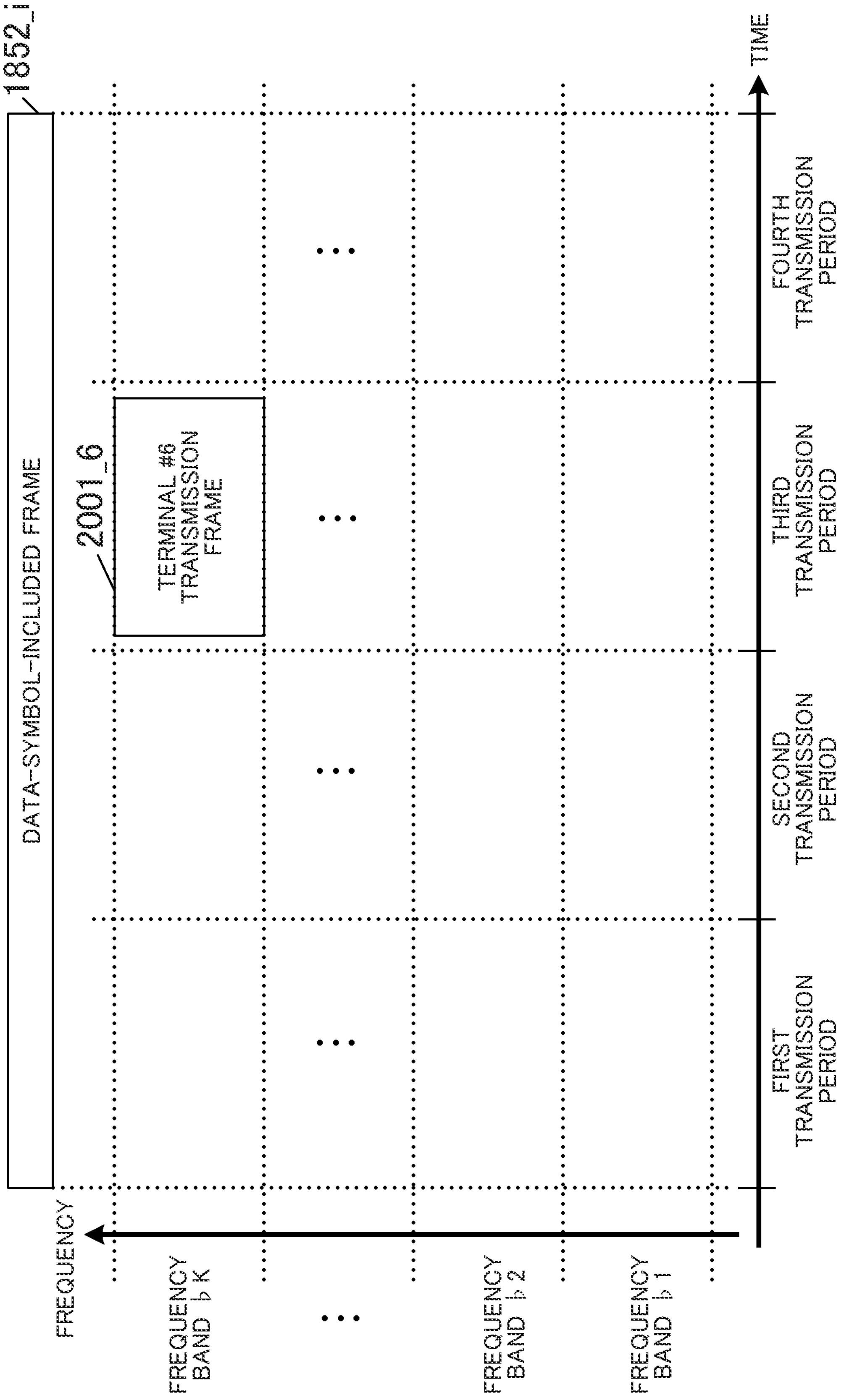
FIG. 20F illustrates an exemplary configuration of a "data-symbol-included frame" transmitted by terminal #6.

As illustrated in FIG. 20F, terminal #6 labeled 902_6 transmits terminal #6 transmission frame (including a data symbol) 2001_6 using frequency band ♭K and the third transmission period, for example.

"Terminal #6 labeled 902_6 transmits terminal #6 transmission frame (including a data symbol) 20016 using frequency band ♭K" because "base station #1 labeled 901_1 transmits a modulation signal (slot) addressed to terminal #6 labeled 9026 using frequency band ♭K" as illustrated in FIG. 17B.

As described above, "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" is subjected to, for example, OFDMA and/or time division and transmitted by each terminal, and base station #1 labeled 901_1 receives the frame transmitted by the terminal, thereby preventing interference and achieving high data reception quality.

Note that terminal #1 transmission frame 2001_1, terminal #2 transmission frame 2001_2, terminal #3 transmission frame 2001_3, terminal #4 transmission frame 2001_4, terminal #5 transmission frame 2001_5, and terminal #6 transmission frame 2001_6 in FIGS. 20A, 20B, 20C. 20D, 20E, and 20F may include, in addition to the data symbol, a "reference signal such as DMRS, PTRS, or SRS", a pilot symbol, a pilot signal, a preamble, and a symbol including control information, for example.

In FIGS. 20A, 20B, 20C, 20D, 20E, and 20F, a description has been given of a case where the terminals perform OFDMA and/or time division on the frames to be transmitted, but the terminals may perform spatial division on the frames to be transmitted using multi user-multiple-input multiple-output (MU-MIMO).

Note that the present embodiment has provided a description of a case where a terminal transmits a modulation signal in a multi-carrier scheme such as OFDM, for example, but the scheme is not limited to this. For example, a terminal may transmit a signal in a single-carrier scheme when transmitting a signal of a frame in FIGS. 14, 20A, 20B, 20C, 20D, 20E, 20F, etc.

In FIG. 14, for example, terminal #1 labeled 902_1 may transmit terminal #1 "sector sweep reference signal" 1401_1 in frequency band ♭K in a single-carrier scheme. Further, in FIG. 20A, terminal #1 labeled 902_1 may transmit "terminal #1 transmission frame" 2001_1 infrequency band ♭K in a single-carrier scheme. Note that other terminals may also transmit a signal in a single-carrier scheme.

Embodiment 2

In Embodiment 2, a description will be given of a communication system, communication apparatus, and communication method using sector sweep as a variation of Embodiment 1. Note that the drawings used in Embodiment 1 are sometimes used in the following description of Embodiment 2.

FIGS. 1A, 1B, and 1C illustrate exemplary configurations of, for example, a base station, an access point, a terminal, and a repeater in Embodiment 2, and the description of the detailed operations will be omitted since they have already been described with reference to FIGS. 2, 3, 4, 5, 6, 7, and 8. For FIGS. 2, 3, 4, 5, 6, 7, and 8, the description of the detailed operations will also be omitted since they have already been described.

FIG. 9 illustrates an exemplary communication state in Embodiment 2. As illustrated in FIG. 9, a case to be discussed is where base station #1 labeled 901_1 communicates with terminal #1 labeled 902_1, terminal #2 labeled 902_2, terminal #3 labeled 902_3, terminal #4 labeled 902_4, terminal #5 labeled 902_5, and terminal #6 labeled 902_6. A relationship between a base station and terminals, however, is not limited to this example, and the base station may communicate with one or more terminals, for example.

Note that the following description is about an exemplary case where the base station transmits modulation signals to the terminals using the OFDMA scheme and the terminals transmit modulation signals to the base station using a single-carrier scheme.

FIG. 10 illustrates an example of modulation signal 1000 transmitted by base station #1 labeled 901_1 in FIG. 9. In FIG. 10, the horizontal axis represents time and the vertical axis represents frequency. In the time period from time t0 to t1, sector sweep (sector-sweep level) reference signal 1001 is present. Note that sector sweep reference signal 1001 will be described later.

The time period from time t1 to t2 is a terminal response period. Note that the terminal response will be described later.

In the time period from time t2 to t3, feedback signal 1002 is present. Note that feedback signal 1002 will be described later.

In the time period from time t4 to t5, data-symbol-included frame 1003 is present. Note that data-symbol-included frame 1003 will be described later.

The reference signal for sector sweep is referred to as sector sweep reference signal 1001 in FIG. 10, but the name is not limited thereto and may be a reference signal, a reference symbol, a training signal, a training symbol, or the like. The signal denoted by reference sign 1002 is referred to as feedback signal 1002, but the name is not limited thereto and may be a feedback symbol, a terminal-addressed signal, a terminal-addressed symbol, a control signal, a control symbol, or the like. In addition, the frame including a data symbol is referred to as data-symbol-included frame 1003, but the name is not limited thereto and may be a slot/mini-slot/unit-included frame, or the like.

Figure 21:
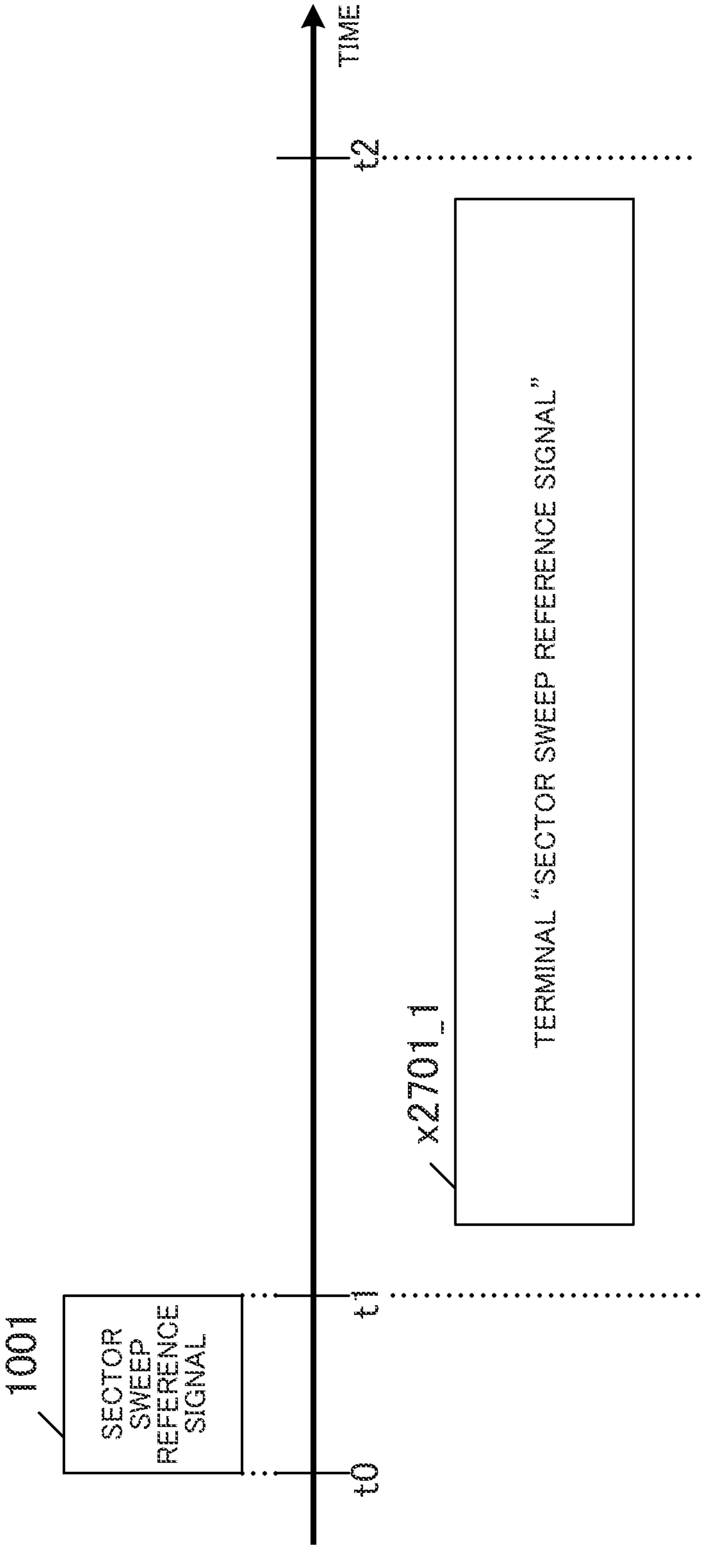
FIG. 21 illustrates an exemplary configuration of a terminal response period in the time period from time t1 to t2 in FIG. 10.

FIG. 21 illustrates an exemplary configuration of the time period from time t1 to t2 in FIG. 10, which is the terminal response period, and the horizontal axis represents time. Sector sweep reference signal 1001 transmitted by the base station is present in the time period from time t0 to t1.

Subsequently, terminal "sector sweep reference signal" x2701 is present in the time period from time t1 to t2.

FIG. 11 illustrates examples of sector sweep reference signal 1001 in FIG. 10 transmitted by base station #1 labeled 901_1 in FIG. 9 with the configuration in FIG. 1A, 1B, or 1C, for example. Note that the horizontal axis represents time and the vertical axis represents frequency in FIG. 11. In the example of FIG. 11, the frequency is divided into frequency band ♭1, frequency band ♭2, . . . , frequency band ♭K as illustrated in FIG. 11 for base station #1 labeled 901_1 to transmit modulation signals based on OFDMA. Note that K is an integer equal to or greater than 1 or an integer equal to or greater than 2.

In frequency band ♭1, for example, sector sweep reference signal 1101_11 in transmission panel antenna 1 for frequency ♭1 is present in the first time period, sector sweep reference signal 1101_12 in transmission panel antenna 2 for frequency ♭1 is present in the second time period, . . . , sector sweep reference signal 1101_1M in transmission panel antenna M for frequency ♭1 is present in the M-th time period.

That is, in frequency band ♭i, sector sweep reference signal 1101_*i*1 in transmission panel antenna 1 for frequency ♭i is present in the first time period, sector sweep reference signal 1101_*i*2 in transmission panel antenna 2 for frequency ♭i is present in the second time period, . . . , sector sweep reference signal 1101_*i*M in transmission panel antenna M for frequency ♭i is present in the M-th time period. Note that i is an integer from 1 to K (both inclusive).

Note that sector sweep reference signal 1101_*ij* in transmission panel antenna j for frequency ♭i is transmitted from transmission panel antenna j labeled 106_*j* of base station #1 labeled 901_1 with the configuration in FIG. 1A, 1B, or 1C. In this case, j is an integer from 1 to M (both inclusive).

One feature is that "sector sweep reference signals are transmitted from the same transmission panel antenna in the i-th time period regardless of the frequency band in FIG. 11". At this time, the same beamforming parameter is used in a first period of time regardless of the frequency band. Note that the beamforming will be described later.

FIG. 12 illustrates an exemplary configuration of "sector sweep reference signal 1101_*pi* in transmission panel antenna i for frequency ♭p" in FIG. 11. Note that the horizontal axis represents time in FIG. 12. Note that p is an integer from 1 to K (both inclusive) and i is an integer from 1 to M (both inclusive).

A description will be omitted regarding a specific example of a transmission method for "sector sweep reference signal 1101_*pi* in transmission panel antenna i for frequency ♭p" that is composed as in FIGS. 11 and 12 and transmitted by base station #1 labeled 901_1 with the configuration in FIG. 1A, 1B, or 1C, since it has already been described.

As illustrated in FIGS. 11 and 12, when base station #1 labeled 901_1 transmits "sector sweep reference signal

1101_*i* in transmission panel antenna i for frequency ♭p", "reference signal 1201_*j* according to j-th parameter in transmission panel antenna i for frequency ♭p" includes, for example, the following information:

- Identification number (ID) of the transmission panel antenna, which corresponds to i here, for example; Identification number (ID) of the parameter used for beamforming (directivity control), which corresponds to j here, for example; and
- The number of frequency divisions in which sector sweep reference signals can be transmitted when the terminals transmit the sector sweep reference signals, which will be described later.

Note that, in a case where "the number of frequency divisions in which sector sweep reference signals can be transmitted" is determined in advance, information of the number of frequency divisions in which sector sweep reference signals can be transmitted need not be included in "reference signal 1201_*j* according to j-th parameter in transmission panel antenna i for frequency ♭p".

Note that "reference signal 1201_*j* according to j-th parameter in transmission panel antenna i for frequency ♭p" may include other information. Examples of the information will be described in the other embodiments, for example, in Embodiment 6 or later.

The following information may also be included in "reference signal 1201_*j* according to j-th parameter in transmission panel antenna i for frequency ♭p".

- Information on the frequency band and/or frequency ♭p (information of the number of frequency divisions may also be included), which will be described later.

Transmission of the "identification number (ID) of the transmission panel antenna for frequency ♭p" and the "identification number (ID) of the parameter used for beamforming (directivity control)" by base station #1 labeled 901_1 allows the terminals to recognize the "identification number (ID) of the transmission panel antenna" and the "identification number (ID) of the parameter used for beamforming (directivity control)" that have allowed successful reception; accordingly, base station #1 labeled 901_1 and the terminals can perform appropriate control. This produces the effect of enhancing data reception quality.

Note that "the number of frequency divisions in which sector sweep reference signals can be transmitted when the terminals transmit the sector sweep reference signals" may be changeable according to the frame and/or time, for example. This produces the effect of enhancing data transmission efficiency of a communication system.

Further, transmission of the "information on the frequency band and/or frequency ♭p" by base station #1 labeled 901_1 allows the terminals to obtain the information and transmit "information relative to a frequency that the terminals desire the base station to use for transmission". This allows the base station to perform appropriate control and produces the effect of enhancing data reception quality.

Next, a description will be given of an operation in the time period from time t1 to t2 in FIG. 10, which is the terminal response period. Note that, in this Embodiment 6, the description is based on a case where the terminals use a multi-carrier scheme such as the OFDM scheme and frequency (bands) used by the base station and frequency (bands) used by the terminals partially overlap each other, by way of example.

FIG. 21 illustrates an exemplary operation in the time period from time t1 to t2, which is the terminal response period. Note that the horizontal axis represents time in FIG. 21. Terminals such as terminal #1 labeled 902_1, terminal #2 labeled 902_2, terminal #3 labeled 902_3, terminal #4 labeled 902_4, terminal #5 labeled 902_5, and terminal #6 labeled 902_6 in FIG. 9 transmit sector sweep reference signals in the time period from time t1 to t2, which is the terminal response period. Note that, in FIG. 21, the components that operate in the same manner as in FIG. 10 are denoted by the same reference signs.

As illustrated in FIGS. 10 and 21, for example, base station #1 labeled 901_1 transmits sector sweep reference signals in the time period from time t0 to t1. After that, the terminal response period, which is the time period from time t1 to t2, includes terminal "sector sweep reference signal" x2701_1 as illustrated in FIG. 13.

Figure 22A:
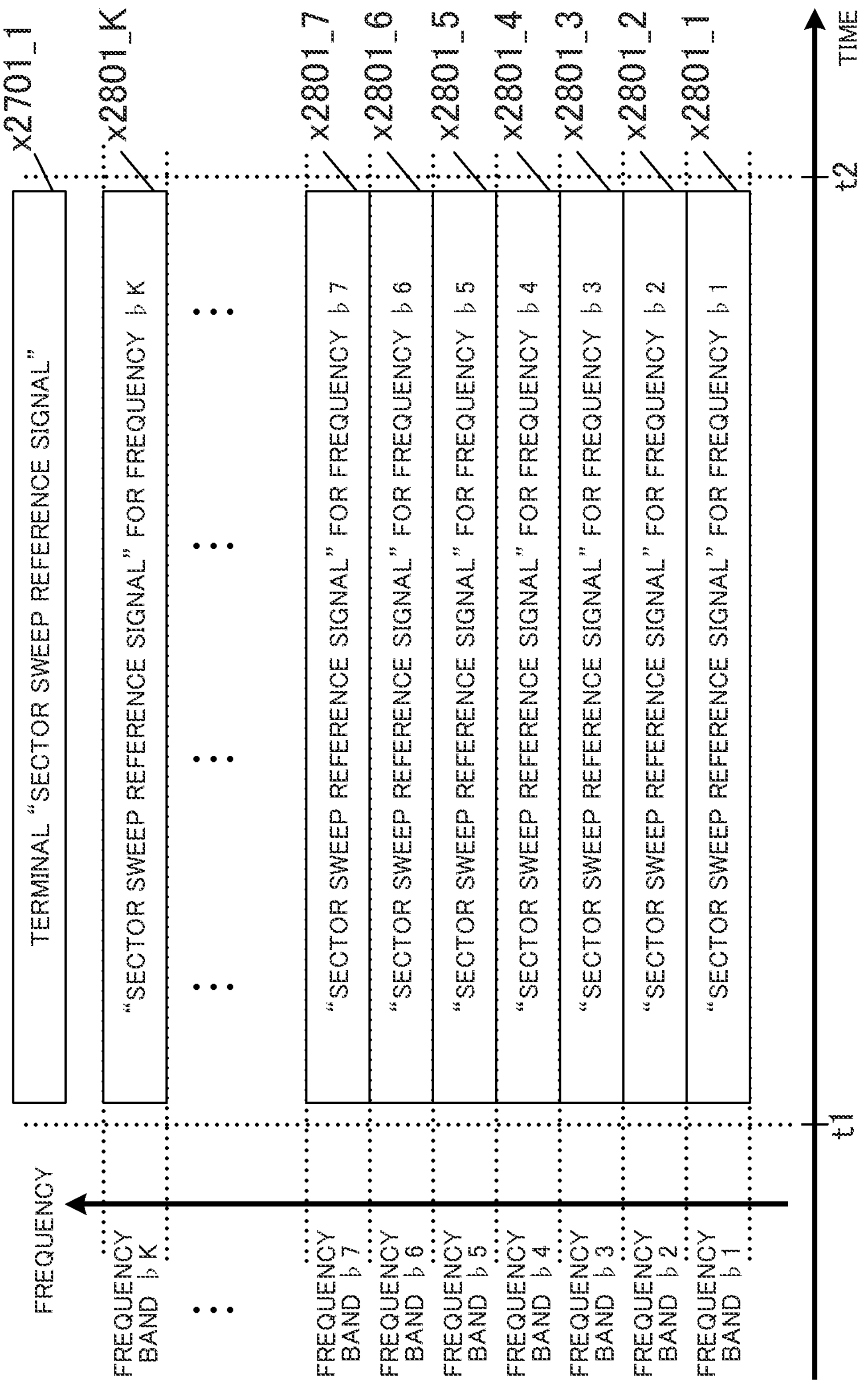
FIG. 22A illustrates an exemplary configuration, in time and frequency, of a terminal "sector sweep reference signal"

FIG. 22A illustrates an exemplary configuration, in time and frequency, of terminal "sector sweep reference signal" x2701_1 illustrated in FIG. 21. Note that the horizontal axis represents time and the vertical axis represents frequency in FIG. 22A.

As illustrated in FIG. 22A, "terminal "sector sweep reference signal" x2701_1 includes areas for "sector sweep reference signal" x2801_1 for frequency ♭1, "sector sweep reference signal" x2801_2 for frequency ♭2, "sector sweep reference signal" x2801_3 for frequency ♭3, "sector sweep reference signal" x2801_4 for frequency ♭4, "sector sweep reference signal" x2801_5 for frequency ♭5, "sector sweep reference signal" x2801_6 for frequency ♭6, "sector sweep reference signal" x2801_7 for frequency ♭7, . . . , "sector sweep reference signal" x2801_K for frequency ♭K".

Thus, in the case of FIG. 22A, "the number of frequency divisions in which sector sweep reference signals can be transmitted when the terminals transmit the sector sweep reference signals" is set to K by base station #1 labeled 901_1.

Figure 22B:
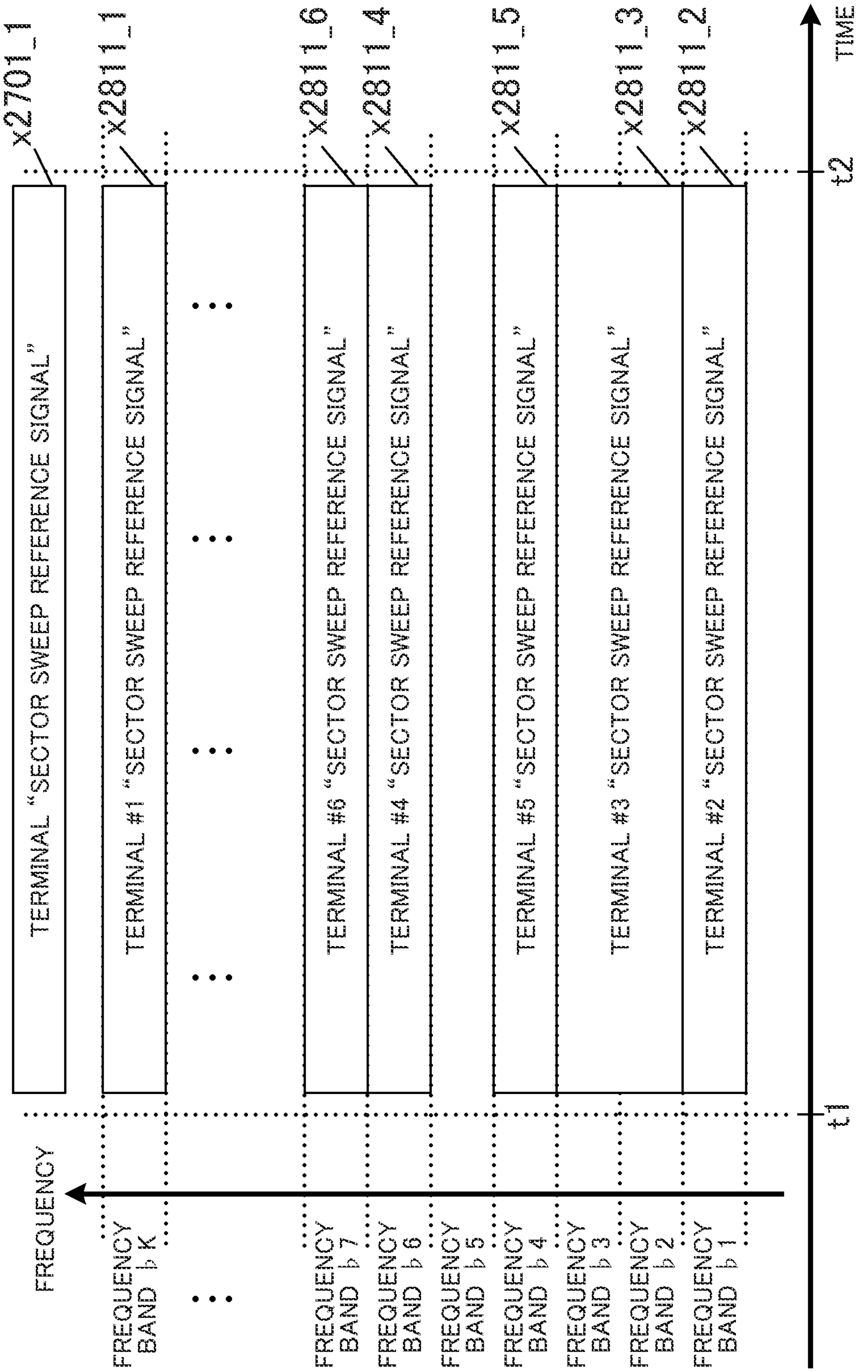
FIG. 22B illustrates an exemplary configuration, in time and frequency, of a terminal "sector sweep reference signal"

FIG. 22B illustrates exemplary occupation by the terminals in the areas for "sector sweep reference signal" x2801_1 for frequency ♭1, "sector sweep reference signal" x2801_2 for frequency ♭2, "sector sweep reference signal" x2801_3 for frequency ♭3, "sector sweep reference signal" x2801_4 for frequency ♭4, "sector sweep reference signal" x2801_5 for frequency ♭5, "sector sweep reference signal" x2801_6 for frequency ♭6, "sector sweep reference signal" x2801_7 for frequency ♭7, . . . , "sector sweep reference signal" x2801_K for frequency ♭K" included in terminal "sector sweep reference signal" x2701_1 illustrated in FIG. 21A. Note that the horizontal axis represents time and the vertical axis represents frequency in FIG. 22A.

Terminal #1 labeled 902_1 in FIG. 9 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency ♭p" included in sector sweep reference signal 1001 may be used for this estimation.

Terminal #1 labeled 902_1 estimates, for example, "transmission panel antenna a1 and parameter b1" as the "transmission panel antenna and parameter" with high reception quality. Terminal #1 labeled 902_1 also estimates frequency band ♭K as the "frequency domain" with high reception quality. Terminal #1 labeled 9021 may further estimate the frequency domain with second highest reception quality, the frequency domain with third highest reception quality, and so forth. Note that the frequency domain with highest reception quality will be discussed here to simplify the description.

While estimating the "transmission panel antenna and parameter" with high reception quality, terminal #1 labeled 902_1 may simultaneously obtain information of "the number of frequency divisions in which sector sweep reference signals can be transmitted when the terminals transmit the sector sweep reference signals". In the case of FIG. 22B, terminal #1 labeled 902_1 may obtain information indicating that "the number of frequency divisions in which sector sweep reference signals can be transmitted when the terminals transmit the sector sweep reference signals" is K.

Then, terminal #1 labeled 902_1, for example, transmits terminal #1 "sector sweep reference signal" x2811_1 using frequency band ♭K based on the above result. Although the description here is based on an example where terminal #1 labeled 902_1 uses "frequency band ♭K" that is estimated to have the highest reception quality, a frequency band other than the frequency band estimated to have the highest reception quality may be used.

Note that terminal #1 "sector sweep reference signal" x2811_1 includes information of the "transmission panel antenna and parameter" with high reception quality obtained by terminal #1 labeled 902_1, that is, information of "transmission panel antenna a1 and parameter b1". Terminal #1 "sector sweep reference signal" x2811_1 also includes information of the "frequency domain", for example, information of "frequency band ♭K". This will be described later.

Likewise, terminal #2 labeled 902_2 in FIG. 9 receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. In addition, the "information on the frequency band and/or frequency ♭p" included in sector sweep reference signal 1001 may be used for this estimation.

Terminal #2 labeled 902_2 estimates, for example, "transmission panel antenna a2 and parameter b2" as the "transmission panel antenna and parameter" with high reception quality. Terminal #2 labeled 902_2 also estimates frequency band ♭1 as the "frequency domain" with high reception quality. Terminal #2 labeled 902_2 may further estimate the frequency domain with second highest reception quality, the frequency domain with third highest reception quality, and so forth. Note that the frequency domain with highest reception quality will be discussed here to simplify the description.

While estimating the "transmission panel antenna and parameter" with high reception quality, terminal #2 labeled 902_2 may simultaneously obtain information of "the number of frequency divisions in which sector sweep reference signals can be transmitted when the terminals transmit the sector sweep reference signals". In the case of FIG. 22B, terminal #2 labeled 902_2 may obtain information indicating that "the number of frequency divisions in which sector sweep reference signals can be transmitted when the terminals transmit the sector sweep reference signals" is K.

Then, terminal #2 labeled 902_2, for example, transmits terminal #2 "sector sweep reference signal" x2811_2 using frequency band ♭1 based on the above result. Although the description here is based on an example where terminal #2labeled 902_2 uses "frequency band ♭1" that is estimated to have the highest reception quality, a frequency band other than the frequency band estimated to have the highest reception quality may be used.

Note that terminal #2 "sector sweep reference signal x2811_2" includes information of the "transmission panel antenna and parameter" with high reception quality obtained by terminal #2 labeled 902_2, that is, information of "transmission panel antenna a2 and parameter b2". Terminal #2 "sector sweep reference signal" x2811_2 also includes information of the "frequency domain", for example, information of "frequency band ♭1". This will be described later.

Thus, terminal #i labeled 902_*i* receives sector sweep reference signal 1001 transmitted by base station #1 labeled 901_1 and estimates the "frequency band, transmission panel antenna, and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001. Note that i is an integer equal to or greater than 1, for example. In addition, the "information on the frequency band and/or frequency ♭p" included in sector sweep reference signal 1001 may be used for this estimation.

Terminal #i labeled 902_*i* estimates, for example, "transmission panel antenna ai and parameter b1" as the "transmission panel antenna and parameter" with high reception quality. Terminal #i labeled 902_*i* also estimates frequency band ♭zi as the "frequency domain" with high reception quality. Note that a plurality of frequency domains can be specified. Terminal #i labeled 902_*i* may further estimate the frequency domain with second highest reception quality, the frequency domain with third highest reception quality, and so forth. Note that the frequency domain with highest reception quality will be discussed here to simplify the description.

While estimating the "transmission panel antenna and parameter" with high reception quality, terminal #i labeled 902_*i* may simultaneously obtain information of "the number of frequency divisions in which sector sweep reference signals can be transmitted when the terminals transmit the sector sweep reference signals".

Then, terminal #i labeled 902_*i*, for example, transmits terminal #i "sector sweep reference signal" x2811_*i* using frequency band ♭zi based on the above result. Although the description here is based on an example where terminal #i labeled 902_*i* uses "frequency band ♭zi" that is estimated to have the highest reception quality, a frequency band other than the frequency band estimated to have the highest reception quality may be used.

Note that terminal #i "sector sweep reference signal" 2811_*i* includes information of the "transmission panel antenna and parameter" with high reception quality obtained by terminal #i labeled 902_*i*, that is, information of "transmission panel antenna ai and parameter bi". Terminal #i "sector sweep reference signal" x2811_*i* also includes information of the "frequency domain", for example, information of "frequency band ♭zi". This will be described later.

Note that, in FIG. 21, when the frequency (band) used for sector sweep reference signal 1001 transmitted by base station #1 labeled 901_1 is the same as the frequency (band) used for terminal "sector sweep reference signal" x2701_1 transmitted by terminal #i, terminal #i "sector sweep reference signal" x2811_*i* need not but may include the information of the "frequency domain". In this case, base station #1 labeled 901_1 can recognize the "frequency domain" by referring to the frequency domain where terminal #i "sector sweep reference signal" x2811_*i* is present.

Meanwhile, in FIG. 21, when the frequency (band) used for sector sweep reference signal 1001 transmitted by base station #1 labeled 901_1 is different from the frequency (band) used for terminal "sector sweep reference signal" x2701_1 transmitted by terminal #i, including the information of the "frequency domain" in terminal #i "sector sweep reference signal" x2811_*i* produces the effect of accurately transmitting the information of the "frequency domain" to base station #1 labeled 901_1.

A description will be given of a configuration of terminal #i "sector sweep reference signal" x2811_*i* transmitted by terminal #i labeled 902_*i* described with reference to FIG. 22B. To simplify the description, terminal #i labeled 902_*i* has the configuration in FIG. 1A, 1B, or 1C. In addition, terminal #i labeled 902_*i* with the configuration in FIG. 1A, 1B, or 1C includes the configuration in FIG. 3 as transmission panel antenna xi labeled 106_xi. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

Terminal #i labeled 902_*i* transmits terminal #i "sector sweep reference signal" x2811_*i* as illustrated in FIG. 22B. FIG. 15A illustrates an exemplary configuration of terminal #i "sector sweep reference signal" x2811_*i*. Note that the horizontal axis represents time in FIG. 15A. "Terminal #i "sector sweep reference signal" 1401_*i*" in FIG. 15A corresponds to an example of "sector sweep reference signal" x2811_*i* in FIG. 22B.

As illustrated in FIG. 15A, terminal #i "sector sweep reference signal" x2811_*i* of terminal #i labeled 902_*i* is composed of "sector sweep reference signal 1501_1 in terminal #i transmission panel antenna 1, sector sweep reference signal 1501_2 in terminal #i transmission panel antenna 2, . . . , sector sweep reference signal 1501_M in terminal #i transmission panel antenna M".

For example, terminal #i labeled 902_*i* with the configuration in FIG. 1A, 1B, or 1C transmits "sector sweep reference signal 1501_1 in terminal #i transmission panel antenna I" using transmission panel antenna 1 labeled 106_1.

That is, terminal #i labeled 902_*i* with the configuration in FIG. 1A, 1B, or 1C transmits "sector sweep reference signal 1501_*k* in terminal #i transmission panel antenna k" using transmission panel antenna k labeled 106_*k*. Note that k is an integer from 1 to M (both inclusive).

Note that the number of transmission panel antennas included in terminal #i labeled 902_*i* is M in FIG. 15A, but the number of transmission panel antennas is not limited to this and may be N, where N is an integer equal to or greater than 1.

The details have also been described in other embodiments.

FIG. 15B illustrates an exemplary configuration of "sector sweep reference signal 1501_*xi* in terminal #i transmission panel antenna xi" in FIG. 15A. Note that the horizontal axis represents time in FIG. 15.

As illustrated in FIG. 15B, "sector sweep reference signal 1501_*xi* in terminal #i transmission panel antenna xi" is composed of, for example, "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi".

For example, terminal #i labeled 902_*i* with the configuration in FIG. 1A, 1B, or 1C includes the configuration in FIG. 3 as transmission panel antenna xi labeled 106_*xi*.

A description will be given of "reference signal 1511_1 according to first parameter in transmission panel antenna xi".

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, 1). When first transmission signal 303_1 of "reference signal 1511_1 according to first parameter in transmission panel antenna xi" is tx1ref1(t), multiplier 304_1 obtains tx1ref1(t)×w1(xi, 1). Then, terminal #i labeled 902_*i* transmits tx1ref1(t)×w1(xi, 1) from antenna 306_1 in FIG. 3. Note that t represents time.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, 1). When second transmission signal 303_2 of "reference signal 1511_1 according to first parameter in transmission panel antenna xi" is tx2ref1(t), multiplier 304_2 obtains tx2ref1(t)×w2(xi, 1). Then, terminal #i labeled 902_*i* transmits tx2ref1(t)×w2(xi, 1) from antenna 306_2 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, 1). When third transmission signal 303_3 of "reference signal 1511_1 according to first parameter in transmission panel antenna xi" is tx3ref1(t), multiplier 304_3 obtains tx3ref1(t)×w3(xi, 1). Then, terminal #i labeled 902_*i* transmits tx3ref1(t)×w3(xi, 1) from antenna 306_3 in FIG. 3.

When terminal #i labeled 902_*i* transmits "reference signal 1511_1 according to first parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, 1). When fourth transmission signal 303_4 of "reference signal 1511_1 according to first parameter in transmission panel antenna xi" is tx4ref1(t), multiplier 304_4 obtains tx4ref1(t)×w4(xi, 1). Then, terminal #i labeled 902_*i* transmits tx4ref1(t)×w4(xi, 1) from antenna 306_4 in FIG. 3.

A description will be given of "reference signal 151*i*_*j* according to j-th parameter in transmission panel antenna xi".

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_1 in transmission panel antenna xi labeled 106_*xi* as w1(xi, j). When first transmission signal 303_1 of "reference signal 1511_*j* according to j-th parameter in transmission panel antenna xi" is tx1refj(t), multiplier 304_1 obtains tx1refj(t)×w1(xi, j). Then, terminal #i labeled 902_*i* transmits tx1refj(t)×w1(xi, j) from antenna 306_1 in FIG. 3. Note that t represents time.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_2 in transmission panel antenna xi labeled 106_*xi* as w2(xi, j). When second transmission signal 303_2 of "reference signal 1511_*j* according to j-th parameter in transmission panel antenna xi" is tx2refj(t), multiplier 304_2 obtains tx2refj(t)×w2(xi, j). Then, terminal #i labeled 902_*i* transmits tx2refj(t)×w2(xi, j) from antenna 306_2 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_3 in transmission panel antenna xi labeled 106_*xi* as w3(xi, j). When third transmission signal 303_3 of "reference signal 1511_*j* according to j-th parameter in transmission panel antenna xi" is tx3refj(t), multiplier 304_3 obtains tx3refj(t)×w3(xi, j). Then, terminal #i labeled 902_*i* transmits tx3refj(t)×w3(xi, j) from antenna 306_3 in FIG. 3.

When terminal #i labeled 902_*i* transmits "reference signal 1511_*j* according to j-th parameter in transmission panel antenna xi" illustrated in FIG. 15B, terminal #i labeled 902_*i* sets the multiplication coefficient in multiplier 304_4 in transmission panel antenna xi labeled 106_*xi* as w4(xi, j). When fourth transmission signal 303_4 of "reference signal 1511_*j* according to j-th parameter in transmission panel antenna xi" is tx4refj(t), multiplier 304_4 obtains tx4refj(t)×w4(xi, j). Then, terminal #i labeled 902_*i* transmits tx4refj(t)×w4(xi, j) from antenna 306_4 in FIG. 3.

Note that j is an integer from 1 to 4 (both inclusive) in the case of FIG. 15B. The number Z of parameter changes is four in FIG. 15B, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 22B, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

Information of the "transmission panel antenna and parameter" of base station #1 labeled 901_1 with high reception quality, as described above.

Thus, terminal #i labeled 902_*i* transmits the "information of the "transmission panel antenna and parameter" of base station #1 labeled 901_1 with high reception quality" in "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A.

In addition, terminal #i labeled 902_*i* transmits the "information of the "transmission panel antenna and parameter" of base station #1 labeled 901_1 with high reception quality" in "reference signal 1511_1 according to first parameter in transmission panel antenna xi", "reference signal 1511_2 according to second parameter in transmission panel antenna xi", "reference signal 1511_3 according to third parameter in transmission panel antenna xi", and "reference signal 1511_4 according to fourth parameter in transmission panel antenna xi" in FIG. 15B in "sector sweep reference signal 1501_1 in terminal #i transmission panel antenna 1", "sector sweep reference signal 15012 in terminal #i transmission panel antenna 2", . . . , "sector sweep reference signal 1501_M in terminal #i transmission panel antenna M" in FIG. 15A".

In this case, base station #1 labeled 901_1 is more likely to receive, even with an omnidirectional antenna for example, any of "sector sweep reference signal 1501_1 in terminal #i transmission panel antenna 1", "sector sweep reference signal 1501_2 in terminal #i transmission panel antenna 2", . . . , "sector sweep reference signal 1501_M in terminal #i transmission panel antenna M" in FIG. 15A" transmitted by terminal #i labeled 902_*i*. This is because terminal #i labeled 902_*i* performs transmit beamforming (directivity control). This produces the effect that base station #1 labeled 901_1 is more likely to receive the "information of the "transmission panel antenna and parameter" of base station #1 labeled 901_1 with high reception quality" transmitted by terminal #i labeled 902_*i*. Accordingly, base station #1 labeled 901_1 can transmit a modulation signal to terminal #i labeled 902_*i* based on the "information of the "transmission panel antenna and parameter" of base station #1 labeled 901_1 with high reception quality", and terminal #i labeled 902_*i* can receive the modulation signal with high reception quality.

In a case where a plurality of terminals transmit the sector sweep reference signals as in FIG. 22B, base station #1 labeled 901_1 can obtain the "information of the "transmission panel antenna and parameter" of base station #1 labeled 901_1 with high reception quality" from the plurality of terminals. This produces the effect that base station #1 labeled 901_1 can transmit modulation signals to the plurality of terminals based on the "information of the "transmission panel antenna and parameter" of base station #1 labeled 901_1 with high reception quality" from the plurality of terminals, and that the plurality of terminals can receive the modulation signals with high reception quality.

As illustrated in FIGS. 22B, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

Identification number (ID) of the transmission panel antenna, which corresponds to Xi here, for example; and Identification number (ID) of the parameter used for beamforming (directivity control), which corresponds to j here, for example.

Transmission of the "identification number (ID) of the transmission panel antenna" and the "identification number (ID) of the parameter used for beamforming (directivity control)" by terminal #i labeled 902_*i* allows base station #1 labeled 901_1 to recognize the "identification number (ID) of the transmission panel antenna" and the "identification number (ID) of the parameter used for beamforming (directivity control)" that have allowed successful reception, accordingly, terminal #i labeled 902_*i* and base station #1 labeled 90I_1 can perform appropriate control. This produces the effect of enhancing data reception quality.

Note that "reference signal 1511_*j* according to j-th parameter in transmission panel antenna xi" may include other information.

Further, as illustrated in FIGS. 22B, 15A, and 15B, when terminal #i labeled 902_*i* transmits "sector sweep reference signal 1501_*xi* in terminal #i transmission panel antenna xi", "reference signal 1511_*j* according to j-th parameter in transmission panel antenna xi" includes, for example, the following information:

"Information on the frequency band and/or frequency ♭p" that has been used for transmission by terminal #i labeled 902_*i* or that terminal #i labeled 902_*i* desires base station #1 labeled 901_1 to use.

Transmission of the "information on the frequency band and/or frequency ♭p" by terminal #i labeled 902_*i* allows base station #1 labeled 901_1 to recognize the "information on the frequency band and/or frequency ♭p"; accordingly, terminal #i labeled 902_*i* and base station #1 labeled 901_1 can perform appropriate control. This produces the effect of enhancing data reception quality.

Figure 23A:
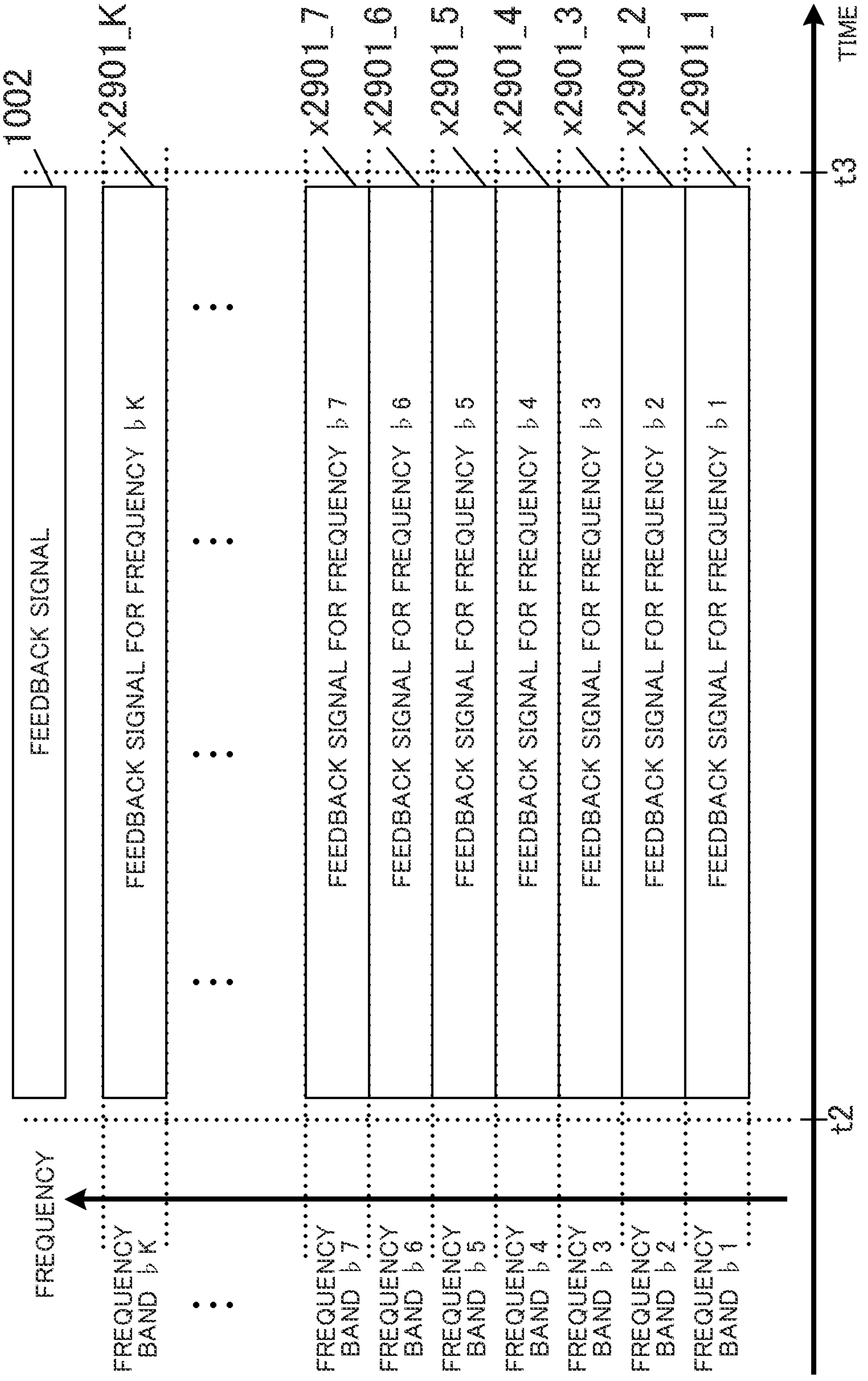
FIG. 23A illustrates an exemplary configuration of a feedback signal that is present in the time period from t2 to t3 in FIG. 10 and transmitted by base station #1.

FIG. 23A illustrates an exemplary configuration of feedback signal 1002 that is present in the time period from t2 to t3 in FIG. 10 and transmitted by base station #1 labeled 901_1. Note that the horizontal axis represents time and the vertical axis represents frequency in FIG. 23A. In this example, feedback signal 1002 includes areas for "feedback signal x2901_1 for frequency ♭1, feedback signal x2901_2 for frequency ♭2, feedback signal x2901_3 for frequency ♭3, feedback signal x2901_4 for frequency ♭4, feedback signal x2901_5 for frequency ♭5, feedback signal x2901_6 for frequency ♭6, feedback signal x2901_7 for frequency ♭7, . . . , feedback signal x2901_K for frequency ♭K" as illustrated in FIG. 23A.

Figure 23B:
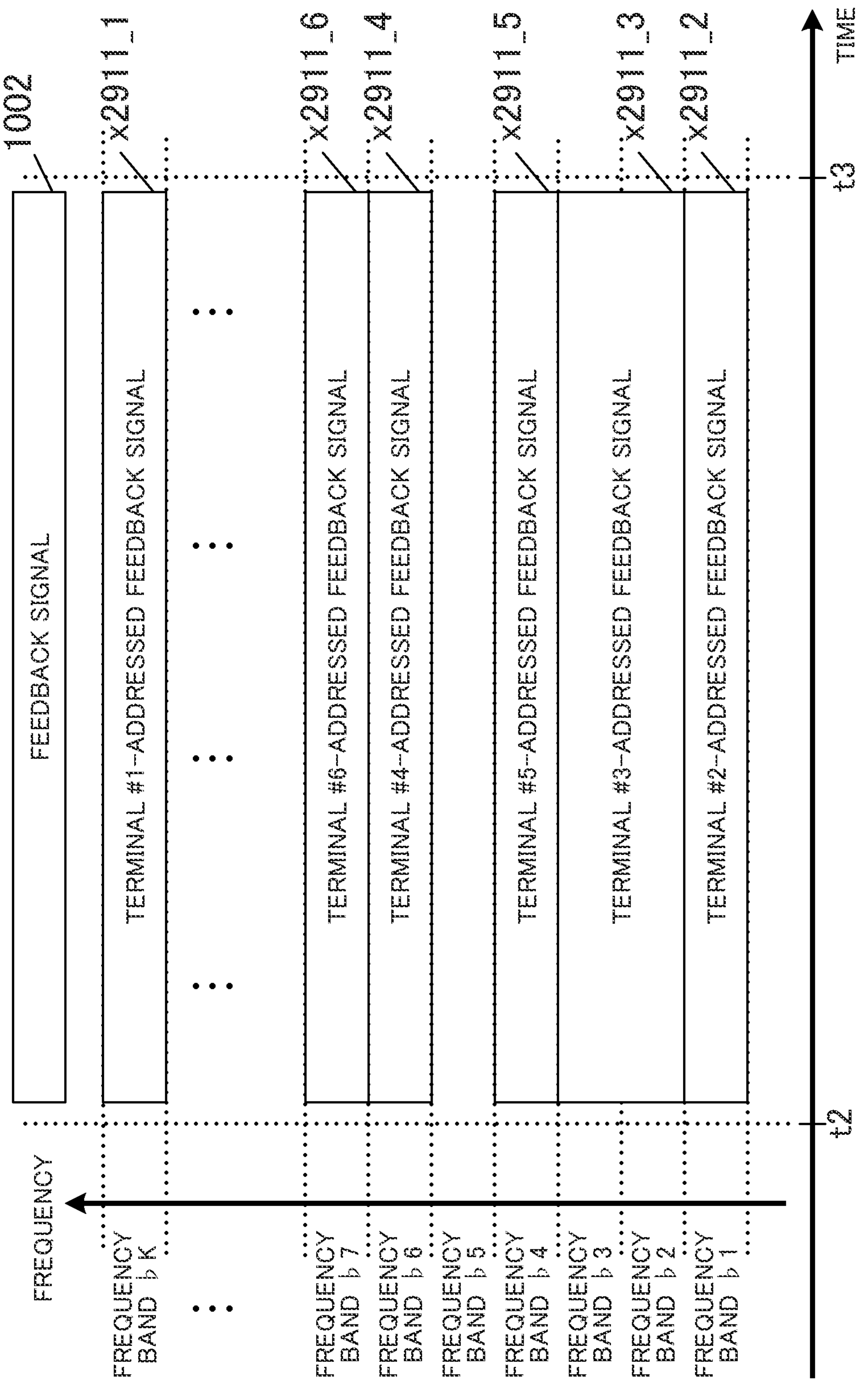
FIG. 23B illustrates exemplary specific feedback signal illustrated in FIG. 23A.

FIG. 23B illustrates exemplary specific feedback signal assignment for feedback signal 1002 in the areas for "feedback signal x2901_1 for frequency ♭1, feedback signal x2901_2 for frequency ♭2, feedback signal x2901_3 for frequency ♭3, feedback signal x2901_4 for frequency ♭4, feedback signal x2901_5 for frequency ♭5, feedback signal x2901_6 for frequency ♭6, feedback signal x2901_7 for frequency ♭7, . . . , feedback signal x2901_K for frequency ♭K" illustrated in FIG. 23A.

As in FIG. 22B, for example, terminal #1 labeled 902_1 transmits terminal #1 "sector sweep reference signal" x2811_1, terminal #2 labeled 902_2 transmits terminal #2 "sector sweep reference signal" x2811_2, terminal #3 labeled 902_3 transmits terminal #3 "sector sweep reference signal" x2811_3, and other terminals also transmit sector sweep reference signals.

As in FIG. 23B, base station #1 labeled 901_1 transmits terminal #1-addressed feedback signal x2911_1 using frequency band ♭K based on terminal #1 "sector sweep reference signal" x2811_1.

Base station #1 labeled 901_1 transmits terminal #2-addressed feedback signal x2911_2 using frequency band ♭1 based on terminal #2 "sector sweep reference signal" x2811_2 as in FIG. 23B.

Base station #1 labeled 901_1 transmits terminal #3-addressed feedback signal x2911_3 using frequency bands ♭2 and 63 based on terminal #3 "sector sweep reference signal" x2811_3 as in FIG. 23B.

Base station #1 labeled 90I_1 transmits terminal #4-addressed feedback signal x2911_4 using frequency band 66 based on terminal #4 "sector sweep reference signal" x2811_4 as in FIG. 23B.

Base station #1 labeled 901_1 transmits terminal #5-addressed feedback signal x2911_5 using frequency band ♭4 based on terminal #5 "sector sweep reference signal" x2811_5 as in FIG. 23B.

Base station #1 labeled 901_1 transmits terminal #6-addressed feedback signal x2911_6 using frequency band 67 based on terminal #6 "sector sweep reference signal" x2811_6 as in FIG. 23B.

In this manner, obtaining terminal #i-addressed feedback signal x2911_*i* allows terminal #i labeled 902_*i* to know that communication with base station #1 labeled 901_1 is available and to know the frequency band to be used. Note that FIG. 23B is merely an example. In a case where there is no terminal #1-addressed feedback signal x2911_1 as feedback signal 1002, for example, terminal #1 labeled 9021 recognizes that the communication with base station #1 labeled 901_1 has not been established.

At this time, terminal #i-addressed feedback signal 2911_*i* includes, for example, information indicating that communication with terminal #i labeled 902_*i* is available (or indicating that data-symbol-included frame 1003 in FIG. 10 includes a symbol addressed to terminal #i labeled 902_*i*).

Further, base station #1 labeled 901_1 selects a frequency (band) and a transmission panel antenna and sets a parameter of beamforming based on the "information of the "transmission panel antenna and parameter" of base station #1 labeled 901_1 with high reception quality" transmitted by terminal #i labeled 902_*i*, and base station #1 labeled 901_1 then transmits terminal #i-addressed feedback signal x2911_*i*. The "frequency (band) information" of base station #1 labeled 901_1 with high reception quality" transmitted by terminal #i labeled 902_*i* may be included.

Figure 24A:
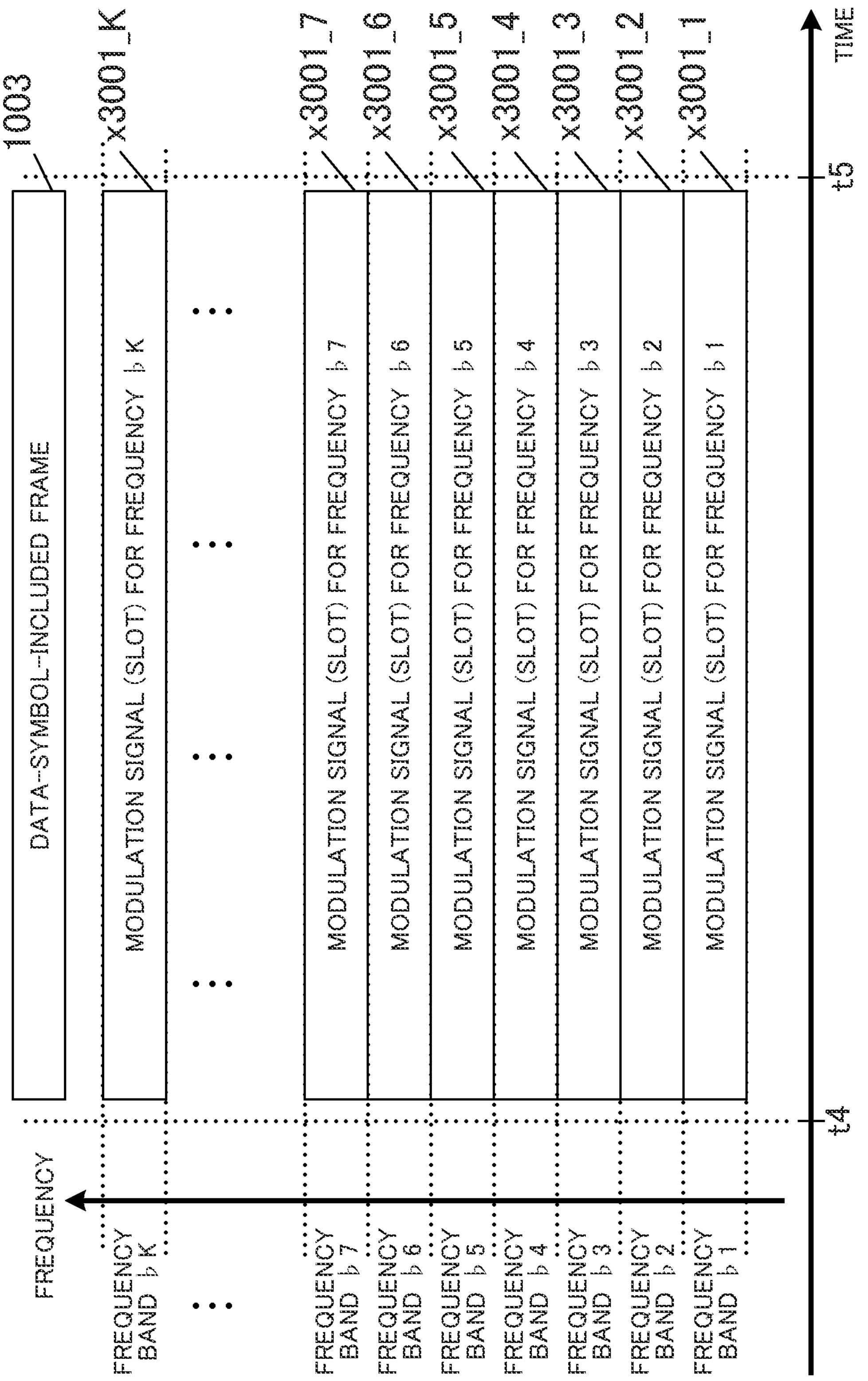
FIG. 24A illustrates an exemplary configuration of a data-symbol-included frame that is present in the time period from t4 to t5 in FIG. 10 and transmitted by base station #1.

FIG. 24A illustrates an exemplary configuration of data-symbol-included frame 1003 that is present in the time period from t4 to t5 in FIG. 10 and transmitted by base station #1 labeled 901_1. Note that the horizontal axis represents time and the vertical axis represents frequency in FIG. 24A. In this example, data-symbol-included frame 1003 includes areas for "modulation signal (slot) x3001_1 for frequency ♭1, modulation signal (slot) x3001_2 for frequency ♭2, modulation signal (slot) x3001_3 for frequency ♭3, modulation signal (slot) x3001_4 for frequency ♭4, modulation signal (slot) x3001_5 for frequency ♭5, modulation signal (slot) x3001_6 for frequency ♭6, modulation signal (slot) x3001_7 for frequency ♭7, . . . , modulation signal (slot) x3001_K for frequency ♭K" as illustrated in FIG. 24A.

Figure 24B:
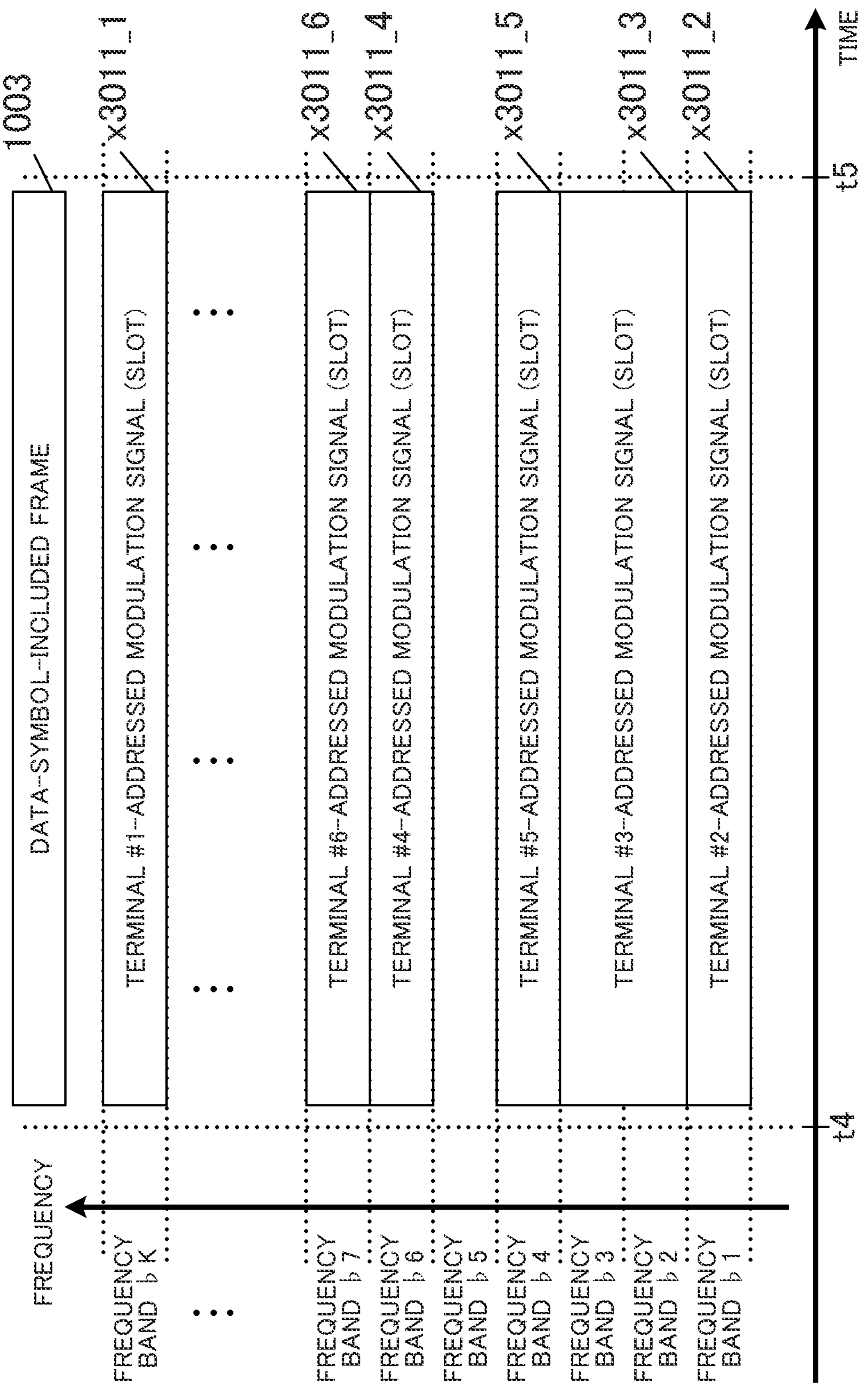
FIG. 24B illustrates exemplary assignment of modulation signals (slots) for frequency for the data-symbol-included frame illustrated in FIG. 24A.

FIG. 24B illustrates exemplary specific modulation signal (slot) assignment for data-symbol-included frame 1003 in the areas for "modulation signal (slot) x3001_1 for frequency ♭1, modulation signal (slot) x3001_2 for frequency ♭2, modulation signal (slot) x3001_3 for frequency ♭3, modulation signal (slot) x3001_4 for frequency ♭4, modulation signal (slot) x30015 for frequency ♭5, modulation signal (slot) x3001_6 for frequency ♭6, modulation signal (slot) x3001_7 for frequency ♭7, . . . , modulation signal (slot) x3001_K for frequency ♭K" illustrated in FIG. 24A.

As in FIG. 22B, for example, terminal #1 labeled 902_1 transmits terminal #1 "sector sweep reference signal" x2811_1, terminal #2 labeled 902_2 transmits terminal #2 "sector sweep reference signal" x2811_2, terminal #3 labeled 902_3 transmits terminal #3 "sector sweep reference signal" x2811_3, and other terminals also transmit sector sweep reference signals.

As in FIG. 24B, base station #1 labeled 901_1 transmits terminal #1-addressed modulation signal (slot) x3011_1 using frequency band ♭K based on terminal #1 "sector sweep reference signal" x2811_1.

Base station #1 labeled 901_1 transmits terminal #2-addressed modulation signal (slot) x3011_2 using frequency band ♭1 based on terminal #2 "sector sweep reference signal" x2811_2 as in FIG. 24B.

Base station #1 labeled 901_1 transmits terminal #3-addressed modulation signal (slot) x3011_3 using frequency bands ♭2 and 63 based on terminal #3 "sector sweep reference signal" 2811_3 as in FIG. 24B.

Base station #1 labeled 901_1 transmits terminal #4-addressed modulation signal (slot) x3011_4 using frequency band 66 based on terminal #4 "sector sweep reference signal" 2811_4 as in FIG. 24B.

Base station #1 labeled 901_1 transmits terminal #5-addressed modulation signal (slot) x3011_5 using frequency band♭4 based on terminal #5 "sector sweep reference signal" 2811_5 as in FIG. 24B.

Base station #1 labeled 901_1 transmits terminal #6-addressed modulation signal (slot) x3011_6 using frequency band 67 based on terminal #6 "sector sweep reference signal" 2811_6 as in FIG. 24B.

At this time, terminal #i-addressed modulation signal (slot) x3011_*i* includes, for example, a data symbol (data and/or information) addressed to terminal #i labeled 902_*i*.

In this manner, terminal #i-addressed modulation signal (slot) x3011_*i* allows terminal #i labeled 902_*i* to know that communication with base station #1 labeled 901_1 is available and to know the frequency band to be used. Note that FIG. 24B is merely an example. In a case where there is no terminal #1-addressed modulation signal (slot) x3011_1 as data-symbol-included frame 1003, for example, terminal #1 labeled 902_1 recognizes that the communication with base station #1 labeled 901_1 has not been established.

Further, base station #1 labeled 901_1 selects a frequency (band) and a transmission panel antenna and sets a parameter of beamforming based on the "information of the "transmission panel antenna and parameter" of base station #1 labeled 901_1 with high reception quality" transmitted by terminal #i labeled 902_*i*, and base station #1 labeled 901_1 then transmits terminal #i-addressed modulation signal (slot) x3011_*i*. The ""frequency (band) information" of base station #1 labeled 901_1 with high reception quality" transmitted by terminal #i labeled 902_*i* may be included.

Note that, in FIGS. 23A and 23B, base station #1 labeled 901_1 may estimate the "frequency (band)" and the "transmission panel antenna and parameter" of terminal #i labeled 902_1 with high reception quality in receiving "terminal #i "sector sweep reference signal" x281_1_*i* transmitted by terminal #i labeled 902_*i*", and the estimated information may be included in terminal #i-addressed feedback signal x2911_*i*.

Terminal #i labeled 902_*i* selects a frequency (band) and a transmission panel antenna and determines a beamforming method based on the information of "frequency (band)" and "transmission panel antenna and parameter" of terminal #i labeled 902_*i* with high reception quality obtained from base station #1 labeled 901_1, and terminal #i labeled 902_*i* then transmits a symbol, a frame, and/or a modulation signal to base station #1 labeled 901_1. This produces the effect of enhancing data reception quality in base station #1 labeled 901_1.

Incidentally, in the time period from t3 to t4 in FIG. 10, terminal #i labeled 902_*i* may transmit, to base station #1 labeled 901_1, a modulation signal including information indicating successful reception of a signal from base station #1 labeled 901_1, such as acknowledgement (ACK).

Note that, terminal #i-addressed modulation signal (slot) x301_*i* in FIG. 24B may include, in addition to the data symbol, a "reference signal such as a demodulation reference signal (DMRS), phase tracking reference signal (PTRS), or sounding reference signal (SRS)", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of the modulation and coding scheme (MCS), and the like.

FIG. 18 illustrates an exemplary state where base station #1 labeled 901_1 and "terminal #1 labeled 902_1, terminal #2 labeled 902_2, terminal #3 labeled 902_3, terminal #4 labeled 902_4, terminal #5 labeled 902_5, and terminal #6 labeled 902_6" communicate with each other as illustrated in FIG. 9. (A) of FIG. 18 illustrates an exemplary modulation signal transmission state of base station #1 labeled 901_1, and (B) of FIG. 18 illustrates an exemplary modulation signal transmission state of "terminal #1 labeled 902_1, terminal #2 labeled 902_2, terminal #3 labeled 902_3, terminal #4 labeled 902_4, terminal #5 labeled 902_5, and terminal #6 labeled 902_6". Note that the horizontal axes represent time in (A) and (B) of FIG. 18.

First, base station #1 labeled 901_1 transmits sector sweep reference signal 1801_1. Note that this has already been described with reference to FIG. 10, and the description thereof will be thus omitted.

Then, a terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_1. Note that this has already been described with reference to, for example, FIGS. 21, 22A, 22B, 15A, 15B, etc.

Base station #1 labeled 901_1 transmits feedback signal 1802_1. Note that this has already been described with reference to FIGS. 23A and 23B, and the description thereof will be thus omitted.

After that, base station #1 labeled 901_1 transmits "data-symbol-included frame 1803_1". Note that this has already been described with reference to FIGS. 24A and 24B, and the description thereof will be thus omitted. (Hence, "data-symbol-included frame 1803_1" is considered to be a frame for downlink, for example).

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_1". Note that a configuration of the frame will be described later with reference to FIGS. 25A, 25B, 25C. 25D, 25E, and 25F. (Hence, "data-symbol-included frame 1852_1" is considered to be a frame for uplink, for example).

Next, base station #1 labeled 901_1 transmits "data-symbol-included frame 1803_2". Note that a configuration method of "data-symbol-included frame 1803_2" is as described with reference to FIGS. 24A and 24B.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_2". Note that a configuration of the frame will be described later with reference to FIGS. 25A, 25B, 25C, 25D, 25E, and 25F.

FIG. 19 illustrates an exemplary modulation signal transmission state of base station #1 labeled 901_1 and an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" after the state in FIG. 18.

(A) of FIG. 19 illustrates an exemplary modulation signal transmission state of base station #1 labeled 901_1, and it is a temporal continuation from the modulation signal transmission state of base station #1 labeled 901_1 in (A) of FIG. 18.

(B) of FIG. 19 illustrates an exemplary modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6", and it is a temporal continuation from the modulation signal transmission state of the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" in (B) of FIG. 18.

Note that the horizontal axes represent time in (A) and (B) of FIG. 19.

After the states in (A) and (B) of FIG. 18, base station #1 labeled 901_1 transmits "data-symbol-included frame 1803_3". Note that a configuration method of "data-symbol-included frame 1803_3" is as described with reference to FIGS. 24A and 24B.

The terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_3". Note that a configuration of the frame will be described later with reference to FIGS. 25A, 25B, 25C, 25D, 25E, and 25F.

Next, base station #1 labeled 901_1 transmits sector sweep reference signal 1801_2. Note that this has already been described with reference to FIG. 10, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits sector sweep reference signal 1851_2. Note that this has already been described with reference to, for example, FIGS. 21, 22A, 22B, 15A, 15B, etc., and the description thereof will be thus omitted.

Base station #1 labeled 901_1 transmits feedback signal 1802_2. Note that this has already been described with reference to FIGS. 23A and 23B, and the description thereof will be thus omitted.

After that, base station #1 labeled 901_1 transmits "data-symbol-included frame 1803_4". Note that this has already been described with reference to FIGS. 24A and 24B, and the description thereof will be thus omitted.

Then, the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" transmits "data-symbol-included frame 1852_4". Note that a configuration of the frame will be described later with reference to FIGS. 25A, 25B, 25C, 25D, 25E, and 25F.

As described above, base station #1 labeled 901_1 and the terminal transmit the sector sweep reference signals before the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"", and again transmit the sector sweep reference signals after the "transmission of the "data-symbol-included frames" by base station #1 labeled 901_1 and/or the transmission of the "data-symbol-included frames" by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6"". Base station #1 labeled 901_1 and the terminal then each configure a frequency (band), select a transmission panel antenna to be used, and configure transmit beamforming. This produces the effect that the base station and/or the terminal achieve high data reception quality.

Next, a description will be given of an exemplary configuration of "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" with reference to FIGS. 25A, 25B, 25C, 25D, 25E, and 25F. Note that i is an integer equal to or greater than 1, for example, and the horizontal axis represents time and the vertical axis represents frequency in FIGS. 25A, 25B, 25C, 25D, 25E, and 25F.

As illustrated in FIGS. 25A, 25B, 25C, 25D, 25E, and 25F, there are frequency band 61, frequency band ♭2, frequency band ♭3, frequency band ♭4, frequency band ♭5, frequency band ♭6, frequency band ♭7, . . . , frequency band ♭K for "data-symbol-included frame 1852_*i*".

Figure 25A:
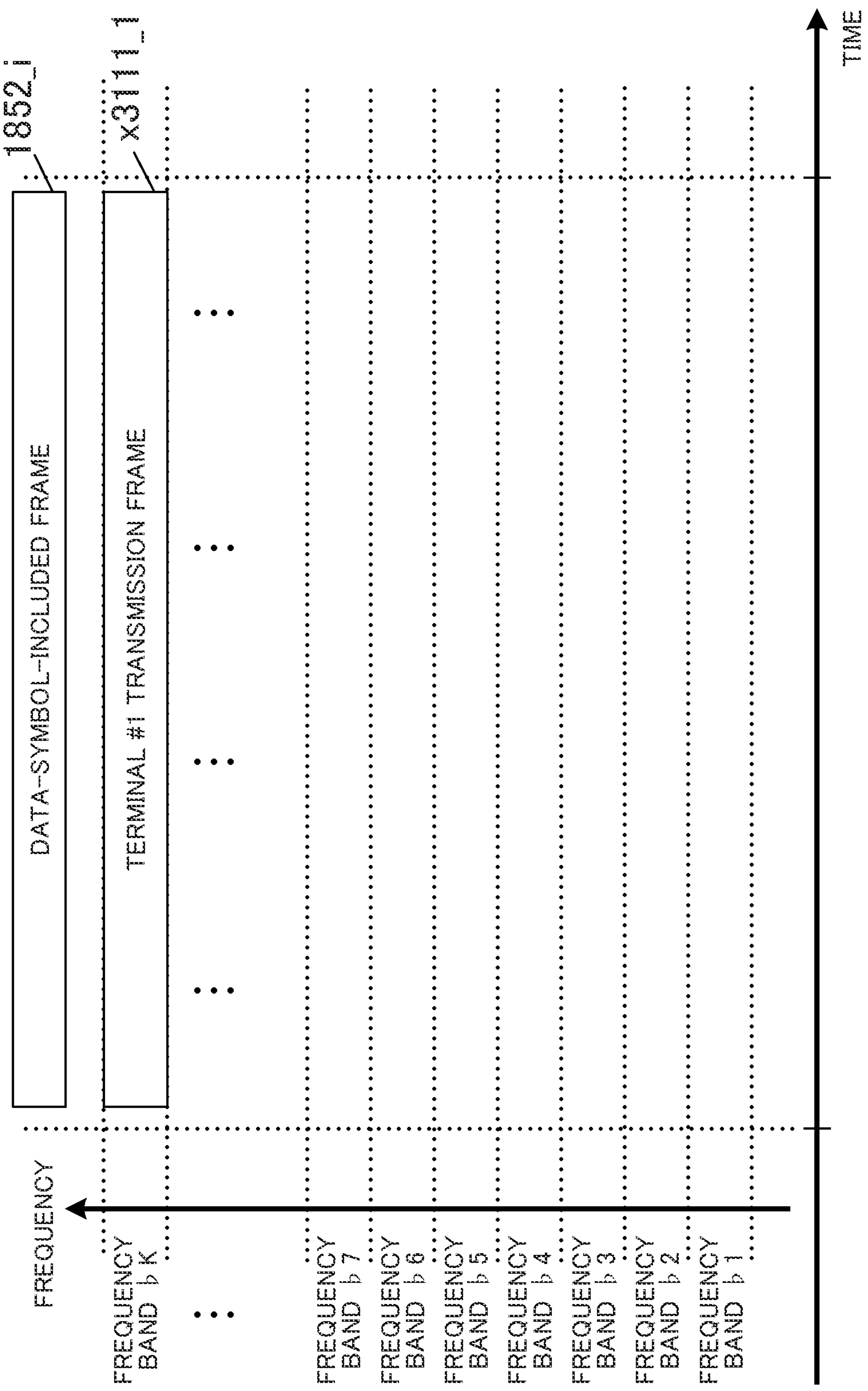
FIG. 25A illustrates an exemplary configuration of a data-symbol-included frame transmitted by a terminal.

FIG. 25A illustrates "data-symbol-included frame 1852_*i*" transmitted by terminal #1 labeled 902_1, and terminal #1 labeled 902_1 transmits "terminal #1 transmission frame (including a data symbol) x3111_1" using frequency band ♭K as illustrated in FIG. 25A.

Figure 25B:
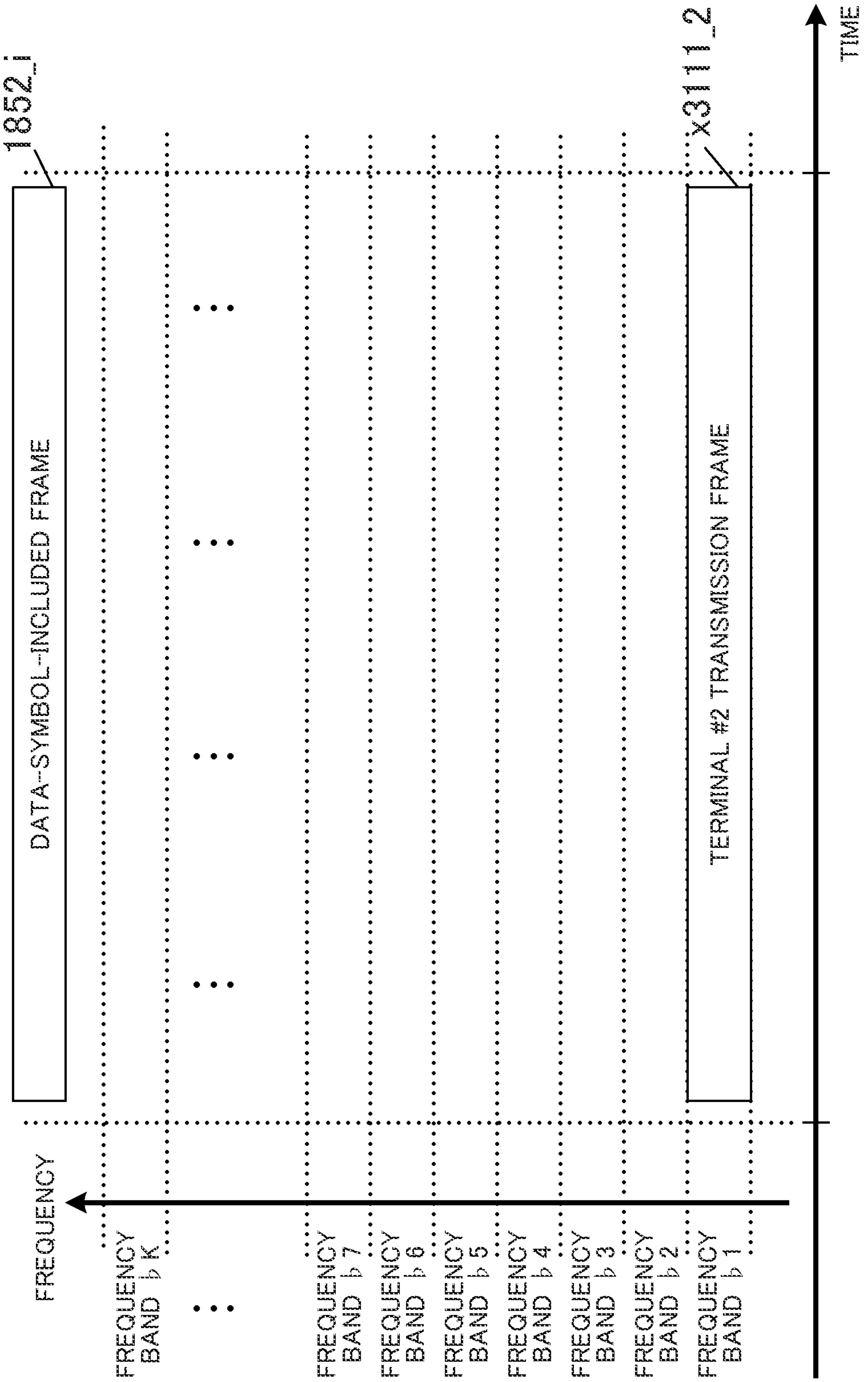
FIG. 25B illustrates an exemplary configuration of a data-symbol-included frame transmitted by a terminal.

FIG. 25B illustrates "data-symbol-included frame 1852_*i*" transmitted by terminal #2 labeled 902_2, and terminal #2 labeled 902_2 transmits "terminal #2 transmission frame (including a data symbol) x3111_2" using frequency band ♭1 as illustrated in FIG. 25B.

Figure 25C:
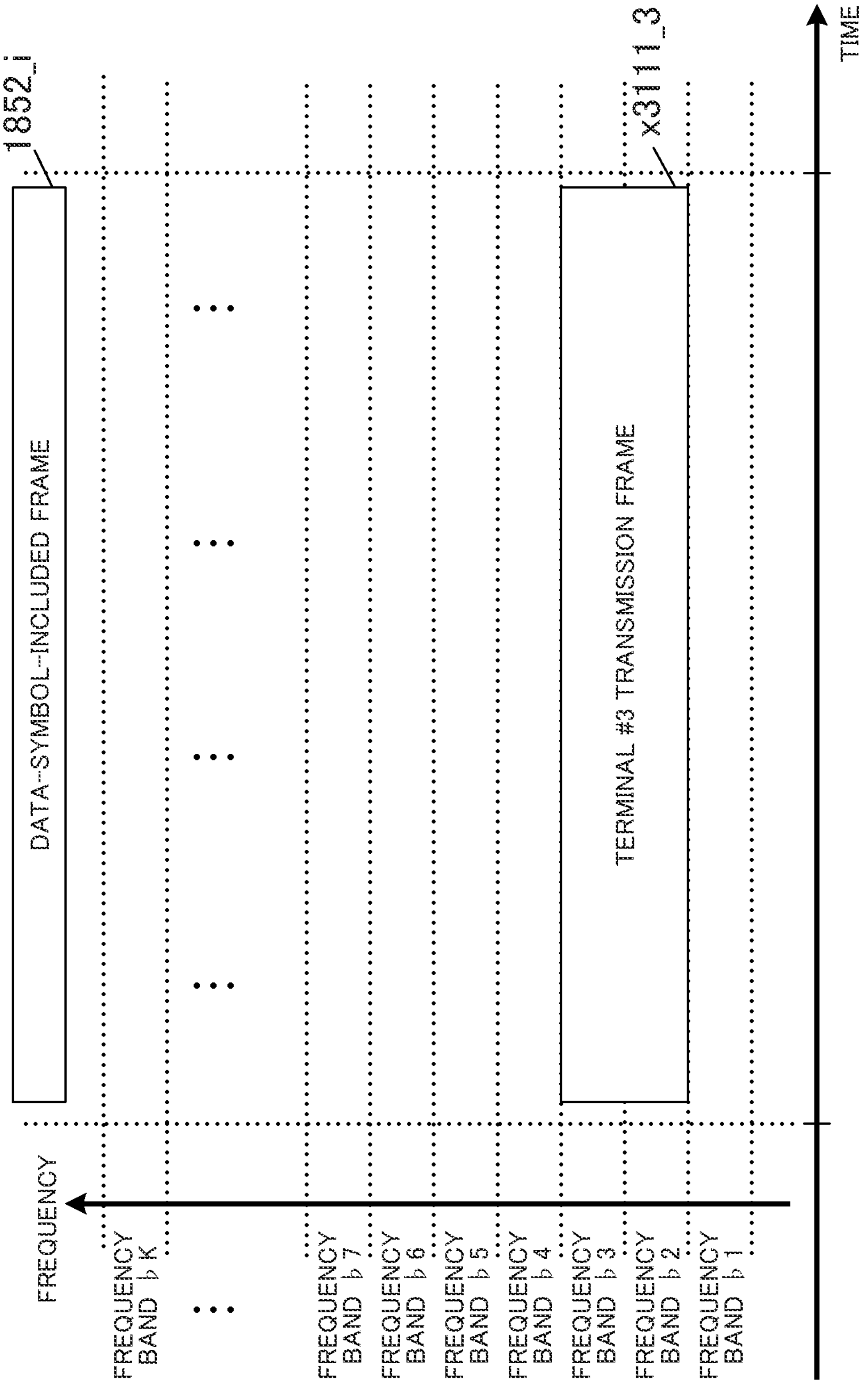
FIG. 25C illustrates an exemplary configuration of a data-symbol-included frame transmitted by a terminal.

FIG. 25C illustrates "data-symbol-included frame 1852_*i*" transmitted by terminal #3 labeled 902_3, and terminal #3 labeled 902_3 transmits "terminal #3 transmission frame (including a data symbol) x3111_3" using frequency bands ♭2 and 63 as illustrated in FIG. 25C.

Figure 25D:
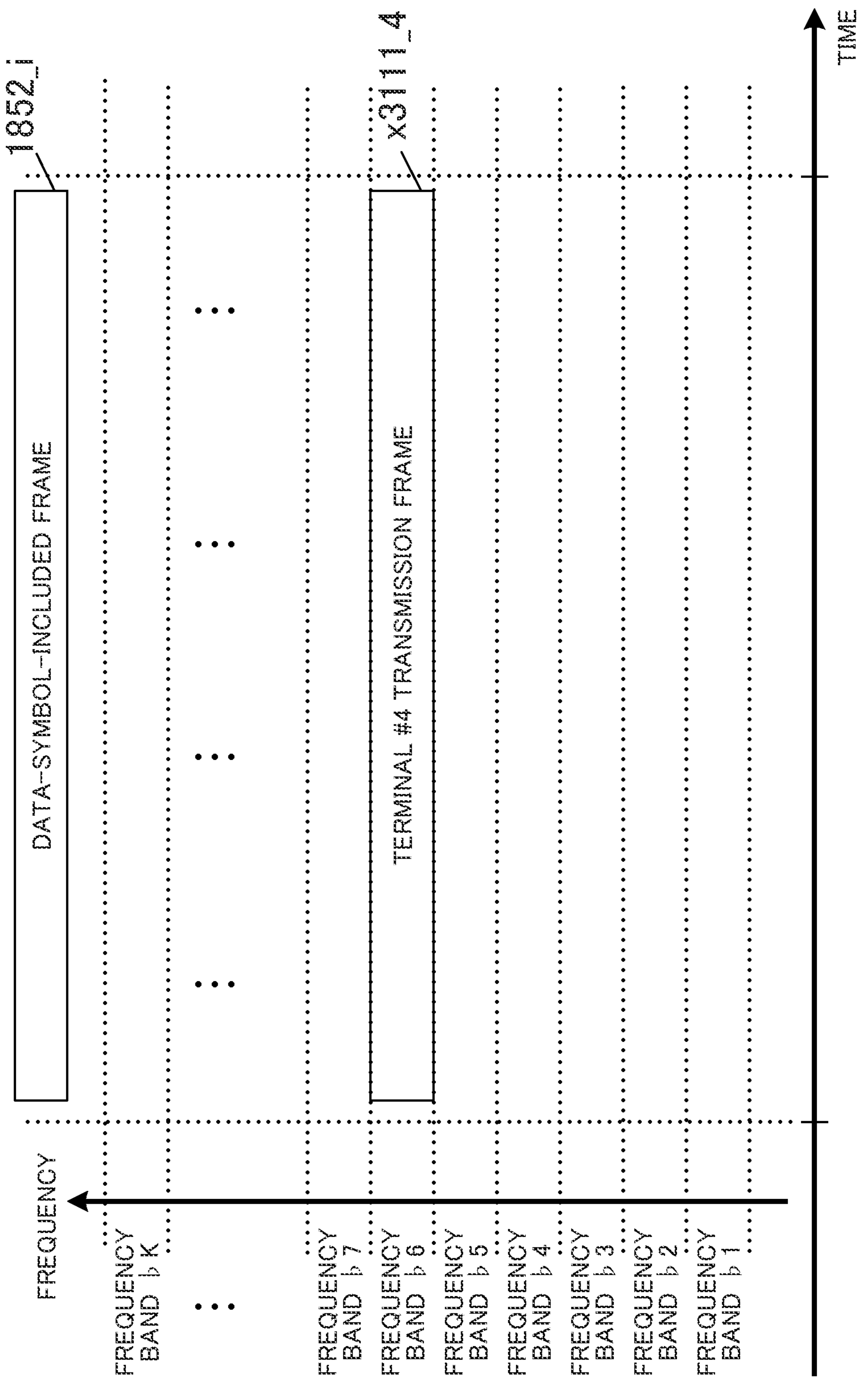
FIG. 25D illustrates an exemplary configuration of a data-symbol-included frame transmitted by a terminal.

FIG. 25D illustrates "data-symbol-included frame 1852_*i*" transmitted by terminal #4 labeled 902_4, and terminal #4 labeled 902_4 transmits "terminal #4 transmission frame (including a data symbol) x3111_4" using frequency band 66 as illustrated in FIG. 25D.

Figure 25E:
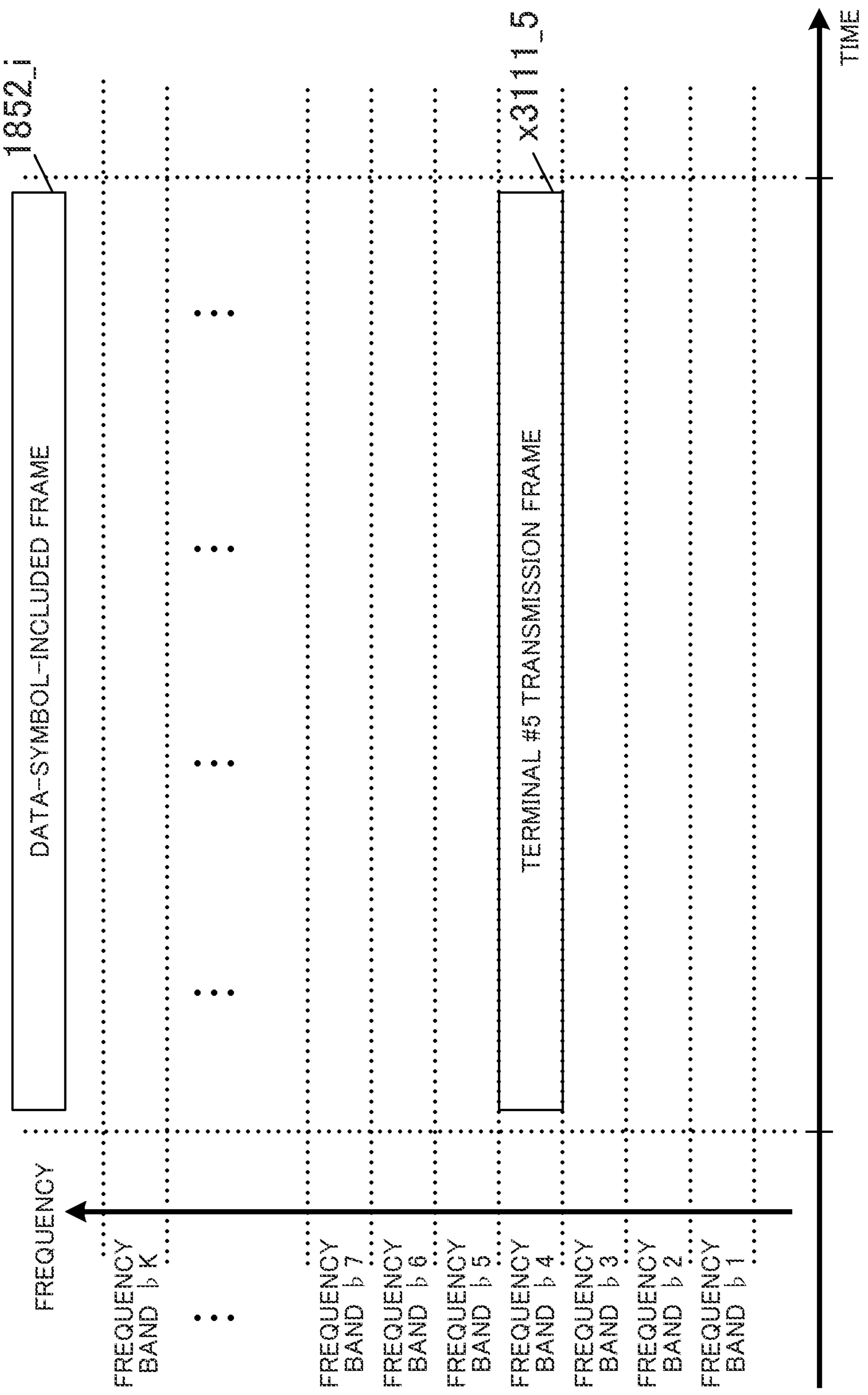
FIG. 25E illustrates an exemplary configuration of a data-symbol-included frame transmitted by a terminal.

FIG. 25E illustrates "data-symbol-included frame 1852_*i*" transmitted by terminal #5 labeled 902_5, and terminal #5 labeled 902_5 transmits "terminal #5 transmission frame (including a data symbol) x3111_5" using frequency band ♭4 as illustrated in FIG. 25E.

Figure 25F:
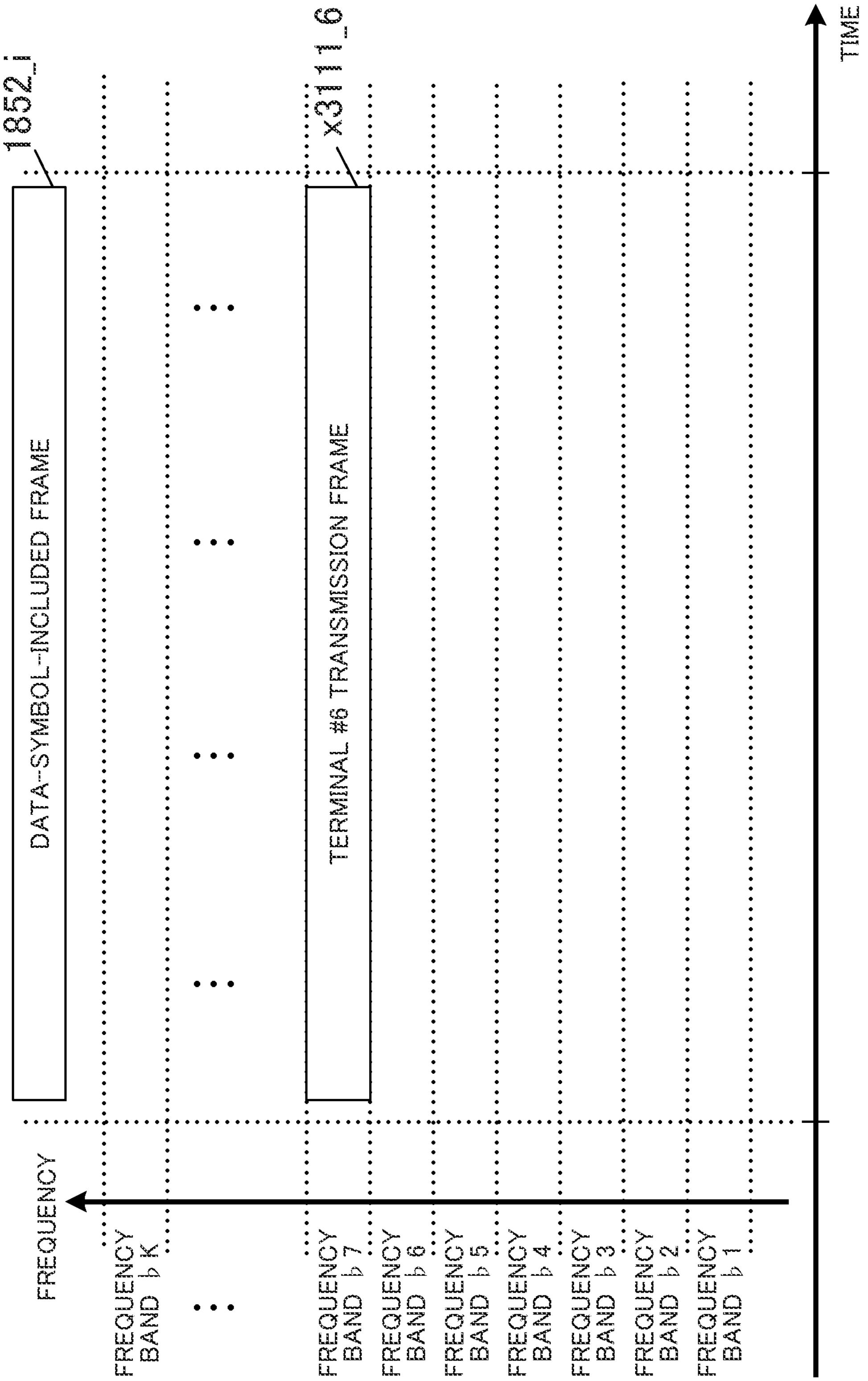
FIG. 25F illustrates an exemplary configuration of a data-symbol-included frame transmitted by a terminal.

FIG. 25F illustrates "data-symbol-included frame 1852_*i*" transmitted by terminal #6 labeled 902_6, and terminal #6 labeled 902_6 transmits "terminal #6 transmission frame (including a data symbol) x**31*ll*_6" using frequency band 67 as illustrated in FIG. 25**F.

As described above, "data-symbol-included frame 1852_*i*" transmitted by the terminal such as "terminal #1 labeled 902_1, terminal #2 labeled 902_2, terminal #3 labeled 902_3, terminal #4 labeled 902_4, terminal #5 labeled 902_5, and terminal #6 labeled 902_6" is subjected to, for example, frequency division (OFDMA here) and transmitted by each terminal, and base station #1 labeled 901_1 receives the frame transmitted by the terminal, thereby preventing interference and achieving high data reception quality.

Note that terminal #1 transmission frame x3111_1, terminal #2 transmission frame x311_2, terminal #3 transmission frame x3111_3, terminal #4 transmission frame x31_11_4, terminal #5 transmission frame x3111_5, and terminal #6 transmission frame x3111_6 in FIGS. 25A, 25B, 25C, 25D, 25E, and 25F may include, in addition to the data symbol, a "reference signal such as DMRS, PTRS, or SRS", a pilot symbol, a pilot signal, a preamble, and a symbol including control information, for example.

In FIGS. 25A, 25B, 25C, 25D, 25E, and 25F, a description has been given of a case where the terminals perform frequency division on the frames to be transmitted, but the terminals may perform spatial division on the frames to be transmitted using multi user-multiple-input multiple-output (MU-MIMO).

Note that, although the present embodiment has provided a description of a case where frequency (bands) for signals transmitted by a base station and frequency (bands) for signals transmitted by a terminal are the same or partially overlap each other, by way of example, the same can be implemented in a case where frequency (bands) for signals transmitted by a base station and frequency (bands) for signals transmitted by a terminal are different or partially different from each other.

Further, the present embodiment has provided a description of a case where a terminal transmits a modulation signal in a multi-carrier scheme such as OFDM, for example, but the scheme is not limited to this. For example, a terminal may transmit a signal in a single-carrier scheme when transmitting a signal of a frame in FIGS. 14, 20A, 20B, 20C, 20D, 20E, 20F, etc.

In FIG. 14, for example, terminal #1 labeled 902_1 may transmit terminal #1 "sector sweep reference signal" 1401_1 in frequency band ♭K in a single-carrier scheme. Further, in FIG. 20A, terminal #1 labeled 902_1 may transmit "terminal #1 transmission frame" 2001_1 in frequency band ♭K in a single-carrier scheme. Note that other terminals may also transmit a signal in a single-carrier scheme.

Embodiment 3

In Embodiment 3, a description will be given of a communication system, communication apparatus, and communication method using sector sweep in a case where a base station and a terminal performs transmission in a single-carrier scheme. Note that the drawings used in Embodiment 1 are sometimes used in the following description of Embodiment 3.

FIGS. 1A, 1B, and 1C illustrate exemplary configurations of, for example, a base station, an access point, a terminal, and a repeater according to Embodiment 3, and the description of the detailed operations will be omitted since they have already been described with reference to FIGS. 2, 3, 4, 5, 6, 7, and 8. For FIGS. 2, 3, 4, 5, 6, 7, and 8, the description of the detailed operations will also be omitted since they have already been described.

For example, examples of the single-carrier scheme include "discrete Fourier transform (DFT)-spread orthogonal frequency division multiplexing (OFDM)" (DFT-S OFDM), "trajectory constrained DFT-spread OFDM", "constrained DFT-spread OFDM" (constrained DFT-S OFDM), "OFDM based single carrier (SC)", "single carrier (SC)-frequency division multiple access (FDMA)", "guard interval DFT-spread OFDM", a time-domain implementation single carrier scheme (e.g., single carrier (SC)-QAM), and the like.

Figure 26:
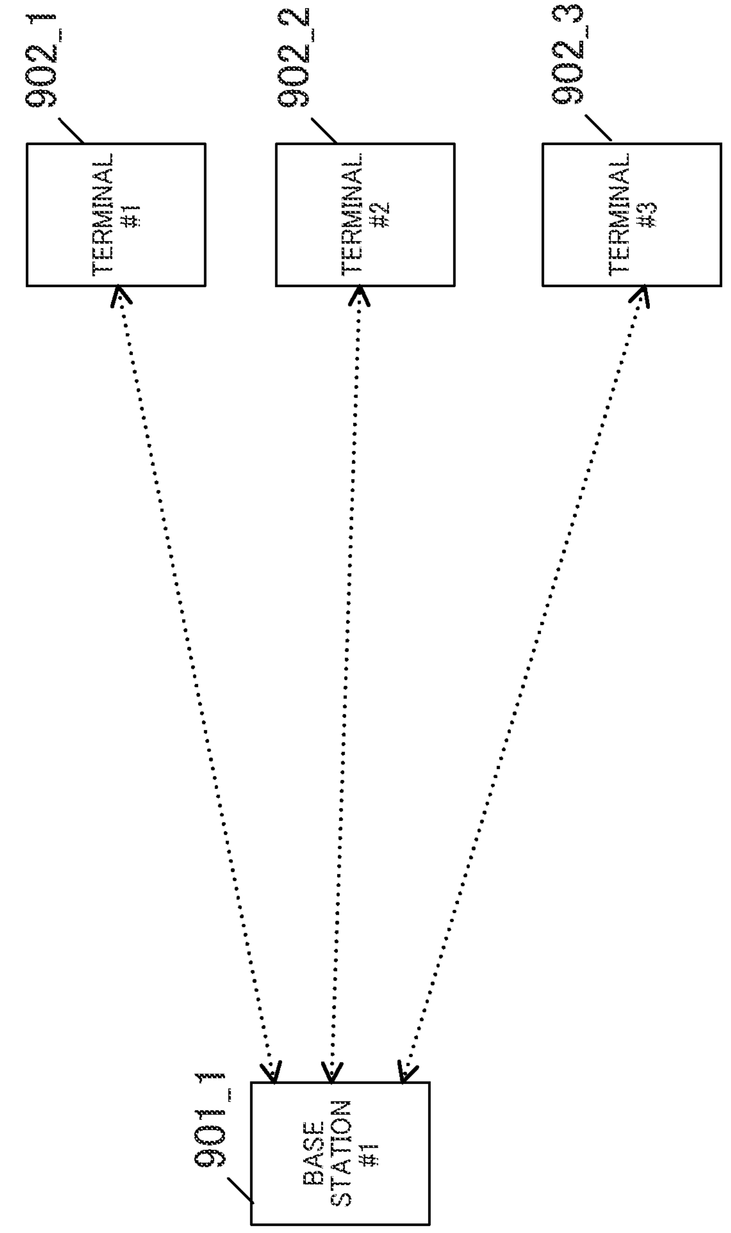
FIG. 26 illustrates an exemplary communication state according to Embodiment 3.

FIG. 26 illustrates an exemplary communication state in Embodiment 3. As illustrated in FIG. 26, a case to be discussed is where base station #1 labeled 901_1 communicates with terminal #1 labeled 902_1, terminal #2 labeled 902_2, and terminal #3 labeled 902_3. A relationship between abase station and terminals, however, is not limited to this example, and the base station may communicate with one or more terminals, for example.

Note that the following description is about an exemplary case where the base station and the terminals perform time division duplex (TDD), time division multiple access (TDMA), or time division multiplexing (TDM).

FIG. 10 illustrates an example of modulation signal 1000 transmitted by base station #1 labeled 901_1 in FIG. 26. In FIG. 10, the horizontal axis represents time. In the time period from time t0 to t1, sector sweep (sector-sweep level) reference signal 1001 is present. Note that sector sweep reference signal 1001 will be described later.

The time period from time t1 to t2 is a terminal response period. Note that the terminal response will be described later.

In the time period from time t2 to t3, feedback signal 1002 is present. Note that feedback signal 1002 will be described later.

In the time period from time t4 to t5, data-symbol-included frame 1003 is present. Note that data-symbol-included frame 1003 will be described later.

The reference signal for sector sweep is referred to as sector sweep reference signal 1001 in FIG. 10, but the name is not limited thereto and may be a reference signal, a reference symbol, a training signal, a training symbol, or the like. The signal denoted by reference sign 1002 is referred to as feedback signal 1002, but the name is not limited thereto and may be a feedback symbol, a terminal-addressed signal, a terminal-addressed symbol, a control signal, a control symbol, or the like. In addition, the frame including a data symbol is referred to as data-symbol-included frame 1003, but the name is not limited thereto and may be a frame, slot, mini-slot, unit, or the like.

Figure 27:
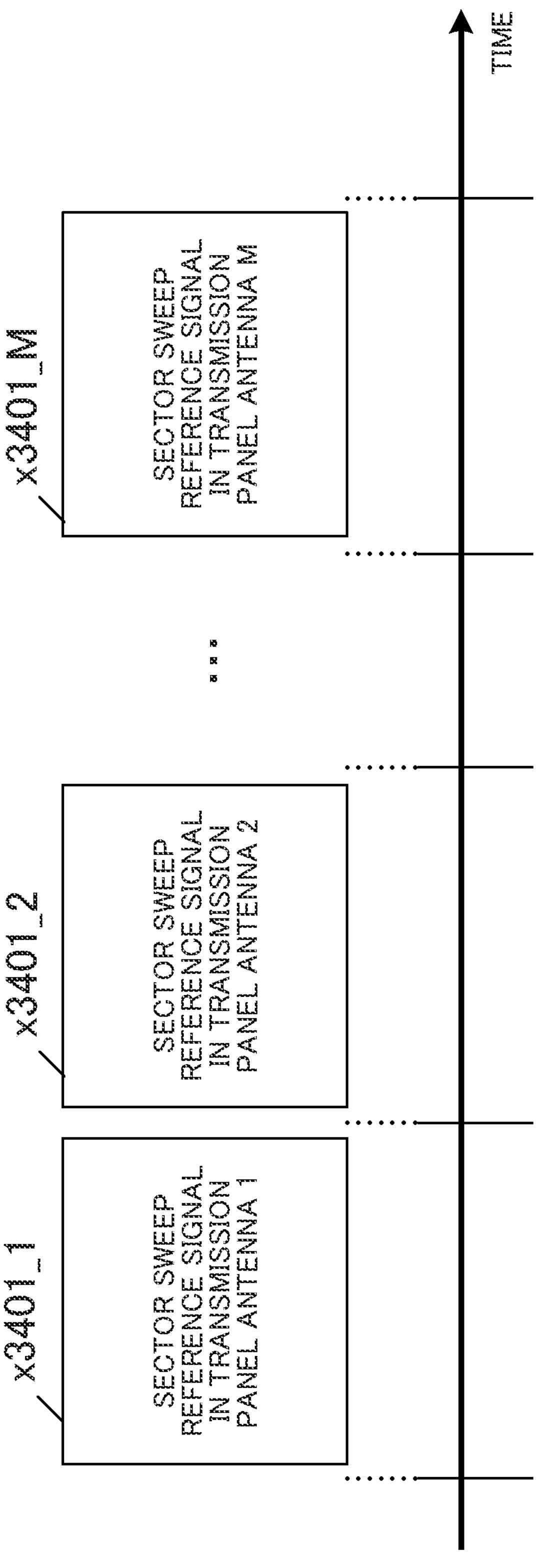
FIG. 27 illustrates exemplary sector sweep reference signals in FIG. 10 transmitted by base station #1 in FIG. 26.

FIG. 27 illustrates examples of sector sweep reference signal 1001 in FIG. 10 transmitted by base station #1 labeled 901_1 in FIG. 26. Note that the horizontal axis represents time in FIG. 27.

For example, base station #1 labeled 901_1 with the configuration in FIG. 1A, 1B, or 1C transmits sector sweep reference signal x3401_1 in transmission panel antenna 1 from transmission panel antenna 1 labeled 106_1.

That is, as illustrated in FIG. 27, base station #1 labeled 901_1 with the configuration in FIG. 1A, 1B, or 1C transmits sector sweep reference signal x3401_*i* in transmission panel antenna i from transmission panel antenna i labeled 106_*i*. Note that i is an integer from 1 to M (both inclusive).

Figure 28:
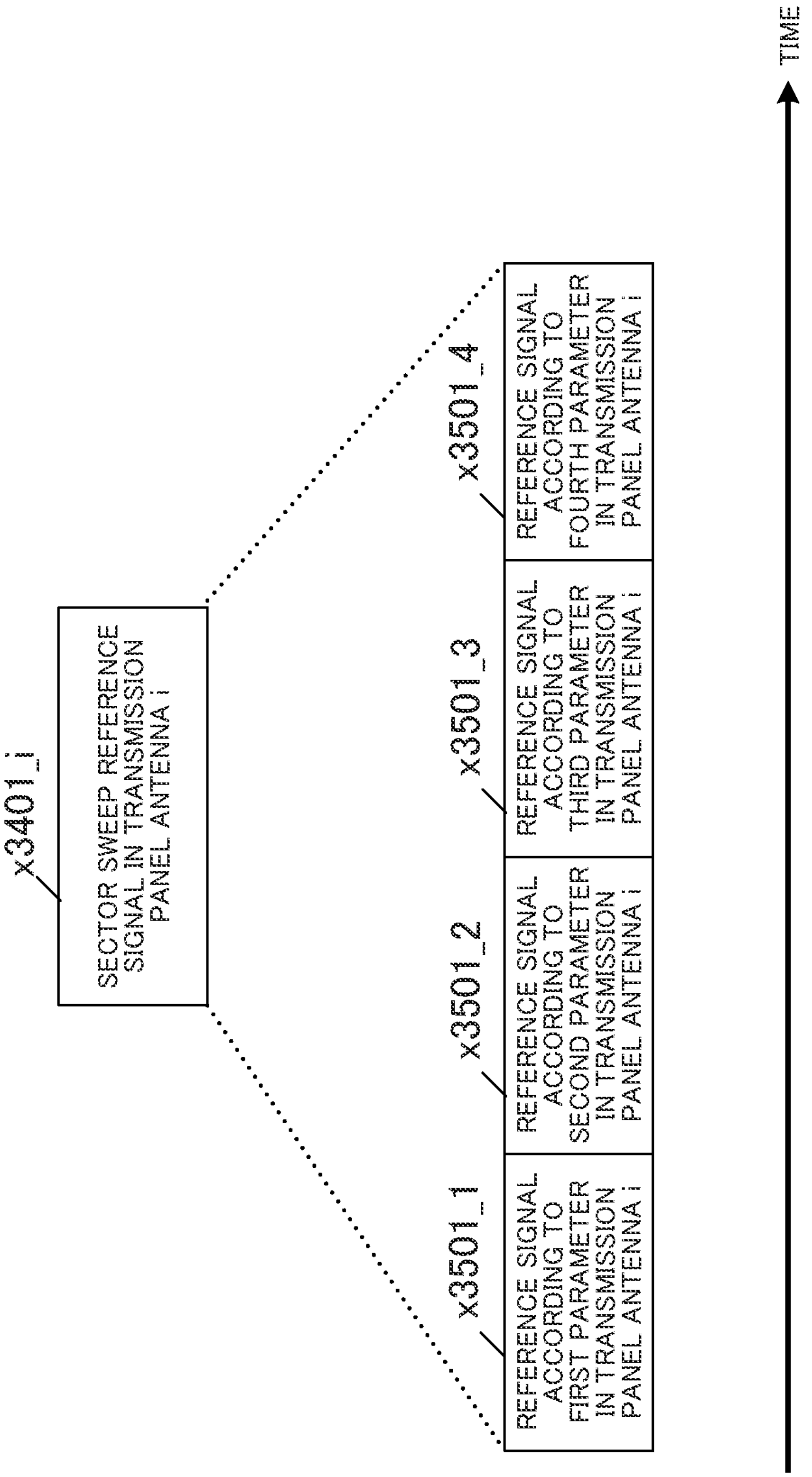
FIG. 28 illustrates an exemplary configuration of a "sector sweep reference signal in transmission panel antenna i" in FIG. 27.

FIG. 28 illustrates an exemplary configuration of "sector sweep reference signal x3401_*i* in transmission panel antenna i" in FIG. 27. Note that the horizontal axis represents time in FIG. 28.

For example, base station #1 labeled 901_1 with the configuration in FIG. 1A, 1B, or 1C includes the configuration in FIG. 3 as transmission panel antenna i labeled 106_*i*.

A description will be given of "reference signal x3501_1 according to first parameter in transmission panel antenna i".

When base station #1 labeled 901_1 transmits "reference signal x3501_1 according to first parameter in transmission panel antenna i" illustrated in FIG. 28, base station #1 labeled 901_1 sets the multiplication coefficient in multiplier 304_1 in transmission panel antenna i labeled 106_*i* as w1(i, 1). When first transmission signal 303_1 of "reference signal x3501_1 according to first parameter in transmission panel antenna i" is tx1ref1(t), multiplier 304_1 obtains tx1ref1(t)×w1(i, 1). Then, base station #1 labeled 901_1 transmits tx1ref1(t)×w1(i, 1) from antenna 306_1 in FIG. 3. Note that t represents time.

When base station #1 labeled 901_1 transmits "reference signal x3501_1 according to first parameter in transmission panel antenna i" illustrated in FIG. 28, base station #1 labeled 901_1 sets the multiplication coefficient in multiplier 304_2 in transmission panel antenna i labeled **106_*i* as w2(i, 1). When second transmission signal 303_2 of "reference signal x3501_1 according to first parameter in transmission panel antenna i" is tx2ref1(t), multiplier 304_2 obtains tx2ref1(t)×w2(i, 1). Then, base station #1 labeled 901_1 transmits tx2ref1(t)×w2(i, 1) from antenna 306_2 in FIG. 3**.

When base station #1 labeled 901_1 transmits "reference signal x3501_1 according to first parameter in transmission panel antenna i" illustrated in FIG. 28, base station #1 labeled 901_1 sets the multiplication coefficient in multiplier 304_3 in transmission panel antenna i labeled **106_*i* as w3(i, 1). When third transmission signal 303_3 of "reference signal x3501_1 according to first parameter in transmission panel antenna i" is tx3ref1(t), multiplier 304_3 obtains tx3ref1(t)×w3(i, 1). Then, base station #1 labeled 901_1 transmits tx3ref1(t)×w3(i, 1) from antenna 306_3 in FIG. 3**.

When base station #1 labeled 901_1 transmits "reference signal x3501_1 according to first parameter in transmission panel antenna i" illustrated in FIG. 28, base station #1 labeled 901_1 sets the multiplication coefficient in multiplier 304_4 in transmission panel antenna i labeled **106_*i* as w4(i, 1). When fourth transmission signal 3034 of "reference signal x3501_1 according to first parameter in transmission panel antenna i" is tx4ref1(t), multiplier 304_4 obtains tx4ref1(t)×w4(i, 1). Then, base station #1 labeled 901_1 transmits tx4ref1(t)×w4(i, 1) from antenna 306_4 in FIG. 3**.

A description will be given of "reference signal x**3501_*j*** according to j-th parameter in transmission panel antenna i".

When base station #1 labeled 901_1 transmits "reference signal x**3501_*j* according to j-th parameter in transmission panel antenna i" illustrated in FIG. 28, base station #1 labeled 901_1 sets the multiplication coefficient in multiplier 304_1 in transmission panel antenna i labeled 106_*i* as w1(i, j). When first transmission signal 3031 of "reference signal x3501_*j* according to j-th parameter in transmission panel antenna i" is tx1refj(t), multiplier 304_1 obtains tx1refj(t)× w1(i, j). Then, base station #1 labeled 901_1 transmits tx1refj(t)×w1(i, j) from antenna 306_1 in FIG. 3**. Note that t represents time.

When base station #1 labeled 901_1 transmits "reference signal x**3501_*j* according to j-th parameter in transmission panel antenna i" illustrated in FIG. 28, base station #1 labeled 901_1 sets the multiplication coefficient in multiplier 3042 in transmission panel antenna i labeled 106_*i* as w2(i, j). When second transmission signal 303_2 of "reference signal x3501_*j* according to j-th parameter in transmission panel antenna i" is tx2refj(t), multiplier 304_2 obtains tx2refj(t)×w2(i, j). Then, base station #1 labeled 901_1 transmits tx2refj(t)×w2(i, j) from antenna 306_2 in FIG. 3**.

When base station #1 labeled 901_1 transmits "reference signal x**3501_*j* according to j-th parameter in transmission panel antenna i" illustrated in FIG. 28, base station #1 labeled 901_1 sets the multiplication coefficient in multiplier 304_3 in transmission panel antenna i labeled 106_*i* as w3(i, j). When third transmission signal 3033 of "reference signal x3501_*j* according to j-th parameter in transmission panel antenna i" is tx3refj(t), multiplier 304_3 obtains tx3refj(t)× w3(i, j). Then, base station #1 labeled 901_1 transmits tx3refj(t)×w3(i, j) from antenna 306_3 in FIG. 3**.

When base station #1 labeled 901_1 transmits "reference signal x**3501_*j* according to j-th parameter in transmission panel antenna i" illustrated in FIG. 28, base station #1 labeled 901_1 sets the multiplication coefficient in multiplier 304_4 in transmission panel antenna i labeled 106_*i* as w4(i, j). When fourth transmission signal 303_4 of "reference signal x3501_*j* according to j-th parameter in transmission panel antenna i" is tx4refj(t), multiplier 304_4 obtains tx4refj(t)×w4(i, j). Then, base station #1 labeled 901_1 transmits tx4refj(t)×w4(i, j) from antenna 306_4 in FIG. 3**.

Note that j is an integer from 1 to 4 (both inclusive) in the case of FIG. 12. The number Z of parameter changes is four in FIG. 28, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 27 and 28, when base station #1 labeled 901_1 transmits "sector sweep reference signal x**3401_*i* in transmission panel antenna i", "reference signal x3501_*j*** according to j-th parameter in transmission panel antenna i" includes, for example, the following information:

Identification number (ID) of the transmission panel antenna, which corresponds to i here, for example;

Identification number (ID) of the parameter used for beamforming (directivity control), which corresponds to j here, for example; and The number of slots in which sector sweep reference signals can be transmitted when the terminals transmit the sector sweep reference signals (the number of terminals that can transmit the sector sweep reference signals), which will be described later.

Note that "reference signal x**3501_*j*** according to j-th parameter in transmission panel antenna i" may include other information.

Transmission of the "identification number (ID) of the transmission panel antenna" and the "identification number (ID) of the parameter used for beamforming (directivity control)" by base station #1 labeled 901_1 allows the terminals to recognize the "identification number (ID) of the transmission panel antenna" and the "identification number (ID) of the parameter used for beamforming (directivity control)" that have allowed successful reception; accordingly, base station #1 labeled 901_1 and the terminals can perform appropriate control. This produces the effect of enhancing data reception quality.

Note that "the number of slots in which sector sweep reference signals can be transmitted when the terminals transmit the sector sweep reference signals (the number of terminals that can transmit the sector sweep reference signals)" may be changeable according to the frame and/or time, for example. This produces the effect of enhancing data transmission efficiency of a communication system.

Next, a description will be given of an operation in the time period from time t1 to t2 in FIG. 10, which is the terminal response period.

FIG. 13 illustrates an exemplary operation in the time period from time t1 to t2, which is the terminal response period. Note that the horizontal axis represents time in FIG. 13.

As illustrated in FIGS. 10 and 13, for example, base station #1 labeled 901_1 transmits sector sweep reference signals in the time period from time t0 to t1. After that, the terminal response period, which is the time period from time t1 to t2, includes terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4, as illustrated in FIG. 13.

Thus, in the case of FIG. 13, "the number of slots in which sector sweep reference signals can be transmitted when the terminals transmit the sector sweep reference signals (the number of terminals that can transmit the sector sweep reference signals)" is set to four by base station #1 labeled 901_1.

Figure 29:
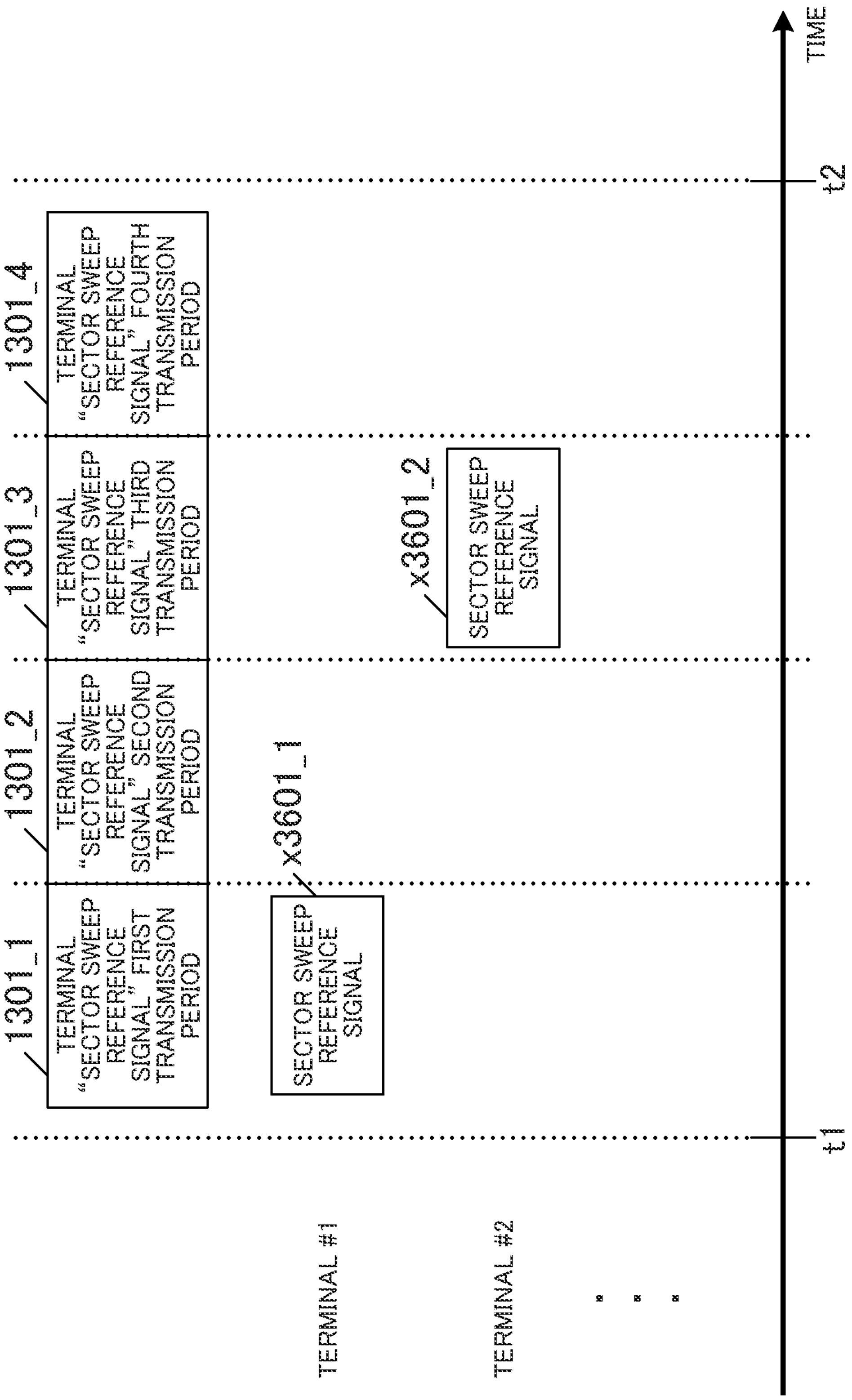
FIG. 29 illustrates exemplary occupation of the terminal "sector sweep reference signal" transmission periods illustrated in FIG. 13.

FIG. 29 illustrates exemplary occupation by the terminals in terminal "sector sweep reference signal" first transmission period 1301_1, terminal "sector sweep reference signal" second transmission period 1301_2, terminal "sector sweep reference signal" third transmission period 1301_3, and terminal "sector sweep reference signal" fourth transmission period 1301_4 illustrated in FIG. 13. Note that the horizontal axis represents time in FIG. 29.

Terminal #1 labeled 902_1 in FIG. 26 receives sector sweep reference signal 1001 transmitted by base station #1 labeled 901_1 and estimates the "transmission panel antenna and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001.

Terminal #1 labeled 902_1 estimates, for example, "transmission panel antenna a1 and parameter b1" as the "transmission panel antenna and parameter" with high reception quality.

In addition, while estimating the "transmission panel antenna and parameter" with high reception quality, terminal #1 labeled 902_1 simultaneously obtains information of "the number of slots in which sector sweep reference signals can be transmitted when the terminals transmit the sector sweep reference signals (the number of terminals that can transmit the sector sweep reference signals)". In the case of FIG. 29, terminal #1 labeled 902_1 obtains information indicating that "the number of slots in which sector sweep reference signals can be transmitted when the terminals transmit the sector sweep reference signals (the number of terminals that can transmit the sector sweep reference signals)" is four.

In this case, terminal #1 labeled 902_1 obtains, for example, any one of the values "0", "1", "2", and "3" using a random number. For example, terminal #1 labeled 902_1 obtains "0" using a random number. In this case, since "0"+1=1, terminal #1 labeled 902_1 transmits sector sweep reference signal x3601_1 using "terminal "sector sweep reference signal" first (="0"+1) transmission period 1301_1" in FIG. 29. Here, the transmission period for the sector sweep reference signal is configured using a random number, but the transmission period for the sector sweep reference signal may be configured using, instead of a random number, a random number of an integer or a natural number, an irregular integer or natural number, a regular integer or natural number, an integer or a natural number held uniquely by the terminal, for example. Hence, the configuration of the transmission period for the sector sweep reference signal is not limited to the above example, and the transmission period for the sector sweep reference signal is configured for each terminal, for example. This is also applicable to the following similar descriptions.

Note that sector sweep reference signal 1401_1 includes information of the "transmission panel antenna and parameter" with high reception quality obtained by terminal #1 labeled 902_1, that is, information of "transmission panel antenna a1 and parameter b1". This will be described later.

Likewise, terminal #2 labeled 902_2 in FIG. 26 receives sector sweep reference signal 1001 transmitted by base station #1 labeled 901_1 and estimates the "transmission panel antenna and parameter number" with high reception quality from transmission panel antennas of base station #1 labeled 901_1. Note that this estimation can be performed by obtaining sector sweep reference signal 1001, and the "identification number (ID) of the transmission panel antenna" and the "identification number (ID) of the parameter used for beamforming (directivity control)" that are included in sector sweep reference signal 1001.

Terminal #2 labeled 902_2 estimates, for example, "transmission panel antenna a2 and parameter b2" as the "transmission panel antenna and parameter" with high reception quality.

In addition, while estimating the "transmission panel antenna and parameter" with high reception quality, terminal #2 labeled 902_2 simultaneously obtains information of "the number of slots in which sector sweep reference signals can be transmitted when the terminals transmit the sector sweep reference signals (the number of terminals that can transmit the sector sweep reference signals)". In the case of FIG. 29, terminal #2 labeled 902_2 obtains information indicating that "the number of slots in which sector sweep reference signals can be transmitted when the terminals transmit the sector sweep reference signals (the number of terminals that can transmit the sector sweep reference signals)" is four.

In this case, terminal #2 labeled 902_2 obtains, for example, any one of the values "0", "1", "2", and "3" using a random number. For example, terminal #2 labeled 902_2 obtains "2" using a random number. In this case, since "2"+1=3, terminal #2 labeled 902_2 transmits sector sweep reference signal x3601_2 using "terminal "sector sweep reference signal" third (="2"+1) transmission period 1301_3" in FIG. 29.

Note that sector sweep reference signal 1401_2 includes information of the "transmission panel antenna and parameter" with high reception quality obtained by terminal #2 labeled 902_2, that is, information of "transmission panel antenna a2 and parameter b2". This will be described later.

Thus, terminal #i labeled 902_*i* receives sector sweep reference signal 1001 transmitted by base station #1 labeled 901_1 and estimates the "transmission panel antenna and parameter number" with high reception quality from transmission panel antennas of base station #1 labeled 901_1. Note that this estimation can be performed by obtaining sector sweep reference signal 1001, and the identification number (ID) of the transmission panel antenna- and the "identification number (ID) of the parameter used for beamforming (directivity control)" that are included in sector sweep reference signal 1001. Note that i is an integer equal to or greater than 1, for example.

Terminal #i labeled 902_*i* estimates, for example, "transmission panel antenna ai and parameter bi" as the "transmission panel antenna and parameter" with high reception quality.

In addition, while estimating the "transmission panel antenna and parameter" with high reception quality, terminal #i labeled 902_*i* simultaneously obtains information of "the number of slots in which sector sweep reference signals can be transmitted when the terminals transmit the sector sweep reference signals (the number of terminals that can transmit the sector sweep reference signals)". In the case of FIG. 29, terminal #i labeled 902_*i* obtains information indicating that "the number of slots in which sector sweep reference signals can be transmitted when the terminals transmit the sector sweep reference signals (the number of terminals that can transmit the sector sweep reference signals)" is four.

In this case, terminal #i labeled 902_*i* obtains, for example, any one of the values "0", "1", "2", and "3" using a random number. For example, terminal #i labeled 902_*i* obtains "j" using a random number. Note that j is any one of the values "0", "1", "2", and "3". In this case, terminal #i labeled 902_*i* transmits sector sweep reference signal x3601_*i* using terminal "sector sweep reference signal" ("j"+1)-th transmission period 1301_("j"+1) in FIG. 29.

Note that sector sweep reference signal 3601_*i* includes information of the "transmission panel antenna and parameter" with high reception quality obtained by terminal #i labeled 902_*i*, that is, information of "transmission panel antenna ai and parameter bi". This will be described later.

In the manner described above, a collision of the sector sweep reference signals transmitted by the respective terminals can be reduced. This produces the effect that the base station can receive more sector sweep reference signals and can communicate with more terminals.

A description will be given of a configuration of sector sweep reference signal x3601_*i* transmitted by terminal #i labeled 902_*i* described with reference to FIG. 29. To simplify the description, terminal #i labeled 902_*i* has the configuration in FIG. 1A, 1B, or 1C. In addition, terminal #i labeled 902_*i* with the configuration in FIG. 1A, 1B, or 1C includes the configuration in FIG. 3 as transmission panel antenna xi labeled 106_*xi*. Note that the configuration of terminal #i labeled 902_*i* is not limited to the configuration in FIG. 1A, 1B, or 1C, and the configuration of transmission panel antenna xi labeled 106_*xi* included in terminal #i labeled 902_*i* with the configuration in FIG. 1A, 1B, or 1C is not limited to the configuration in FIG. 3.

FIG. 27 illustrates examples of sector sweep reference signal x3401_*i* transmitted by terminal #i labeled 902_*i*. Note that the horizontal axis represents time in FIG. 27.

For example, terminal #i labeled 902_*i* with the configuration in FIG. 1A, 1B, or 1C transmits sector sweep reference signal x3401_1 in transmission panel antenna 1 from transmission panel antenna 1 labeled 106_1.

That is, as illustrated in FIG. 27, terminal #i labeled 902_*i* with the configuration in FIG. 1A, 1B, or 1C transmits sector sweep reference signal x3401_*xi* in transmission panel antenna xi from transmission panel antenna xi labeled 106_*xi*. Note that xi is an integer from 1 to M (both inclusive).

Figure 30:
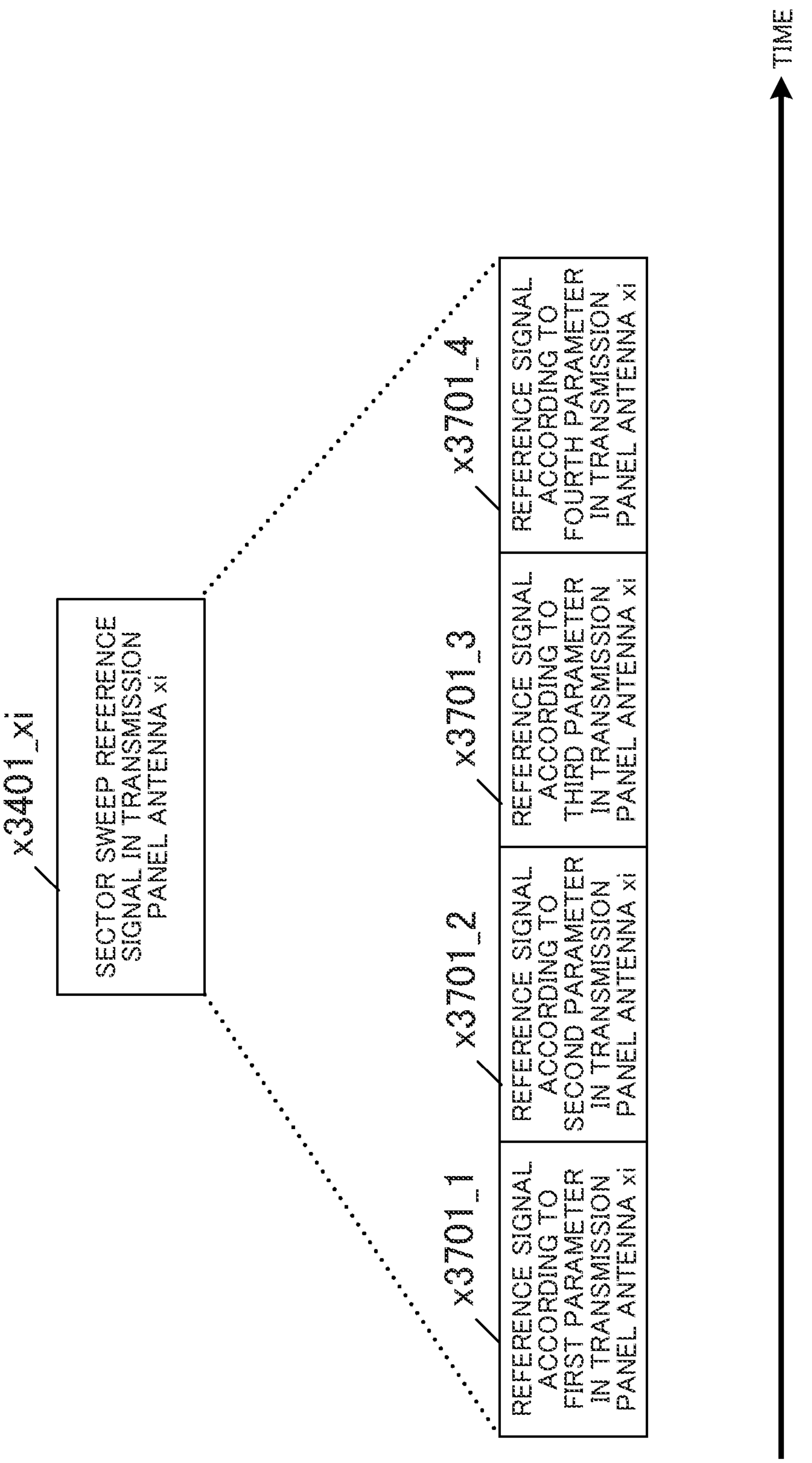
FIG. 30 illustrates an exemplary configuration of a "sector sweep reference signal in a transmission panel antenna" in FIG. 27.

FIG. 30 illustrates an exemplary configuration of "sector sweep reference signal x3401_*xi* in transmission panel antenna xi" in FIG. 27. Note that the horizontal axis represents time in FIG. 30.

For example, terminal #i labeled 902_*i* with the configuration in FIG. 1A, 1B, or 1C includes the configuration in FIG. 3 as transmission panel antenna xi labeled 106_*xi*.

A description will be given of "reference signal x3701_1 according to first parameter in transmission panel antenna xi".

When terminal #i labeled 902_1 transmits "reference signal x3701_1 according to first parameter in transmission panel antenna xi" illustrated in FIG. 30, terminal #i labeled 902_*i* sets the multiplication coefficient in multiplier 304_1 in transmission panel antenna xi labeled 106_*xi* as w1(xi, 1). When first transmission signal 303_1 of "reference signal x3701_1 according to first parameter in transmission panel antenna xi" is tx1ref1(t), multiplier 304_1 obtains tx1ref1(t)×w1(xi, 1). Then, terminal #i labeled 902_*i* transmits tx1ref1(t)×w1(xi, 1) from antenna 306_1 in FIG. 3. Note that t represents time.

When terminal #i labeled 902_*i* transmits "reference signal x3701_1 according to first parameter in transmission panel antenna xi" illustrated in FIG. 30, terminal #i labeled 902_*i* sets the multiplication coefficient in multiplier 304_2 in transmission panel antenna xi labeled 106_*xi* as w2(xi, 1). When second transmission signal 303_2 of "reference signal x3701_1 according to first parameter in transmission panel antenna xi" is tx2ref1(t), multiplier 304_2 obtains tx2ref1(t)×w2(xi, 1). Then, terminal #i labeled 902_*i* transmits tx2ref1(t)×w2(xi, 1) from antenna 306_2 in FIG. 3.

When terminal #i labeled 902_*i* transmits "reference signal x3701_1 according to first parameter in transmission panel antenna xi" illustrated in FIG. 30, terminal #i labeled 902_*i* sets the multiplication coefficient in multiplier 304_3 in transmission panel antenna xi labeled 106_*xi* as w3(xi, 1). When third transmission signal 303_3 of "reference signal x3701_1 according to first parameter in transmission panel antenna xi" is tx3ref1(t), multiplier 304_3 obtains tx3ref1(t)×w3(xi, 1). Then, terminal #i labeled 902_*i* transmits tx3ref1(t)×w3(xi, 1) from antenna 306_3 in FIG. 3.

When terminal #i labeled 902_*i* transmits "reference signal x3701_1 according to first parameter in transmission panel antenna xi" illustrated in FIG. 30, terminal #i labeled 902_*i* sets the multiplication coefficient in multiplier 304_4 in transmission panel antenna xi labeled 106_*xi* as w4(xi, 1). When fourth transmission signal 303_4 of "reference signal x3701_1 according to first parameter in transmission panel antenna xi" is tx4ref1(t), multiplier 304_4 obtains tx4ref1(t)×w4(xi, 1). Then, terminal #i labeled 902_*i* transmits tx4ref1(t)×w4(xi, 1) from antenna 306_4 in FIG. 3.

A description will be given of "reference signal 3701_*j* according to j-th parameter in transmission panel antenna xi".

When terminal #i labeled 902_*i* transmits "reference signal x3701_*j* according to j-th parameter in transmission panel antenna xi" illustrated in FIG. 30, terminal #i labeled 902_1 sets the multiplication coefficient in multiplier 304_1 in transmission panel antenna xi labeled 106_*xi* as w1(xi, j). When first transmission signal 303_1 of "reference signal x3701_*j* according to j-th parameter in transmission panel antenna xi" is tx1refj(t), multiplier 304_1 obtains tx1refj(t)×w1(xi, j). Then, terminal #i labeled 902_*i* transmits tx1refj(t)×w1(xi, j) from antenna 306_1 in FIG. 3. Note that t represents time.

When terminal #i labeled 902_*i* transmits "reference signal x3701_*j* according to j-th parameter in transmission panel antenna xi" illustrated in FIG. 30, terminal #i labeled 902_*i* sets the multiplication coefficient in multiplier 304_2 in transmission panel antenna xi labeled 106_*xi* as w2(xi, j). When second transmission signal 303_2 of "reference signal x3701_*j* according to j-th parameter in transmission panel antenna xi" is tx2refj(t), multiplier 304_2 obtains tx2refj(t)×w2(xi, j). Then, terminal #i labeled 902_*i* transmits tx2refj(t)×w2(xi, j) from antenna 306_2 in FIG. 3.

When terminal #i labeled 902_*i* transmits "reference signal x3701_*j* according to j-th parameter in transmission panel antenna xi" illustrated in FIG. 30, terminal #i labeled 902_*i* sets the multiplication coefficient in multiplier 304_3 in transmission panel antenna xi labeled 106_*xi* as w3(xi, j). When third transmission signal 303_3 of "reference signal x3701_*j* according to j-th parameter in transmission panel antenna xi" is tx3refj(t), multiplier 304_3 obtains tx3refj(t)×w3(xi, j). Then, terminal #i labeled 902_*i* transmits tx3refj(t)×w3(xi, j) from antenna 306_3 in FIG. 3.

When terminal #i labeled 902_*i* transmits "reference signal x3701_*j* according to j-th parameter in transmission panel antenna xi" illustrated in FIG. 30, terminal #i labeled 902_*i* sets the multiplication coefficient in multiplier 304_4 in transmission panel antenna xi labeled 106_*xi* as w4(xi, j). When fourth transmission signal 303_4 of "reference signal x3701_*j* according to j-th parameter in transmission panel antenna xi" is tx4refj(t), multiplier 304_4 obtains tx4refj(t)×w4(xi, j). Then, terminal #i labeled 902_*i* transmits tx4refj(t)×w4(xi, j) from antenna 306_4 in FIG. 3.

Note that j is an integer from 1 to 4 (both inclusive) in the case of FIG. 30. The number Z of parameter changes is four in FIG. 30, but the number Z of parameter changes is not limited to four. The same can be implemented as long as Z is an integer equal to or greater than 1 or an integer equal to or greater than 2. At this time, j is an integer from 1 to Z (both inclusive).

As illustrated in FIGS. 27 and 30, when terminal #i labeled 902_*i* transmits "sector sweep reference signal x3401_*xi* in transmission panel antenna xi". "reference signal x3701_*j* according to j-th parameter in transmission panel antenna xi" includes, for example, the following information.

Information of the "transmission panel antenna and parameter" of base station #1 labeled 901_1 with high reception quality, as described above.

Thus, terminal #i labeled 902_*i* transmits the "information of the "transmission panel antenna and parameter" of base station #1 labeled 901_1 with high reception quality" in "sector sweep reference signal x3401_1 in transmission panel antenna 1", "sector sweep reference signal x3401_2 in transmission panel antenna 2", . . . , "sector sweep reference signal x3401_M in transmission panel antenna M" in FIG. 27.

In addition, terminal #i labeled 902_*i* transmits the information of the "transmission panel antenna and parameter" of base station #1 labeled 901_1 with high reception quality" in "reference signal x3701_1 according to first parameter in transmission panel antenna xi", "reference signal x3701_2 according to second parameter in transmission panel antenna xi", "reference signal x3701_3 according to third parameter in transmission panel antenna xi", and "reference signal x3701_4 according to fourth parameter in transmission panel antenna xi" in FIG. 30 in ""sector sweep reference signal x3401_1 in transmission panel antenna 1", "sector sweep reference signal x3401_2 in transmission panel antenna 2 . . . , "sector sweep reference signal x3401_M in transmission panel antenna M" in FIG. 27".

In this case, base station #1 labeled 901_1 is more likely to receive, even with an omnidirectional antenna for example, any of "sector sweep reference signal x3401_1 in transmission panel antenna 1", "sector sweep reference signal x3401_2 in transmission panel antenna 2", . . . , "sector sweep reference signal x3401_M in transmission panel antenna M" in FIG. 27" transmitted by terminal #i labeled 902_*i*. This is because terminal #i labeled 902_*i* performs transmit beamforming (directivity control). This produces the effect that base station #1 labeled 901_1 is more likely to receive the "information of the "transmission panel antenna and parameter" of base station #1 labeled 901_1 with high reception quality" transmitted by terminal #i labeled 902_*i*. Accordingly, base station #1 labeled 901_1 can transmit a modulation signal to terminal #i labeled 902_*i* based on the "information of the "transmission panel antenna and parameter" of base station #1 labeled 901_1 with high reception quality", and terminal #i labeled 902_*i* can receive the modulation signal with high reception quality.

In a case where a plurality of terminals transmit the sector sweep reference signals as in FIG. 29, base station #1 labeled 901_1 can obtain the "information of the "transmission panel antenna and parameter" of base station #1 labeled 901_1 with high reception quality" from the plurality of terminals. This produces the effect that base station #1 labeled 901_1 can transmit modulation signals to the plurality of terminals based on the "information of the "transmission panel antenna and parameter" of base station #1 labeled 901_1 with high reception quality" from the plurality of terminals, and that the plurality of terminals can receive the modulation signals with high reception quality.

As illustrated in FIGS. 27 and 30, when terminal #i labeled 902_*i* transmits "sector sweep reference signal x3401_*xi* in transmission panel antenna xi", "reference signal x3701_*j* according to j-th parameter in transmission panel antenna xi" includes, for example, the following information:

- Identification number (ID) of the transmission panel antenna, which corresponds to i here, for example; and
- Identification number (ID) of the parameter used for beamforming (directivity control), which corresponds to j here, for example.

Transmission of the "identification number (ID) of the transmission panel antenna" and the "identification number (ID) of the parameter used for beamforming (directivity control)" by terminal #i labeled 902_*i* allows base station #1 labeled 901_1 to recognize the "identification number (ID) of the transmission panel antenna" and the "identification number (ID) of the parameter used for beamforming (directivity control)" that have allowed successful reception; accordingly, terminal #i labeled 902_*i* and base station #1 labeled 901_1 can perform appropriate control. This produces the effect of enhancing data reception quality.

Note that "reference signal 3701_*j* according to j-th parameter in transmission panel antenna xi" may include other information.

Figure 31:
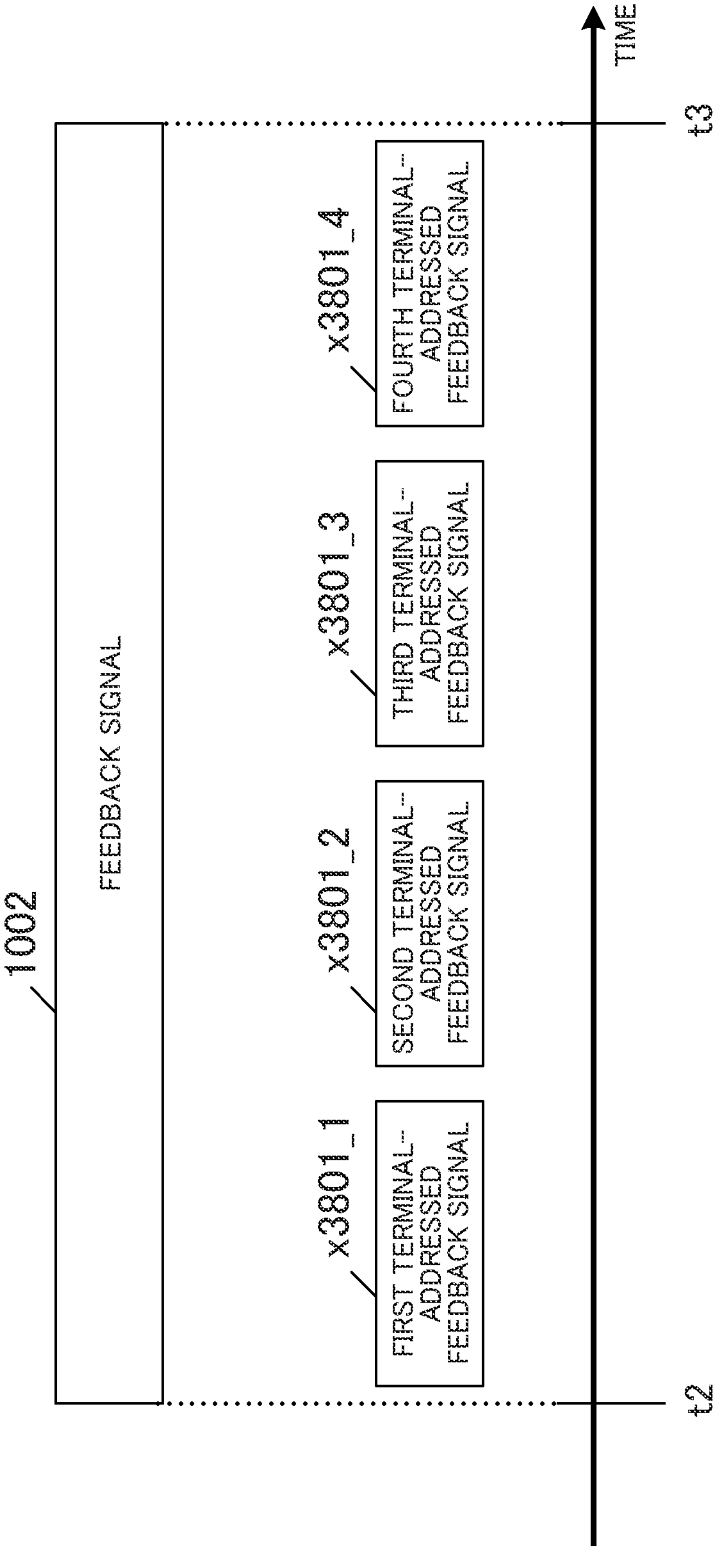
FIG. 31 illustrates an exemplary configuration of the feedback signal that is present in the time period from t2 to t3 in FIG. 10 and transmitted by base station #1.

FIG. 31 illustrates an exemplary configuration of feedback signal 1002 that is present in the time period from t2 to t3 in FIG. 10 and transmitted by base station #1 labeled 901_1. Note that the horizontal axis represents time in FIG. 31. In this example, since "the number of slots in which sector sweep reference signals can be transmitted when the terminals transmit the sector sweep reference signals (the number of terminals that can transmit the sector sweep reference signals)" is four, there are four terminal-addressed feedback signals, such as first terminal-addressed feedback signal x3801_1, second terminal-addressed feedback signal x3801_2, third terminal-addressed feedback signal x3801_3, and fourth terminal-addressed feedback signal x3801_4, for feedback signal 1002 as illustrated in FIG. 31. Note that, in a case where "the number of slots in which sector sweep reference signals can be transmitted when the terminals transmit the sector sweep reference signals (the number of terminals that can transmit the sector sweep reference signals)" is Ω, for example, Ω terminal feedback signals may be configured to be present for feedback signal 1002, where Ω is an integer equal to or greater than 1 or an integer equal to or greater than 2.

As in FIG. 29, when terminal #1 labeled 902_1 transmits sector sweep reference signal x3601_1 and terminal #2 labeled 902_2 transmits sector sweep reference signal x3601_2, for example, base station #1 labeled 901_1 transmits a feedback signal to terminal #1 labeled 902_1 using first terminal-addressed feedback signal x3801_1 and transmits a feedback signal to terminal #2 labeled 9022 using third terminal-addressed feedback signal x3801_3.

At this time, first terminal-addressed feedback signal x3801_1 includes, for example, information indicating that communication with terminal #1 labeled 902_1 is available (or indicating that data-symbol-included frame 1003 in FIG. 10 includes a symbol addressed to terminal #1 labeled 902_1).

Third terminal-addressed feedback signal 3801_3 includes, for example, information indicating that communication with terminal #2 labeled 902_2 is available (or indicating that data-symbol-included frame 1003 in FIG. 10 includes a symbol addressed to terminal #2 labeled 902_2).

Note that base station #1 labeled 901_1 selects a transmission panel antenna and sets a parameter of beamforming based on the "information of the "transmission panel antenna and parameter" of base station #1 labeled 901_1 with high reception quality" transmitted by terminal #1 labeled 902_1, and base station #1 labeled 901_1 then transmits first terminal-addressed feedback signal x3801_1.

Likewise, base station #1 labeled 901_1 selects a transmission panel antenna and sets a parameter of beamforming based on the "information of the "transmission panel antenna and parameter" of base station #1 labeled 901_1 with high reception quality" transmitted by terminal #2 labeled 902_2, and base station #1 labeled 901_1 then transmits third terminal-addressed feedback signal x3801_3.

Figure 32:
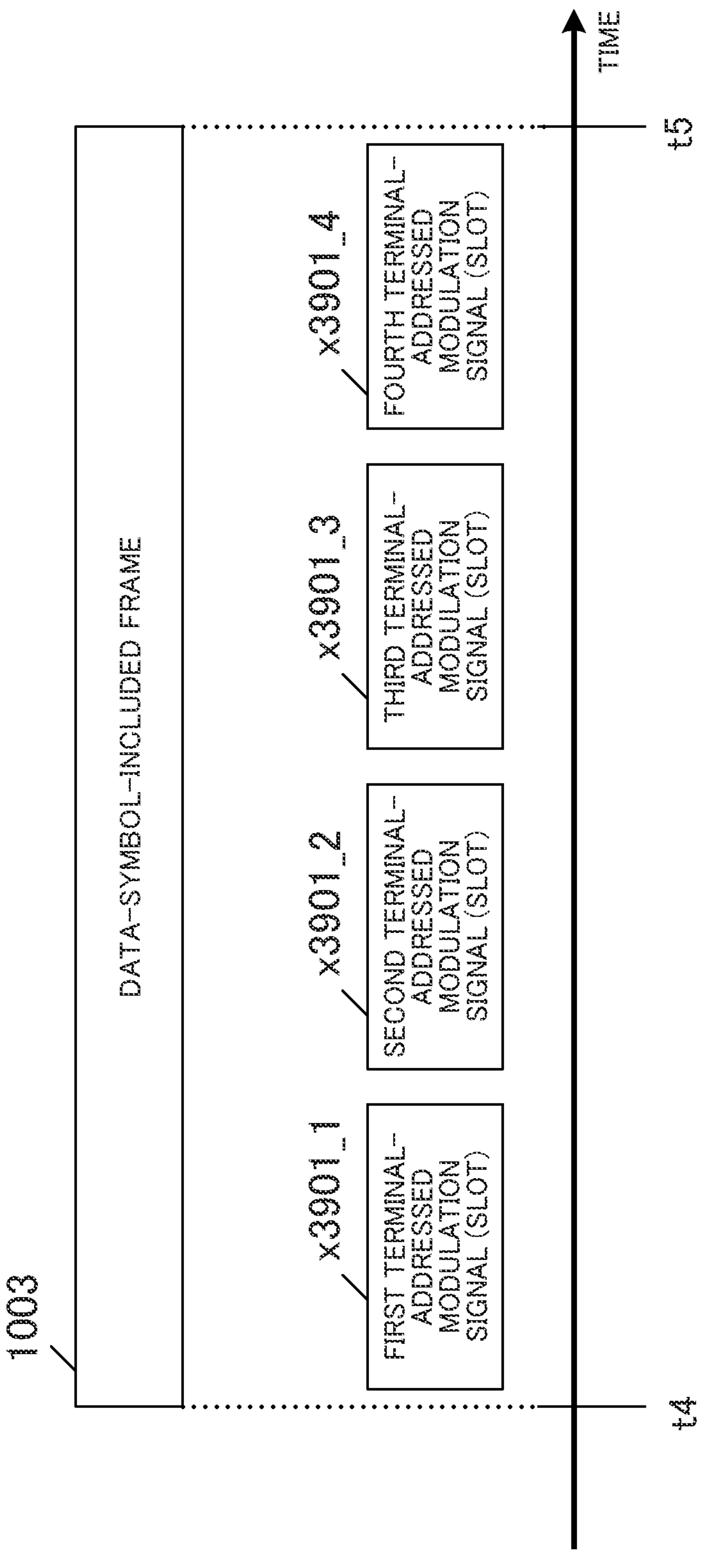
FIG. 32 illustrates an exemplary configuration of the data-symbol-included frame that is present in the time period from t4 to t in FIG. 10 and transmitted by base station #1.

FIG. 32 illustrates an exemplary configuration of data-symbol-included frame 1003 that is present in the time period from t4 to t5 in FIG. 10 and transmitted by base station #1 labeled 901_1. Note that the horizontal axis represents time in FIG. 32. In this example, since "the number of slots in which sector sweep reference signals can be transmitted when the terminals transmit the sector sweep reference signals (the number of terminals that can transmit the sector sweep reference signals)" is four, there are four terminal-addressed modulation signals (slots), such as first terminal-addressed modulation signal (first terminal-addressed slot) x3901_1, second terminal-addressed modulation signal (second terminal-addressed slot) x3901_2, third terminal-addressed modulation signal (third terminal-addressed slot) x3901_3, and fourth terminal-addressed modulation signal (fourth terminal-addressed slot) x3901_4, for data-symbol-included frame 1003 as illustrated in FIG. 17. Note that, in a case where "the number of slots in which sector sweep reference signals can be transmitted when the terminals transmit the sector sweep reference signals (the number of terminals that can transmit the sector sweep reference signals)" is Ω, for example, Ω terminal-addressed modulation signals (slots) may be configured to be present for data-symbol-included frame 1003, where Ω is an integer equal to or greater than 1 or an integer equal to or greater than 2.

As in FIG. 29, when terminal #1 labeled 902_1 transmits sector sweep reference signal x3601_1 and terminal #2 labeled 902_2 transmits sector sweep reference signal x3601_2, for example, base station #1 labeled 901_1 transmits a modulation signal (slot) to terminal #1 labeled 902_1 using first terminal-addressed modulation signal (first terminal-addressed slot) x3901_1 and transmits a modulation signal (slot) to terminal #2 labeled 902_2 using third terminal-addressed modulation signal (first terminal-addressed slot) x3901_3.

At this time, first terminal-addressed modulation signal (first terminal-addressed slot) x3901_1 includes, for example, a data symbol (data/information) addressed to terminal #1 labeled 902_1.

Third terminal-addressed modulation signal (third terminal-addressed slot) x3901_3 includes, for example, a data symbol (data/information) addressed to terminal #2 labeled 902_2.

Note that base station #1 labeled 901_1 selects a transmission panel antenna and sets a parameter of beamforming based on the "information of the "transmission panel antenna and parameter" of base station #1 labeled 901_1 with high reception quality" transmitted by terminal #1 labeled 902_1, and base station #1 labeled 901_1 then transmits first terminal-addressed modulation signal (first terminal-addressed slot) x3901_1.

Likewise, base station #1 labeled 901_1 selects a transmission panel antenna and sets a parameter of beamforming based on the "information of the "transmission panel antenna and parameter" of base station #1 labeled 901_1 with high reception quality" transmitted by terminal #2 labeled 902_2, and base station #1 labeled 901_1 then transmits third terminal-addressed modulation signal (third terminal-addressed slot) x3901_3.

Note that, in FIG. 31, "base station #1 labeled 901_1 may estimate the "transmission panel antenna and parameter" of terminal #1 labeled 902_1 with high reception quality in receiving "sector sweep reference signal 3601_1 transmitted by terminal #1 labeled 902_1", and the estimated information" may be included in first terminal-addressed feedback signal x3801_1.

Terminal #1 labeled 902_1 selects a transmission panel antenna and determines a beamforming method based on the information of "transmission panel antenna and parameter" of terminal #1 labeled 902_1 with high reception quality obtained from base station #1 labeled 901_1, and terminal #1 labeled 902_1 then transmits a symbol, a frame, and/or a modulation signal to base station #1 labeled 901_1. This produces the effect of enhancing data reception quality in base station #1 labeled 901_1.

Further, in FIG. 31, "base station #1 labeled 901_1 may estimate the "transmission panel antenna and parameter" of terminal #2 labeled 902_2 with high reception quality in receiving "sector sweep reference signal x3601_2 transmitted by terminal #2 labeled 902_2", and the estimated information" may be included in third terminal-addressed feedback signal x3801_3.

Terminal #2 labeled 902_2 selects a transmission panel antenna and determines a beamforming method based on the information of "transmission panel antenna and parameter" of terminal #2 labeled 902_2 with high reception quality obtained from base station #2 labeled 901_1, and terminal #2 labeled 902_2 then transmits a symbol, a frame, and/or a modulation signal to base station #1 labeled 901_1. This produces the effect of enhancing data reception quality in base station #1 labeled 901_1.

Incidentally, in the time period from t3 to t4, terminals, which are terminal #1 labeled 902_1 and terminal #2 labeled 902_2 in the above description, may transmit, to base station #1 labeled 901_1, modulation signals including information indicating successful reception of a signal from base station #1 labeled 901_1, such as acknowledgement (ACK).

Note that, first terminal-addressed modulation signal (first terminal-addressed slot) x3901_1 in FIG. 32 may include, in addition to the data symbol, a "reference signal such as a demodulation reference signal (DMRS), phase tracking reference signal (PTRS), or sounding reference signal (SRS)", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of the modulation and coding scheme (MCS), and the like.

Likewise, second terminal-addressed modulation signal (second terminal-addressed slot) x3901_2, third terminal-addressed modulation signal (third terminal-addressed slot) x3901_3, and fourth terminal-addressed modulation signal (fourth terminal-addressed slot) x3901_4 may include, in addition to the data symbol, a "reference signal such as DMRS, PTRS, or SRS", a pilot symbol, a pilot signal, a preamble, and a symbol including control information, for example. Examples of the symbol including the control information may include information of a destination terminal (ID for identifying the terminal), a transmission method of the modulation signal, information of the modulation scheme, information of the error correction coding scheme (code length, code rate, etc.), information of the MCS, and the like.

FIG. 18 illustrates an exemplary state where base station #1 labeled 901_1 and "terminal #1 labeled 902_1, terminal #2 labeled 902_2, and terminal #3 labeled 902_3" communicate with each other as illustrated in FIG. 26. (A) of FIG. 18 illustrates an exemplary modulation signal transmission state of base station #1 labeled 901_1, and (B) of FIG. 18 illustrates an exemplary modulation signal transmission state of "terminal #1 labeled 902_1, terminal #2labeled 902_2, and terminal #3 labeled 902_3". Note that the horizontal axes represent time in (A) and (B) of FIG. 18.

First, base station #1 labeled 901_1 transmits sector sweep reference signal 1801_1. Note that this has already been described with reference to FIG. 10, and the description thereof will be thus omitted.

Then, a terminal such as "terminal #1 labeled 902_1, terminal #2 labeled 902_2, and terminal #3 labeled 902_3" transmits sector sweep reference signal 1851_1. Note that this has already been described with reference to, for example. FIGS. 13, 29, etc., and the description thereof will be thus omitted.

Base station #1 labeled 901_1 transmits feedback signal 1802_1. Note that this has already been described with reference to FIG. 31, and the description thereof will be thus omitted.

After that, base station #1 labeled 901_1 transmits "data-symbol-included frame 1803_1". Note that this has already been described with reference to FIG. 32, and the description thereof will be thus omitted. (Hence, "data-symbol-included frame 1803_1" is considered to be a frame for downlink, for example).

Then, the terminal such as "terminal #1 labeled 902_1, terminal #2 labeled 902_2, and terminal #3 labeled 902_3" transmits "data-symbol-included frame 1852_1". Note that a configuration of the frame will be described later with reference to FIG. 33. (Hence, "data-symbol-included frame 1852_1" is considered to be a frame for uplink, for example).

Next, base station #1 labeled 901_1 transmits "data-symbol-included frame 1803_2". Note that a configuration method of "data-symbol-included frame 1803_2" is as described with reference to FIG. 32.

Then, the terminal such as "terminal #1 labeled 902_1, terminal #2 labeled 902_2, and terminal #3 labeled 902_3" transmits "data-symbol-included frame 1852_2". Note that a configuration of the frame will be described later with reference to FIG. 33.

FIG. 19 illustrates an exemplary modulation signal transmission state of base station #1 labeled 901_1 and an exemplary modulation signal transmission state of the terminal such as "terminal #1 labeled 902_1, terminal #2 labeled 902_2, and terminal #3 labeled 902_3" after the state in FIG. 18.

(A) of FIG. 19 illustrates an exemplary modulation signal transmission state of base station #1 labeled 901_1, and it is a temporal continuation from the modulation signal transmission state of base station #1 labeled 901_1 in (A) of FIG. 18.

(B) of FIG. 19 illustrates an exemplary modulation signal transmission state of "terminal #1 labeled 902_1, terminal #2 labeled 902_2, and terminal #3 labeled 902_3", and it is a temporal continuation from the modulation signal transmission state of "terminal #1 labeled 902_1, terminal #2 labeled 902_2, and terminal #3 labeled 902_3" in (B) of FIG. 18.

Note that the horizontal axes represent time in (A) and (B) of FIG. 19.

After the states in (A) and (B) of FIG. 18, base station #1 labeled 901_1 transmits "data-symbol-included frame 1803_3". Note that a configuration method of "data-symbol-included frame 1803_2" is as described with reference to FIG. 32.

The terminal such as "terminal #1 labeled 902_1, terminal #2 labeled 902_2, and terminal #3 labeled 902_3" transmits "data-symbol-included frame 1852_3". Note that a configuration of the frame will be described later with reference to FIG. 33.

Next, base station #1 labeled 901_1 transmits sector sweep reference signal 1801_2. Note that this has already been described with reference to FIG. 10, and the description thereof will be thus omitted.

Then, the terminal such as "terminal #1 labeled 902_1, terminal #2 labeled 902_2, and terminal #3 labeled 902_3" transmits sector sweep reference signal 1851_2. Note that this has already been described with reference to, for example, FIGS. 13, 29, etc., and the description thereof will be thus omitted.

Base station #1 labeled 901_1 transmits feedback signal 1802_2. Note that this has already been described with reference to FIG. 31, and the description thereof will be thus omitted.

After that, base station #1 labeled 901_1 transmits "data-symbol-included frame 1803_4". Note that this has already been described with reference to FIG. 32, and the description thereof will be thus omitted.

Then, the terminal such as "terminal #1 labeled 902_1, terminal #2 labeled 902_2, and terminal #3 labeled 902_3" transmits "data-symbol-included frame 1852_4". Note that a configuration of the frame will be described later with reference to FIG. 33.

As described above, base station #1 labeled 901_1 and the terminal transmit the sector sweep reference signals before the "transmission of the "data-symbol-included frames" by base station #1 labeled 901_1 and/or the transmission of the "data-symbol-included frames" by the terminal such as "terminal #1 labeled 902_1, terminal #2 labeled 902_2, and terminal #3 labeled 902_3", and again transmit the sector sweep reference signals after the "transmission of the "data-symbol-included frames" by base station #1 labeled 901_1 and/or the transmission of the "data-symbol-included frames" by the terminal such as "terminal #1 labeled 902_1, terminal #2 labeled 902_2, and terminal #3 labeled 902_3"". Base station #1 labeled 901_1 and the terminal then each select a transmission panel antenna to be used and configure transmit beamforming. This produces the effect that the base station and/or the terminal achieve high data reception quality.

Next, a description will be given of an exemplary configuration of "data-symbol-included frame 1852_*i*" transmitted by the terminal such as "terminal #1 labeled 902_1, terminal #2labeled 902_2, and terminal #3 labeled 902_3" with reference to FIG. 33. Note that i is an integer equal to or greater than 1, for example, and the horizontal axis represents time in FIG. 33.

Figure 33:
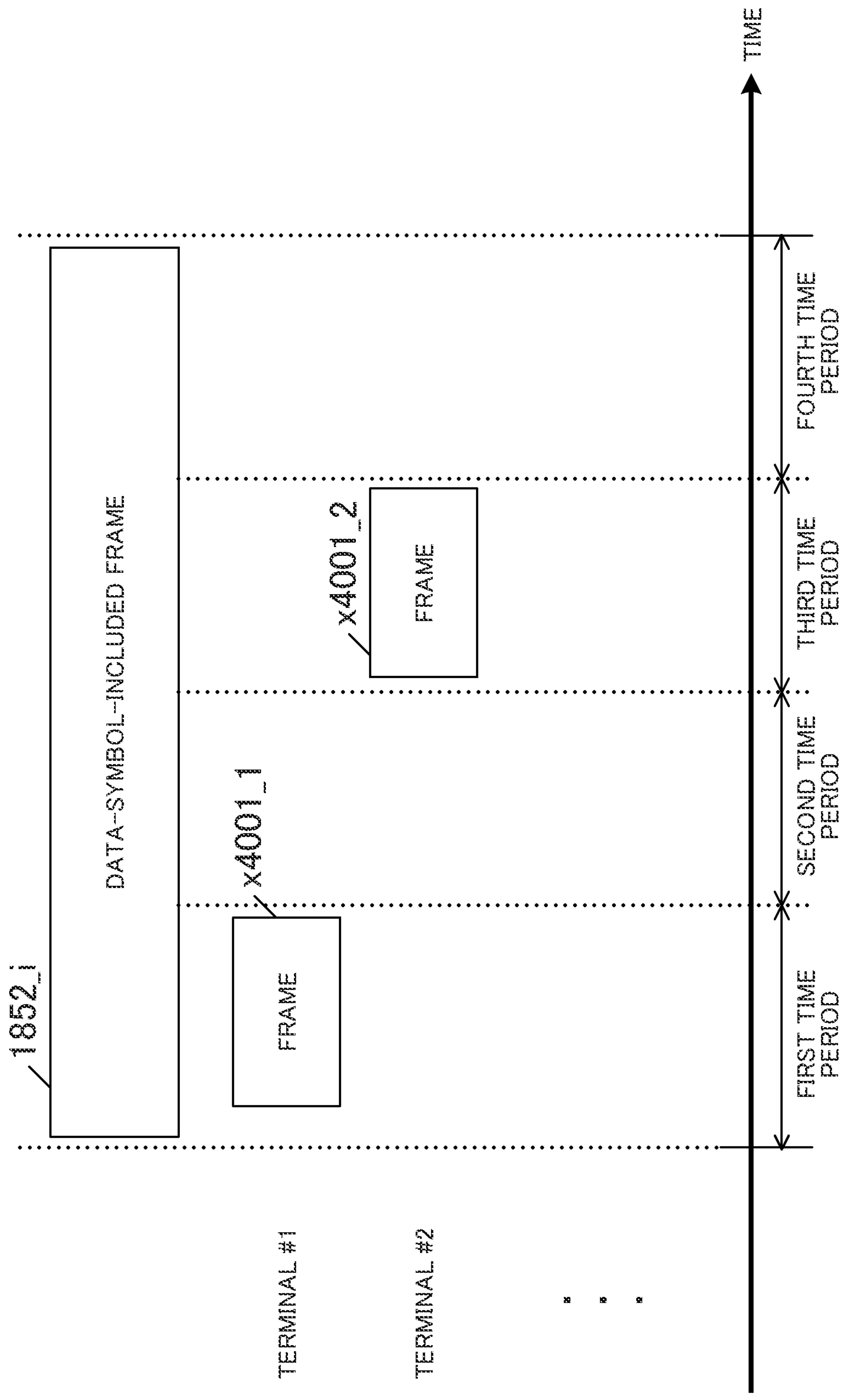
FIG. 33 illustrates an exemplary configuration of the "data-symbol-included frame" transmitted by the terminal.

As illustrated in FIG. 33, "data-symbol-included frame 1852_*i*" is composed of a first time period, a second time period, a third time period, and a fourth time period.

Terminal #1 labeled 902_1 transmits frame (including a data symbol) x4001_I using the first time period, for example. Terminal #2 labeled 902_2 transmits frame (including a data symbol) x4001_2 using the third time period.

As described above, "data-symbol-included frame 1852_*i*" transmitted by the terminal such as "terminal #1 labeled 902_1, terminal #2 labeled 902_2, and terminal #3 labeled 902_3" is subjected to, for example, time division and transmitted by each terminal, and base station #1 labeled 901_1 receives the frame transmitted by the terminal, thereby preventing interference and achieving high data reception quality.

Note that frame x4001_1 in FIG. 33 may include, in addition to the data symbol, a "reference signal such as DMRS. PTRS, or SRS", a pilot symbol, a pilot signal, a preamble, and a symbol including control information, for example.

Likewise, frames present in the first time period, the second time period, the third time period, and the fourth time period, such as frames x4001_1 and x4001_2, may include, in addition to the data symbol, a "reference signal such as DMRS, PTRS, or SRS", a pilot symbol, a pilot signal, a preamble, and a symbol including control information, for example.

In FIG. 33, a description has been given of a case where the terminals perform time division on the frames to be transmitted, but the terminals may perform frequency division on the frames to be transmitted or perform spatial division using multi user-multiple-input multiple-output (MU-MIMO). Note that the configurations of the terminals and the base station are not limited to the configurations in FIGS. 1A, 1B, and 1C. In addition, the configurations of a transmission panel antenna and a reception panel antenna are not limited to the configurations in FIGS. 3 and 4, and may be any antenna configurations as long as one or more or a plurality of transmission directivities and reception directivities can be generated, for example. Further, signals, frames, etc. are illustrated in FIGS. 10, 13, 18, 19, 27, 28, 29, 30, 31, 32, and 33, but the names thereof are not limited to those in the drawings and the important part is the functions of the signals to be transmitted.

Embodiment 4

The embodiments in the present specification, such as Embodiments 1 to 3, have provided a description of methods of transmitting a sector sweep reference signal (e.g., 1001 in FIG. 10, etc.) by a base station, the example of which is base station #1 labeled 901_1 in FIG. 9, etc., and a description of methods of transmitting a sector sweep reference signal by a terminal, the example of which is the terminal labeled 902_*i* in FIG. 9, etc. In the present embodiment, a description will be given of variations of the "methods of transmitting a sector sweep reference signal by a base station" and the "methods of transmitting a sector sweep reference signal by a terminal".

The methods of transmitting a sector sweep reference signal by a base station have been described with reference to, for example, FIGS. 11, 12, 27, 28, etc.

To be more specific, a sector sweep reference signal is generated based on the identification (ID) of a transmission panel antenna and the ID of beamforming (see FIG. 12).

For example, a base station transmits sector sweep reference signals using transmission panel antenna #1. In this case, the base station transmits sector sweep reference signals as described below using transmission panel antenna #1.

"(Reference) signal subjected to processing based on a parameter of beamforming (directivity control) ID 0, which is parameter ID 0, using transmission panel antenna #1"

"(Reference) signal subjected to processing based on a parameter of beamforming (directivity control) ID 1, which is parameter ID 1, using transmission panel antenna #1"

"(Reference) signal subjected to processing based on a parameter of beamforming (directivity control) ID 2, which is parameter ID 2, using transmission panel antenna #1"

"(Reference) signal subjected to processing based on a parameter of beamforming (directivity control) ID 3, which is parameter ID 3, using transmission panel antenna #1"

Likewise, the base station transmits sector sweep reference signals using transmission panel antenna #2. In this case, the base station transmits sector sweep reference signals as described below using transmission panel antenna #2.

"(Reference) signal subjected to processing based on a parameter of beamforming (directivity control) ID 0, which is parameter ID 0, using transmission panel antenna #2"

"(Reference) signal subjected to processing based on a parameter of beamforming (directivity control) ID 1, which is parameter ID 1, using transmission panel antenna #2"

"(Reference) signal subjected to processing based on a parameter of beamforming (directivity control) ID 2, which is parameter ID 2, using transmission panel antenna #2"

"(Reference) signal subjected to processing based on a parameter of beamforming (directivity control) ID 3, which is parameter ID 3, using transmission panel antenna #2"

That is, the base station transmits sector sweep reference signals using transmission panel antenna #i. Note that i is an integer equal to or greater than 1. In this case, the base station transmits sector sweep reference signals as described below using transmission panel antenna #i.

"(Reference) signal subjected to processing based on a parameter of beamforming (directivity control) ID 0, which is parameter ID 0, using transmission panel antenna #i"

"(Reference) signal subjected to processing based on a parameter of beamforming (directivity control) ID 1, which is parameter ID 1, using transmission panel antenna #i"

"(Reference) signal subjected to processing based on a parameter of beamforming (directivity control) ID 2, which is parameter ID 2, using transmission panel antenna #i"

"(Reference) signal subjected to processing based on a parameter of beamforming (directivity control) ID 3, which is parameter ID 3, using transmission panel antenna #i"

In the above, "the ID of a transmission panel antenna and the ID of beamforming (directivity control) of a base station" are distinguished from each other, but the ID may be assigned without distinguishing and the base station may generate and transmit a sector sweep reference signal.

For example, an ID is assigned to "use of beamforming (directivity control) ID 0, which is parameter ID 0, with transmission panel antenna #1", and it is ID ♭0. An ID is assigned to "use of beamforming (directivity control) ID 1, which is parameter ID 1, with transmission panel antenna #1", and it is ID ♭1. An ID is assigned to "use of beamforming (directivity control) ID 2, which is parameter ID 2, with transmission panel antenna #1", and it is ID ♭2. An ID is assigned to "use of beamforming (directivity control) ID 3, which is parameter ID 3, with transmission panel antenna #1", and it is ID ♭3.

An ID is assigned to "use of beamforming (directivity control) ID 0, which is parameter ID 0, with transmission panel antenna #2", and it is ID ♭4. An ID is assigned to "use of beamforming (directivity control) ID 1, which is parameter ID 1, with transmission panel antenna #2", and it is ID ♭5. An ID is assigned to "use of beamforming (directivity control) ID 2, which is parameter ID 2, with transmission panel antenna #2", and it is ID ♭6. An ID is assigned to "use of beamforming (directivity control) ID 3, which is parameter ID 3, with transmission panel antenna #2", and it is ID ♭7.

An ID is assigned to "use of beamforming (directivity control) ID 0, which is parameter ID 0, with transmission panel antenna #3", and it is ID ♭8. An ID is assigned to "use of beamforming (directivity control) ID 1, which is parameter ID 1, with transmission panel antenna #3", and it is ID ♭9. An ID is assigned to "use of beamforming (directivity control) ID 2, which is parameter ID 2, with transmission panel antenna #3", and it is ID ♭10. An ID is assigned to "use of beamforming (directivity control) ID 3, which is parameter ID 3, with transmission panel antenna #3", and it is ID ♭11, and so forth.

Then, the base station transmits, as sector sweep reference signals, a "(reference) signal subjected to processing based on ID ♭0", a "(reference) signal subjected to processing based on ID ♭1", a "(reference) signal subjected to processing based on ID ♭2", a "(reference) signal subjected to processing based on ID ♭3", a "(reference) signal subjected to processing based on ID ♭4", a "(reference) signal subjected to processing based on ID ♭5", a "(reference) signal subjected to processing based on ID ♭6", a "(reference) signal subjected to processing based on ID ♭7", a "(reference) signal subjected to processing based on ID ♭8", a "(reference) signal subjected to processing based on ID ♭9", a "(reference) signal subjected to processing based on ID ♭10", a "(reference) signal subjected to processing based on ID ♭11", and so forth. Note that the above signals may be transmitted in the above order or in a different order.

At this time, the "(reference) signal subjected to processing based on ID ♭k" transmitted by the base station includes information of ID ♭k, where k is an integer equal to or greater than 0. Note that the "(reference) signal subjected to processing based on ID ♭k" transmitted by the base station may include other information. The examples are described in other embodiments, and the description thereof will be thus omitted (information of a transmission panel antenna may be included).

A terminal then receives the sector sweep reference signals transmitted by the base station and transmits a sector sweep reference signal including information of the ID with high reception quality (e.g., when "ID ♭3" has high reception quality, the information of "ID ♭3" is included). Note that the sector sweep reference signal transmitted by a terminal may include other information. The examples are as described in other embodiments. Methods of transmitting the sector sweep reference signal by a terminal are as described in other embodiments and will be described later in the present embodiment.

A transmission panel antenna (see FIGS. 1A, 1B and 1C) of the base station may include the configuration in FIG. 3. The transmission panel antenna may be composed of a single antenna or a plurality of antennas.

Based on the above, the base station may generate and transmit, for example, sector sweep reference signal 1001 in FIG. 10, etc. in the following manner.

Figure 34:
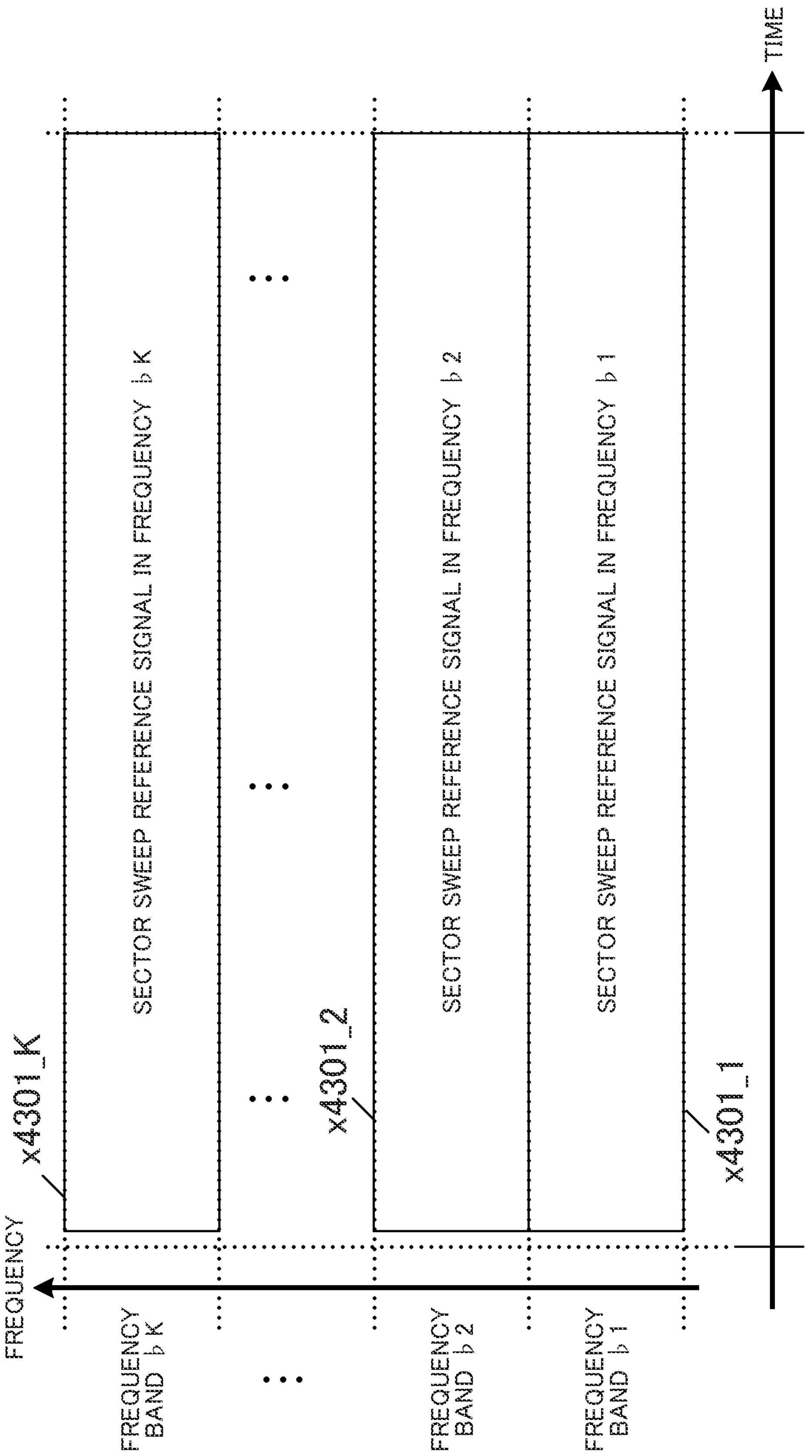
FIG. 34 illustrates an exemplary configuration for the sector sweep reference signals.

FIG. 34 illustrates an exemplary configuration of sector sweep reference signal 1001, which has been described with reference to FIG. 10 etc., for example, transmitted by the base station. The vertical axis represents frequency and the horizontal axis represents time in FIG. 34. Note that there are frequency band ♭1, frequency band ♭2, . . . , frequency band ♭K as in other embodiments.

As illustrated in FIG. 34, sector sweep reference signal 1001 is composed of "sector sweep reference signal x4301_1 in frequency ♭1", "sector sweep reference signal x4301_2 in frequency ♭2", . . . , "sector sweep reference signal x4301_K in frequency ♭K".

Figure 35:
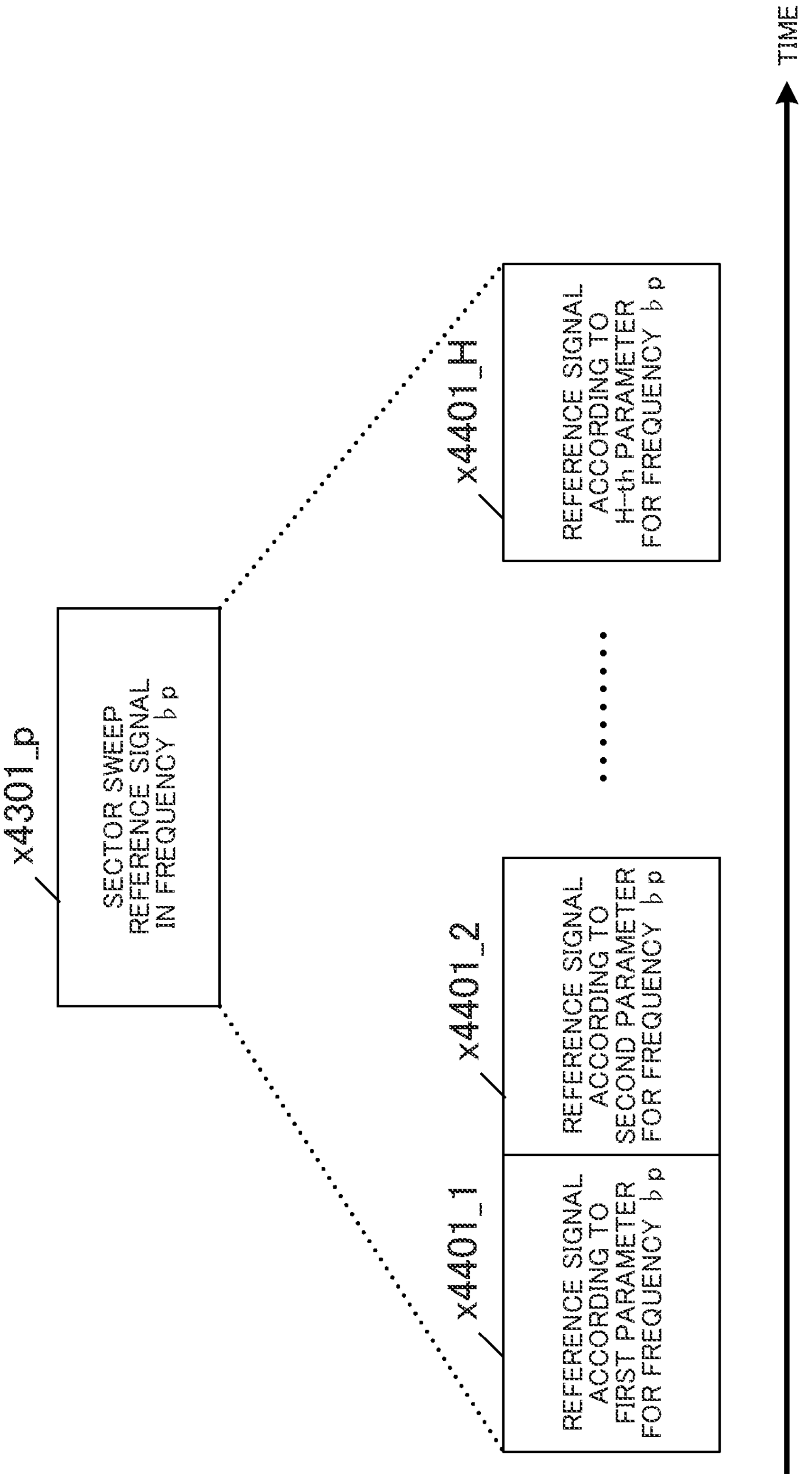
FIG. 35 illustrates an exemplary configuration of the "sector sweep reference signal in frequency ♭p" in FIG. 34.

FIG. 35 illustrates an exemplary configuration of "sector sweep reference signal x4301_*p* in frequency ♭p" in FIG. 34. Note that the horizontal axis represents time in FIG. 35. Note that p is an integer from 1 to K (both inclusive).

"Sector sweep reference signal x4301_*p* in frequency ♭p" is composed of "reference signal x4401_1 according to first parameter for frequency ♭p", "reference signal x4401_2 according to second parameter for frequency ♭p", . . . , "reference signal x4401_H according to H-th parameter for frequency ♭p". Note that H is an integer equal to or greater than 1 or an integer equal to or greater than 2.

In a case where the base station has a configuration in FIG. 1A, 1B, or 1C, "reference signal x4401_*i* according to i-th parameter for frequency ♭p" is transmitted using one or more transmission panel antennas among transmission panel antenna 1 labeled 106_1 to transmission panel antenna M labeled 106_M. Note that i is an integer from 1 to H (both inclusive).

For example, in a case where the base station has a configuration in FIG. 1A or 1B, "reference signal x440*i*_*i* according to i-th parameter for frequency ♭p" is subjected to signal processing (beamforming (directivity control)) according to the i-th parameter in first processor 104, and first processor 104 generates "reference signal x4401_*i* according to i-th parameter for frequency ♭p" to be transmitted using one or more transmission panel antennas among transmission panel antenna 1 labeled 106_1 to transmission panel antenna M labeled 106_M.

"Reference signal x4401_*i* according to i-th parameter for frequency ♭p" includes, for example, the following information.

Information on the i-th parameter, that is, a beamforming (directivity control) identification number (ID), which corresponds to i here, for example;

The number of time divisions in which sector sweep reference signals can be transmitted when the terminals transmit the sector sweep reference signals; and Information on the frequency band and/or frequency ♭p (information of the number of frequency divisions may also be included).

Other information may also be included, and "reference signal x4401_*i* according to i-th parameter for frequency ♭p" may include, for example, information similar to the information included in reference signal 1201_*a* according to a-th parameter in a transmission panel antenna for frequency ♭p in FIG. 12. Thus, for operations on "reference signal 1201_*a* according to a-th parameter in a transmission panel antenna for frequency ♭p in FIG. 12" in the present specification, the same can be implemented by replacing "reference signal 1201_*a* according to a-th parameter in a transmission panel antenna for frequency ♭p in FIG. 12" with "reference signal x4401_*i* according to i-th parameter for frequency ♭p".

In addition, "reference signal x4401_*i* according to i-th parameter for frequency ♭p" may include information of an antenna (e.g., transmission panel antenna ID, sector antenna information, and antenna port number) used for transmitting "reference signal x4401_*i* according to i-th parameter for frequency ♭p".

Note that, although the above description is based on a case of multi-carrier such as OFDM, by way of example, the present disclosure is not limited to this and the same can be implemented in a case of single-carrier. It can be implemented in a single-carrier scheme, for example, considering that there is only frequency ♭1 in FIG. 34, etc.

Next, a variation on a sector sweep reference signal transmitted by a terminal will be described.

The methods of transmitting a sector sweep reference signal by a terminal have described with reference to, for example, FIGS. 14, 15A, 15B, etc.

To be more specific, a sector sweep reference signal is generated based on the identification (ID) of a transmission panel antenna and the ID of beamforming (see FIGS. 15A and 15B).

For example, a terminal transmits sector sweep reference signals using transmission panel antenna #1. In this case, the terminal transmits the following sector sweep reference signals using transmission panel antenna #1.

"(Reference) signal subjected to processing based on a parameter of beamforming (directivity control) ID 0, which is parameter ID 0, using transmission panel antenna #1"

"(Reference) signal subjected to processing based on a parameter of beamforming (directivity control) ID 1, which is parameter ID 1, using transmission panel antenna #1"

"(Reference) signal subjected to processing based on a parameter of beamforming (directivity control) ID 2, which is parameter ID 2, using transmission panel antenna #1"

"(Reference) signal subjected to processing based on a parameter of beamforming (directivity control) ID 3, which is parameter ID 3, using transmission panel antenna #1"

Likewise, the terminal transmits sector sweep reference signals using transmission panel antenna #2. In this case, the terminal transmits the following sector sweep reference signals using transmission panel antenna #2.

"(Reference) signal subjected to processing based on a parameter of beamforming (directivity control) ID 0, which is parameter ID 0, using transmission panel antenna #2"

"(Reference) signal subjected to processing based on a parameter of beamforming (directivity control) ID 1, which is parameter ID 1, using transmission panel antenna #2"

"(Reference) signal subjected to processing based on a parameter of beamforming (directivity control) ID 2, which is parameter ID 2, using transmission panel antenna #2"

"(Reference) signal subjected to processing based on a parameter of beamforming (directivity control) ID 3, which is parameter ID 3, using transmission panel antenna #2"

That is, the terminal transmits sector sweep reference signals using transmission panel antenna #i. Note that i is an integer equal to or greater than 1. In this case, the terminal transmits the following sector sweep reference signals using transmission panel antenna #i.

"(Reference) signal subjected to processing based on a parameter of beamforming (directivity control) ID 0, which is parameter ID 0, using transmission panel antenna #i"

"(Reference) signal subjected to processing based on a parameter of beamforming (directivity control) ID 1, which is parameter ID 1, using transmission panel antenna #i"

"(Reference) signal subjected to processing based on a parameter of beamforming (directivity control) ID 2, which is parameter ID 2, using transmission panel antenna #i"

"(Reference) signal subjected to processing based on a parameter of beamforming (directivity control) ID 3, which is parameter ID 3, using transmission panel antenna #i"

In the above, "the ID of a transmission panel antenna and the ID of beamforming (directivity control) of a terminal" are distinguished from each other, but the ID may be assigned without distinguishing and the terminal may generate and transmit a sector sweep reference signal.

For example, an ID is assigned to "use of beamforming (directivity control) ID 0, which is parameter ID 0, with transmission panel antenna #1", and it is ID ♭0. An ID is assigned to "use of beamforming (directivity control) ID 1, which is parameter ID 1, with transmission panel antenna #1", and it is ID ♭1. An ID is assigned to "use of beamforming (directivity control) ID 2, which is parameter ID 2, with transmission panel antenna #1", and it is ID ♭2. An ID is assigned to "use of beamforming (directivity control) ID 3, which is parameter ID 3, with transmission panel antenna #1", and it is ID ♭3.

An ID is assigned to "use of beamforming (directivity control) ID 0, which is parameter ID 0, with transmission panel antenna #2", and it is ID ♭4. An ID is assigned to "use of beamforming (directivity control) ID 1, which is parameter ID 1, with transmission panel antenna #2", and it is ID ♭5. An ID is assigned to "use of beamforming (directivity control) ID 2, which is parameter ID 2, with transmission panel antenna #2", and it is ID ♭6. An ID is assigned to "use of beamforming (directivity control) ID 3, which is parameter ID 3, with transmission panel antenna #2", and it is ID ♭7.

An ID is assigned to "use of beamforming (directivity control) ID 0, which is parameter ID 0, with transmission panel antenna #3", and it is ID ♭8. An ID is assigned to "use of beamforming (directivity control) ID 1, which is parameter ID 1, with transmission panel antenna #3", and it is ID ♭9. An ID is assigned to "use of beamforming (directivity control) ID 2, which is parameter ID 2, with transmission panel antenna #3", and it is ID♭10. An ID is assigned to "use of beamforming (directivity control) ID 3, which is parameter ID 3, with transmission panel antenna #3", and it is ID ♭11, and so forth.

Then, the terminal transmits, as sector sweep reference signals, a "(reference) signal subjected to processing based on ID ♭0", a "(reference) signal subjected to processing based on ID ♭1", a "(reference) signal subjected to processing based on ID ♭2", a "(reference) signal subjected to processing based on ID ♭3", a "(reference) signal subjected to processing based on ID ♭4", a "(reference) signal subjected to processing based on ID ♭5", a "(reference) signal subjected to processing based on ID ♭6", a "(reference) signal subjected to processing based on ID ♭7", a "(reference) signal subjected to processing based on ID ♭8", a "(reference) signal subjected to processing based on ID ♭9", a "(reference) signal subjected to processing based on ID ♭10", a "(reference) signal subjected to processing based on ID ♭11", and so forth. Note that the above signals may be transmitted in the above order or in a different order.

At this time, the "(reference) signal subjected to processing based on ID ♭k" transmitted by the terminal includes information of ID♭k, where k is an integer equal to or greater than 0. Note that the "(reference) signal subjected to processing based on ID ♭k" transmitted by the terminal may include other information. The examples are described in other embodiments, and the description thereof will be thus omitted (information of a transmission panel antenna may be included).

A base station then receives the sector sweep reference signals transmitted by the terminal and transmits a feedback signal including information of the ID with high reception quality (e.g., when "ID ♭3" has high reception quality, the information of "ID ♭3" is included). Note that the feedback signal transmitted by a base station may include other information. The examples are as described in other embodiments. Methods of transmitting the feedback signal by a base station are as described in other embodiments and will be described later in the present embodiment.

A transmission panel antenna (see FIGS. 1A, 1B and 1C) of the terminal may include the configuration in FIG. 3. The transmission panel antenna may be composed of a single antenna or a plurality of antennas.

Based on the above, the terminal may generate and transmit, for example, a terminal sector sweep reference signal in FIG. 13, etc. in the following manner.

FIG. 14 illustrates exemplary assignment of sector sweep reference signals transmitted by the terminals. The description thereof will be omitted since it has already been described.

Figure 36:
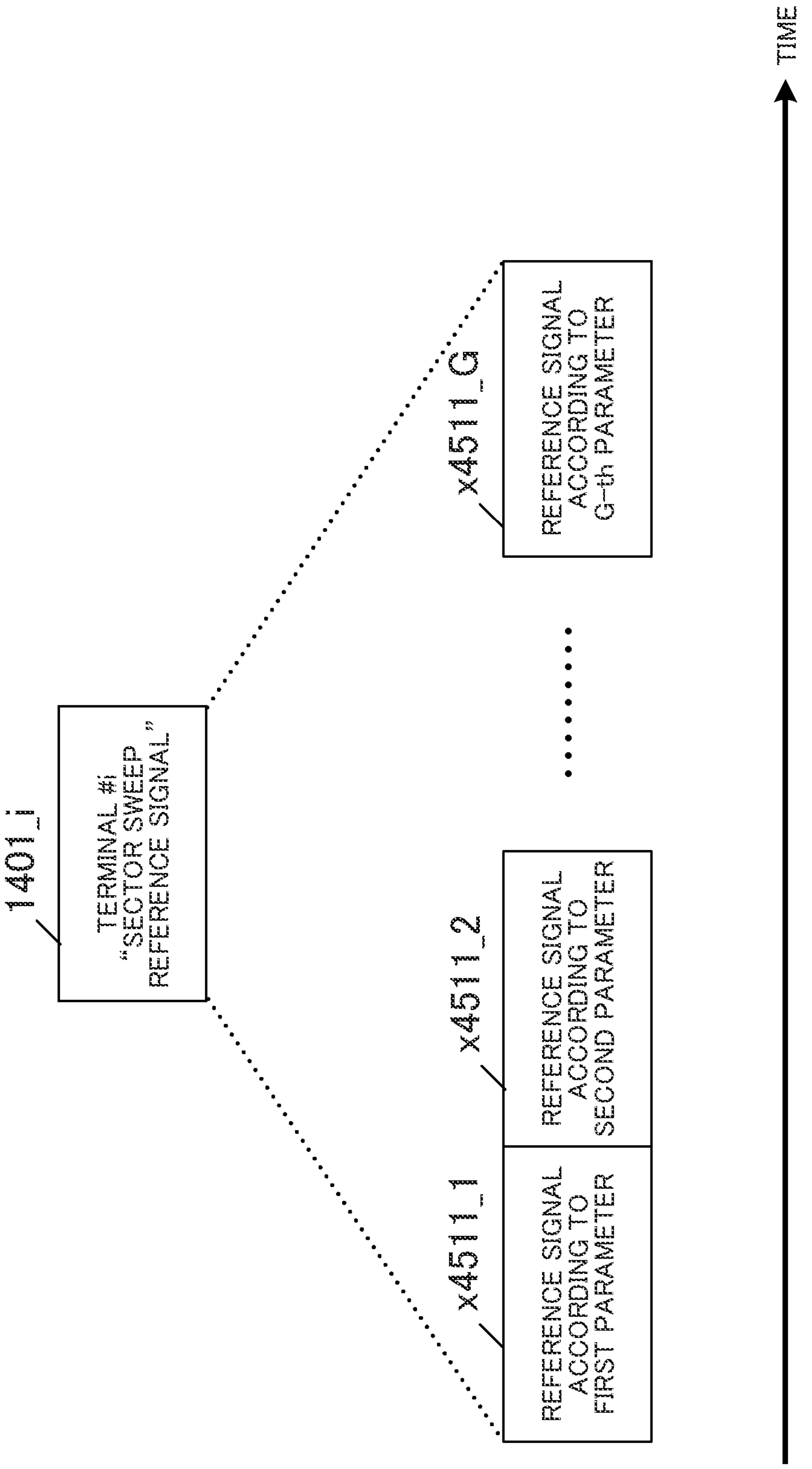
FIG. 36 illustrates an exemplary configuration of the terminal #i "sector sweep reference signal" in FIG. 14.

FIG. 36 illustrates an exemplary configuration of terminal #i "sector sweep reference signal" 1401_*i* in FIG. 14. Terminal #i "sector sweep reference signal" 1401_*i* is composed of "reference signal x4511_1 according to first parameter", "reference signal x4511_2 according to second parameter", . . . , "reference signal x4511_G according to G-th parameter". Note that G is an integer equal to or greater than 1 or an integer equal to or greater than 2.

In a case where terminal #i has a configuration in FIG. 1A. 1B, or 1C, terminal #i "sector sweep reference signal" 1401_*i* is transmitted using one or more transmission panel antennas among transmission panel antenna 1 labeled 106_1 to transmission panel antenna M labeled 106_M.

For example, in a case where the terminal has a configuration in FIG. 1A or 11, "reference signal x4511_*k* according to k-th parameter" is subjected to signal processing (beamforming (directivity control)) according to the k-th parameter in first processor 104, and first processor 104 generates "reference signal x4511_*k* according to k-th parameter" to be transmitted using one or more transmission panel antennas among transmission panel antenna 1 labeled 106_1 to transmission panel antenna M labeled 106_M. Note that k is an integer from 1 to G (both inclusive).

"Reference signal x4511_*k* according to k-th parameter" includes, for example, the following information.

- Information on the k-th parameter, that is, a beamforming (directivity control) identification number (ID), for example; and
- Information to be fed back to the base station, for example, information of a frequency (band) with high reception quality, information of a parameter of beamforming (directivity control) with high reception quality, and information of an antenna with high reception quality that have been estimated by the terminal in receiving sector sweep reference signals transmitted by the base station.

Information included in "reference signal x4511_*k* according to k-th parameter" are as described in other embodiments, including the above-described information.

Thus, for operations on "reference signal 1511_*a* according to a-th parameter in transmission panel antenna xi in FIG. 15B" in the present specification, the same can be implemented by replacing "reference signal 1511_*a* according to a-th parameter in transmission panel antenna xi in FIG. 15B" with "reference signal x451_1_*k* according to k-th parameter".

In addition, "reference signal x4511_*k* according to k-tb parameter" may include information of an antenna (e.g., transmission panel antenna ID, sector antenna information, and antenna port number) used for transmitting "reference signal x4511_*k* according to k-th parameter"

Another example will be described.

A transmission panel antenna (see FIGS. 1A, 1B and 1C) of the terminal may include the configuration in FIG. 3. The transmission panel antenna may be composed of a single antenna or a plurality of antennas.

Based on the above, the terminal may generate and transmit, for example, a terminal sector sweep reference signal in FIG. 23, etc. in the following manner.

FIG. 24 illustrates exemplary assignment of sector sweep reference signals transmitted by the terminals. The description thereof will be omitted since it has already been described.

Figure 37:
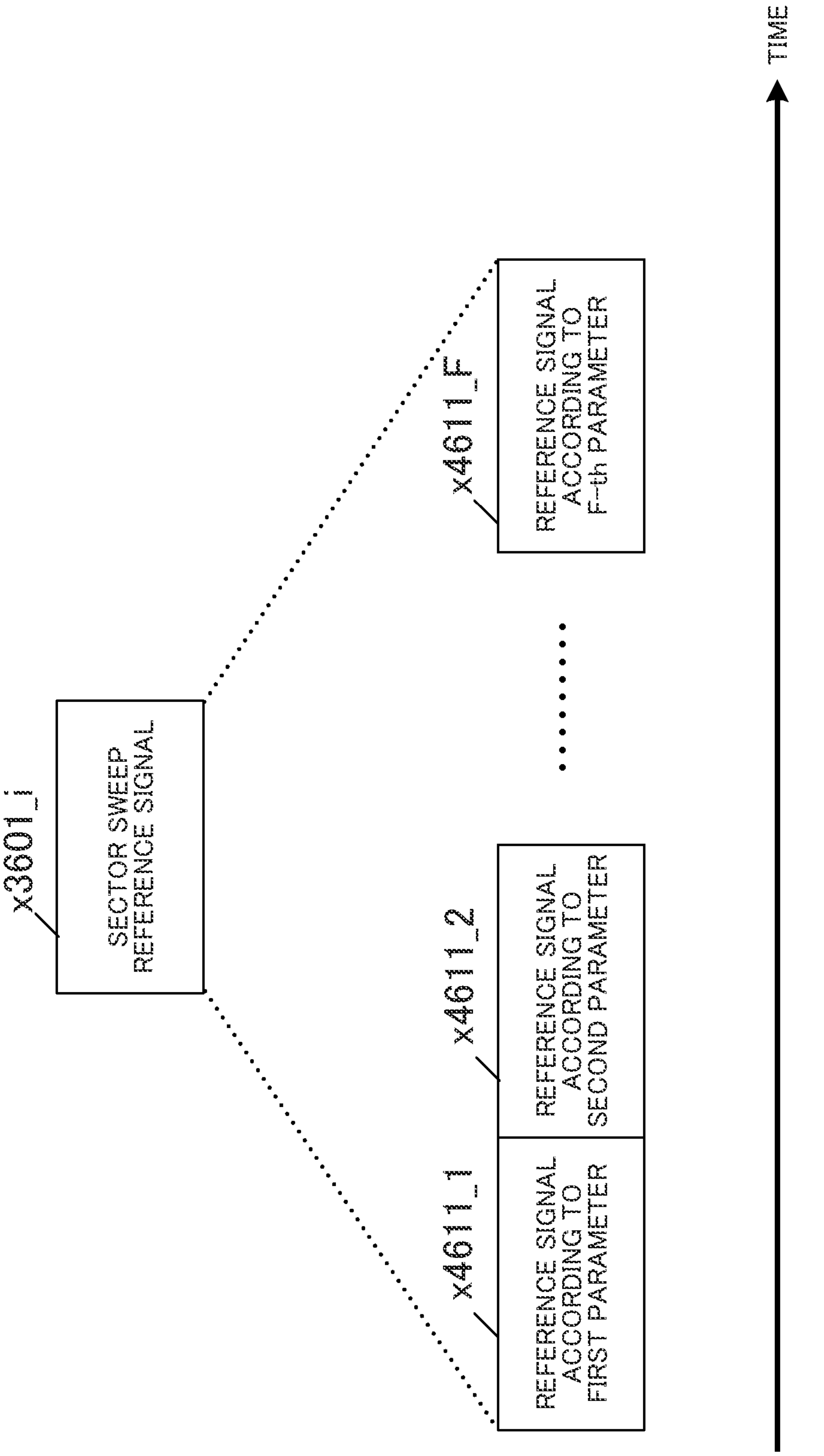
FIG. 37 illustrates an exemplary configuration of the sector sweep reference signal in FIG. 29.

FIG. 37 illustrates an exemplary configuration of sector sweep reference signal x3601_*i* in FIG. 29. Sector sweep reference signal x3601_*i* is composed of "reference signal x4611_1 according to first parameter", "reference signal x4611_2 according to second parameter", . . . , "reference signal x4611_F according to F-th parameter". Note that F is an integer equal to or greater than 1 or an integer equal to or greater than 2.

In a case where terminal #i has a configuration in FIG. 1A, 1B, or 1C, sector sweep reference signal x3601_*i* is transmitted using one or more transmission panel antennas among transmission panel antenna 1 labeled 106_1 to transmission panel antenna M labeled 106_M.

For example, in a case where the terminal has a configuration in FIG. 1A or 1B, "reference signal x461_1_*k* according to k-th parameter" is subjected to signal processing (beamforming (directivity control)) according to the k-th parameter in first processor 104, and first processor 104 generates "reference signal x4611_*k* according to k-th parameter" to be transmitted using one or more transmission panel antennas among transmission panel antenna 1 labeled 106_1 to transmission panel antenna M labeled 106_M. Note that k is an integer from 1 to F (both inclusive).

"Reference signal x4611_*k* according to k-th parameter" includes, for example, the following information:

Information on the k-th parameter, that is, a beamforming (directivity control) identification number (ID), for example; and Information to be fed back to the base station, for example, information of a frequency (band) with high reception quality, information of a parameter of beamforming (directivity control) with high reception quality, and information of an antenna with high reception quality that have been estimated by the terminal in receiving sector sweep reference signals transmitted by the base station.

Information included in "reference signal x461_1_*k* according to k-th parameter" are as described in other embodiments, including the above-described information.

Thus, for operations on "reference signal 1511_*a* according to a-th parameter in transmission panel antenna xi in FIG. 15B" in the present specification, the same can be implemented by replacing "reference signal 1511_*a* according to a-th parameter in transmission panel antenna xi in FIG. 15B" with "reference signal x4611_*k* according to k-th parameter".

In addition, "reference signal x4611_*k* according to k-th parameter" may include information of an antenna (e.g., transmission panel antenna ID, sector antenna information, and antenna port number) used for transmitting "reference signal x4611_*k* according to k-th parameter"

The base station may transmit, to a communication counterpart (terminal), information of a reception panel antenna used for reception of a modulation signal and information of a parameter of beamforming (directivity control) for the reception. In addition, as is the case with the above examples on transmission, an ID may be assigned without distinguishing between the information of a reception panel antenna and the beamforming (directivity control), and the ID information may be transmitted to the communication counterpart (terminal).

Note that, although FIGS. 1A, 1B, and 1C have been used for the configuration example of the base station, the configuration is not limited to these. The configuration of a reception panel antenna is not limited to the configuration in FIG. 4 either, and the reception panel antenna may be composed of a single antenna or a plurality of antennas.

At this time, the beamforming (directivity control) for reception may be performed using one or more reception panel antennas (one or more reception antennas). Then, information of a parameter of the beamforming (directivity control) used for the reception may be transmitted to a communication counterpart (terminal).

The terminal may transmit, to a communication counterpart (base station), information of a reception panel antenna used for reception of a modulation signal and information of a parameter of beamforming (directivity control) for the reception. In addition, as is the case with the above examples on transmission, an ID may be assigned without distinguishing between the information of a reception panel antenna and the beamforming (directivity control), and the ID information may be transmitted to the communication counterpart (base station).

Note that, although FIGS. 1A, 1B, and 1C have been used for the configuration example of the terminal, the configuration is not limited to these. The configuration of a reception panel antenna is not limited to the configuration in FIG. 4 either, and the reception panel antenna may be composed of a single antenna or a plurality of antennas.

At this time, the beamforming (directivity control) for reception may be performed using one or more reception panel antennas (one or more reception antennas). Then, information of a parameter of the beamforming (directivity control) used for the reception may be transmitted to a communication counterpart (base station).

Note that a description has been given of examples of transmission beamforming by a base station, reception beamforming by the base station, transmission beamforming by a terminal, and reception beamforming by the terminal using Embodiment 1 to Embodiment 4, but the implementation method is not limited to these examples. For example, the base station may use either a multi-carrier scheme such as OFDM or a single-carrier scheme, and the base station may support both the multi-carrier scheme such as OFDM and the single-carrier scheme. Likewise, the terminal may use either a multi-carrier scheme such as OFDM or a single-carrier scheme, and the terminal may support both the multi-carrier scheme such as OFDM and the single-carrier scheme.

Embodiment 5

In some cases, radio systems using different radio communication schemes share "a licensed band and/or an unlicensed band". For example, the NR system in a frequency band from 52.6 GHz to 71 GHz (both inclusive) and a radio system of IEEE 802.11ad/ay sometimes share "a licensed band and/or an unlicensed band". A description will be given of exemplary operations in the case where radio systems using different radio communication schemes share "a licensed band and/or an unlicensed band". Note that operations described in the present embodiment are applicable to a case where a frequency (band) is shared.

Figure 38:
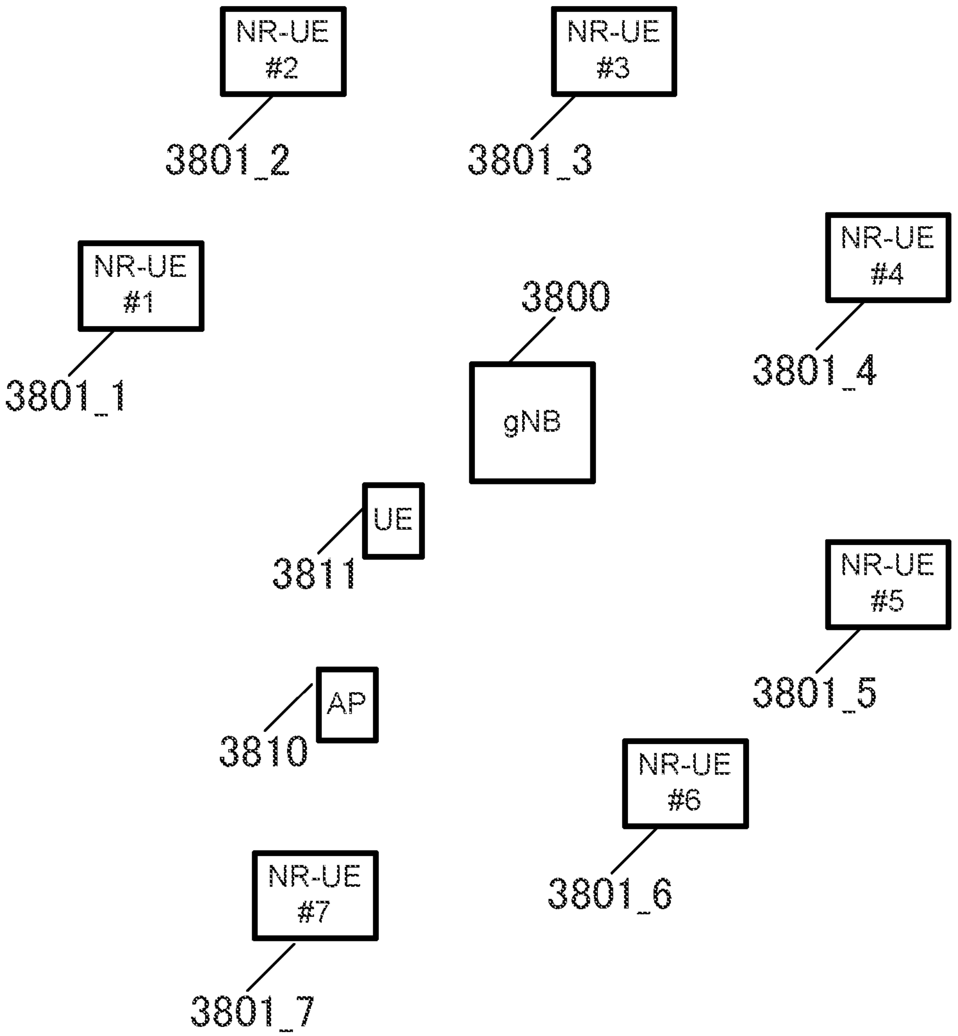
FIG. 38 illustrates an exemplary radio system according to Embodiment 5.

FIG. 38 illustrates an exemplary radio system according to Embodiment 5, etc. In FIG. 38, a radio system of NR and a radio system of IEEE 802.11ad and/or IEEE 802.11ay are present in a certain space. In the following, IEEE 802.11ad and/or IEEE 802.11ay are sometimes referred to as the first standard.

The radio system of new radio (NR) includes a base station and a terminal. The base station of NR may be referred to as g Node B (gNB). For example, gNB 3800 is present in FIG. 38. The terminal of NR may be referred to as user equipment (UE). Note that the name thereof is not limited to this. In the following, the terminal of NR is sometimes referred to as "NR-UE". For example, NR-UE #1 labeled 38001_1 to NR-UE #7 labeled 38001_7 are present in FIG. 38.

The radio system specified in the first standard includes a base station and a terminal. The base station specified in the first standard may be referred to as an access point (AP). For example, AP 3810 is present in FIG. 38. The terminal specified in the first standard may be referred to as UE. For example, UE 3811 is present in FIG. 38.

The radio system of NR and the radio system specified in the first standard share "a licensed band and/or an unlicensed band". The radio system of NR and the radio system specified in the first standard can occupy the "licensed band and/or unlicensed band" based on Listen Before Talk (LBT), for example.

As a simple method, the radio system of NR and/or the radio system specified in the first standard performs "carrier sensing and/or LBT" and starts communication when a channel is available, for example. Meanwhile, the radio system of NR and/or the radio system specified in the first standard stands by to start communication when a channel is in use.

Next, LBT related to the present invention will be described.

Figure 39:
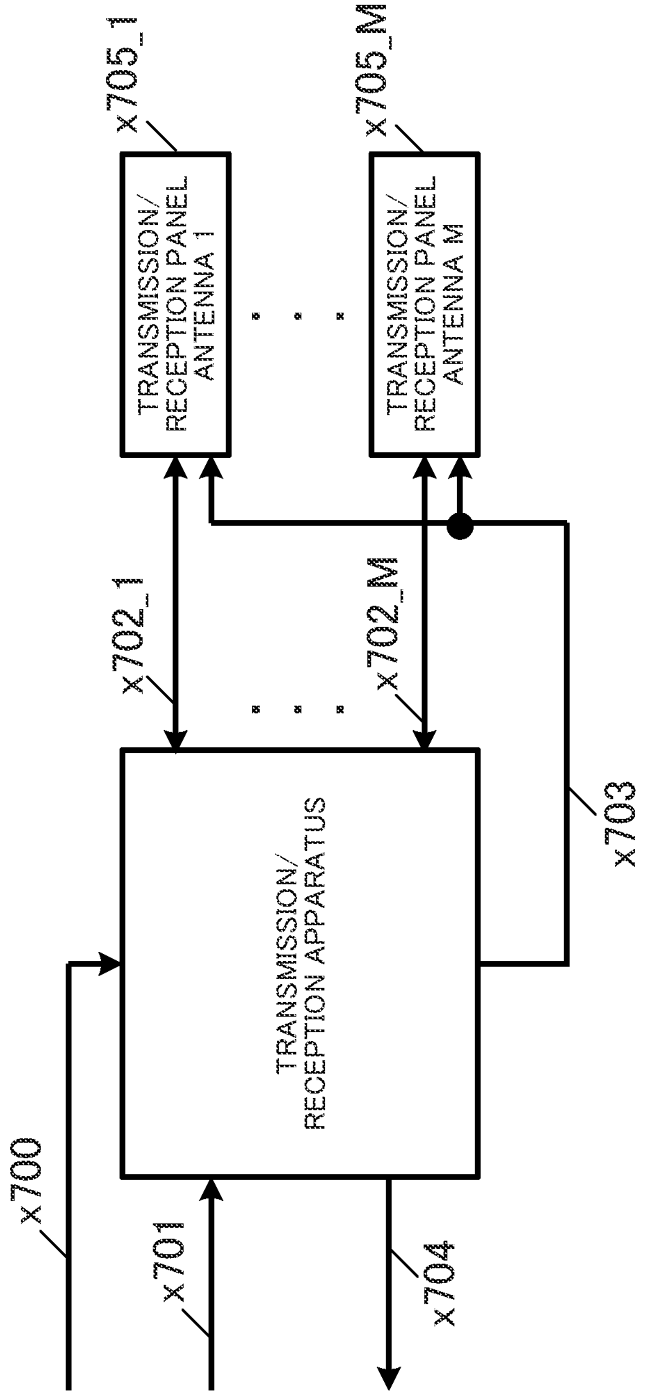
FIG. 39 illustrates an exemplary configuration of gNB and NR-UE.

FIG. 39 illustrates an exemplary configuration of the gNB and NR-UE, for example. Transmission/reception panel antenna i labeled x705_*i* in FIG. 39 is an antenna including components in FIGS. 3 and 4, for example. Here, i is an integer from 1 to M (both inclusive), and M is an integer equal to or greater than 1 or an integer equal to or greater than 2. Thus, transmission/reception panel antenna i labeled x705_*i* can perform transmit beamforming (transmission directivity control) and receive beamforming (reception directivity control).

Note that specific operations of transmit beamforming (transmission directivity control) and receive beamforming (reception directivity control) have already been described, and the apparatus performs transmit beamforming (transmission directivity control) to transmit a sector sweep reference signal, feedback signal, frame, slot, modulation signal, data symbol, and the like.

Figure 40:
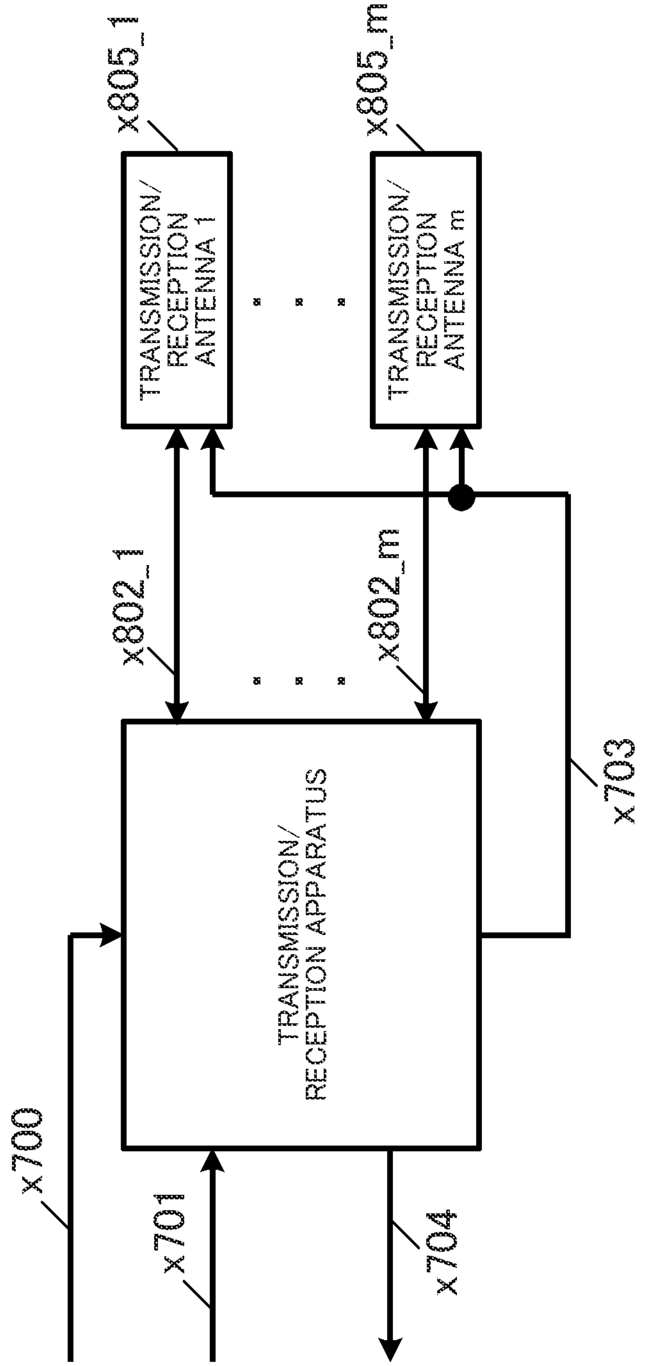
FIG. 40 illustrates another exemplary configuration of gNB and NR-UE.

FIG. 40 illustrates another exemplary configuration of the gNB and NR-UE. In FIG. 40, the components that operate in the same manner as in FIG. 39 are denoted by the same reference signs, and the descriptions thereof will be omitted.

In a case where the gNB has the configuration in FIG. 40, transmit beamforming (transmission directivity control) and receive beamforming (reception directivity control) are performed using one or more of "transmission/reception antenna 1 labeled x805_1 to transmission/reception antenna m labeled x805_*m*".

Then, the gNB with the configuration in FIG. 40 performs transmit beamforming (transmission directivity control) and transmits sector sweep reference signals described above.

For example, the gNB with the configuration in FIG. 40 uses a first transmit beam to transmit a first sector sweep reference signal, use a second transmit beam to transmit a second sector sweep reference signal, and so forth.

The gNB then determines "transmit beamforming and receive beamforming" to be used for communication with each terminal, and transmits and receives a feedback signal, frame, slot, modulation signal, data symbol, and the like.

In a case where the NR-UE has the configuration in FIG. 40, transmit beamforming (transmission directivity control) and receive beamforming (reception directivity control) are performed using one or more of "transmission/reception antenna 1 labeled x805_1 to transmission/reception antenna in labeled x805_*m*".

Then, the NR-UE with the configuration in FIG. 40 performs transmit beamforming (transmission directivity control) and transmits sector sweep reference signals described above.

For example, the NR-UE with the configuration in FIG. 40 uses a first transmit beam to transmit a first sector sweep reference signal, uses a second transmit beam to transmit a second sector sweep reference signal, and so forth.

The NR-UE then determines "transmit beamforming and receive beamforming" to be used for communication with the gNB, and transmits and receives a feedback signal, frame, slot, modulation signal, data symbol, and the like.

Note that FIGS. 39 and 40 illustrating "a configuration of the gNB and a configuration of the NR-UE" are merely examples and the configurations are not limited to these.

The transmission/reception panel antenna (x705_1 to x705_M) in FIG. 39 may be composed of a single antenna or a plurality of antennas. In addition, the transmission/reception panel antenna (x705_1 to x705_M) may be composed of a single antenna element or a plurality of antenna elements. A configuration of the transmission/reception panel antenna (x705_1 to x705_M) is not limited to the configuration described in the present embodiment, and may be the configuration described in the other embodiments, for example.

The transmission/reception antenna (x805_1 to x805_*m*) in FIG. 40 may be composed of a single antenna or a plurality of antennas. In addition, the transmission/reception antenna (x805_1 to x805_*m*) may be composed of a single antenna element or a plurality of antenna elements. A configuration of the transmission/reception antenna (x805_1 to x805_*m*) is not limited to the configuration described in the present embodiment.

Note that, in a case where transmission/reception panel antenna i labeled x705_*i* in FIG. 39 shares, for example, the transmission panel antenna with the configuration in FIG. 3 and the reception panel antenna with the configuration in FIG. 4, transmission antenna 306_1 in FIG. 3 and reception antenna 401_1 in FIG. 4 are shared to configure a single antenna, and multiplier 3041 and multiplier 4031 are connected to the shared antenna.

Likewise, transmission antenna 306_2 in FIG. 3 and reception antenna 401_2 in FIG. 4 are shared to configure a single antenna, and multiplier 304_2 and multiplier 403_2 are connected to the shared antenna. In addition, transmission antenna 306_3 in FIG. 3 and reception antenna 401_3 in FIG. 4 are shared to configure a single antenna, and multiplier 304_3 and multiplier 403_3 are connected to the shared antenna. Then, transmission antenna 306_4 in FIG. 3 and reception antenna 401_4 in FIG. 4 are shared to configure a single antenna, and multiplier 304_4 and multiplier 403_4 are connected to the shared antenna.

Regarding Omni-Directional Antenna.

In a case where the gNB and NR-UE have the configuration in FIG. 39, signal reception is performed by using one or more of "transmission/reception panel antenna I labeled x705_1 to transmission/reception panel antenna M labeled x705_M".

In each of "transmission/reception panel antenna 1 labeled x705_1 to transmission/reception panel antenna M labeled x705_M", certain receive beamforming (reception directivity control) is configured for antennas composing the transmission/reception panel antenna.

Note that not all antennas composing the transmission/reception panel antenna need to be used for signal reception, and the configuration of receive beamforming (reception directivity control) may or may not be fixed in time.

The method of using the transmission/reception panel antenna in omni-directional reception is not limited to the above example.

In a case where the gNB and NR-UE have the configuration in FIG. 40, signal reception is performed by using one or more of "transmission/reception antenna 1 labeled x805_1 to transmission/reception antenna m labeled x805_*m*".

In each of "transmission/reception antenna 1 labeled x805_1 to transmission/reception antenna m labeled x805_*m*", certain receive beamforming (reception directivity control) is configured for antennas composing the transmission/reception antenna.

Note that not all antennas composing the transmission/reception antenna need to be used for signal reception.

The method of using the transmission/reception antenna in omni-directional reception is not limited to the above example.

Figure 41:
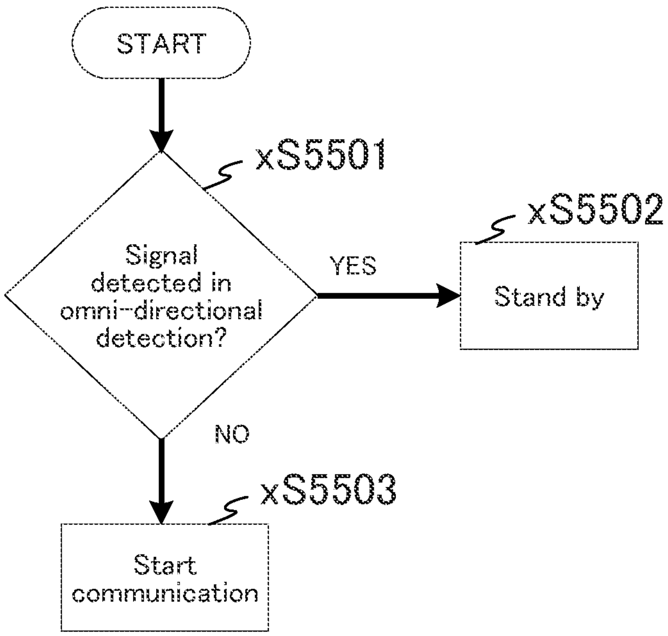
FIG. 41 is a flowchart describing an exemplary operation of gNB in omni-directional LBT.

Regarding Omni-Directional LBT;

FIG. 41 is a flowchart describing an exemplary operation of the gNB in omni-directional LBT. The gNB determines whether a signal is detected in omni-directional detection (55501).

When a signal is detected in the omni-directional detection (YES in xS5501), the gNB stands by for communication (xS5502). For example, the gNB determines that another apparatus (another gNB, NR-UE, AP or first standard-UE) occupies a channel in the “licensed band and/or unlicensed band” and stands by without transmitting a signal.

When no signal is detected (no signal can be detected) in the omni-directional detection (NO in xS5501), the gNB starts communication (xS5503). For example, the gNB determines that another apparatus (another gNB, NR-UE, AP, or first standard-UE) does not occupy a channel in the “licensed band and/or unlicensed band” and starts communication.

As a method of signal detection, the gNB may determine that a signal is present when the power at the time of reception is greater than a threshold and that a signal is not present when the power is less than the threshold. As another method, the gNB may determine that a signal is present when the signal can be demodulated and that a signal is not present when the signal cannot be demodulated. Although two examples have been described as methods of signal detection, the present disclosure is not limited to these. In addition, the above description is about an exemplary operation of the gNB, but the NR-UE operates in the same manner. Note that, although the signal detected by the gNB and NR-UE is assumed to be a signal based on the first standard, it may be a signal other than the signal of the first standard or may be an NR signal, which causes interference.

Regarding Stand-By:

In some cases, the gNB and NR-UE “stand by” when the omni-directional reception is performed and a signal is detected. For example, the gNB and NR-UE stand by without transmitting a signal as illustrated in xS5502 of FIG. 41.

The gNB and NR-UE may restart the operation of the omni-directional LBT when a certain amount of time has passed. Alternatively, when the omni-directional reception is performed and a signal is detected, the gNB and NR-UE may again perform the omni-directional reception and check whether a signal is present.

Figure 42:
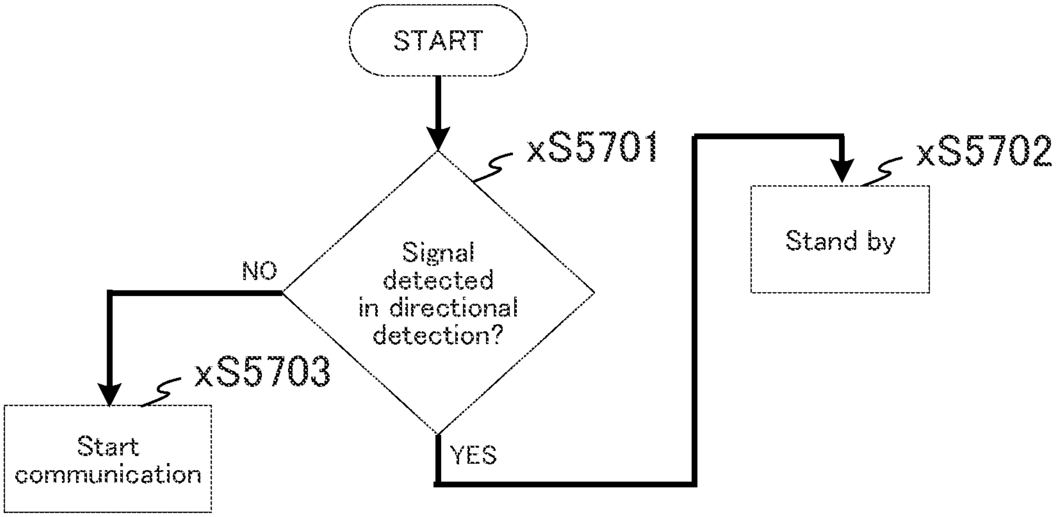
FIG. 42 is a flowchart describing an exemplary operation of gNB in directional LBT.

Regarding Directional LBT;

FIG. 42 is a flowchart describing an exemplary operation of the gNB in the directional LBT. The gNB determines whether a signal is detected in the directional detection (xS5701).

When a signal is detected in the directional detection (YES in xS5701), the gNB stands by for communication (xS5702). For example, the gNB determines that another apparatus (another gNB, NR-UE, AP, or first standard-UE) occupies a channel in the “licensed band and/or unlicensed band” and stands by without transmitting a signal.

When no signal is detected (no signal can be detected) in the directional detection (NO in xS5701), the gNB starts communication (xS5703). For example, the gNB determines that another apparatus (another gNB, NR-UE, AP, or first standard-UE) does not occupy a channel in the “licensed band and/or unlicensed band” and starts communication.

As a method of signal detection, the gNB may determine that a signal is present when the power at the time of reception is greater than a threshold and that a signal is not present when the power is less than the threshold. As another method, the gNB may determine that a signal is present when the signal can be demodulated and that a signal is not present when the signal cannot be demodulated. Two examples have been described but the method is not limited to the examples. In addition, the above description is about an exemplary operation of the gNB, but the NR-UE operates in the same manner. Note that, although the signal detected by the gNB and NR-UE is assumed to be a signal based on the first standard, it may be a signal other than the signal of the first standard or may be an NR signal, which causes interference.

Figure 43:
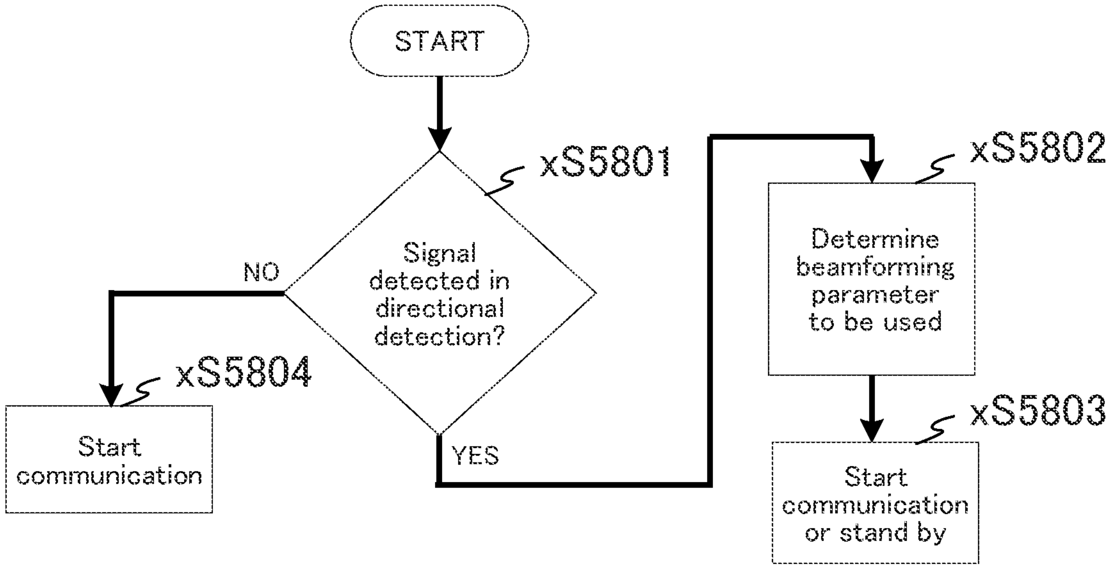
FIG. 43 is a flowchart describing an exemplary operation of gNB in directional LBT.

FIG. 43 is a flowchart describing an exemplary operation of the gNB in the directional LBT. In FIG. 43, the gNB specifies a beam direction in which signal interference occurs. The gNB stands by without transmitting a signal in the specified beam direction, and transmits a signal (starts communication) in a direction other than the specified beam direction.

The gNB determines whether a signal is detected in the directional detection (xS5801).

When a signal is detected in the directional detection (YES in xS5801), the gNB determines a beamforming parameter to be used for signal transmission (xS5802). For example, the gNB may determine a beamforming parameter in a direction other than the direction in which a signal is detected in the directional detection.

Upon determining the beamforming parameter in xS5802, the gNB starts communication or stands by, using the determined beamforming parameter (xS5803). For example, the gNB may determine that another apparatus (another gNB, NR-UE, AP, or first standard-UE) occupies a channel of the “licensed band and/or unlicensed band” in the direction in which a signal is detected in the directional detection, and stand by without transmitting a signal. The gNB may determine that another apparatus (another gNB, NR-UE, AP, or first standard-UE) does not occupy a channel of the “licensed band and/or unlicensed band” in a direction other than the direction in which a signal is detected in the directional detection, and starts communication.

When no signal is detected (no signal can be detected) in the directional detection (NO in xS5801), the gNB starts communication (xS5804). For example, the gNB determines that another apparatus (another gNB, NR-UE, AP, or first standard-UE) does not occupy a channel in the “licensed band and/or unlicensed band” and starts communication.

As a method of signal detection, the gNB may determine that a signal is present when the power at the time of reception is greater than a threshold and that a signal is not present when the power is less than the threshold. As another method, the gNB may determine that a signal is present when the signal can be demodulated and that a signal is not present when the signal cannot be demodulated. Two examples have been described but the method is not limited to the examples. In addition, the above description is about an exemplary operation of the gNB, but the NR-UE operates in the same manner. Note that, although the signal detected by the gNB and NR-UE is assumed to be a signal based on the first standard, it may be a signal other than the signal of the first standard or may be an NR signal, which causes interference.

Regarding Directional Antenna:

In a case where the gNB and NR-UE have the configuration in FIG. 39, signal reception is performed by using one of “transmission/reception panel antenna 1 labeled x705_1 to transmission/reception panel antenna M labeled x705_M”.

In detecting a signal in the directional reception, each transmission panel antenna performs, for example, four types of receive beamforming (reception directivity control).

In detecting a signal in the directional reception, the gNB and NR-UE perform, for example, receive beamforming (reception directivity control) according to the first parameter, receive beamforming (reception directivity control) according to the second parameter, receive beamforming (reception directivity control) according to the third parameter, and receive beamforming (reception directivity control) according to the fourth parameter in transmission/reception panel antenna 1 labeled x705_1.

Further, in detecting a signal in the directional reception, the gNB and NR-UE perform receive beamforming (reception directivity control) according to the fifth parameter, receive beamforming (reception directivity control) according to the sixth parameter, receive beamforming (reception directivity control) according to the seventh parameter, and receive beamforming (reception directivity control) according to the eighth parameter in transmission/reception panel antenna 2 labeled x705_2.

Thus, in detecting a signal in the directional reception, receive beamforming (reception directivity control) according to the (4×i−3)-th parameter, receive beamforming (reception directivity control) according to the (4×i−2)-th parameter, receive beamforming (reception directivity control) according to the (4×i−1)-th parameter, and receive beamforming (reception directivity control) according to the (4×i)-th parameter are performed in transmission/reception panel antenna i labeled x705_*i*. Note that i is an integer from 1 to M (both inclusive).

Then, the gNB and NR-UE perform receive beamforming (reception directivity control) according to the first parameter, and confirm whether a signal is present. Accordingly, the gNB and NR-UE use transmission/reception panel antenna 1 labeled x705_1.

The gNB and NR-UE perform receive beamforming (reception directivity control) according to the second parameter, and confirm whether a signal is present. Accordingly, the gNB and NR-UE use transmission/reception panel antenna 1 labeled x705_1.

The gNB and NR-UE perform receive beamforming (reception directivity control) according to the third parameter, and confirm whether a signal is present. Accordingly, the gNB and NR-UE use transmission/reception panel antenna 1 labeled x705_I.

The gNB and NR-UE perform receive beamforming (reception directivity control) according to the fourth parameter, and confirm whether a signal is present. Accordingly, the gNB and NR-UE use transmission/reception panel antenna 1 labeled x705_1.

The gNB and NR-UE perform receive beamforming (reception directivity control) according to the fifth parameter, and confirm whether a signal is present. Accordingly, the gNB and NR-UE use transmission/reception panel antenna 2 labeled x705_2.

The gNB and NR-UE perform receive beamforming (reception directivity control) according to the sixth parameter, and confirm whether a signal is present. Accordingly, the gNB and NR-UE use transmission/reception panel antenna 2 labeled x705_2.

The gNB and NR-UE perform receive beamforming (reception directivity control) according to the seventh parameter, and confirm whether a signal is present. Accordingly, the gNB and NR-UE use transmission/reception panel antenna 2 labeled x705_2.

The gNB and NR-UE perform receive beamforming (reception directivity control) according to the eighth parameter, and confirm whether a signal is present. Accordingly, the gNB and NR-UE use transmission/reception panel antenna 2 labeled x705_2.

Thus, the gNB and NR-UE perform receive beamforming (reception directivity control) according to the (4×i−3)-th parameter, and confirm whether a signal is present. Accordingly, the gNB and NR-UE use transmission/reception panel antenna i labeled x705_*i*.

The gNB and NR-UE perform receive beamforming (reception directivity control) according to the (4×i−2)-th parameter, and confirm whether a signal is present. Accordingly, the gNB and NR-UE use transmission/reception panel antenna i labeled x705_*i*.

The gNB and NR-UE perform receive beamforming (reception directivity control) according to the (4×i−1)-th parameter, and confirm whether a signal is present. Accordingly, the gNB and NR-UE use transmission/reception panel antenna i labeled x705_*i*.

The gNB and NR-UE perform receive beamforming (reception directivity control) according to the (4×i)-th parameter, and confirm whether a signal is present. Accordingly, the gNB and NR-UE use transmission/reception panel antenna i labeled x705_*i*.

Note that i is an integer from 1 to M (both inclusive).

Another example will be described. In a case where the gNB and NR-UE have the configuration in FIG. 47, signal reception is performed by using one or more of "transmission/reception antenna 1 labeled x805_1 to transmission/reception antenna m labeled x805_*m*" and performing receive beamforming (reception directivity control).

In detecting a signal in the directional reception, g types of receive beamforming (reception directivity control) are performed by using one or more of "transmission/reception antenna 1 labeled x805_1 to transmission/reception antenna m labeled x805_*m*". Note that g is an integer equal to or greater than 2.

The gNB and NR-UE perform receive beamforming (reception directivity control) according to the first parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the second parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the third parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the fourth parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the fifth parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the sixth parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the seventh parameter by using one or more of "transmission/reception antenna 1 labeled x805_1 to transmission/reception antenna m labeled x805_*m*", and confirm whether a signal is present.

The gNB and NR-UE perform receive beamforming (reception directivity control) according to the eighth parameter by using one or more of "transmission/reception antenna 1 labeled x805_1 to transmission/reception antenna m labeled x805_*m*", and confirm whether a signal is present.

Thus, the gNB and NR-UE perform receive beamforming (reception directivity control) according to the i-th parameter by using one or more of "transmission/reception antenna 1 labeled x805_1 to transmission/reception antenna m labeled x805_*m*", and confirm whether a signal is present. Note that i is an integer from 1 to g (both inclusive).

Regarding Stand-By:

In some cases, the gNB and NR-UE "stand by" when the directional reception is performed and a signal is detected. For example, the gNB and NR-UE stand by without transmitting a signal.

The gNB and NR-UE may restart the operation of the directional LBT when a certain amount of time has passed. Alternatively, when the directional reception is performed and a signal is detected, the gNB and NR-UE may again perform the directional reception and check whether a signal is present.

Regarding "Determine Beamforming Parameter to be Used" in S5802 of FIG. 43:

Descriptions will be separately given of a case where the gNB and NR-UE have the configuration in FIG. 39 and a case where the gNB and NR-UE have the configuration in FIG. 40.

1) Case where the gNB and NR-UE have the Configuration in FIG. 39:

As described above, the gNB and NR-UE perform receive beamforming (reception directivity control) according to the (4×i−3)-th parameter, and confirm whether a signal is present.

In addition, the gNB and NR-UE perform receive beamforming (reception directivity control) according to the (4×i−2)-th parameter, and confirm whether a signal is present.

Then, the gNB and NR-UE perform receive beamforming (reception directivity control) according to the (4×i−1)-th parameter, and confirm whether a signal is present.

The gNB and NR-UE perform receive beamforming (reception directivity control) according to the (4×i)-th parameter, and confirm whether a signal is present.

Note that i is an integer from 1 to M (both inclusive).

When confirming that a signal is present, the gNB and NR-UE do not use the parameter at that time to transmit a modulation signal. When not confirming that a signal is present (detecting no signal), the gNB and NR-UE can use the parameter at that time to transmit a modulation signal.

For example, the gNB and NR-UE perform receive beamforming (reception directivity control) according to the first parameter, and confirm whether a signal is present. At this time, the gNB and NR-UE use transmission/reception panel antenna 1 labeled x705_1.

When detecting a signal, the gNB and NR-UE do not transmit a modulation signal using the first parameter. When detecting no signal, the gNB and NR-UE can transmit a modulation signal using the first parameter.

For example, the gNB and NR-UE perform receive beamforming (reception directivity control) according to the fifth parameter, and confirm whether a signal is present. At this time, the gNB and NR-UE use transmission/reception panel antenna 2 labeled x705_2.

When detecting a signal, the gNB and NR-UE do not transmit a modulation signal using the fifth parameter. When detecting no signal, the gNB and NR-UE can transmit a modulation signal using the fifth parameter.

Similar processing is performed for beamforming parameters in the other reception periods.

2) Case where the gNB and NR-UE have the Configuration in FIG. 40:

As described above, the gNB and NR-UE perform receive beamforming (reception directivity control) according to the i-th parameter by using one or more of "transmission/reception antenna 1 labeled x805_1 to transmission/reception antenna m labeled x805_*m*", and confirm whether a signal is detected. Note that i is an integer from 1 to g (both inclusive).

When detecting a signal, the gNB and NR-UE do not transmit a modulation signal using the parameter at that time. When detecting no signal, the gNB and NR-UE can transmit a modulation signal using the parameter at that time.

For example, the gNB and NR-UE perform receive beamforming (reception directivity control) according to the first parameter by using one or more of "transmission/reception antenna 1 labeled x805_1 to transmission/reception antenna m labeled x805_*m*", and confirm whether a signal is detected.

When detecting a signal, the gNB and NR-UE do not transmit a modulation signal using the first parameter. When detecting no signal, the gNB and NR-UE can transmit a modulation signal using the first parameter.

For example, the gNB and NR-UE perform receive beamforming (reception directivity control) according to the fifth parameter by using one or more of "transmission/reception antenna 1 labeled x805_1 to transmission/reception antenna m labeled x805_*m*", and confirm whether a signal is detected.

When detecting a signal, the gNB and NR-UE do not transmit a modulation signal using the fifth parameter. When detecting no signal, the gNB and NR-UE can transmit a modulation signal using the fifth parameter.

Similar processing is performed for beamforming parameters in the other reception periods.

Note that the gNB and NE-UE may perform the omni-directional LBT and directional LBT processing. The methods of the omni-directional LBT and directional LBT processing are not limited to the above example.

In the following, a description will be given of an operation when an NR apparatus such as gNB and NE-UE performs broadcast. Note that the term "broadcast" is used in the following description, but it may be referred to as "multicast" or "groupcast".

Figures 44A, 44B:
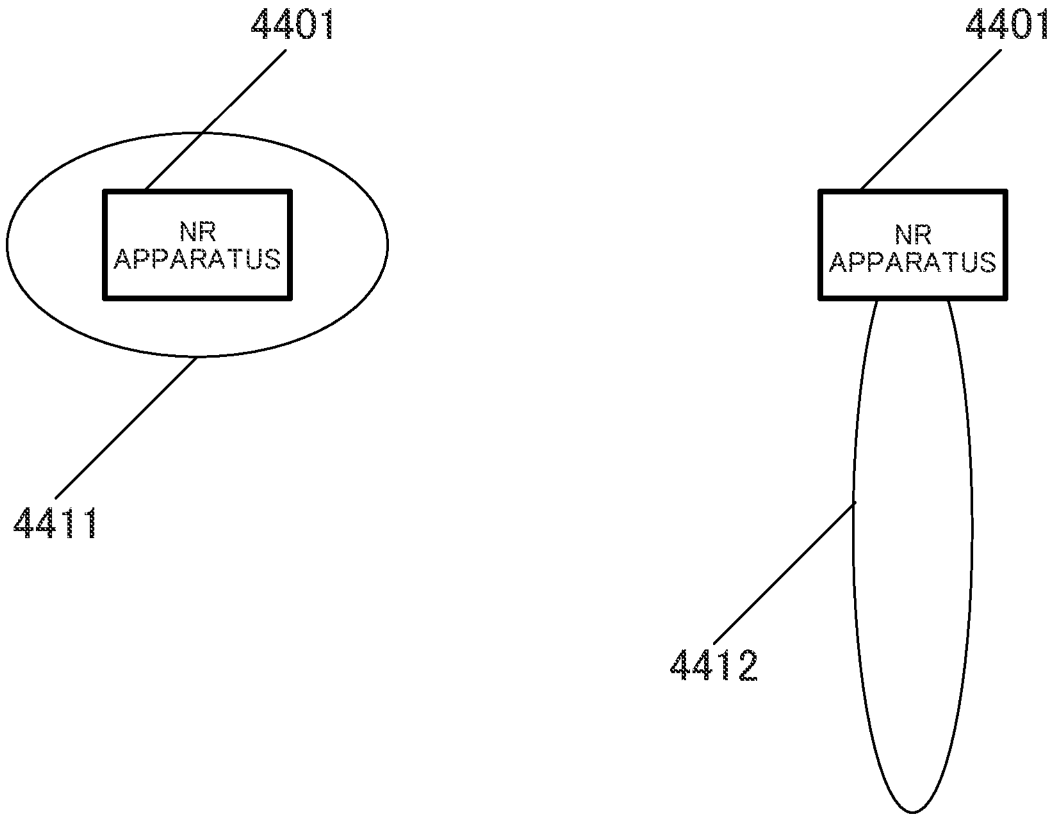
FIG. 44A illustrates an exemplary state where an NR apparatus transmits a broadcast signal using a wide beam.
FIG. 44B illustrates an exemplary state where the NR apparatus transmits a broadcast signal using a narrow beam.

FIG. 44A illustrates an exemplary state where NR apparatus 4401 transmits a broadcast signal using wide beam 4411. At this time, the beam is present in a wide direction, but the communication range is short.

FIG. 44B illustrates an exemplary state where NR apparatus 4401 transmits a broadcast signal using narrow beam 4412. At this time, the beam is present in a narrow direction, and the communication range is long. Meanwhile, the beam is not present in a wide direction.

A role of the broadcast is "to deliver a broadcast signal to many NR apparatuses". Accordingly, it is necessary to implement a transmission method for broadcast that satisfies this. A transmission method for this purpose will be described below.

Figure 45:
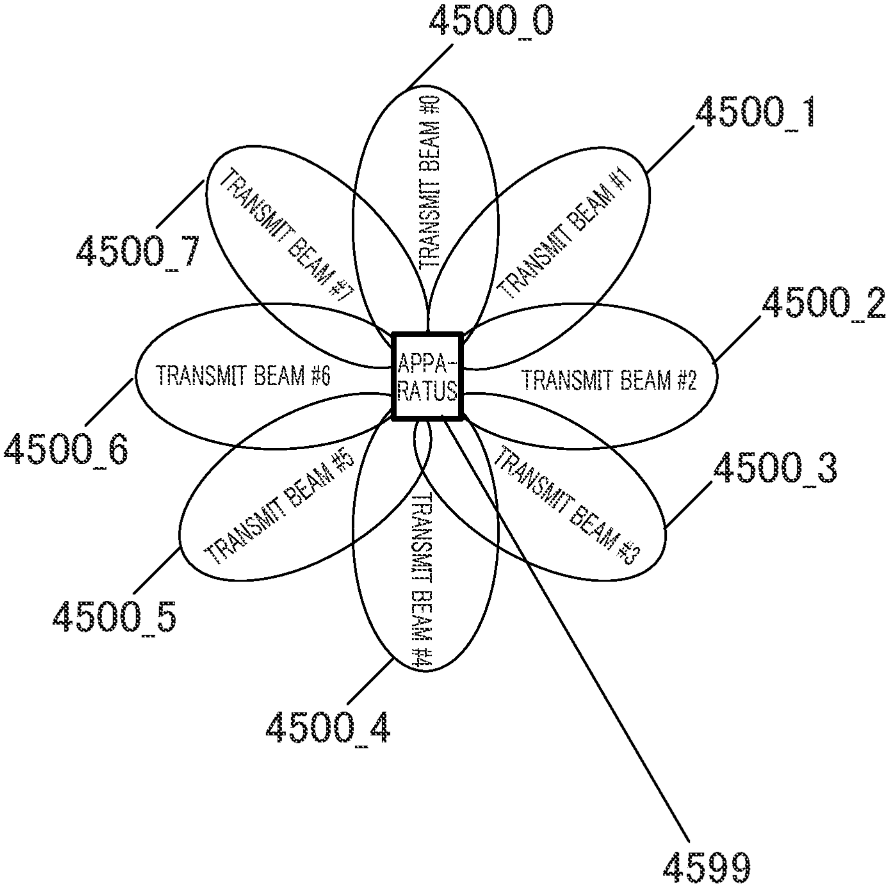
FIG. 45 illustrates an exemplary state where an NR apparatus performs transmit beamforming and forms narrow beams.

FIG. 45 illustrates an exemplary state where NR apparatus 4599 performs transmit beamforming and forms narrow beams, for example. As illustrated in FIG. 45, NR apparatus 4599 can generate transmit beam #0 labeled 4500_0, transmit beam #1 labeled 4500_1, transmit beam #2 labeled 4500_2, transmit beam #3 labeled 4500_3, transmit beam #4 labeled 4500_4, transmit beam #5 labeled 4500_5, transmit beam #6 labeled 4500_6, and transmit beam #7 labeled 4500_7. Note that the example is illustrated here in which eight transmit beams can be generated, but a transmit beam generation method is not limited to this example, and two or more transmit beams may be generated, for example.

By way of example here, a description will be given of a case where gNB (base station) performs broadcast transmission as NR apparatus 4599.

Figure 46A:
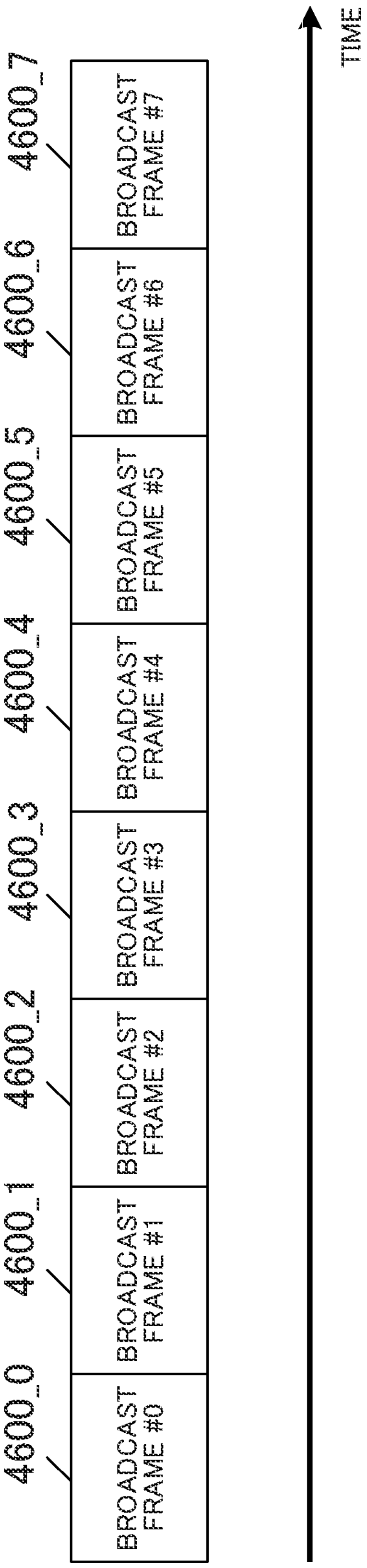
FIG. 46A illustrates exemplary frames when gNB performs broadcast transmission.
Figure 46B:
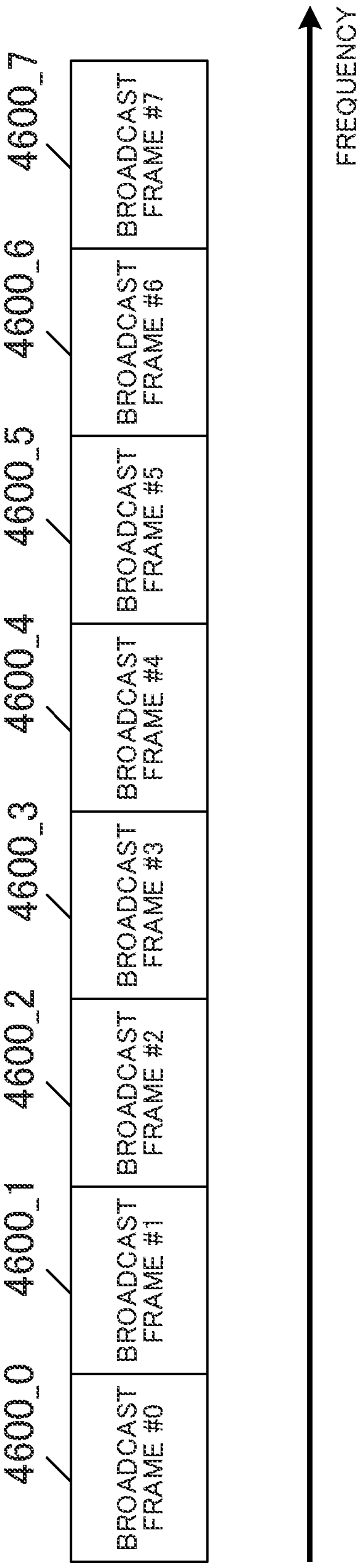
FIG. 46B illustrates exemplary frames when gNB performs broadcast transmission.

FIGS. 46A and 46B illustrate exemplary frames when the gNB (base station) performs broadcast transmission. Note that the horizontal axis represents time in FIG. 46A, and the vertical axis represents frequency in FIG. 46B. The gNB may transmit any of the frames in FIGS. 46A and 46B, for example.

In FIG. 46A, the gNB puts broadcast frame #0 labeled 4600_0 to broadcast frame #7 labeled 4600_7 on the time axis and transmits them.

The gNB transmits broadcast frame #0 labeled 4600_0 using transmit beam #0 labeled 4500_0 in FIG. 45.

The gNB transmits broadcast frame #1 labeled 46001 using transmit beam #1 labeled 4500_1 in FIG. 45.

The gNB transmits broadcast frame #2 labeled 4600_2 using transmit beam #2 labeled 4500_2 in FIG. 45.

The gNB transmits broadcast frame #3 labeled 4600_3 using transmit beam #3 labeled 4500_3 in FIG. 45.

The gNB transmits broadcast frame #4 labeled 4600_4 using transmit beam #4 labeled 4500_4 in FIG. 45.

The gNB transmits broadcast frame #5 labeled 4600_5 using transmit beam #5 labeled 4500_5 in FIG. 45.

The gNB transmits broadcast frame #6 labeled 46006 using transmit beam #6 labeled 4500_6 in FIG. 45.

The gNB transmits broadcast frame #7 labeled 4600_7 using transmit beam #7 labeled 4500_7 in FIG. 45.

Note that the broadcast frame configuration method and the transmission order are not limited to this example. The broadcast frame configuration method as in FIG. 46A may be referred to as a "time division multiplexing (TDM) broadcast frame configuration method". Note that the above TDM broadcast configuration method is effective when higher frequency is used in terms of transmitting information to many communication counterparts.

In FIG. 46B, the gNB puts broadcast frame #0 labeled 4600_0 to broadcast frame #7 labeled 4600_7 on the frequency axis and transmits them.

The gNB transmits broadcast frame #0 labeled 4600_0 using transmit beam #0 labeled 4500_0 in FIG. 45.

The gNB transmits broadcast frame #1 labeled 4600_1 using transmit beam #1 labeled 4500_1 in FIG. 45.

The gNB transmits broadcast frame #2 labeled 4600_2 using transmit beam #2 labeled 4500_2 in FIG. 45.

The gNB transmits broadcast frame #3 labeled 4600_3 using transmit beam #3 labeled 4500_3 in FIG. 45.

The gNB transmits broadcast frame #4 labeled 4600_4 using transmit beam #4 labeled 4500_4 in FIG. 45.

The gNB transmits broadcast frame #5 labeled 4600_5 using transmit beam #5 labeled 4500_5 in FIG. 45.

The gNB transmits broadcast frame #6 labeled 4600_6 using transmit beam #6 labeled 4500_6 in FIG. 45.

The gNB transmits broadcast frame #7 labeled 4600_7 using transmit beam #7 labeled 4500_7 in FIG. 45.

Note that the broadcast frame configuration method and the arrangement order on the frequency are not limited to this example. The broadcast frame configuration method as in FIG. 46B may be referred to as a "frequency division multiplexing (FDM) broadcast frame configuration method".

Figure 46C:
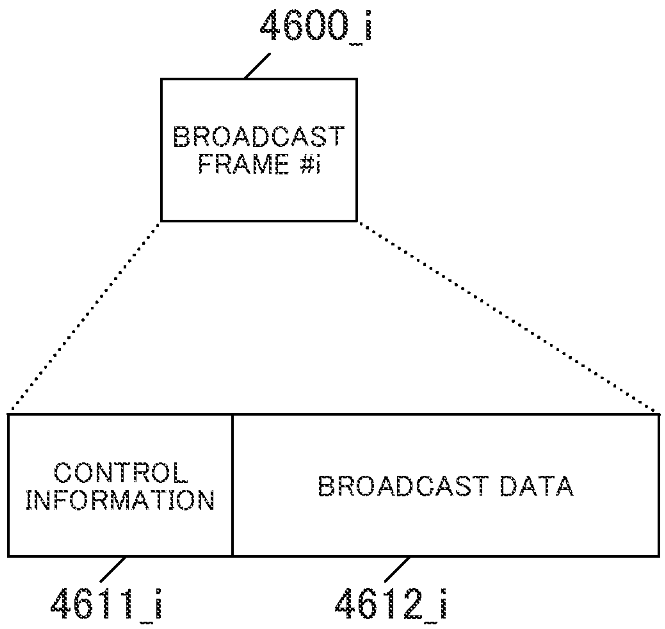
FIG. 46C illustrates an exemplary configuration of the broadcast frames illustrated in FIGS. 46A and 46B.

FIG. 46C illustrates an exemplary configuration of broadcast frame #i labeled 4600_*i* illustrated in FIGS. 46A and 46B. Note that i is an integer from 0 to 7 (both inclusive) in FIGS. 46A and 46B.

It is assumed that broadcast frame #i labeled 4600_*i* is composed of, for example, control information 4611_*i* and broadcast data 4612_*i*.

At this time, "broadcast data 4612_0, broadcast data 4612_1, broadcast data 4612_2, broadcast data 4612_3, broadcast data 4612_4, broadcast data 4612_5, broadcast data 4612_6, and broadcast data 4612_7" include the same data, for example. As another example, "broadcast data 4612_0, broadcast data 4612_1, broadcast data 4612_2, broadcast data 4612_3, broadcast data 4612_4, broadcast data 4612_5, broadcast data 4612_6, and broadcast data 4612_7" may be configured to include the same content although "the condition, such as a compression ratio and a configuration, is different". Further, "broadcast data 4612_0, broadcast data 4612_1, broadcast data 4612_2, broadcast data 4612_3, broadcast data 4612_4, broadcast data 4612_5, broadcast data 4612_6, and broadcast data 4612_7" may include partially the same data.

Broadcast data 4612_*i* is data to be transmitted to a plurality of terminals. For example, in FIG. 38, broadcast data 4612_*i* is data transmitted by gNB 3800, and gNB 3800 is transmitted to "NR-UE #1 labeled 3801_1, NR-UE #2 labeled 3801_2, NR-UE #3 labeled 3801_3, NR-UE #4 labeled 3801_4. NR-UE #5 labeled 3801_5, NR-UE #6 labeled 3801_6, and NR-UE #7 labeled 3801_7" if possible.

"Control information 4611_0, control information 4611_1, control information 4611_2, control information 4611_3, control information 4611_4, control information 4611_5, control information 4611_6, and control information 4611_7" may include the same data or different data from each other.

Examples of "control information 4611_0, control information 4611_1, control information 4611_2, control information 4611_3, control information 4611_4, control information 4611_5, control information 4611_6, and control information 4611_7" include higher layer signaling, radio resource control (RRC), layer 1 (L1) signaling, downlink control information (DCI), broadcast information, synchronization signals/physical broadcast channel (SS/PBCH) block, PBCH, etc., but the examples are not limited to these. Note that one of the features is to use "information and/or signal" other than synchronization signals (SS) as the control information.

Figure 47:
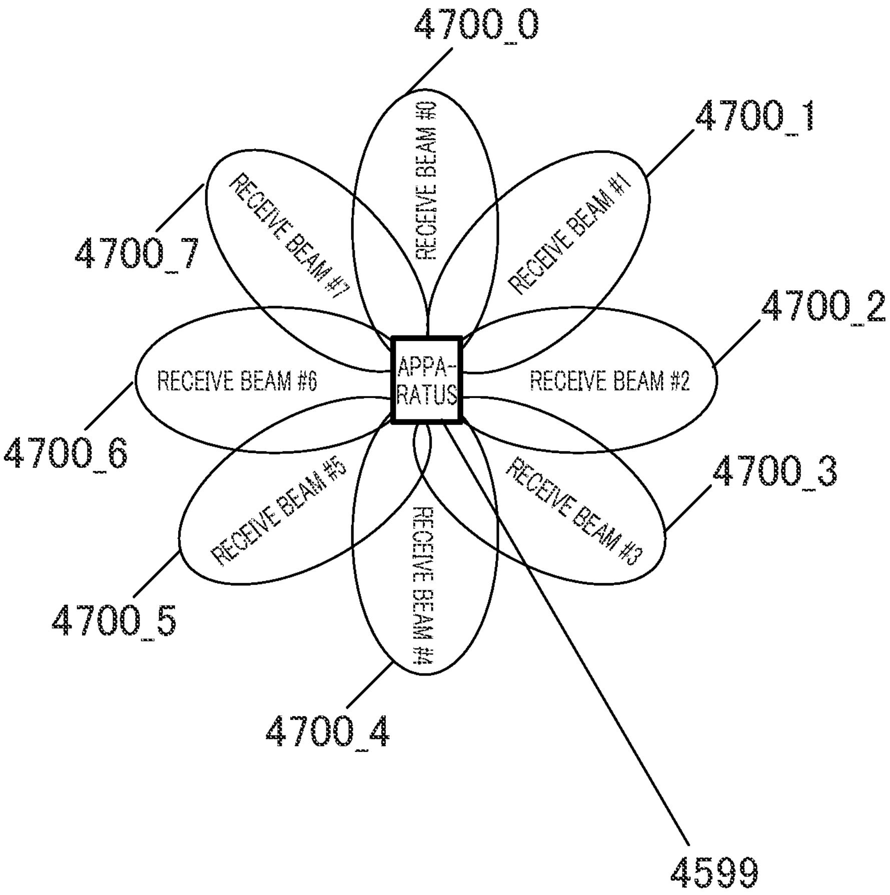
FIG. 47 illustrates an exemplary state where the NR apparatus performs receive beamforming and forms narrow beams.

FIG. 47 illustrates an exemplary state where NR apparatus 4599 performs receive beamforming and forms narrow beams, for example. As illustrated in FIG. 47, NR apparatus 4599 can generate receive beam #0 labeled 4700_0, receive beam #1 labeled 4700_1, receive beam #2 labeled 4700_2, receive beam #3 labeled 4700_3, receive beam #4 labeled 4700_4, receive beam #5 labeled 4700_5, receive beam #6 labeled 4700_6, and receive beam #7 labeled 4700_7. Note that the example is illustrated here in which eight receive beams can be generated, but a receive beam generation method is not limited to this example, and two or more transmit beams may be generated, for example.

In the following, a description will be given of exemplary LBT performed by gNB before broadcast transmission.

Figure 48A:
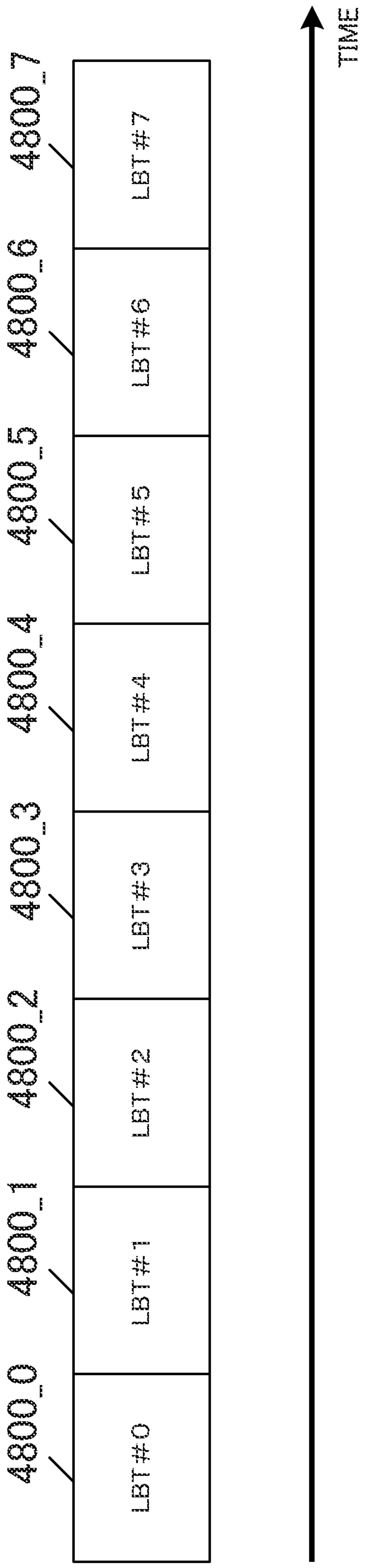
FIG. 48A illustrates exemplary frames of LBT performed before broadcast transmission.

In FIG. 48A, the gNB arranges LBT #0 labeled 4800_0 to LBT #7 labeled 4800_7 on the time axis.

The gNB performs LBT of "LBT #0 labeled 4800_0" using receive beam #0 labeled 4700_0 in FIG. 47.

The gNB performs LBT of "LBT #1 labeled 4800_1" using receive beam #1 labeled 4700_1 in FIG. 47.

The gNB performs LBT of "LBT #2 labeled 4800_2" using receive beam #2 labeled 4700_2 in FIG. 47.

The gNB performs LBT of "LBT #3 labeled 4800_3" using receive beam #3 labeled 4700_3 in FIG. 47.

The gNB performs LBT of "LBT #4 labeled 4800_4" using receive beam #4 labeled 4700_4 in FIG. 47.

The gNB performs LBT of "LBT #5 labeled 4800_5" using receive beam #5 labeled 4700_5 in FIG. 47.

The gNB performs LBT of "LBT #6 labeled 4800_6" using receive beam #6 labeled 4700_6 in FIG. 47.

The gNB performs LBT of "LBT #7 labeled 4800_7" using receive beam #7 labeled 4700_7 in FIG. 47.

Note that the LBT configuration method and the LBT performing order are not limited to this example. An exemplary method of performing LBT has already been described, and thus the description thereof will be omitted. LBT may be referred to as omni-directional LBT, directional LBT, or others. The LBT method as in FIG. 48A may be referred to as an "LBT method by time division multiplexing (TDM)".

Figure 48B:
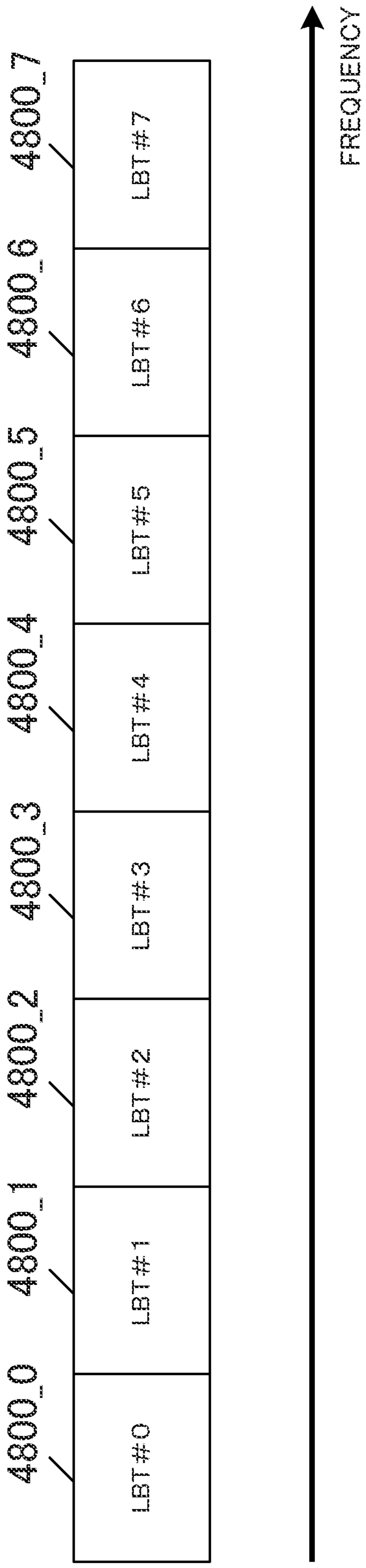
FIG. 48B illustrates exemplary frames of LBT performed before broadcast transmission.

In FIG. 48B, the gNB arranges LBT #0 labeled 4800_0 to LBT #7 labeled 4800_7 on the frequency axis.

The gNB performs LBT of "LBT #0 labeled 4800_0" using receive beam #0 labeled 4700_0 in FIG. 47.

The gNB performs LBT of "LBT #1 labeled 4800_1" using receive beam #1 labeled 4700_1 in FIG. 47.

The gNB performs LBT of "LBT #2labeled 4800_2" using receive beam #2 labeled 4700_2 in FIG. 47.

The gNB performs LBT of "LBT #3 labeled 4800_3" using receive beam #3 labeled 4700_3 in FIG. 47.

The gNB performs LBT of "LBT #4 labeled 4800_4" using receive beam #4 labeled 4700_4 in FIG. 47.

The gNB performs LBT of "LBT #5 labeled 4800_5" using receive beam #5 labeled 4700_5 in FIG. 47.

The gNB performs LBT of "LBT #6 labeled 4800_6" using receive beam #6 labeled 4700_6 in FIG. 47.

The gNB performs LBT of "LBT #7 labeled 4800_7" using receive beam #7 labeled 4700_7 in FIG. 47.

Note that the LBT configuration method and the LBT performing order are not limited to this example. An exemplary method of performing LBT has already been described, and thus the description thereof will be omitted. LBT may be referred to as omni-directional LBT, directional LBT, or others. The LBT method as in FIG. 48B may be referred to as an "LBT method by frequency division multiplexing (FDM)".

The relationship between a broadcast frame and broadcast LBT, and the operation will be described below.

The relationship between a broadcast frame and broadcast LBT, and the operation will be described.

Figure 49:
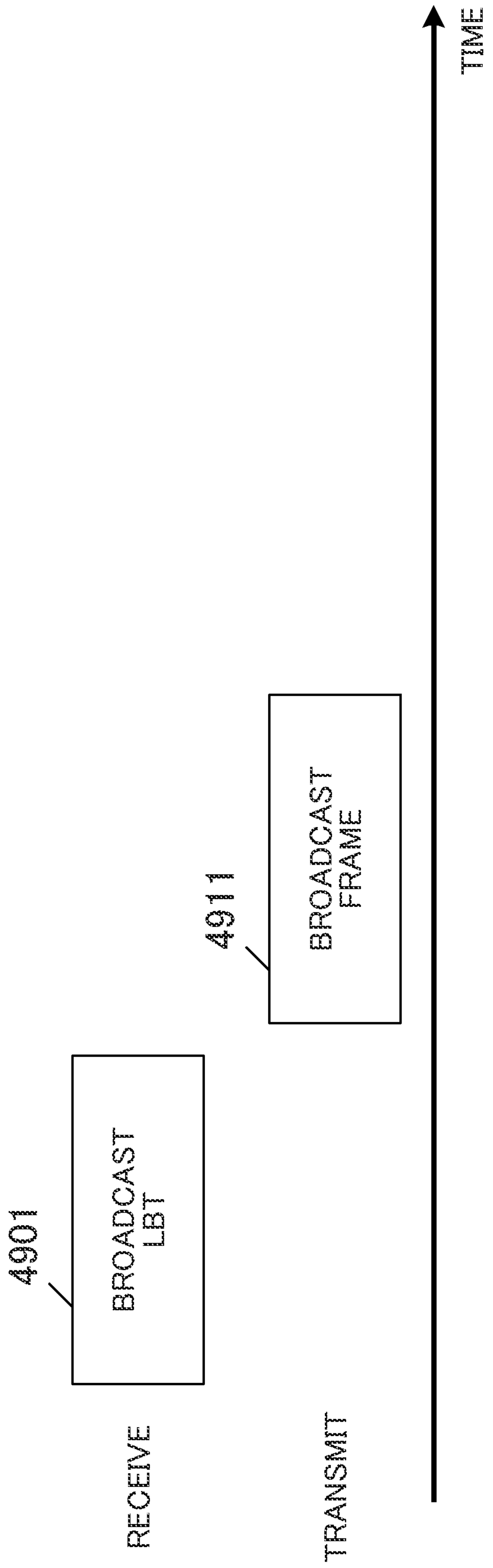
FIG. 49 illustrates an exemplary case where gNB performs broadcast LBT and transmits a broadcast frame based on the result.

FIG. 49 illustrates an example where the gNB performs broadcast LBT 4901 and transmits broadcast frame 4911 based on the result.

In FIG. 49, the gNB performs LBT in FIG. 48A as broadcast LBT 4901, for example. The gNB then transmits the broadcast frame in FIG. 46A as broadcast frame 4911 based on the LBT result.

At this time, relevance is given to the transmit beams in FIG. 45 and the receive beams in FIG. 47. Transmit beam #0 labeled 4500_0 is associated with receive beam #0 labeled 4700_0. For example, the gNB performs LBT (LBT #0 labeled 4800_0 in FIG. 48A) using receive beam #0 labeled 4700_0, and when no signal is detected, the gNB transmits broadcast frame #0 labeled 4600_0 in FIG. 46A using transmit beam #0 labeled 4500_0. When a signal is detected, the gNB does not transmit a broadcast frame using transmit beam #0 labeled 4500_0.

Hence, transmit beam #i labeled 4500_*i* is associated with receive beam #i labeled 4700_*i*. For example, the gNB performs LBT (LBT #i labeled 4800_*i* in FIG. 48A) using receive beam #i labeled 4700_*i*, and when no signal is detected, the gNB transmits broadcast frame #0 labeled 4600_*i* in FIG. 46A using transmit beam #i labeled 4500_*i*. When a signal is detected, the gNB does not transmit a broadcast frame using transmit beam #i labeled 4500_*i*. Note that i is an integer from 0 to 7 (both inclusive).

In the above example, a transmit beam and a receive beam with the same index are associated, but the index of a transmit beam and the index of a receive beam may be different from each other.

This produces an effect that transmit beams and receive beams are selected accurately.

Another example will be described. FIG. 49 illustrates an example where the gNB performs broadcast LBT 4901 and transmits broadcast frame 4911 based on the result.

In FIG. 49, the gNB performs LBT in FIG. 48B as broadcast LBT 4901, for example. The gNB then transmits the broadcast frame in FIG. 46B as broadcast frame 4911 based on the LBT result.

At this time, relevance is given to the transmit beams in FIG. 45 and the receive beams in FIG. 47. Transmit beam #0 labeled 4500_0 is associated with receive beam #0 labeled 4700_0. For example, the gNB performs LBT (LBT #0 labeled 4800_0 in FIG. 48B) using receive beam #0 labeled 4700_0, and w % ben no signal is detected, the gNB transmits broadcast frame #0 labeled 4600_0 in FIG. 46B using transmit beam #0 labeled 4500_0. When a signal is detected, the gNB does not transmit a broadcast frame using transmit beam #0 labeled 4500_0.

Hence, transmit beam #i labeled 4500_*i* is associated with receive beam #i labeled 4700_*i*. For example, the gNB performs LBT (LBT #i labeled 4800_1 in FIG. 48B) using receive beam #i labeled 4700_*i*, and when no signal is detected, the gNB transmits broadcast frame #0 labeled 4600_*i* in FIG. 46B using transmit beam #i labeled 4500_*i*. When a signal is detected, the gNB does not transmit a broadcast frame using transmit beam #i labeled 4500_*i*. Note that i is an integer from 0 to 7 (both inclusive).

In the above example, a transmit beam and a receive beam with the same index are associated, but the index of a transmit beam and the index of a receive beam may be different from each other.

This produces an effect that transmit beams and receive beams are selected accurately.

Note that the same can be implemented in the following examples in terms of the relationship between a broadcast frame and broadcast LBT, and the operation.

In the above example, the number of transmit beams (=8) in FIG. 45 and the number of receive beams (=8) in FIG. 47 are the same. The following description is about a case where the number of transmit beams and the number of receive beams are different from each other.

Figure 50A:
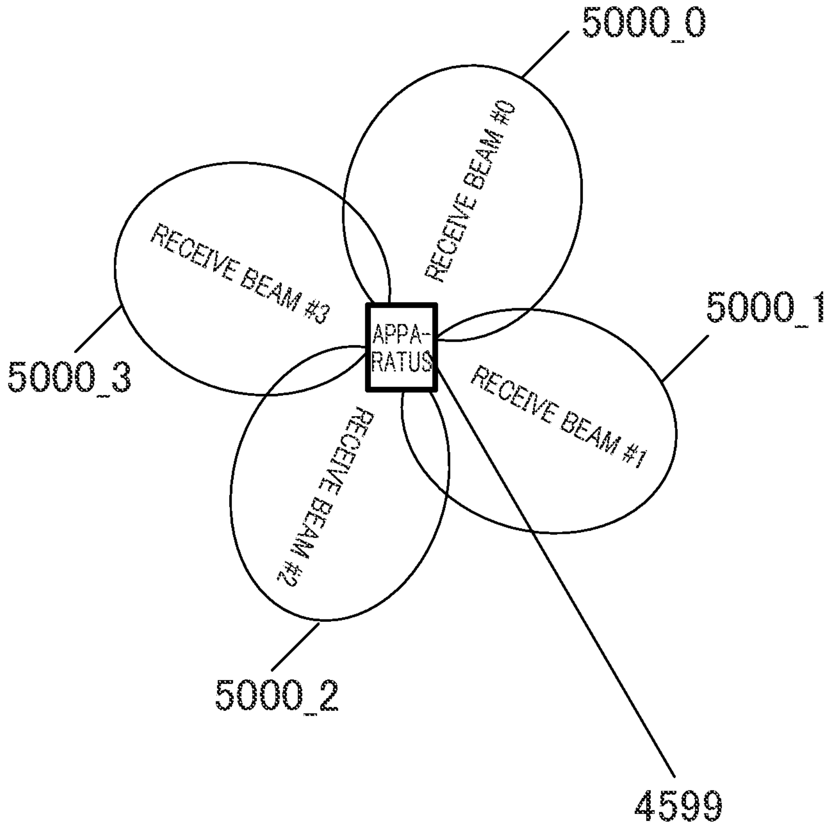
FIG. 50A illustrates an exemplary state where the NR apparatus performs receive beamforming and forms beams.

FIG. 50A illustrates an exemplary state where NR apparatus 4599 performs receive beamforming and forms beams, for example. As illustrated in FIG. 50A, NR apparatus 4599 can generate receive beam #0 labeled 5000_0, receive beam #1 labeled 5000_1, receive beam #2 labeled 5000_2, and receive beam #3 labeled 5000_3. Note that the example is illustrated here in which four receive beams can be generated, but a receive beam generation method is not limited to this example, and two or more transmit beams may be generated, for example.

In the following, a description will be given of exemplary LBT performed by gNB before broadcast transmission.

Figure 50B:
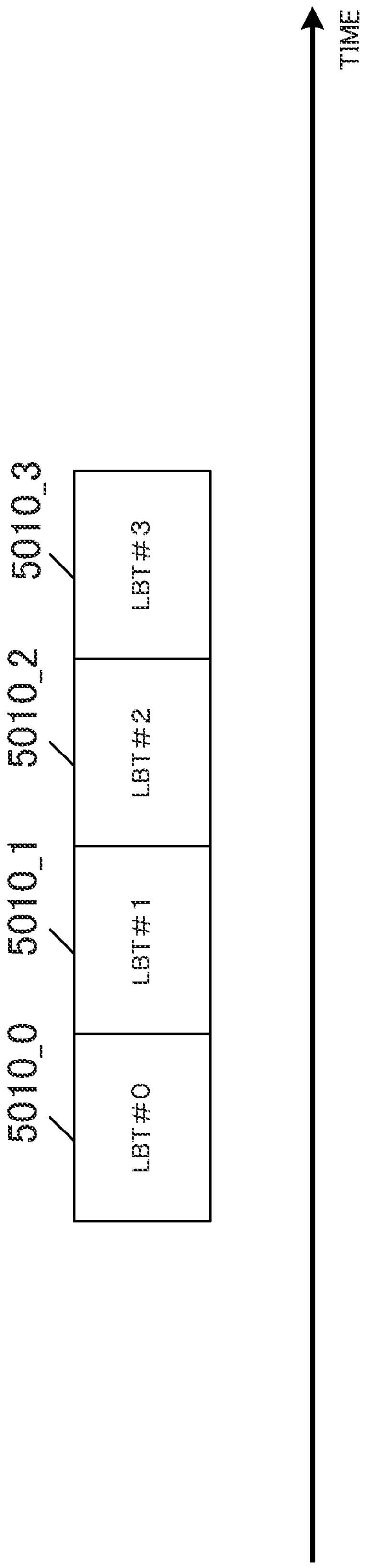
FIG. 50B illustrates exemplary frames of LBT performed before broadcast transmission.

In FIG. 50B, the gNB arranges LBT #0 labeled 5010_0 to LBT #3 labeled 5010_3 on the time axis.

The gNB performs LBT of "LBT #0 labeled 5010_0" using receive beam #0 labeled 5000_0 in FIG. 50A.

The gNB performs LBT of "LBT #1 labeled 5010_1" using receive beam #1 labeled 5000_1 in FIG. 50A.

The gNB performs LBT of "LBT #2labeled 5010_2" using receive beam #2 labeled 5000_2 in FIG. 50A.

The gNB performs LBT of "LBT #3 labeled 5010_3" using receive beam #3 labeled 5000_3 in FIG. 50A.

Note that the LBT configuration method and the LBT performing order are not limited to this example. An exemplary method of performing LBT has already been described, and thus the description thereof will be omitted. LBT may be referred to as omni-directional LBT, directional LBT, or others. The LBT method as in FIG. 50B may be referred to as an "LBT method by time division multiplexing (TDM)".

Figure 50C:
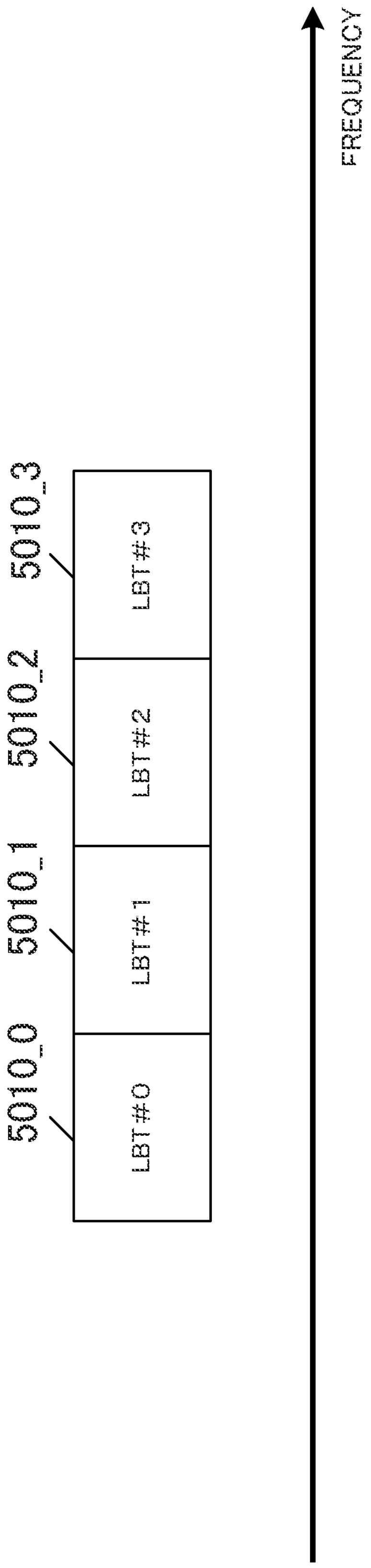
FIG. 50C illustrates exemplary frames of LBT performed before broadcast transmission.

In FIG. 50C, the gNB arranges LBT #0 labeled 5010_0 to LBT #3 labeled 5010_3 on the frequency axis.

The gNB performs LBT of "LBT #0 labeled 5010_0" using receive beam #0 labeled 5000_0 in FIG. 50A.

The gNB performs LBT of "LBT #0 labeled 5010_1" using receive beam #1 labeled 5000_1 in FIG. 50A.

The gNB performs LBT of "LBT #2labeled 5010_2" using receive beam #2 labeled 5000_2 in FIG. 50A.

The gNB performs LBT of "LBT #3 labeled 5010_3" using receive beam #3 labeled 5000_3 in FIG. 50A.

Note that the LBT configuration method and the LBT performing order are not limited to this example. An exemplary method of performing LBT has already been described, and thus the description thereof will be omitted. LBT may be referred to as ommi-directional LBT, directional LBT, or others. The LBT method as in FIG. 50C may be referred to as an "LBT method by frequency division multiplexing (FDM)".

FIG. 49 illustrates an example where the gNB performs broadcast LBT 4901 and transmits broadcast frame 4911 based on the result.

In FIG. 49, the gNB performs LBT in FIG. 50B as broadcast LBT 4901, for example. The gNB then transmits the broadcast frame in FIG. 46A as broadcast frame 4911 based on the LBT result.

At this time, relevance is given to the transmit beams in FIG. 45 and the receive beams in FIG. 50A. "Transmit beam #0 labeled 4500_0 and transmit beam #1 labeled 4500_1" and receive beam #0 labeled 5000_0" are associated with each other. For example, the gNB performs LBT (LBT #0 labeled 5010_0 in FIG. 50B) using receive beam #0 labeled 5000_0, and when no signal is detected, the gNB transmits broadcast frame #0 labeled 4600_0 in FIG. 46A using transmit beam #0 labeled 4500_0 and transmits broadcast frame #1 labeled 4600_1 in FIG. 46A using transmit beam #1 labeled 4500_1. When a signal is detected, the gNB does not transmit a broadcast frame using transmit beam #0 labeled 4500_0, and does not transmit a broadcast frame using transmit beam #1 labeled 4500_1 either.

Hence, ""transmit beam #(2×i) labeled 4500_(2×i) and transmit beam #(2×i+1) labeled 4500_(2×i+1)" and receive beam #i labeled 5000_*i*" are associated with each other. For example, the gNB performs LBT (LBT #i labeled 5010_*i* in FIG. 50B) using receive beam #i labeled 5000_*i*, and when no signal is detected, the gNB transmits broadcast frame #(2×i) labeled 4600_(2×i) in FIG. 46A using transmit beam #(2×i) labeled 4500_(2×i) and transmits broadcast frame #(2×i+1) labeled 4600_(2×i+1) in FIG. 46A using transmit beam #(2×i+1) labeled 4500_(2×i+1). When a signal is detected, the gNB does not transmit a broadcast frame using transmit beam #(2×i) labeled 4500_(2×i), and does not transmit a broadcast frame using transmit beam #(2×i+1) labeled 44500_(2×i+1) either. Note that i is an integer from 0 to 3 (both inclusive).

A method of associating the index of a transmit beam and the index of a receive beam is not limited to the above examples.

This produces an effect that transmit beams and receive beams are selected accurately.

Another example will be described. FIG. 49 illustrates an example where the gNB performs broadcast LBT 4901 and transmits broadcast frame 4911 based on the result.

In FIG. 49, the gNB performs LBT in FIG. 50C as broadcast LBT 4901, for example. The gNB then transmits the broadcast frame in FIG. 46B as broadcast frame 4911 based on the LBT result.

At this time, relevance is given to the transmit beams in FIG. 45 and the receive beams in FIG. 50A. ""Transmit beam #0 labeled 4500_0 and transmit beam #1 labeled 4500_1" and receive beam #0 labeled 5000_0" are associated with each other. For example, the gNB performs LBT (LBT #0 labeled 5010_0 in FIG. 50C) using receive beam #0 labeled 5000_0, and when no signal is detected, the gNB transmits broadcast frame #0 labeled 4600_0 in FIG. 46B using transmit beam #0 labeled 4500_0 and transmits broadcast frame #1 labeled 4600_1 in FIG. 46B using transmit beam #1 labeled 4500_1. When a signal is detected, the gNB does not transmit a broadcast frame using transmit beam #0 labeled 4500_0, and does not transmit a broadcast frame using transmit beam #1 labeled 4500_1 either.

Hence, ""transmit beam #(2×i) labeled 4500_(2×i) and transmit beam #(2×i+1) labeled 4500_(2×i+1)" and receive beam #i labeled 5000_*i*" are associated with each other. For example, the gNB performs LBT (LBT #i labeled 5010_*i* in FIG. 50C) using receive beam #i labeled 5000_*i*, and when no signal is detected, the gNB transmits broadcast frame #(2×i) labeled 4600_(2×i) in FIG. 46B using transmit beam #(2×i) labeled 4500_(2×i) and transmits broadcast frame #(2×i+1) labeled 4600_(2×i+1) in FIG. 46B using transmit beam #(2×i+1) labeled 4500_(2×i+1). When a signal is detected, the gNB does not transmit a broadcast frame using transmit beam #(2×i) labeled 4500_(2×i), and does not transmit a broadcast frame using transmit beam #(2×i+1) labeled 44500_(2×i+1) either. Note that i is an integer from 0 to 3 (both inclusive).

A method of associating the index of a transmit beam and the index of a receive beam is not limited to the above examples.

This produces an effect that transmit beams and receive beams are selected accurately.

Another example where the number of transmit beams and the number of receive beams are different from each other will be described.

Figure 51A:
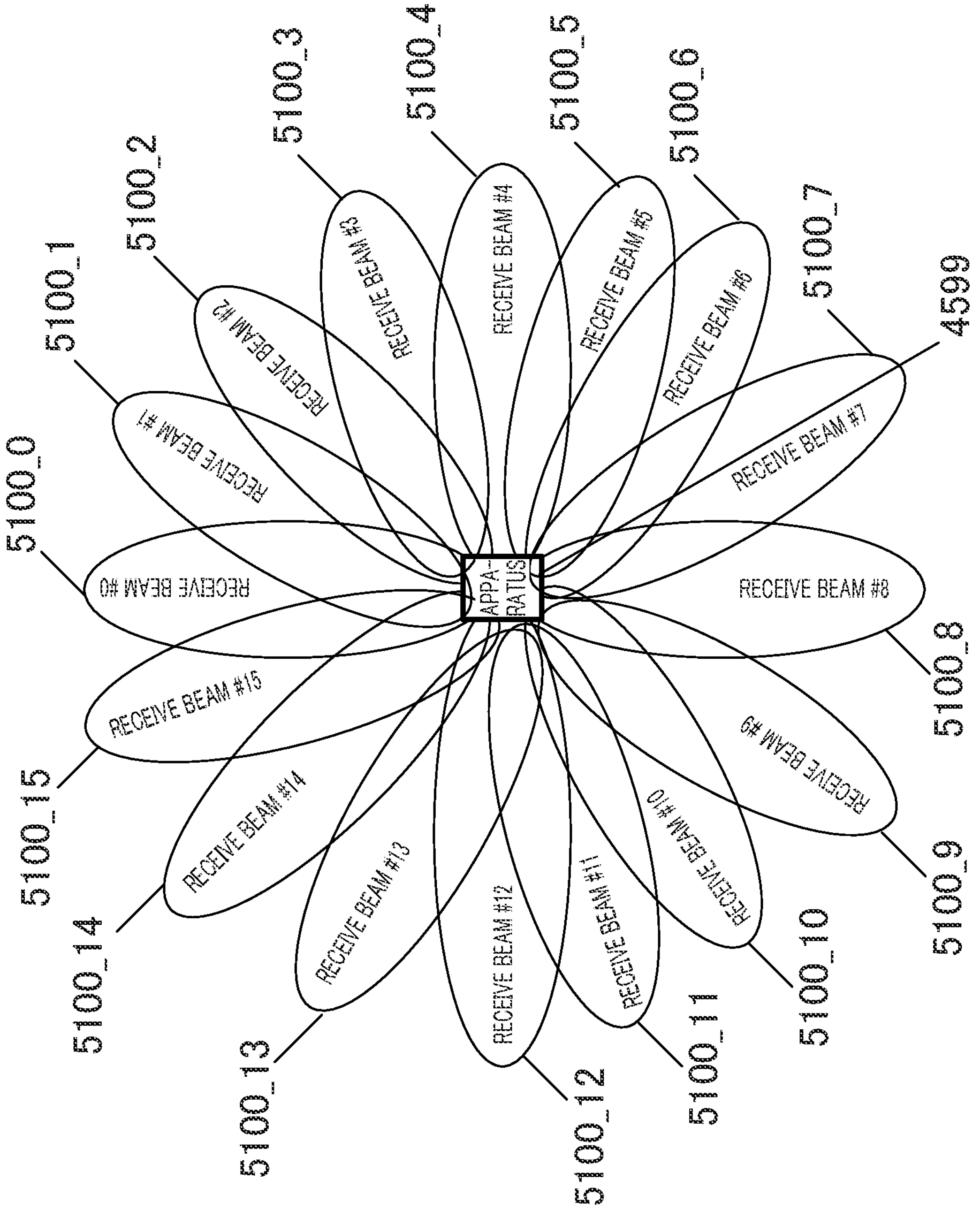
FIG. 51A illustrates an exemplary state where the NR apparatus performs receive beamforming and forms beams.

FIG. 51A illustrates an exemplary state where NR apparatus 4599 performs receive beamforming and forms beams, for example. As illustrated in FIG. 51A, NR apparatus 4599 can generate receive beam #0 labeled 5100_0, receive beam #1 labeled 5100_1, receive beam #2 labeled 5100_2, receive beam #3 labeled 5100_3, receive beam #4 labeled 5100_4, receive beam #5 labeled 5100_5, receive beam #6 labeled 5100_6, receive beam #7 labeled 5100_7, receive beam #8 labeled 5100_8, receive beam #9 labeled 5100_9, receive beam #10 labeled 5100_10, receive beam #11 labeled 5100_11, receive beam #12 labeled 5100_12, receive beam #13 labeled 5100_13, receive beam #14 labeled 5100_14, and receive beam #15 labeled 5100_15. Note that the example is illustrated here in which 16 receive beams can be generated, but a receive beam generation method is not limited to this example, and two or more transmit beams may be generated, for example.

In the following, a description will be given of exemplary LBT performed by gNB before broadcast transmission.

Figure 51B:
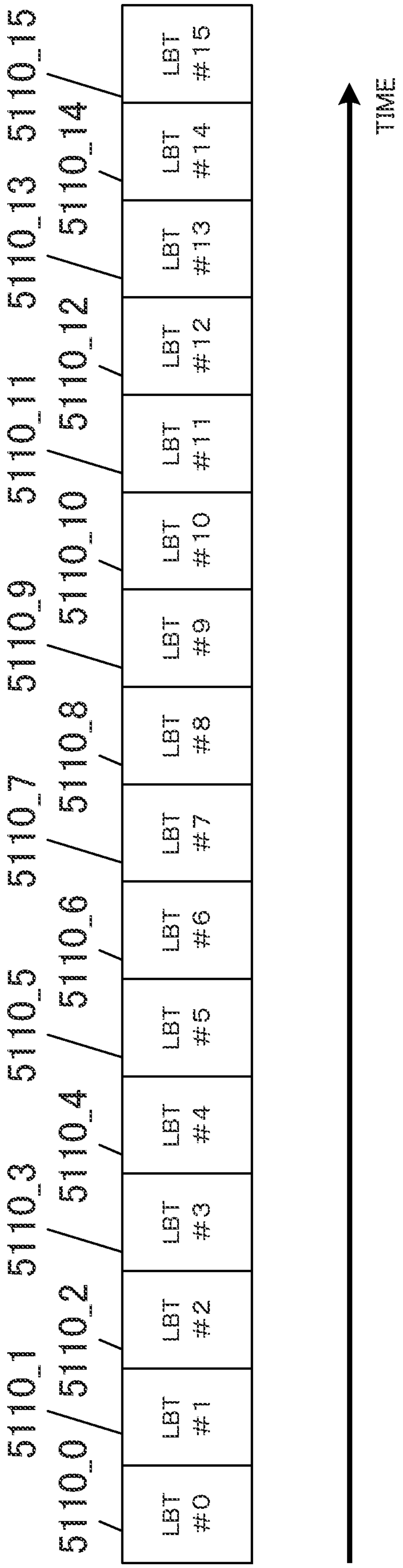
FIG. 51B illustrates exemplary frames of LBT performed before broadcast transmission.

In FIG. 51B, the gNB arranges LBT #0 labeled 5110_0 to LBT #15 labeled 5110_15 on the time axis.

The gNB performs LBT of "LBT #0 labeled 5110_0" using receive beam #0 labeled 5100_0 in FIG. 51A.

The gNB performs LBT of "LBT #1 labeled 5110_1" using receive beam #1 labeled 5100_1 in FIG. 51A.

The gNB performs LBT of "LBT #2 labeled 5110_2" using receive beam #2 labeled 5100_2 in FIG. 51A.

The gNB performs LBT of "LBT #3 labeled 5110_3" using receive beam #3 labeled 5100_3 in FIG. 51A.

The gNB performs LBT of "LBT #4 labeled 5110_4" using receive beam #4 labeled 5100_4 in FIG. 51A.

The gNB performs LBT of "LBT #5 labeled 5110_5" using receive beam #5 labeled 51005 in FIG. 51A.

The gNB performs LBT of "LBT #6 labeled 5110_6" using receive beam #6 labeled 5100_6 in FIG. 51A.

The gNB performs LBT of "LBT #7 labeled 5110_7" using receive beam #7 labeled 5100_7 in FIG. 51A.

The gNB performs LBT of "LBT #8 labeled 5110_8" using receive beam #8 labeled 5100_8 in FIG. 51A.

The gNB performs LBT of "LBT #9 labeled 5110_9" using receive beam #9 labeled 5100_9 in FIG. 51A.

The gNB performs LBT of "LBT #10 labeled 5110_10" using receive beam #10 labeled 5100_10 in FIG. 51A.

The gNB performs LBT of "LBT #11 labeled 5110_11" using receive beam #11 labeled 5100_11 in FIG. 51A.

The gNB performs LBT of "LBT #12 labeled 5110_12" using receive beam #12 labeled 5100_12 in FIG. 51A.

The gNB performs LBT of "LBT #13 labeled 5110_13" using receive beam #13 labeled 5100_13 in FIG. 51A.

The gNB performs LBT of "LBT #14 labeled 5110_14" using receive beam #14 labeled 5100_14 in FIG. 51A.

The gNB performs LBT of "LBT #15 labeled 5110_15" using receive beam #15 labeled 5100_15 in FIG. 51A.

Note that the LBT configuration method and the LBT performing order are not limited to this example. An exemplary method of performing LBT has already been described, and thus the description thereof will be omitted. LBT may be referred to as omni-directional LBT, directional LBT, or others. The LBT method as in FIG. 51B may be referred to as an "LBT method by time division multiplexing (TDM)".

Figure 51C:
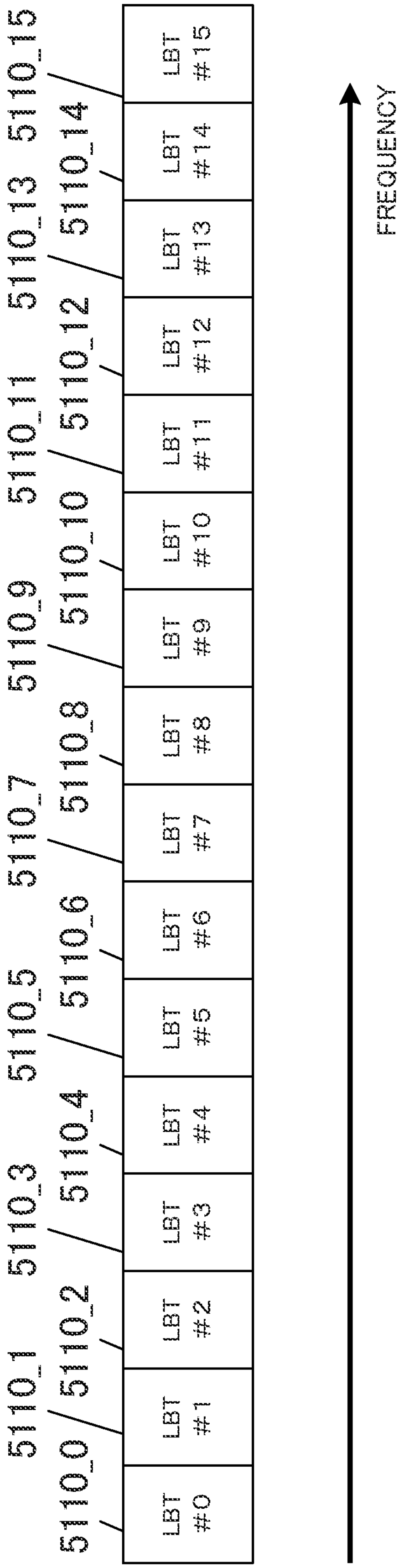
FIG. 51C illustrates exemplary frames of LBT performed before broadcast transmission.

In FIG. 51C, the gNB arranges LBT #0 labeled 5110_0 to LBT #15 labeled 5110_15 on the frequency axis.

The gNB performs LBT of "LBT #0 labeled 5110_0" using receive beam #0 labeled 5100_0 in FIG. 51A.

The gNB performs LBT of "LBT #1 labeled 5110_1" using receive beam #1 labeled 5100_1 in FIG. 51A.

The gNB performs LBT of "LBT #2 labeled 5110_2" using receive beam #2 labeled 5100_2 in FIG. 51A.

The gNB performs LBT of "LBT #3 labeled 5110_3" using receive beam #3 labeled 5100_3 in FIG. 51A.

The gNB performs LBT of "LBT #4 labeled 5110_4" using receive beam #4 labeled 5100_4 in FIG. 51A.

The gNB performs LBT of "LBT #5 labeled 5110_5" using receive beam #5 labeled 510)_5 in FIG. 51A.

The gNB performs LBT of "LBT #6 labeled 5110_6" using receive beam #6 labeled 5100_6 in FIG. 51A.

The gNB performs LBT of "LBT #7 labeled 5110_7" using receive beam #7 labeled 5100_7 in FIG. 51A.

The gNB performs LBT of "LBT #8 labeled 5110_8" using receive beam #8 labeled 5100_8 in FIG. 51A.

The gNB performs LBT of "LBT #9 labeled 5110_9" using receive beam #9 labeled 5100_9 in FIG. 51A.

The gNB performs LBT of "LBT #10 labeled 5110_10" using receive beam #10 labeled 5100_10 in FIG. 51A.

The gNB performs LBT of "LBT #11 labeled 5110_11" using receive beam #11 labeled 5100_11 in FIG. 51A.

The gNB performs LBT of "LBT #12 labeled 5110_12" using receive beam #12 labeled 5100_12 in FIG. 51A.

The gNB performs LBT of "LBT #13 labeled 5110_13" using receive beam #13 labeled 5100_13 in FIG. 51A.

The gNB performs LBT of "LBT #14 labeled 5110_14" using receive beam #14 labeled 5100_14 in FIG. 51A.

The gNB performs LBT of "LBT #15 labeled 5110_15" using receive beam #15 labeled 5100_15 in FIG. 51A.

Note that the LBT configuration method and the LBT performing order are not limited to this example. An exemplary method of performing LBT has already been described, and thus the description thereof will be omitted. LBT may be referred to as omni-directional LBT, directional LBT, or others. The LBT method as in FIG. 51C may be referred to as an "LBT method by frequency division multiplexing (FDM)".

FIG. 49 illustrates an example where the gNB performs broadcast LBT 4901 and transmits broadcast frame 4911 based on the result.

In FIG. 49, the gNB performs LBT in FIG. 50B as broadcast LBT 4901, for example. The gNB then transmits the broadcast frame in FIG. 46A as broadcast frame 4911 based on the LBT result.

At this time, relevance is given to the transmit beams in FIG. 45 and the receive beams in FIG. 51A. "Transmit beam #0 labeled 4500_0" and "receive beam #0 labeled 5100_0 and receive beam #1 labeled 5100_1" are associated with each other. For example, the gNB performs LBT (LBT #0 labeled 5110_0 in FIG. 51B) using receive beam #0 labeled 5100_0 and LBT (LBT #1 labeled 5110_1 in FIG. 51B) using receive beam #1 labeled 5100_1, and when no signal is detected, the gNB transmits broadcast frame #0 labeled 4600_0 in FIG. 46A using transmit beam #0 labeled 4500_0. When a signal is detected, the gNB does not transmit a broadcast frame using transmit beam #0 labeled 4500_0.

Hence, "transmit beam #i labeled 4500_$i$" and "receive beam #(2×i) labeled 5100_(2×i) and receive beam #(2×i+1) labeled 5100_(2×i+1)" are associated with each other. For example, the gNB performs LBT (LBT #(2×i) labeled 5110_(2 i) in FIG. 51B) using receive beam #(2×i) labeled 5100_(2×i) and LBT (LBT #(2×i+1) labeled 5110_(2×i+1) in FIG. 51B) using receive beam #(2×i+1) labeled 5100_(2×i+1), and when no signal is detected, the gNB transmits broadcast frame #i labeled 4600_$i$ in FIG. 46A using transmit beam #i labeled 4500_$i$. When a signal is detected, the gNB does not transmit a broadcast frame using transmit beam #i labeled 4500_$i$. Note that i is an integer from 0 to 3 (both inclusive).

A method of associating the index of a transmit beam and the index of a receive beam is not limited to the above examples.

This produces an effect that transmit beams and receive beams are selected accurately.

Another example will be described. FIG. 49 illustrates an example where the gNB performs broadcast LBT 4901 and transmits broadcast frame 4911 based on the result.

In FIG. 49, the gNB performs LBT in FIG. 50C as broadcast LBT 4901, for example. The gNB then transmits the broadcast frame in FIG. 46B as broadcast frame 4911 based on the LBT result.

At this time, relevance is given to the transmit beams in FIG. 45 and the receive beams in FIG. 51A. "Transmit beam #0 labeled 4500_0" and "receive beam #0 labeled 5100_0 and receive beam #1 labeled 5100_1" are associated with each other. For example, the gNB performs LBT (LBT #0 labeled 5110_0 in FIG. 51C) using receive beam #0 labeled 5100_0 and LBT (LBT #1 labeled 5110_1 in FIG. 51C) using receive beam #1 labeled 5100_1, and when no signal is detected, the gNB transmits broadcast frame #0 labeled 4600_0 in FIG. 46B using transmit beam #0 labeled 4500_0. When a signal is detected, the gNB does not transmit a broadcast frame using transmit beam #0 labeled 4500_0.

Hence, "transmit beam #i labeled **4500_*i*" and "receive beam #(2×i) labeled 5100_(2×i) and receive beam #(2×i+1) labeled 5100_(2×i+1)" are associated with each other. For example, the gNB performs LBT (LBT #(2×i) labeled 5110_(2×i) in FIG. 51C) using receive beam #(2×i) labeled 5100_(2×i) and LBT (LBT #(2×i+1) labeled 5110_(2×i+1) in FIG. 51C) using receive beam #(2×i+1) labeled 5100_(2×i+1), and when no signal is detected, the gNB transmits broadcast frame #i labeled 4600_*i* in FIG. 46B using transmit beam #i labeled 4500_*i*. When a signal is detected, the gNB does not transmit a broadcast frame using transmit beam #i labeled 4500_*i***. Note that i is an integer from 0 to 3 (both inclusive).

A method of associating the index of a transmit beam and the index of a receive beam is not limited to the above examples.

This produces an effect that transmit beams and receive beams are selected accurately.

Next, a relationship between broadcast and unicast will be described.

For example, in FIG. 38, a situation is considered in which gNB 3800 transmits broadcast data to NR-UE #1 labeled 38001 1 to NR-UE #7 labeled 38001_7 while transmitting unicast data (individual data) to NR-UE #1 labeled 38001_1.

Figure 52A:
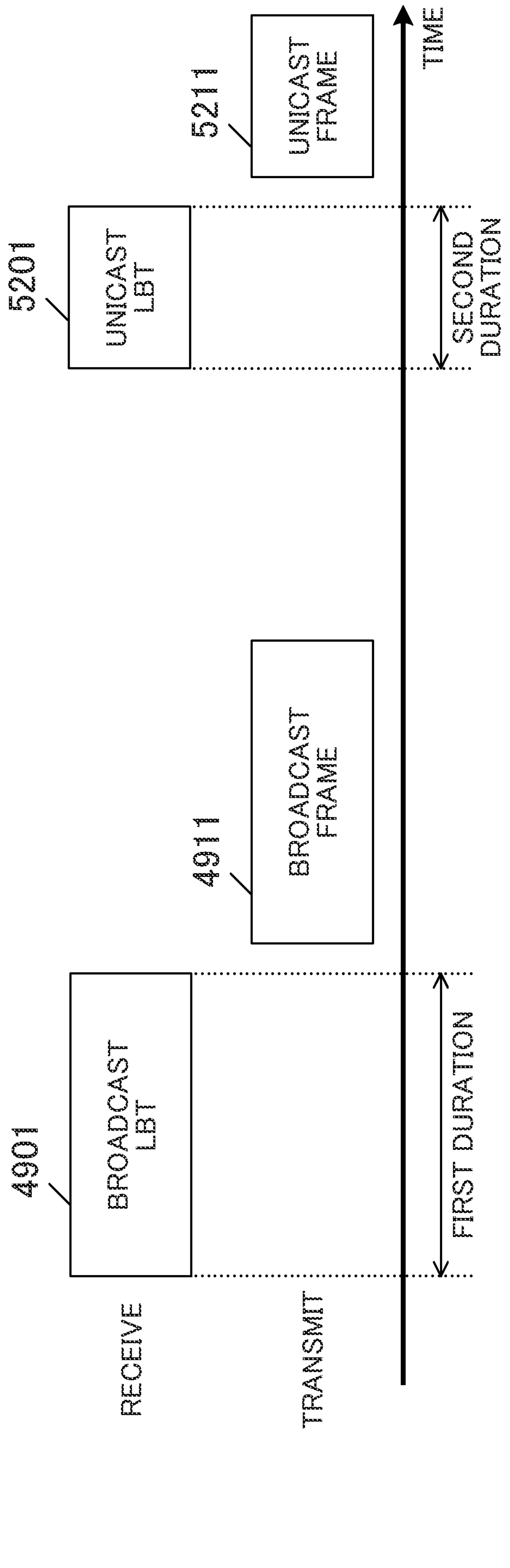
FIG. 52A illustrates an exemplary state of reception and transmission by gNB.

FIG. 52A illustrates an exemplary state of reception and transmission by gNB 3800, and the horizontal axis represents time. Note that the components that operate in the same manner as in FIG. 49 are denoted by the same reference signs.

It is assumed that broadcast LBT 4901 in FIG. 52A is performed by changing receive beams in the time axis direction as in "FIGS. 48A, 50B, and 51B". In this case, broadcast LBT 4901 has the first duration.

It is also assumed that, for broadcast frame 4911 in FIG. 52A, the broadcast frame is transmitted by changing transmit beams in the time axis direction as in FIG. 46A.

As in FIG. 52A, gNB 3800 also performs unicast LBT 5201. Note that unicast LBT 5201 has the second duration.

For example, gNB 3800 performs communication for transmitting unicast data (individual data) to NR-UE #1 labeled 38001_1. Thus, gNB 3800 has performed unicast LBT 5201 for performing a modulation signal including the unicast data (individual data). As a result, the gNB detects no signal.

Accordingly, gNB 3800 transmits unicast frame 5211 to NR-UE #1 labeled 38001_1.

For example, directional LBT or omni-directional LBT, which has already been described, is performed as the unicast LBT performed by gNB 3800. In this case, gNB 3800 performs LBT in a direction in which NR-UE #1 labeled 38001_1 is present. Meanwhile, when gNB 3800 performs broadcast LBT, for example, gNB 3800 performs LBT in a direction in which NR-UE is possibly present. Thus, it is highly likely that the first duration, which is the time width of broadcast LBT 4901, is longer than the second duration, which is the time width of unicast LBT 5201.

In the above example, the description is about the case where gNB 3800 transmits to NR-UE #1 labeled 38001_1 a modulation signal including unicast data, but also in a case where gNB 3800 transmits to a plurality of NR-UEs modulation signals including respective unicast data, it is still highly likely that the first duration, which is the time width of broadcast LBT 4901, is longer than the second duration, which is the time width of unicast LBT 5201. This is because broadcast modulation signals need to be delivered to as many NR-UEs as possible when gNB 3800 transmits the broadcast modulation signals; accordingly, LBT is preferably performed in as many directions as possible.

This produces an effect of using resources for communication, such as time, frequency, and space, effectively.

Figure 52C:
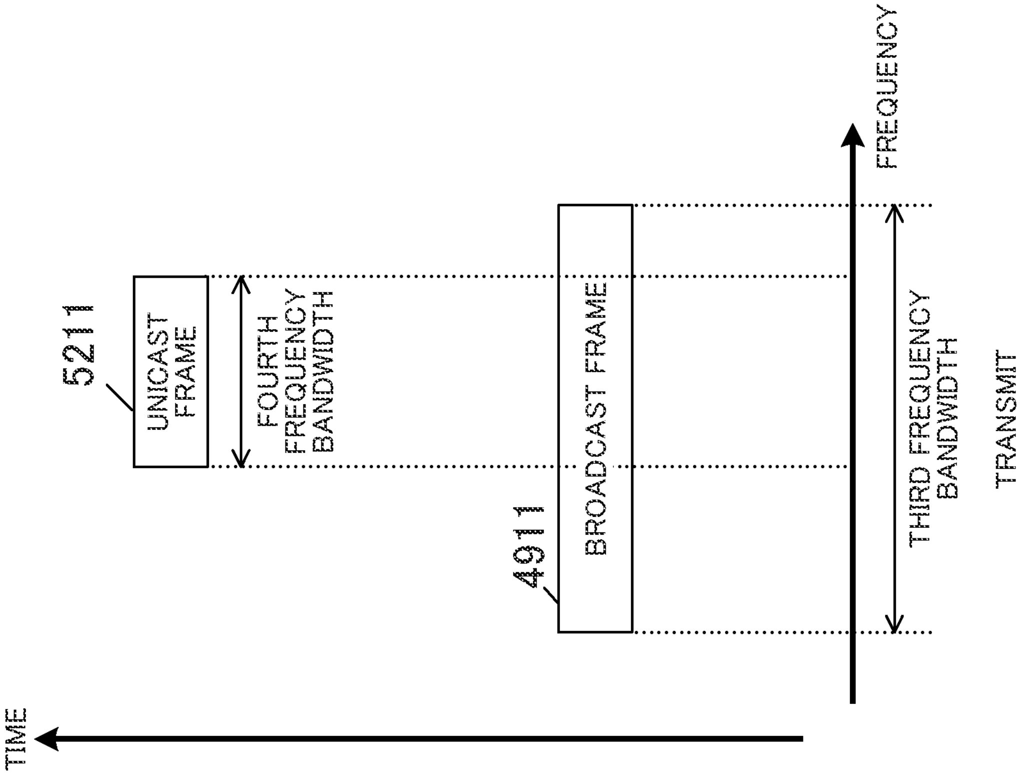
FIG. 52C illustrates an exemplary transmission state of gNB.
Figure 52B:
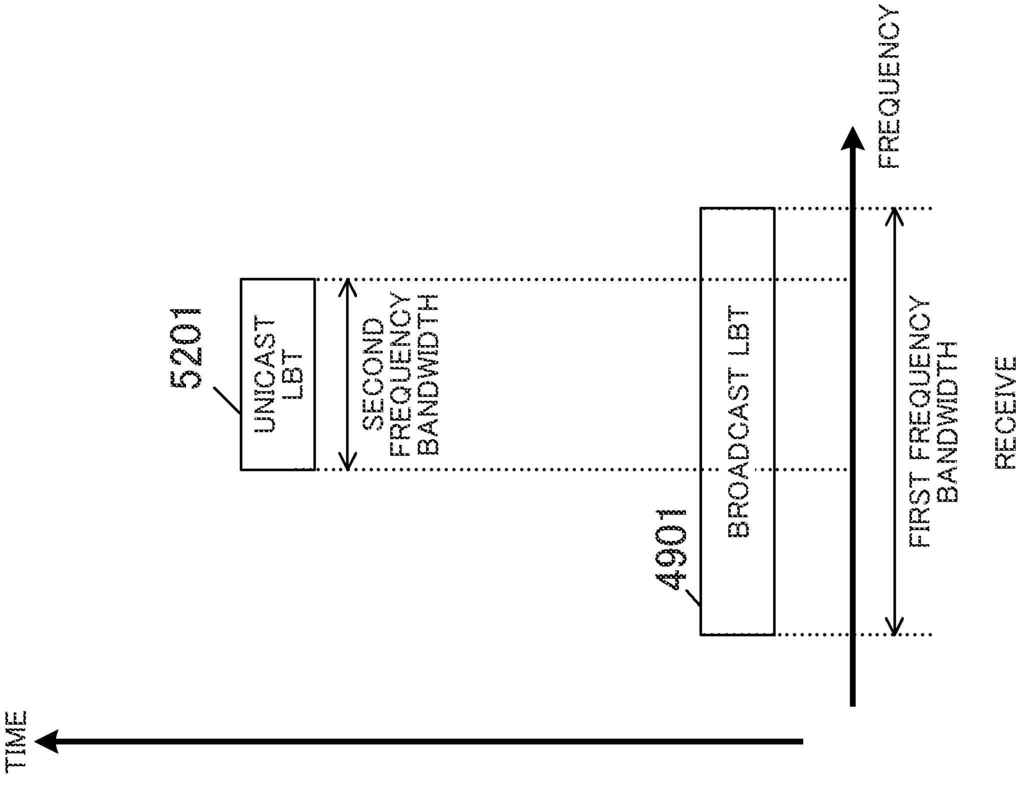
FIG. 52B illustrates an exemplary reception state of gNB.

Another example will be described below. FIG. 52B illustrates an exemplary reception state of gNB 3800, and FIG. 52C illustrates an exemplary transmission state of gNB 3800. Note that the horizontal axis represents frequency and the vertical axis represents time in FIGS. 52B and 52C. Note that the components that operate in the same manner as in FIG. 49 are denoted by the same reference signs.

It is assumed that broadcast LBT 4901 in FIG. 52B is performed by changing receive beams in the frequency axis direction as in "FIGS. 48B, 50C, and 51C". In this case, broadcast LBT 4901 has the first frequency bandwidth.

It is also assumed that, for broadcast frame 4911 in FIG. 52C, the broadcast frame is transmitted by changing transmit beams in the frequency axis direction as in FIG. 46B.

As in FIG. 52B, gNB 3800 also performs unicast LBT 5201. Note that unicast LBT 5201 has the second frequency bandwidth.

For example, gNB 3800 performs communication for transmitting unicast data (individual data) to NR-UE #1 labeled 38001_1. Thus, gNB 3800 has performed unicast LBT 5201 for performing a modulation signal including the unicast data (individual data). As a result, the gNB detects no signal.

Accordingly, gNB 3800 transmits unicast frame 5211 to NR-UE #1 labeled 38001_1 as in FIG. 52C.

For example, directional LBT or omni-directional LBT, which has already been described, is performed as the unicast LBT performed by gNB 3800. In this case, gNB 3800 performs LBT in a direction in which NR-UE #1 labeled 38001_1 is present. Meanwhile, when gNB 3800 performs broadcast LBT, for example, gNB 3800 performs LBT in a direction in which NR-UE is possibly present. Thus, it is highly likely that the first frequency bandwidth, which is the frequency bandwidth of broadcast LBT 4901, is broader than the second frequency bandwidth, which is the frequency bandwidth of unicast LBT 5201.

In the above example, the description is about the case where gNB 3800 transmits to NR-UE #1 labeled 38001_1 a modulation signal including unicast data, but also in a case where gNB 3800 transmits to a plurality of NR-UEs modulation signals including respective unicast data, it is still highly likely that the first frequency bandwidth, which is the frequency bandwidth of broadcast LBT 4901, is broader than the second frequency bandwidth, which is the frequency bandwidth of unicast LBT 5201. This is because broadcast modulation signals need to be delivered to as many NR-UEs as possible when gNB 3800 transmits the broadcast modulation signals; accordingly, LBT is preferably performed in as many directions as possible.

In addition, in a case where the frequency bandwidth of broadcast frame 4911 transmitted by gNB 3800 is the third frequency bandwidth and the frequency bandwidth of unicast frame 5211 transmitted by gNB 3800 is the fourth frequency bandwidth in FIG. 52C, it is highly likely that the third frequency bandwidth is broader than the fourth frequency bandwidth. This is because broadcast modulation signals need to be delivered to as many NR-UEs as possible when gNB 3800 transmits the broadcast modulation signals, accordingly, broadcast frames are preferably transmitted in as many directions as possible.

Figure 53A:
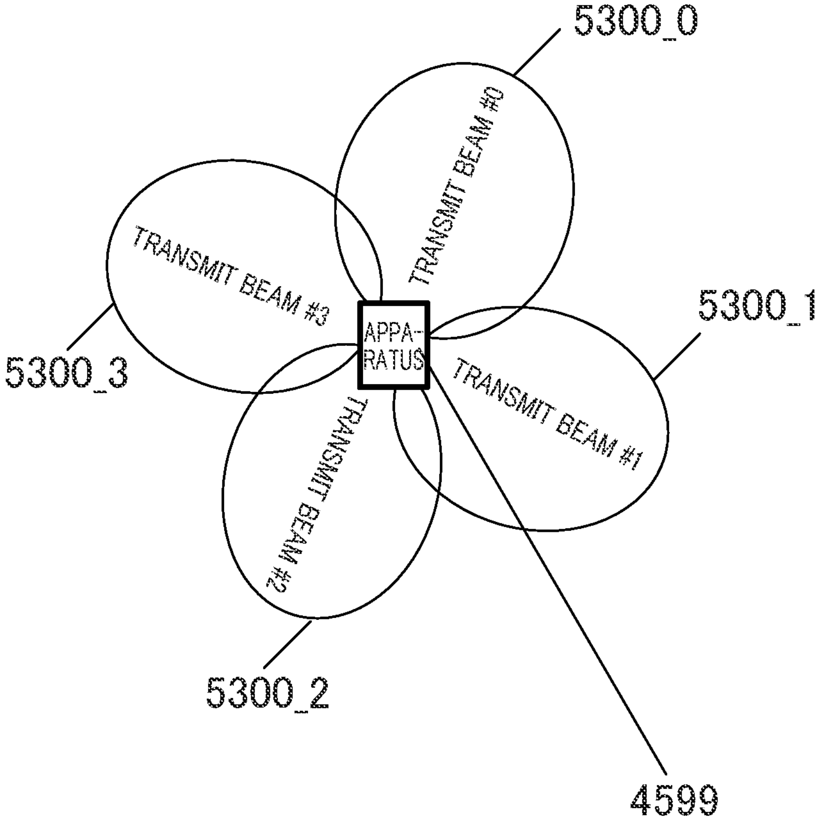
FIG. 53A illustrates an exemplary case where the NR apparatus performs transmit beamforming and forms beams.

FIG. 53A illustrates an exemplary state other than that in FIG. 45 where NR apparatus 4599 performs transmit beamforming and forms beams. As illustrated in FIG. 53A, NR apparatus 4599 can generate transmit beam #0 labeled 5300_0, transmit beam #1 labeled 5300_1, transmit beam #2 labeled 5300_2, and transmit beam #3 labeled 5300_3. Note that the example is illustrated here in which four transmit beams can be generated, but a transmit beam generation method is not limited to this example, and two or more transmit beams may be generated, for example.

By way of example here, a description will be given of a case where gNB (base station) performs broadcast transmission as NR apparatus 4599.

Figure 53B:
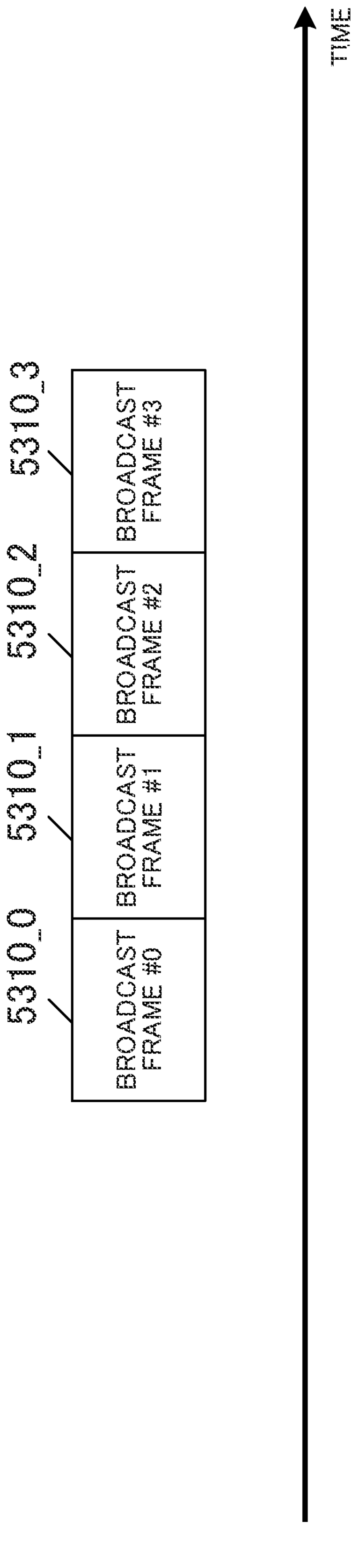
FIG. 53B illustrates exemplary frames when gNB performs broadcast transmission.
Figure 53C:
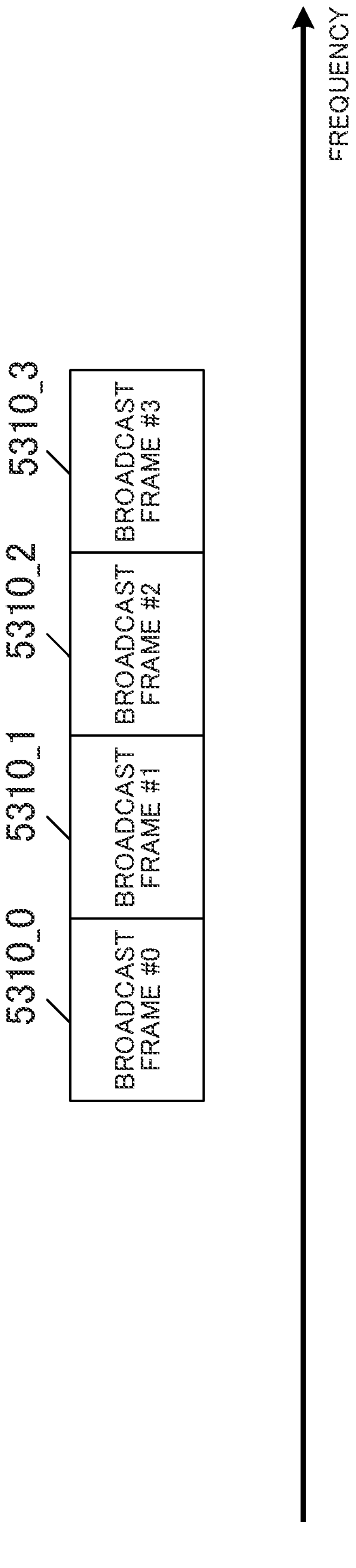
FIG. 53C illustrates exemplary frames when gNB performs broadcast transmission.

FIGS. 53B and 53C illustrate exemplary frames when the gNB (base station) performs broadcast transmission. Note that the horizontal axis represents time in FIG. 53B, and the vertical axis represents frequency in FIG. 53C. The gNB may transmit any of the frames in FIGS. 53B and 53C, for example.

In FIG. 53B, the gNB puts broadcast frame #0 labeled 5310_0 to broadcast frame #3 labeled 5310_3 on the time axis and transmits them.

The gNB transmits broadcast frame #0 labeled 53100 using transmit beam #0 labeled 5300_0 in FIG. 53A.

The gNB transmits broadcast frame #1 labeled 53101 using transmit beam #1 labeled 5300_1 in FIG. 53A.

The gNB transmits broadcast frame #2 labeled 53102 using transmit beam #2 labeled 5300_2 in FIG. 53A.

The gNB transmits broadcast frame #3 labeled 53103 using transmit beam #3 labeled 5300_3 in FIG. 53A.

Note that the broadcast frame configuration method and the transmission order are not limited to this example. The broadcast frame configuration method as in FIG. 53B may be referred to as a "time division multiplexing (TDM) broadcast frame configuration method". Note that the above TDM broadcast configuration method is effective when higher frequency is used in terms of transmitting information to many communication counterparts.

In FIG. 53C, the gNB puts broadcast frame #0 labeled 5310_0 to broadcast frame #3 labeled 5310_3 on the frequency axis and transmits them.

The gNB transmits broadcast frame #0 labeled 53100 using transmit beam #0 labeled 5300_0 in FIG. 53A.

The gNB transmits broadcast frame #1 labeled 5310_1 using transmit beam #1 labeled 5300_1 in FIG. 53A.

The gNB transmits broadcast frame #2 labeled 53102 using transmit beam #2 labeled 5300_2 in FIG. 53A.

The gNB transmits broadcast frame #3 labeled 53103 using transmit beam #3 labeled 5300_3 in FIG. 53A.

Note that the broadcast frame configuration method and the arrangement order on frequency are not limited to this example. The broadcast frame configuration method as in FIG. 53C may be referred to as a "frequency division multiplexing (FDM) broadcast frame configuration method".

Figure 53D:
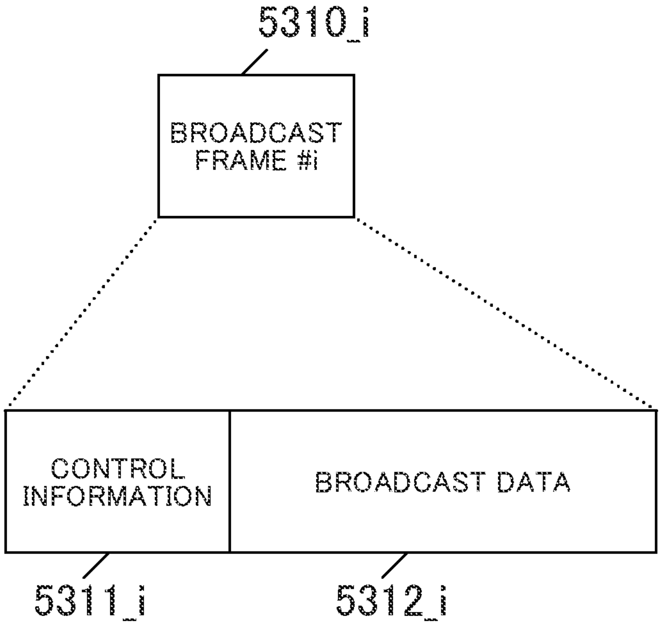
FIG. 53D illustrates an exemplary configuration of the broadcast frames.

FIG. 53D illustrates an exemplary configuration of broadcast frame #i labeled 5310_*i* illustrated in FIGS. 53B and 53C. Note that i is an integer from 0 to 3 (both inclusive) in FIGS. 53B and 53C.

It is assumed that broadcast frame #i labeled 5310_*i* is composed of, for example, control information 5311_*i* and broadcast data 5312_*i*.

At this time, "broadcast data 5312_0, broadcast data 5312_1, broadcast data 5312_2, and broadcast data 5312_3" include the same data, for example. As another example, "broadcast data 5312_0, broadcast data 5312_1, broadcast data 5312_2, and broadcast data 5312_3" may be configured to include the same content although "the condition, such as a compression ratio and a configuration, is different".

Broadcast data 5312_*i* is data to be transmitted to a plurality of terminals. For example, in FIG. 38, broadcast data 5312_*i* is data transmitted by gNB 3800, and gNB 3800 is transmitted to "NR-UE #1 labeled 3801_1, NR-UE #2 labeled 3801_2, NR-UE #3 labeled 3801_3. NR-UE #4 labeled 3801_4, NR-UE #5 labeled 3801_5. NR-UE #6 labeled 3801_6, and NR-UE #7 labeled 3801_7" if possible.

Figure 54A:
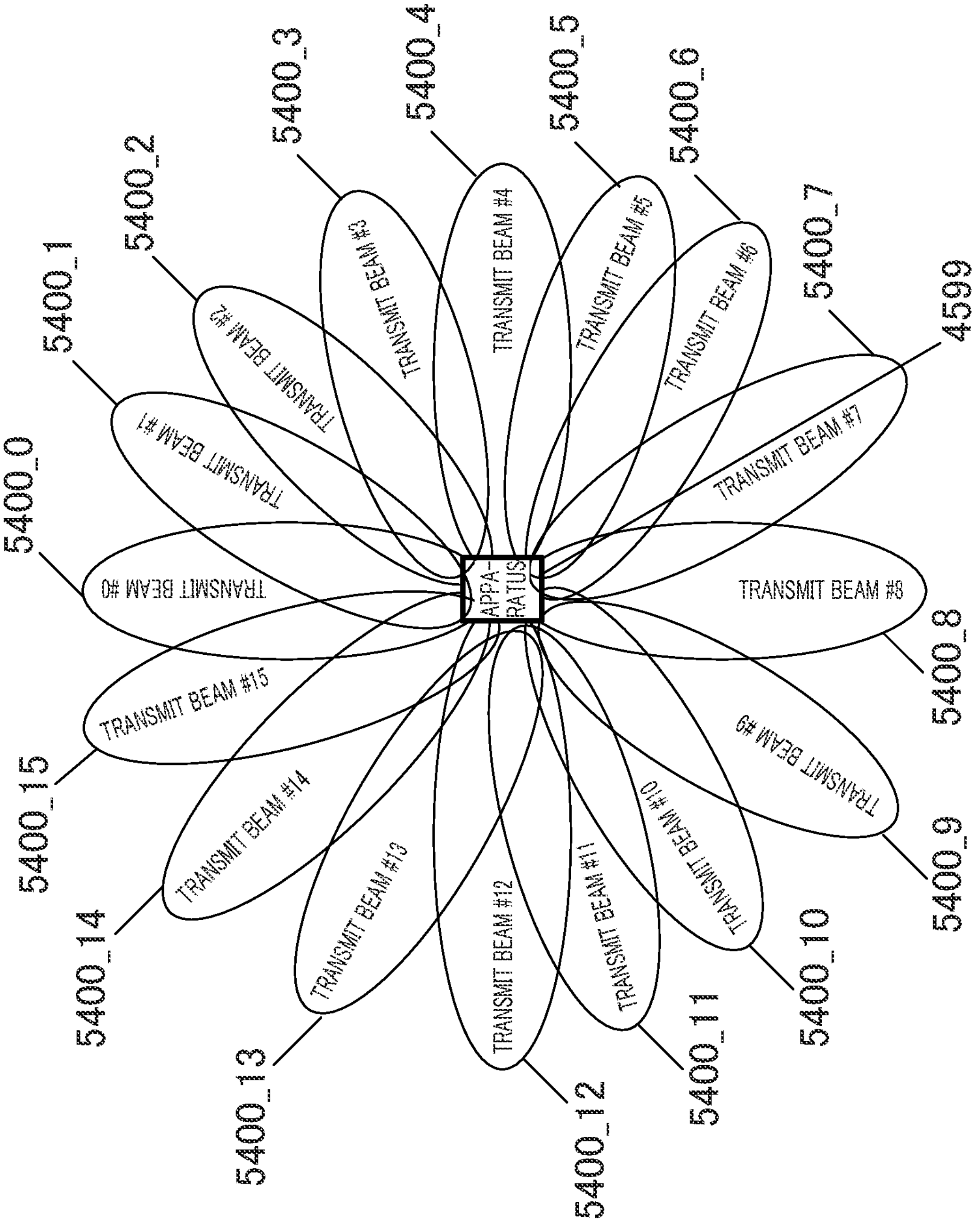
FIG. 54A illustrates an exemplary case where the NR apparatus performs transmit beamforming and forms beams.

FIG. 54A illustrates an exemplary state other than those in FIGS. 45 and 53A where NR apparatus 4599 performs transmit beamforming and forms beams. As illustrated in FIG. 54A, NR apparatus 4599 can generate transmit beam #0 labeled 5400_0, transmit beam #1 labeled 5400_1, transmit beam #2 labeled 5400_2, transmit beam #3 labeled 5400_3, transmit beam #4 labeled 5400_4, transmit beam #5 labeled 5400_5, transmit beam #6 labeled 5400_6, transmit beam #7 labeled 5400_7, transmit beam #8 labeled 5400_8, transmit beam #9 labeled 5400_9, transmit beam #10 labeled 5400_10, transmit beam #11 labeled 5400_11, transmit beam #12 labeled 5400_12, transmit beam #13 labeled 5400_13, transmit beam #14 labeled 5400_14, and transmit beam #15 labeled 5400_15. Note that the example is illustrated here in which 16 transmit beams can be generated, but a transmit beam generation method is not limited to this example, and two or more transmit beams may be generated, for example.

By way of example here, a description will be given of a case where gNB (base station) performs broadcast transmission as NR apparatus 4599.

Figure 54B:
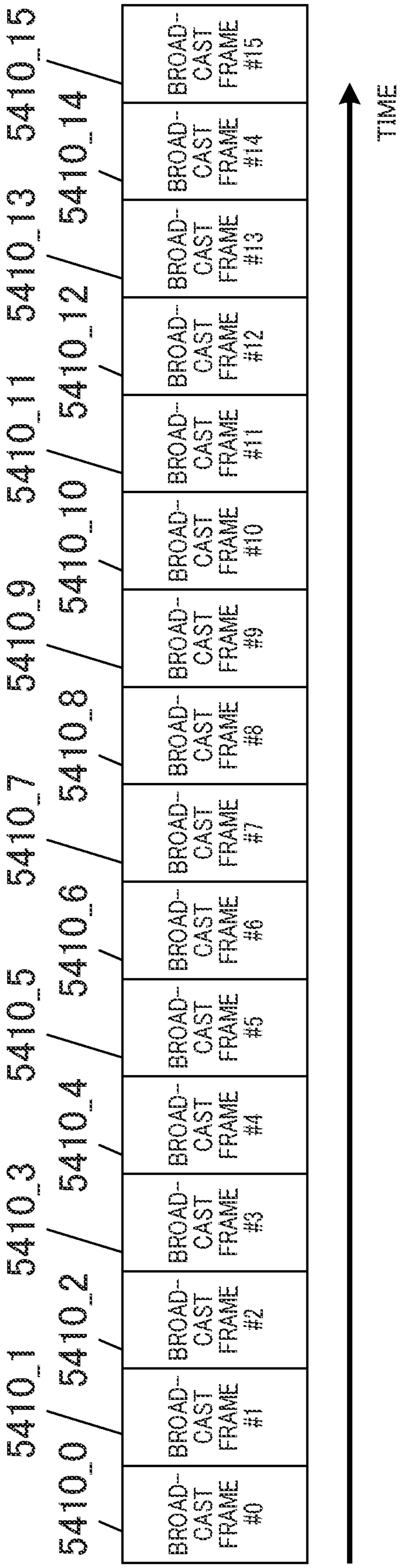
FIG. 54B illustrates exemplary frames when gNB performs broadcast transmission.
Figure 54C:
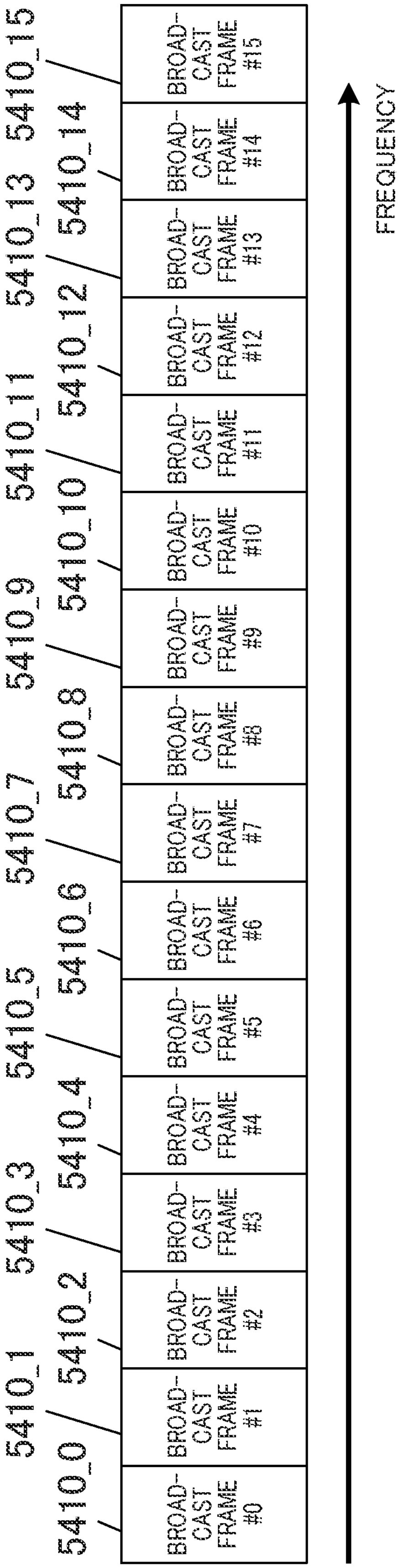
FIG. 54C illustrates exemplary frames when gNB performs broadcast transmission.

FIGS. 54B and 54C illustrate exemplary frames when the gNB (base station) performs broadcast transmission. Note that the horizontal axis represents time in FIG. 54B, and the vertical axis represents frequency in FIG. 54C. The gNB may transmit any of the frames in FIGS. 54B and 54C, for example.

In FIG. 54B, the gNB puts broadcast frame #0 labeled 5410_0 to broadcast frame #15 labeled 5410_15 on the time axis and transmits them.

The gNB transmits broadcast frame #0 labeled 54100 using transmit beam #0 labeled 5400_0 in FIG. 54A.

The gNB transmits broadcast frame #1 labeled 54101 using transmit beam #1 labeled 5400_1 in FIG. 54A.

The gNB transmits broadcast frame #2 labeled 54102 using transmit beam #2 labeled 5400_2 in FIG. 54A.

The gNB transmits broadcast frame #3 labeled 54103 using transmit beam #3 labeled 5400_3 in FIG. 54A.

The gNB transmits broadcast frame #3 labeled 54104 using transmit beam #4 labeled 5400_4 in FIG. 54A.

The gNB transmits broadcast frame #3 labeled 54105 using transmit beam #5 labeled 5400_5 in FIG. 54A.

The gNB transmits broadcast frame #3 labeled 54106 using transmit beam #6 labeled 5400_6 in FIG. 54A.

The gNB transmits broadcast frame #3 labeled 54107 using transmit beam #7 labeled 5400_7 in FIG. 54A.

The gNB transmits broadcast frame #3 labeled 54108 using transmit beam #8 labeled 5400_8 in FIG. 54A.

The gNB transmits broadcast frame #3 labeled 54109 using transmit beam #9 labeled 5400_9 in FIG. 54A.

The gNB transmits broadcast frame #3 labeled 541010 using transmit beam #10 labeled 5400_10 in FIG. 54A.

The gNB transmits broadcast frame #3 labeled 541011 using transmit beam #11 labeled 5400_11 in FIG. 54A.

The gNB transmits broadcast frame #3 labeled 541012 using transmit beam #12 labeled 5400_12 in FIG. 54A.

The gNB transmits broadcast frame #3 labeled 541013 using transmit beam #13 labeled 5400_13 in FIG. 54A.

The gNB transmits broadcast frame #3 labeled 541014 using transmit beam #14 labeled 5400_14 in FIG. 54A.

The gNB transmits broadcast frame #3 labeled 541015 using transmit beam #15 labeled 5400_15 in FIG. 54A.

Note that the broadcast frame configuration method and the transmission order are not limited to this example. The broadcast frame configuration method as in FIG. 54B may be referred to as a "time division multiplexing (TDM) broadcast frame configuration method". Note that the above TDM broadcast configuration method is effective when higher frequency is used in terms of transmitting information to many communication counterparts.

In FIG. 54C, the gNB puts broadcast frame #0 labeled 5410_0 to broadcast frame #15 labeled 5410_15 on the frequency axis and transmits them.

The gNB transmits broadcast frame #0 labeled 54100 using transmit beam #0 labeled 5400_0 in FIG. 54A.

The gNB transmits broadcast frame #1 labeled 54101 using transmit beam #1 labeled 5400_1 in FIG. 54A.

The gNB transmits broadcast frame #2 labeled 54102 using transmit beam #2 labeled 5400_2 in FIG. 54A.

The gNB transmits broadcast frame #3 labeled 54103 using transmit beam #3 labeled 5400_3 in FIG. 54A.

The gNB transmits broadcast frame #3 labeled 54104 using transmit beam #4 labeled 5400_4 in FIG. 54A.

The gNB transmits broadcast frame #3 labeled 54105 using transmit beam #5 labeled 5400_5 in FIG. 54A.

The gNB transmits broadcast frame #3 labeled 54106 using transmit beam #6 labeled 5400_6 in FIG. 54A.

The gNB transmits broadcast frame #3 labeled 54107 using transmit beam #7 labeled 5400_7 in FIG. 54A.

The gNB transmits broadcast frame #3 labeled 54108 using transmit beam #8 labeled 5400_8 in FIG. 54A.

The gNB transmits broadcast frame #3 labeled 54109 using transmit beam #9 labeled 5400_9 in FIG. 54A.

The gNB transmits broadcast frame #3 labeled 541010 using transmit beam #10 labeled 5400_10 in FIG. 54A.

The gNB transmits broadcast frame #3 labeled 541011 using transmit beam #11 labeled 5400_11 in FIG. 54A.

The gNB transmits broadcast frame #3 labeled 541012 using transmit beam #12 labeled 5400_12 in FIG. 54A.

The gNB transmits broadcast frame #3 labeled 541013 using transmit beam #13 labeled 5400_13 in FIG. 54A.

The gNB transmits broadcast frame #3 labeled 541014 using transmit beam #14 labeled 5400_14 in FIG. 54A.

The gNB transmits broadcast frame #3 labeled 541015 using transmit beam #15 labeled 5400_15 in FIG. 54A.

Note that the broadcast frame configuration method and the arrangement order on frequency are not limited to this example. The broadcast frame configuration method as in FIG. 54C may be referred to as a "frequency division multiplexing (FDM) broadcast frame configuration method".

Figure 54D:
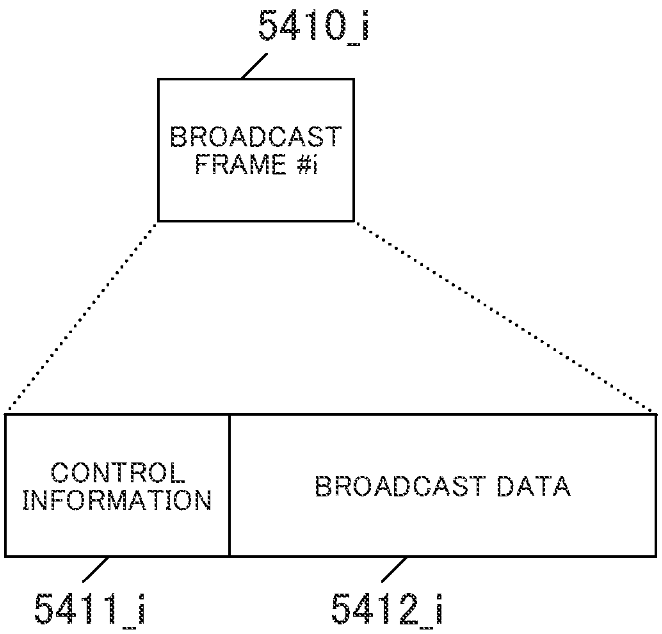
FIG. 54D illustrates an exemplary configuration of the broadcast frames.

FIG. 54D illustrates an exemplary configuration of broadcast frame #i labeled 5410_*i* illustrated in FIGS. 54B and 54C. Note that i is an integer from 0 to 15 (both inclusive) in FIGS. 54B and 54C.

It is assumed that broadcast frame #i labeled 5410_*i* is composed of, for example, control information 5411_*i* and broadcast data 5412_*i*.

At this time, "broadcast data 5412_0, broadcast data 5412_1, broadcast data 5412_2, broadcast data 5412_3, broadcast data 5412_4, broadcast data 5412_5, broadcast data 5412_6, broadcast data 5412_7, broadcast data 5412_8, broadcast data 5412_9, broadcast data 5412_10, broadcast data 5412_11, broadcast data 5412_12, broadcast data 5412_13, broadcast data 5412_14, and broadcast data 5412_15" include the same data, for example. As another example, "broadcast data 5412_0, broadcast data 5412_1, broadcast data 5412_2, broadcast data 5412_3, broadcast data 5412_4, broadcast data 5412_5, broadcast data 5412_6, broadcast data 5412_7, broadcast data 5412_8, broadcast data 5412_9, broadcast data 5412_10, broadcast data 5412_11, broadcast data 5412_12, broadcast data 5412_13, broadcast data 5412_14, and broadcast data 5412_15" may be configured to include the same content although "the condition, such as a compression ratio and a configuration, is different".

Broadcast data 5312_*i* is data to be transmitted to a plurality of terminals. For example, in FIG. 38, broadcast data 5312_*i* is data transmitted by gNB 3800, and gNB 3800 is transmitted to "NR-UE #1 labeled 3801_1, NR-UE #2 labeled 3801_2, NR-UE #3 labeled 3801_3. NR-UE #4 labeled 3801_4, NR-UE #5 labeled 3801_5. NR-UE #6 labeled 3801_6, and NR-UE #7 labeled 3801_7" if possible.

When transmitting broadcast frame 4911 as in FIGS. 49, 52A, and 52C, gNB 3800 may transmit broadcast frame 4911 by selecting any of "using 8 beams as in FIGS. 46A and 46B", "using 4 beams as in FIGS. 53B and 53C", and "using 16 beams as in FIGS. 54B and 54C", for example. Note that the frame configuration, the number of beams to use, etc, for transmission of broadcast frame 4911 are not limited to this example, and variations of "using 8 beams as in FIGS. 46A and 46B", "using 4 beams as in FIGS. 53B and 53C", and "using 16 beams as in FIGS. 54B and 54C" may be applied, for example.

That is, gNB 3800 may change the number of beams to use as time passes when transmitting broadcast frame 4911.

When transmitting unicast frame 5211 as in FIGS. 52A, and 52C, gNB 3800 may select any of the beam generation method in FIG. 45, the beam generation method in FIG. 53A, and the beam generation method in FIG. 54A, for example, and transmit unicast frame 5211 using the selected beam generation method. Thus, gNB 3800 may change the beam width depending on time when transmitting unicast frame 5211 as in FIGS. 52A and 52C.

This produces an effect of using resources for communication, such as time, frequency, and space, effectively.

Note that the variations of "using 8 beams as in FIGS. 46A and 46B", "using 4 beams as in FIGS. 53B and 53C", and "using 16 beams as in FIGS. 54B and 54C" will be described later.

When performing LBT by broadcast LBT 4901 as in FIGS. 49, 52A, and 52B, gNB 3800 may perform LBT by broadcast LBT 4901 by selecting any of "using 8 beams as in FIGS. 48A and 48B", "using 4 beams as in FIGS. 50B and 50C", and "using 16 beams as in FIGS. 51B and 51C", for example. Note that the frame configuration and the number of beams to use in performing LBT by broadcast LBT 4901 are not limited to this example. Omni-directional LBT may also be performed at this time.

That is, gNB 3800 may change the number of beams to use as time passes when performing LBT by broadcast LBT 4901.

When performing LBT in unicast LBT 5201 as in FIGS. 52A, and 52B, gNB 3800 may select any of the beam generation method in FIG. 47, the beam generation method in FIG. 50A, and the beam generation method in FIG. 51A, for example, and perform LBT in unicast LBT 5201 using the selected beam generation method. Thus, gNB 3800 may change the beam width depending on time w % ben performing LBT in unicast LBT 5201 as in FIGS. 52A and 52B. Omni-directional LBT may also be performed at this time.

This produces an effect of using resources for communication, such as time, frequency, and space, effectively.

Next, an exemplary relationship between a broadcast frame and broadcast LBT and an exemplary operation will be described.

A description will be given of the variations of "using 8 beams as in FIGS. 46A and 461", "using 4 beams as in FIGS. 53B and 53C", and "using 16 beams as in FIGS. 54B and 54C", which are configuration methods of broadcast frame 4911, when gNB 3800 transmits broadcast frame 4911 as in FIGS. 49, 52A, 52C, etc.

Figure 55:
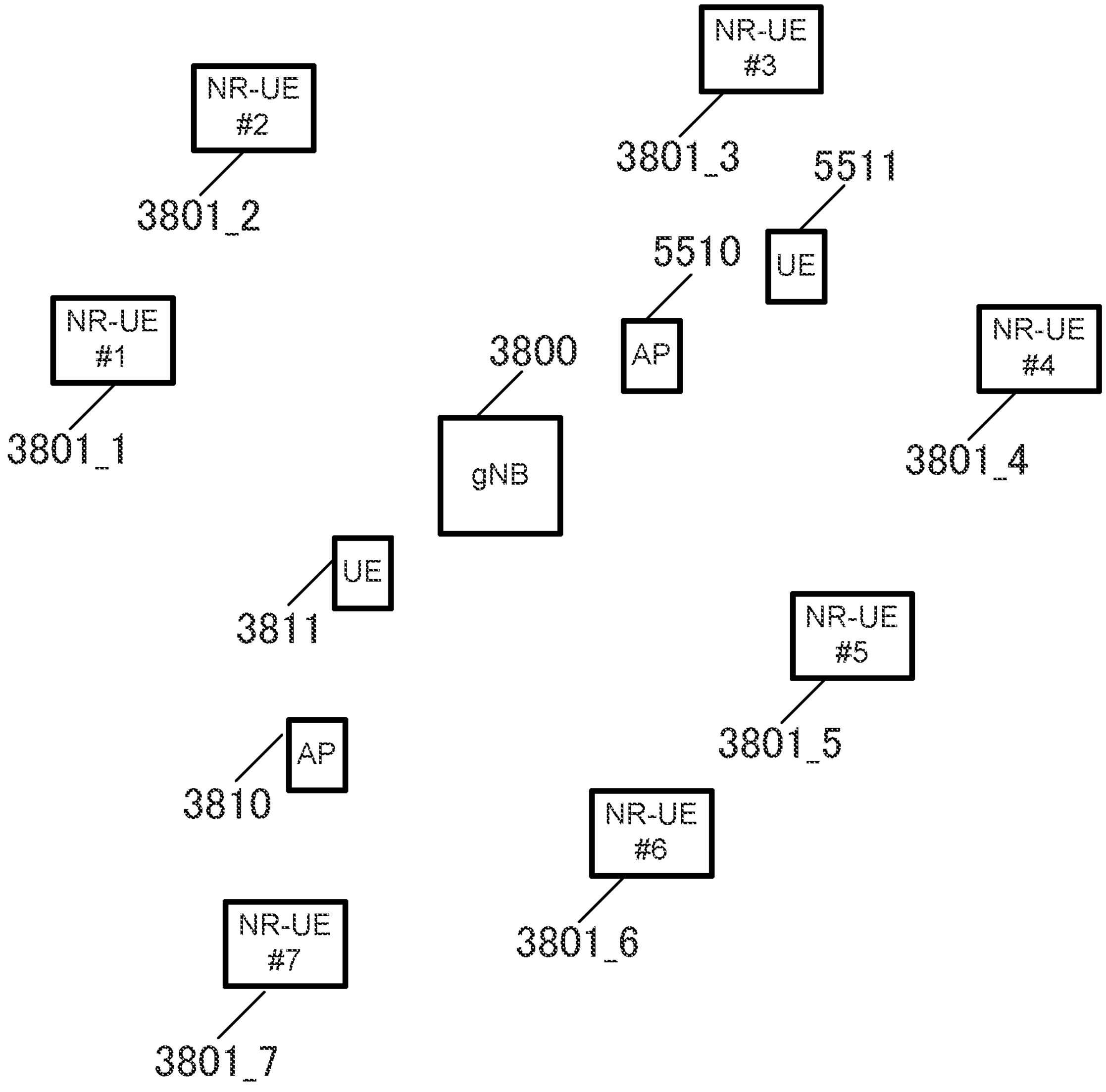
FIG. 55 illustrates an exemplary radio communication system.

FIG. 55 illustrates an exemplary radio communication system, and the components that operate in the same manner as in FIG. 38 are denoted by the same reference signs.

In FIG. 55, it is assumed that AP 3810 and UE 3811 perform communication using the first standard, for example, and AP 5510 and UE 5511 also perform communication using the first standard. Since AP 3810 and UE 3811 are performing communication, gNB 3800 is subject to interference by a modulation signal related to this communication. Since AP 5510 and UE 5511 are performing communication, gNB 3800 is also subject to interference by a modulation signal related to this communication.

Figure 56A:
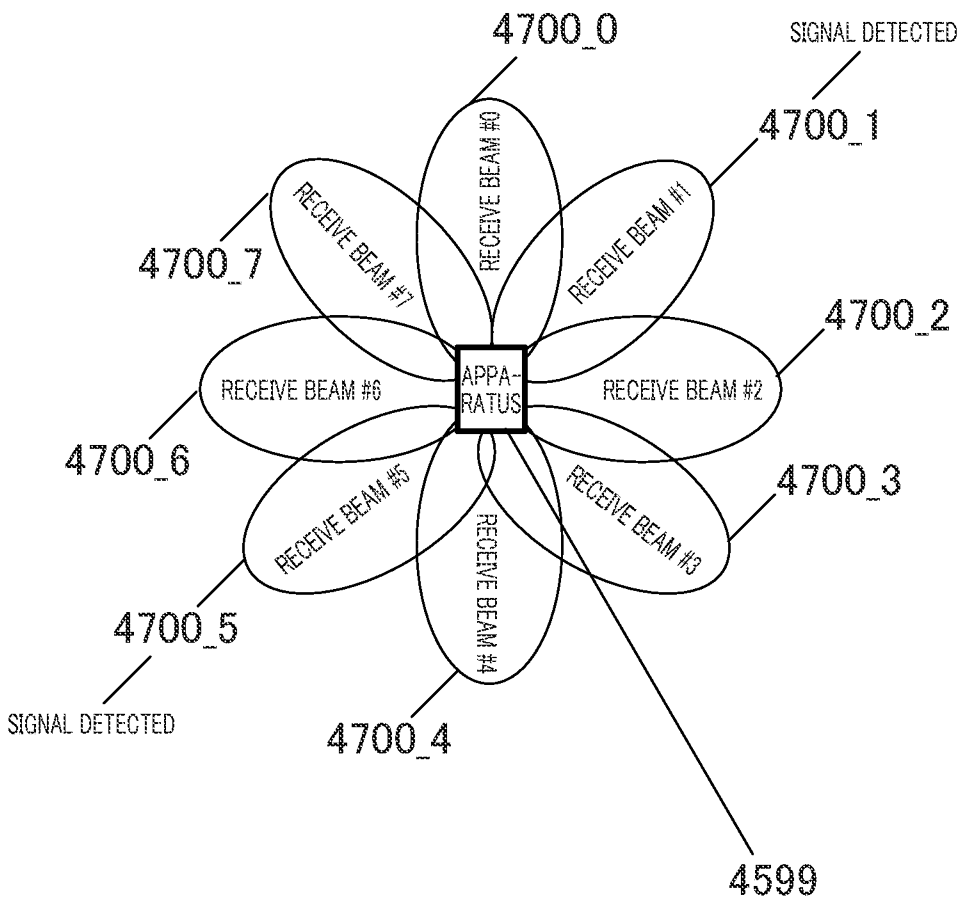
FIG. 56A illustrates receive beams generated when gNB performs LBT by broadcast LBT.

FIG. 56A illustrates receive beams generated when gNB 3800 in FIG. 55 performs LBT by broadcast LBT 4901 as in FIGS. 49, 52A, 52B, etc. The components that operate in the same manner as in FIG. 47 are denoted by the same reference signs, and the descriptions thereof will be omitted.

When gNB 3800 performs LBT by broadcast LBT 4901 in the situation as in FIG. 55, a signal is detected by receive beam #1 labeled 4700_1 due to the "interference by communication between AP 5510 and UE 5511", for example.

In addition, when gNB 3800 performs LBT by broadcast LBT 4901, a signal is detected by receive beam #5 labeled 4700_5 due to the "interference by communication between AP 3810 and UE 3811", for example.

Figure 56B:
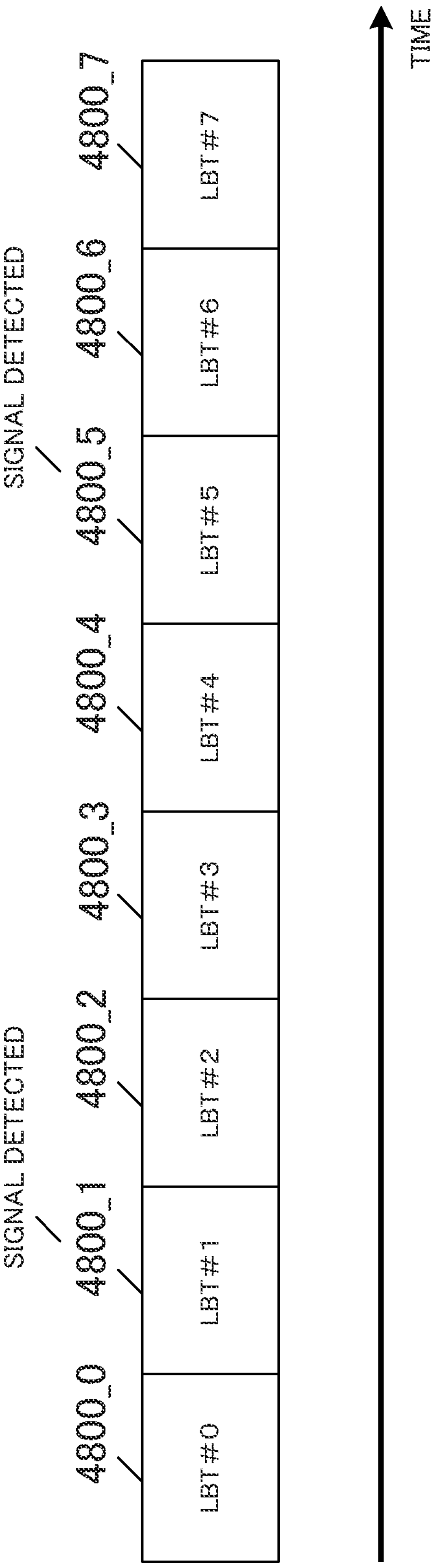
FIG. 56B illustrates exemplary frames of LBT performed before broadcast transmission.

It is assumed that gNB 3800 performs LBT configured as in FIG. 56B when performing LBT by broadcast LBT 4901. Note that, in FIG. 56B, components that operate in the same manner as in FIG. 48A are denoted by the same reference signs, and the description thereof will be omitted.

In FIG. 56B, gNB 3800 detects a signal due to the "interference by communication between AP 5510 and UE 5511" in LBT #1 labeled 4800_1.

In addition, gNB 3800 detects a signal due to the "interference by communication between AP 3810 and UE 3811" in LBT #5 labeled 4800_5.

Figure 56C:
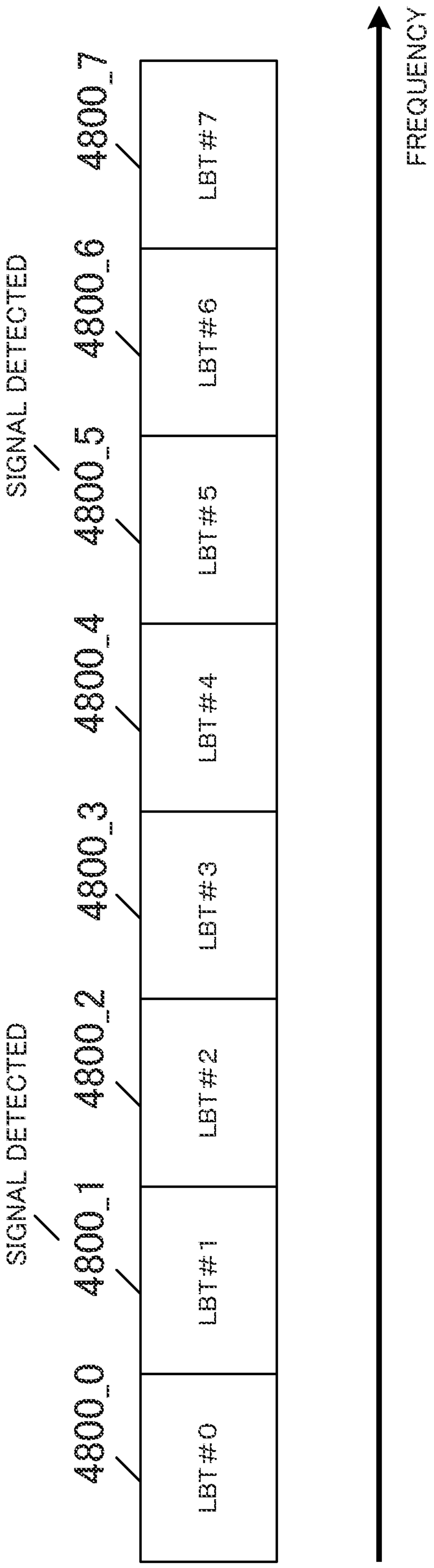
FIG. 56C illustrates exemplary frames of LBT performed before broadcast transmission.

As another example, it is assumed that gNB 3800 performs LBT configured as in FIG. 56C w % ben performing LBT by broadcast LBT 4901. Note that, in FIG. 56C, components that operate in the same manner as in FIG. 48B are denoted by the same reference signs, and the description thereof will be omitted.

In FIG. 56C, gNB 3800 detects a signal due to the "interference by communication between AP 5510 and UE 5511" in LBT #1 labeled 4800_1.

In addition, gNB 3800 detects a signal due to the "interference by communication between AP 3810 and UE 3811" in LBT #5 labeled 4800_5.

Figure 57A:
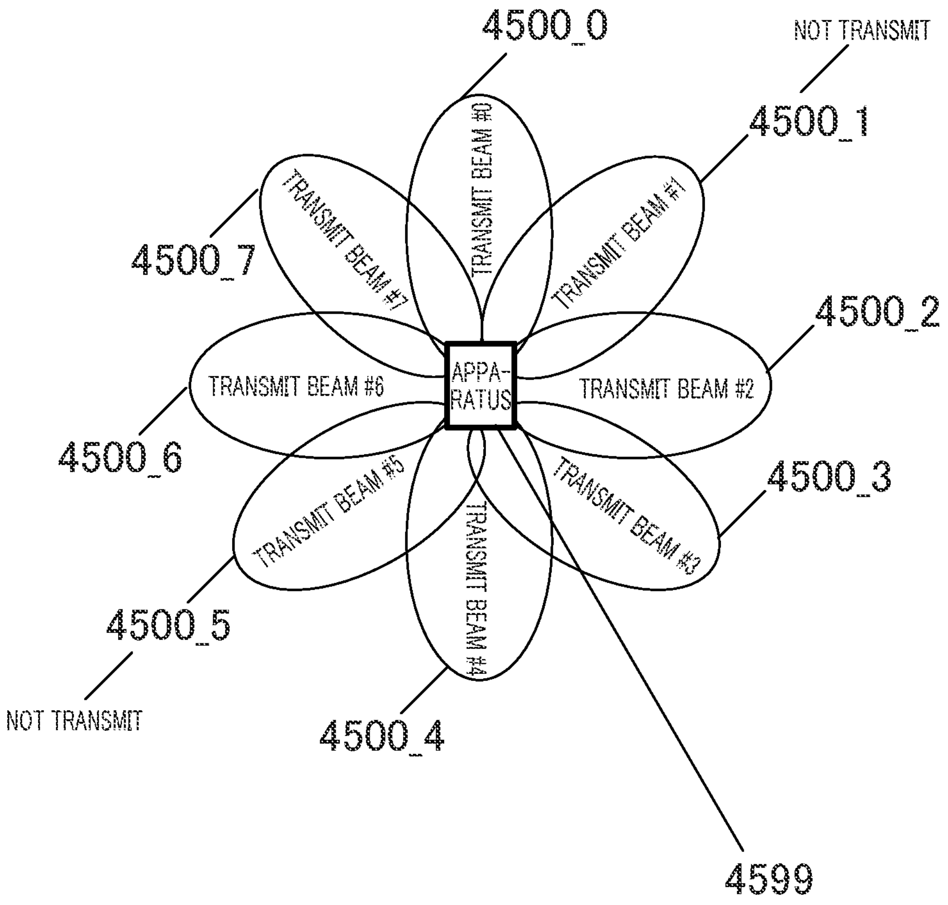
FIG. 57A illustrates transmit beams when gNB 3800 transmits a broadcast frame.

FIG. 57A illustrates transmit beams when gNB 3800 in FIG. 55 transmits broadcast frame 4911 as in FIGS. 49, 52A, 52C, etc. The components that operate in the same manner as in FIG. 45 are denoted by the same reference signs, and the descriptions thereof will be omitted.

When gNB 3800 performs LBT by broadcast LBT 4901 in the situation as in FIG. 55, signal detection as in FIG. 56B or 56C is performed.

In accordance with this, gNB 3800 in FIG. 55 does not transmit a modulation signal for broadcast using transmit beam #1 labeled 4500_1 in FIG. 57A, or does not transmit a broadcast signal using transmit beam #5 labeled 4500_5 in FIG. 57A.

Figure 57B:
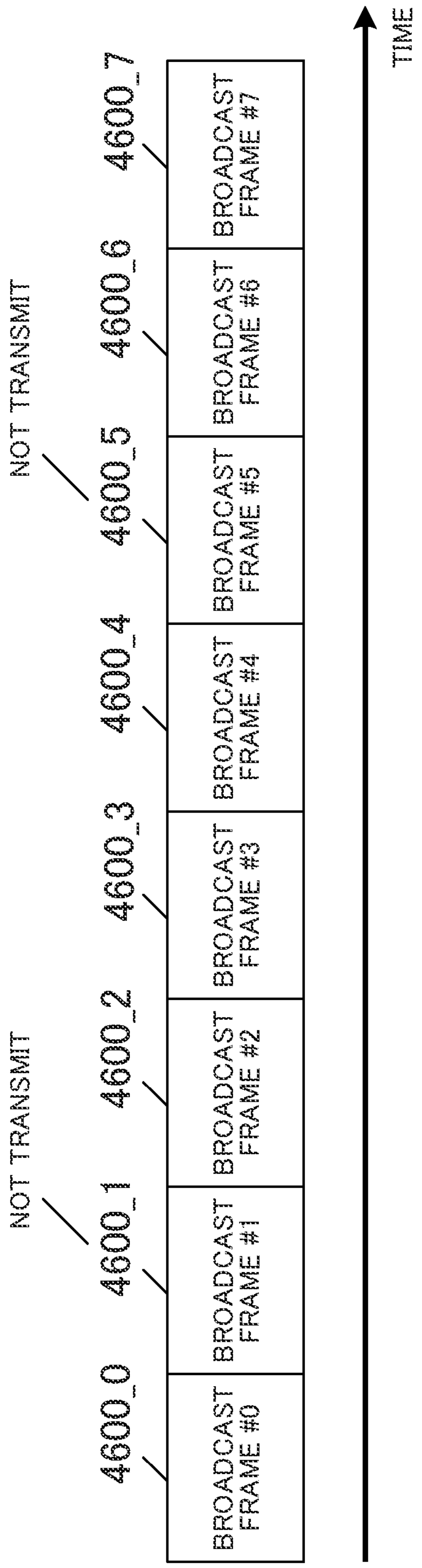
FIG. 57B illustrates an exemplary configuration of broadcast frames.

FIG. 57B illustrates an exemplary configuration of broadcast frame 4911 when gNB 3800 performs LBT and the result is as in FIG. 56B. Note that, in FIG. 57B, components that operate in the same manner as in FIG. 46A are denoted by the same reference signs, and the description thereof will be omitted.

In FIG. 56B, gNB 3800 has detected a signal due to the "interference by communication between AP 5510 and UE 5511" in LBT #1 labeled 4800_1, and thus does not transmit broadcast frame #1 labeled 4600_1 in FIG. 57B.

In FIG. 56B, gNB 3800 has also detected a signal due to the "interference by communication between AP 3810 and UE 3811" in LBT #5 labeled 4800_5, and thus does not transmit broadcast frame #5 labeled 4600_5 in FIG. 57B.

Accordingly, gNB 3800 transmits "broadcast frame #0 labeled 4600_0, broadcast frame #2 labeled 4600_2, broadcast frame #3 labeled 4600_3, broadcast frame #4 labeled 4600_4, broadcast frame #6 labeled 4600_6, and broadcast frame #7 labeled 4600_7".

Figure 57C:
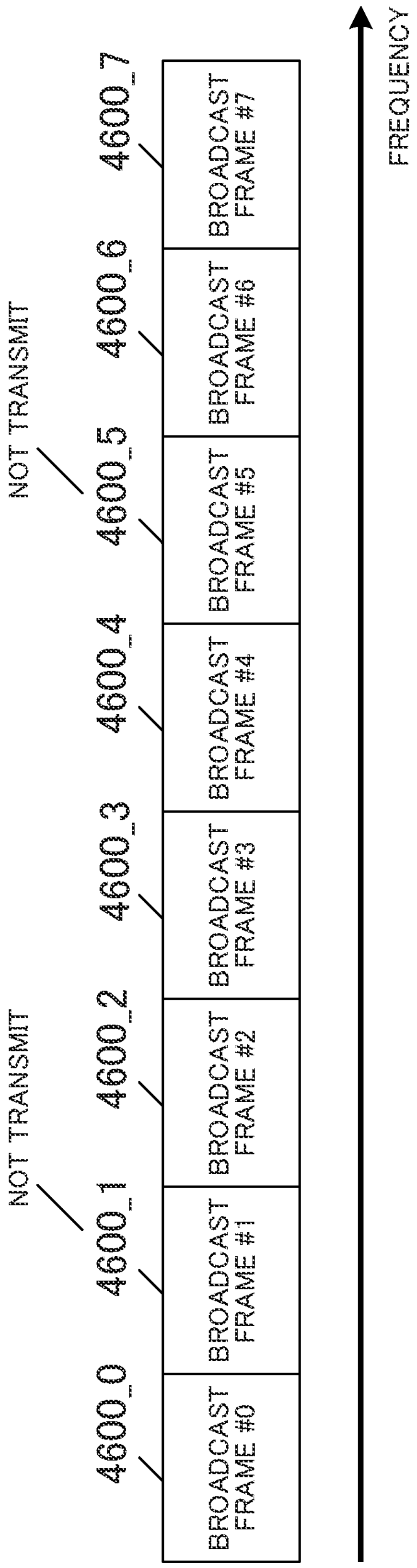
FIG. 57C illustrates an exemplary configuration of broadcast frames.

FIG. 57C illustrates an exemplary configuration of broadcast frame 4911 when gNB 3800 performs LBT and the result is as in FIG. 56C. Note that, in FIG. 57C, components that operate in the same manner as in FIG. 46B are denoted by the same reference signs, and the description thereof will be omitted.

In FIG. 56C, gNB 3800 has detected a signal due to the "interference by communication between AP 5510 and UE 5511" in LBT #1 labeled 4800_1, and thus does not transmit broadcast frame #1 labeled 4600_1 in FIG. 57C.

In FIG. 56C, gNB 3800 has also detected a signal due to the "interference by communication between AP 3810 and UE 3811" in LBT #5 labeled 4800_5, and thus does not transmit broadcast frame #5 labeled 4600_5 in FIG. 57C.

Accordingly, gNB 3800 transmits "broadcast frame #0 labeled 4600_0, broadcast frame #2 labeled 460002, broadcast frame #3 labeled 4600_3, broadcast frame #4 labeled 4600_4, broadcast frame #6 labeled 4600_6, and broadcast frame #7 labeled 4600_7".

Figure 57D:
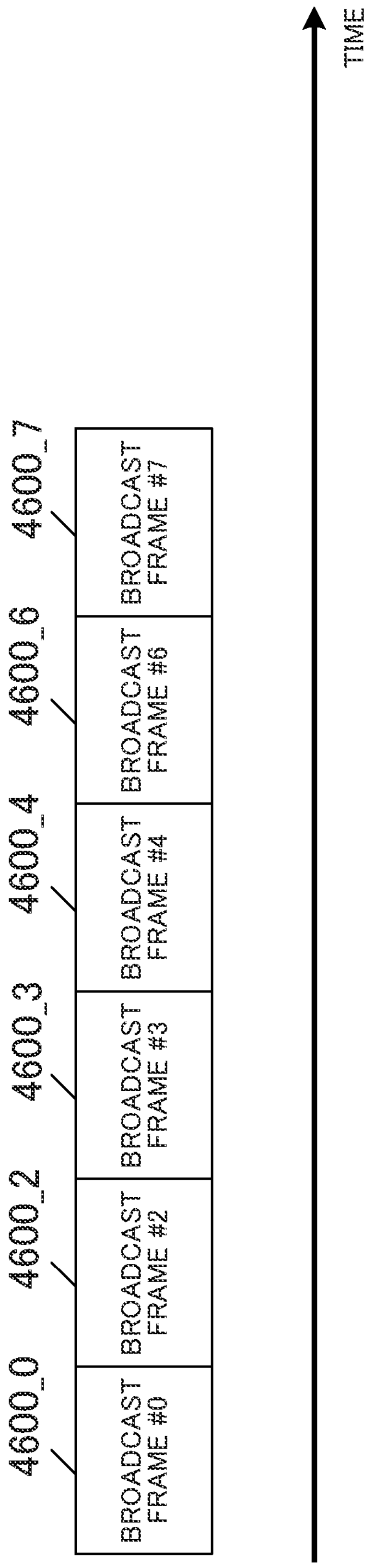
FIG. 57D illustrates an exemplary configuration of broadcast frames.

FIG. 57D illustrates an exemplary configuration of broadcast frame 4911 other than that in FIG. 57B when the gNB 3800 performs LBT and the result is as in FIG. 56B. Note that, in FIG. 57D, components that operate in the same manner as in FIG. 46A are denoted by the same reference signs, and the description thereof will be omitted.

In FIG. 56B, gNB 3800 has detected a signal due to the "interference by communication between AP 5510 and UE 5511" in LBT #1 labeled 4800_1, and thus broadcast frame #1 labeled 4600_1 is not present in FIG. 57D.

In FIG. 56B, gNB 3800 has also detected a signal due to the "interference by communication between AP 3810 and UE 3811" in LBT #5 labeled 4800_5, and thus broadcast frame #5 labeled 4600_5 is not present in FIG. 57D.

Accordingly, gNB 3800 transmits "broadcast frame #0 labeled 4600_0, broadcast frame #2 labeled 4600_2, broadcast frame #3 labeled 4600_3, broadcast frame #4 labeled 4600_4, broadcast frame #6 labeled 4600_6, and broadcast frame #7 labeled 4600_7".

In the above, a variation related to broadcast frame 4911 "using 8 beams as in FIGS. 46A and 46B" has been described. A variation related to broadcast frame 4911 "using 4 beams as in FIGS. 53B and 53C" and an example related to broadcast frame 4911 "using 16 beams as in FIGS. 54B and 54C" can be implemented in the same manner as above.

That is, the same can be implemented as long as a broadcast frame is not transmitted in a direction in which a signal is detected by performing LBT as in FIGS. 57B, 57C, and 57D.

This produces an effect of transmitting broadcast frames using resources for communication, such as time, frequency, and space, effectively.

Next, a "spatial division multiplexing (SDM) broadcast frame configuration method" and an "LBT method by spatial division multiplexing (SDM)" will be described.

FIG. 47 illustrates an exemplary state where NR apparatus 4599 performs receive beamforming and forms narrow beams, for example. The detail has already been described, and thus the description thereof will be omitted. Note that the NR apparatus is described as gNB here.

In addition. FIGS. 38 and 55 are considered, for example, as a communication state of the gNB and NR-UE.

Figure 58:
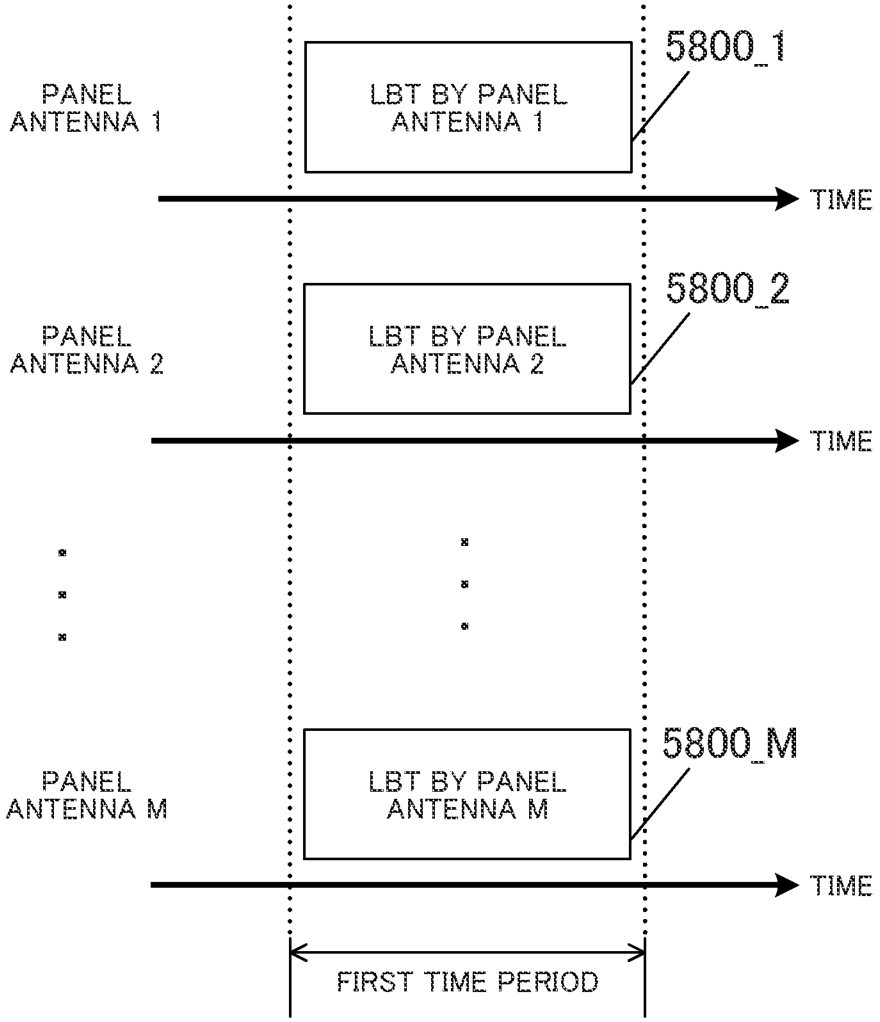
FIG. 58 illustrates LBT performed by gNB.

FIG. 58 illustrates the gNB performing LBT. Note that the horizontal axes represent time in FIG. 58.

It is assumed that the gNB includes the configuration in FIG. 39. The gNB with the configuration in FIG. 39 performs "LBT 5800_1 by panel antenna 1" using transmission/reception panel antenna 1 labeled x705_1.

In addition, the gNB with the configuration in FIG. 39 performs "LBT 5800_2 by panel antenna 2" using transmission/reception panel antenna 2 labeled x705_2.

. . . .

The gNB with the configuration in FIG. 39 performs "LBT 5800_M by panel antenna M" using transmission/reception panel antenna M labeled x705_M.

That is, the gNB with the configuration in FIG. 39 performs "LBT 5800_*i* by panel antenna i" using transmission/reception panel antenna i labeled x705_*i*. In this case, i is an integer from 1 to M (both inclusive). As illustrated in FIG. 58, "LBT 5800_*i* by panel antenna i" is present in the first time period.

For example, M is assumed to be 8. In "LBT 58001 by panel antenna I", LBT is performed using receive beam #1 labeled 4700_1 in FIG. 47.

In "LBT 58002 by panel antenna 2", LBT is performed using receive beam #2 labeled 4700_2 in FIG. 47.

In "LBT 5800_3 by panel antenna 3". LBT is performed using receive beam #3 labeled 4700_3 in FIG. 47.

In "LBT 5800_4 by panel antenna 4", LBT is performed using receive beam #4 labeled 4700_4 in FIG. 47.

In "LBT 5800_5 by panel antenna 5", LBT is performed using receive beam #5 labeled 4700_5 in FIG. 47.

In "LBT 5800_6 by panel antenna 6", LBT is performed using receive beam #6 labeled 4700_6 in FIG. 47.

In "LBT 5800_7 by panel antenna 7", LBT is performed using receive beam #7 labeled 4700_7 in FIG. 47.

In "LBT 58008 by panel antenna 8", LBT is performed using receive beam #0 labeled 4700_0 in FIG. 47.

Note that LBT is performed at the same time using a plurality of receive beams in FIG. 58, and it is thus called an "LBT method by spatial division multiplexing (SDM)", for example.

FIG. 45 illustrates an exemplary state where NR apparatus 4599 performs transmit beamforming and forms narrow beams, for example. The detail has already been described, and thus the description thereof will be omitted. Note that the NR apparatus is described as gNB here.

In addition, FIGS. 38 and 55 are considered, for example, as a communication state of the gNB and NR-UE.

Figure 59A:
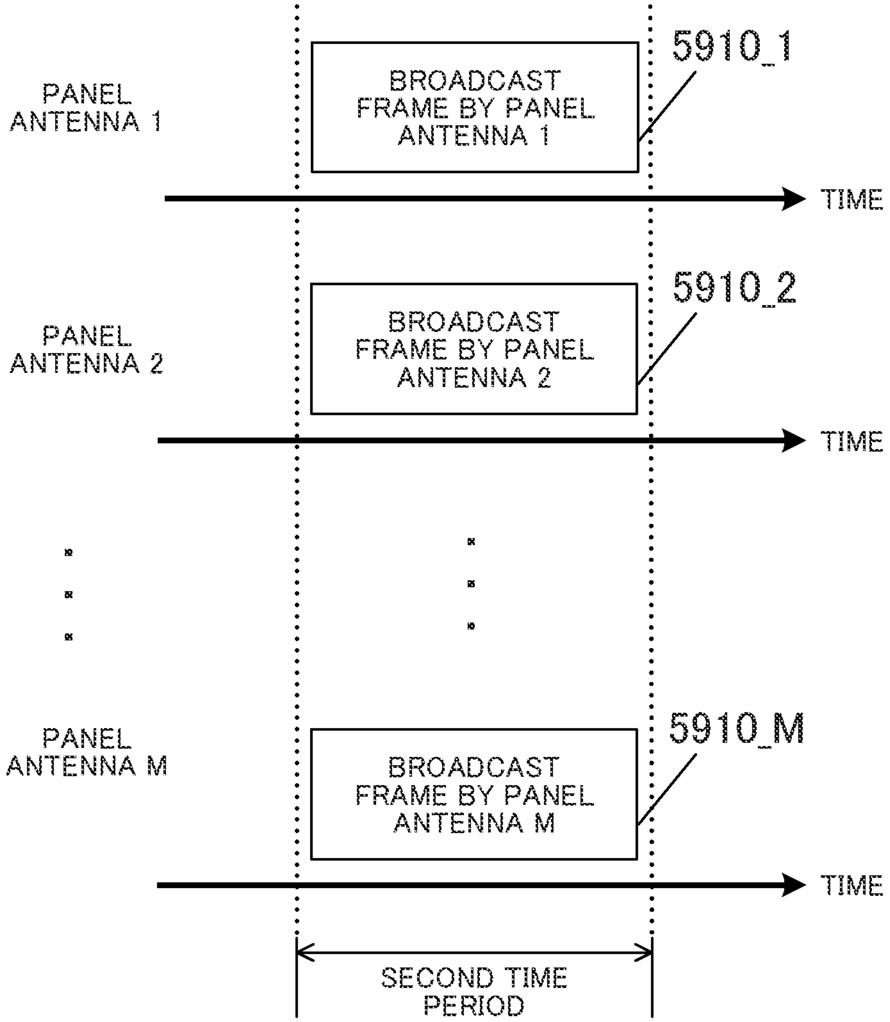
FIG. 59A illustrates broadcast frames transmitted by gNB.

FIG. 59A illustrates the gNB transmitting broadcast frames. Note that the horizontal axes represent time in FIG. 59A.

It is assumed that the gNB includes the configuration in FIG. 39. The gNB with the configuration in FIG. 39 transmits "broadcast frame 59101 in panel antenna 1" using transmission/reception panel antenna 1 labeled x705_1.

In addition, the gNB with the configuration in FIG. 39 transmits "broadcast frame 5910_2 in panel antenna 2" using transmission/reception panel antenna 2 labeled x705_2.

. . . .

The gNB with the configuration in FIG. 39 transmits "broadcast frame 5910_M in panel antenna M" using transmission/reception panel antenna M labeled x705_M.

That is, the gNB with the configuration in FIG. 39 transmits "broadcast frame 5910_*i* in panel antenna i" using transmission/reception panel antenna i labeled x705_*i*. In this case, i is an integer from 1 to M (both inclusive). As illustrated in FIG. 59A, "broadcast frame 5910_*i* in panel antenna i" is present in the second time period.

For example, M is assumed to be 8. "Broadcast frame 5910_1 in panel antenna I" is transmitted using transmit beam #1 labeled 4500_1 in FIG. 45.

"Broadcast frame 59102 in panel antenna 2" is transmitted using transmit beam #2 labeled 4500_2 in FIG. 45.

"Broadcast frame 59103 in panel antenna 3" is transmitted using transmit beam #3 labeled 4500_3 in FIG. 45.

"Broadcast frame 59104 in panel antenna 4" is transmitted using transmit beam #4 labeled 4500_4 in FIG. 45.

"Broadcast frame 59105 in panel antenna 5" is transmitted using transmit beam #5 labeled 4500_5 in FIG. 45.

"Broadcast frame 59106 in panel antenna 6" is transmitted using transmit beam #6 labeled 4500_6 in FIG. 45.

"Broadcast frame 59107 in panel antenna 7" is transmitted using transmit beam #7 labeled 4500_7 in FIG. 45.

"Broadcast frame 59108 in panel antenna 8" is transmitted using transmit beam #0 labeled 4500_0 in FIG. 45.

An exemplary operation will be described.

For example, a case will be considered where the gNB performs LBT of broadcast LBT 4901 and transmits broadcast frame 4911 based on the result as in FIG. 49.

For example, the gNB has performed LBT of "LBT 5800_1 by panel antenna 1" in FIG. 58.

It is assumed that the gNB detects no signal as a result. In this case, the gNB transmits "broadcast frame 59101 in panel antenna 1" in FIG. 59A.

In contrast, it is assumed that the gNB detects a signal. In this case, the gNB does not transmit "broadcast frame 5910_1 in panel antenna 1" in FIG. 59A.

Likewise, the gNB has performed LBT of "LBT 5800_2 by panel antenna 2" in FIG. 58.

It is assumed that the gNB detects no signal as a result. In this case, the gNB transmits "broadcast frame 59102 in panel antenna 2" in FIG. 59A In contrast, it is assumed that the gNB detects a signal. In this case, the gNB does not transmit "broadcast frame 5910_2 in panel antenna 2" in FIG. 59A.

. . . .

That is, the gNB has performed LBT of "LBT **5800_*i* by panel antenna i" in FIG. 58**.

It is assumed that the gNB detects no signal as a result. In this case, the gNB transmits "broadcast frame **5910_*i* in panel antenna i" in FIG. 59**A.

In contrast, it is assumed that the gNB detects a signal. In this case, the gNB does not transmit "broadcast frame **5910_*i* in panel antenna i" in FIG. 59**A.

Note that i is an integer from 1 to M (both inclusive).

Note that broadcast frames are present at the same time using a plurality of receive beams in FIG. 59A, and it is thus called a "broadcast frame configuration method by spatial division multiplexing (SDM)", for example.

Figure 59B:
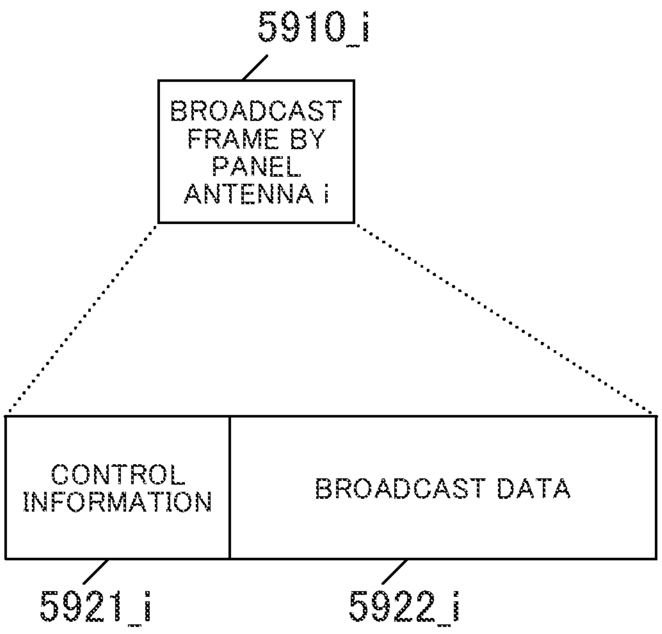
FIG. 59B illustrates an exemplary configuration of the broadcast frames.

FIG. 59B illustrates an exemplary configuration of broadcast frame **5910_*i* in panel antenna i illustrated in FIG. 59A. Note that i is an integer from 1 to M (both inclusive) in FIG. 59**B.

It is assumed that broadcast frame **5910_*i* in panel antenna i is composed of, for example, control information 5921_*i* and broadcast data 5922_*i***.

At this time, "broadcast data 5922_1, broadcast data 5922_2, and broadcast data 5922_3, broadcast data 5922_4, . . . , broadcast data 5922_M" include the same data, for example. As another example, "broadcast data 5922_1, broadcast data 5922_2, and broadcast data 5922_3, broadcast data 5922_4, . . . , broadcast data 5922_M" may be configured to include the same content although "the condition, such as a compression ratio and a configuration, is different". Further, "broadcast data 5922_1, broadcast data 5922_2, and broadcast data 5922_3, broadcast data 5922_4, . . . , broadcast data 5922_M" may include partially the same data.

Broadcast data **5922_*i* is data to be transmitted to a plurality of terminals. For example, in FIG. 38, broadcast data 5922_*i* is data transmitted by gNB 3800, and gNB 3800 is transmitted to "NR-UE #1 labeled 3801_1, NR-UE #2 labeled 3801_2, NR-UE #3 labeled 3801_3, NR-UE #4 labeled 3801_4. NR-UE #5 labeled 3801_5, NR-UE #6 labeled 3801_6, and NR-UE #7 labeled 3801_7**" if possible.

"Control information 5921_1, control information 5921_2, control information 5921_3, control information 5921_4, . . . , and control information 5921_M" may include the same data or different data from each other. Examples of "control information 5921_1, control information 5921_2, control information 5921_3, control information 5921_4, . . . , and control information 5921_M" include higher layer signaling, RRC, L1 signaling, DCI, broadcast information, SS/PBCH block, PBCH, etc., but the examples are not limited to these. Note that one of the features is to use "information and/or signal" other than synchronization signals (SS) as the control information.

Next, an example other than the above will be described.

FIG. 47 illustrates an exemplary state where NR apparatus 4599 performs receive beamforming and forms narrow beams, for example. The detail has already been described, and thus the description thereof will be omitted. Note that the NR apparatus is described as gNB here.

In addition, FIGS. 38 and 55 are considered, for example, as a communication state of the gNB and NR-UE.

Figure 60:
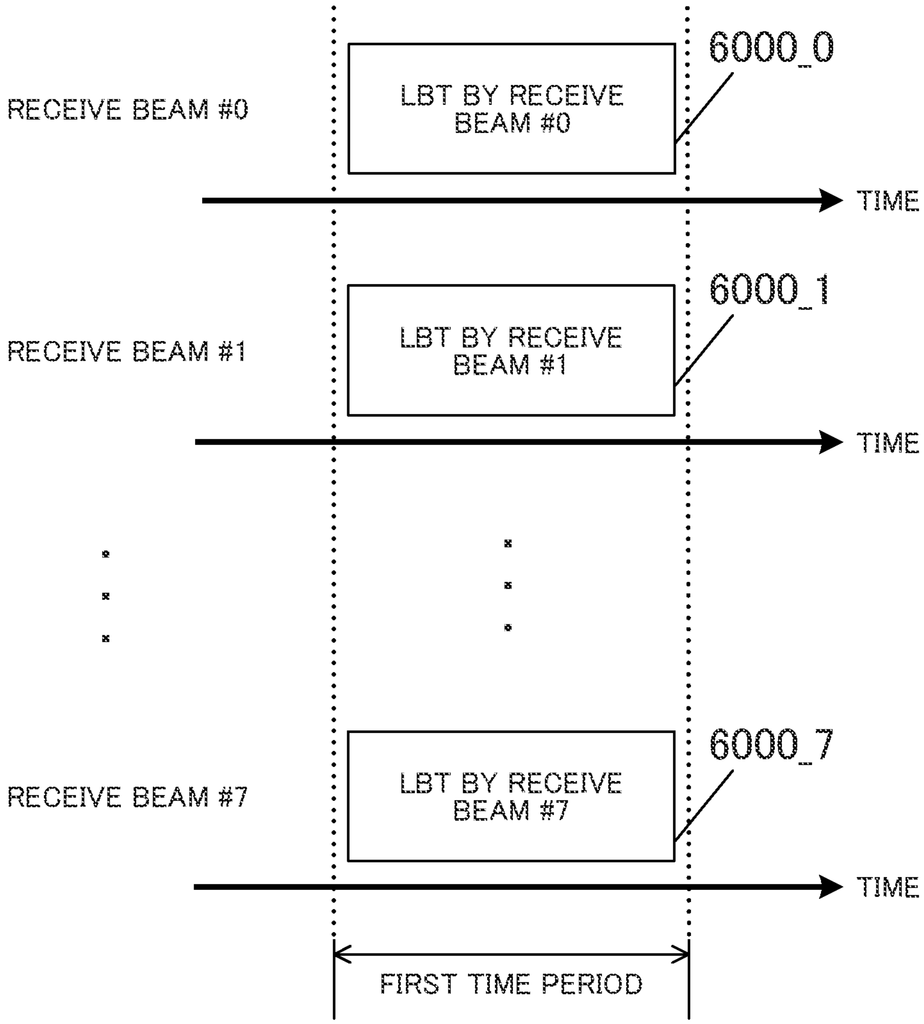
FIG. 60 illustrates LBT performed by gNB.

FIG. 60 illustrates the gNB performing LBT. Note that the horizontal axes represent time in FIG. 60.

It is assumed that the gNB includes the configuration in FIG. 40. The gNB with the configuration in FIG. 40 generates receive beam #0 labeled 4700_0 in FIG. 47 and performs "LBT 6000_0 by receive beam #0 labeled 4700_0" using transmission/reception antenna 1 labeled x805_1 to transmission/reception antenna m labeled x805_*m*.

Then, the gNB with the configuration in FIG. 40 generates receive beam #1 labeled 4700_1 in FIG. 47 and performs "LBT 60001 by receive beam #1 labeled 4700_1" using transmission/reception antenna 1 labeled x805_1 to transmission/reception antenna m labeled x805_*m*.

. . . .

The gNB with the configuration in FIG. 40 generates receive beam #7 labeled 4700_7 in FIG. 47 and performs "LBT 6000_7 by receive beam #7 labeled 4700_7" using transmission/reception antenna 1 labeled x805_1 to transmission/reception antenna m labeled x805_*m*.

That is, the gNB with the configuration in FIG. 40 generates receive beam #i labeled **4700_*i* in FIG. 47 and performs "LBT 6000_*i* by receive beam #i labeled 4700_*i*" using transmission/reception antenna 1 labeled x805_1 to transmission/reception antenna m labeled x805**_*m*. In this case, i is an integer from 0 to 7 (both inclusive).

As illustrated in FIG. 60, "LBT **6000_*i* by receive beam #i labeled 4700_*i***" is present in the first time period.

Note that LBT is performed at the same time using a plurality of receive beams in FIG. 60, and it is thus called an "LBT method by spatial division multiplexing (SDM)", for example.

FIG. 45 illustrates an exemplary state where NR apparatus 4599 performs transmit beamforming and forms narrow beams, for example. The detail has already been described, and thus the description thereof will be omitted. Note that the NR apparatus is described as gNB here.

Figure 61A:
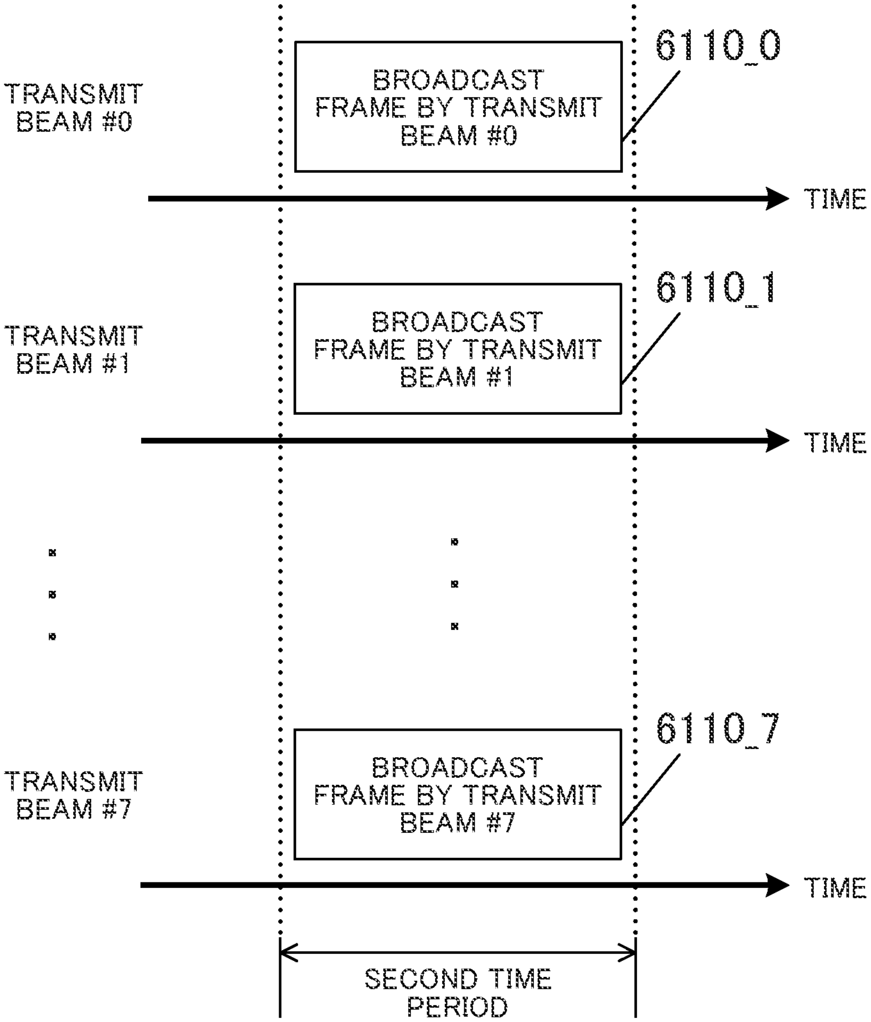
FIG. 61A illustrates broadcast frames transmitted by gNB.

In addition. FIGS. 38 and 55 are considered, for example, as a communication state of the gNB and NR-UE FIG. 61A illustrates the gNB transmitting broadcast frames. Note that the horizontal axes represent time in FIG. 61A.

It is assumed that the gNB includes the configuration in FIG. 40. The gNB with the configuration in FIG. 40 generates transmit beam #0 labeled 4500_0 in FIG. 45 and transmits "broadcast frame 6110_0 by transmit beam #0 labeled 4500_0 in FIG. 45" using transmission/reception antenna 1 labeled x805_1 to transmission/reception antenna m labeled x805_*m*.

Then, the gNB with the configuration in FIG. 40 generates transmit beam #1 labeled 4500_1 in FIG. 45 and transmits "broadcast frame 6110_1 by transmit beam #1 labeled 4500_1 in FIG. 45" using transmission/reception antenna 1 labeled x805_1 to transmission/reception antenna m labeled x805_*m*.

. . . .

The gNB with the configuration in FIG. 40 generates transmit beam #7 labeled 4500_7 in FIG. 45 and transmits "broadcast frame 6110_7 by transmit beam #7 labeled 4500_7 in FIG. 45" using transmission/reception antenna 1 labeled x805_1 to transmission/reception antenna m labeled x805_m.

That is, the gNB with the configuration in FIG. 40 generates transmit beam #i labeled 4500_i in FIG. 45 and transmits broadcast frame 6110_i by transmit beam #i labeled 4500_i in FIG. 45 using transmission/reception antenna 1 labeled x805_1 to transmission/reception antenna m labeled x805_m. In this case, i is an integer from 0 to 7 (both inclusive). As illustrated in FIG. 61A, broadcast frame 6110_i by transmit beam #i labeled 4500_i in FIG. 45 is present in the second time period.

An exemplary operation will be described.

For example, a case will be considered where the gNB performs LBT of broadcast LBT 4901 and transmits broadcast frame 4911 based on the result as in FIG. 49.

For example, the gNB has performed LBT of "LBT 6000_0 by receive beam #0" in FIG. 60.

It is assumed that the gNB detects no signal as a result. In this case, the gNB transmits "broadcast frame 61100 by transmit beam #0" in FIG. 61A In contrast, it is assumed that the gNB detects a signal. In this case, the gNB does not transmit "broadcast frame 6110_0 by transmit beam #0" in FIG. 61A.

Likewise, the gNB has performed LBT of "LBT 6000_1 by receive beam #1" in FIG. 60.

It is assumed that the gNB detects no signal as a result. In this case, the gNB transmits "broadcast frame 6110_1 by transmit beam #1" in FIG. 61A.

In contrast, it is assumed that the gNB detects a signal. In this case, the gNB does not transmit "broadcast frame 6110_1 by transmit beam #1" in FIG. 61A.

. . . .

That is, the gNB has performed LBT of "LBT 6000_i by receive beam #i" in FIG. 60.

It is assumed that the gNB detects no signal as a result. In this case, the gNB transmits "broadcast frame 6110_i by transmit beam #i" in FIG. 61A.

In contrast, it is assumed that the gNB detects a signal. In this case, the gNB does not transmit "broadcast frame 6110_i by transmit beam #i" in FIG. 61A.

Note that i is an integer from 0 to 7 (both inclusive).

Note that broadcast frames are present at the same time using a plurality of receive beams in FIG. 61A, and it is thus called a "broadcast frame configuration method by spatial division multiplexing (SDM)", for example. The example with 8 beams has been described here, but it is not limited to this example. In addition, the number of receive beams used for LBT may be one or more in FIG. 60. Further, the number of beams used for transmitting broadcast frames may be one or more or two or more in FIG. 61A.

Figure 61B:
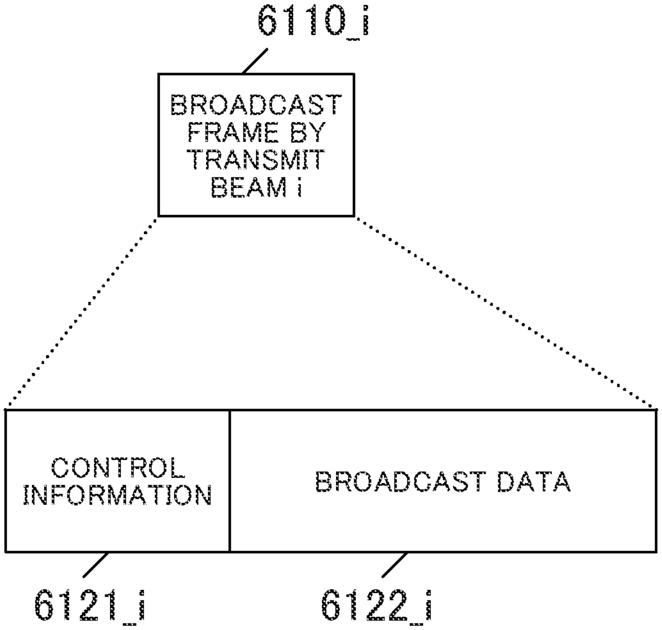
FIG. 61B illustrates an exemplary configuration of the broadcast frames.

FIG. 61B illustrates an exemplary configuration of broadcast frame 6110_i by transmit beam #i labeled 4500_i in FIG. 45, illustrated in FIG. 61A. Note that i is an integer from 0 to 7 (both inclusive) in FIG. 61B.

It is assumed that broadcast frame 6110_i by transmit beam #i labeled 4500_i in FIG. 45 is composed of, for example, control information 6121_i and broadcast data 6122_i.

At this time, "broadcast data 6122_0, broadcast data 6122_1, broadcast data 6122_2, and broadcast data 6122_3, broadcast data 6122_4, . . . , broadcast data 6122_7" include the same data, for example. As another example, "broadcast data 6122_0, broadcast data 6122_1, broadcast data 6122_2, and broadcast data 6122_3, broadcast data 6122_4 . . . , broadcast data 6122_7" may be configured to include the same content although "the condition, such as a compression ratio and a configuration, is different". Further, "broadcast data 6122_0, broadcast data 6122_1, broadcast data 6122_2, and broadcast data 6122_3, broadcast data 6122_4, . . . , broadcast data 6122_7" may include partially the same data.

Broadcast data 6122_i is data to be transmitted to a plurality of terminals. For example, in FIG. 38, broadcast data 6122_i is data transmitted by gNB 3800, and gNB 3800 is transmitted to "NR-UE #1 labeled 3801_1, NR-UE #2 labeled 3801_2, NR-UE #3 labeled 3801_3, NR-UE #4 labeled 3801_4. NR-UE #5 labeled 3801_5, NR-UE #6 labeled 3801_6, and NR-UE #7 labeled 3801_7" if possible.

"Control information 6121_0, control information 6121_1, control information 6121_2, control information 6121_3, control information 6121_4, . . . , and control information 6121_7" may include the same data or different data from each other. Examples of "control information 6121_0, control information 6121_1, control information 6121_2, control information 6121_3, control information 6121_4, . . . , and control information 6121_7" include higher layer signaling, RRC, L1 signaling, DCI, broadcast information. SS/PBCH block, PBCH, etc., but the examples are not limited to these. Note that one of the features is to use "information and/or signal" other than synchronization signals (SS) as the control information.

This produces an effect of transmitting broadcast frames using resources for communication, such as time, frequency, and space, effectively.

Next, a "broadcast frame configuration method using spatial division multiplexing (SDM) and time division multiplexing (TDM) together" and an "LBT method using spatial division multiplexing (SDM) and time division multiplexing (TDM) together" will be described.

Figure 62:
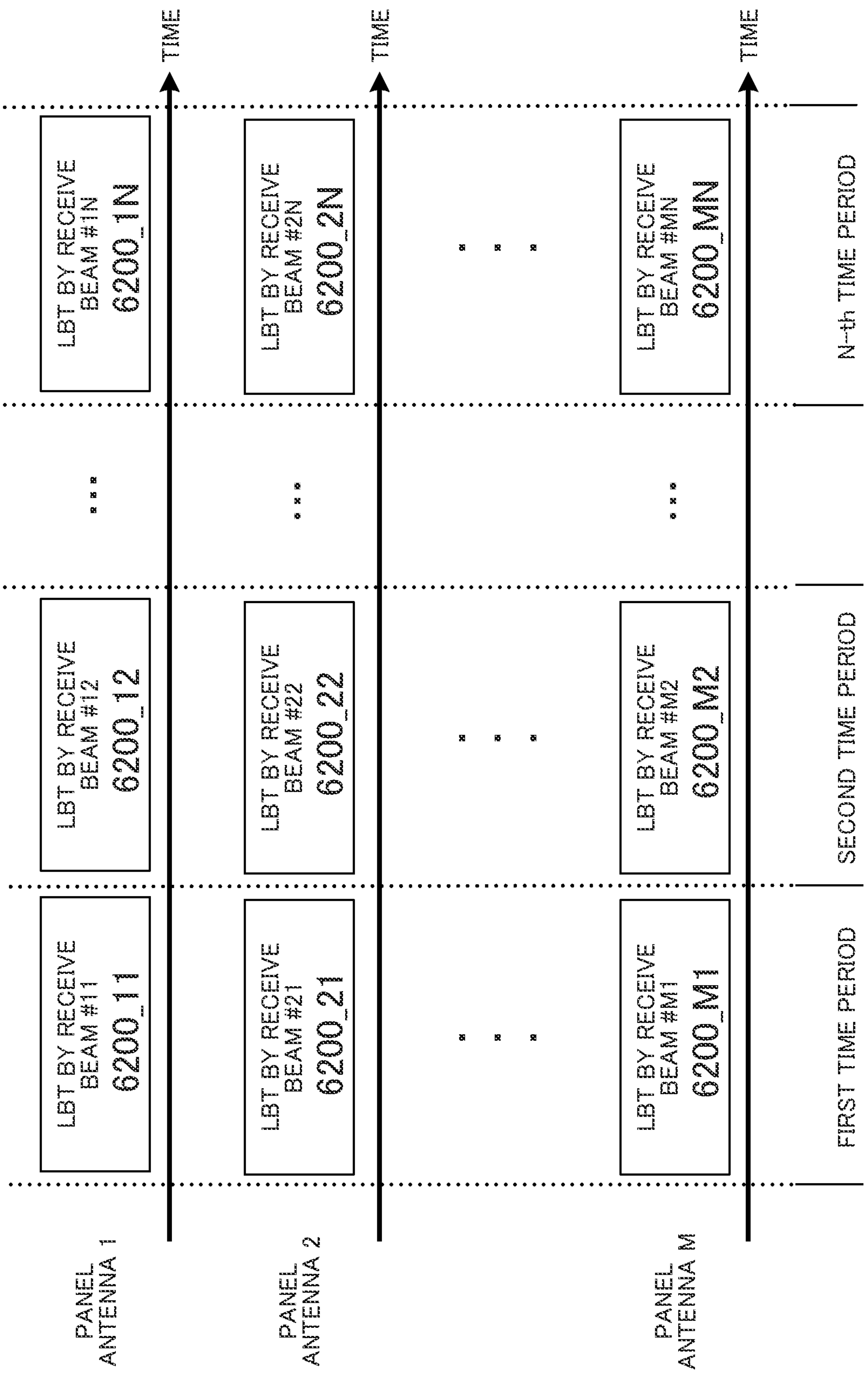
FIG. 62 illustrates LBT performed by gNB.

FIG. 62 illustrates the gNB performing LBT. Note that the horizontal axes represent time in FIG. 62.

It is assumed that the gNB includes the configuration in FIG. 39. The gNB with the configuration in FIG. 39 can, for example, generate a plurality of receive beams using transmission/reception panel antenna 1 labeled x705_1. Here, the gNB can generate "receive beam #11, receive beam #12, . . . , receive beam #1N" using transmission/reception panel antenna 1 labeled x705_1. Note that N is an integer equal to or greater than 1 or an integer equal to or greater than 2.

The gNB with the configuration in FIG. 39 can, for example, generate a plurality of receive beams using transmission/reception panel antenna 2 labeled x705_2. Here, the gNB can generate "receive beam #21, receive beam #22, . . . , receive beam #2N" using transmission/reception panel antenna 2 labeled x705_2. Note that N is an integer equal to or greater than 1 or an integer equal to or greater than 2.

. . . .

The gNB with the configuration in FIG. 39 can, for example, generate a plurality of receive beams using transmission/reception panel antenna M labeled x705_M. Here, the gNB can generate "receive beam #M1, receive beam #M2, . . . , receive beam #MN" using transmission/reception panel antenna M labeled x705_M. Note that N is an integer equal to or greater than 1 or an integer equal to or greater than 2.

That is, the gNB with the configuration in FIG. 39 can, for example, generate a plurality of receive beams using transmission/reception panel antenna i labeled x705_i. Here, the gNB can generate "receive beam #i1, receive beam #i2, . . . , receive beam #iN" using transmission/reception panel antenna i labeled x705_i. Note that Nis an integer equal to or greater than 1 or an integer equal to or greater than 2. In addition, i is an integer from 1 to M (both inclusive).

Then, the gNB with the configuration in FIG. 39 performs each LBT of "LBT 6200_11 by receive beam #11", "LBT 6200_12 by receive beam #12", . . . , "LBT 6200_1N by receive beam #1N" using transmission/reception panel antenna 1 labeled x705_1.

The gNB with the configuration in FIG. 39 performs each LBT of "LBT 6200_21 by receive beam #21", "LBT 6200_22 by receive beam #22", . . . , "LBT 6200_2N by receive beam #2N" using transmission/reception panel antenna 2 labeled x705_2.

. . . .

The gNB with the configuration in FIG. 39 performs each LBT of "LBT 6200_M1 by receive beam #M1", "LBT 6200_M2 by receive beam #M2", . . . , "LBT 6200_MN by receive beam #MN" using transmission/reception panel antenna M labeled x705_M.

That is, the gNB with the configuration in FIG. 39 performs each LBT of "LBT 6200_*i*1 by receive beam #i1", "LBT 6200_*i*2 by receive beam #i2", . . . , "LBT 6200_1N by receive beam #iN" using transmission/reception panel antenna i labeled x705_*i*. Note that i is an integer from 1 to M (both inclusive).

In this case, "LBT 6200_11 by receive beam #11", "LBT 6200_21 by receive beam #21", . . . , "LBT 6200_M1 by receive beam #M1" are present in the first time period. That is, "LBT 6200_*k*1 by receive beam #k1" is present in the first time period. Note that k is an integer from 1 to M (both inclusive).

"LBT 6200_12 by receive beam #12", "LBT 6200_22 by receive beam #22", . . . , "LBT 6200_M2 by receive beam #M2" are present in the second time period. That is, "LBT 6200_*k*2 by receive beam #k2" is present in the second time period. Note that k is an integer from 1 to M (both inclusive).

. . . .

"LBT 6200_1N by receive beam #1N", "LBT 6200_2N by receive beam #2N", . . . , "LBT 6200_MN by receive beam #MN" are present in the N-th time period. That is, "LBT 6200_kN by receive beam #kN" is present in the N-th time period. Note that k is an integer from 1 to M (both inclusive).

Thus, "LBT 6200_1x by receive beam #1x", "LBT 6200_2x by receive beam #2x", . . . , "LBT 6200_Mx by receive beam #Mx" are present in the x-th time period. That is, "LBT 6200_*kx* by receive beam #kx" is present in the x-th time period. Note that k is an integer from 1 to M (both inclusive). In addition, x is an integer from 1 to N (both inclusive).

Note that LBT is performed at the same time using a plurality of receive beams and performing time division in FIG. 62, and it is thus called an "LBT method using spatial division multiplexing (SDM) and TDM together", for example.

Although N types of beams can be generated in each transmission/reception panel antenna in FIG. 62, the present disclosure is not limited to this, and the number of beams that can be generated may be set in each transmission/reception panel antenna.

For example, 5 types of beams can be generated in transmission/reception panel antenna 1 labeled x705_1, and the gNB performs LBT in the first time period to the fifth time period. Likewise, 8 types of beams can be generated in transmission/reception panel antenna 2 labeled x705_2, and the gNB performs LBT in the first time period to the eighth time period, and so forth.

FIGS. 38 and 55 are considered, for example, as a communication state of the gNB and NR-UE.

Figure 63A:
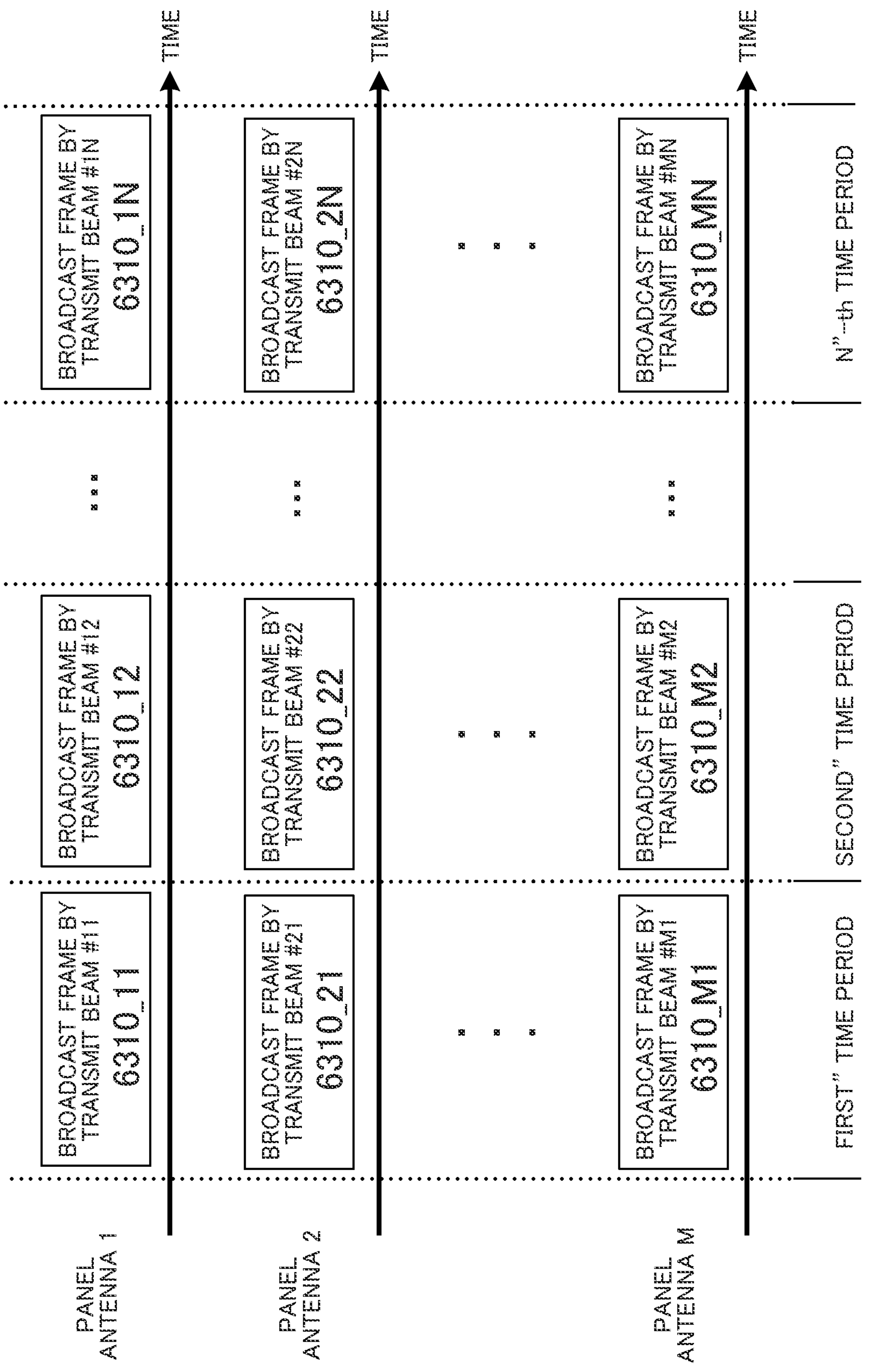
FIG. 63A illustrates broadcast frames transmitted by gNB.

FIG. 63A illustrates the gNB transmitting broadcast frames. Note that the horizontal axes represent time in FIG. 63A.

It is assumed that the gNB includes the configuration in FIG. 39. The gNB with the configuration in FIG. 39 can, for example, generate a plurality of receive beams using transmission/reception panel antenna 1 labeled x705_1. Here, the gNB can generate "transmit beam #11, transmit beam #12, . . . , transmit beam #1N" using transmission/reception panel antenna 1 labeled x705_I. Note that N is an integer equal to or greater than 1 or an integer equal to or greater than 2.

The gNB with the configuration in FIG. 39 can, for example, generate a plurality of receive beams using transmission/reception panel antenna 1 labeled x705_2. Here, the gNB can generate "transmit beam #21, transmit beam #22, . . . , transmit beam #2N" using transmission/reception panel antenna 2 labeled x705_2. Note that N is an integer equal to or greater than 1 or an integer equal to or greater than 2.

. . . .

The gNB with the configuration in FIG. 39 can, for example, generate a plurality of receive beams using transmission/reception panel antenna 1 labeled x705_M. Here, the gNB can generate "transmit beam #M1, transmit beam #M2, . . . , transmit beam #MN" using transmission/reception panel antenna M labeled x705_M. Note that N is an integer equal to or greater than 1 or an integer equal to or greater than 2.

That is, the gNB with the configuration in FIG. 39 can, for example, generate a plurality of receive beams using transmission/reception panel antenna 1 labeled x705_*i*. Here, the gNB can generate "transmit beam #i1, transmit beam #i2, . . . , transmit beam #iN" using transmission/reception panel antenna i labeled x705_*i*. Note that N is an integer equal to or greater than 1 or an integer equal to or greater than 2. In addition, i is an integer from 1 to M (both inclusive).

Then, the gNB with the configuration in FIG. 39 transmits "broadcast frame 6310_11 by transmit beam #11", "broadcast frame 6310_12 by transmit beam #12", . . . , "broadcast frame 6310_1N by transmit beam #1N" using transmission/reception panel antenna 1 labeled x705_1.

The gNB with the configuration in FIG. 39 transmits "broadcast frame 631021 by transmit beam #21", "broadcast frame 6310_22 by transmit beam #22", . . . , "broadcast frame 6310_2N by transmit beam #2N" using transmission/reception panel antenna 2 labeled x705_2.

. . . .

The gNB with the configuration in FIG. 39 transmits "broadcast frame 6310_M1 by transmit beam #M1", "broadcast frame 6310_M2 by transmit beam #M2", . . . , "broadcast frame 6310_MN by transmit beam #MN" using transmission/reception panel antenna M labeled x705_M.

That is, the gNB with the configuration in FIG. 39 transmits "broadcast frame 6310_*i*1 by transmit beam #i1", "broadcast frame 6310_*i*2 by transmit beam #i2", . . . , "broadcast frame 6310_1N by transmit beam #iN" using transmission/reception panel antenna i labeled x705_*i*. In this case, i is an integer from 1 to M (both inclusive).

In this case, "broadcast frame 6310_11 by transmit beam #11", "broadcast frame 6310_21 by transmit beam #21", . . . , "broadcast frame 6310_M1 by transmit beam #M1" are present in the first" time period. That is, "broadcast frame 6310_*k*1 by transmit beam #k1" is present in the first" time period. Note that k is an integer from 1 to M (both inclusive).

"Broadcast frame 6310_12 by transmit beam #12", "broadcast frame 6310_22 by transmit beam #22", . . . , "broadcast frame 6310_M2 by transmit beam #M2" are present in the second" time period. That is, "broadcast frame 6310_*k*2 by transmit beam #k2" is present in the second" time period. Note that k is an integer from 1 to M (both inclusive).

. . . .

"Broadcast frame 6310_1N by transmit beam #iN", "broadcast frame 6310_2N by transmit beam #2N", . . . , "broadcast frame 6310_MN by transmit beam #MN" are present in the N"-th time period. That is, "broadcast frame 6310_kN by transmit beam #kN" is present in the N"-th time period. Note that k is an integer from 1 to M (both inclusive).

Thus, "broadcast frame 6310_1*x* by transmit beam #x", "broadcast frame 6310_2*x* by transmit beam #2x", . . . , "broadcast frame 6310_Mx by transmit beam #Mx" are present in the x"-th time period. That is, "broadcast frame 6310_*kx* by transmit beam #kx" is present in the x"-th time period. Note that k is an integer from 1 to M (both inclusive). In addition, x is an integer from 1 to N (both inclusive).

An exemplary supplementary operation will be described.

For example, the gNB performs LBT in each of "LBT 6200_11 by receive beam #11", "LBT 6200_12 by receive beam #12", . . . , "LBT 6200_1N by receive beam #1N" among "receive beam #11, receive beam #12, . . . , receive beam #1N" in transmission/reception antenna 1 labeled x705_*in* FIG. 62.

At this time, it is assumed that the gNB has detected a signal in "LBT 6200_11 by receive beam #11", for example. Then, the gNB does not transmit "broadcast frame 6310_11 by transmit beam #11" in FIG. 63A.

It is assumed that the gNB has detected no signal in "LBT 6200_12 by receive beam #12". Then, the gNB transmits "broadcast frame 6310_12 by transmit beam #12" in FIG. 63A.

. . . .

It is assumed that the gNB has detected no signal in "LBT 6200_1N by receive beam #1N". Then, the gNB transmits "broadcast frame 6310_1N by transmit beam #1N" in FIG. 63A.

The gNB performs LBT in each of "LBT 6200_21 by receive beam #21". "LBT 6200_22 by receive beam #22" . . . , "LBT 6200_2N by receive beam #2N" among "receive beam #21, receive beam #22, . . . , receive beam #2N" in transmission/reception antenna 2 labeled x705_2 in FIG. 62.

At this time, it is assumed that the gNB has detected no signal in "LBT 6200_21 by receive beam #21", for example. Then, the gNB transmits "broadcast frame 6310_21 by transmit beam #21" in FIG. 63A.

It is assumed that the gNB has detected a signal in "LBT 6200_22 by receive beam #22". Then, the gNB does not transmit "broadcast frame 6310_22 by transmit beam #22" in FIG. 63A.

. . . .

It is assumed that the gNB has detected no signal in "LBT 6200_2N by receive beam #2N". Then, the gNB transmits "broadcast frame 6310_2N by transmit beam #2N" in FIG. 63A.

. . . .

The gNB performs LBT in each of "LBT 6200_M1 by receive beam #M1", "LBT 6200_M2 by receive beam #M2", . . . , "LBT 6200_MN by receive beam #MN" among "receive beam #M1, receive beam #M2, . . . , receive beam #MN" in transmission/reception antenna M labeled x705_M in FIG. 62.

At this time, it is assumed that the gNB has detected no signal in "LBT 6200_M1 by receive beam #M1", for example. Then, the gNB transmits "broadcast frame 6310_M1 by transmit beam #M1" in FIG. 63A.

It is assumed that the gNB has detected no signal in "LBT 6200_M2 by receive beam #M2". Then, the gNB transmits "broadcast frame 6310_M2 by transmit beam #M2" in FIG. 63A.

. . . .

It is assumed that the gNB has detected no signal in "LBT 620)_MN by receive beam #MN". Then, the gNB transmits "broadcast frame 6310_MN by transmit beam #MN" in FIG. 63A.

That is, LBT is performed in "LBT 6200_*ix* by receive beam #ix," in transmission/reception antenna i labeled x705_*i* in FIG. 62.

When detecting no signal in "LBT 6200_*ix* by receive beam #ix,", the gNB transmits "broadcast frame 6310_*ix* by transmit beam #ix" in FIG. 63A.

When detecting a signal in "LBT 6200_*ix* by receive beam #ix,", the gNB does not transmit "broadcast frame 6310_*ix* by transmit beam #ix" in FIG. 63A.

Note that i is an integer from 1 to M (both inclusive) and x is an integer from 1 to N (both inclusive).

In FIG. 63A, broadcast frames are present at the same time using a plurality of receive beams and are transmitted by performing time division, and it is thus called a "broadcast frame configuration method using spatial division multiplexing (SDM) and TDM together", for example.

Although N types of beams can be generated in each transmission/reception panel antenna in FIG. 63A, the present disclosure is not limited to this, and the number of beams that can be generated may be set in each transmission/reception panel antenna.

For example, 5 types of beams can be generated in transmission/reception panel antenna 1 labeled x705_1, and the gNB transmits broadcast frames in the first" time period to the fifth" time period. Further, 8 types of beams can be generated in transmission/reception panel antenna 2 labeled x705_2, and the gNB transmits broadcast frames in the first"time period to the eighth" time period, and so forth.

Another exemplary operation will be described.

Figure 63B:
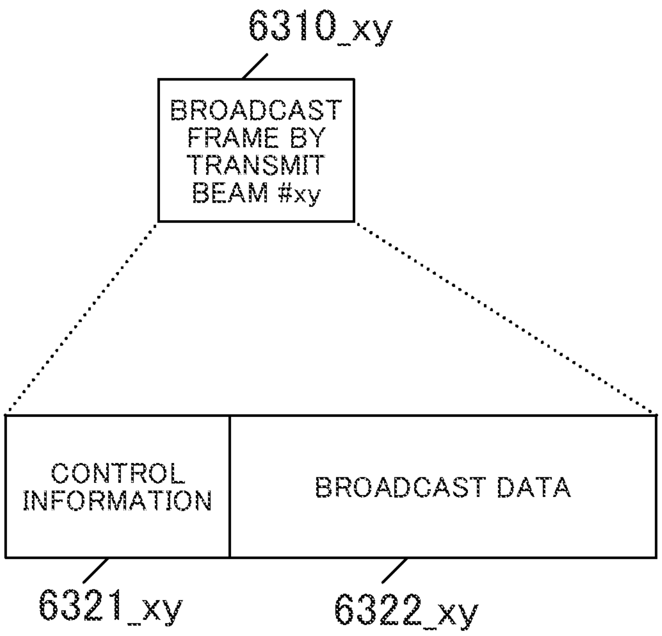
FIG. 63B illustrates an exemplary configuration of the broadcast frames.
Figure 63C:
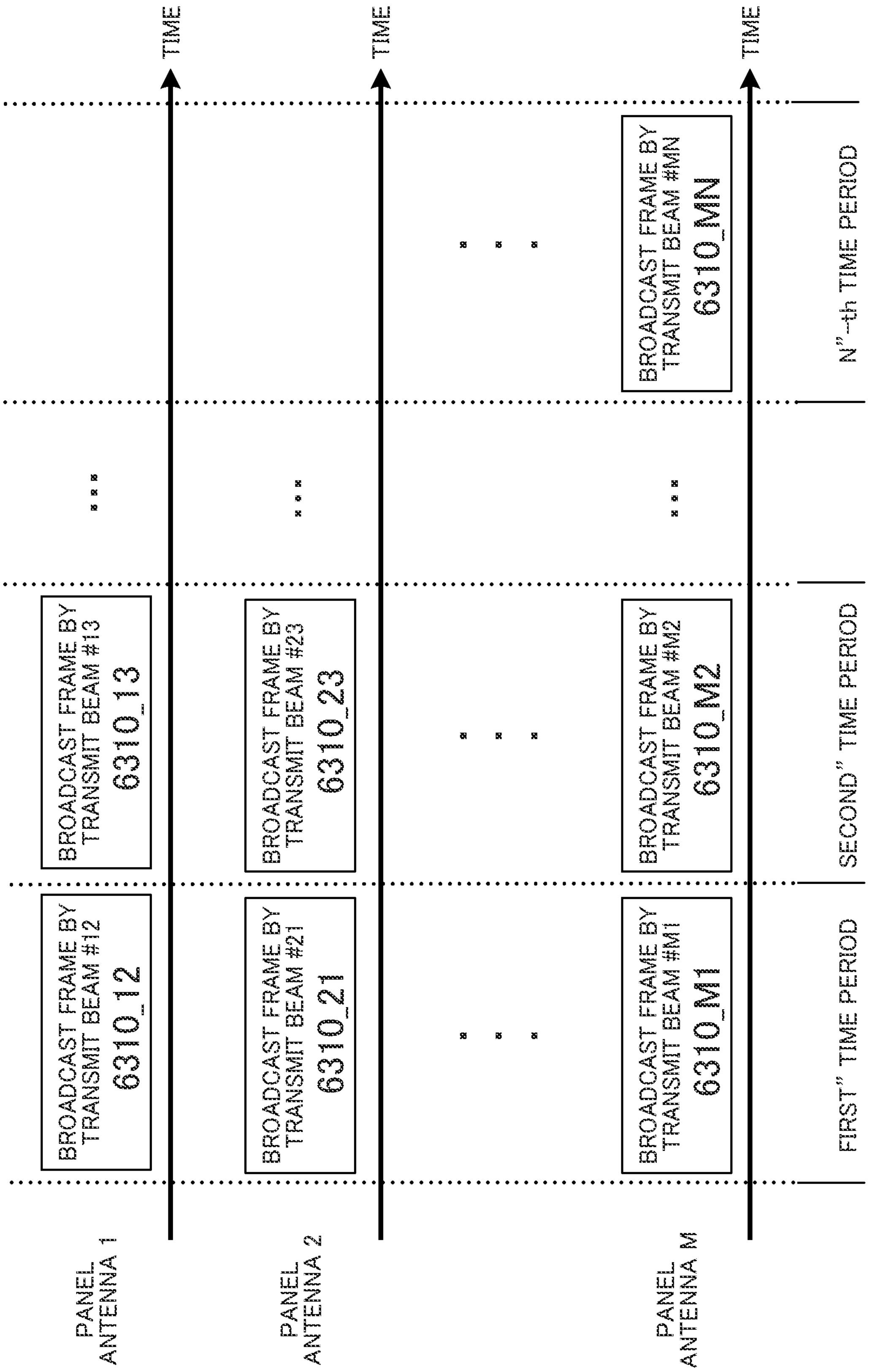
FIG. 63C illustrates a variation of FIG. 63A.

FIG. 63C is a variation of FIG. 63A, and in FIG. 63C, components that operate in the same manner as in FIG. 63A are denoted by the same reference signs. Note that the horizontal axes represent time in FIG. 63C.

For example, the gNB performs LBT in each of "LBT 6200_11 by receive beam #11", "LBT 6200_12 by receive beam #12", . . . , "LBT 6200_1N by receive beam #1N" among "receive beam #11, receive beam #12, . . . , receive beam #1N" in transmission/reception antenna 1 labeled x705_1 in FIG. 62.

At this time, it is assumed that the gNB has detected a signal in "LBT 6200_11 by receive beam #11", for example. Then, "broadcast frame 6310_11 by transmit beam #11" is not present as in FIG. 63C, and the gNB does not transmit "broadcast frame 6310_11 by transmit beam #1I".

It is assumed that the gNB has detected no signal in "LBT 6200_12 by receive beam #12". Then, the gNB transmits "broadcast frame 6310_12 by transmit beam #12" as in FIG. 63C.

. . . .

The gNB performs LBT in each of "LBT 6200_21 by receive beam #21", "LBT 6200_22 by receive beam

#22", . . . "LBT 6200_2N by receive beam #2N" among "receive beam #21, receive beam #22, . . . , receive beam #2N" in transmission/reception antenna 2 labeled x705_2 in FIG. 62.

At this time, it is assumed that the gNB has detected no signal in "LBT 6200_21 by receive beam #21", for example. Then, the gNB transmits "broadcast frame 6310_21 by transmit beam #21" as in FIG. 63C.

It is assumed that the gNB has detected a signal in "LBT 6200_22 by receive beam #22". Then, "broadcast frame 6310_22 by transmit beam #22" is not present as in FIG. 63C, and the gNB does not transmit "broadcast frame 6310_22 by transmit beam #22" as in FIG. 63C.

. . . .

The gNB performs LBT in each of "LBT 6200_M1 by receive beam #M1", "LBT 6200_M2 by receive beam #M2", . . . , "LBT 6200_MN by receive beam #MN" among "receive beam #M1, receive beam #M2, . . . , receive beam #MN" in transmission/reception antenna M labeled x705_M in FIG. 62.

At this time, it is assumed that the gNB has detected no signal in "LBT 6200_M1 by receive beam #M1", for example. Then, the gNB transmits "broadcast frame 6310_M1 by transmit beam #M1" as in FIG. 63C.

It is assumed that the gNB has detected no signal in "LBT 6200_M2 by receive beam #M2". Then, the gNB transmits "broadcast frame 6310_M2 by transmit beam #M2" as in FIG. 63C.

. . . .

It is assumed that the gNB has detected no signal in "LBT 6200_MN by receive beam #MN". Then, the gNB transmits "broadcast frame 6310_MN by transmit beam #MN" as in FIG. 63C.

That is, LBT is performed in "LBT 6200_*ix* by receive beam #ix," in transmission/reception antenna i labeled x705_*i* in FIG. 62.

When detecting no signal in "LBT 6200_*ix* by receive beam #ix,", the gNB transmits "broadcast frame 6310_*ix* by transmit beam #ix" in FIG. 63C.

When the gNB detects a signal in "LBT 6200_*ix* by receive beam #ix,", "broadcast frame 6310_*ix* by transmit beam #ix" is not present in FIG. 63C, and the gNB does not transmit "broadcast frame 6310_*ix* by transmit beam #ix".

Note that i is an integer from 1 to M (both inclusive) and x is an integer from 1 to N (both inclusive).

Although N types of beams can be generated in each transmission/reception panel antenna in FIG. 63C, the present disclosure is not limited to this, and the number of beams that can be generated may be set in each transmission/reception panel antenna.

For example, 5 types of beams can be generated in transmission/reception panel antenna 1 labeled x705_1, and the gNB transmits broadcast frames in the first "time period to the fifth" time period. Further, 8 types of beams can be generated in transmission/reception panel antenna 2 labeled x705_2, and the gNB transmits broadcast frames in the first"time period to the eighth" time period, and so forth FIG. 63B illustrates an exemplary configuration of broadcast frame 6310_*xy* by transmit beam #xy illustrated in FIGS. 63A and 63C. Note that x is an integer from 1 to M (both inclusive), and y is an integer from 1 to N (both inclusive) in FIG. 63B.

It is assumed that broadcast frame 6310_*xy* is composed of, for example, control information 6321_*xy* and broadcast data 6322_*xy*.

At this time, "broadcast data 6322_11, broadcast data 6322_12, . . . , broadcast data 6322_1N", "broadcast data 6322_21, broadcast data 6322_22, . . . , broadcast data 6322_2N",

. . .

"broadcast data 6322_M1, broadcast data 6322_M2, . . . , broadcast data 6322_MN" include the same data, for example.

As another example, "broadcast data 6322_11, broadcast data 6322_12, . . . , broadcast data 6322_1N", "broadcast data 6322_21, broadcast data 6322_22, . . . , broadcast data 6322_2N",

. . .

"broadcast data 6322_M1, broadcast data 6322_M2, . . . , broadcast data 6322_MN" may be configured to include the same content although "the condition, such as a compression ratio and a configuration, is different".

Further, "broadcast data 6322_11, broadcast data 6322_12, . . . , broadcast data 6322_1N", "broadcast data 6322_21, broadcast data 6322_22, . . . , broadcast data 6322_2N",

. . .

"broadcast data 6322_M1, broadcast data 6322_M2, . . . , broadcast data 6322_MN" may include partially the same data.

Broadcast data 6322_*xy* is data to be transmitted to a plurality of terminals. For example, in FIG. 38, broadcast data 6322_*xy* is data transmitted by gNB 3800, and gNB 3800 is transmitted to "NR-UE #1 labeled 3801_1, NR-UE #2 labeled 3801_2, NR-UE #3 labeled 3801_3. NR-UE #4 labeled 3801_4, NR-UE #5 labeled 3801_5, NR-UE #6 labeled 3801_6, and NR-UE #7 labeled 3801_7" if possible.

"Control information 6322_11, control information 6322_12, . . . , control information 6322_1N", "control information 6322_21, control information 6322_22, . . . , control information 6322_2N", . . . , "control information 6322_M1, control information 6322_M2, . . . , control information 6322_MN" may include the same data or different data from each other.

Examples of "control information 6322_11, control information 6322_12, . . . , control information 6322_1N", "control information 6322_21, control information 6322_22, . . . , control information 6322_2N", . . . , "control information 6322_M1, control information 6322_M2, . . . , control information 6322_MN" include higher layer signaling. RRC, L1 signaling, DCI, broadcast information, SS/PBCH block, PBCH, etc., but the examples are not limited to these. Note that one of the features is to use "information and/or signal" other than synchronization signals (SS) as the control information.

Next, another example w % ill be described. FIGS. 38 and 55 are considered, for example, as a communication state of the gNB and NR-UE.

Figure 64:
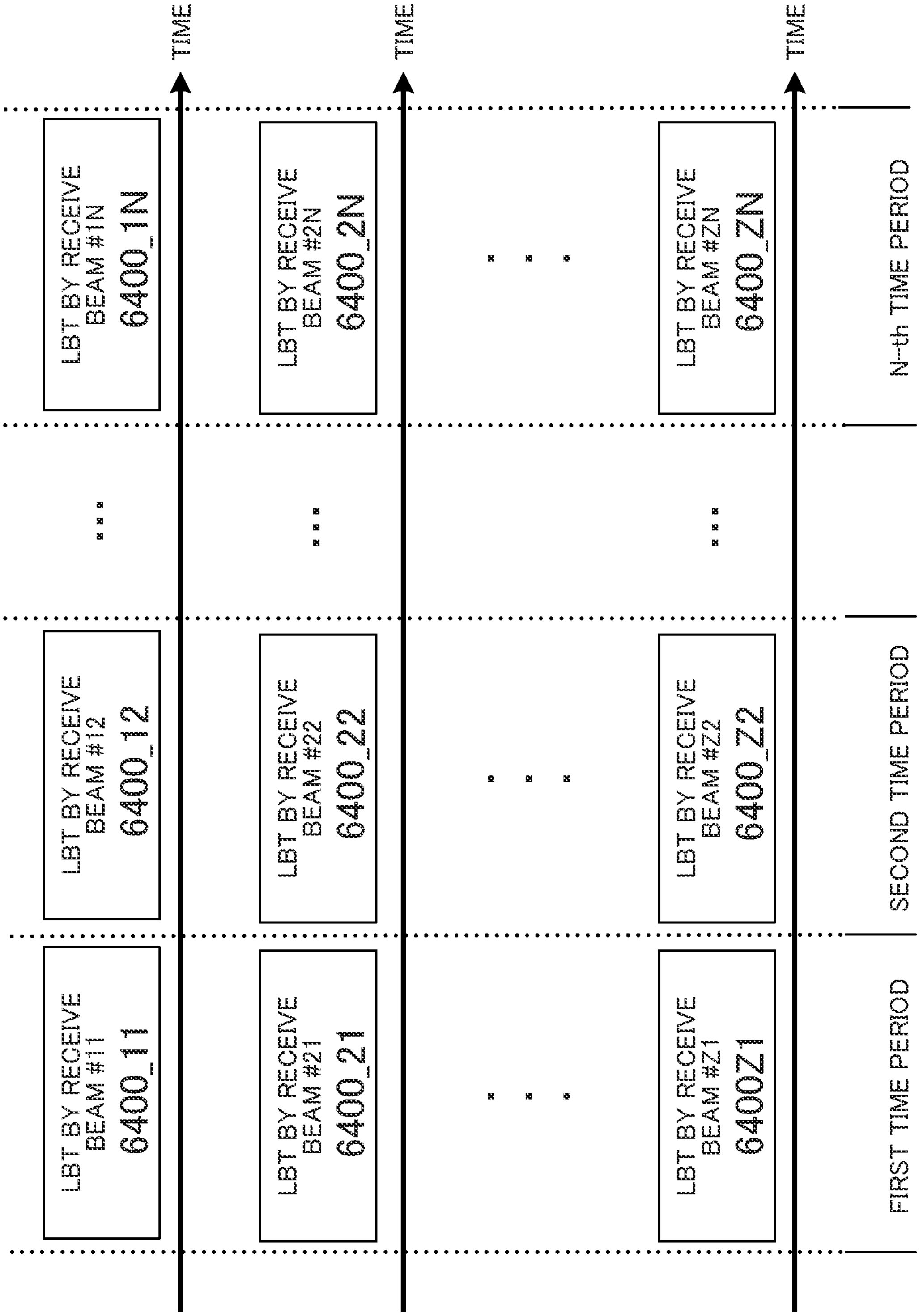
FIG. 64 illustrates LBT performed by gNB.

FIG. 64 illustrates the gNB performing LBT. Note that the horizontal axes represent time in FIG. 64.

It is assumed that the gNB includes the configuration in FIG. 40. The gNB with the configuration in FIG. 40 can, for example, generate a plurality of receive beams using transmission/reception antenna 1 labeled x805_1 to transmission/reception antenna m labeled x805_*m*. Here, the gNB can generate:

"receive beam #11, receive beam #12, . . . , receive beam #1N";

"receive beam #21, receive beam #22, . . . , receive beam #2N";

. . .

"receive beam #Z1, receive beam #Z2, . . . , receive beam #ZN". Note that N is an integer equal to or greater than 1 or an integer equal to or greater than 2. Z is an integer equal to or greater than 1 or an integer equal to or greater than 2.

Thus, the gNB with the configuration in FIG. 40 performs each LBT of "LBT 6400_11 by receive beam #11", "LBT 6400_12 by receive beam #12", . . . , "LBT 6400_1N by receive beam #1N".

In addition, the gNB with the configuration in FIG. 40 performs each LBT of "LBT 6400_21 by receive beam #21". "LBT 6400_22 by receive beam #22", . . . , "LBT 6400_2N by receive beam #2N".

. . . .

The gNB with the configuration in FIG. 40 also performs each LBT of "LBT 6400_Z1 by receive beam #Z1", "LBT 6400_Z2 by receive beam #Z2", . . . , "LBT 6400_ZN by receive beam #ZN".

That is, the gNB with the configuration in FIG. 40 performs each LBT of "LBT **6400_*i* by receive beam #i1", "LBT 6400_*i*2 by receive beam #i2", . . . "LBT 6400_1N** by receive beam #iN". Note that i is an integer from 1 to Z (both inclusive).

In this case, "LBT 6400_11 by receive beam #1l", "LBT 6400_21 by receive beam #21", . . . , "LBT 6400_Z1 by receive beam #Z1" are present in the first time period. That is, "LBT **6400_*k*1** by receive beam #k1" is present in the first time period. Note that k is an integer from 1 to Z (both inclusive).

"LBT 6400_12 by receive beam #12", "LBT 6400_22 by receive beam #22", . . . , "LBT 6400_Z2 by receive beam #Z2" are present in the second time period. That is, "LBT **6400_*k*2** by receive beam #k2" is present in the second time period. Note that k is an integer from 1 to Z (both inclusive).

. . . .

"LBT 6400_1N by receive beam #1N", "LBT 6400_2N by receive beam #2N", . . . , "LBT 6400_ZN by receive beam #ZN" are present in the N-th time period. That is. "LBT 6400_kN by receive beam #kN" is present in the N-th time period. Note that k is an integer from 1 to Z (both inclusive).

Thus, "LBT **6400_1*x* by receive beam #1x", "LBT 6400_2*x* by receive beam #2x", . . . , "LBT 6400_Zx by receive beam #Zx" are present in the x-th time period. That is, "LBT 6400_*kx*** by receive beam #kx" is present in the x-th time period. Note that k is an integer from 1 to Z (both inclusive). In addition, x is an integer from 1 to N (both inclusive).

LBT is performed at the same time using a plurality of receive beams and performing time division, and it is thus called an "LBT method using spatial division multiplexing (SDM) and TDM together", for example.

Note that, in FIG. 64, N types of beams can be generated in receive beam #1x, but the present disclosure is not limited to this. Likewise, N types of beams can be generated in receive beam #2x, but the present disclosure is not limited to this, . . . , N types of beams can be generated in receive beam #Zx, but the present disclosure is not limited to this.

The number of beams that can be generated may be set in each of receive beam #lx, receive beam #2x, . . . , receive beam #Zx.

For example, 5 types of beams can be generated in receive beam #1x, and the gNB performs LBT in the first time period to the fifth time period. Then, 8 types of beams can be generated in receive beam #2x, and the gNB performs LBT in the first time period to the eighth time period, and so forth.

FIGS. 38 and 55 are considered, for example, as a communication state of the gNB and NR-UE.

Figure 65A:
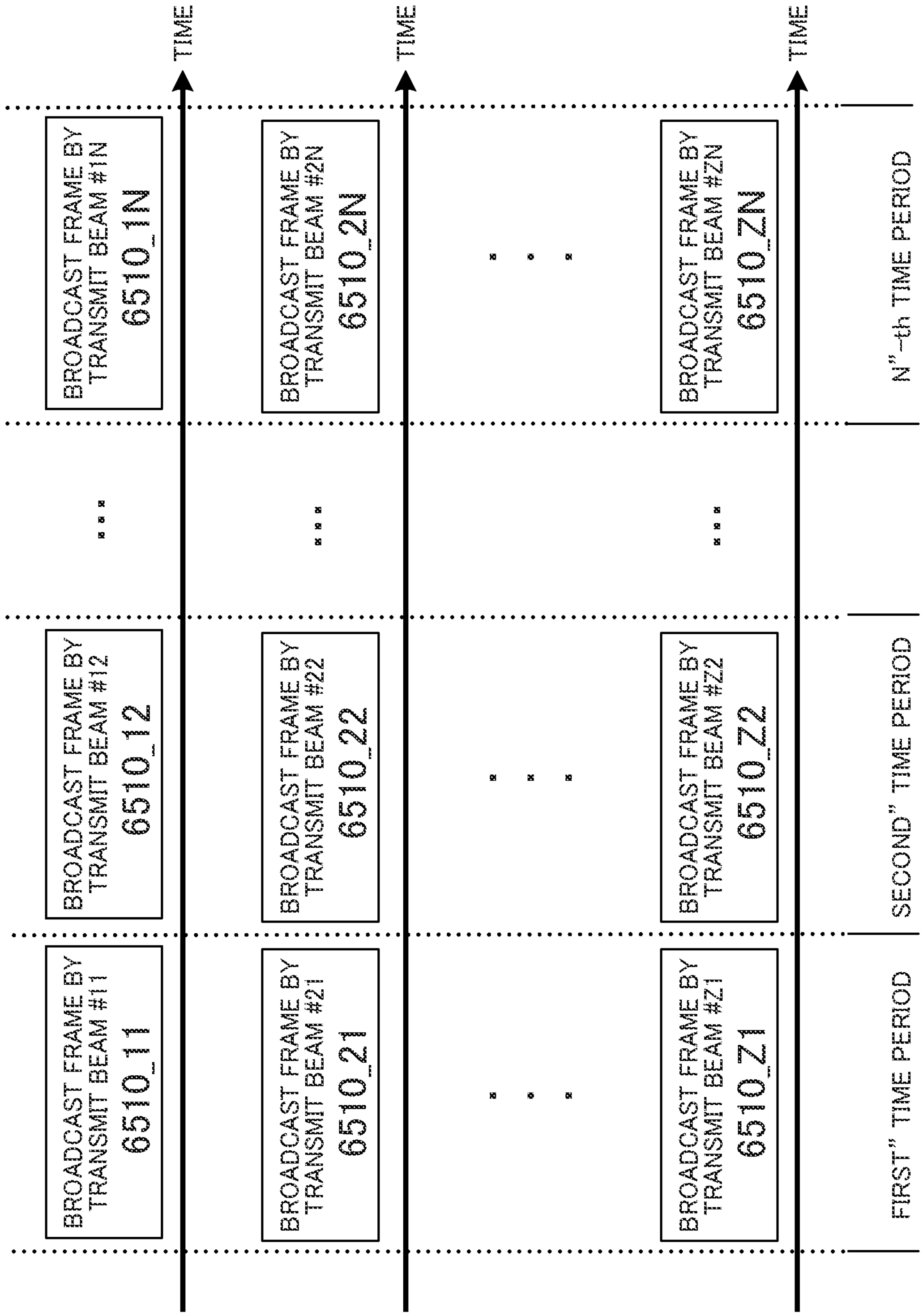
FIG. 65A illustrates broadcast frames transmitted by gNB.

FIG. 65A illustrates the gNB transmitting broadcast frames. Note that the horizontal axes represent time in FIG. 65A.

It is assumed that the gNB includes the configuration in FIG. 40. The gNB with the configuration in FIG. 40 can, for example, generate a plurality of receive beams using transmission/reception antenna 1 labeled x805_1 to transmission/reception antenna m labeled **x805_*m***. Here, the gNB can generate:

"transmit beam #11, transmit beam #12, . . . , transmit beam #1N",

"transmit beam #21, transmit beam #22, . . . , transmit beam #2N";

. . .

"transmit beam #Z1, transmit beam #Z2, . . . , transmit beam #ZN". Note that N is an integer equal to or greater than 1 or an integer equal to or greater than 2. Z is an integer equal to or greater than 1 or an integer equal to or greater than 2.

Thus, the gNB with the configuration in FIG. 40 transmits "broadcast frame 6510_11 by transmit beam #11", "broadcast frame 6510_12 by transmit beam #12", . . . , "broadcast frame 6510_1N by transmit beam #1N".

The gNB with the configuration in FIG. 40 also transmits "broadcast frame 6510_21 by transmit beam #21". "broadcast frame 6510_22 by transmit beam #22", . . . , "broadcast frame 6510_2N by transmit beam #2N".

. . . .

The gNB with the configuration in FIG. 40 transmits "broadcast frame 6510_Z1 by transmit beam #Z ". "broadcast frame 6510_Z2 by transmit beam #Z2" . . . , "broadcast frame 6510_ZN by transmit beam #ZN".

That is, the gNB with the configuration in FIG. 40 transmits "broadcast frame **6510_*i*1 by transmit beam #i1", "broadcast frame 6510_*i*2 by transmit beam #i2", . . . , "broadcast frame 6510_1**N by transmit beam #iN". In this case, i is an integer from 1 to Z (both inclusive).

At this time, "broadcast frame 6510_11 by transmit beam #11", "broadcast frame 6510_21 by transmit beam #21", . . . , "broadcast frame 6510_Z1 by transmit beam #Z1" are present in the first" time period. That is, "broadcast frame **6310_*k*1** by transmit beam #k1" is present in the first" time period. Note that k is an integer from 1 to Z (both inclusive).

"Broadcast frame 6510_12 by transmit beam #12", "broadcast frame 6510_22 by transmit beam #22" . . . , "broadcast frame 6510_Z2 by transmit beam #Z2" are present in the second" time period. That is, "broadcast frame **6510_*k*2** by transmit beam #k2" is present in the second" time period. Note that k is an integer from 1 to Z (both inclusive).

. . . .

"Broadcast frame 6510_1N by transmit beam #1N", "broadcast frame 6510_2N by transmit beam #2N", . . . "broadcast frame 6510_ZN by transmit beam #ZN" are present in the N"-th time period. That is. "broadcast frame 6510_kN by transmit beam #kN" is present in the N"-th time period. Note that k is an integer from 1 to Z (both inclusive).

Thus, "broadcast frame **6510_1*x* by transmit beam #1x", "broadcast frame 6510_2*x* by transmit beam #2x", . . . , "broadcast frame 6510_Zx by transmit beam #Zx" are present in the x"-th time period. That is, "broadcast frame 6510_*kx*** by transmit beam #kx" is present in the x"-th time period. Note that k is an integer from 1 to Z (both inclusive). In addition, x is an integer from 1 to N (both inclusive).

An exemplary supplementary operation will be described.

For example, the gNB performs LBT in each of "LBT 6400_11 by receive beam #11". "LBT 6400_12 by receive beam #12", . . . , "LBT 6400_1N by receive beam #1N" in FIG. 64.

At this time, it is assumed that the gNB has detected a signal in "LBT 6400_11 by receive beam #11", for example. Then, the gNB does not transmit "broadcast frame 6510_11 by transmit beam #11" in FIG. 65A.

It is assumed that the gNB has detected no signal in "LBT 6400_12 by receive beam #12". Then, the gNB transmits "broadcast frame 6510_12 by transmit beam #12" in FIG. 65A.

. . . .

It is assumed that the gNB has detected no signal in "LBT 6400_1N by receive beam #1N". Then, the gNB transmits "broadcast frame 6510_1N by transmit beam #1N" in FIG. 65A.

The gNB performs LBT in each of "LBT 6400_21 by receive beam #21", "LBT 6400_22 by receive beam #22", . . . , "LBT 6400_2N by receive beam #2N" in FIG. 64.

At this time, it is assumed that the gNB has detected no signal in "LBT 6400_21 by receive beam #21", for example. Then, the gNB transmits "broadcast frame 6510_21 by transmit beam #21" in FIG. 65A.

It is assumed that the gNB has detected a signal in "LBT 6400_22 by receive beam #22". Then, the gNB does not transmit "broadcast frame 6510_22 by transmit beam #22" in FIG. 65A.

. . . .

It is assumed that the gNB has detected no signal in "LBT 6400_2N by receive beam #2N". Then, the gNB transmits "broadcast frame 6510_2N by transmit beam #2N" in FIG. 65A.

. . . .

The gNB performs LBT in each of "LBT 6400_Z1 by receive beam #Z", "LBT 6400_Z2 by receive beam #Z2", . . . , "LBT 6400_ZN by receive beam #ZN" among "receive beam #Z1, receive beam Z2, . . . , receive beam #ZN" in FIG. 64.

At this time, it is assumed that the gNB has detected no signal in "LBT 6400_Z1 by receive beam #Z1", for example. Then, the gNB transmits "broadcast frame 6510_Z1 by transmit beam #Z1" in FIG. 65A.

It is assumed that the gNB has detected no signal in "LBT 6400_Z2 by receive beam #Z2". Then, the gNB transmits "broadcast frame 6510_Z2 by transmit beam #Z2" in FIG. 65A.

. . . .

It is assumed that the gNB has detected no signal in "LBT 6400_ZN by receive beam #ZN". Then, the gNB transmits "broadcast frame 6510_ZN by transmit beam #ZN" in FIG. 65A.

That is, LBT is performed in "LBT 6400_*ix* by receive beam #ix," in FIG. 64.

When detecting no signal in "LBT 6400_*ix* by receive beam #ix,", the gNB transmits "broadcast frame 6510_*ix* by transmit beam #ix" in FIG. 65A.

When detecting a signal in "LBT 6400_*ix* by receive beam #ix,", the gNB does not transmit "broadcast frame 6510_*ix* by transmit beam #ix" in FIG. 65A.

Note that i is an integer from 1 to Z (both inclusive) and x is an integer from 1 to N (both inclusive).

In FIG. 65A, broadcast frames are present at the same time using a plurality of receive beams and are transmitted by performing time division, and it is thus called a "broadcast frame configuration method using spatial division multiplexing (SDM) and TDM together", for example.

In FIG. 65A, N types of beams can be generated in transmit beam #1x, but the present disclosure is not limited to this. Likewise, N types of beams can be generated in transmit beam #2x, but the present disclosure is not limited to this, . . . , N types of beams can be generated in transmit beam #Zx, but the present disclosure is not limited to this.

The number of beams that can be generated may be set in each of transmit beam #1x, transmit beam #2x, . . . , transmit beam #Zx.

For example, 5 types of beams can be generated in transmit beam #1x, and the gNB transmits broadcast frames in the first"time period to the fifth" time period. Then, 8 types of beams can be generated in transmit beam #2x, and the gNB transmits broadcast frames in the first"time period to the eighth" time period, and so forth.

Another exemplary operation will be described.

Figure 65B:
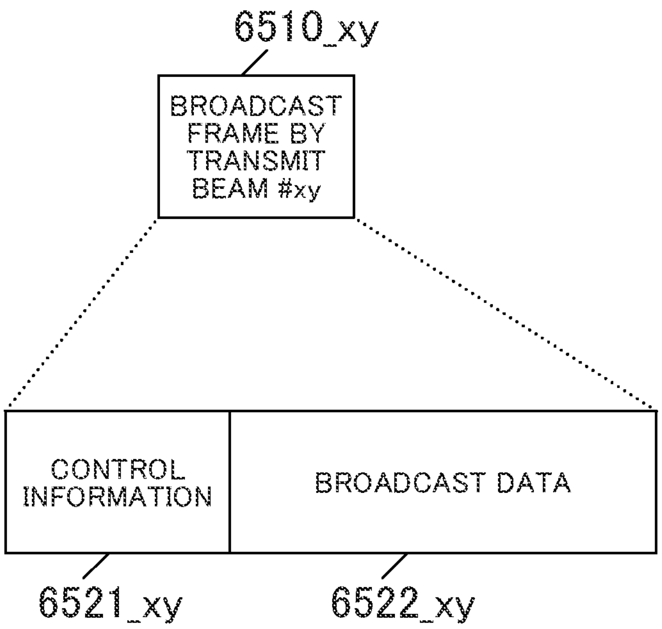
FIG. 65B illustrates an exemplary configuration of the broadcast frames.
Figure 65C:
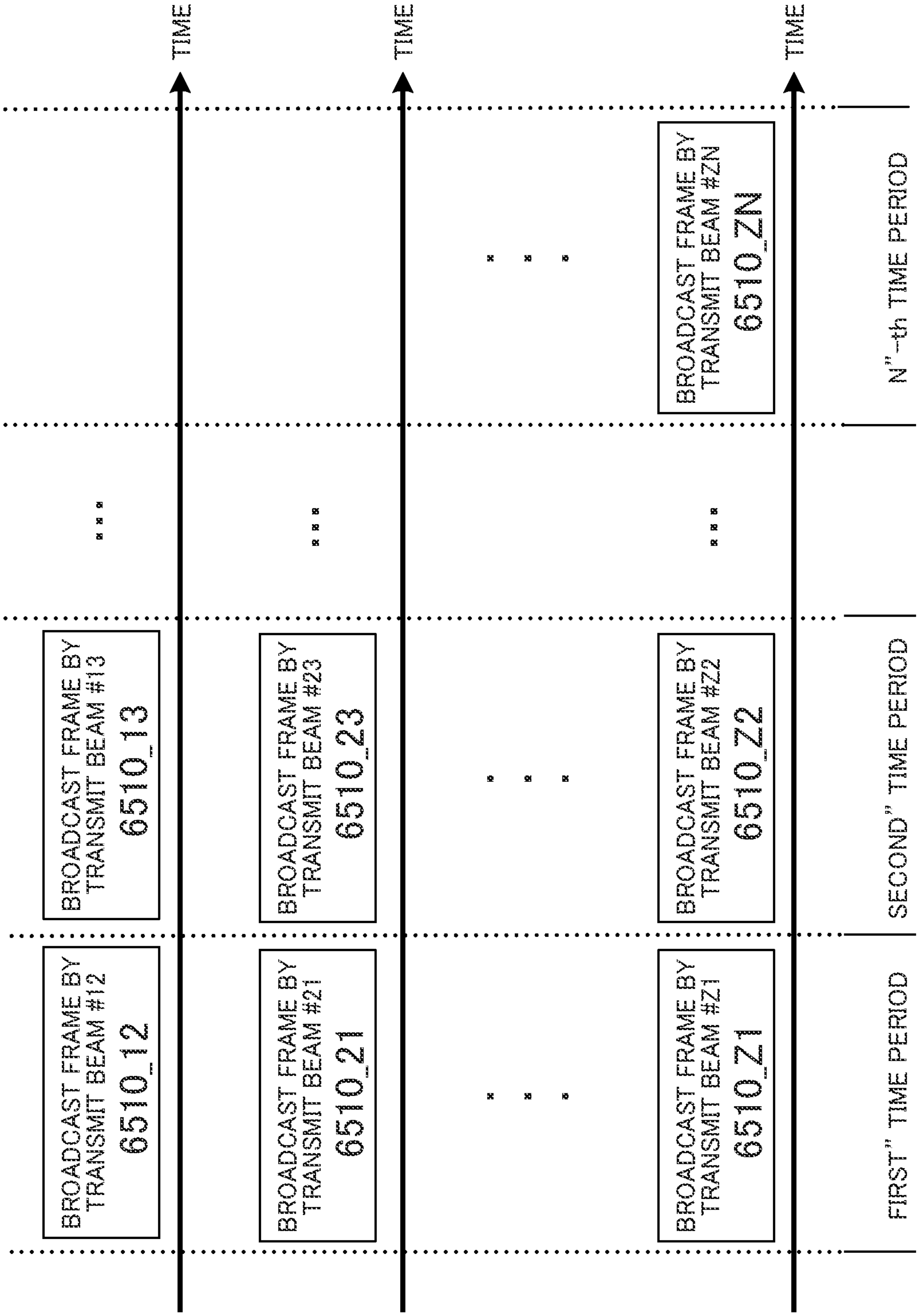
FIG. 65C illustrates a variation of FIG. 65A.

FIG. 65C is a variation of FIG. 65A, and in FIG. 65C, components that operate in the same manner as in FIG. 65A are denoted by the same reference signs. Note that the horizontal axes represent time in FIG. 65C.

For example, the gNB performs LBT in each of "LBT 6400_11 by receive beam #11". "LBT 6400_12 by receive beam #12", . . . , "LBT 6400_1N by receive beam #1N" among "receive beam #11, receive beam #12, . . . , receive beam #1N" in FIG. 64.

At this time, it is assumed that the gNB has detected a signal in "LBT 640)_11 by receive beam #11", for example. Then. "broadcast frame 6510_11 by transmit beam #11" is not present as in FIG. 65C, and the gNB does not transmit "broadcast frame 6510_11 by transmit beam #11".

It is assumed that the gNB has detected no signal in "LBT 6400_12 by receive beam #12". Then, the gNB transmits "broadcast frame 6510_12 by transmit beam #12" as in FIG. 65C.

. . . .

The gNB performs LBT in each of "LBT 6400_21 by receive beam #21", "LBT 6400_22 by receive beam #22", . . . , "LBT 6400_2N by receive beam #2N" among "receive beam #21, receive beam #22, . . . , receive beam #2N" in FIG. 64.

At this time, it is assumed that the gNB has detected no signal in "LBT 6400_21 by receive beam #21", for example. Then, the gNB transmits "broadcast frame 6510_21 by transmit beam #21" as in FIG. 65C.

It is assumed that the gNB has detected a signal in "LBT 6400_22 by receive beam #22". Then, "broadcast frame 6310_22 by transmit beam #22" is not present as in FIG. 65C, and the gNB does not transmit "broadcast frame 6510_22 by transmit beam #22" as in FIG. 65C.

. . . .

The gNB performs LBT in each of "LBT 6400_Z1 by receive beam #Z1", "LBT 6400_Z2 by receive beam #Z2", . . . , "LBT 6400_ZN by receive beam #ZN" among "receive beam #Z1, receive beam Z2, . . . , receive beam #ZN" in FIG. 64.

At this time, it is assumed that the gNB has detected no signal in "LBT 6400_Z1 by receive beam #Z1", for example. Then, the gNB transmits "broadcast frame 6510_Z1 by transmit beam #Z1" as in FIG. 65C.

It is assumed that the gNB has detected no signal in "LBT 6400_Z2 by receive beam #Z2". Then, the gNB transmits "broadcast frame 6510_Z2 by transmit beam #Z2" as in FIG. 65C.

. . . , it is assumed that the gNB has detected no signal in "LBT 6400_ZN by receive beam #ZN". Then, the gNB transmits "broadcast frame 6510_ZN by transmit beam #ZN" as in FIG. 65C.

That is, LBT is performed in "LBT 6400_*ix* by receive beam #ix," in FIG. 64.

When detecting no signal in "LBT 6400_*ix* by receive beam #ix,", the gNB transmits "broadcast frame 6510_*ix* by transmit beam #ix" in FIG. 65C.

When the gNB detects a signal in "LBT 6400_*ix* by receive beam #ix," "broadcast frame 6510_*ix* by transmit beam #ix" is not present in FIG. 65C, and the gNB does not transmit "broadcast frame 6510_*ix* by transmit beam #ix".

Note that i is an integer from 1 to Z (both inclusive) and x is an integer from 1 to N (both inclusive).

In FIG. 65C, N types of beams can be generated in transmit beam #1x, but the present disclosure is not limited to this. Likewise, N types of beams can be generated in transmit beam #2x, but the present disclosure is not limited to this, . . . , N types of beams can be generated in transmit beam #Zx, but the present disclosure is not limited to this.

The number of beams that can be generated may be set in each of transmit beam #1x, transmit beam #2x, . . . , transmit beam #Zx.

For example, 5 types of beams can be generated in transmit beam #1x, and the gNB transmits broadcast frames in the first"time period to the fifth" time period. Then, 8 types of beams can be generated in transmit beam #2x, and the gNB transmits broadcast frames in the first"time period to the eighth" time period, and so forth.

FIG. 65B illustrates an exemplary configuration of broadcast frame 6510_*xy* by transmit beam #xy illustrated in FIGS. 65A and 65C. Note that x is an integer from 1 to M (both inclusive), and y is an integer from 1 to N (both inclusive) in FIG. 65B.

It is assumed that broadcast frame 6510_*xy* is composed of, for example, control information 6521_*xy* and broadcast data 6522_*xy*.

At this time. "broadcast data 6522_11, broadcast data 6522_12, . . . , broadcast data 6522_1N", "broadcast data 6522_21, broadcast data 6522_22, . . . , broadcast data 6522_2N", . . . , "broadcast data 6522_M1, broadcast data 6522_M2, . . . , broadcast data 6522_MN" include the same data, for example.

As another example, "broadcast data 6522_11, broadcast data 6522_12, . . . , broadcast data 6522_N", "broadcast data 6522_21, broadcast data 6522_22, . . . , broadcast data 6522_2N", . . . , "broadcast data 6522_M1, broadcast data 6522_M2, . . . , broadcast data 6522_MN" may be configured to include the same content although "the condition, such as a compression ratio and a configuration, is different".

Further, "broadcast data 6522_11, broadcast data 6522_12, . . . , broadcast data 6522_1N", "broadcast data 6522_21, broadcast data 6522_22, . . . , broadcast data 6522_2N", . . . , "broadcast data 6522_M1, broadcast data 6522_M2, . . . , broadcast data 6522_MN" may include partially the same data.

Broadcast data 6522_*xy* is data to be transmitted to a plurality of terminals. For example, in FIG. 38, broadcast data 6522_*xy* is data transmitted by gNB 3800, and gNB 3800 is transmitted to "NR-UE #1 labeled 3801_1, NR-UE #2 labeled 3801_2, NR-UE #3 labeled 3801_3, NR-UE #4 labeled 3801_4, NR-UE #5 labeled 3801_5. NR-UE #6 labeled 3801_6, and NR-UE #7 labeled 3801_7" if possible.

"Control information 6522_11, control information 6522_12, . . . , control information 6522_1N", "control information 6522_21, control information 6522_22, . . . , control information 6522_2N", . . . , "control information 6522_M1, control information 6522_M2, . . . , control information 6522_MN" may include the same data or different data from each other.

Examples of "control information 6522_11, control information 6522_12, . . . , control information 6522_1N", "control information 6522_21, control information 6522_22, . . . , control information 6522_2N", . . . , "control information 6522_M1, control information 6522_M2, . . . , control information 6522_MN" include higher layer signaling, RRC, L1 signaling, DCI, broadcast information, SS/PBCH block, PBCH, etc., but the examples are not limited to these. Note that one of the features is to use "information and/or signal" other than synchronization signals (SS) as the control information.

This produces an effect of transmitting broadcast frames using resources for communication, such as time, frequency, and space, effectively.

Next, still another example will be described. FIGS. 38 and 55 are considered, for example, as a communication state of the gNB and NR-UE.

Figure 66A:
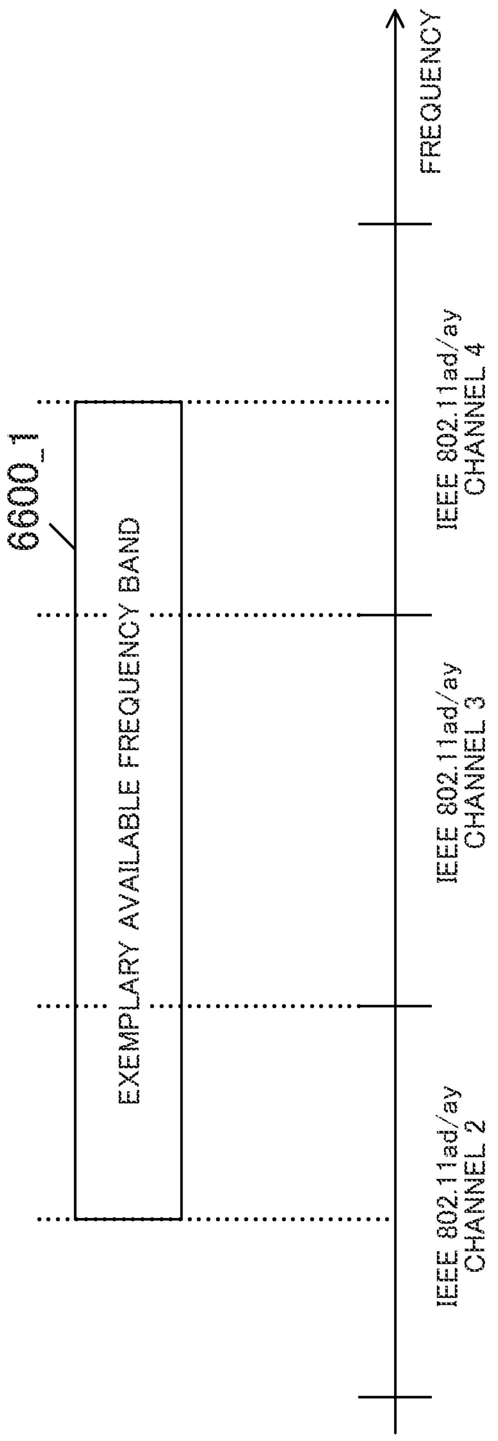
FIG. 66A illustrates an exemplary frequency band used by gNB to transmit a modulation signal.

FIG. 66A illustrates an exemplary frequency band used by the gNB to transmit a modulation signal, for example. The horizontal axis represents frequency in FIG. 66A.

For example, in FIG. 66A, "IEEE 802.11ad/IEEE 802.11ay channel 2", "IEEE 802.11ad/IEEE 802.11ay channel 3", and "IEEE 802.11ad/IEEE 802.11ay channel 4" are present. A case will be considered where the gNB can transmit a modulation signal using "exemplary available frequency band 6600_1" when transmitting a modulation signal. Note that "IEEE 802.11ad/IEEE 802.11ay channel 3" is included in "exemplary available frequency band 6600_1", part of "IEEE 802.11ad/IEEE 802.11ay channel 2" is included in "exemplary available frequency band 6600_1", and part of "IEEE 802.11 ad/IEEE 802.11 ay channel 4" is included in "exemplary available frequency band 6600_1". "Exemplary available frequency band 6600_1", however, is not limited to the example in FIG. 66A.

Figure 66B:
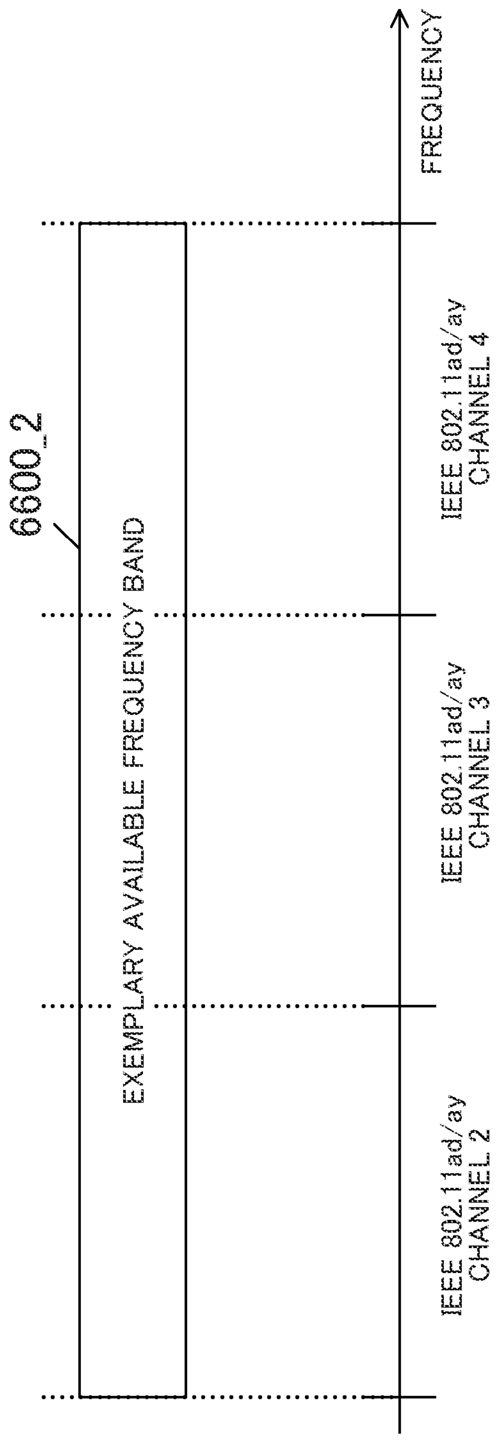
FIG. 66B illustrates an exemplary frequency band used by gNB to transmit a modulation signal.

FIG. 66B illustrates an "exemplary frequency band used by the gNB to transmit a modulation signal" other than that in FIG. 66A. The horizontal axis represents frequency in FIG. 66B.

For example, in FIG. 66B, "IEEE 802.11ad/IEEE 802.11ay channel 2", "IEEE 802.11ad/IEEE 802.11ay channel 3", and "IEEE 802.11ad/IEEE 802.11ay channel 4" are present.

A case will be considered where the gNB can transmit a modulation signal using "exemplary available frequency band 6600_2" when transmitting a modulation signal. Note that "IEEE 802.11ad/IEEE 802.11ay channel 3" is included in "exemplary available frequency band 6600_2", "IEEE 802.11ad/IEEE 802.11ay channel 2" is included in "exemplary available frequency band 6600_2", and "IEEE 802.11ad/IEEE 802.11ay channel 4" is included in "exemplary available frequency band 6600_2". "Exemplary available frequency band 6600_2", however, is not limited to the example in FIG. 66B.

Figure 67A:
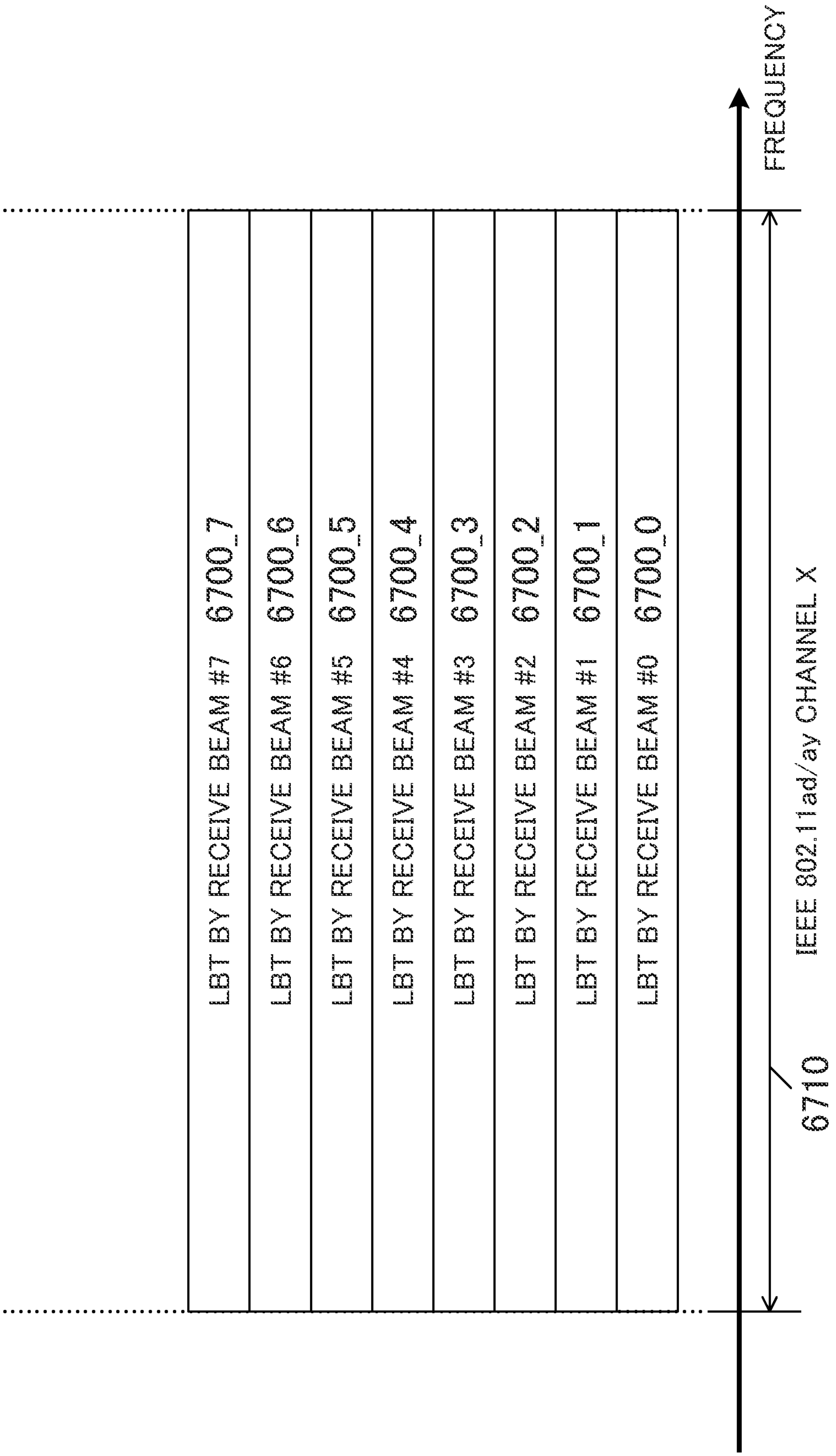
FIG. 67A illustrates LBT performed in an IEEE 802.11ad/IEEE 802.11ay channel.

FIG. 67A illustrates LBT performed in IEEE 802.11ad/IEEE 802.11ay channel X, and the horizontal axis represents frequency. Note that X is an integer, for example. Here, a description will be given of an exemplary case where "the gNB can generate 8 beams of receive beam #0 to receive beam #7 as in FIG. 47".

As illustrated in FIG. 67A, IEEE 802.11ad/IEEE 802.11ay channel X has a frequency band of frequency band 6710.

The example in FIG. 67A is an example where "frequency band 6710 of IEEE 802.11ad/IEEE 802.11ay channel X" and the frequency band of "LBT by receive beam #i" 6700_*i* are equal, or "frequency band 6710 of IEEE 802.11ad/IEEE 802.11ay channel X" includes the frequency band of "LBT by receive beam #i" 6700_*i*. Note that i is an integer from 0 to 7 (both inclusive).

The gNB can perform LBT of "LBT by receive beam #0" 6700_0 in IEEE 802.11ad/IEEE 802.11ay channel X. Note that when performing LBT of "LBT by receive beam #0" 6700_0, the gNB uses receive beam #0 labeled 4700_0 in FIG. 47.

In addition, the gNB can perform LBT of "LBT by receive beam #1" 6700_1 in IEEE 802.11ad/IEEE 802.11ay channel X. Note that when performing LBT of "LBT by receive beam #1" 6700_1, the gNB uses receive beam #1 labeled 4700_1 in FIG. 47.

. . . .

That is, the gNB can perform LBT of "LBT by receive beam #i" 6700_*i* in IEEE 802.11ad/IEEE 802.11ay channel X. Note that when performing LBT of "LBT by receive beam #i" 6700_*i*, the gNB uses receive beam #i labeled 4700_*i* in FIG. 47. Note that i is an integer from 0 to 7 (both inclusive).

Figure 67B:
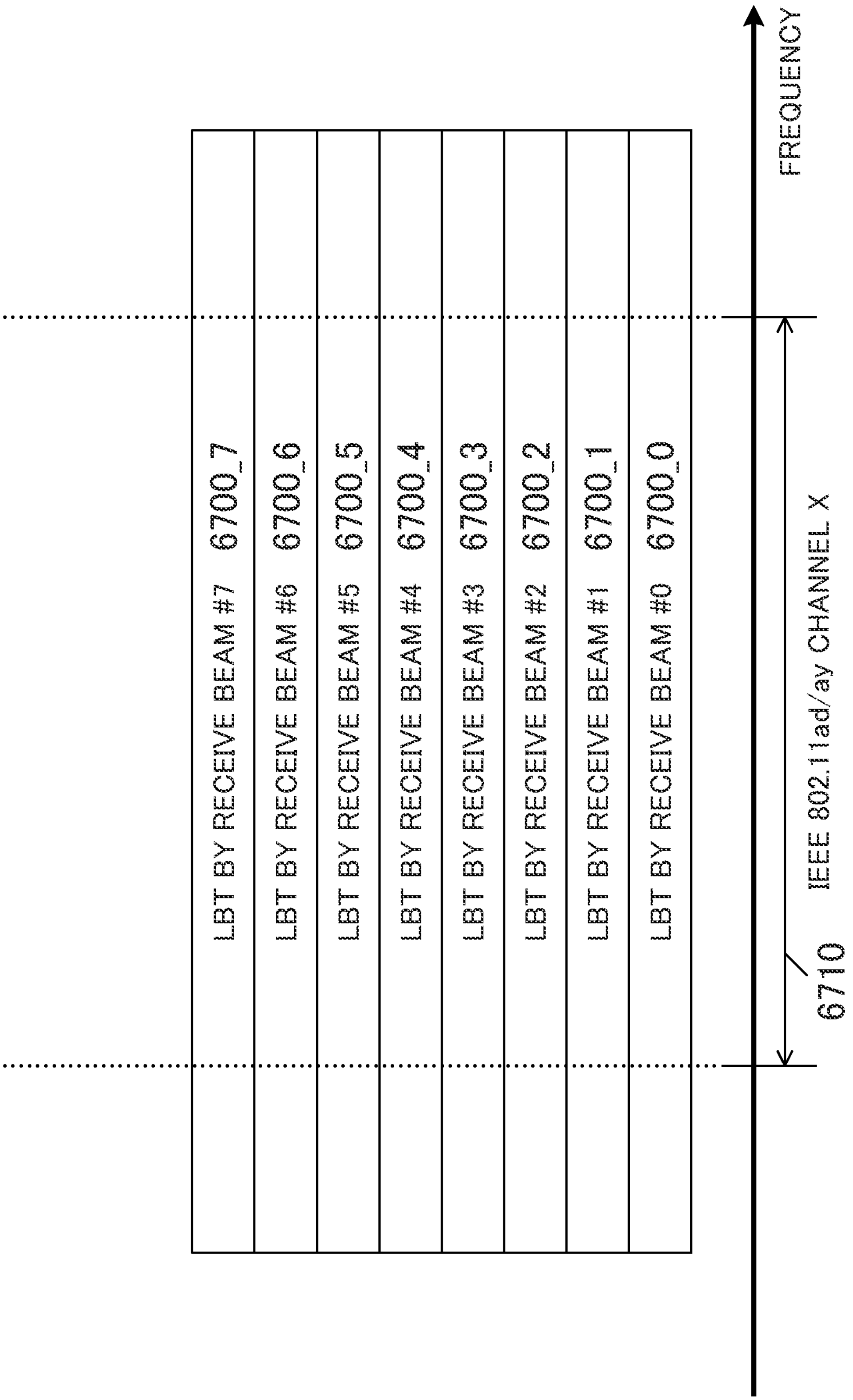
FIG. 67B illustrates LBT performed in the IEEE 802.11ad/IEEE 802.11ay channel.

FIG. 67B illustrates LBT performed in IEEE 802.11ad/IEEE 802.11ay channel X and its neighboring frequencies other than that in FIG. 67A, and the horizontal axis represents frequency. Note that X is an integer, for example. Here, a description will be given of an exemplary case where "the gNB can generate 8 beams of receive beam #0 to receive beam #7 as in FIG. 47".

As illustrated in FIG. 67B, IEEE 802.11ad/IEEE 802.11ay channel X has a frequency band of frequency band 6710.

The example in FIG. 67B is an example where the frequency band of IEEE "LBT by receive beam #i" 6700_*i* includes "frequency band 6710 of IEEE 802.11ad/IEEE 802.11ay channel X". Note that i is an integer from 0 to 7 (both inclusive).

The gNB can perform LBT of "LBT by receive beam #0" 6700_0 in IEEE 802.11ad/IEEE 802.11ay channel X and its neighboring frequencies. Note that when performing LBT of "LBT by receive beam #0" 6700_0, the gNB uses receive beam #0 labeled 4700_0 in FIG. 47.

In addition, the gNB can perform LBT of "LBT by receive beam #1" 6700_1 in IEEE 802.11ad/IEEE 802.11ay channel X and its neighboring frequencies. Note that when performing LBT of "LBT by receive beam #1" 6700_1, the gNB uses receive beam #1 labeled 4700_1 in FIG. 47.

. . . .

Thus, the gNB can perform LBT of "LBT by receive beam #i" 6700_*i* in IEEE 802.11ad/IEEE 802.11ay channel X and its neighboring frequencies. Note that when performing LBT of "LBT by receive beam #i" 6700_*i*, the gNB uses receive beam #i labeled 4700_*i* in FIG. 47. Note that i is an integer from 0 to 7 (both inclusive).

Figure 67C:
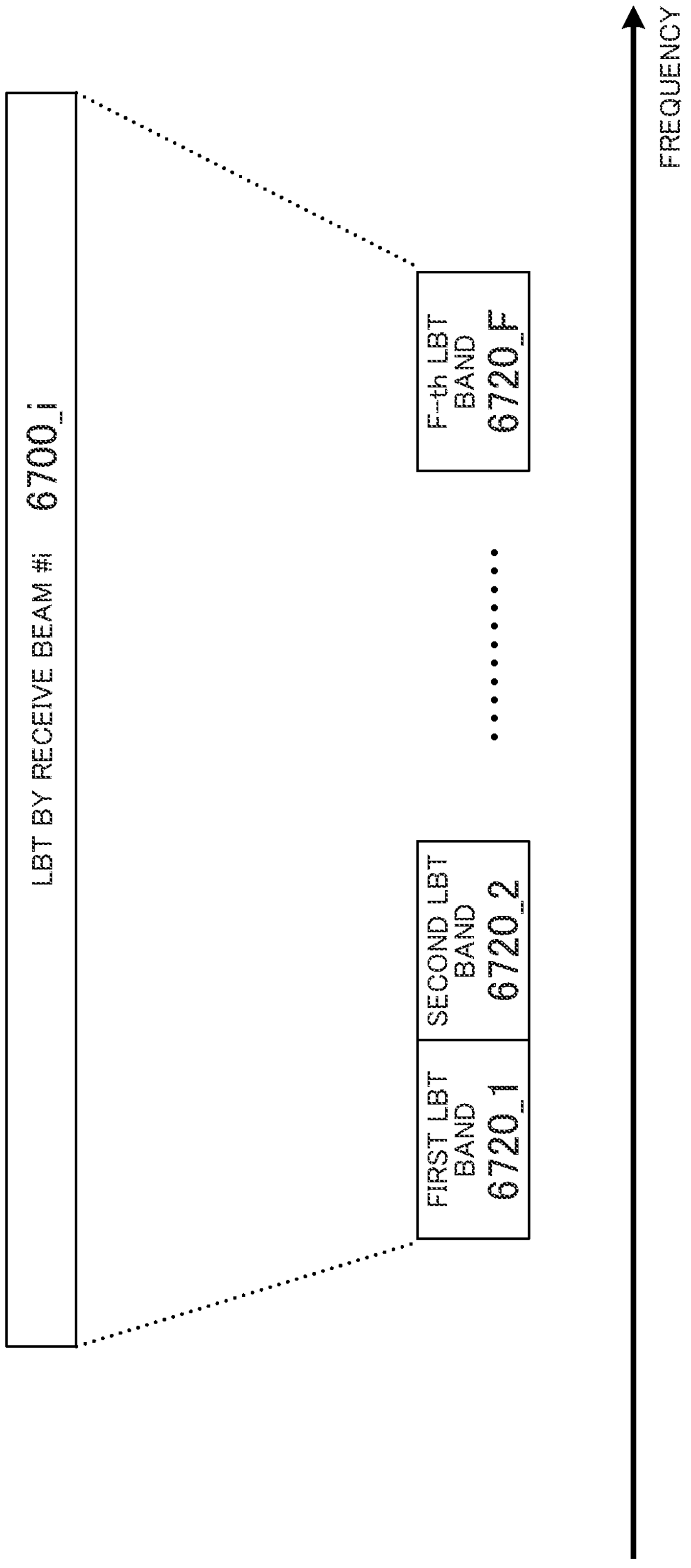
FIG. 67C illustrates exemplary frequency band division for LBT.

FIG. 67C illustrates exemplary frequency band division for LBT in "LBT by receive beam #i" 6700_*i* in FIGS. 67A and 67B. Note that, in FIG. 67C, the horizontal axis represents frequency, and i is an integer from 0 to 7 (both inclusive).

As in FIG. 67C, "first LBT band 6720_1", "second LBT band 6720_2", . . . , "F-th LBT band 6720_F" are aligned in the frequency axis direction in "LBT by receive beam #i" 6700_*i*. Note that F is an integer equal to or greater than 1 or an integer equal to or greater than 2.

That is, "LBT by receive beam #i" 6700_*i* includes "k-th LBT band 6720_*k*". Note that k is an integer from 1 to F (both inclusive).

At this time, in "first LBT band 6720_1" in "LBT by receive beam #i" 6700_*i*, the gNB checks whether a signal is present in the frequency band included in "first LBT band 6720_". When a signal is present, the gNB does not perform modulation signal transmission for the frequency band included in "first LBT band 6720_1". When no signal is present, the gNB performs modulation signal transmission for the frequency band included in "first LBT band 67201". Note that the details will be described later.

In "second LBT band 6720_2" in "LBT by receive beam #i" 6700_*i*, the gNB checks whether a signal is present in the frequency band included in "second LBT band 6720_2". When a signal is present, the gNB does not perform modulation signal transmission for the frequency band included in "second LBT band 6720_2". When no signal is present, the gNB performs modulation signal transmission for the frequency band included in "second LBT band 6720_2". Note that the details will be described later.

. . . .

In "F-th LBT band 6720_F" in "LBT by receive beam #i" 6700_*i*, the gNB checks whether a signal is present in the frequency band included in "F-th LBT band 6720_F". When a signal is present, the gNB does not perform modulation signal transmission for the frequency band included in "F-th LBT band 6720_F". When no signal is present, the gNB performs modulation signal transmission for the frequency band included in "F-th LBT band 6720_F". Note that the details will be described later.

That is, in "k-th LBT band 6720_*k*" in "LBT by receive beam #i" 6700_*i*, the gNB checks whether a signal is present in the frequency band included in "k-th LBT band 6720_*k*". When a signal is present, the gNB does not perform modulation signal transmission for the frequency band included in "k-th LBT band 6720_*k*". When no signal is present, the gNB performs modulation signal transmission for the frequency band included in "k-th LBT band 6720_*k*". Details will be described later. Note that k is an integer from 1 to F (both inclusive). Note that i is an integer from 0 to 7 (both inclusive).

Figure 68A:
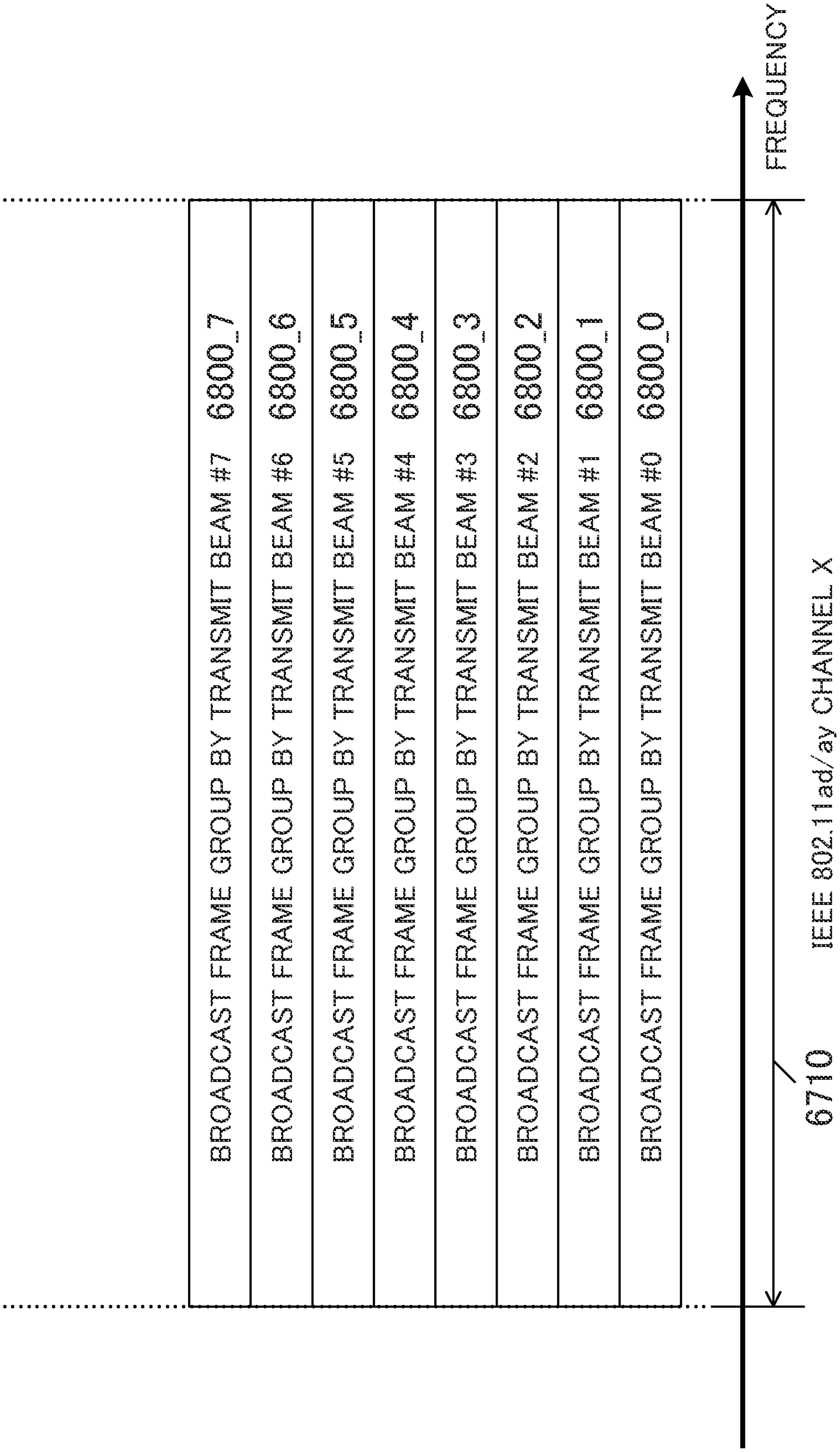
FIG. 68A illustrates broadcast frame groups in the IEEE 802.11ad/IEEE 802.11ay channel.

FIG. 68A illustrates broadcast frame groups in IEEE 802.11ad/IEEE 802.11ay channel X, and the horizontal axis represents frequency. Note that X is an integer, for example. Here, a description will be given of an exemplary case where "the gNB can generate 8 beams of transmit beam #0 to transmit beam #7 as in FIG. 45".

As illustrated in FIG. 68A, IEEE 802.11ad/IEEE 802.11ay channel X has a frequency band of frequency band 6710, as in FIG. 67A.

The example in FIG. 68A is an example where "frequency band 6710 of IEEE 802.11ad/IEEE 802.11ay channel X" and the frequency band of "broadcast frame group by transmit beam #i" 6800_*i* are equal, or "frequency band 6710 of IEEE 802.11ad/IEEE 802.11ay channel X" includes the frequency band of "broadcast frame group by transmit beam #i" 6800_*i*. Note that i is an integer from 0 to 7 (both inclusive).

The gNB can transmit "broadcast frame group by transmit beam #0" 6800_0 in IEEE 802.11ad/IEEE 802.11ay channel X. Note that the gNB uses transmit beam #0 labeled 4500_0 in FIG. 45 when transmitting "broadcast frame group by transmit beam #0" 6800_0.

In addition, the gNB can transmit "broadcast frame group by transmit beam #1" 6800_1 in IEEE 802.11ad/IEEE 802.11ay channel X. Note that the gNB uses transmit beam

#1 labeled 4500_1 in FIG. 45 when transmitting "broadcast frame group by transmit beam #1" 6800_1.

. . . .

That is, the gNB can transmit "broadcast frame group by transmit beam #i" 6800__i_ in IEEE 802.11ad/IEEE 802.11ay channel X. Note that the gNB uses transmit beam #i labeled 4500__i_ in FIG. 45 when transmitting "broadcast frame group by transmit beam #i" 6800__i_. Note that i is an integer from 0 to 7 (both inclusive).

Figure 68B:
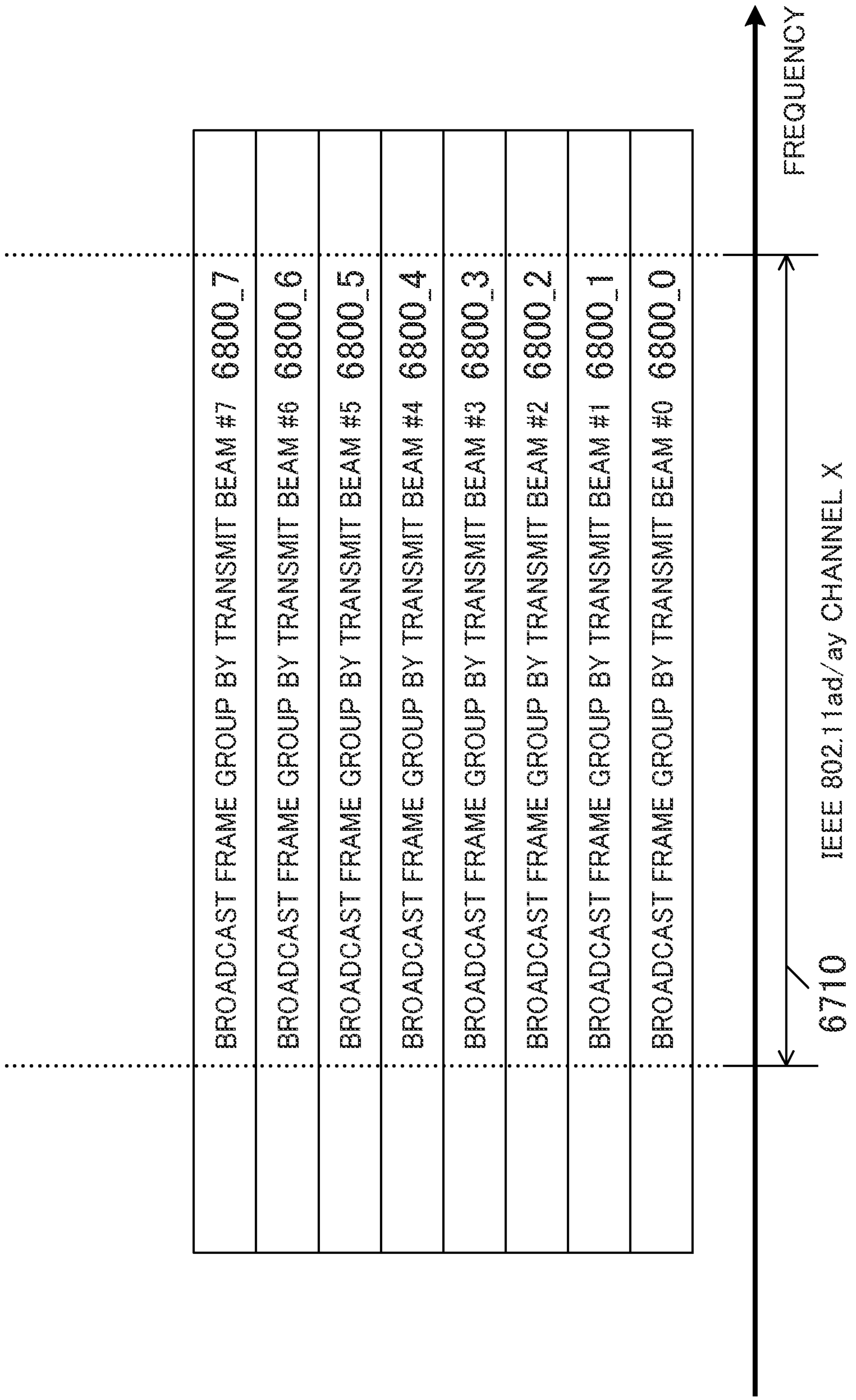
FIG. 68B illustrates broadcast frame groups in the IEEE 802.11ad/IEEE 802.11ay channel.

FIG. 68B illustrates broadcast frame groups in IEEE 802.11ad/IEEE 802.11ay channel X other than that in FIG. 68A, and the horizontal axis represents frequency. Note that X is an integer, for example. Here, a description will be given of an exemplary case where "the gNB can generate 8 beams of transmit beam #0 to transmit beam #7 as in FIG. 45".

As illustrated in FIG. 68B, IEEE 802.11ad/IEEE 802.11ay channel X has a frequency band of frequency band 6710.

The example in FIG. 68B is an example where "frequency band 6710 of IEEE 802.11ad/IEEE 802.11ay channel X" and the frequency band of "broadcast frame group by transmit beam #i" 6800__i_ includes "frequency band 6710 of IEEE 802.11ad/IEEE 802.11ay channel X". Note that i is an integer from 0 to 7 (both inclusive).

The gNB can transmit "broadcast frame group by transmit beam #0" 6800_0 in IEEE 802.11ad/IEEE 802.11ay channel X and its neighboring frequencies. Note that the gNB uses transmit beam #0 labeled 4500_0 in FIG. 45 when transmitting "broadcast frame group by transmit beam #0" 6800_0.

In addition, the gNB can transmit "broadcast frame group by transmit beam #1" 6800_1 in IEEE 802.11ad/IEEE 802.11ay channel X and its neighboring frequencies. Note that the gNB uses transmit beam #1 labeled 4500_1 in FIG. 45 when transmitting "broadcast frame group by transmit beam #1" 6800_1.

. . . .

That is, the gNB can transmit "broadcast frame group by transmit beam #i" 6800__i_ in IEEE 802.11ad/IEEE 802.11ay channel X and its neighboring frequencies. Note that the gNB uses transmit beam #i labeled 4500__i_ in FIG. 45 when transmitting "broadcast frame group by transmit beam #i" 6800__i_. Note that i is an integer from 0 to 7 (both inclusive).

Figure 68C:
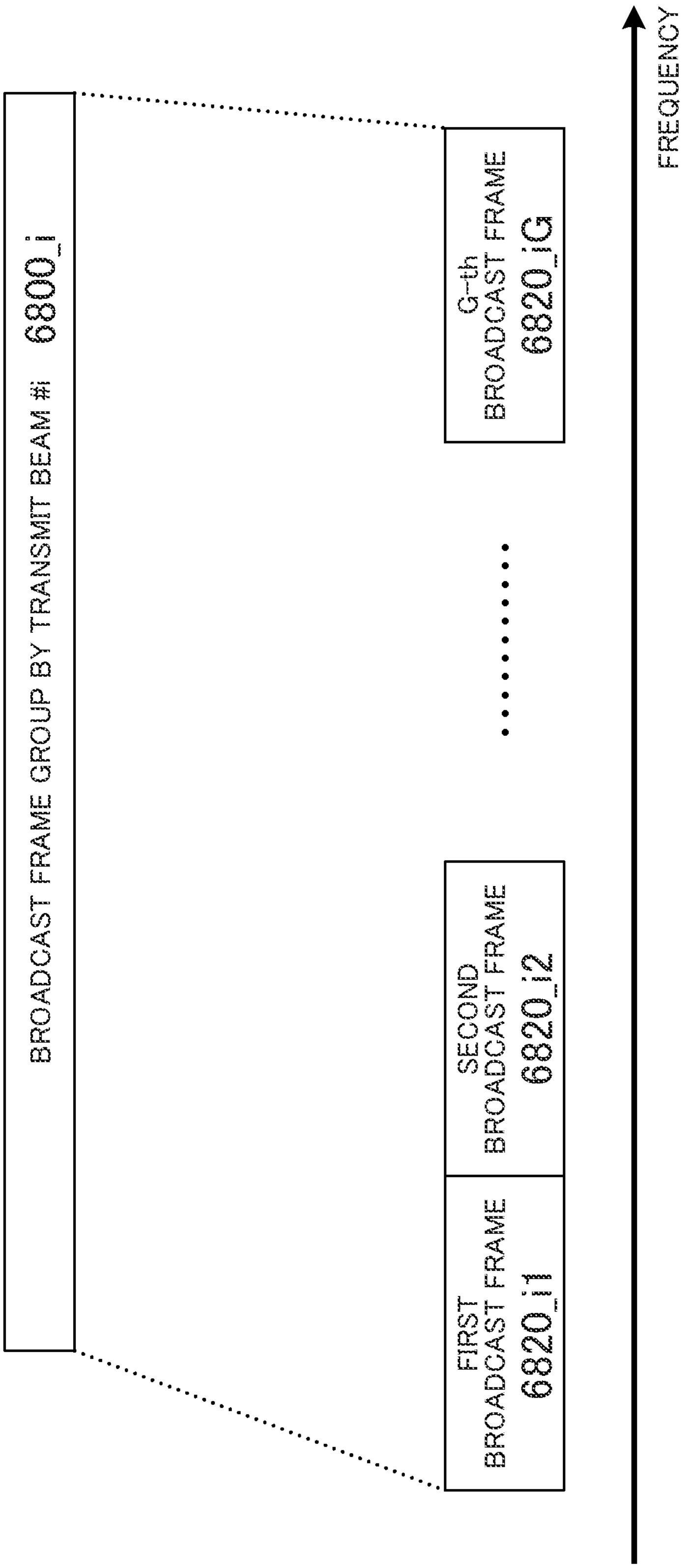
FIG. 68C illustrates exemplary frequency band division for a broadcast frame group.

FIG. 68C illustrates exemplary frequency band division for "broadcast frame group by receive beam #i" 6800__i_ in FIGS. 68A and 68B. Note that, in FIG. 68C, the horizontal axis represents frequency, and i is an integer from 0 to 7 (both inclusive).

As in FIG. 68C, "first broadcast frame 6820__i_1", "second broadcast frame 6820__i_2", . . . , "G-th broadcast frame 6820_iG" are aligned in the frequency axis direction in "broadcast frame group by transmit beam #i" 6800_i_. Note that G is an integer equal to or greater than 1 or an integer equal to or greater than 2.

That is, "broadcast frame group by transmit beam #i" 6800__i_ includes "k-th broadcast frame 6820__ik_". Note that k is an integer from 1 to G (both inclusive).

In this case, the gNB transmits the "first broadcast frame 6820__i_1" in "broadcast frame group by transmit beam #i" 6800__i_, depending on a result of LBT that has been performed. Note that the details will be described later.

In addition, the gNB transmits the "second broadcast frame 6820__i_2" in "broadcast frame group by transmit beam #i" 6800__i_, depending on a result of LBT that has been performed. Note that the details will be described later.

. . . .

The gNB transmits the "G-th broadcast frame 6820_iG" in "broadcast frame group by transmit beam #i" 6800__i_, depending on a result of LBT that has been performed. Note that the details will be described later.

That is, the gNB transmits the "k-th broadcast frame 6820__ik_" in "broadcast frame group by transmit beam #i" 6800__i_, depending on a result of LBT that has been performed. Details will be described later. Note that k is an integer from 1 to G (both inclusive). Note that i is an integer from 0 to 7 (both inclusive).

Figure 68D:
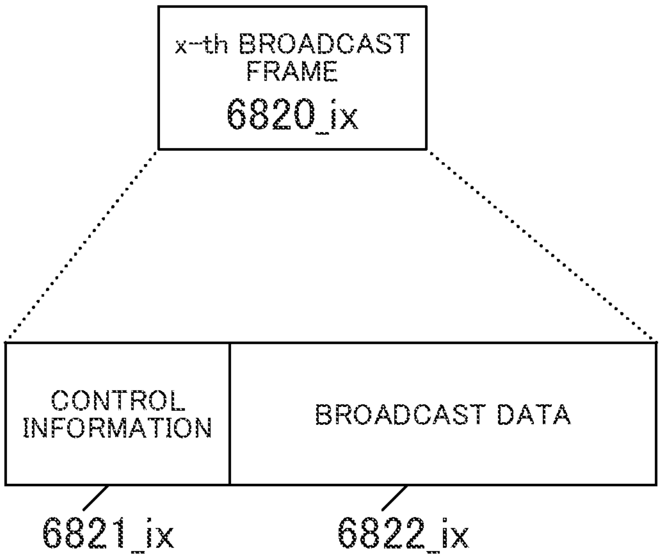
FIG. 68D illustrates an exemplary configuration of a broadcast frame.

FIG. 68D illustrates an exemplary configuration of "x-th broadcast frame 6820__ix_" in "broadcast frame group by transmit beam #i" 6800__i_. Note that x is an integer from 1 to G (both inclusive). Note that i is an integer from 0 to 7 (both inclusive).

It is assumed that x-th broadcast frame 6820__ix_ is composed of, for example, control information 6821__ix_ and broadcast data 6822__ix_.

At this time, "broadcast data 6822_01, broadcast data 6822_02, . . . , broadcast data 6822_0G", "broadcast data 6822_11, broadcast data 6822_12, . . . , broadcast data 6822_G", "broadcast data 6822_21, broadcast data 6822_22, . . . , broadcast data 6822_2G".

"broadcast data 6822_31, broadcast data 6822_32, . . . , broadcast data 6822_3G", "broadcast data 6822_41, broadcast data 6822_42, . . . , broadcast data 6822_4G", "broadcast data 6822_51, broadcast data 6822_52, . . . , broadcast data 6822_5G", "broadcast data 6822_61, broadcast data 6822_62, . . . , broadcast data 68226G", and "broadcast data 6822_71, broadcast data 6822_72, . . . , broadcast data 6822_7G" include the same data, for example.

As another example, "broadcast data 6822_01, broadcast data 6822_02, . . . , broadcast data 6822_0G", "broadcast data 6822_11, broadcast data 6822_12, . . . , broadcast data 6822_1G", "broadcast data 6822_21, broadcast data 6822_22, . . . , broadcast data 6822_2G", "broadcast data 6822_31, broadcast data 6822_32, . . . , broadcast data 6822_3G", "broadcast data 6822_41, broadcast data 6822_42, . . . , broadcast data 6822_4G", "broadcast data 6822_51, broadcast data 6822_52, . . . , broadcast data 6822_5G", broadcast data 6822_61, broadcast data 6822_62, . . . , broadcast data 6822_6G, and "broadcast data 6822_71, broadcast data 6822_72, . . . , broadcast data 6822_7G" may be configured to include the same content although "the condition, such as a compression ratio and a configuration, is different".

Further. "broadcast data 6822_01, broadcast data 6822_02, . . . , broadcast data 6822_0G", "broadcast data 6822_11, broadcast data 6822_12, . . . , broadcast data 6822_1G", "broadcast data 6822_21, broadcast data 6822_22, . . . , broadcast data 6822_2G", "broadcast data 6822_31, broadcast data 6822_32, . . . , broadcast data 6822_3G", "broadcast data 6822_41, broadcast data 6822_42, . . . , broadcast data 6822_4G", "broadcast data 6822_51, broadcast data 6822_52, . . . , broadcast data 6822_5G", "broadcast data 6822_61, broadcast data 6822_62, . . . , broadcast data 6822_6G", and "broadcast data 6822_71, broadcast data 6822_72, . . . , broadcast data 6822_7G" may include partially the same data.

Broadcast data 6822_*ix* is data to be transmitted to a plurality of terminals. For example, in FIG. 38, broadcast data 6522_*xv* is data transmitted by gNB 3800, and gNB 3800 is transmitted to "NR-UE #1 labeled 3801_1, NR-UE #2 labeled 3801_2, NR-UE #3 labeled 3801_3, NR-UE #4 labeled 3801_4, NR-UE #5 labeled 3801_5. NR-UE #6 labeled 3801_6, and NR-UE #7 labeled 3801_7" if possible.

"Control information 6821_01, control information 6821_02, . . . , control information 6821_0G", "control information 6821_11, control information 6821_12, . . . , control information 6821_1G", "control information 6821_21, control information 6821_22, . . . , control information 6821_2G", "control information 6821_31, control information 6821_32, . . . , control information 6821_3G", "control information 6821_41, control information 6821_42, . . . , control information 6821_4G", "control information 6821_51, control information 6821_52, . . . , control information 6821_5G", "control information 6821_61, control information 6821_62, . . . , control information 6821_6G", and "control information 6821_71, control information 6821_72, . . . , control information 6821_7G" may include the same data or different data from each other.

Examples of "control information 6821_01, control information 6821_02, . . . , control information 6821_0G", "control information 6821_11, control information 6821_12, . . . , control information 6821_1G", "control information 6821_21, control information 6821_22, . . . , control information 6821_2G", "control information 6821_31, control information 6821_32, . . . , control information 6821_3G", "control information 6821_41, control information 6821_42, . . . , control information 6821_4G", "control information 6821_51, control information 6821_52, . . . , control information 6821_5G", "control information 6821_61, control information 6821_62, . . . , control information 6821_6G", and "control information 6821_71, control information 6821_72, . . . , control information 6821_7G" include higher layer signaling, RRC, L1 signaling. DCI, broadcast information, SS/PBCH block, PBCH, etc., but the examples are not limited to these. Note that one of the features is to use "information and/or signal" other than synchronization signals (SS) as the control information.

Figure 69A:
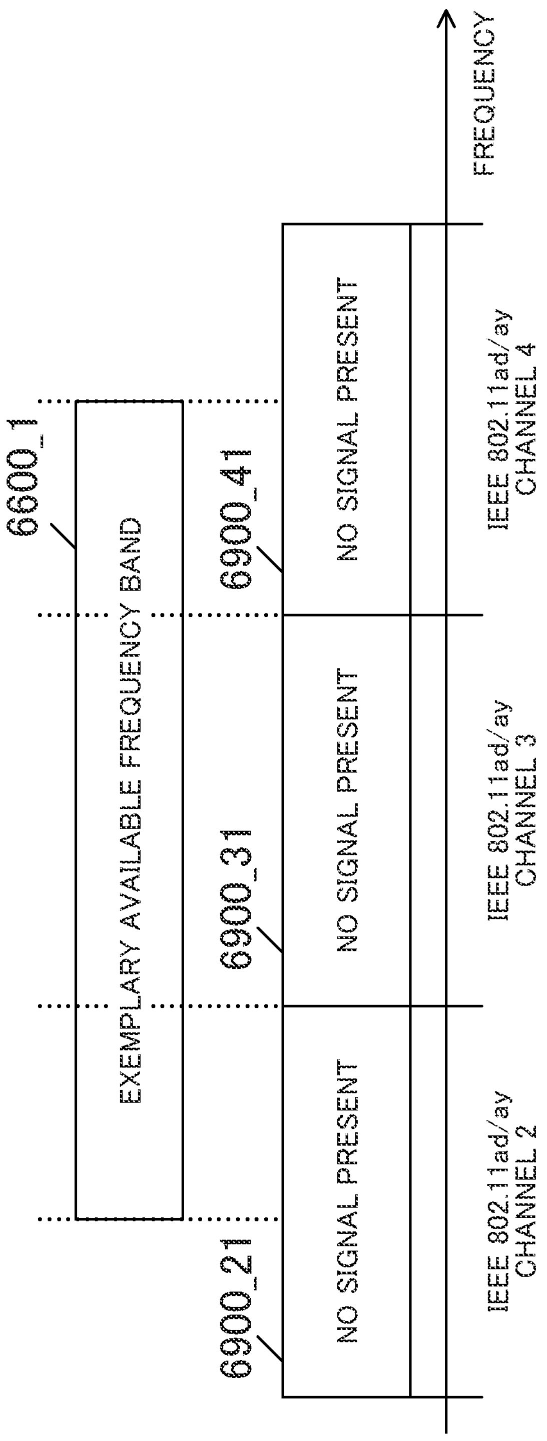
Figure 69B:
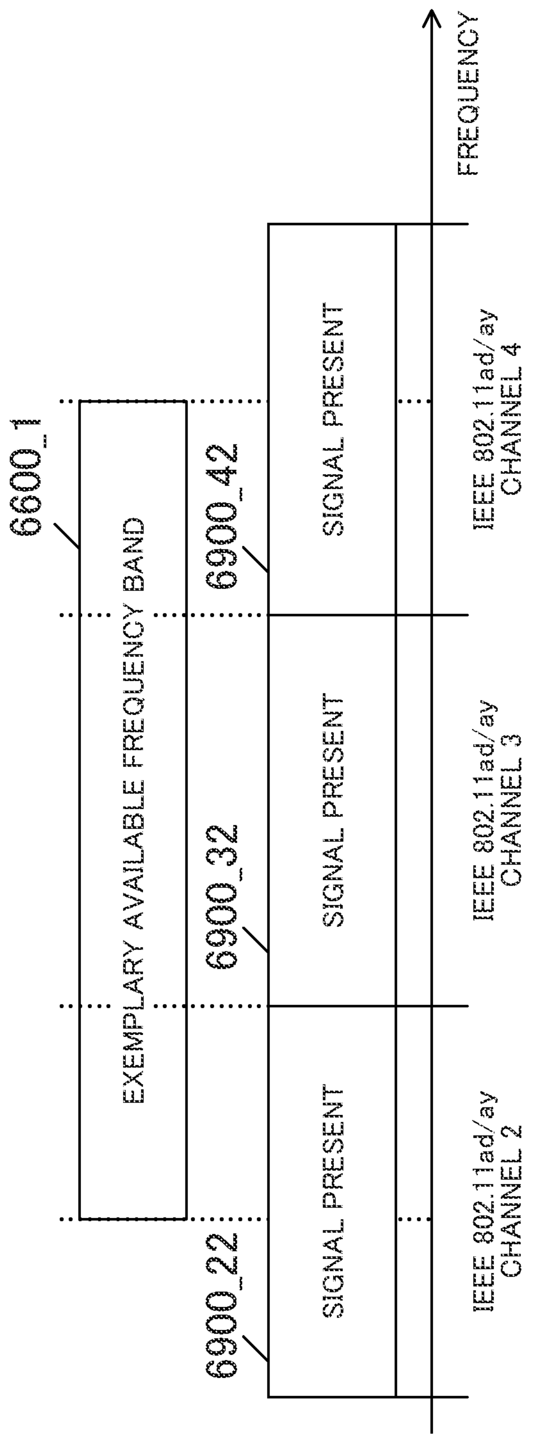
Figure 69C:
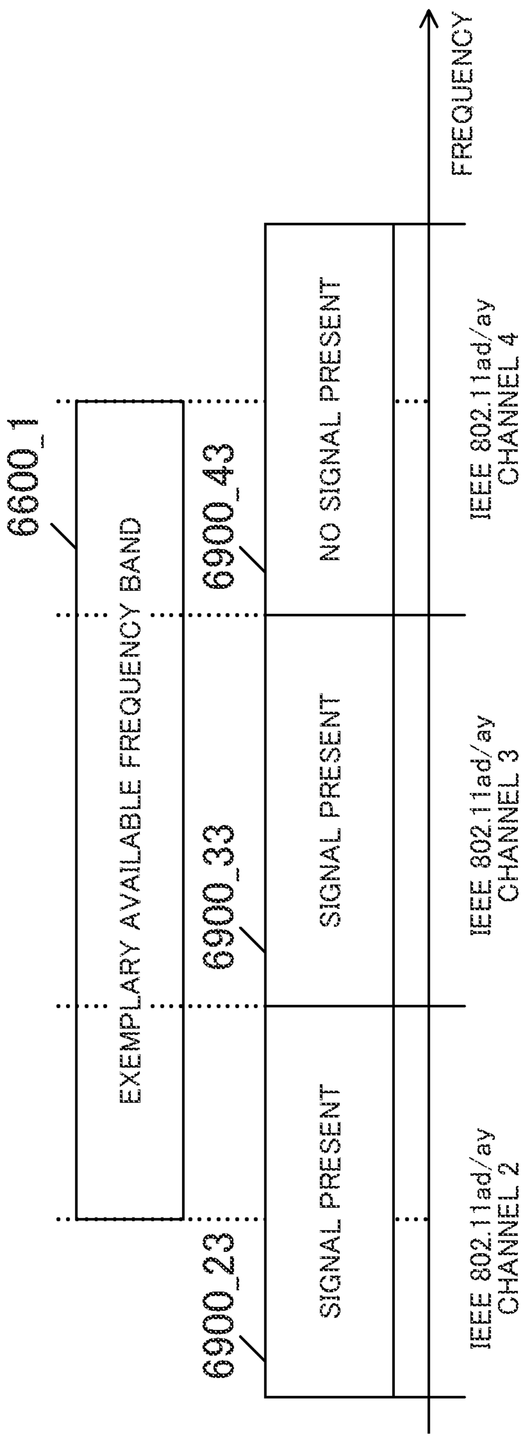
Figure 69D:
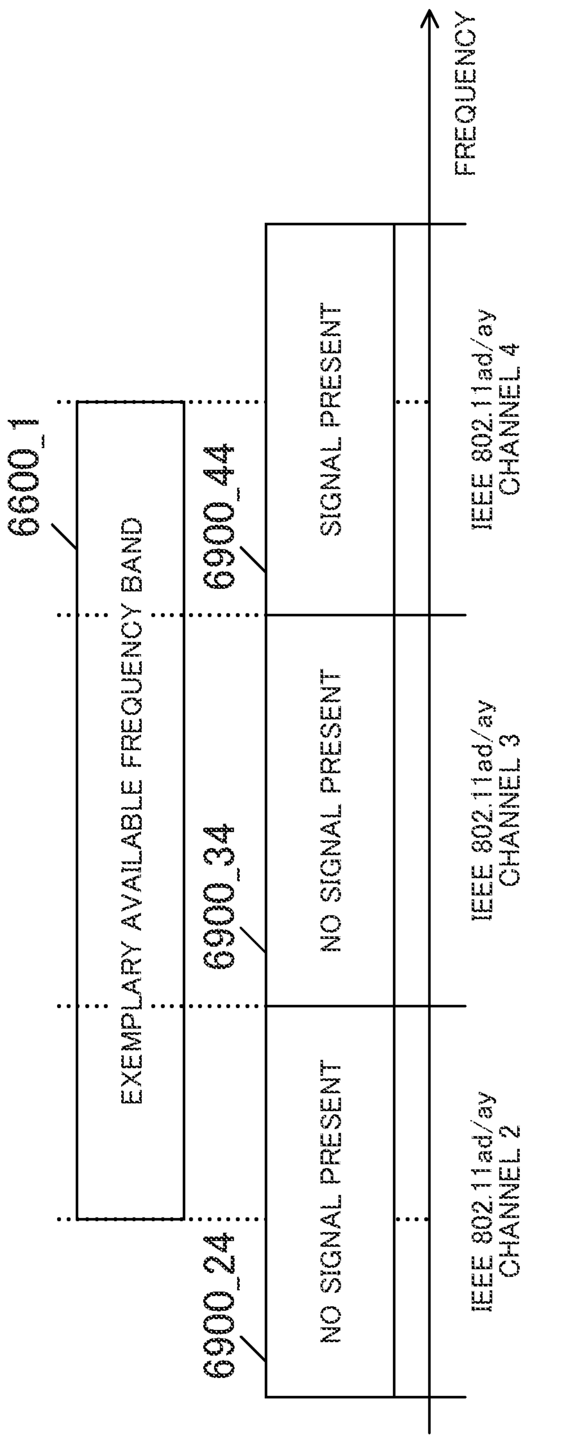

Next, an exemplary specific operation will be described. It is assumed that gNB 3800 in FIG. 55 can generate receive beams as in FIG. 47. At this time, it is also assumed that the state of FIG. 69A is found in "receive beam #0 labeled 4700_0 and receive beam #1 labeled 4700_1", the state of FIG. 69B is found in "receive beam #2 labeled 4700_2 and receive beam #3 labeled 4700_3", the state of FIG. 69C is found in "receive beam #4 labeled 4700_4 and receive beam #5 labeled 4700_5", and the state of FIG. 69D is found in "receive beam #6 labeled 4700_6 and receive beam #7 labeled 4700_7". Note that the frequency band used by gNB 3800 for transmission and reception is "exemplary available frequency band 6600_1" illustrated in FIG. 66A, and the horizontal axes represent frequency in FIGS. 69A, 69B, 69C, and 69D.

As illustrated in FIG. 69A, "exemplary available frequency band 6600_1" is present as in FIG. 66A. When gNB 3800 performs signal detection using "receive beam #0 labeled 4700_0 and receive beam #1 labeled 4700_1", no signal is present in "IEEE 802.11 ad/IEEE 802.11ay channel 2" as in 6900_21, no signal is present in "IEEE 802.11ad/IEEE 802.11ay channel 3" as in 6900_31, and no signal is present in "IEEE 802.11ad/IEEE 802.11ay channel 4" as in 6900_41, as illustrated in FIG. 69A.

As illustrated in FIG. 69B, "exemplary available frequency band 6600_1" is present as in FIG. 66A. When gNB 3800 performs signal detection using "receive beam #2 labeled 4700_2 and receive beam #3 labeled 4700_3", a signal is present in "IEEE 802.11ad/IEEE 802.11ay channel 2" as in 6900_22, a signal is present in "IEEE 802.11ad/IEEE 802.11ay channel 3" as in 6900_32, and a signal is present in "IEEE 802.11ad/IEEE 802.11ay channel 4" as in 6900_42, as illustrated in FIG. 69B.

As illustrated in FIG. 69C, "exemplary available frequency band 6600_1" is present as in FIG. 66A. When gNB 3800 performs signal detection using "receive beam #4 labeled 4700_4 and receive beam #5 labeled 4700_5", a signal is present in "IEEE 802.11ad/IEEE 802.11ay channel 2" as in 6900_23, a signal is present in "IEEE 802.11ad/IEEE 802.11ay channel 3" as in 6900_33, and no signal is present in "IEEE 802.11ad/IEEE 802.11ay channel 4" as in 6900_43, as illustrated in FIG. 69C.

As illustrated in FIG. 69D, "exemplary available frequency band 6600_1" is present as in FIG. 66A. When gNB 3800 performs signal detection using "receive beam #6 labeled 4700_6 and receive beam #7 labeled 4700_7", no signal is present in "IEEE 802.11ad/IEEE 802.11ay channel 2" as in 6900_24, no signal is present in "IEEE 802.11ad/IEEE 802.11ay channel 3" as in 6900_34, and a signal is present in "IEEE 802.11ad/IEEE 802.11ay channel 4" as in 6900_44, as illustrated in FIG. 69D.

In addition, as described with reference to FIGS. 67A, 67B, and 67C, gNB 3800 performs LBT in "exemplary available frequency band 6600_1".

For example, it is assumed that gNB 3800 has performed LBT for "exemplary available frequency band 6600_1" using "receive beam #0 labeled 4700_0 and receive beam #1 labeled 4700_1" as described with reference to FIGS. 67A, 67B, and 67C.

Figure 70A:
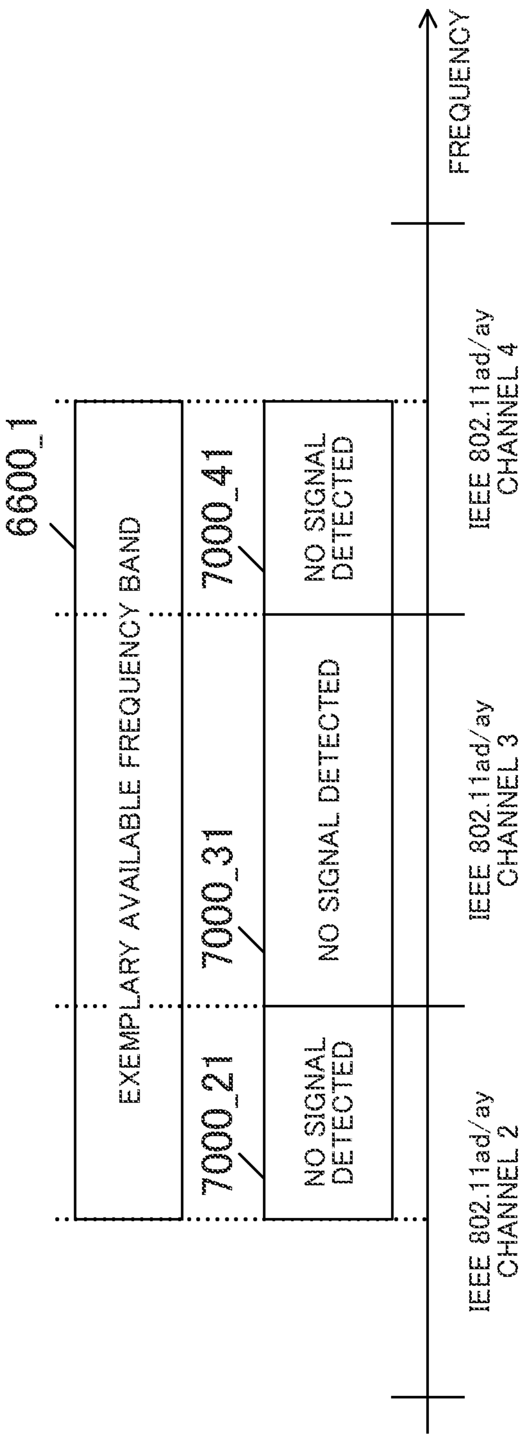

Then, since it is the state of FIG. 69A, as illustrated in FIG. 70A, gNB 3800 detects no signal in part of "IEEE 802.11ad/IEEE 802.11ay channel 2" in "exemplary available frequency band 6600_" as in 7000_21.

Also, as illustrated in FIG. 70A, gNB 3800 detects no signal in "IEEE 802.11ad/IEEE 802.11ay channel 3" in "exemplary available frequency band 6600_1" as in 7000_31.

Further, as illustrated in FIG. 70A, gNB 3800 detects no signal in part of "IEEE 802.11ad/IEEE 802.11ay channel 4" in "exemplary available frequency band 6600_1" as in 7000_41.

For example, gNB 3800 performs LBT in each of first LBT band 6702_1, second LBT band 6702_2, . . . , F-th LBT band 6702_F in FIG. 67C, and checks "whether a signal is detected" in each of them. This applies to FIGS. 70B, 70C, and 70D as well.

It is assumed that gNB 3800 has performed LBT for "exemplary available frequency band 6600_1" using "receive beam #2 labeled 4700_2 and receive beam #3 labeled 4700_3" as described with reference to FIGS. 67A, 67B, and 67C.

Figure 70B:
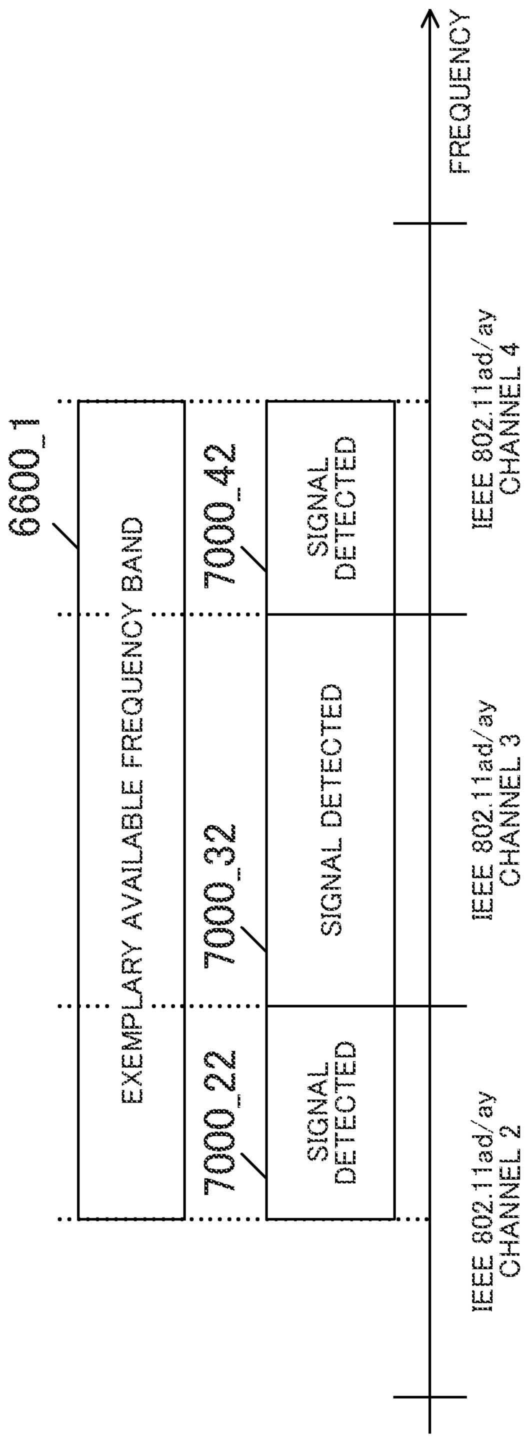

Then, since it is the state of FIG. 69B, as illustrated in FIG. 70B, gNB 3800 detects a signal in part of "IEEE 802.11ad/IEEE 802.11ay channel 2" in "exemplary available frequency band 6600_1" as in 7000_22.

Also, as illustrated in FIG. 70B, gNB 3800 detects a signal in "IEEE 802.11ad/IEEE 802.11ay channel 3" in "exemplary available frequency band 6600_1" as in 7000_32.

Further, as illustrated in FIG. 70B, gNB 3800 detects a signal in part of "IEEE 802.11ad/IEEE 802.11ay channel 4" in "exemplary available frequency band 6600_1" as in 7000_42.

It is assumed that gNB 3800 has performed LBT for "exemplary available frequency band 6600_1" using "receive beam #4 labeled 4700_4 and receive beam #5 labeled 4700_5" as described with reference to FIGS. 67A, 67B, and 67C.

Figure 70C:
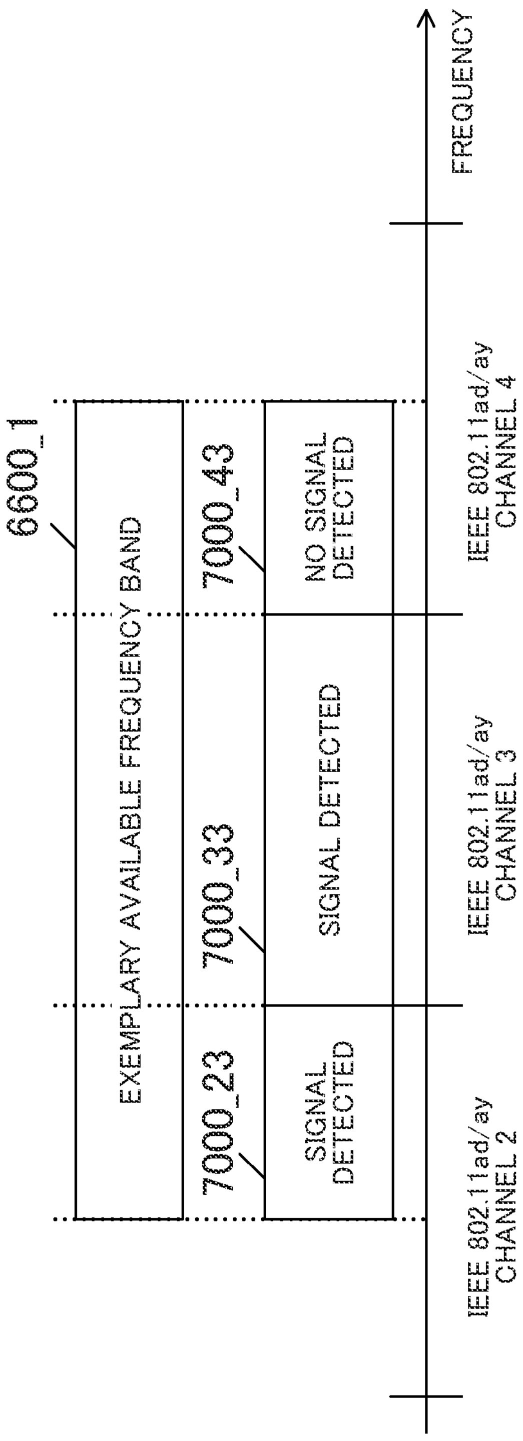

Then, since it is the state of FIG. 69C, as illustrated in FIG. 70C, gNB 3800 detects a signal in part of "IEEE 802.11ad/IEEE 802.111ay channel 2" in "exemplary available frequency band 6600_1" as in 7000_23.

Also, as illustrated in FIG. 70C, gNB 3800 detects a signal in "IEEE 802.11ad/IEEE 802.11ay channel 3" in "exemplary available frequency band 6600_1" as in 700033.

Further, as illustrated in FIG. 70C, gNB 3800 detects no signal in part of "IEEE 802.11ad/IEEE 802.11ay channel 4" in "exemplary available frequency band 6600_1" as in 7000_43.

It is assumed that gNB 3800 has performed LBT for "exemplary available frequency band 6600_1" using "receive beam #6 labeled 4700_6 and receive beam #7 labeled 4700_7" as described with reference to FIGS. 67A, 67B, and 67C.

Figure 70D:
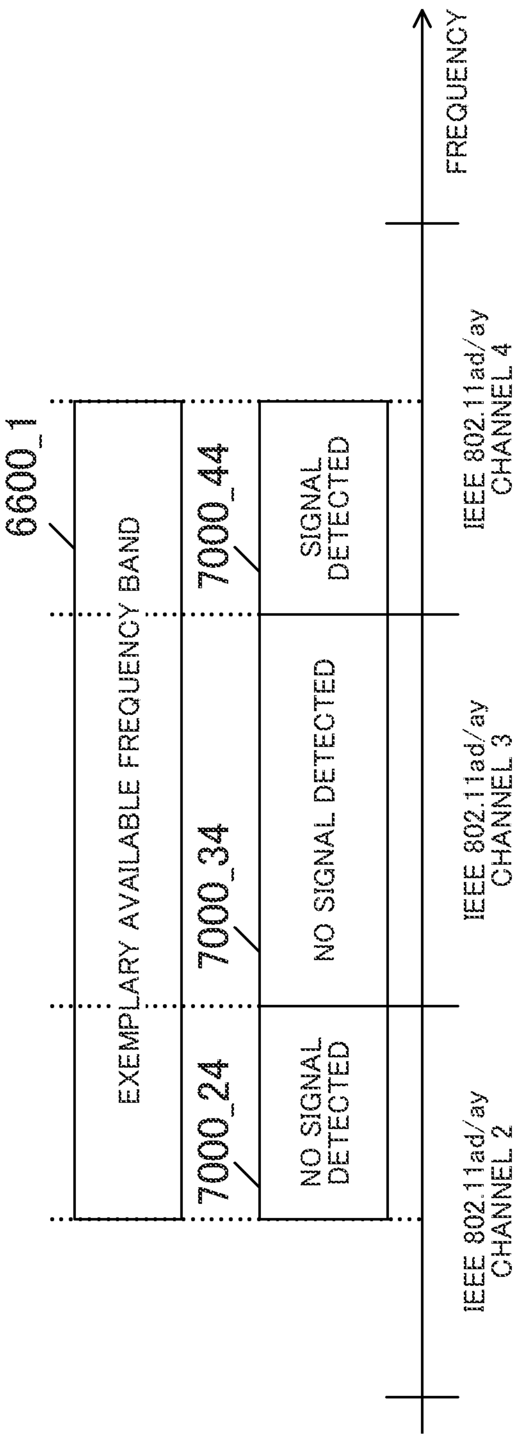

Then, since it is the state of FIG. 69D, as illustrated in FIG. 70D, gNB 3800 detects no signal in part of "IEEE 802.11ad/IEEE 802.11ay channel 2" in "exemplary available frequency band 6600_1" as in 7000_24.

Also, as illustrated in FIG. 70D, gNB 3800 detects no signal in "IEEE 802.11ad/IEEE 802.11ay channel 3" in "exemplary available frequency band 6600_1" as in 7000_34.

Further, as illustrated in FIG. 70D, gNB 3800 detects a signal in part of "IEEE 802.11ad/IEEE 802.11ay channel 4" in "exemplary available frequency band 6600_1" as in 7000_44.

gNB 3800 has performed LBT for "exemplary available frequency band 6600_1" using "receive beam #0 labeled 4700_0 and receive beam #1 labeled 4700_1" and obtained a result as in FIG. 70A.

Figure 71A:
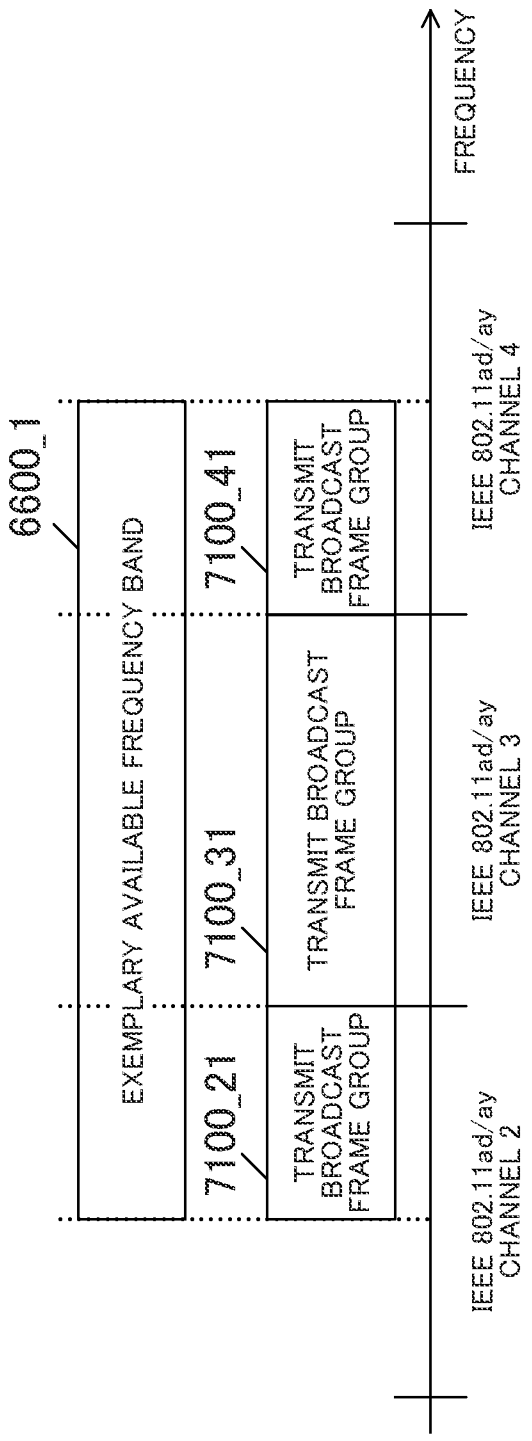

Thus, as in FIG. 71A, gNB 3800 transmits a broadcast frame group using "transmit beam #0 labeled 4500_0 and transmit beam #1 labeled 4500_1 in FIG. 45" in part of "IEEE 802.11ad/IEEE 802.111ay channel 2" in "exemplary available frequency band 6600_1" as in 7100_21.

In addition, as in FIG. 71A, gNB 3800 transmits a broadcast frame group using "transmit beam #0 labeled 4500_0 and transmit beam #1 labeled 4500_1 in FIG. 45" in "IEEE 802.11ad/IEEE 802.11ay channel 3" in "exemplary available frequency band 6600_1" as in 7100_31.

As in FIG. 71A, gNB 3800 also transmits a broadcast frame group using "transmit beam #0 labeled 4500_0 and transmit beam #1 labeled 4500_1 in FIG. 45" in part of "IEEE 802.11ad/IEEE 802.11ay channel 4" in "exemplary available frequency band 6600_1" as in 7100_41.

For example, gNB 3800 determines whether to transmit a broadcast signal in each of first broadcast frame 6820_*i*1, second broadcast frame 6820_*i*2, . . . , G-th broadcast frame 6820_iG in FIG. 68C. This applies to FIGS. 71B, 71C, and 71D as well.

gNB 3800 has performed LBT for "exemplary available frequency band 6600_1" using "receive beam #2 labeled 4700_2 and receive beam #3" labeled 4700_3Y and obtained a result as in FIG. 70B.

Figure 71B:
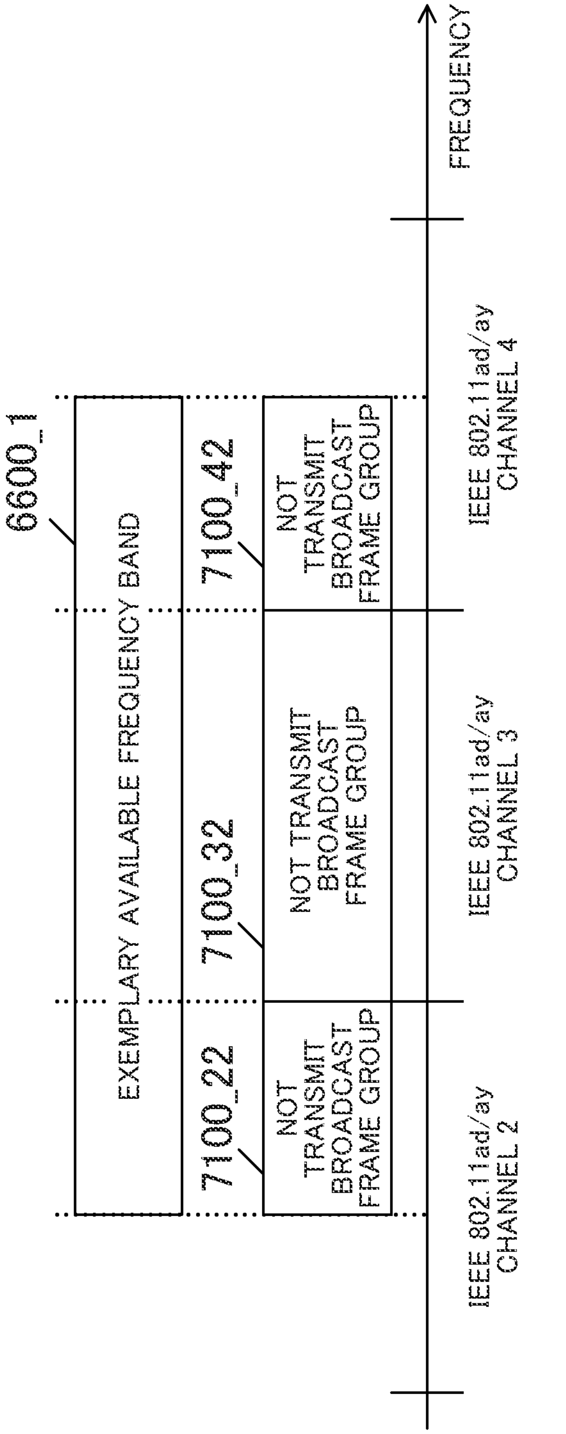

Thus, as in FIG. 71B, gNB 3800 does not transmit a broadcast frame group using "transmit beam #2 labeled 4500_2 and transmit beam #3 labeled 4500_3 in FIG. 45" in part of "IEEE 802.11ad/IEEE 802.11ay channel 2" in "exemplary available frequency band 6600_1" as in 7100_22.

In addition, as in FIG. 71B, gNB 3800 does not transmit a broadcast frame group using "transmit beam #2 labeled 4500_2 and transmit beam #3 labeled 4500_3 in FIG. 45" in "IEEE 802.11ad/IEEE 802.11ay channel 3" in "exemplary available frequency band 6600_1" as in 7100_32.

As in FIG. 71B, gNB 3800 does not transmit a broadcast frame group using "transmit beam #2 labeled 4500_2 and transmit beam #3 labeled 4500)_3 in FIG. 45" either in part of "IEEE 802.11ad/IEEE 802.11ay channel 4" in "exemplary available frequency band 6600_1" as in 7100_42.

gNB 3800 has performed LBT for "exemplary available frequency band 6600_1" using "receive beam #4 labeled 4700_4 and receive beam #5 labeled 4700_5" and obtained a result as in FIG. 70C.

Figure 71C:
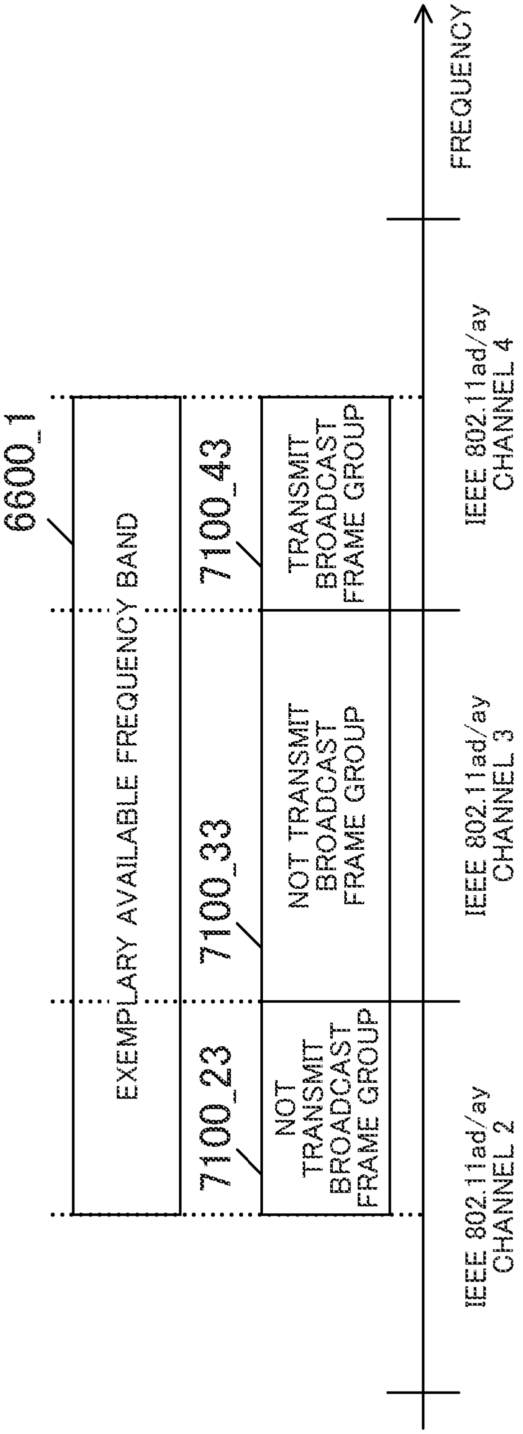

Thus, as in FIG. 71C, gNB 3800 does not transmit a broadcast frame group using "transmit beam #4 labeled 4500_4 and transmit beam #5 labeled 4500_5 in FIG. 45" in part of "IEEE 802.11ad/IEEE 802.11ay channel 2" in "exemplary available frequency band 66001" as in 7100_23.

In addition, as in FIG. 71C, gNB 3800 does not transmit a broadcast frame group using "transmit beam #4 labeled 4500_4 and transmit beam #5 labeled 4500_5 in FIG. 45" in "IEEE 802.11ad/IEEE 802.11ay channel 3" in "exemplary available frequency band 6600_1" as in 7100_33.

As in FIG. 71C, gNB 3800 transmits a broadcast frame group using "transmit beam #4 labeled 4500_4 and transmit beam #5 labeled 4500_5 in FIG. 45" in part of "IEEE 802.11ad/IEEE 802.11ay channel 4" in "exemplary available frequency band 6600_1" as in 7100_43.

gNB 3800 has performed LBT for "exemplary available frequency band 6600_1" using "receive beam #6 labeled 4700_6 and receive beam #7 labeled 4700_7" and obtained a result as in FIG. 70D.

Figure 71D:
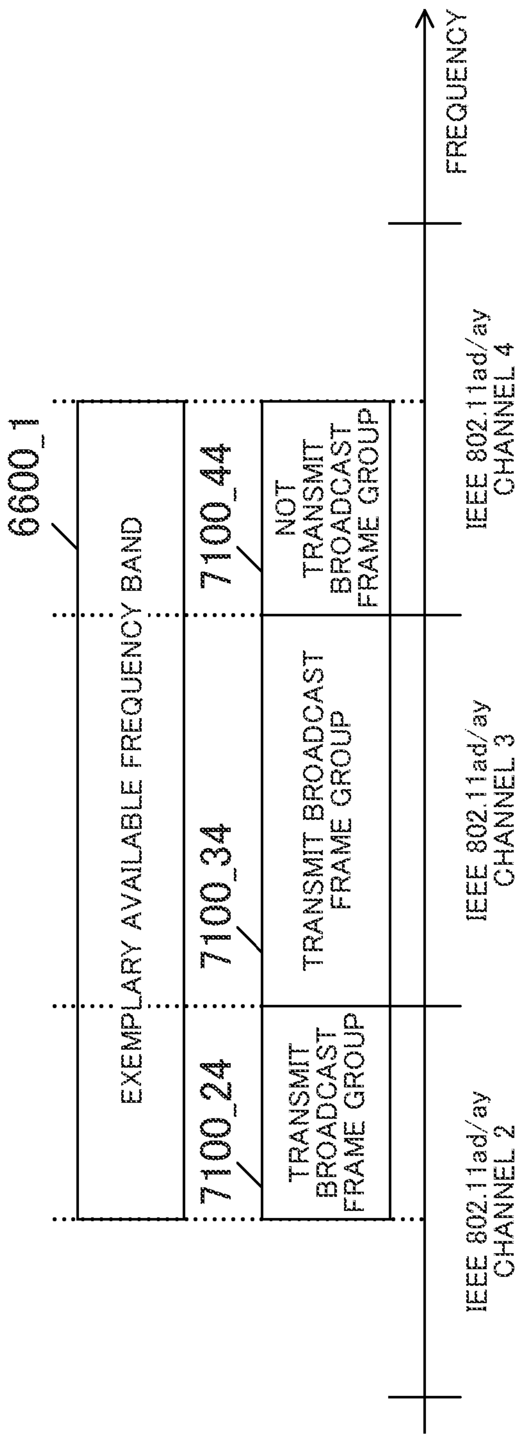

Thus, as in FIG. 71D, gNB 3800 transmits a broadcast frame group using "transmit beam #6 labeled 4500_6 and transmit beam #7 labeled 4500_7 in FIG. 45" in part of "IEEE 802.11ad/IEEE 802.11ay channel 2" in "exemplary available frequency band 6600_1" as in 7100_24.

In addition, as in FIG. 71D, gNB 3800 transmits a broadcast frame group using "transmit beam #6 labeled 4500_6 and transmit beam #7 labeled 4500_7 in FIG. 45" in "IEEE 802.11ad/IEEE 802.11ay channel 3" in "exemplary available frequency band 6600_1" as in 7100_34.

As in FIG. 71D, gNB 3800 does not transmit a broadcast frame group using "transmit beam #6 labeled 4500_6 and transmit beam #7 labeled 4500_7 in FIG. 45" in part of "IEEE 802.11ad/IEEE 802.11ay channel 4" in "exemplary available frequency band 6600_1" as in 7100_44.

Next, another example of specific operations w % ill be described. It is assumed that gNB 3800 in FIG. 55 can generate receive beams as in FIG. 47. At this time, it is also assumed that the state of FIG. 72A is found in "receive beam #0 labeled 4700_0 and receive beam #1 labeled 4700_1", the state of FIG. 72B is found in "receive beam #2 labeled 4700_2 and receive beam #3 labeled 4700_3", the state of FIG. 72C is found in "receive beam #4 labeled 4700_4 and receive beam #5 labeled 4700_5", and the state of FIG. 72D is found in "receive beam #6 labeled 4700_6 and receive beam #7 labeled 4700_7". Note that the frequency band used by gNB 3800 for transmission and reception is "exemplary available frequency band 6600_2" illustrated in FIG. 66B, and the horizontal axes represent frequency in FIGS. 72A, 72B, 72C, and 72D.

As illustrated in FIG. 72A, "exemplary available frequency band 6600_2" is present as in FIG. 66B. When gNB 3800 performs signal detection using "receive beam #0 labeled 4700_0 and receive beam #1 labeled 4700_1", no signal is present in "IEEE 802.11ad/IEEE 802.11ay channel 2" as in 7200_21, no signal is present in "IEEE 802.11ad/IEEE 802.11ay channel 3" as in 7200_31, and no signal is present in "IEEE 802.11ad/IEEE 802.111ay channel 4" as in 7200_41, as illustrated in FIG. 72A.

As illustrated in FIG. 72B, "exemplary available frequency band 6600_2" is present as in FIG. 66B. When gNB 3800 performs signal detection using "receive beam #2 labeled 4700_2 and receive beam #3 labeled 4700_3", a signal is present in "IEEE 802.11ad/IEEE 802.11ay channel 2" as in 7200_22, a signal is present in "IEEE 802.11ad/IEEE 802.11ay channel 3" as in 7200_32, and a signal is present in "IEEE 802.11ad/IEEE 802.11ay channel 4" as in 7200_42, as illustrated in FIG. 72B.

As illustrated in FIG. 72C, "exemplary available frequency band 6600_2" is present as in FIG. 66B. When gNB 3800 performs signal detection using "receive beam #4 labeled 4700_4 and receive beam #5 labeled 4700_5", a signal is present in "IEEE 802.11ad/IEEE 802.11ay channel 2" as in 7200_23, a signal is present in "IEEE 802.11ad/IEEE 802.11ay channel 3" as in 7200_33, and no signal is present in "IEEE 802.11ad/IEEE 802.11ay channel 4" as in 7200_43, as illustrated in FIG. 72C.

As illustrated in FIG. 72D, "exemplary available frequency band 6600_2" is present as in FIG. 66B. When gNB 3800 performs signal detection using "receive beam #6 labeled 4700_6 and receive beam #7 labeled 4700_7", no signal is present in "IEEE 802.11 ad/IEEE 802.11ay channel 2" as in 7200_24, no signal is present in "IEEE 802.11ad/IEEE 802.11ay channel 3" as in 7200_34, and a signal is present in "IEEE 802.11ad./IEEE 802.11ay channel 4" as in 7200_44, as illustrated in FIG. 72D.

In addition, as described with reference to FIGS. 67A, 67B, and 67C, gNB 3800 performs LBT in "exemplary available frequency band 6600_2".

For example, it is assumed that gNB 3800 has performed LBT for "exemplary available frequency band 6600_2" using "receive beam #0 labeled 4700_0 and receive beam #1 labeled 4700_1" as described with reference to FIGS. 67A, 67B, and 67C.

Then, since it is the state of FIG. 72A, as illustrated in FIG. 73A, gNB 3800 detects no signal in "IEEE 802.11ad/IEEE 802.11ay channel 2" in "exemplary available frequency band 6600_2" as in 7300_21.

Also, as illustrated in FIG. 72A, gNB 3800 detects no signal in "IEEE 802.11ad/IEEE 802.11ay channel 3" in "exemplary available frequency band 6600_2" as in 7300_31.

Further, as illustrated in FIG. 72A, gNB 3800 detects no signal in "IEEE 802.11ad/IEEE 802.11ay channel 4" in "exemplary available frequency band 6600_2" as in 7300_41.

For example, gNB 3800 performs LBT in each of first LBT band 6702_1, second LBT band 6702_2, . . . , F-th LBT band 6702_F in FIG. 67C, and checks "whether a signal is detected" in each of them. This applies to FIGS. 73B, 73C, and 73D as well.

It is assumed that gNB 3800 has performed LBT for "exemplary available frequency band 6600_2" using "receive beam #2 labeled 4700_2 and receive beam #3 labeled 4700_3" as described with reference to FIGS. 67A, 67B, and 67C.

Then, since it is the state of FIG. 72B, as illustrated in FIG. 73B, gNB 3800 detects a signal in "IEEE 802.11ad/IEEE 802.11ay channel 2" in "exemplary available frequency band 6600_2" as in 7300_22.

Also, as illustrated in FIG. 73B, gNB 3800 detects a signal in "IEEE 802.11 ad/IEEE 802.11ay channel 3" in "exemplary available frequency band 6600_2" as in 7300_32.

Further, as illustrated in FIG. 72B, gNB 3800 detects a signal in "IEEE 802.11ad/IEEE 802.11ay channel 4" in "exemplary available frequency band 6600_2" as in 7300_42.

It is assumed that gNB 3800 has performed LBT for "exemplary available frequency band 6600_2" using "receive beam #4 labeled 4700_4 and receive beam #5 labeled 4700_5" as described with reference to FIGS. 67A, 67B, and 67C.

Then, since it is the state of FIG. 72C, as illustrated in FIG. 73C, gNB 3800 detects a signal in "IEEE 802.11ad/IEEE 802.11ay channel 2" in "exemplary available frequency band 6600_2" as in 7300_23.

Also, as illustrated in FIG. 73C, gNB 3800 detects a signal in "IEEE 802.11 ad/IEEE 802.11ay channel 3" in "exemplary available frequency band 6600_2" as in 7300_33.

Further, as illustrated in FIG. 70C, gNB 3800 detects no signal in "IEEE 802.11ad/IEEE 802.11 ay channel 4" in "exemplary available frequency band 6600_2" as in 7300_43.

It is assumed that gNB 3800 has performed LBT for "exemplary available frequency band 6600_2" using "receive beam #6 labeled 4700_6 and receive beam #7 labeled 4700_7" as described with reference to FIGS. 67A, 67B, and 67C.

Then, since it is the state of FIG. 72D, as illustrated in FIG. 73D, gNB 3800 detects no signal in "IEEE 802.11 ad/IEEE 802.11ay channel 2" in "exemplary available frequency band 6600_2" as in 7300_24.

Also, as illustrated in FIG. 73D, gNB 3800 detects no signal in "IEEE 802.11ad/IEEE 802.11ay channel 3" in "exemplary available frequency band 6600_2" as in 7300_34.

Further, as illustrated in FIG. 73D, gNB 3800 detects a signal in "IEEE 802.11ad/IEEE 802.11 ay channel 4" in "exemplary available frequency band 6600_2" as in 7300_44.

gNB 3800 has performed LBT for "exemplary available frequency band 6600_2" using "receive beam #0 labeled 4700_0 and receive beam #1 labeled 4700_1" and obtained a result as in FIG. 73A.

Thus, as in FIG. 74A, gNB 3800 transmits a broadcast frame group using "transmit beam #0 labeled 4500_0 and transmit beam #1 labeled 4500_1 in FIG. 45" in "IEEE 802.11ad/IEEE 802.11 ay channel 2" in "exemplary available frequency band 6600_2" as in 7400_21.

In addition, as in FIG. 74A, gNB 3800 transmits a broadcast frame group using "transmit beam #0 labeled 4500_0 and transmit beam #1 labeled 4500_1 in FIG. 45" in "IEEE 802.11ad/IEEE 802.11ay channel 3" in "exemplary available frequency band 6600_2" as in 7400_31.

As in FIG. 74A, gNB 3800 transmits a broadcast frame group using "transmit beam #0 labeled 4500_0 and transmit beam #1 labeled 4500_1 in FIG. 45" in "IEEE 802.11ad/IEEE 802.11ay channel 4" in "exemplary available frequency band 6600_2" as in 7400_41.

For example, gNB 3800 determines whether to transmit a broadcast signal in each of first broadcast frame 6820_*i*1, second broadcast frame 6820_*i*2, . . . , G-th broadcast frame 6820_iG in FIG. 68C. This applies to FIGS. 74B, 74C, and 74D as well.

gNB 3800 has performed LBT for "exemplary available frequency band 6600_2" using "receive beam #2 labeled 4700_2 and receive beam #3 labeled 4700_3" and obtained a result as in FIG. 73B.

Thus, as in FIG. 74B, gNB 3800 does not transmit a broadcast frame group using "transmit beam #2 labeled 4500_2 and transmit beam #3 labeled 4500_3 in FIG. 45" in "IEEE 802.11ad/IEEE 802.11ay channel 2" in "exemplary available frequency band 6600_2" as in 7400_22.

In addition, as in FIG. 74B, gNB 3800 does not transmit a broadcast frame group using "transmit beam #2 labeled 4500_2 and transmit beam #3 labeled 4500_3 in FIG. 45" in "IEEE 802.11ad/IEEE 802.11ay channel 3" in "exemplary available frequency band 6600_2" as in 7400_32.

As in FIG. 74B, gNB 3800 does not transmit a broadcast frame group using "transmit beam #2 labeled 4500_2 and transmit beam #3 labeled 4500_3 in FIG. 45" in "IEEE 802.11ad/IEEE 802.11ay channel 4" in "exemplary available frequency band 6600_2" as in 7400_42.

gNB 3800 has performed LBT for "exemplary available frequency band 6600_2" using "receive beam #4 labeled 4700_4 and receive beam #5 labeled 4700_5" and obtained a result as in FIG. 73C.

Thus, as in FIG. 74C, gNB 3800 does not transmit a broadcast frame group using "transmit beam #4 labeled 4500_4 and transmit beam #5 labeled 4500_5 in FIG. 45" in "IEEE 802.11ad/IEEE 802.11ay channel 2" in "exemplary available frequency band 6600_2" as in 7400_23.

In addition, as in FIG. 74C, gNB 3800 does not transmit a broadcast frame group using "transmit beam #4 labeled 4500_4 and transmit beam #5 labeled 4500_5 in FIG. 45" in "IEEE 802.11ad/IEEE 802.11ay channel 3" in "exemplary available frequency band 6600_2" as in 7400_33.

As in FIG. 74C, gNB 3800 transmits a broadcast frame group using "transmit beam #4 labeled 4500_4 and transmit beam #5 labeled 4500_5 in FIG. 45" in "IEEE 802.11ad/IEEE 802.11ay channel 4" in "exemplary available frequency band 6600_2" as in 7400_43.

gNB 3800 has performed LBT for "exemplary available frequency band 6600_2" using "receive beam #6 labeled 4700_6 and receive beam #7 labeled 4700_7" and obtained a result as in FIG. 73D.

Thus, as in FIG. 74D, gNB 3800 transmits a broadcast frame group using "transmit beam #6 labeled 4500_6 and transmit beam #7 labeled 4500_7 in FIG. 45" in "IEEE 802.11ad/IEEE 802.11ay channel 2" in "exemplary available frequency band 6600_2" as in 7400_24.

In addition, as in FIG. 74D, gNB 3800 transmits a broadcast frame group using "transmit beam #6 labeled 4500_6 and transmit beam #7 labeled 4500_7 in FIG. 45" in "IEEE 802.11ad/IEEE 802.11ay channel 3" in "exemplary available frequency band 6600_2" as in 7400_34.

As in FIG. 74D, gNB 3800 does not transmit a broadcast frame group using "transmit beam #6 labeled 4500_6 and transmit beam #7 labeled 4500_7 in FIG. 45" in "IEEE 802.11ad/IEEE 802.11ay channel 4" in "exemplary available frequency band 6600_2" as in 7400_44.

As described above, performing LBT based on FDM taking into account the IEEE 802.11ad/IEEE 802.11ay channel duration and applying the FDM broadcast frame configuration method reduce interference among signals and produce an effect of using resources for communication, such as time, frequency, and space, effectively.

Note that, in the above examples, LBT based on TDM and/or LBT based on SDM may be used together and performed in each frequency in which LBT is performed. Further, in the above examples, the TDM broadcast frame configuration method and/or the SDM broadcast frame configuration may be used together and performed in the FDM broadcast frame configuration method.

As in FIGS. 66B, 72A, 72B, 72C, 72D, 73A, 73B, 73C, 73D, 74A, 74B, 74C, and 74D, for example, LBT may be performed in units of IEEE 802.11ad/IEEE 802.11ay channels, and broadcast frame transmission may be determined in units of IEEE 802.11ad/IEEE 802.11ay channels. In addition, as in FIGS. 66A, 69A, 69B, 69C, 69D, 70A, 70B, 70C, 70D, 71A, 71B, 71C, and 71D, when there is a frequency bandwidth narrower than the IEEE 802.11ad/IEEE 802.11ay channel width, LBT may be performed for the frequency bandwidth based on units of IEEE 802.11ad/IEEE 802.11ay channels, and it may be determined whether to perform broadcast frame transmission for the frequency bandwidth.

When the gNB implements the above description, the gNB may use a multi-carrier scheme such as OFDM or may use a single-carrier scheme such as DFT-S-OFDM, which is an abbreviation for Discrete Fourier Transform (DFT)-Spread Orthogonal Frequency Division Multiplexing (OFDM).

The gNB may use a multi-carrier scheme in which a plurality of signals of a single-carrier scheme, such as DFT-S-OFDM, are aggregated together. At this time, i-th LBT band 6720_*i* in FIG. 67C, for example, may correspond to a frequency band of the single-carrier scheme. In addition, i-th broadcast frame 6820_*i* in FIG. 68C, for example, may be a single signal of the single-carrier scheme.

Note that the multi-carrier scheme and the single-carrier scheme are not limited to these examples.

In the above description, the exemplary operations are based on the case where the gNB uses three IEEE 802.11ad/IEEE 802.11ay channels, but the same can be implemented when the gNB uses one or more or two or more IEEE 802.11ad/IEEE 802.11ay channels.

Although FIGS. 66A and 66B have been described as exemplary frequency bands available to the gNB, the gNB may use the frequency consecutively for "exemplary available frequency band 6601_1" and "exemplary available frequency band 6601_2", or may use the frequency discretely for "exemplary available frequency band 6601_1" and "exemplary available frequency band 6601_2".

Although the number of transmit beams generated by the gNB is 8 and the number of receive beams is 8 in the above description, the same can be implemented when the number of transmit beams is one or more or two or more and the number of receive beams is one or more or two or more.

Next, a description will be given of an exemplary communication state between the gNB and NR-UE in FIGS. 38, 55, etc. For example, a communication state between "gNB 3800 and NR-UE #1 labeled 3801_1" in FIG. 55 will be described here.

(A) of FIG. 75, (A) of FIG. 76, and (A) of FIG. 77 illustrate transmission states of gNB 3800, and the horizontal axes represent time. (A) of FIG. 76 illustrates the state in (A) of FIG. 75 later in time, and (A) of FIG. 77 illustrates the state in (A) of FIG. 76 later in time.

(B) of FIG. 75, (B) of FIG. 76, and (B) of FIG. 77 illustrate reception states of gNB 3800, and the horizontal axes represent time. (B) of FIG. 76 illustrates the state in (B) of FIG. 75 later in time, and (B) of FIG. 77 illustrates the state in (B) of FIG. 76 later in time.

(C) of FIG. 75, (C) of FIG. 76, and (C) of FIG. 77 illustrate transmission states of NR-UE #1 labeled 3801_1, and the horizontal axes represent time. (C) of FIG. 76 illustrates the state in (C) of FIG. 75 later in time, and (C) of FIG. 77 illustrates the state in (C) of FIG. 76 later in time.

(D) of FIG. 75, (D) of FIG. 76, and (D) of FIG. 77 illustrate reception states of NR-UE #1 labeled 3801_1, and the horizontal axes represent time. (D) of FIG. 76 illustrates the state in (D) of FIG. 75 later in time, and (D) of FIG. 77 illustrates the state in (D) of FIG. 76 later in time.

First, as in (C) of FIG. 75, NR-UE #1 labeled 3801_1 transmits frame 7500_3 in time #1. Note that frame 7500_3 is a unicast frame addressed to gNB 3800.

Thus, as in (B) of FIG. 75, gNB 3800 receives frame 7500_3 transmitted by NR-UE #1 labeled 3801_1. (The frame is frame 75012 in (B) of FIG. 75.)

Then, as in (B) of FIG. 75, gNB 3800 performs unicast LBT in time #2 to transmit a modulation signal to NR-UE #1 labeled 3801_1. Accordingly, unicast LBT 7502_2 is present in time #2 as in (B) of FIG. 75.

It is assumed that no signal is detected as a result of the unicast LBT performed by gNB 3800. Then, as in (A) of FIG. 75, gNB 3800 transmits frame 7503_1 in time #3. Note that frame 7503_1 includes at least a frame addressed to NR-UE #1 labeled 3801_1, and frame 7503_1 may also include a frame addressed another NR-UE.

Thus, as in (D) of FIG. 75, NR-UE #1 labeled 3801_1 receives the frame transmitted by gNB 3800. (The frame is frame 7504_4 in (D) of FIG. 75.)

When a signal is detected as a result of the unicast LBT performed by gNB 3800, however, the frame may not be transmitted.

After that, as in (B) of FIG. 75, broadcast LBT is performed in time #4 to transmit a modulation signal to one or more NR-UEs. Accordingly, broadcast LBT 7505_2 is present in time #4 as in (B) of FIG. 75.

It is assumed that there is a direction in which no signal is detected as a result of the broadcast LBT performed by gNB 3800. Then, as in (A) of FIG. 75, gNB 3800 transmits frame 7506_1 in time #5. Note that frame 7506_1 is a broadcast frame for one or more NR-UEs. Note also that a method of transmitting frame 7506_1, i.e., a broadcast frame has already been described, and the description thereof will be omitted. An operation of the broadcast LBT has already been described, and the description thereof will also be omitted.

Thus, as in (D) of FIG. 75, NR-UE #1 labeled 3801_1 receives the frame transmitted by gNB 3800. (The frame is frame 7507_4 in (D) of FIG. 75.)

When a signal is detected as a result of the broadcast LBT performed by gNB 3800 and it is determined not to transmit a frame, however, the frame may not be transmitted.

Then, as in (D) of FIG. 76, NR-UE #1 labeled 3801_1 performs unicast LBT in time #6 to transmit a modulation signal to gNB 3800. Accordingly, unicast LBT 7600_4 is present in time #6 as in (D) of FIG. 76.

It is assumed that no signal is detected as a result of the unicast LBT performed by NR-UE #1 labeled 38011. Then, as in (C) of FIG. 75, NR-UE #1 labeled 3801_1 transmits frame 7601_3 in time #7. Note that frame 7601_3 is a unicast frame addressed to gNB 3800.

Thus, as in (B) of FIG. 76, gNB 3800 receives the frame transmitted by NR-UE #1 labeled 3801_1. (The frame is frame 7602_2 in (B) of FIG. 76.)

When a signal is detected as a result of the unicast LBT performed by NR-UE #1 labeled 3801_1, however, the frame may not be transmitted.

After that, as in (B) of FIG. 76, gNB 3800 performs unicast LBT in time #8 to transmit a modulation signal to NR-UE #1 labeled 3801_1. Accordingly, unicast LBT 7603_2 is present in time #8 as in (B) of FIG. 76.

It is assumed that no signal is detected as a result of the unicast LBT performed by gNB 3800. Then, as in (A) of FIG. 76, gNB 3800 transmits frame 7603_1 in time #9. Note that frame 7603_1 includes at least a frame addressed to NR-UE #1 labeled 3801_1, and frame 7603_1 may also include a frame addressed another NR-UE.

Thus, as in (D) of FIG. 76, NR-UE #1 labeled 3801_1 receives the frame transmitted by gNB 3800. (The frame is frame 7605_4 in (D) of FIG. 76.)

When a signal is detected as a result of the unicast LBT performed by gNB 3800, however, the frame may not be transmitted.

Then, as in (D) of FIG. 76, NR-UE #1 labeled 3801_1 performs unicast LBT in time #10 to transmit a modulation signal to gNB 3800. Accordingly, unicast LBT 7606_4 is present in time #10 as in (D) of FIG. 76.

It is assumed that no signal is detected as a result of the unicast LBT performed by NR-UE #1 labeled 3801_1. Then, as in (C) of FIG. 77, NR-UE #1 labeled 3801_1 transmits frame 7700_3 in time #11. Note that frame 7700_3 is a unicast frame addressed to gNB 3800.

Thus, as in (B) of FIG. 77, gNB 3800 receives the frame transmitted by NR-UE #1 labeled 3801_1. (The frame is frame 7701_2 in (B) of FIG. 77.)

When a signal is detected as a result of the unicast LBT performed by NR-UE #1 labeled 3801_1, however, the frame may not be transmitted.

After that, as in (B) of FIG. 77, broadcast LBT is performed in time #12 to transmit a modulation signal to one or more NR-UEs. Accordingly, broadcast LBT 7702_2 is present in time #12 as in (B) of FIG. 77.

It is assumed that there is a direction in which no signal is detected as a result of the broadcast LBT performed by gNB 3800. Then, as in (A) of FIG. 77, gNB 3800 transmits frame 7703_1 in time #13.

Note that frame 7703_1 is a broadcast frame for one or more NR-UEs. Note also that a method of transmitting frame 7703_1, i.e., a broadcast frame has already been described, and the description thereof will be omitted. An operation of the broadcast LBT has already been described, and the description thereof will also be omitted.

Thus, as in (D) of FIG. 77, NR-UE #1 labeled 3801_1 receives the frame transmitted by gNB 3800. (The frame is frame 77044 in (D) of FIG. 77.)

When a signal is detected as a result of the broadcast LBT performed by gNB 3800 and it is determined not to transmit the frame, however, the frame may not be transmitted.

After that, as in (B) of FIG. 77, gNB 3800 performs unicast LBT in time #14 to transmit a modulation signal to NR-UE other than NR-UE #1 labeled 3801_1. Accordingly, unicast LBT 7705_2 is present in time #14 as in (B) of FIG. 77.

It is assumed that no signal is detected as a result of the unicast LBT performed by gNB 3800. Then, as in (A) of FIG. 77, gNB 3800 transmits frame 7706_1 in time #15. Note that frame 7706_1 includes at least one frame addressed to the NR-UE, and frame 7706_1 may also include a frame addressed another NR-UE.

When a signal is detected as a result of the unicast LBT performed by gNB 3800, however, the frame may not be transmitted.

Configuring unicast LBT and broadcast LBT separately by the gNB as described above produces an effect of configuring an LBT method (e.g., omni-directional LBT, directional LBT, etc.), the duration of performing LBT, etc, for each of "unicast LBT" and "broadcast LBT".

Note that the "unicast LBT" and "broadcast LBT" may be collectively referred to as LBT, and an LBT method (e.g., omni-directional LBT, directional LBT, etc.), the duration of performing LBT, etc. may be configured according to the purpose of "LBT performed for unicast transmission" and "LBT performed for broadcast transmission".

In the above description, gNB 3800 performs unicast LBT and broadcast LBT, for example. In this case, a description will be given of a specific example where both unicast LBT and broadcast LBT are directional LBT.

An exemplary operation of gNB 3800 performing broadcast LBT has already been described, and the description thereof will be omitted here.

An exemplary operation of gNB 3800 performing unicast LBT will be described.

As an example, a description will be given of a case where gNB 3800 performs unicast LBT using beamforming as in directional LBT.

FIG. 78A illustrates an exemplary unicast communication state between gNB 3800 and NR-UE #1 labeled 3801_1. Note that gNB 3800 can generate receive beam #0 labeled 7800_0, receive beam #1 labeled 7800_1, receive beam #2 labeled 7800_2, receive beam #3 labeled 7800_3, receive beam #4 labeled 7800_4, receive beam #5 labeled 7800_5, receive beam #6 labeled 7800_6, and receive beam #7 labeled 7800_7.

NR-UE #1 labeled 3801_1 transmits a modulation signal to gNB 3800 using transmit beam 7810.

Then, gNB 3800 receives the modulation signal transmitted by NR-UE #1 labeled 3801_1 using receive beam #2 labeled 7800_2.

FIG. 78B illustrates an exemplary unicast communication state between gNB 3800 and NR-UE #1 labeled 38011_. Note that gNB 3800 can generate transmit beam #0 labeled 7801_0, transmit beam #1 labeled 7801_1, transmit beam #2 labeled 7801_2, transmit beam #3 labeled 7801_3, transmit beam #4 labeled 7801_4, transmit beam #5 labeled 7801_5, transmit beam #6 labeled 7801_6, and transmit beam #7 labeled 7801_7.

Receive beam #2 labeled 7800_2 in FIG. 78A is associated with transmit beam #2 labeled 7801_2 in FIG. 78B. (Receive beam #i labeled **7800_*i* in FIG. 78A is associated with transmit beam #i labeled 7801_*i* in FIG. 78**B, where i is an integer from 0 to 7 (both inclusive)) Note that the detail of the association has already been described.

Thus, in a case where gNB 3800 transmits a modulation signal addressed to NR-UE #1 labeled 3801_1, when gNB 3800 transmits the modulation signal addressed to NR-UE #1 labeled 3801_1 using transmit beam #2 labeled 7801_2 as in FIG. 78B, NR-UE #1 labeled 3801_1 is likely to receive the modulation signal addressed to NR-UE #1 labeled 3801_1 by generating receive beam 7811_1.

In FIG. 78C, when gNB 3800 performs unicast LBT using receive beam #2 labeled 7800_2 and no signal is detected, gNB 3800 transmits a modulation signal addressed to NR-UE #1 labeled 3801_1 using transmit beam #2 labeled 7801_2 as in FIG. 78B..

As described above, when unicast LBT is performed, gNB 3800 generates receive beam #2 labeled 7800_2 to perform unicast LBT. Meanwhile, when broadcast LBT is performed, gNB 3800 generates a plurality of receive beams to perform broadcast LBT, which has already been described. Thus, the duration of unicast LBT performed by gNB 3800 (duration of detecting signals in unicast LBT) is characteristically shorter than the duration of broadcast LBT performed by gNB 3800 (duration of detecting signals in broadcast LBT).

Next, a variation of the above will be described.

As in FIG. 78A, NR-UE #1 labeled 3801_1 transmits a modulation signal to gNB 3800 using transmit beam 7810, and gNB 3800 receives the modulation signal transmitted by NR-UE #1 labeled 3801_1 using receive beam #2 labeled 7800_2.

FIG. 78D illustrates an exemplary unicast communication state between gNB 3800 and NR-UE #1 labeled 3801_1 other than that in FIG. 78B. Note that gNB 3800 can generate transmit beam #0 labeled 7801_0, transmit beam #1 labeled 7801_1, transmit beam #2 labeled 7801_2, transmit beam #3 labeled 7801_3, transmit beam #4 labeled 7801_4, transmit beam #5 labeled 7801_5, transmit beam #6 labeled 7801_6, and transmit beam #7 labeled 7801_7.

At this time, a receive beam generated by NR-UE #1 labeled 3801_1 possibly has wide directivity as in 7811_2, for example.

Thus, in a case where gNB 3800 transmits a modulation signal addressed to NR-UE #1 labeled 3801_1, when gNB 3800 transmits the modulation signal addressed to NR-UE #1 labeled 3801_1 using transmit beam #1 labeled 7801_1, transmit beam #2 labeled 7801_2, or transmit beam #3 labeled 7801_3 in FIG. 78D, NR-UE #1 labeled 3801_1 is likely to receive the modulation signal addressed to NR-UE #1 labeled 3801_1 by generating receive beam 7811_2.

In FIG. 78C, when gNB 3800 performs unicast LBT using receive beam #1 labeled 7800_2, receive beam #2 labeled 7800_2, and receive beam #3 labeled 00_2 and no signal is detected, gNB 3800 transmits a modulation signal addressed to NR-UE #1 labeled 3801_1 using transmit beam #1 labeled 7801_1, transmit beam #2 labeled 7801_2, or transmit beam #3 labeled 7801_3 as in FIG. 78D.

As described above, when unicast LBT is performed, gNB 3800 generates receive beam #1 labeled 7800_2, receive beam #2labeled 7800_2, and receive beam #3 labeled 00_2 to perform unicast LBT.

Meanwhile, when broadcast LBT is performed, gNB 3800 generates a plurality of receive beams to perform broadcast LBT, which has already been described. At this time, when the number of receive beams generated by gNB 3800 for performing broadcast LBT is greater than the number of receive beams generated for performing unicast LBT, the duration of unicast LBT performed by gNB 3800 (duration of detecting signals in unicast LBT) is characteristically shorter than the duration of broadcast LBT performed by gNB 3800 (duration of detecting signals in broadcast LBT).

Note that the number of receive beams generated by gNB 3800 for performing unicast LBT is not limited to the above example. Thus, in general, when the number of receive beams generated by gNB 3800 for performing broadcast LBT is greater than the number of receive beams generated for performing unicast LBT, the duration of unicast LBT performed by gNB 3800 (duration of detecting signals in unicast LBT) is characteristically shorter than the duration of broadcast LBT performed by gNB 3800 (duration of detecting signals in broadcast LBT).

Next, a description will be given of a case where omni directional LBT is performed in unicast LBT performed by gNB 3800. As in FIG. 78A, NR-UE #1 labeled 3801_1 transmits a modulation signal to gNB 3800 using transmit beam 7810, and gNB 3800 receives the modulation signal transmitted by NR-UE #1 labeled 3801_1 using receive beam #2 labeled 7800_2.

FIG. 78E illustrates an exemplary unicast communication state between gNB 3800 and NR-UE #1 labeled 38011 where gNB 3800 performs omni-directional LBT after the state of FIG. 78A.

For example, gNB 3800 generates an omni-directional receive beam as in 7802 and performs omni-directional LBT.

In a case where gNB 3800 generates an omni-directional receive beam, performs omni-directional LBT, no signal is detected, and gNB 3800 transmits a modulation signal addressed to NR-UE #1 labeled 3801_1, for example, when gNB 3800 transmits the modulation signal addressed to NR-UE #1 labeled 3801_1 using transmit beam #2 labeled 7801_2 as in FIG. 78B, NR-UE #1 labeled 3801_1 is likely to receive the modulation signal addressed to NR-UE #1 labeled 3801_1 by generating receive beam 7811_1.

As another method, in a case where gNB 3800 generates an omni-directional receive beam, performs omni-directional LBT, and no signal is detected, for example, gNB 3800 transmits a modulation signal addressed to NR-UE #1 labeled 3801_1 using transmit beam #1 labeled 7801_1, transmit beam #2 labeled 7801_2, or transmit beam #3 labeled 7801_3 as in FIG. 78D.

In the above-described manner, gNB 3800 generates an omni-directional receive beam and performs omni-directional LBT.

Meanwhile, when broadcast LBT is performed, gNB 3800 generates a plurality of receive beams to perform broadcast LBT, which has already been described.

At this time, when gNB 3800 generates many receive beams for performing broadcast LBT, the duration of unicast LBT (omni-directional LBT) performed by gNB 3800 (duration of signal detection in unicast LBT) is characteristically shorter than the duration of broadcast LBT performed by gNB 3800 (duration of signal detection in broadcast LBT).

A description will be given of a case where omni directional LBT is performed in broadcast LBT performed by gNB 3800.

When gNB 3800 communicates with NR-UE #1 labeled 3801_1, gNB 3800 performs unicast LBT using directional LBT. The operations at this time have already been described, and thus the detailed description thereof will be omitted.

FIG. 78E illustrates an exemplary communication state between gNB 3800 and NR-UE #1 labeled 3801_1 where gNB 3800 performs omni-directional LBT.

For example, gNB 3800 generates an omni-directional receive beam as in 7802 and performs broadband LBT using omni-directional LBT.

Meanwhile, when gNB 3800 performs unicast LBT, gNB 3800 generates a single receive beam or one or more receive beams to perform unicast LBT.

Thus, "the duration of unicast LBT performed by gNB 3800 (duration of signal detection in unicast LBT) is characteristically shorter than the duration of broadcast LBT performed by gNB 3800 (duration of signal detection in broadcast LBT)" or "the duration of unicast LBT performed by gNB 3800 (duration of signal detection in unicast LBT) is sometimes not much different from the duration of broadcast LBT performed by gNB 3800 (duration of signal detection in broadcast LBT)".

In addition, gNB 3800 may perform omni-directional LBT in both broadcast LBT and unicast LBT.

Although the term "broadcast" is used in the description in the present embodiment, the same can be implemented by replacing the term "broadcast" with "multicast" or "groupcast" in the present embodiment.

The operations of gNB described in the present embodiment may be performed by a communication apparatus such as a base station, repeater, terminal. NR-UE, etc. Further, the operations of NR-UE described in the present embodiment may be performed by a communication apparatus such as a base station, repeater, terminal, gNB, etc.

Note that the "broadcast frame". "broadcast frame group", and "broadcast signal" described in the present embodiment may be a paging channel (PCH), broadcast channel (BCH), downlink shared channel (DL-SCH), uplink shared channel (UL-SCH), broadcast control channel (BCCH), paging control channel (PCCH), common control channel (CCCH), common search space, physical broadcast channel (PBCH), physical downlink control channel (PDCCH), physical downlink shared channel (PDSCH), physical uplink control channel (PUCCH), or physical uplink shared channel (PUSCH).

In the present embodiment and disclosure, a description has been given of an example where an NR apparatus such as gNB and NR-UE detects "a signal transmitted by a first standard apparatus" by performing LBT, the NR apparatus may detect a signal transmitted by an apparatus of another standard by performing LBT.

Further, in the present embodiment and disclosure, a description has been given of an example where an NR apparatus detects "a signal transmitted by a first standard apparatus", the NR apparatus may detect a signal transmitted by an apparatus of another standard.

The present embodiment can be implemented with one or more or two or more transmit beams and one or more or two or more receive beams generated by an NR apparatus such as gNB and NR-UE.

As in the above, when gNB performs broadcast LBT and transmits a broadcast signal, a terminal can receive the broadcast signal with little interference. In addition, since the gNB transmits the broadcast signal to reduce interference, communication with little interference is allowed for other systems.

Note that, in the present embodiment, a description has been given of a case where gNB and NR-UE support LBT as an example, but gNB and NR-UE may support a mode of "not performing LBT" (No-LBT mode). When gNB and NR-UE perform the "No-LBT mode", the gNB and NR-UE transmit a unicast modulation signal and a broadcast modulation signal without performing LBT.

Further, gNB and NR-UE may switch and perform the "No-LBT mode" and the "mode of performing LBT" depending on, for example, time, place (country, cell, etc.), or the like.

Note that a communication apparatus such as gNB or NR-UE may include control circuitry and communication circuitry. The control circuitry may forma plurality of beams. The communication circuitry may transmit a plurality of broadcast frames by associating them with the plurality of beams respectively. At that time, the communication circuitry may transmit the plurality of broadcast frames based on the result of LBT in each of the directions of the plurality of beams.

In addition, data transmitted by the plurality of broadcast frames may be the same in all the plurality of broadcast frames or may be the same in some of the plurality of broadcast frames.

Embodiment 6

For example, the methods of transmitting a sector sweep reference signal by gNB have described in Embodiment 1 to Embodiment 4. In the present embodiment, methods of transmitting a broadcast signal using a sector sweep reference signal will be described.

FIGS. 1A, 1B, 1C. 39, and 40 have been described as examples of an apparatus configuration of the gNB. On the basis of the sector sweep method described in the present disclosure, the transmission methods of FIGS. 79A and 79B, for example, are considered as examples of a transmission method for sector-sweep reference signal 1001 in FIG. 10 transmitted by the gNB.

By way of example, the gNB can generate transmit beams according to 64 types of parameters.

The gNB includes 8 panel antennas of "panel antenna 1, panel antenna 2, panel antenna 3, panel antenna 4, panel antenna 5, panel antenna 6, panel antenna 7, and panel antenna 8", by way of example. Note that the number of antennas included in the gNB is merely an example, and the following description can be implemented as long as the gNB includes one or more or two or more panel antennas.

FIG. 79A illustrates an exemplary transmission method in the time axis for sector-sweep reference signals transmitted by the gNB including 8 panel antennas, and the horizontal axis represents time.

The gNB generates sector-sweep reference signals as 64 types of reference signals.

Thus, the gNB generates "reference signal 7901_1 according to 1st parameter" using the 1st parameter of beamforming and transmits the signal. Note that an exemplary generation method of this signal and exemplary information to be included have been described in other embodiments, and thus the description thereof will be omitted.

In addition, the gNB generates "reference signal 7901_2 according to 2nd parameter" using the 2nd parameter of beamforming and transmits the signal. Note that an exemplary generation method of this signal and exemplary information to be included have been described in other embodiments, and thus the description thereof will be omitted.

Then, the gNB generates "reference signal 7901_3 according to 3rd parameter" using the 3rd parameter of beamforming and transmits the signal. Note that an exemplary generation method of this signal and exemplary information to be included have been described in other embodiments, and thus the description thereof will be omitted.

The gNB generates "reference signal 7901_4 according to 4th parameter" using the 4th parameter of beamforming and transmits the signal. Note that an exemplary generation method of this signal and exemplary information to be included have been described in other embodiments, and thus the description thereof will be omitted.

At this time, "reference signal 7901_1 according to 1st parameter", "reference signal 7901_2 according to 2nd parameter", "reference signal 7901_3 according to 3rd parameter", and "reference signal 79014 according to 4th parameter" are transmitted using panel antenna 1 in FIG. 79A.

The gNB generates "reference signal 7901_5 according to 5th parameter" using the 5th parameter of beamforming and transmits the signal. Note that an exemplary generation method of this signal and exemplary information to be included have been described in other embodiments, and thus the description thereof will be omitted.

In addition, the gNB generates "reference signal 7901_6 according to 6th parameter" using the 6th parameter of beamforming and transmits the signal. Note that an exemplary generation method of this signal and exemplary information to be included have been described in other embodiments, and thus the description thereof will be omitted.

Then, the gNB generates "reference signal 7901_7 according to 7th parameter" using the 7th parameter of beamforming and transmits the signal. Note that an exemplary generation method of this signal and exemplary information to be included have been described in other embodiments, and thus the description thereof will be omitted.

The gNB generates "reference signal 7901_8 according to 8th parameter" using the 8th parameter of beamforming and transmits the signal. Note that an exemplary generation method of this signal and exemplary information to be included have been described in other embodiments, and thus the description thereof will be omitted.

At this time. "reference signal 7901_5 according to 5th parameter", "reference signal 7901_6 according to 6th parameter". "reference signal 7901_7 according to 7th parameter", and "reference signal 7901_8 according to 8th parameter" are transmitted using panel antenna 2 in FIG. 79A.

The gNB generates "reference signal 7901_61 according to 61st parameter" using the 61st parameter of beamforming and transmits the signal. Note that an exemplary generation method of this signal and exemplary information to be included have been described in other embodiments, and thus the description thereof will be omitted.

In addition, the gNB generates "reference signal 7901_62 according to 62nd parameter" using the 62nd parameter of beamforming and transmits the signal. Note that an exemplary generation method of this signal and exemplary information to be included have been described in other embodiments, and thus the description thereof will be omitted.

Then, the gNB generates "reference signal 7901_63 according to 63rd parameter" using the 63rd parameter of beamforming and transmits the signal. Note that an exemplary generation method of this signal and exemplary information to be included have been described in other embodiments, and thus the description thereof will be omitted.

The gNB generates "reference signal 7901_64 according to 64th parameter" using the 64th parameter of beamforming and transmits the signal. Note that an exemplary generation method of this signal and exemplary information to be included have been described in other embodiments, and thus the description thereof will be omitted.

At this time. "reference signal 7901_61 according to 61st parameter", "reference signal 7901_62 according to 62nd parameter", "reference signal 7901_63 according to 63rd parameter", and "reference signal 7901_64 according to 64th parameter" are transmitted using panel antenna 8 in FIG. 79A That is, the gNB generates "reference signal 7901_(4×i−3) according to (4×i−3)-th parameter" using the (4×i−3)-th parameter of beamforming and transmits the signal. Note that an exemplary generation method of this signal and exemplary information to be included have been described in other embodiments, and thus the description thereof will be omitted.

In addition, the gNB generates "reference signal 7901_(4×i−2) according to (4×i−2)-th parameter" using the (4×i−2)-th parameter of beamforming and transmits the signal.

Note that an exemplary generation method of this signal and exemplary information to be included have been described in other embodiments, and thus the description thereof will be omitted.

Then, the gNB generates "reference signal 7901_(4×i−1) according to (4×i−1)-th parameter" using the (4×i−1)-th parameter of beamforming and transmits the signal. Note that an exemplary generation method of this signal and exemplary information to be included have been described in other embodiments, and thus the description thereof will be omitted.

The gNB generates "reference signal 7901_(4×i) according to (4×i)-th parameter" using the (4×i)-th parameter of beamforming and transmits the signal. Note that an exemplary generation method of this signal and exemplary information to be included have been described in other embodiments, and thus the description thereof will be omitted.

At this time, "reference signal 7901_(4×i−3) according to (4×i−3)-th parameter", "reference signal 7901_(4×i−2) according to (4×i−2)-th parameter", "reference signal 7901_(4×i−1) according to (4×i−1)-th parameter", and "reference signal 7901_(4×i) according to (4×i)-th parameter" are transmitted using panel antenna i in FIG. 79A. Note that i is an integer from 1 to 8 (both inclusive) here.

Although 4 types of reference signals are generated per panel antenna in FIG. 79A, the present disclosure is not limited to this example, and the number of reference signals to be generated may be set in each panel antenna.

Next, a case will be considered where the gNB includes one or more or two or more antennas.

FIG. 79B illustrates an exemplary transmission method in the time axis for sector-sweep reference signals transmitted by the gNB including one or more or two or more antennas, and the horizontal axis represents time.

The gNB generates sector-sweep reference signals as 64 types of reference signals. Note that, in FIG. 79B, the same components as in FIG. 79A are denoted by the same reference signs.

The gNB generates "reference signal 7901_1 according to 1st parameter" using the 1st parameter of beamforming and transmits the signal. Note that an exemplary generation method of this signal and exemplary information to be included have been described in other embodiments, and thus the description thereof will be omitted.

In addition, the gNB generates "reference signal 7901_2 according to 2nd parameter" using the 2nd parameter of beamforming and transmits the signal. Note that an exemplary generation method of this signal and exemplary information to be included have been described in other embodiments, and thus the description thereof will be omitted.

Then, the gNB generates "reference signal 7901_63 according to 63rd parameter" using the 63rd parameter of beamforming and transmits the signal. Note that an exemplary generation method of this signal and exemplary information to be included have been described in other embodiments, and thus the description thereof will be omitted.

The gNB generates "reference signal 7901_64 according to 64th parameter" using the 64th parameter of beamforming and transmits the signal. Note that an exemplary generation method of this signal and exemplary information to be included have been described in other embodiments, and thus the description thereof will be omitted.

That is, the gNB generates "reference signal 7901_*k* according to k-th parameter" using the k-th parameter of beamforming and transmits the signal. Note that an exemplary generation method of this signal and exemplary information to be included have been described in other embodiments, and thus the description thereof will be omitted. In addition, k is an integer from 1 to 64 (both inclusive).

Although 64 types of reference signals are generated per panel antenna in FIG. 79B, the present disclosure is not limited to this example.

FIG. 80 illustrates an exemplary configuration of "reference signal 7901_*i* according to i-th parameter" illustrated in FIGS. 79A and 79B. Note that i is an integer from 1 to 64 (both inclusive) in FIGS. 79A and 79B.

As in FIG. 80, "reference signal 7901_*i* according to i-th parameter" is composed of, for example, broadcast control information 8001_*i*, broadcast data 8002_*i*, control information 8003_*i*, and data 8004_*i*.

At this time, "broadcast data 8002_1, broadcast data 8002_2, and broadcast data 8002_3, . . . , broadcast data 8002_62, broadcast data 8002_63, and broadcast data 8002_64" include the same data, for example. That is, when i is an integer from 1 to 64 (both inclusive) for broadcast data 8002_*i*, the same data is included, for example.

As another example, "broadcast data 8002_1, broadcast data 8002_2, and broadcast data 8002_3, . . . , broadcast data 8002_62, broadcast data 8002_63, and broadcast data 8002_64" may be configured to include the same content although "the condition, such as a compression ratio and a configuration, is different". That is, when i is an integer from 1 to 64 (both inclusive) for broadcast data 8002_*i*, it may be configured to include the same content although "the condition, such as a compression ratio and a configuration, is different".

Further, "broadcast data 8002_1, broadcast data 8002_2, and broadcast data 8002_3, . . . , broadcast data 8002_62, broadcast data 8002_63, and broadcast data 8002_64" may include partially the same data. That is, when i is an integer from 1 to 64 (both inclusive) for broadcast data 8002_*i*, partially the same data may be included.

Broadcast data 8002_*i* is data to be transmitted to a plurality of terminals. For example, in FIG. 38, broadcast data 8002_*i* is data transmitted by gNB 3800, and gNB 3800 is transmitted to "NR-UE #1 labeled 3801_1, NR-UE #2 labeled 3801_2, NR-UE #3 labeled 3801_3. NR-UE #4 labeled 3801_4, NR-UE #5 labeled 3801_5. NR-UE #6 labeled 3801_6, and NR-UE #7 labeled 3801_7" if possible.

"Broadcast control information 8001_1, broadcast control information 8001_2, broadcast control information 8001_3, . . . , broadcast control information 8001_62, broadcast control information 8001_63, and broadcast control information 8001_64" may include the same data or different data from each other. That is, when i is an integer from 1 to 64 (both inclusive) for broadcast control information 8001_*i*, the same data may be included, or different data from each other may be included.

Examples of "broadcast control information 8001_1, broadcast control information 8001_2, broadcast control information 8001_3, . . . , broadcast control information 8001_62, broadcast control information 8001_63, and broadcast control information 8001_64" include higher layer signaling, radio resource control (RRC), layer 1 (L1) signaling, downlink control information (DCI), broadcast information, synchronization signals/physical broadcast channel (SS/PBCH) block, PBCH, etc., but the examples are not limited to these. Note that one of the features is to use "information and/or signal" other than synchronization signals (SS) as the control information.

As in FIG. 80, "reference signal 7901_*i* according to i-th parameter" may include "control information 8003_*i* and data 8004_*i*" in addition to "broadcast control information 8001_*i* and broadcast data 8002_*i*". Note that specific examples of data and information included in "control information 8003_*i* and data 8004_*i*" in "reference signal 7901_*i* according to i-th parameter" have already been described in other embodiments, etc., and thus the description thereof will be omitted.

More terminals can receive broadcast data when broadcast data is transmitted using sector-sweep reference signals as described above. This is because a sector-sweep reference signal generates transmit/receive beams in a plurality of directions so that the signal is delivered to more terminals.

As described above, more terminals can receive broadcast data by the gNB transmitting broadcast data using sector-sweep reference signals, and this produces an effect of building a stable system.

In the above, a method of transmitting broadcast data by the gNB using sector-sweep reference signals has been described with reference to FIGS. 79A, 79B, and 80. When the gNB transmits a modulation signal using a plurality of carriers, sector-sweep reference signals are generated and transmitted in each carrier, and in this case, the same as the above can be implemented when broadcast data is transmitted using a sector-sweep reference signal.

LBT may be performed before the gNB transmits a sector-sweep reference signal including broadcast data. For example, the gNB performs "LBT described in FIGS. 48A, 48B, 50B, 50C, 51B, 51C, 52A, 52B, 52C, 56B, 56C, 58, 60, 62, 64, 67A, 67B, 67C, etc." and recognizes a direction (beam) in which a signal is detected and a direction (beam) in which no signal is detected. The gNB then determines, based on a result of the "direction (beam) in which a signal is detected and direction (beam) in which no signal is detected", "reference signal 7901_*k* according to k-th parameter" to transmit among "reference signal 7901_1 according to 1st parameter", "reference signal 7901_2 according to 2nd parameter". . . . , "reference signal 7901_63 according to 63rd parameter", "reference signal 7901_64 according to 64th parameter" in FIGS. 79A and 79B. At this time, "reference signal 7901_*k* according to k-th parameter" has the configuration in FIG. 80, for example.

Note that, although the example where LBT is performed before a sector-sweep reference signal including broadcast data is transmitted has been described above, LBT need not be performed. A detailed description of this case will be given below.

For example, "reference signal 7901_1 according to 1st parameter", "reference signal 7901_2 according to 2nd parameter", . . . , "reference signal 7901_63 according to 63rd parameter", "reference signal 7901_64 according to 64th parameter" have different beamforming directions (beams) from each other in FIGS. 79A and 79B. Thus, when the duration of "reference signal 7901_*k* according to k-th parameter" is set to a value equal to or less than "the maximum value of the duration that is not considered as interference in a signal (this maximum value is referred to as "maximum value A" here)", an apparatus of another system and an NR apparatus do not consider "reference signal 7901_*k* according to k-th parameter" as an interference signal.

Thus, "reference signal 7901_*k* according to k-th parameter" is configured so that the duration of "reference signal 7901_*k* according to k-th parameter" is equal to or less than maximum value A. That is, when "reference signal 7901_*k* according to k-th parameter" is configured as in FIG. 80, for example, the data amount of "broadcast control information 8001_*k*, broadcast data 8002_*k*, control information 8003_*k*, and data 8004_*k*" composing "reference signal 7901_*k* according to k-th parameter" is limited so that the duration of "reference signal 7901_*k* according to k-th parameter" is equal to or less than maximum value A.

This configuration produces an effect that the gNB can transmit "reference signal 7901_*k* according to k-th parameter" without causing interference to another system and an NR apparatus.

Note that the data amount of "broadcast control information 8001_*k*, broadcast data 8002_*k*, control information 8003_*k*, and data 8004_*k*" composing "reference signal 7901_*k* according to k-th parameter" may be configured so that the duration of "reference signal 7901_*k* according to k-th parameter" is equal to or greater than A. At this time, the gNB may or may not perform LBT.

FIGS. 79A and 79B illustrate assignment of "reference signal 7901_*i* according to i-th parameter" on the time axis, but a vertical axis may be present and the vertical axis may represent frequency in FIGS. 79A and 79B. In this case, a configuration of "reference signal 7901_*i* according to i-th parameter" on the frequency axis is illustrated in FIG. 81A.

FIG. 81A illustrates an exemplary configuration of "reference signal 7901_*i* according to i-th parameter" illustrated in FIGS. 79A and 79B. Note that i is an integer from 1 to 64 (both inclusive) in FIGS. 79A and 79B. In addition, the vertical axis represents frequency in FIG. 81A.

As in FIG. 81A, it is assumed that "reference signal 7901_*i* according to i-th parameter" is composed of, for example, "first frequency resource signal 8101_[i, 1] of reference signal according to i-th parameter", "second frequency resource signal 8101_[i, 2] of reference signal according to i-th parameter", "third frequency resource signal 8101_[i, 3] of reference signal according to i-th parameter", . . . , "Z-th frequency resource signal 8101_[i, Z] of reference signal according to i-th parameter". Note that Z is an integer equal to or greater than 1 or an integer equal to or greater than 2. That is, "k-th frequency resource signal 8101_[i, k] of reference signal according to i-th parameter" is present in "reference signal 7901_*i* according to i-th parameter". Note that k is an integer from 1 to Z (both inclusive).

FIG. 81B illustrates an exemplary configuration of "k-th frequency resource signal 8101_[i, k] of reference signal according to i-th parameter" illustrated in FIG. 81A. Note that i is an integer from 1 to 64 (both inclusive) and k is an integer from 1 to Z (both inclusive). As illustrated in FIG. 81B, it is assumed that "k-th frequency resource signal 8101_[i, k] of reference signal according to i-th parameter" is composed of broadcast control information 811/1_[i, k], broadcast data 8112_[i, k], control information 8113_[i, k], and data 8114_[i, k].

In this case, the following two configuration methods are considered for broadcast data 8112_[i, k].

First Method:

""Broadcast data 8112_[1, 1], broadcast data 8112_[1, 2], . . . , and broadcast data 8112_[1, Z]"" include the same data, for example.

In addition. "broadcast data 8112_[2, 1], broadcast data 8112_[2, 2], . . . , and broadcast data 8112_[2, Z]" include the same data, for example.

. . . .

"Broadcast data 8112_[63, 1], broadcast data 8112_[63, 2], . . . , and broadcast data 8112_[63, Z]" include the same data, for example.

"Broadcast data 8112_[64, 1], broadcast data 8112_[64, 2], . . . , and broadcast data 8112_[64, Z]" include the same data, for example.

As another example,

"Broadcast data 8112_[1, 1], broadcast data 8112_[1, 2], . . . , and broadcast data 8112_[1, Z]" may be configured to include the same content although "the condition, such as a compression ratio and a configuration, is different".

In addition, "broadcast data 8112_[2, 1], broadcast data 8112_[2, 2], . . . , and broadcast data 8112_[2, Z]" may be configured to include the same content although "the condition, such as a compression ratio and a configuration, is different".

. . . .

"Broadcast data 8112_[63, 1], broadcast data 8112_[63, 2], . . . , and broadcast data 8112_[63, Z]" may be configured to include the same content although "the condition, such as a compression ratio and a configuration, is different".

"Broadcast data 8112_[64, 1], broadcast data 8112_[64, 2], . . . , and broadcast data 8112_[64, Z]" may be configured to include the same content although "the condition, such as a compression ratio and a configuration, is different".

As still another example,

"Broadcast data 8112_[1, 1], broadcast data 8112_[1, 2], . . . , and broadcast data 8112_[1, Z]" may include partially the same data.

. . . .

In addition. "broadcast data 8112_[2, 1], broadcast data 8112_[2, 2], . . . , and broadcast data 8112_[2. Z]" may include partially the same data.

"Broadcast data 8112_[63, 1], broadcast data 8112_[63, 2], . . . , and broadcast data 8112_[63, Z]" may include partially the same data.

"Broadcast data 8112_[64, 1], broadcast data 8112_[64, 2], . . . , and broadcast data 8112_[64, Z]" may include partially the same data.

Broadcast data 8112_[i, k] is data to be transmitted to a plurality of terminals. For example, in FIG. 38, broadcast data 8112_[i, k] is data transmitted by gNB 3800, and gNB 3800 is transmitted to "NR-UE #1 labeled 3801_1. NR-UE #2 labeled 3801_2. NR-UE #3 labeled 3801_3, NR-UE #4 labeled 3801_4, NR-UE #5 labeled 3801_5, NR-UE #6 labeled 3801_6, and NR-UE #7 labeled 3801_T" if possible.

Second Method:

The following is the second method.

""Broadcast data 8112_[1, 1], broadcast data 8112_[1, 2], . . . , broadcast data 8112_[1, Z]"", ""broadcast data 8112_[2, 1], broadcast data 8112_[2, 2], . . . , broadcast data 8112_[2, Z]"",

. . . .

""broadcast data 8112_[63, 1], broadcast data 8112_[63, 2], . . . , broadcast data 8112_[63, Z]"", ""broadcast data 8112_[64, 1], broadcast data 8112_[64, 2], . . . , broadcast data 8112_[64, Z]"" include the same data, for example.

As another example,

""Broadcast data 8112_[1, 1], broadcast data 8112_[1, 2], . . . , broadcast data 8112_[1, Z]"", ""broadcast data 8112_[2, 1], broadcast data 8112_[2, 2], . . . , broadcast data 8112_[2, Z]"", ""broadcast data 8112_[63, 1], broadcast data 8112_[63, 2], . . . , broadcast data 8112_[63, Z]"", ""broadcast data 8112_[64, 1], broadcast data 8112_[64, 2], . . . , broadcast data 8112_[64, Z]"" may be configured to include the same content although "the condition, such as a compression ratio and a configuration, is different".

As still another example,

""Broadcast data 8112_[1, 1], broadcast data 8112_[1, 2], . . . , broadcast data 8112_[1, Z]"", ""broadcast data 8112_[2, 1], broadcast data 8112_[2, 2], . . . , broadcast data 8112_[2, Z]"", ""broadcast data 8112_[63, 1], broadcast data 8112_[63, 2], . . . , broadcast data 8112_[63, Z]"", ""broadcast data 8112_[64, 1], broadcast data 8112_[64, 2], . . . , broadcast data 8112_[64, Z]"" may include partially the same data.

Broadcast data 8112_[i, k] is data to be transmitted to a plurality of terminals. For example, in FIG. 38, broadcast data 8112_[i, k] is data transmitted by gNB 3800, and gNB 3800 is transmitted to "NR-UE #1 labeled 3801_1, NR-UE #2 labeled 3801_2, NR-UE #3 labeled 3801_3. NR-UE #4 labeled 3801_4, NR-UE #5 labeled 3801_5, NR-UE #6 labeled 3801_6, and NR-UE #7 labeled 3801_7" if possible.

""Broadcast control information 8111_[1, 1], broadcast control information 8111_[1, 2], . . . , broadcast control information 8111_[1, Z]"", ""broadcast control information 8111_[2, 1], broadcast control information 8111_[2, 2], . . . , broadcast control information 8111_[2, Z]"",

. . . .

""broadcast control information 8111_[63, 1], broadcast control information 8111_[63, 2], . . . , broadcast control information 8111_[63, Z]"", ""broadcast control information 8111_[64, 1], broadcast control information 8111_[64, 2], . . . , broadcast control information 8111_[64, Z]"" may include the same data or different data from each other.

In addition, examples of ""broadcast control information 8111_[1, 1], broadcast control information 8111_[1, 2], . . . , broadcast control information 8111_[1, Z]"", ""broadcast control information 8111_[2, 1], broadcast control information 8111_[2, 2], . . . , broadcast control information 8111_[2, Z]"", ""broadcast control information 8111_[63, 1], broadcast control information 8111_[63, 2], . . . , broadcast control information 8111_[63, Z]"", ""broadcast control information 8111_[64, 1], broadcast control information 8111_[64, 2], . . . , broadcast control information 8111_[64, Z]"" include higher layer signaling, radio resource control (RRC), layer 1 (L1) signaling, downlink control information (DCI), broadcast information, synchronization signals/physical broadcast channel (SS/PBCH) block, PBCH, etc., but the examples are not limited to these. Note that one of the features is to use "information and/or signal" other than synchronization signals (SS) as the control information.

As in FIG. 81B, "k-th frequency resource signal 8101_[i, k] of reference signal according to i-th parameter" may include "control information 8113_[i, k] and data 8114_[i, k]" in addition to "broadcast control information 8111_[i, k] and broadcast data 8112_[i, k]". Note that specific examples of data and information included in "control information 8113_[i, k] and data 8114_[i, k]" in "k-th frequency resource signal 8101_[i, k] of reference signal according to i-th parameter" have already been described in other embodiments, etc., and thus the description thereof will be omitted.

As described above, more terminals can receive broadcast data by the gNB transmitting broadcast data using sector-sweep reference signals, and this produces an effect of building a stable system.

LBT may be performed before the gNB transmits a sector-sweep reference signal including broadcast data. For example, the gNB performs "LBT described in FIGS. 48A, 48B, 50B, 50C, 51B, 51C, 52A, 52B, 52C, 56B, 56C, 58, 60, 62, 64, 67A, 67B, 67C, etc." and recognizes a direction (beam) in which a signal is detected and a direction (beam) in which no signal is detected. The gNB then determines, based on a result of the "direction (beam) in which a signal is detected and direction (beam) in which no signal is detected", "k-th frequency resource signal 8101_[i, k] of reference signal according to i-th parameter" to transmit among:

""broadcast control information 8111_[1, 1], broadcast control information 8111_[1, 2], . . . , broadcast control information 8111_[Z]"";

""broadcast control information 8111_[2, 1], broadcast control information 8111_[2, 2], . . . , broadcast control information 8111_[2, Z]"";

. . . .

""broadcast control information 8111_[63, 1], broadcast control information 8111_[63, 2], . . . , broadcast control information 8111_[63, Z]"";

""broadcast control information 8111_[64, 1], broadcast control information 8111_[64, 2], . . . , broadcast control information 8111_[64, Z]"". At this time, "k-th frequency resource signal 8101_[i, k] of reference signal according to i-th parameter" has the configuration in FIG. 81B, for example.

Note that, although the example where LBT is performed before a sector-sweep reference signal including broadcast data is transmitted has been described above, LBT need not be performed. A detailed description of this case will be given below.

As in FIG. 81A, for example, "h-th frequency resource signal 8101_[1, h] of reference signal according to first parameter", "h-th frequency resource signal 8101_[2, h] of reference signal according to second parameter", "h-th frequency resource signal 8101_[3, h] of reference signal according to third parameter", . . . , "h-th frequency resource signal 8101_[64, h] of reference signal according to 64th parameter" have different directions (beams) of beamforming from one another. Note that h is an integer from 1 to Z (both inclusive). Thus, when the duration of h-th frequency resource signal 8101_[i, h] of reference signal according to i-th parameter is set to a value equal to or less than "the maximum value of the duration that is not considered as interference in a signal (this maximum value is referred to as "maximum value A" here)", an apparatus of another system and an NR apparatus do not consider h-th frequency resource signal 8101_[i, h] of reference signal according to i-th parameter as an interference signal.

Thus, "h-th frequency resource signal 8101_[i, h] of reference signal according to i-th parameter" is configured so that the duration of h-th frequency resource signal 8101_[i, h] of reference signal according to i-th parameter is equal to or less than maximum value A. That is, when "h-th frequency resource signal 8101_[i, h] of reference signal according to i-th parameter" is configured as in FIG. 81B, for example, the data amount of "broadcast control information 8111_[i, h], broadcast data 8112_[i, h], control information 8113_[i, h], and data 8114_[i, h]" composing "h-th frequency resource signal 8101_[i, h] of reference signal according to i-th parameter"is limited so that the duration of" h-th frequency resource signal 8101_[i, h] of reference signal according to i-th parameter" is equal to or less than maximum value A.

This configuration produces an effect that the gNB can transmit "h-th frequency resource signal 8101_[i, h] of reference signal according to i-th parameter" without causing interference to another system and an NR apparatus.

Note that the data amount of "broadcast control information 8111_[i, h], broadcast data 8112_[i, h], control information 8113_[i, h], and data 8114_[i, h]" composing "h-th frequency resource signal 8101_[i, h] of reference signal according to i-th parameter" may be configured so that the duration of "h-th frequency resource signal 8101_[i, h] of reference signal according to i-th parameter" is equal to or greater than A. At this time, the gNB may or may not perform LBT.

The method of transmitting broadcast data described with reference to FIGS. 79A, 79B, 80, 81A, 81B, etc. is referred to as a "broadcast method using sector sweep" here.

Next, a description will be given of a specific example where both broadcast described in Embodiment 5 and broadcast described in the present embodiment are applied.

FIG. 82A illustrates an exemplary transmission and reception state of the gNB, and the horizontal axis represents time.

At this time, it is assumed that the gNB is an apparatus capable of performing LBT and operates in the mode of performing LBT.

As illustrated in FIG. 82A, the gNB transmits a modulation signal by "broadcast method 8201 using sector sweep" described in the present embodiment, and more terminals can receive broadcast data. In the case of FIG. 82A, the gNB does not perform LBT for transmitting a modulation signal before transmitting the modulation signal by "broadcast method 8201 using sector sweep".

At this time, the gNB is an apparatus capable of performing LBT and operates in the mode of performing LBT. Thus, when "reference signal 7901_*k* according to k-th parameter" is configured as in FIG. 80, for example, in "broadcast method 8201 using sector sweep", the data amount of "broadcast control information 8001_*k*, broadcast data 8002_*k*, control information 8003_*k*, and data 8004_*k*" composing "reference signal 7901_*k* according to k-th parameter" is limited so that the duration of "reference signal 7901_*k* according to k-th parameter" is equal to or less than maximum value A.

When "h-th frequency resource signal 8101_[i, h] of reference signal according to i-th parameter" is configured as in FIG. 81B, the data amount of "broadcast control information 8111_[i, h], broadcast data 8112_[i, h], control information 8113_[i, h], and data 8114_[i, h]" composing "h-th frequency resource signal 8101_[i, h] of reference signal according to i-th parameter" is limited so that the duration of "h-th frequency resource signal 8101_[i, h] of reference signal according to i-th parameter" is equal to or less than maximum value A.

Meanwhile, it is assumed that the gNB transmits broadcast frame (group) 8221 as described in Embodiment 5 as in FIG. 82A. In this case, the gNB is an apparatus capable of performing LBT and operates in the mode of performing LBT, and thus the gNB performs broadcast LBT 8221 before transmitting broadcast frame (group) 8221. Note that methods of broadcast LBT 221 and transmitting a broadcast frame (group) performed by the gNB have already been described in Embodiment 5, and the description thereof will be omitted.

As described above, controlling whether to perform LBT by a modulation signal transmitted using both the "broadcast method using sector sweep" and "transmission by a broadcast frame (group)" reduces interference and produces an effect of improving the communication efficiency.

FIG. 82B illustrates a transmission and reception state of the gNB other than that in FIG. 82A. The horizontal axis represents time.

It is assumed that the gNB is either "an apparatus not capable of performing LBT" or "an apparatus capable of performing LBT but operates in the mode of not performing LBT".

In this case, as illustrated in FIG. 82B, the gNB transmits a modulation signal by "broadcast method 8201 using sector sweep" described in the present embodiment, and more terminals can receive broadcast data. In the case of FIG. 82B, the gNB does not perform LBT for transmitting a modulation signal before transmitting the modulation signal by "broadcast method 8201 using sector sweep".

In addition, it is assumed that the gNB transmits broadcast frame (group) 8221 as described in Embodiment 5 as in FIG. 82B. At this time, the gNB does not perform LBT for transmitting a frame (group) before transmitting "broadcast frame (group) 8221".

As another example, it is assumed that the gNB is an apparatus capable of performing LBT and operates in the mode of performing LBT.

In this case, as illustrated in FIG. 82B, the gNB transmits a modulation signal by "broadcast method 8201 using sector sweep" described in the present embodiment, and more terminals can receive broadcast data. In the case of FIG. 82B, the gNB does not perform LBT for transmitting a modulation signal before transmitting the modulation signal by "broadcast method 8201 using sector sweep".

At this time, the gNB is an apparatus capable of performing LBT and operates in the mode of performing LBT. Thus, when "reference signal 7901_*k* according to k-th parameter" is configured as in FIG. 80, for example, in "broadcast method 8201 using sector sweep", the data amount of "broadcast control information 8001_*k*, broadcast data 8002_*k*, control information 8003_*k*, and data 8004_*k*" composing "reference signal 7901_*k* according to k-th parameter" is limited so that the duration of "reference signal 7901_*k* according to k-th parameter" is equal to or less than maximum value A.

When "h-th frequency resource signal 8101_[i, h] of reference signal according to i-th parameter" is configured as in FIG. 81B, the data amount of "broadcast control information 8111_[i, h], broadcast data 8112_[i, h], control information 8113_[i, h], and data 8114_[i, h]" composing "h-th frequency resource signal 8101_[i, h] of reference signal according to i-th parameter" is limited so that the duration of "h-th frequency resource signal 8101_[i, h] of reference signal according to i-th parameter" is equal to or less than maximum value A.

In addition, it is assumed that the gNB transmits broadcast frame (group) 8221 as described in Embodiment 5 as in FIG. 82B. At this time, the gNB is an apparatus capable of performing LBT and operates in the mode of performing LBT. In this case, broadcast LBT is not performed before broadcast frame (group) 8221 is transmitted. This is because durations of broadcast frames composing broadcast frame (group) 8221 are short, and no interference is caused to another system or an NR apparatus even when the gNB transmits broadcast frame (group) 8221.

FIG. 82C illustrates an exemplary transmission and reception state of the gNB other than those in FIGS. 82A and 82B, and the horizontal axis represents time.

At this time, it is assumed that the gNB is an apparatus capable of performing LBT and operates in the mode of performing LBT.

As illustrated in FIG. 82C, the gNB transmits a modulation signal by "broadcast method 8201 using sector sweep" described in the present embodiment, and more terminals can receive broadcast data. In the case of FIG. 82C, the gNB performs LBT for transmitting a modulation signal before transmitting the modulation signal by "broadcast method 8201 using sector sweep".

At this time, the gNB is an apparatus capable of performing LBT and operates in the mode of performing LBT. Thus, when "reference signal 7901_*k* according to k-th parameter" is configured as in FIG. 80, for example, in "broadcast method 8201 using sector sweep", the data amount of "broadcast control information 8001_*k*, broadcast data 8002_*k*, control information 8003_*k*, and data 8004_*k*" composing "reference signal 7901_*k* according to k-th parameter" need not be limited so that the duration of "reference signal 7901_*k* according to k-th parameter" is equal to or less than maximum value A. The duration of "reference signal 7901_*k* according to k-th parameter" may be set to be equal to or less than maximum value A, however.

When "h-th frequency resource signal 8101_[i, h] of reference signal according to i-th parameter" is configured as in FIG. 81B, the data amount of "broadcast control information 8111_[i, h], broadcast data 8112_[i, h], control information 8113_[i, h], and data 8114_[i, h]" composing "h-th frequency resource signal 8101_[i, h] of reference signal according to i-th parameter" need not be limited so that the duration of "h-th frequency resource signal 8101_[i, h] of reference signal according to i-th parameter" is equal to or less than maximum value A.

Meanwhile, it is assumed that the gNB transmits broadcast frame (group) 8221 as described in Embodiment 5 as in FIG. 82C. In this case, the gNB is an apparatus capable of performing LBT and operates in the mode of performing LBT, and thus the gNB performs broadcast LBT 8221 before transmitting broadcast frame (group) 8221. Note that methods of broadcast LBT 221 and transmitting a broadcast frame (group) performed by the gNB have already been described in Embodiment 5, and the description thereof will be omitted.

Note that the LBT state of the gNB may be switched overtime like FIG. 82A, FIG. 82B, and FIG. 82C depending on the situation or location of an apparatus.

As described above, controlling whether to perform LBT by a modulation signal transmitted using both the "broadcast method using sector sweep" and "transmission by a broadcast frame (group)" reduces interference and produces an effect of improving the communication efficiency.

Note that the gNB may perform unicast transmission and unicast LBT although not illustrated in FIGS. 82A, 82B, and 82C.

In the present embodiment, a broadcast method using sector sweep, the specific operations, the usage, etc. have been described. The above description is merely an example, and the implementation method is not limited to the above description.

A communication apparatus such as gNB or NR-UE may include control circuitry and communication circuitry. The control circuitry may include broadcast data in each of a plurality of reference signals for sector sweep. The communication circuitry may transmit the plurality of reference signals including broadcast data.

The communication circuitry may transmit the broadcast data based on the result of LBT in each of the transmission directions of the plurality of reference signals. Also, the communication circuitry may transmit the broadcast data without performing LBT when the transmission time of each of the plurality of reference signals is shorter than a predetermined time (e.g., 8 μsecond (sec)).

Embodiment 7

In other embodiments, exemplary specific methods of LBT performed by gNB and NR-UE have been described. Meanwhile, gNB and NR-UE may support a mode of "not performing LBT" (No-LBT mode). In the present embodiment, a description will be given of a case where gNB and NR-UE support a mode of "performing LBT described in other embodiments or LBT" (LBT mode) and a mode of "not performing LBT" (No-LBT mode).

The description will be given with an example where gNB performs communication with NR-UE as in FIG. 38 or 55.

The gNB and NR-UE have a configuration in FIG. 1A, 1B, 1C, 39 or 40, for example. The NR-UE transmits a modulation signal including "UE capability information" 8300 illustrated in FIG. 83A to the gNB.

At this time, "UE capability information" 8300 may include "information 8311 on LBT mode" and "information 8312 on No-LBT mode" as illustrated in FIG. 83A.

For example, the NR-UE that is present in an area where LBT is not required may transmit, to the gNB, "information 8311 on LBT mode" including information "whether it is possible to perform LBT". The gNB can know "whether the NR-UE can perform LBT" by obtaining "information 8311 on LBT mode". Note that, when there are a plurality of terminals, each of the terminals may transmit UE capability information 8300 including "information 8311 on LBT mode", and the gNB can know the state of "whether it is possible to perform LBT" of each terminal.

For example, the NR-UE that is present in an area where LBT is not required may transmit, to the gNB, "information 8312 on No-LBT mode" including information "whether it supports a mode of not performing LBT". The gNB can know "whether the NR-UE supports a mode of not performing LBT" by obtaining "information 8312 on No-LBT mode". Note that, when there are a plurality of terminals, each of the terminals may transmit UE capability information 8300 including "information 8312 on No-LBT mode", and the gNB can know the state of "whether it supports a mode of not performing LBT" of each terminal.

For example, the NR-UE that is present in an area where LBT is required need not transmit "information 8311 on LBT mode" to the gNB. Likewise, the NR-UE that is present in an area where LBT is required need not transmit "information 8312 on No-LBT mode" to the gNB.

As another method, the NR-UE that is present in an area where LBT is required may transmit "information 8311 on LBT mode" to the gNB. At this time, the NR-UE and gNB may determine that "information 8311 on LBT mode" is not valid. At this time, the NR-UE and gNB may determine that "information 8311 on LBT mode" is not valid. Likewise, the NR-UE that is present in an area where LBT is required may transmit "information 8312 on No-LBT mode" to the gNB. At this time, the NR-UE and gNB may determine that "information 8312 on No-LBT mode" is not valid.

For example, the NR-UE that is present in an area where No-LBT is required need not transmit "information 8311 on LBT mode" to the gNB. Likewise, the NR-UE that is present in an area where No-LBT is required need not transmit "information 8312 on No-LBT mode" to the gNB.

As still another method, the NR-UE that is present in an area where No-LBT is required may transmit "information 8311 on LBT mode" to the gNB. At this time, the NR-UE and gNB may determine that "information 8311 on LBT mode" is not valid. Likewise, the NR-UE that is present in an area where No-LBT is required may transmit "information 8312 on No-LBT mode" to the gNB. At this time, the NR-UE and gNB may determine that "information 8312 on No-LBT mode" is not valid.

The gNB transmits a modulation signal including "gNB capability information" 8300 illustrated in FIG. 83A to NR-UE.

At this time, "gNB capability information" 8300 may include "information 8311 on LBT mode" and "information 8312 on No-LBT mode" as illustrated in FIG. 83A.

For example, the gNB that is present in an area where LBT is not required may transmit, to the NR-UE (and another gNB), "information 8311 on LBT mode" including information "whether it is possible to perform LBT". The NR-UE (and another gNB) can know "whether the gNB can perform LBT" by obtaining "information 8311 on LBT mode". Note that, when there are a plurality of terminals, the gNB may transmit, to each of the terminals, gNB capability information 8300 including "information 8311 on LBT mode", and the NR-UE (and another gNB) can know the state of "whether it is possible to perform LBT" for each terminal.

For example, the gNB that is present in an area where LBT is not required may transmit, to the NR-UE (and another gNB), "information 8312 on No-LBT mode" including information "whether it supports a mode of not performing LBT". The NR-UE (and another gNB) can know "whether the gNB supports a mode of not performing LBT" by obtaining "information 8312 on No-LBT mode". Note that, when there are a plurality of terminals, the gNB may transmit, to each of the terminals, gNB capability information 8300 including "information 8312 on No-LBT mode", and the NR-UE (and another gNB) can know the state of "whether it supports a mode of not performing LBT" for each terminal.

For example, the gNB that is present in an area where LBT is required need not transmit "information 8311 on LBT mode" to the NR-UE (and another gNB). Likewise, the gNB that is present in an area where LBT is required need not transmit "information 8312 on No-LBT mode" to the NR-UE (and another gNB).

As another method, the gNB that is present in an area where LBT is required may transmit "information 8311 on LBT mode" to the NR-UE (and another gNB). At this time, the NR-UE and gNB may determine that "information 8311 on LBT mode" is not valid. Likewise, the gNB that is present in an area where LBT is required may transmit "information 8312 on No-LBT mode" to the NR-UE (and another gNB). At this time, the NR-UE and gNB may determine that "information 8312 on No-LBT mode" is not valid.

For example, the gNB that is present in an area where No-LBT is required need not transmit "information 8311 on LBT mode" to the NR-UE (and another gNB). Likewise, the gNB that is present in an area where No-LBT is required need not transmit "information 8312 on No-LBT mode" to the NR-UE (and another gNB).

As another method, the gNB that is present in an area where No-LBT is required may transmit "information 8311 on LBT mode" to the NR-UE (and another gNB). At this time, the NR-UE and gNB may determine that "information 8311 on LBT mode" is not valid. Likewise, the gNB that is present in an area where No-LBT is required may transmit "information 8312 on No-LBT mode" to the NR-UE (and another gNB). At this time, the NR-UE and gNB may determine that "information 8312 on No-LBT mode" is not valid.

In addition, "UE capability information" 8300 transmitted by the NR-UE may include "information 8321 on directional LBT" and "information 8322 on omni-directional LBT" illustrated in FIG. 83B. Note that information 8321 on directional LBT may be information on directional LBT for unicast or may be information on directional LBT for broadcast. In addition, information 8322 on omni-directional LBT may be information on omni-directional LBT for unicast or may be information on omni-directional LBT for broadcast.

For example, the NR-UE that is present in an area where LBT is not required may transmit, to the gNB, "information 8321 on directional LBT" including information "whether it is possible to perform directional LBT". The gNB can know "whether the NR-UE can perform directional LBT" by obtaining "information 8321 on directional LBT". Note that, when there are a plurality of terminals, each of the terminals may transmit UE capability information 8300 including "information 8321 on directional LBT", and the gNB can know the state of "whether it is possible to perform directional LBT" of each terminal.

For example, the NR-UE that is present in an area where LBT is not required may transmit, to the gNB, "information 8322 on omni-directional LBT" including information "whether it is possible to perform omni-directional LBT". The gNB can know "whether the NR-UE can perform omni-directional LBT" by obtaining "information 8322 on omni-directional LBT". The gNB can know "whether the NR-UE can perform omni-directional LBT" by obtaining "information 8322 on omni-directional LBT". Note that, when there are a plurality of terminals, each of the terminals may transmit UE capability information 8300 including "information 8322 on omni-directional LBT", and the gNB can know the state of "whether it is possible to perform omni-directional LBT" of each terminal.

For example, the NR-UE that is present in an area where LBT is required may transmit, to the gNB, "information 8321 on directional LBT" including information "whether it is possible to perform directional LBT". The gNB can know "whether the NR-UE can perform directional LBT" by obtaining "information 8321 on directional LBT". Note that, when there are a plurality of terminals, each of the terminals may transmit UE capability information 8300 including "information 8321 on directional LBT", and the gNB can know the state of "whether it is possible to perform directional LBT" of each terminal.

For example, the NR-UE that is present in an area where LBT is required may transmit, to the gNB, "information 8322 on omni-directional LBT" including information "whether it is possible to perform omni-directional LBT". The gNB can know "whether the NR-UE can perform omni-directional LBT" by obtaining "information 8322 on omni-directional LBT". Note that, when there are a plurality of terminals, each of the terminals may transmit UE capability information 8300 including "information 8322 on omni-directional LBT", and the gNB can know the state of "whether it is possible to perform omni-directional LBT" of each terminal.

For example, the NR-UE that is present in an area where No-LBT is required need not transmit "information 8321 on directional LBT" to the gNB. Likewise, the NR-UE that is present in an area where No-LBT is required need not transmit "information 8322 on omni-directional LBT" to the gNB.

As another method, the NR-UE that is present in an area where No-LBT is required may transmit "information 8321 on directional LBT" to the gNB. At this time, the NR-UE and gNB may determine that "information 8321 on directional LBT" is not valid. Likewise, the NR-UE that is present in an area where No-LBT is required may transmit "information 8322 on omni-directional LBT" to the gNB. At this time, the NR-UE and gNB may determine that "information 8322 on omni-directional LBT" is not valid.

"gNB capability information" 8300 transmitted by the gNB may include "information 8321 on directional LBT" and "information 8322 on omni-directional LBT" illustrated in FIG. 83B.

For example, the gNB that is present in an area where LBT is not required may transmit, to the NR-UE (and another gNB), "information 8321 on directional LBT" including information "whether it is possible to perform directional LBT". The NR-UE (and another gNB) can know "whether the gNB can perform directional LBT" by obtaining "information 8321 on directional LBT". Note that, when there are a plurality of terminals, the gNB may transmit, to each of the terminals, gNB capability information 8300 including "information 8321 on directional LBT", and each terminal can know the state of "whether it is possible to perform directional LBT" of the gNB.

For example, the gNB that is present in an area where LBT is not required may transmit, to the NR-UE (and another gNB), "information 8322 on omni-directional LBT" including information "whether it is possible to perform omni-directional LBT". The NR-UE (and another gNB) can know "whether the gNB can perform omni-directional LBT" by obtaining "information 8322 on omni-directional LBT". Note that, when there are a plurality of terminals, the gNB may transmit, to each of the terminals, gNB capability information 8300 including "information 8322 on omni-directional LBT", and each terminal can know the state of "whether it is possible to perform omni-directional LBT" of the gNB.

For example, the gNB that is present in an area where LBT is required may transmit, to the NR-UE (and another gNB), "information 8321 on directional LBT" including information "whether it is possible to perform directional LBT". The NR-UE (and another gNB) can know "whether the gNB can perform directional LBT" by obtaining "information 8321 on directional LBT". Note that, when there are a plurality of terminals, the gNB may transmit, to each of the terminals, gNB capability information 8300 including "information 8321 on directional LBT", and each terminal can know the state of "whether it is possible to perform directional LBT" of the gNB.

For example, the gNB that is present in an area where LBT is required may transmit, to the NR-UE (and another gNB), "information 8322 on omni-directional LBT" including information "whether it is possible to perform omni-directional LBT". The NR-UE (and another gNB) can know "whether the gNB can perform omni-directional LBT" by obtaining "information 8322 on omni-directional LBT". Note that, when there are a plurality of terminals, the gNB may transmit, to each of the terminals, gNB capability information 8300 including "information 8322 on omni-directional LBT", and each terminal can know the state of "whether it is possible to perform omni-directional LBT" of the gNB.

For example, the gNB that is present in an area where No-LBT is required need not transmit "information 8321 on directional LBT" to the NR-UE (and another gNB). Likewise, the gNB that is present in an area where No-LBT is required need not transmit "information 8322 on omni-directional LBT" to the NR-UE (and another gNB).

As another method, the gNB that is present in an area where No-LBT is required may transmit "information 8321 on directional LBT" to the NR-UE (and another gNB). At this time, the NR-UE and gNB may determine that "information 8321 on directional LBT" is not valid. Likewise, the gNB that is present in an area where No-LBT is required may transmit "information 8322 on omni-directional LBT" to the NR-UE (and another gNB). At this time, the NR-UE and gNB may determine that "information 8322 on omni-directional LBT" is not valid.

"UE capability information" 8300 transmitted by the NR-UE may include "information 8331 on broadcast LBT" illustrated in FIG. 83C.

For example, the NR-UE that is present in an area where LBT is not required may transmit, to the gNB, "information 8331 on broadcast LBT" including information "whether it is possible to perform broadcast LBT". The gNB can know "whether the NR-UE can perform broadcast LBT" by obtaining "information 8331 on broadcast LBT. Note that, when there are a plurality of terminals, each of the terminals may transmit UE capability information 8300 including "information 8331 on broadcast LBT", and the gNB can know the state of "whether it is possible to perform broadcast LBT" of each terminal.

For example, the NR-UE that is present in an area where LBT is required may transmit, to the gNB, "information 8331 on broadcast LBT" including information "whether it is possible to perform broadcast LBT". The gNB can know "whether the NR-UE can perform broadcast LBT" by obtaining "information 8331 on broadcast LBT". Note that, when there are a plurality of terminals, each of the terminals may transmit UE capability information 8300 including Information 8331 on broadcast LBT", and the gNB can know the state of "whether the NR-UE can perform broadcast LBT" of each terminal.

For example, the NR-UE that is present in an area where No-LBT is required need not transmit "information 8331 on broadcast LBT" to the gNB.

As another method, the NR-UE that is present in an area where No-LBT is required may transmit "information 8331 on broadcast LBT" to the gNB. At this time, the NR-UE and gNB may determine that "information 8331 on broadcast LBT" is not valid.

"gNB capability information" 8300 transmitted by the gNB may include "information 8331 on broadcast LBT" illustrated in FIG. 83C.

For example, the gNB that is present in an area where LBT is not required may transmit, to the NR-UE (and another gNB), "information 8331 on broadcast LBT" including information "whether it is possible to perform broadcast LBT". The NR-UE (and another gNB) can know "whether the gNB can perform broadcast LBT" by obtaining "information 8331 on broadcast LBT". Note that, when there are a plurality of terminals, the gNB may transmit, to each of the terminals, gNB capability information 8300 including "information 8331 on broadcast LBT", and each terminal can know the state of "whether it is possible to perform broadcast LBT" of the gNB.

For example, the gNB that is present in an area where LBT is required may transmit, to the NR-UE (and another gNB), "information 8331 on broadcast LBT" including information "whether it is possible to perform broadcast LBT". The NR-UE (and another gNB) can know "whether the gNB can perform broadcast LBT" by obtaining "information 8331 on broadcast LBT". Note that, when there are a plurality of terminals, the gNB may transmit, to each of the terminals, gNB capability information 8300 including "information 8331 on broadcast LBT", and each terminal can know the state of "whether it is possible to perform broadcast LBT" of the gNB.

For example, the gNB that is present in an area where No-LBT is required need not transmit "information 8331 on broadcast LBT" to the NR-UE (and another gNB).

As another method, the gNB that is present in an area where No-LBT is required may transmit "information 8331 on broadcast LBT" to the NR-UE (and another gNB). At this time, the NR-UE and gNB may determine that "information 8331 on broadcast LBT" is not valid.

The above operation allows the gNB and NR-UE to know the LBT supporting state of a communication counterpart, and this enables the gNB and NR-UE to easily perform control for reducing interference.

Next, a description will be given of an exemplary configuration of control information included in a modulation signal when the gNB and NR-UE transmits the modulation signal to a communication counterpart.

FIG. 84 illustrates an exemplary configuration of control information 8400 included in a modulation signal transmitted by the gNB, for example.

As illustrated in FIG. 84, control information 8400 includes "information 8411 on LBT performing state". "Information 8411 on LBT performing state" includes the following information, for example.

"Information Whether the gNB (Own Apparatus) Performs LBT";

This information is "information for indicating to a communication counterpart, e.g., NR-UE, whether the gNB performs LBT".

For example, the "information whether the gNB (own apparatus) performs LBT" includes "information indicating either the gNB itself "(always) performs LBT" or "(always) does not perform LBT". At this time, the "information whether the gNB (own apparatus) performs LBT" may be cell-specific information or apparatus (gNB)-specific information.

As another method, the gNB may transmit the "information whether the gNB (own apparatus) performs LBT" to each terminal. The "information whether the gNB (own apparatus) performs LBT" transmitted to each terminal may be the same information or different information. At this time, the "information whether the gNB (own apparatus) performs LBT" may be cell-specific information, apparatus (gNB)-specific information, or addressed-terminal-specific information.

"Information on an LBT Method Used by the gNB (Own Apparatus)":

This information is "information on a scheme of LBT performed by the gNB" and is information of LBT actually performed among directional LBT, omni-directional LBT, and other LBT, for example. A communication counterpart knows a method of LBT performed by the gNB by obtaining this information. At this time, the "information on an LBT method used by the gNB (own apparatus)" may be cell-specific information or apparatus (gNB)-specific information.

As another method, the gNB may transmit the "information on an LBT method used by the gNB (own apparatus)" to each terminal. The "information on an LBT method used by the gNB (own apparatus)" transmitted to each terminal may be the same information or different information. At this time, the "information on an LBT method used by the gNB (own apparatus)" may be cell-specific information, apparatus (gNB)-specific information, or addressed-terminal-specific information.

As additional information, "information whether the gNB performs broadcast LBT" may be included in either "information whether the gNB (own apparatus) performs LBT" or "information on an LBT method used by the gNB (own apparatus)", for example. A communication counterpart of the gNB knows whether the gNB performs broadcast LBT by obtaining this information.

FIG. 84 illustrates an exemplary configuration of control information 8400 included in a modulation signal transmitted by the NR-UE, for example.

As illustrated in FIG. 84, control information 8400 includes "information 8411 on LBT performing state". "Information 8411 on LBT performing state" includes the following information, for example.

"Information Whether the NR-UE (Own Apparatus) Performs LBT":

This information is "information for indicating to a communication counterpart, e.g., gNB, whether the NR-UE performs LBT".

For example, the "information whether the NR-UE (own apparatus) performs LBT" includes "information indicating either the NR-UE itself "(always) performs LBT" or "(always) does not perform LBT"". At this time, the "information whether the NR-UE (own apparatus) performs LBT" may be cell-specific information or apparatus (NR-UE (terminal))-specific information.

"Information on an LBT Method Used by the NR-UE (Own Apparatus)":

This information is "information on a scheme of LBT performed by the NR-UE" and is information of LBT actually performed among directional LBT, omni-directional LBT, and other LBT, for example. A communication counterpart knows a method of LBT performed by the NR-UE by obtaining this information. At this time, the "information on an LBT method used by the NR-UE (own apparatus)" may be cell-specific information or apparatus (NR-UE (terminal))-specific information.

As additional information, "information whether the NR-UE performs broadcast LBT" may be included in either "information whether the NR-UE (own apparatus) performs LBT" or "information on an LBT method used by the NR-UE (own apparatus)", for example. A communication counterpart of the NR-UE knows whether the NR-UE performs broadcast LBT by obtaining this information.

The above operation allows the gNB and NR-UE to indicate the LBT performing state to a communication counterpart, and this enables the gNB and NR-UE to easily perform control for reducing interference, thereby producing the effect of improving data reception quality, for example.

In the following, a description will be given of another example related to ""UE capability information or gNB capability information" 8300 and "control information 8400"".

FIGS. 85A and 85B illustrate exemplary configurations of "UE capability information 8300" and "gNB capability information 8300".

First, UE capability information 8300 will be described as an example. Examples of information included in UE capability information 8300 are information 8531 on support for LBT using wide receive beam", "information 8532 on support for multi-channel LBT (LBT based on FDM)", "information 8533 on support for LBT based on SDM", "information 8534 on support for LBT based on TDM", "information 8535 on support for LBT in each category", and "information 8536 on support for broadcast LBT" in FIG. 85A, and "information 8541 on support for transmission of multiple modulation signals", "information 8542 on support for reception of multiple modulation signals", "information 8543 on support for transmission of modulation signals to multiple points", and "information 8544 on support for reception of modulation signals from multiple points" in FIG. 85B. Note that the "category of LBT", "LBT based on FDM, LBT based on SDM, and LBT based on TDM" are as described in the present specification.

"Information 8531 on Support for LBT Using Wide Receive Beam":

In a case where the NR-UE is capable of performing LBT using a receive beam wider than a transmit beam, "information 8531 on support for LBT using wide receive beam" includes information indicating that "the NR-UE is capable of performing LBT using a receive beam wider than a transmit beam".

Meanwhile, in a case where the NR-UE is not capable of performing LBT using a receive beam wider than a transmit beam, "information 8531 on support for LBT using wide receive beam" includes information indicating that "the NR-UE is not capable of performing LBT using a receive beam wider than a transmit beam".

Note that examples of a transmit beam generation method and a receive beam generation method have already been described.

"Information 8532 on Support for Multi-Channel LBT (LBT Based on FDM)":

Two examples of the first method and the second method will be described.

First Method:

In a case where the NR-UE is capable of performing LBT for a plurality of channels of the NR standard, "information 8532 on support for multi-channel LBT (LBT based on FDM)" includes information indicating that "the NR-UE is capable of performing LBT for a plurality of channels of the NR standard".

Meanwhile, in a case where the NR-UE is not capable of performing LBT for a plurality of channels of the NR standard, "information 8532 on support for multi-channel LBT (LBT based on FDM)" includes information indicating that "the NR-UE is not capable of performing LBT for a plurality of channels of the NR standard".

Second Method:

In a case where the NR-UE is capable of performing LBT for a plurality of channels of a standard other than NR. "information 8532 on support for multi-channel LBT (LBT based on FDM)" includes information indicating that "the NR-UE is capable of performing LBT for a plurality of channels of a standard other than NR".

Meanwhile, in a case where the NR-UE is not capable of performing LBT for a plurality of channels of a standard other than NR, "information 8532 on support for multi-channel LBT (LBT based on FDM)" includes information indicating that "the NR-UE is not capable of performing LBT for a plurality of channels of a standard other than NR".

Note that performing "multi-channel LBT", i.e., performing "LBT for a plurality of channels of some standard" may be referred to as the LBT based on FDM.

In addition, "information 8532 on support for multi-channel LBT (LBT based on FDM)" may include information of the number of channels where LBT can be performed and information of a frequency bandwidth where LBT can be performed.

"Information 8533 on Support for LBT Based on SDM":

In a case where the NR-UE is capable of performing LBT based on SDM, "information 8533 on support for LBT based on SDM" includes information indicating that "the NR-UE is capable of performing LBT based on SDM".

Meanwhile, in a case where the NR-UE is not capable of performing LBT based on SDM, "information 8533 on support for LBT based on SDM" includes information indicating that "the NR-UE is not capable of performing LBT based on SDM".

Note that the "LBT based on SDM" is as described in the present specification.

"Information 8534 on support for LBT based on TDM":

In a case where the NR-UE is capable of performing LBT based on TDM, "information 8534 on support for LBT based on TDM" includes information indicating that "the NR-UE is capable of performing LBT based on TDM".

Meanwhile, in a case where the NR-UE is not capable of performing LBT based on TDM, "information 8534 on support for LBT based on TDM" includes information indicating that "the NR-UE is not capable of performing LBT based on TDM".

Note that the "LBT based on TDM" is as described in the present specification.

"Information 8535 on Support for LBT in Each Category":

"Information 8535 on support for LBT in each category" includes "information of a category of LBT that can be performed by the NR-UE".

Note that, when the NR-UE is not capable of performing LBT, "information 8535 on support for LBT in each category" may include information of "not capable of performing LBT".

As another method, "information 8535 on support for LBT in each category" need not be transmitted when the NR-UE is not capable of performing LBT.

The category of LBT will be described later.

"Information 8536 on Support for Broadcast LBT":

In a case where the NR-UE is capable of performing broadcast LBT, "information 8536 on support for broadcast LBT" includes information indicating that "the NR-UE is capable of performing broadcast LBT".

Meanwhile, in a case where the NR-UE is not capable of performing broadcast LBT, "information 8536 on support for broadcast LBT" includes information indicating that "the NR-UE is not capable of performing broadcast LBT".

Note that the "broadcast LBT" is as described in the present specification.

"Information 8541 on Support for Transmission of Multiple Modulation Signals":

In a case where the NR-UE is capable of transmitting multiple modulation signals, "information 8541 on support for transmission of multiple modulation signals" includes information indicating that "the NR-UE is capable of transmitting multiple modulation signals".

Meanwhile, in a case where the NR-UE is not capable of transmitting multiple modulation signals, "information 8541 on support for transmission of multiple modulation signals" includes information indicating that "the NR-UE is not capable of transmitting multiple modulation signals".

Note that the NR-UE may use multiple transmit beams in transmitting multiple modulation signals.

"Information 8542 on Support for Reception of Multiple Modulation Signals":

In a case where the NR-UE is capable of receiving multiple modulation signals, "information 8542 on support for reception of multiple modulation signals" includes information indicating that "the NR-UE is capable of receiving multiple modulation signals".

Meanwhile, in a case where the NR-UE is not capable of receiving multiple modulation signals, "information 8542 on support for reception of multiple modulation signals" includes information indicating that "the NR-UE is not capable of receiving multiple modulation signals".

Note that the NR-UE may use multiple receive beams in receiving multiple modulation signals.

"Information 8543 on Support for Transmission of Modulation Signals to Multiple Points":

In a case where the NR-UE is capable of transmitting multiple modulation signals to, for example, multiple transmission/reception points (TRPs), "information 8543 on support for transmission of modulation signals to multiple points" includes information indicating that "the NR-UE is capable of transmitting multiple modulation signals to, for example, multiple TRPs".

Meanwhile, in a case where the NR-UE is not capable of transmitting multiple modulation signals to, for example, multiple TRPs, "information 8543 on support for transmission of modulation signals to multiple points" includes information indicating that "the NR-UE is not capable of transmitting multiple modulation signals to, for example, multiple TRPs".

Note that the NR-UE may use multiple transmit beams in transmitting multiple modulation signals.

"Information 8544 on Support for Reception of Modulation Signals from Multiple Points":

In a case where the NR-UE is capable of receiving multiple modulation signals transmitted by, for example, multiple TRPs, "information 8544 on support for reception of modulation signals from multiple points" includes information indicating that "the NR-UE is capable of receiving multiple modulation signals transmitted by, for example, multiple TRPs".

Meanwhile, in a case where the NR-UE is not capable of receiving multiple modulation signals transmitted by, for example, multiple TRPs, "information 8544 on support for reception of modulation signals from multiple points" includes information indicating that "the NR-UE is not capable of receiving multiple modulation signals transmitted by, for example, multiple TRPs".

Note that the NR-UE may use multiple receive beams in receiving multiple modulation signals.

The gNB obtains "UE capability information 8300 including, for example, such information transmitted by the NR-UE" and determines, based on UE capability information 8300, the "LBT performing method", "modulation signal transmission method", "modulation signal reception method". "frequency bandwidth for transmission", "frequency bandwidth for reception", "application of multiple TRPs in transmission". "application of multiple TRPs in reception", etc. Then, the gNB transmits a modulation signal including, for example, "information 8411 on LBT performing state", "information 8611 on transmission", "information 8612 on reception", etc. using control information 8400 in FIGS. 84 and 86.

The NR-UE receives control information 840 and determines the LBT method, transmission method, and reception method.

gNB capability information 8300 will be described as an example. Examples of information included in gNB capability information 8300 are "information 8531 on support for LBT using wide receive beam". "information 8532 on support for multi-channel LBT (LBT based on FDM)", "information 8533 on support for LBT based on SDM", "information 8534 on support for LBT based on TDM", "information 8535 on support for LBT in each category", and "information 8536 on support for broadcast LBT" in FIG. 85A, and "information 8541 on support for transmission of multiple modulation signals". "information 8542 on support for reception of multiple modulation signals". "information 8543 on support for transmission of modulation signals to multiple points", and "information 8544 on support for reception of modulation signals from multiple points" in FIG. 85B. Note that the "category of LBT", "LBT based on FDM, LBT based on SDM, and LBT based on TDM" are as described in the present specification.

Each information will be described below.

"Information 8531 on Support for LBT Using Wide Receive Beam":

In a case where the gNB is capable of performing LBT using a receive beam wider than a transmit beam, "information 8531 on support for LBT using w % ide receive beam" includes information indicating that "the gNB is capable of performing LBT using a receive beam wider than a transmit beam".

Meanwhile, in a case where the gNB is not capable of performing LBT using a receive beam wider than a transmit beam. "information 8531 on support for LBT using wide receive beam" includes information indicating that "the gNB is not capable of performing LBT using a receive beam wider than a transmit beam".

Note that examples of a transmit beam generation method and a receive beam generation method have already been described.

"Information 8532 on Support for Multi-Channel LBT (LBT Based on FDM)":

Two examples of the first method and the second method will be described.

First Method:

In a case where the gNB is capable of performing LBT for a plurality of channels of the NR standard, "information 8532 on support for multi-channel LBT (LBT based on FDM)" includes information indicating that "the gNB is capable of performing LBT for a plurality of channels of the NR standard".

Meanwhile, in a case where the gNB is not capable of performing LBT for a plurality of channels of the NR standard, "information 8532 on support for multi-channel LBT (LBT based on FDM)" includes information indicating that "the gNB is not capable of performing LBT for a plurality of channels of the NR standard".

Second Method:

In a case where the gNB is capable of performing LBT for a plurality of channels of a standard other than NR, "information 8532 on support for multi-channel LBT (LBT based on FDM)" includes information indicating that "the gNB is capable of performing LBT for a plurality of channels of a standard other than NR".

Meanwhile, in a case where the gNB is not capable of performing LBT for a plurality of channels of a standard other than NR. "information 8532 on support for multi-channel LBT (LBT based on FDM)" includes information indicating that "the gNB is not capable of performing LBT for a plurality of channels of a standard other than NR".

Note that performing "multi-channel LBT", i.e., performing "LBT for a plurality of channels of some standard" may be referred to as the LBT based on FDM.

In addition, "information 8532 on support for multi-channel LBT (LBT based on FDM)" may include information of the number of channels where LBT can be performed and information of a frequency bandwidth where LBT can be performed.

"Information 8533 on Support for LBT Based on SDM":

In a case where the gNB is capable of performing LBT based on SDM, "information 8533 on support for LBT based on SDM" includes information indicating that "the gNB is capable of performing LBT based on SDM".

Meanwhile, in a case where the gNB is not capable of performing LBT based on SDM, "information 8533 on support for LBT based on SDM" includes information indicating that "the gNB is not capable of performing LBT based on SDM".

Note that the "LBT based on SDM" is as described in the present specification.

"Information 8534 on Support for LBT Based on TDM":

In a case where the gNB is capable of performing LBT based on TDM, "information 8534 on support for LBT based on TDM" includes information indicating that "the gNB is capable of performing LBT based on TDM".

Meanwhile, in a case where the gNB is not capable of performing LBT based on TDM, "information 8534 on support for LBT based on TDM" includes information indicating that "the gNB is not capable of performing LBT based on TDM".

Note that the "LBT based on TDM" is as described in the present specification.

"Information 8535 on Support for LBT in Each Category":

"Information 8535 on support for LBT in each category" includes "information of a category of LBT that can be performed by the gNB".

Note that, when the gNB is not capable of performing LBT, "information 8535 on support for LBT in each category" may include information of "not capable of performing LBT".

As another method, "information 8535 on support for LBT in each category" need not be transmitted when the gNB is not capable of performing LBT.

The category of LBT will be described later.

"Information 8536 on Support for Broadcast LBT":

In a case where the gNB is capable of performing broadcast LBT, "information 8536 on support for broadcast LBT" includes information indicating that "the gNB is capable of performing broadcast LBT".

Meanwhile, in a case where the gNB is not capable of performing broadcast LBT, "information 8536 on support for broadcast LBT" includes information indicating that "the gNB is not capable of performing broadcast LBT".

Note that the "broadcast LBT" is as described in the present specification.

"Information 8541 on Support for Transmission of Multiple Modulation Signals":

In a case where the gNB is capable of transmitting multiple modulation signals, "information 8541 on support for transmission of multiple modulation signals" includes information indicating that "the gNB is capable of transmitting multiple modulation signals".

Meanwhile, in a case where the gNB is not capable of transmitting multiple modulation signals, "information 8541 on support for transmission of multiple modulation signals" includes information indicating that"the gNB is not capable of transmitting multiple modulation signals".

Note that the gNB may use multiple transmit beams in transmitting multiple modulation signals.

"Information 8542 on Support for Reception of Multiple Modulation Signals":

In a case where the gNB is capable of receiving multiple modulation signals, "information 8542 on support for reception of multiple modulation signals" includes information indicating that "the gNB is capable of receiving multiple modulation signals".

Meanwhile, in a case where the gNB is not capable of receiving multiple modulation signals, "information 8542 on support for reception of multiple modulation signals" includes information indicating that "the gNB is not capable of receiving multiple modulation signals".

Note that the gNB may use multiple receive beams in receiving multiple modulation signals.

"Information 8543 on Support for Transmission of Modulation Signals to Multiple Points":

In a case where the gNB is capable of transmitting multiple modulation signals to, for example, multiple TRPs. "information 8543 on support for transmission of modulation signals to multiple points" includes information indicating that "the gNB is capable of transmitting multiple modulation signals to, for example, multiple TRPs".

Meanwhile, in a case where the gNB is not capable of transmitting multiple modulation signals to, for example, multiple TRPs, "information 8543 on support for transmission of modulation signals to multiple points" includes information indicating that "the gNB is not capable of transmitting multiple modulation signals to, for example, multiple TRPs".

Note that the gNB may use multiple transmit beams in transmitting multiple modulation signals.

"Information 8544 on Support for Reception of Modulation Signals from Multiple points":

In a case where the gNB is capable of receiving multiple modulation signals transmitted by, for example, multiple TRPs, "information 8544 on support for reception of modulation signals from multiple points" includes information indicating that "the gNB is capable of receiving multiple modulation signals transmitted by, for example, multiple TRPs".

Meanwhile, in a case where the gNB is not capable of receiving multiple modulation signals transmitted by, for example, multiple TRPs, "information 8544 on support for reception of modulation signals from multiple points" includes information indicating that "the gNB is not capable of receiving multiple modulation signals transmitted by, for example, multiple TRPs".

Note that the gNB may use multiple receive beams in receiving multiple modulation signals.

The NR-UE obtains "gNB capability information 8300 including, for example, such information transmitted by the gNB" and determines, based on gNB capability information 8300, the "LBT performing method", "modulation signal transmission method", "modulation signal reception method", "frequency bandwidth for transmission", "frequency bandwidth for reception", "application of multiple TRPs in transmission", "application of multiple TRPs in reception", etc. Then, the NR-UE transmits a modulation signal including, for example, "information 8411 on LBT performing state", "information 8611 on transmission", "information 8612 on reception", etc. using control information 8400 in FIGS. 84 and 86.

The gNB receives control information 8400 and determines the LBT method, transmission method, and reception method.

The above operation allows the gNB and NR-UE to know the state of a communication counterpart, and the gNB and NR-UE indicate, to the communication counterpart, the LBT state, information on the transmission method, and information on the reception method. This enables the gNB and NR-UE to easily perform control for reducing interference, thereby producing the effect of improving data reception quality, for example.

Note that "UE capability information 8300" and "gNB capability information 8300" preferably include at least one of the information portions illustrated in FIGS. 83A, 83B, 85A, and 85B, and "UE capability information 8300" and "gNB capability information 8300" may include information other than the information portions illustrated in FIGS. 83A, 83B, 85A, and 85B.

(Supplement 1)

It is needless to say that the embodiments described in the present specification may be implemented while combined with each other or combined with other contents.

Further, the embodiments and other contents are merely examples. For example, even though the "modulation scheme, error correction coding scheme (error correction code, code length, coding rate, and the like for use), control information, and the like" are illustrated as the examples, it is possible to implement the embodiments with a similar configuration even when a "modulation scheme, error correction coding scheme (error correction code, code length, coding rate, and the like for use), control information, and the like" different from those in the examples are applied.

Regarding the modulation scheme, the embodiments and other contents described in the present specification can be implemented also by using modulation schemes other than the modulation schemes described in the present specification. For example, amplitude phase shift keying (APSK) (e.g., 16APSK, 64APSK, 128APSK, 256APSK, 1024APSK, 4096APSK), pulse amplitude modulation (PAM) (e.g., 4PAM, 8PAM, 16PAM, 64PAM, 128PAM, 256PAM, 1024PAM, 4096PAM), phase shift keying (PSK) (e.g., BPSK, QPSK, 8PSK, 16PSK, 64PSK, 128PSK, 256PSK, 1024PSK, 4096PSK), quadrature amplitude modulation (QAM) (e.g., 4QAM, 8QAM, 16QAM, 64QAM, 128QAM, 256QAM, 1024QAM, 4096QAM), or the like may be applied, or uniform mapping and non-uniform mapping may be applied for each of the modulation schemes. The number of signal points in in-phase (I)-quadrature (phase) (Q) is not limited to those in the examples above, and may be an integer equal to or greater than 3.

In addition, the method of arranging signal points (e.g., 2, 4, 8, 16, 64, 128, 256, or 1024 signal points) on the I-Q plane (modulation scheme with 2, 4, 8, 16, 64, 128, 256, 1024, or other numbers of signal points) is not particularly limited to the signal point arrangement methods of the modulation schemes described in the present specification. Thus, the function of outputting an in-phase component and a quadrature component based on a plurality of bits is a function in a mapper, and performing a matrix operation (e.g., precoding) to perform MIMO transmission and phase changing for a baseband signal after the outputting function is one of the effective functions of the present disclosure.

In addition, when "$\forall$" and "$\exists$" are present in the present specification, "$\forall$" represents a universal quantifier, and "$\exists$" represents an existential quantifier.

Further, when the present specification describes a complex plane, the unit of phase, such as, e.g., an argument, is "radian".

The use of the complex plane allows representation of complex numbers in polar form as a representation of the complex numbers using polar coordinates. Letting a point (a, b) on the complex plane correspond to a complex number z=a+jb (where both of "a" and "b" are real numbers and "j" is an imaginary unit), a=r×cosθ and b=r sinθ when this point is expressed as [r, θ] (with the polar coordinates.

(Equation 1)

$$r = \sqrt{a^2 + b^2} \quad [1]$$

holds true. The character "r" is the absolute value of z(r=|z|) and θ is the argument. Then, z=a+jb is expressed as $r \times e^{j\theta}$.

In the present specification, the "terminal, base station, access point, gateway, etc." may each have a configuration in which a reception apparatus and an antenna of which are separate from each other. For example, the reception apparatus includes an interface for inputting, through a cable, a signal received by the antenna or a signal received by the antenna and subjected to frequency conversion, and the reception apparatus performs subsequent processing. Further, the data and information obtained by the reception apparatus are then converted into a video and sound, and displayed on a display (monitor), or outputted from a speaker in the case of sound. Further, the data and information obtained by the reception apparatus may be subjected to signal processing relevant to the video and sound (such signal processing does not have to be performed), and outputted from an RCA terminal (a video terminal and a sound terminal), universal serial bus (USB), high-definition multimedia interface (HDMI) (registered trademark), digital terminal, or the like provided in the reception apparatus.

It is contemplated herein that the transmission apparatus and/or transmitter is included in, for example, communication equipment/broadcasting equipment such as a broadcasting station, base station, access point, terminal, mobile phone, smartphone, tablet, laptop PC, server, PC, personal computer, television, home appliance (household electrical machinery equipment), factory apparatus, and Internet of Things (IoT) equipment or the like, g Node B (gNB), repeater, node, car, bicycle, motorcycle, ship, satellite, airplane, drone, mobile equipment, robot, or transmission (Tx)/reception (Rx) point (TRP). Meanwhile, it is contemplated that the reception apparatus and/or receiver is included in, for example, communication equipment such as a radio, terminal, personal computer, mobile phone, access point, and base station, communication equipment/broadcasting equipment such as a smartphone, tablet, laptop PC, server, PC, personal computer, television, home appliance (household electrical machinery equipment), factory apparatus, and Internet of Things (IoT) equipment or the like, g Node B (gNB), repeater, node, car, bicycle, motorcycle, ship, satellite, airplane, drone, mobile equipment, robot, or transmission (Tx)/reception (Rx) point (TRP). Further, it is considered that the transmission apparatus and the reception apparatus in the present disclosure are devices having a communication function, and the devices are configured to be capable of connecting via a certain interface to an apparatus for executing an application of a television, a radio, a personal computer, a mobile phone, or the like. Further, it is considered that the communication apparatus in the present specification is included in, for example, communication equipment/broadcasting equipment such as a broadcasting station, base station, access point, terminal, mobile phone, smartphone, tablet, laptop PC, server, PC, personal computer, television, home appliance (household electrical machinery equipment), factory apparatus, and Internet of Things (IoT) equipment or the like, g Node B (gNB), repeater, node, car, bicycle, motorcycle, ship, satellite, airplane, drone, mobile equipment, robot, or transmission (Tx)/reception (Rx) point (TRP).

In addition, symbols other than a data symbol (for example, a reference signal (preamble, unique word, postamble, reference symbol, pilot symbol, pilot signal, and the like), a control information symbol, a sector sweep, etc.) may be mapped in any manner in a frame in the present embodiments. Although the present specification uses the terms "reference signal". "control information symbol", and "sector sweep", the important part is the function itself. The sector sweep may be replaced by a sector-level sweep, for example.

It is contemplated that the reference signal and/or a signal relevant to sector sweep are, for example, known symbols modulated using PSK modulation by the transmitter and receiver (alternatively, the receiver may be capable of knowing a symbol transmitted by the transmitter by synchronization by the receiver), non-zero power signals, zero power signals, signals known to the transmitter and receiver, or the like. The receiver performs, using these signals, frequency synchronization, time synchronization, channel estimation (estimation of channel state information (CSI))(for each modulation signal), signal detection, estimation of a reception state, estimation of a transmission state, or the like.

Further, the control information symbol is also a symbol for transmitting information (e.g., a modulation scheme, an error correction coding scheme, and a coding rate of the error correction coding scheme; configuration information in a higher layer; a modulation and coding scheme (MCS); a frame configuration; channel information; information on a using frequency band; information on the number of using channels; and the like used for communication) that needs to be transmitted to a communication counterpart to achieve communication (of an application or the like) other than data communication.

The transmission apparatus and/or reception apparatus sometimes need to be notified of a transmission method (MIMO, single-input single-output (SISO), multiple-input single-output (MISO), single-input multiple-output (SIMO), space-time block code, interleaving scheme, MCS, etc.), modulation scheme, and error correction coding scheme. This description may be omitted in some of the embodiments.

The terms such as "precoding", "precoding weight", etc. are sometimes used in the present specification, but they may be called in any manner and the important part is the signal processing itself in the present disclosure.

Regarding both the transmission panel antenna of the transmission apparatus and the reception panel antenna of the reception apparatus, a single antenna illustrated in the drawings may be composed of one antenna or a plurality of antennas.

Further, in the explanation of the embodiments and the like, the transmission panel antenna and the reception panel antenna may be described separately; however, a configuration of "transmission/reception panel antenna" serving as both of the transmission panel antenna and the reception panel antenna may be used.

In addition, the transmission panel antenna, reception panel antenna, and transmission/reception panel antenna may be referred to, for example, as an antenna port. The transmission panel antenna, reception panel antenna, and transmission/reception panel antenna may be referred to as another name, and a method of configuring the transmission panel antenna with one or more antennas or a plurality of antennas is conceivable. Additionally, a method of configuring the reception panel antenna with one or more antennas or a plurality of antennas is conceivable. Also, a method of configuring the transmission/reception panel antenna with one or more antennas or a plurality of antennas is conceivable. Further, an apparatus may be configured for each transmission panel antenna, an apparatus may be configured for each reception panel antenna, and an apparatus may be configured for each transmission/reception panel antenna. That is, it may be regarded as a multiple transmitter (TX)/receiver (RX) point (TRP).

The antenna port may be a logical antenna (antenna group) composed of one or more physical antennas. That is, the antenna port does not necessarily refer to one physical antenna, but may refer to an array antenna or the like composed of a plurality of antennas. For example, the number of physical antennas composing the antenna port is not specified, but the number of physical antennas may be specified as the minimum unit in which a terminal station is capable of transmitting a reference signal. Further, the antenna port may also be specified as a unit or a minimum unit for multiplication by a precoding vector or a weight of a precoding matrix.

The gNB may separately include an antenna port for transmitting a broadcast modulation signal and an antenna port for transmitting a unicast modulation signal. The configuration of the antenna port, however, is not limited to this example, and a broadcast modulation signal and a unicast modulation signal may be transmitted using one antenna port or one or more antenna ports.

The gNB may separately include an antenna port for broadcast LBT and an antenna port for unicast LBT. The configuration of the antenna port, however, is not limited to this example, and broadcast LBT and unicast LBT may be performed using one antenna port or one or more antenna ports.

There are a plurality of methods of generating a modulation signal by a single-carrier scheme in the present specification, and the present embodiments can be implemented by using any of the schemes. For example, examples of the single-carrier scheme include “discrete Fourier transform (DFT)-spread orthogonal frequency division multiplexing (OFDM)” (DFT-S OFDM), “trajectory constrained DFT-spread OFDM”, “constrained DFT-spread OFDM” (constrained DFT-S OFDM), “OFDM based single carrier (SC)”, “single carrier (SC)-frequency division multiple access (FDMA)”, “guard interval DFT-spread OFDM”, a time-domain implementation single carrier scheme (e.g., single carrier (SC)-QAM), and the like.

In the present specification, the ID of the transmission panel antenna and the ID of beamforming are described separately from each other; however, an ID may be assigned without distinguishing between the two.

For example, “ID 0 of beamforming by using transmission panel antenna #1” may be referred to as ID♭0, “ID 1 of beamforming by using transmission panel antenna #1” may be referred to as ID ♭1, “ID 0 of beamforming by using transmission panel antenna #2” may be referred to as ID ♭2, “ID 1 of beamforming by using transmission panel antenna #2” may be referred to as ID ♭3, and so forth.

Thus, a signal for sector sweep may be generated based on the IDs, and the base station and the terminal may transmit information including the IDs.

It has been indicated above that the waveforms of the modulation signal transmitted by the communication apparatus herein may be either the single-carrier scheme or the multi-earner scheme such as OFDM. In a case of using the multi-carrier scheme such as OFDM, a frame also includes a symbol on the frequency axis.

In the present specification, a “sector sweep reference signal transmitted by a base station” described in the embodiments and drawings such as FIGS. 10, 11, and 12, for example, may be included in a “synchronization signal (SS) block”. “physical broadcast channel (PBCH) block”, or SS/PBCH block. In this case, it need not be called the “sector sweep reference signal”. In addition, a “feedback signal transmitted by a base station and feedback signal group transmitted by a base station” described in the embodiments and drawings such as FIGS. 10, etc., for example, may be included in a “synchronization signal (SS) block”, “physical broadcast channel (PBCH) block”, or SS/PBCH block. In this case, it need not be called the “feedback signal and feedback signal group”.

Although it has been explained that a sector sweep reference signal includes the ID of a transmission panel antenna when a base station transmits the sector sweep reference signal, the sector sweep reference signal may include the ID of a sector antenna and/or information of an antenna port number as “the ID of a transmission panel antenna”. Likewise, although it has been explained that a sector sweep reference signal includes the ID of a transmission panel antenna when a terminal transmits the sector sweep reference signal, the sector sweep reference signal may include the ID of a sector antenna and/or information of an antenna port number as “the ID of a transmission panel antenna”.

The configurations of the transmission panel antenna and the reception panel antenna of the communication apparatus in the present disclosure are not limited to the configurations in FIGS. 3 and 4. The transmission panel antenna and the reception panel antenna may be composed of one or more antennas and/or antenna elements and may be composed of two or more antennas and/or antenna elements.

Additionally, the antennas illustrated in FIGS. 3 and 4 may be composed of one or more antennas and/or antenna elements or may be composed of two or more antennas and/or antenna elements.

In the present specification, the embodiments have been described using OFDM as an example of multi-carrier schemes, but the embodiments in the present specification can be similarly implemented using another multi-carrier scheme.

By way of example, multi-carrier transmission may be implemented by assigning a “single-carrier scheme using a single frequency band” and assigning a “single-carrier scheme using one or more frequency bands” to the frequency band described in the present specification.

As another example, multi-carrier transmission may be implemented by assigning one or more carriers or two or more carriers to the frequency band described in the present specification. Note that the multi-carrier transmission scheme is not limited to the above examples.

In the present specification, a “sector sweep reference signal transmitted by a base station” described in the embodiments and drawings such as FIGS. 10, 11, and 12, for example, may be included in a “synchronization signal (SS) block”, “physical broadcast channel (PBCH) block”, or SS/PBCH block. In this case, it need not be called the “sector sweep reference signal”.

In addition, a “feedback signal transmitted by a base station and feedback signal group transmitted by a base station” described in the embodiments and drawings such as FIGS. 10, etc., for example, may be included in a “synchronization signal (SS) block”, “physical broadcast channel (PBCH) block", or SS/PBCH block. In this case, it need not be called the "feedback signal and feedback signal group".

Although it has been explained that a sector sweep reference signal includes the ID of a transmission panel antenna when a base station transmits the sector sweep reference signal, the sector sweep reference signal may include the ID of a sector antenna and/or information of an antenna port number as "the ID of a transmission panel antenna".

Likewise, although it has been explained that a sector sweep reference signal includes the ID of a transmission panel antenna when a terminal transmits the sector sweep reference signal, the sector sweep reference signal may include the ID of a sector antenna and/or information of an antenna port number as "the ID of a transmission panel antenna".

The configurations of the transmission panel antenna and the reception panel antenna of the communication apparatus in the present disclosure are not limited to the configurations in FIGS. 3 and 4. The transmission panel antenna and the reception panel antenna may be composed of one or more antennas and/or antenna elements and may be composed of two or more antennas and/or antenna elements.

Additionally, the antennas illustrated in FIGS. 3 and 4 may be composed of one or more antennas and/or antenna elements or may be composed of two or more antennas and/or antenna elements.

In the present specification, the embodiments have been described using OFDM as an example of multi-carrier schemes, but the embodiments in the present specification can be similarly implemented using another multi-carrier scheme.

By way of example, multi-carrier transmission may be implemented by assigning a "single-carrier scheme using a single frequency band" and assigning a "single-carrier scheme using one or more frequency bands" to the frequency band described in the present specification.

As another example, multi-carrier transmission may be implemented by assigning one or more carriers or two or more carriers to the frequency band described in the present specification.

Note that the multi-carrier transmission scheme is not limited to the above examples.

In the present specification, a "sector sweep reference signal transmitted by abase station" described in the embodiments and drawings such as FIGS. 10, 11, and 12, for example, may be included in a "physical downlink control channel (PDCCH)". In this case, it need not be called the "sector sweep reference signal".

For example, it is assumed that information A is present as one piece of information in PDCCH. It is also assumed that a "sector sweep reference signal subjected to beamforming #1", "sector sweep reference signal subjected to beamforming #2", . . . , "sector sweep reference signal subjected to beamforming #N" are present as the "sector sweep reference signals transmitted by abase station". Note that N is an integer equal to or greater than 1 or an integer equal to or greater than 2.

At this time, information A is included in the "sector sweep reference signal subjected to beamforming #1", "sector sweep reference signal subjected to beamforming #2", . . . , "sector sweep reference signal subjected to beamforming #N". This produces an effect that a terminal is more likely to obtain information A.

A "sector sweep reference signal transmitted by a terminal" described in the embodiments of the present specification may be included in a "physical uplink control channel (PUCCH)". In this case, it need not be called the "sector sweep reference signal".

For example, it is assumed that information B is present as one piece of information in PUCCH. It is also assumed that a "sector sweep reference signal subjected to beamforming $1", "sector sweep reference signal subjected to beamforming $2", . . . , "sector sweep reference signal subjected to beamforming $M" are present as the "sector sweep reference signals transmitted by a terminal". Note that M is an integer equal to or greater than 1 or an integer equal to or greater than 2.

At this time, information B is included in the ""sector sweep reference signal subjected to beamforming $1", "sector sweep reference signal subjected to beamfonning $2", . . . , "sector sweep reference signal subjected to beamforning $M"". This produces an effect that a base station is more likely to obtain information B.

Note that, in the present specification, "sections of describing configurations and operations of a base station" may be considered as "configurations and operations of a terminal, AP, or repeater". Likewise, "sections of describing configurations and operations of a terminal" may be considered as "configurations and operations of a base station, AP, or repeater".

In the present specification, a server may provide an application related to processing relevant to the reception apparatus and the receiver, and the terminal may implement the functions of the reception apparatus described in the present specification by installing this application. Note that the application may be provided to the terminal by connection of a communication apparatus including the transmission apparatus described in the present specification to the server via a network, or the application may be provided to the terminal by connection of a communication apparatus having another transmission function to the server via the network.

Likewise, in the present specification, a server may provide an application related to processing relevant to the transmission apparatus and the transmitter, and the communication apparatus may implement the functions of the transmission apparatus described in the present specification by installing this application. Note that a method can be envisaged in which this communication apparatus is provided with the application by connection of another communication apparatus to the server via the network.

Note that the present disclosure is not limited to the embodiments and can be implemented with various modifications. For example, the embodiments are performed by a communication apparatus in the description, but the present invention is not limited to this and the communication methods can be realized by software.

In addition, a program for performing the above communication methods may be stored in read only memory (ROM) in advance, for example, and the program may be executed by a central processor unit (CPU).

Further, a program for performing the communication method may be stored in a computer-readable storage medium, and the program stored in the storage medium may be recorded in a random access memory (RAM) of the computer so that the computer operates according to the program.

Each configuration in the each of the embodiments described above can be typically realized by a large scale integration (LSI), which is an integrated circuit. The LSI may be individually formed as chips, or one chip may be formed so as to include a part or all of the configurations in each embodiment. The LSI here may be referred to as an integrated circuit (IC), a system LSI, a super LSI, or an ultra LSI depending on a difference in the degree of integration. In addition, the technique of implementing an integrated circuit is not limited to the LSI and may be realized by using a dedicated circuit or a general-purpose processor. A field programmable gate array (FPGA) that can be programmed after the manufacture of the LSI or a reconfigurable processor in which the connections and the settings of circuit cells disposed inside the LSI can be reconfigured may be used.

Note that at least one of the FPGA and the CPU may be configured to download all or some of software required for implementing the communication methods described in the present disclosure by radio communication or wired communication. Further, at least one of the FPGA and the CPU may be configured to download all or some of software for updating by radio communication or wired communication. Then, the downloaded software may be stored in storage, and at least one of the FPGA and the CPU may be operated based on the stored software to execute the digital signal processing described in the present disclosure.

The device including at least one of the FPGA and the CPU may be connected to a communication modem by radio or wire, and the communication methods described in the present disclosure may be implemented by the device and the communication modem.

For example, a communication apparatus such as the base station. AP, and terminal described in the present specification may include at least one of the FPGA and the CPU, and the communication apparatus may include an interface for externally obtaining software for operating at least one of the FPGA and the CPU. Further, the communication apparatus may include storage for storing the externally-obtained software, and the FPGA and/or the CPU may be operated based on the stored software to implement the signal processing described in the present disclosure.

If future integrated circuit technology replaces LSIs as a result of the advancement of semiconductor technology or other derivative technology, the functional blocks could be integrated using the future integrated circuit technology. Biotechnology can also be applied.

The present disclosure is widely applicable to radio systems for transmitting different modulation signals from a plurality of antennas, respectively. It is also applicable to the case of using MIMO transmission in wired communication systems with a plurality of transmission points (e.g., power line communication (PLC) system, optical communication system, and digital subscriber line (DSL) system). The communication apparatus may be referred to as a radio apparatus.

The "data", "data symbol", and "data frame" may be, for example, a physical downlink shared channel (PDSCH) or a physical uplink shared channel (PUSCH).

In the present disclosure, a description has been given of an example where an NR apparatus detects "a signal transmitted by a first standard apparatus" by performing LBT, the NR apparatus may detect a signal transmitted by an apparatus of another standard by performing LBT.

Further, in the present disclosure, a description has been given of an example where an NR apparatus detects "a signal transmitted by a first standard apparatus", the NR apparatus may detect a signal transmitted by an apparatus of another standard.

In the present disclosure, an NR apparatus may detect "a sector sweep signal and/or a signal related to sector sweep implementation" transmitted by another NR apparatus by performing LBT.

For example, NR-UE in the drawings of the present specification may detect a modulation signal transmitted by a "TRP not involved in communication in the drawings and/or NR-UE not related to the drawings" by LBT and perform operations in the present specification.

Further, a TRP in the drawings of the present specification may detect a modulation signal transmitted by a "TRP not involved in communication in the drawings and/or NR-UE not related to the drawings" by LBT and perform operations in the present specification.

Note that the same can be implemented by replacing "LBT" with "initial access" in the above description.

In the present disclosure, it has been explained that the gNB and NR-UE form transmit beams, but not all the transmit beams need to be the same polarization. In a case where the gNB and NR-UE can generate transmit beam #1, transmit beam #2, transmit beam #3, and so forth, it may be configured so that transmit beam #1 is the first polarization, transmit beam #2 is the second polarization other than the first polarization, and so forth.

In addition, it has been explained that the gNB and NR-UE form receive beams, but not all the receive beams need to be the same polarization. In a case where the gNB and NR-UE can generate receive beam #1, receive beam #2, receive beam #3, and so forth, it may be configured so that receive beam #1 is the first polarization, receive beam #2 is the second polarization other than the first polarization, and so forth.

It has been explained that the gNB and NR-UE form transmit beams in the present disclosure, and the polarization of a transmit beam may be changed as time passes. For example, the first polarization is used for transmit beam #1 at the beginning and may be later changed to the second polarization other than the first polarization.

In addition, it has been explained that the gNB and NR-UE form receive beams, and the polarization of a receive beam may be changed as time passes. For example, the first polarization is used for receive beam #1 at the beginning and may be later changed to the second polarization other than the first polarization.

Although it has been explained that "an NR apparatus (gNB or NR-UE) does not transmit or stands by to transmit a modulation signal when detecting a signal in LBT" in the present disclosure, the NR apparatus (gNB or NR-UE) may transmit a modulation signal when detecting a signal in LBT as long as the modulation signal is a short-period modulation signal that is less likely to interfere "an apparatus of another system such as the first standard or another NR apparatus" (e.g., a signal including control information and a reference signal such as DMRS, PTRS, and another RS signal).

Although it has been explained that "an NR apparatus (gNB or NR-UE) does not transmit or stands by to transmit a modulation signal in a direction with a signal detected in LBT" in the present disclosure, the NR apparatus (gNB or NR-UE) may transmit a modulation signal in a direction with a signal detected in LBT as long as the modulation signal is a short-period modulation signal that is less likely to interfere "an apparatus of another system such as the first standard or another NR apparatus" (e.g., a signal including control information and a reference signal such as DMRS, PTRS, and another RS signal).

The gNB and NR-UE may detect signals in a plurality of directions in a single reception period in the LBT processing (note that they may detect signals in a plurality of directions in a plurality of reception periods, and the example has been described in an embodiment of the present disclosure. At this time, time division multiplexing (TDM) is performed on the signals in a plurality of methods in some cases). Note that, when the signals in a plurality of directions are detected, the frequency (bands) of the plurality of signals may be the same or different from each other.

When the gNB and NR-UE detect a signal in the first direction and a signal in the second direction in a single reception period, for example, the frequency (band) of the signal in the first direction may be the same as or different from the frequency (band) of the signal in the second direction. Note that the gNB and NR-UE generate receive beam #1 for detecting the signal in the first direction and generate receive beam #2 for detecting the signal in the second direction, for example.

At this time, the case where the frequency (band) of the signal in the first direction is the same as the frequency (band) of the signal in the second direction produces an effect of spatial multiplexing (spatial division multiplexing (SDM)), and the case where the frequency (band) of the signal in the first direction is different from the frequency (band) of the signal in the second direction produces an effect of frequency division multiplexing (FDM).

Note that the gNB and/or NR-UE may control so that the relationship between the signal in the first direction and the signal in the second direction is any one of "spatial multiplexing (spatial division multiplexing (SDM))". "frequency division multiplexing (FDM)", and "time division multiplexing (TDM)". Further, the gNB and/or NR-UE may switch the relationship between the signal in the first direction and the signal in the second direction so that it is any one of "spatial multiplexing (spatial division multiplexing (SDM))", "frequency division multiplexing (FDM)", and "time division multiplexing (TDM)" as time passes.

It is assumed that the gNB and NR-UE perform LBT and do not use two or more directions for communication. At this time, the gNB and NR-UE may detect signals in a plurality of directions from "the two or more directions" in a single reception period (note that they may detect signals in a plurality of directions from "the two or more directions" in a plurality of reception periods, and the example has been described in an embodiment of the present disclosure. At this time, time division multiplexing (TDM) is sometimes performed since there are signals in a plurality of directions from "the two or more directions" in a plurality of reception periods).

For example, the gNB and NR-UE perform the LBT processing and determine not to use the first direction and the second direction for communication. Then, the gNB and NR-UE may detect a signal in the first direction and a signal in the second direction in a single reception period. At this time, the frequency (band) of the signal in the first direction may be the same as or different from the frequency (band) of the signal in the second direction. Note that the gNB and NR-UE generate receive beam #1 for detecting the signal in the first direction and generate receive beam #2 for detecting the signal in the second direction, for example.

At this time, the case where the frequency (band) of the signal in the first direction is the same as the frequency (band) of the signal in the second direction produces an effect of spatial multiplexing (spatial division multiplexing (SDM)), and the case where the frequency (band) of the signal in the first direction is different from the frequency (band) of the signal in the second direction produces an effect of frequency division multiplexing (FDM).

Note that the gNB and/or NR-UE may control so that the relationship between the signal in the first direction and the signal in the second direction is any one of "spatial multiplexing (spatial division multiplexing (SDM))", "frequency division multiplexing (FDM)", and "time division multiplexing (TDM)". Further, the gNB and/or NR-UE may switch the relationship between the signal in the first direction and the signal in the second direction so that it is any one of "spatial multiplexing (spatial division multiplexing (SDM))", "frequency division multiplexing (FDM)", and "time division multiplexing (TDM)" as time passes.

In addition, after the LBT processing, the gNB and NR-UE may simultaneously transmit modulation signals in a plurality of directions in which communication can be performed (note that they may transmit modulation signals in a plurality of directions in a plurality of reception periods, and the example has been described in an embodiment of the present disclosure. At this time, time division multiplexing (TDM) is performed on the modulation signals in a plurality of methods in some cases).

For example, it is assumed that the gNB and NR-UE determine that communication can be performed in the first direction and the second direction by the LBT processing. In this case, when the gNB and NR-UE transmit the first modulation signal from the first direction and the second modulation signal from the second direction, the first modulation signal and the second modulation signal may be present in the same time period. Note that the first modulation signal and the second modulation signal may be signals addressed to the same terminal or may be signals addressed to different terminals. Note that the gNB and NR-UE generate transmit beam #1 for transmitting a signal in the first direction and generate transmit beam #2 for transmitting a signal in the second direction, for example.

The frequency (band) of the first modulation signal may be the same as or different from the frequency (band) of the second modulation signal. At this time, the case where the frequency (band) of the first modulation signal is the same as the frequency (band) of the second modulation signal produces an effect of spatial multiplexing (spatial division multiplexing (SDM)), and the case where the frequency (band) of the first modulation signal is different from the frequency (band) of the second modulation signal produces an effect of frequency division multiplexing (FDM).

Note that the gNB and/or NR-UE may control so that the relationship between the first modulation signal and the second modulation signal is any one of "spatial multiplexing (spatial division multiplexing (SDM))", "frequency division multiplexing (FDM)", and "time division multiplexing (TDM)". Further, the gNB and/or NR-UE may switch the relationship between the first modulation signal and the second modulation signal so that it is any one of "spatial multiplexing (spatial division multiplexing (SDM))", "frequency division multiplexing (FDM)", and "time division multiplexing (TDM)" as time passes.

As another example, it is assumed that the gNB and NR-UE perform the LBT processing and do not use two or more directions for communication. At this time, the gNB and NR-UE may perform signal detection in "the two or more directions" and simultaneously transmit modulation signals in two or more directions in transmitting modulation signals in two or more directions (note that it need not be simultaneous, and the example has been described in an embodiment of the present disclosure. In this case, time division multiplexing (TDM) is performed in some cases).

For example, it is assumed that the gNB and NR-UE perform the LBT processing and do not perform communication in the first direction and the second direction. Then, the gNB and NR-UE may perform signal detection in the first direction and the second direction and simultaneously transmit modulation signals in the first direction and the second direction. Note that the signal in the first direction and the signal in the second direction may be signals addressed to the same terminal or may be signals addressed to different terminals. Note that the gNB and NR-UE generate transmit beam #1 for transmitting a signal in the first direction and generate transmit beam #2 for transmitting a signal in the second direction, for example.

The frequency (band) of the signal in the first direction may be the same as or different from the frequency (band) of the signal in the second direction. The case where the frequency (band) of the signal in the first direction is the same as the frequency (band) of the signal in the second direction produces an effect of spatial multiplexing (spatial division multiplexing (SDM)), and the case where the frequency (band) of the signal in the first direction is different from the frequency (band) of the signal in the second direction produces an effect of frequency division multiplexing (FDM).

Note that the gNB and/or NR-UE may control so that the relationship between the signal in the first direction and the signal in the second direction is any one of "spatial multiplexing (spatial division multiplexing (SDM))", "frequency division multiplexing (FDM)", and "time division multiplexing (TDM)". Further, the gNB and/or NR-UE may switch the relationship between the signal in the first direction and the signal in the second direction so that it is any one of "spatial multiplexing (spatial division multiplexing (SDM))", "frequency division multiplexing (FDM)", and "time division multiplexing (TDM)" as time passes.

That is, a receive beam generated by the gNB (or NR-UE) for the LBT and a transmit beam in which the gNB (or NR-UE) transmits the modulation signal during communication are related to each other. For example, when the gNB (or NR-UE) detects a signal in receive beam #1, the gNB (or NR-UE) does not transmit a modulation signal (does not start communication) in transmit beam #1. Meanwhile, when the gNB (or NR-UE) detects no signal in receive beam #1, the gNB (or NR-UE) transmits a modulation signal (starts communication).

The "bandwidth of a signal transmitted/received by gNB or NR-UE" may be the same as or different from the "bandwidth of a signal transmitted/received by a first standard apparatus".

In the present disclosure, LBT may be referred to as a "channel access procedure" or "part of channel access procedure".

The unlicensed band may be referred to as a shared spectrum.

In a case where an apparatus of NR such as gNB and NR-UE transmits a synchronization signal block (SSB), the SSB may include the sector sweep reference signal described in the present specification.

Communication in which a plurality of channels are aggregated may be referred to as channel aggregation. Communication in which a plurality of carriers are aggregated may be referred to as carrier aggregation. All or some of the above-described first channel of NR to fifth channel of NR may be aggregated (channel aggregation) and used for communication. The first standard is not limited to IEEE 802.11ad or IEEE 802.11ay. The first standard may be, for example, IEEE 802.11aj. Omni-directional LBT may also be referred to as quasi-omni-directional LBT.

Note that "A and/or B" in the present specification may be interpreted as "A and B" or may also be interpreted as "A or B".

Although apparatuses in FIGS. 1A, 1B, 1C, 39, 40, etc. have been described as a configuration of NR apparatus such as gNB and NR-UE in the present embodiment, the configuration is not limited to these. For example, the NR apparatus may be an apparatus that includes "one or more or two or more transmission antennas" and "one or more or two or more reception antennas", transmits one or more modulation signals, and receives one or more modulation signals. The transmission antenna and the reception antenna may be a transmission and reception sharing antenna.

In addition, sections described as the operations for NR-UE may be performed by gNB, a base station, a repeater, a TRP an access point, a movement including a communication apparatus.

Although gNB has been described as an example of an apparatus performing transmission of broadcast modulation signals and broadcast LBT described in the present specification, the same can be implemented with NR-UE, a base station, a terminal, a repeater, a TRP, an access point, a mobile apparatus including a communication apparatus, etc.

In the present specification, gNB uses transmit beams in transmitting modulation signals, and NR-UE selects a suitable beam from the transmit beams used by the gNB in receiving the modulation signals transmitted by the gNB. At this time, the selection of a receive beam used by the NR-UE, which is selection of the transmit beam to be used by the gNB, may be referred to as beam switching.

Although the present specification provides specific values of frequency in the above, the contents described in the present specification can be similarly implemented by using a frequency other than the above specific frequencies. In addition, the contents described in the present specification can be applicable to not only an unlicensed band but also a licensed band.

For example, gNB transmits a plurality of data frames to the first NR-UE as described in the present specification. At this time, the gNB may apply (downlink) spatial division multiplexing (SDM), which uses the same timing and the same frequency to transmit the plurality of data frames, for the first NR-UE.

In addition, the gNB may apply (downlink) frequency division multiplexing (FDM), which uses "a plurality of frequencies or a plurality of carriers" to transmit the plurality of data frames, for the first NR-UE.

Further, the gNB may apply (downlink) time division multiplexing (TDM), which uses a first frequency and divides the time into pluralities to transmit the plurality of data frames, for the first NR-UE.

Further, for example, the second NR-UE transmits a plurality of data frames to the gNB as described in the present specification. At this time, the second NR-UE may apply (uplink) SDM, which uses the same timing and the same frequency to transmit the plurality of data frames, for the gNB.

In addition, the second NR-UE may apply (uplink) FDM, which uses "a plurality of frequencies or a plurality of carriers" to transmit the plurality of data frames, for the gNB.

Further, the second NR-UE may apply (uplink) TDM, which uses a second frequency and divides the time into pluralities to transmit the plurality of data frames, for the gNB.

Note that "A and/or B" in the present specification may be interpreted as "A and B" or may also be interpreted as "A or B".

The gNB and NR-UE may be able to change or configure the frequency bandwidth of LBT, that is, the frequency bandwidth may be configured in any manner. At this time, the modulation signal transmitted by the gNB and NR-UE may be a signal of a multi-carrier scheme such as OFDM or a signal of a single-carrier scheme.

In a case where the scheme of a modulation signal is a single-carrier scheme, for example, it is considered to transmit a modulation signal in units of channel bandwidth by FDD. TDD, etc. Thus, when the gNB and NR-UE perform LBT for a plurality of channels in performing LBT, it is possible to collectively detect a channel with a signal detected and a channel with no signal detected. This allows the gNB and NR-UE to transmit a modulation signal by selecting the channel with no signal detected.

For example, it is assumed that the gNB is configured to be able to switch between transmission of a modulation signal of a single-carrier scheme and transmission of a modulation signal of a multi-carrier scheme such as OFDM. In this case, the gNB configures "the frequency bandwidth of LBT performed before transmitting a modulation signal of a single-carrier scheme" and configures "the frequency bandwidth of LBT performed before transmitting a modulation signal of a multi-carrier scheme such as OFDM". For example, "the frequency bandwidth of LBT performed before transmitting a modulation signal of a single-carrier scheme" and "the frequency bandwidth of LBT performed before transmitting a modulation signal of a multi-carrier scheme such as OFDM" may be different from each other.

Note that a channel access method such as LBT may be categorized as follows, and any of Category 1 to Category 4 may be applied to the LBT described in the present specification.

Category 1:

Transmit immediately after a short switching period. (Transmit without performing LBT.)

Category 2.

Perform LBT without random backoff.

For example, perform carrier sensing in a fixed sensing time before transmission, and transmit when a channel is available.

Category 3:

Perform LBT with random backoff having a fixed-size contention window.

For example, randomly generate a value within a predetermined range before transmission, repeat carrier sensing in a fixed sensing slot time, then transmit when confirming that a channel is available for the generated value.

Category 4:

Perform LBT with random backoff having a variable-size contention window.

For example, randomly generate a value within a predetermined range before transmission, repeat carrier sensing in a fixed sensing slot time, then transmit when confirming that a channel is available for the generated value. In this case, the generation range of the random backoff value (contention window) is variable according to a communication failure state due to collision with communication of another system.

In Embodiment 5 and thereafter, a description has been given of an operation when an NR apparatus such as gNB and NR-UE performs broadcast. Although the term "broadcast" is used here, the same can be implemented in the case of "unicast", i.e., the case where an NR apparatus performs communication with a single (or one or more) communication counterpart.

For example, in Embodiment 5 and thereafter, a description has been given of a "method of transmitting broadcast frames and broadcast signals when an NR apparatus performs broadcast", a "method of LBT performed before broadcast frames and broadcast signals are transmitted", a "beamforming method when broadcast frames and broadcast signals are transmitted", and a "receive beamforming method of an NR apparatus", but the same can be implemented when they are performed as a "method of transmitting unicast frames and unicast signals when an NR apparatus performs unicast", a "method of LBT performed before unicast frames and unicast signals are transmitted", a "beamforming method when unicast frames and unicast signals are transmitted", and a "receive beamforming method of an NR apparatus". In addition, broadcast data 4612_*i* may be considered as unicast data in FIG. 46C.

At this time, "unicast data 4612_0, unicast data 4612_1, unicast data 4612_2, unicast data 4612_3, unicast data 4612_4, unicast data 4612_5, unicast data 4612_6, and unicast data 4612_7" include the same data, for example. As another example, "unicast data 4612_0, unicast data 4612_1, unicast data 4612_2, unicast data 4612_3, unicast data 4612_4, unicast data 4612_5, unicast data 4612_6, and unicast data 4612_7" may be configured to include the same content although "the condition, such as a compression ratio and a configuration, is different". Further, "unicast data 4612_0, unicast data 4612_1, unicast data 4612_2, unicast data 4612_3, unicast data 4612_4, unicast data 4612_5, unicast data 4612_6, and unicast data 4612_7" may include partially the same data.

That is, repetition is performed. Note that the method of repetition is not limited to this example, and it can be performed in a different method as long as the same data is transmitted a plurality of times.

Likewise, broadcast data 5312_*i* may be considered as unicast data in FIG. 53D.

At this time, "unicast data 5312_0, unicast data 5312_1, unicast data 5312_2, and unicast data 5312_3" include the same data, for example. As another example, "unicast data 5312_0, unicast data 5312_1, unicast data 5312_2, and unicast data 5312_3" may be configured to include the same content although "the condition, such as a compression ratio and a configuration, is different". Further, "unicast data 5312_0, unicast data 5312_1, unicast data 5312_2, and unicast data 5312_3" may include partially the same data.

That is, repetition is performed. Note that the method of repetition is not limited to this example, and it can be performed in a different method as long as the same data is transmitted a plurality of times.

In FIG. 54D, broadcast data 5412_*i* may be considered as unicast data.

At this time, "unicast data 5412_0, unicast data 5412_1, unicast data 5412_2, unicast data 5412_3, unicast data 5412_4, unicast data 5412_5, unicast data 5412_6, unicast data 5412_7, unicast data 5412_8, unicast data 5412_9, unicast data 5412_10, unicast data 5412_11, unicast data 5412_12, unicast data 5412_13, unicast data 5412_14, and unicast data 5412_15" include the same data, for example. As another example, "unicast data 5412_0, unicast data 5412_1, unicast data 5412_2, unicast data 5412_3, unicast data 5412_4, unicast data 5412_5, unicast data 5412_6, unicast data 5412_7, unicast data 5412_8, unicast data 5412_9, unicast data 5412_10, unicast data 5412_11, unicast data 5412_12, unicast data 5412_13, unicast data 5412_14, and unicast data 5412_15" may be configured to include the same content although "the condition, such as a compression ratio and a configuration, is different. Further, "unicast data 5412_0, unicast data 5412_1, unicast data 5412_2, unicast data 5412_3, unicast data 5412_4, unicast data 5412_5, unicast data 5412_6, unicast data 5412_7, unicast data 5412_8, unicast data 5412_9, unicast data 5412_10, unicast data 5412_11, unicast data 5412_12, unicast data 5412_13, unicast data 5412_14, and unicast data 5412_15" may include partially the same data.

That is, repetition is performed. Note that the method of repetition is not limited to this example, and it can be performed in a different method as long as the same data is transmitted a plurality of times.

In FIG. 59B, broadcast data 5922_*i* may be considered as unicast data.

At this time. "unicast data 5922_1, unicast data 5922_2, unicast data 5922_3, unicast data 5922_4, . . . , unicast data 5922_M" include the same data, for example. As another example, "unicast data 5922_1, unicast data 5922_2, unicast data 5922_3, unicast data 5922_4, . . . , unicast data 5922_M" may be configured to include the same content although "the condition, such as a compression ratio and a configuration, is different". Further, "unicast data 5922_1, unicast data 5922_2, unicast data 5922_3, unicast data 5922_4 . . . , unicast data 5922_M" may include partially the same data.

That is, repetition is performed. Note that the method of repetition is not limited to this example, and it can be performed in a different method as long as the same data is transmitted a plurality of times.

In FIG. 61B, broadcast data 6122_*i* may be considered as unicast data.

At this time, "unicast data 6122_0, unicast data 6122_1, unicast data 6122_2, unicast data 6122_3, unicast data 6122_4, . . . , unicast data 6122_7" include the same data, for example. As another example, "unicast data 6122_0, unicast data 6122_1, unicast data 6122_2, unicast data 6122_3, unicast data 6122_4, . . . , unicast data 6122_7" may be configured to include the same content although "the condition, such as a compression ratio and a configuration, is different". Further, "unicast data 6122_0, unicast data 6122_1, unicast data 6122_2, unicast data 6122_3, unicast data 6122_4, . . . , unicast data 6122_7" may include partially the same data.

That is, repetition is performed. Note that the method of repetition is not limited to this example, and it can be performed in a different method as long as the same data is transmitted a plurality of times.

In FIG. 63B, broadcast data 6322_*xy* may be considered as unicast data.

At this time, "unicast data 6322_11, unicast data 6322_12, . . . , unicast data 6322_1N", "unicast data 6322_21, unicast data 6322_22, . . . , unicast data 6322_2N",

. . .

"unicast data 6322_M1, unicast data 6322_M2, . . . , unicast data 6322_MN" include the same data, for example.

As another example, "unicast data 6322_11, unicast data 6322_12, . . . , unicast data 6322_1N", "unicast data 6322_21, unicast data 6322_22, . . . , unicast data 6322_2N",

. . .

"unicast data 6322_M1, unicast data 6322_M2, . . . , unicast data 6322_MN" may be configured to include the same content although "the condition, such as a compression ratio and a configuration, is different".

Further, "unicast data 6322_11, unicast data 6322_12, . . . , unicast data 6322_1N", "unicast data 6322_21, unicast data 6322_22, . . . , unicast data 6322_2N",

. . .

"unicast data 6322_M1, unicast data 6322_M2, . . . , unicast data 6322_MN" may include partially the same data.

That is, repetition is performed. Note that the method of repetition is not limited to this example, and it can be performed in a different method as long as the same data is transmitted a plurality of times.

In FIG. 65B, broadcast data 6522_*xy* may be considered as unicast data.

At this time, "unicast data 6522_11, unicast data 6522_12, . . . , unicast data 6522_1N", "unicast data 6522_21, unicast data 6522_22, . . . , unicast data 6522_2N",

. . .

"unicast data 6522_M1, unicast data 6522_M2, . . . , unicast data 6522_MN" include the same data, for example.

As another example, "unicast data 6522_11, unicast data 6522_12, . . . , unicast data 6522_1N", "unicast data 6522_21, unicast data 6522_22, . . . , unicast data 6522_2N".

. . .

"unicast data 6522_M1, unicast data 6522_M2, . . . , unicast data 6522_MN" may be configured to include the same content although "the condition, such as a compression ratio and a configuration, is different".

Further. "unicast data 6522_11, unicast data 6522_12, . . . , unicast data 6522_1N", "unicast data 6522_21, unicast data 6522_22, . . . , unicast data 6522_2N",

. . .

"unicast data 6522_M1, unicast data 6522_M2, . . . , unicast data 6522_MN" may include partially the same data.

That is, repetition is performed. Note that the method of repetition is not limited to this example, and it can be performed in a different method as long as the same data is transmitted a plurality of times.

In FIG. 68D, broadcast data 6822_*ix* may be considered as unicast data.

At this time, "unicast data 6822_01, unicast data 6822_02, . . . , unicast data 6822_0G", "unicast data 6822_11, unicast data 6822_12, . . . , unicast data 6822_1G", "unicast data 6822_21, unicast data 6822_22, . . . , unicast data 6822_2G", "unicast data 6822_31, unicast data 6822_32, . . . , unicast data 6822_3G", "unicast data 6822_41, unicast data 6822_42, . . . , unicast data 6822_4G", "unicast data 6822_51, unicast data 6822_52, . . . , unicast data 6822_5G", "unicast data 6822_61, unicast data 6822_62, . . . , unicast data 6822_6G", and "unicast data 6822_71, unicast data 6822_72, . . . , unicast data 6822_7G" include the same data, for example.

As another example, "unicast data 6822_01, unicast data 6822_02, . . . , unicast data 6822_0G", "unicast data 6822_11, unicast data 6822_12, . . . , unicast data 6822_1G", "unicast data 6822_21, unicast data 6822_22, . . . , unicast data 6822_2G".

"unicast data 6822_31, unicast data 6822_32, . . . , unicast data 6822_3G", "unicast data 6822_41, unicast data 6822_42, . . . , unicast data 6822_4G".

"unicast data 6822_51, unicast data 6822_52, . . . , unicast data 6822_5G", "unicast data 6822_61, unicast data 6822_62, . . . , unicast data 6822_6G", and "unicast data 6822_71, unicast data 6822_72, . . . , unicast data 6822_7G" may be configured to include the same content although "the condition, such as a compression ratio and a configuration, is different".

Further, "unicast data 6822_01, unicast data 6822_02, . . . , unicast data 6822_0G", "unicast data 6822_11, unicast data 6822_12, . . . , unicast data 6822_1G", "unicast data 6822_21, unicast data 6822_22, . . . , unicast data 6822_2G", "unicast data 6822_31, unicast data 6822_32, . . . , unicast data 6822_3G", "unicast data 6822_41, unicast data 6822_42, . . . , unicast data 6822_4G", "unicast data 6822_51, unicast data 6822_52, . . . , unicast data 6822_5G".

"unicast data 6822_61, unicast data 6822_62, . . . , unicast data 6822_6G", and "unicast data 6822_71, unicast data 6822_72, . . . , unicast data 6822_7G" may include partially the same data.

That is, repetition is performed. Note that the method of repetition is not limited to this example, and it can be performed in a different method as long as the same data is transmitted a plurality of times.

Note that this is applicable to broadcast data 8002_*i* in FIG. 80 and broadcast data 8112_[i, k] in FIG. 81B.

The disclosure of Japanese Patent Application No. 2021-161741, filed on Sep. 30, 2021, including the specification, drawings and abstract, is incorporated herein by reference in its entirety.

INDUSTRIAL APPLICABILITY

The present disclosure is widely applicable to radio systems for transmitting modulation signals from one or more antennas, and is suitable for the application to, for example, a communication system using a single carrier and a communication system using a multi-carrier transmission scheme such as OFDM. The present disclosure is also applicable to wired communication systems such as a power line communication (PLC) system, an optical communication system, and a digital subscriber line (DSL) system.

REFERENCE SIGNS LIST

100 Control signal
101_*i* i-th data
102_*i* i-th transmitter
103_*i* i-th modulation signal
104 First processor
105_*j* j-th transmission signal
106_*j* Transmission panel antenna j
151_*i* Reception panel antenna i
152_*i* i-th received signal
153 Second processor
154 j-th signal-processing-subjected signal
155_*j* j-th receiver
156_*j* j-th control data
157_*j* j-th data
158 Third processor
200 Control signal
201 Data
202 Data symbol generator

203 Data symbol modulation signal
204 Sector sweep reference signal generator
205 Sector sweep reference signal
206 Other-signal generator
207 Other signals
251 Processor
252 Frame configuration-based modulation signal
300 Control signal
301 Transmission signal
302 Distributor
303_1 First transmission signal
303_2 Second transmission signal
303_3 Third transmission signal
303_4 Fourth transmission signal
304_1, 304_2, 304_3, 304_4 Multiplier
305_1 Coefficient-multiplication-subjected first transmission signal
305_2 Coefficient-multiplication-subjected second transmission signal
305_3 Coefficient-multiplication-subjected third transmission signal
305_4 Coefficient-multiplication-subjected fourth transmission signal
306_1, 306_2, 306_3, 306_4 Antenna
400 Control signal
401_1, 401_2, 401_3, 401_4 Antenna
402_1 First received signal
402_2 Second received signal
402_3 Third received signal
402_4 Fourth received signal
403_1, 403_2, 403_3, 403_4 Multiplier
404_1 Coefficient-multiplication-subjected first received signal
404_2 Coefficient-multiplication-subjected second received signal
404_3 Coefficient-multiplication-subjected third received signal
404_4 Coefficient-multiplication-subjected fourth received signal
405 Coupler/combiner
406 Modulation signal
501 Constellation mapper
502 Serial/parallel converter
503 IFFT
601 Rx FE processing
602 FFT
603 Parallel/serial converter
604 Demapper
701 Rx FE processing
702 CP removal
703 FFT
704 Tone demapping
705 FDE
706 DFT
707 Demapper
801 Rx FE processing
802 Down-sampling and match filtering
803 TDE
804 CP removal
805 Demapper
901_1 Base station #1
902_1 Terminal #1
902_2 Terminal #2
902_3 Terminal #3
1000 Modulation signal

1001, 1801_1, 1801_2, 1851_1, 1851_2, 2401_1 to 2401_3, 3601_1, 3601_2, 4101_3, 4201_3 Sector sweep reference signal
1002, 1802_1 Feedback signal
1003, 1803_1, 1803_2, 1803_3, 1852_1, 1852_2, 1852_3 Data-symbol-included frame
1101_*pi* Sector sweep reference signal in transmission panel antenna i for frequency ♭p
1201_*j* Reference signal according to j-th parameter in transmission panel antenna i for frequency ♭p
1301_1 to 1301_8 Terminal "sector sweep reference signal" first transmission period to terminal "sector sweep reference signal" eighth transmission period
1401_*i* Terminal #i "sector sweep reference signal"
1501_*xi* Sector sweep reference signal in terminal #i transmission panel antenna xi
1511_*j* Reference signal according to j-th parameter in transmission panel antenna xi
1601_11 to 1601_K4 Feedback signal first transmission period for frequency ♭1 to feedback signal fourth transmission period for frequency ♭K
1611_*i* Terminal #i-addressed feedback signal
1701_11 to 1701_K4 Modulation signal (slot) first transmission period for frequency ♭1 to modulation signal (slot) fourth transmission period for frequency ♭K
1711 to 1716, 3011_1 to 3011_6 Terminal #1-addressed modulation signal (slot) to terminal #6-addressed modulation signal (slot)
1802_1, 1802_2 Feedback signal
1803_1, 1803_2, 1803_3, 1803_4 Data-symbol-included frame
1852_1, 1852_2, 1852_3, 1852_4 Data-symbol-included frame
2001_1 to 2001_6, 2501_1 to 2501_6, 3111_1 to 3111_6 Terminal #1 transmission frame to terminal #6 transmission frame
2401 Sector sweep reference signal
2501 Transmission frame
2701 Sector sweep reference signal
2811 Sector sweep reference signal
2911 Feedback signal
3011 Modulation signal
3111 Transmission frame
3401, 3501, 3601, 3701, 4101, 4201, 7901 Reference signal
3801 Feedback signal
3901 Terminal-addressed modulation signal
4611, 5921, 6121, 6521, 6821, 8001, 8003, 8111, 8113 Control information
4911, 5412, 5910, 6110, 6310, 6510, 6820 Broadcast frame
5211 Unicast frame
5412, 5922, 6122, 6322, 6522, 8002, 8112 Broadcast data
8300 UE capability information

The invention claimed is:

1. A communication apparatus, comprising:

control circuitry, which, in operation, forms a plurality of beams; and communication circuitry, which, in operation, associates a plurality of broadcast frames with the plurality of beams respectively and transmits the plurality of broadcast frames, wherein, the communication circuitry transmits the plurality of broadcast frames based on a result of listen before talk (LBT) in a direction of each of the plurality of beams, and the control circuitry, before the communication circuitry starts transmission of the plurality of broadcast frames, performs, for each of a plurality of channels, clear channel assessment based on the LBT in a direction of each of the plurality of beams, determines transmission of a broadcast frame in an idle channel determined to be idle among the plurality of channels, and, when there are a plurality of idle channels, determines simultaneous transmission of a broadcast frame in the plurality of idle channels.

2. The communication apparatus according to claim 1, wherein the communication circuitry transmits each of the plurality of broadcast frames using at least one or more of time division multiplexing, frequency division multiplexing, and spatial division multiplexing.

3. The communication apparatus according to claim 1, wherein data to be transmitted using the plurality of broadcast frames are identical in all of the plurality of broadcast frames or in some of the plurality of broadcast frames.

4. The communication apparatus according to claim 1, wherein the communication circuitry transmits the plurality of broadcast frames using a single channel or a plurality of channels.

5. The communication apparatus according to claim 1, wherein the control circuitry performs LBT for each direction using a spatial beam having a beam width wider than a beam width of a transmission beam of the broadcast frame.

6. A communication apparatus, comprising:

control circuitry, which, in operation, includes broadcast data in each of a plurality of reference signals for sector sweeping; and communication circuitry, which, in operation, transmits the plurality of reference signals using a plurality of beams, wherein, the control circuitry, before the communication circuitry starts transmission of the plurality of reference signals, performs, for each of a plurality of channels, clear channel assessment based on listen before talk (LBT) in each of the plurality of beams, determines transmission of a reference signal in an idle channel determined to be idle among the plurality of channels, and, when there are a plurality of idle channels, determines simultaneous transmission of a reference signal in the plurality of idle channels.

7. The communication apparatus according to claim 6, wherein the communication circuitry transmits each of the plurality of reference signals using at least one or more of time division multiplexing and frequency division multiplexing.

8. The communication apparatus according to claim 6, wherein the communication circuitry transmits the broadcast data based on a result of the LBT in a communication direction of each of the plurality of reference signals.

9. The communication apparatus according to claim 8, wherein the communication circuitry transmits the broadcast data without performing the LBT when a transmission time of each of the plurality of reference signals is shorter than a predetermined time.

10. The communication apparatus according to claim 6, wherein the communication circuitry transmits the plurality of broadcast data using a single channel or a plurality of channels.

11. The communication apparatus according to claim 6, wherein the control circuitry performs LBT for each direction using a spatial beam having a beam width wider than a beam width of a transmission beam of the reference signal.

12. A communication method, comprising:

forming a plurality of beams;

associating a plurality of broadcast frames with the plurality of beams respectively and transmitting the plurality of broadcast frames; and transmitting the plurality of broadcast frames based on a result of listen before talk (LBT) in a direction of each of the plurality of beams, wherein the method includes:

before starting transmission of the plurality of broadcast frames, performing, for each of a plurality of channels, clear channel assessment based on the LBT in a direction of each of the plurality of beams;

determining transmission of a broadcast frame in an idle channel determined to be idle among the plurality of channels; and when there are a plurality of idle channels, determining simultaneous transmission of a broadcast frame in the plurality of idle channels.

13. A communication method, comprising:

including broadcast data in each of a plurality of reference signals for sector sweeping; and transmitting the plurality of reference signals using a plurality of beams, wherein the method includes:

before starting transmission of the plurality of reference signals, performing, for each of a plurality of channels, clear channel assessment based on listen before talk (LBT) in each of the plurality of beams;

determining transmission of a reference signal in an idle channel determined to be idle among the plurality of channels; and when there are a plurality of idle channels, determining simultaneous transmission of a reference signal in the plurality of idle channels.

* * * * *